United States Patent
Ahlfeld et al.

(10) Patent No.: US 9,704,604 B2
(45) Date of Patent: Jul. 11, 2017

(54) NUCLEAR FISSION REACTOR FUEL ASSEMBLY AND SYSTEM CONFIGURED FOR CONTROLLED REMOVAL OF A VOLATILE FISSION PRODUCT AND HEAT RELEASED BY A BURN WAVE IN A TRAVELING WAVE NUCLEAR FISSION REACTOR AND METHOD FOR SAME

(75) Inventors: Charles E. Ahlfeld, La Jolla, CA (US); John Rogers Gilleland, Kirkland, WA (US); Roderick A. Hyde, Redmond, WA (US); Muriel Y. Ishikawa, Livermore, CA (US); David G. McAlees, Bellevue, WA (US); Nathan P. Myhrvold, Medina, WA (US); Clarence T. Tegreene, Bellevue, WA (US); Thomas Allan Weaver, San Mateo, CA (US); Charles Whitmer, North Bend, WA (US); Victoria Y. H. Wood, Livermore, CA (US); Lowell L. Wood, Jr., Bellevue, WA (US); George B. Zimmerman, Lafayette, CA (US)

(73) Assignee: TerraPower, LLC, Bellevue, WA (US)

( * ) Notice: Subject to any disclaimer, the term of this patent is extended or adjusted under 35 U.S.C. 154(b) by 1240 days.

(21) Appl. No.: 12/459,855

(22) Filed: Jul. 7, 2009

(65) Prior Publication Data
US 2010/0266089 A1  Oct. 21, 2010

Related U.S. Application Data

(63) Continuation-in-part of application No. 12/386,524, filed on Apr. 16, 2009, now Pat. No. 9,443,623.

(51) Int. Cl.
*G21C 7/30* (2006.01)
*G21C 7/00* (2006.01)
(Continued)

(52) U.S. Cl.
CPC ............... *G21C 7/00* (2013.01); *G21C 1/026* (2013.01); *G21C 3/00* (2013.01); *G21C 21/02* (2013.01); *Y02E 30/34* (2013.01); *Y02E 30/39* (2013.01)

(58) Field of Classification Search
CPC .... G21C 21/02; G21C 21/022; G21C 21/024; G21C 21/026; G21C 7/00; G21C 1/026;
(Continued)

(56) References Cited

U.S. PATENT DOCUMENTS

| 2,987,455 A | 6/1961 | Huston et al. |
| 2,990,354 A | 6/1961 | Anderson et al. |

(Continued)

FOREIGN PATENT DOCUMENTS

| CN | 101090006 A | 12/2007 |
| GB | 1 202 920 | 8/1970 |

(Continued)

OTHER PUBLICATIONS

European Patent Office Extended Search Report, Reference P045441EP IRH, Sep. 26, 2013.*
(Continued)

*Primary Examiner* — Marshall O'Connor

(57) ABSTRACT

A nuclear fission reactor fuel assembly and system configured for controlled removal of a volatile fission product and heat released by a burn wave in a traveling wave nuclear fission reactor and method for same. The fuel assembly comprises an enclosure adapted to enclose a porous nuclear fuel body having the volatile fission product therein. A fluid control subassembly is coupled to the enclosure and adapted to control removal of at least a portion of the volatile fission product from the porous nuclear fuel body. In addition, the fluid control subassembly is capable of circulating a heat removal fluid through the porous nuclear fuel body in order to remove heat generated by the nuclear fuel body.

15 Claims, 213 Drawing Sheets

(51) Int. Cl.
G21C 1/02 (2006.01)
G21C 3/00 (2006.01)
G21C 21/02 (2006.01)

(58) Field of Classification Search
CPC ... G21C 3/22; G21C 3/24; G21C 3/26; G21C 3/041; G21C 3/044; G21C 5/18; G21C 15/00; G21C 15/02; G21C 15/04; Y02E 30/34; Y02E 30/39
USPC ....... 376/156, 213, 174, 176, 207, 218, 226, 376/230, 247, 277
See application file for complete search history.

(56) References Cited

U.S. PATENT DOCUMENTS

| | | | |
|---|---|---|---|
| 3,010,889 A | | 11/1961 | Fortescue et al. |
| 3,039,948 A | * | 6/1962 | Krucoff ................. 376/311 |
| 3,219,538 A | * | 11/1965 | Glueckauf et al. .......... 376/313 |
| 3,232,843 A | | 2/1966 | Went et al. |
| 3,285,823 A | | 11/1966 | McDaniel et al. |
| 3,322,644 A | * | 5/1967 | Benson ................. 376/416 |
| 3,459,635 A | | 8/1969 | Bevilacqua et al. |
| 3,573,168 A | | 3/1971 | Campbell |
| 3,813,344 A | | 5/1974 | Krauth et al. |
| 3,964,964 A | | 6/1976 | Fryer et al. |
| 3,976,542 A | | 8/1976 | Fortescue |
| 3,996,100 A | | 12/1976 | Oguma et al. |
| 4,012,490 A | * | 3/1977 | Lofredo ................. 423/262 |
| 4,093,429 A | | 6/1978 | Siegler et al. |
| 4,279,875 A | | 7/1981 | Bray et al. |
| 4,285,891 A | | 8/1981 | Bray et al. |
| 4,330,367 A | | 5/1982 | Musick |
| 4,369,048 A | | 1/1983 | Pence |
| 5,268,947 A | | 12/1993 | Bastide et al. |
| 6,044,858 A | | 4/2000 | Nathenson |
| 6,233,298 B1 | | 5/2001 | Bowman |
| 6,315,029 B1 | | 11/2001 | Cho et al. |
| 8,320,513 B2 | | 11/2012 | Ahlfeld et al. |
| 8,369,474 B2 | | 2/2013 | Ahfeld et al. |
| 2006/0147626 A1 | | 7/2006 | Blomberg |
| 2006/0171498 A1 | | 8/2006 | D'Auvergne |
| 2006/0243858 A1 | | 11/2006 | Anghileri |
| 2008/0123796 A1 | | 5/2008 | Hyde et al. |
| 2008/0123797 A1 | | 5/2008 | Hyde et al. |
| 2009/0080588 A1 | | 3/2009 | Ahlfeld et al. |
| 2009/0232268 A1 | | 9/2009 | Ahlfeld et al. |
| 2009/0252273 A1 | | 10/2009 | Gilleland et al. |
| 2009/0252283 A1 | | 10/2009 | Ahlfeld et al. |
| 2010/0266090 A1 | | 10/2010 | Ahlfeld et al. |
| 2010/0266091 A1 | | 10/2010 | Ahlfeld et al. |

FOREIGN PATENT DOCUMENTS

| | | |
|---|---|---|
| GB | 2 163 888 A | 3/1986 |
| WO | WO 2009/040644 A2 | 4/2009 |

OTHER PUBLICATIONS

U.S. Appl. No. 12/459,856, filed Jul. 7, 2009, Charles E. Ahlfeld et al.
U.S. Appl. No. 12/459,857, filed Jul. 7, 2009, Charles E. Ahlfeld et al.
European Patent Office; Extended European Search Report; Application No. 10 77 2357; Sep. 26, 2013; pp. 1-8.
"A New Type of Power Generation"; Traveling Wave Reactor; copyright date 2012, printed by examiner on Aug. 8, 2013; 1 page; Informational Sites Collective; located at http://travelingwavereactor.org/index.html.
PCT International Search Report; International App. No. PCT/US10/01123; Oct. 8, 2010; pp. 1-2.
Lu Chun-hai, Sun Ying; "Development and application of chemical decontamination in decommission progress of nuclear facility"; China Academy of Engineering Physics; bearing dates of Dec. 5, 2001 and 2002; pp. 25-32; China Academic Journal Electronic Publishing House (No translation available; English abstract on p. 32).
Feoktistov, L. P.; "Safety: the key to revitalization of nuclear power"; Physics—Uspekhi; bearing a date of Aug. 1993; pp. 89-102; vol. 163, No. 8; © Л.П. Феоктистов 1993 (no translation available).
Patent Office of the Russian Federation (ROSPATENT), Office Action; App. No. 2011143970/07(065972); Feb. 18, 2014; 19 pages (including machine translation).
Patent Office of the Russian Federation (ROSPATENT), Office Action; App. No. 2011143978/07(065980); Feb. 17, 2014; 17 pages (including machine translation).
Pavlovich et al.; "Reactor Operating on a Slow Wave of Nuclear Fission"; Atomic Energy; Mar. 2007; pp. 181-189; vol. 102, No. 3; Springer Science + Business Media, Inc.
Brown, L.C.; "Direct Energy Conversion Fission Reactor for the period Dec. 1, 1999 through Feb. 29, 2000"; Report Prepared by General Atomics under Nuclear Energy Research Initiative (NERI) Program DE-FG03-99SF21893 for the U.S. Department of Energy; bearing a date of Mar. 2000; 8 pages total (incl. cover sheet, disclaimer, title page and pp. 1-5); General Atomics; Mar. 2000.
Teller, Edward; Ishikawa, Muriel; Wood, Jr., Lowell; Hyde, Roderick; Nuckolls, John. "Completely Automated Nuclear Reactors for Long-Term Operation II: Toward a Concept-Level Point-Design of a High-Temperature, Gas-Cooled Central Power Station System"; University of California Lawrence Livermore National Laboratory Publication UCRL-JC-122708 Pt 2; submitted to the 1996 International Conference on Emerging Nuclear Energy Systems (ICENES '96), Obninsk, Russian Federation on Jun. 24-28, 1996.
Teller, Edward; Ishikawa, Muriel; Wood, Jr., Lowell; Hyde, Roderick; Nuckolls, John. "Completely Automated Nuclear Power Reactors for Long-Term Operation: III. Enabling Technology for Large-Scale, Low-Risk, Affordable Nuclear Electricity"; University of California Lawrence Livermore National Laboratory Publication UCRL-JRNL-122708; presented at the Jul. 2003 Workshop of the Aspen Global Change Institute.
PCT International Search Report; International App. No. PCT/US10/01122; Oct. 14, 2010; pp. 1-3.
PCT International Search Report; International App. No. PCT/US10/01157; Oct. 13, 2010; pp. 1-2.
PCT International Search Report; International App. No. PCT/US10/01127; Oct. 21, 2010; pp. 1-2.
"Thorium fuel cycle—Potential benefits and challenges", May 2005, 113 pages, International Atomic Energy Agency, Vienna, Austria.
European Patent Office; Extended European Search Report; Application No. 10 772359.5; Oct. 1, 2013 ; pp. 1-2.
European Patent Office; Extended European Search Report; Application No. 10 775181; Oct. 10, 2013 ; pp. 1-6.

* cited by examiner

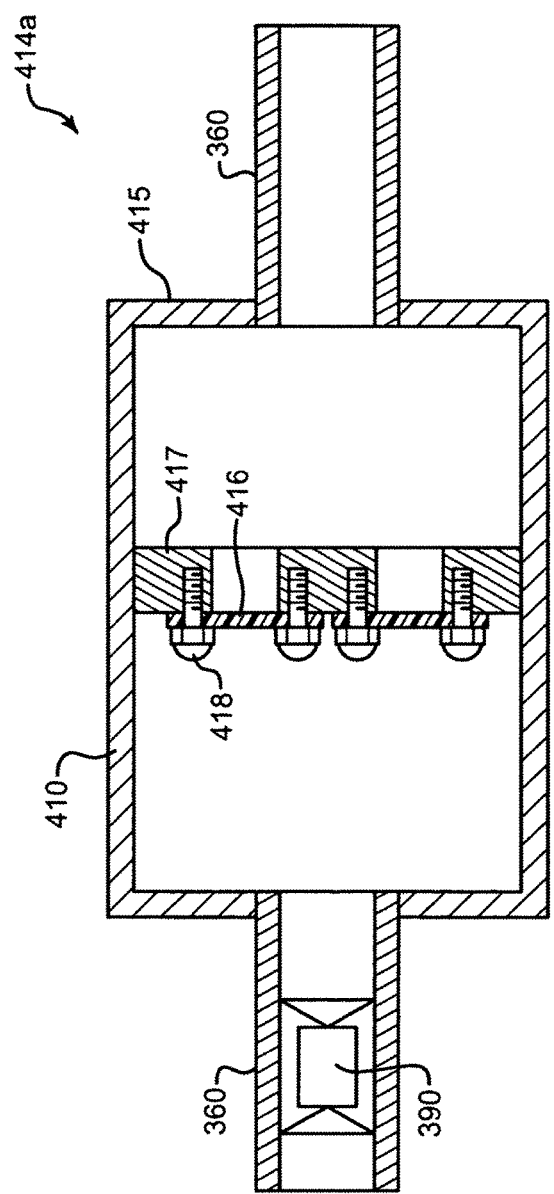

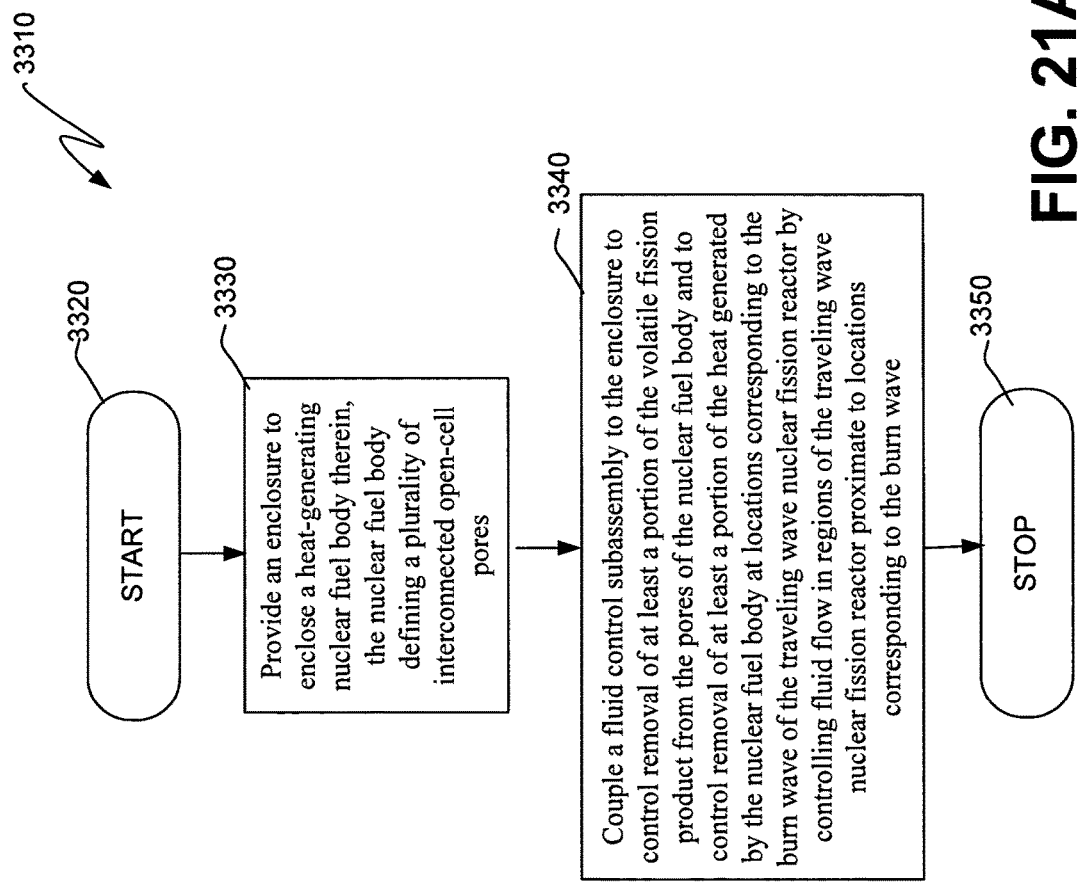

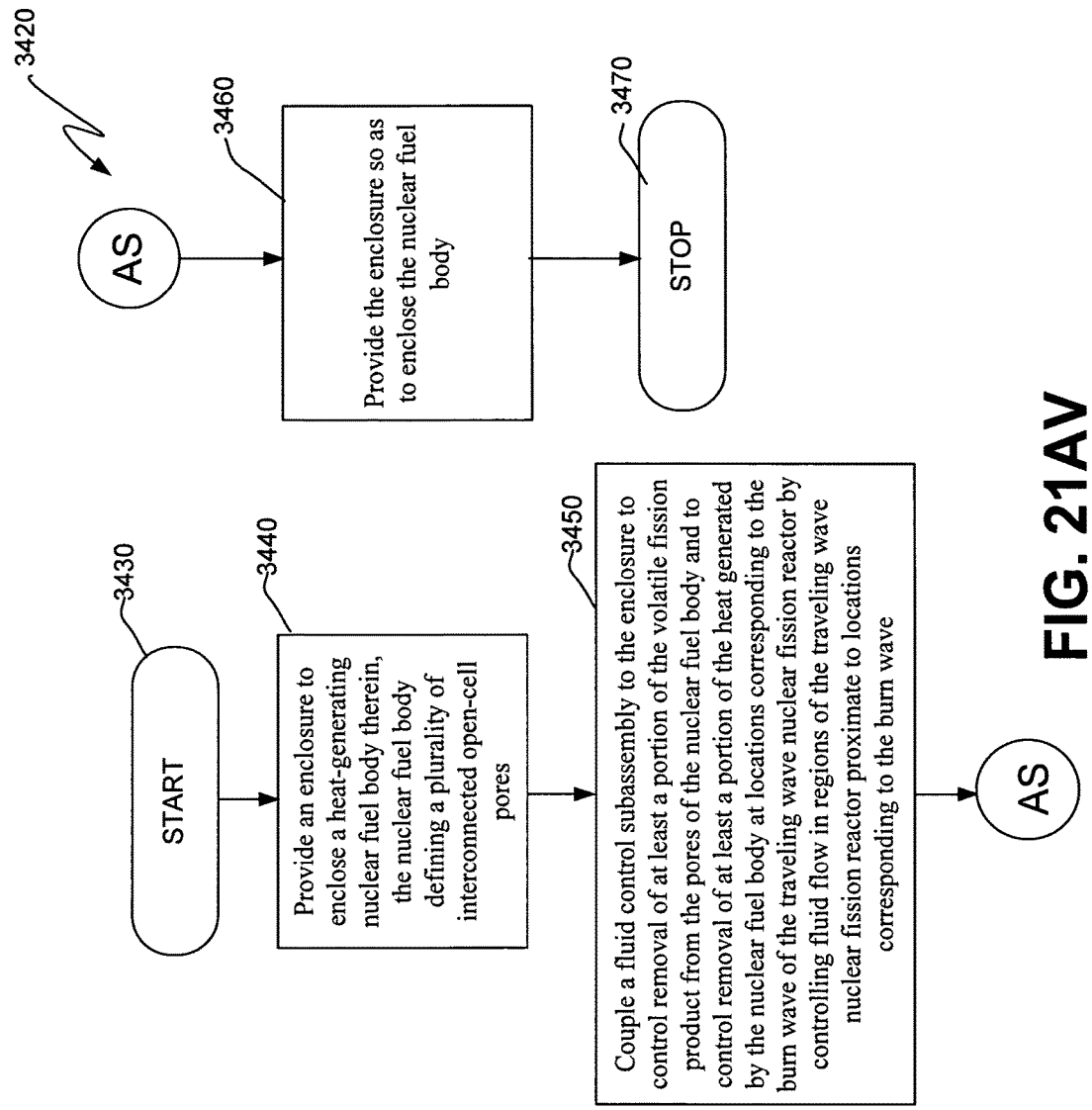

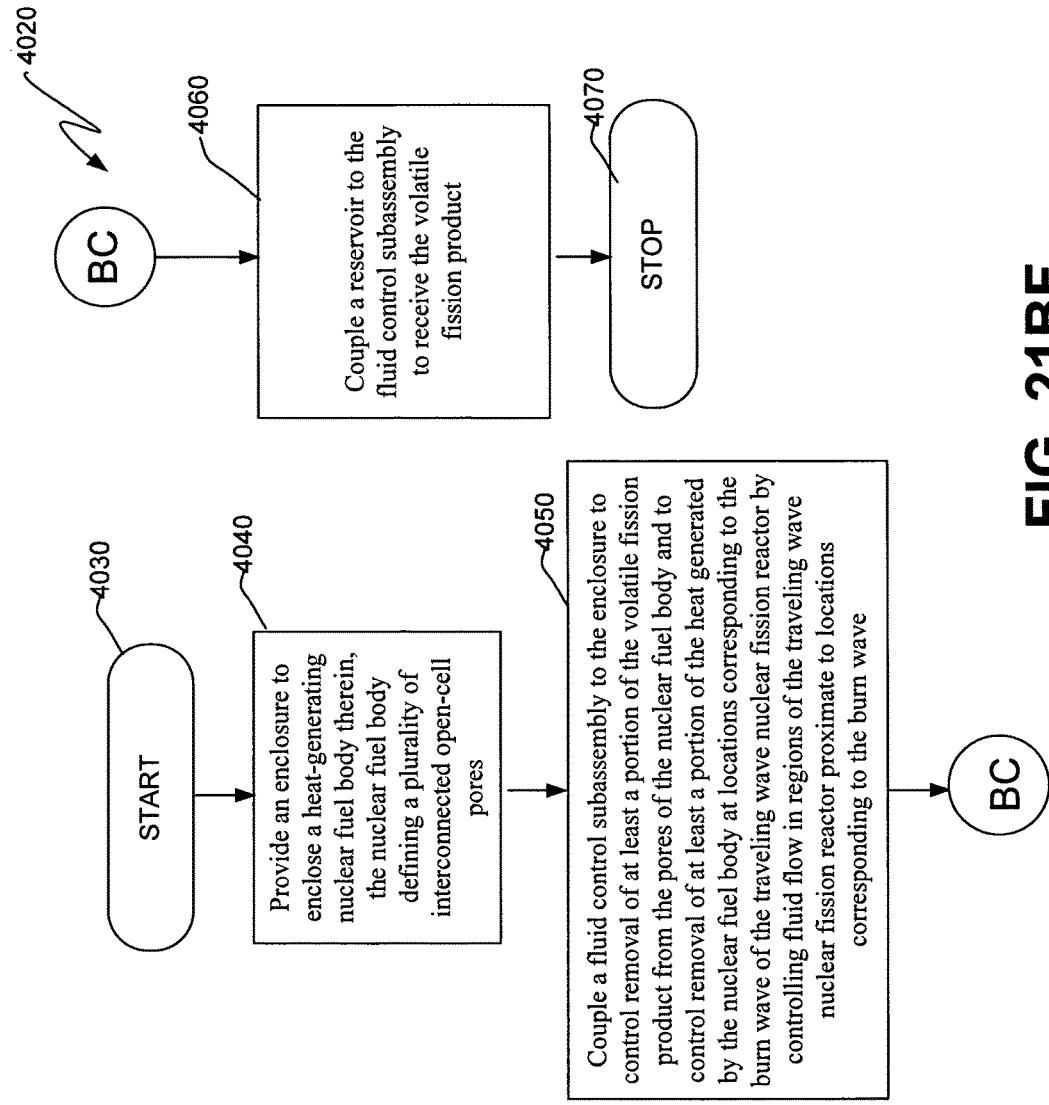

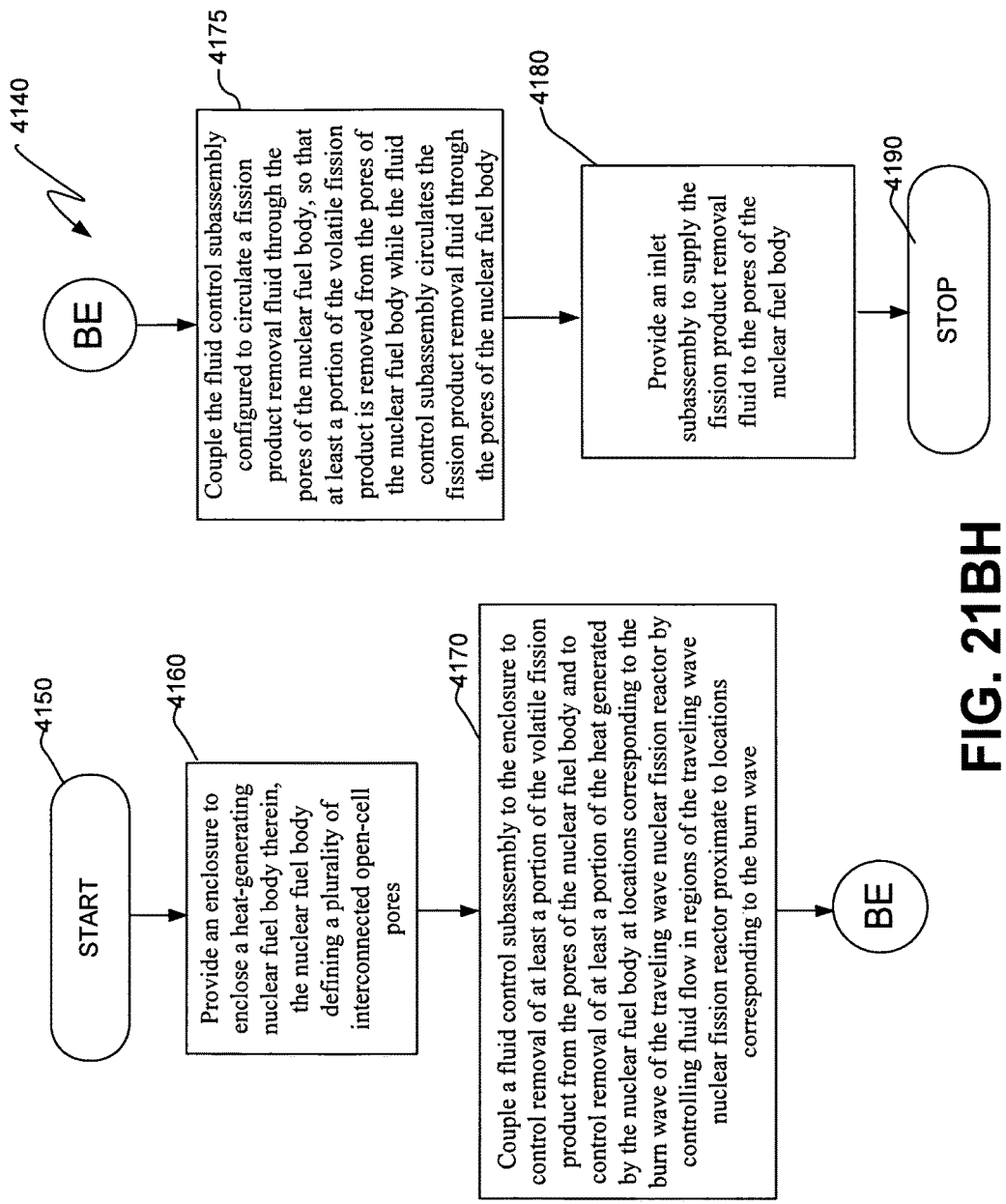

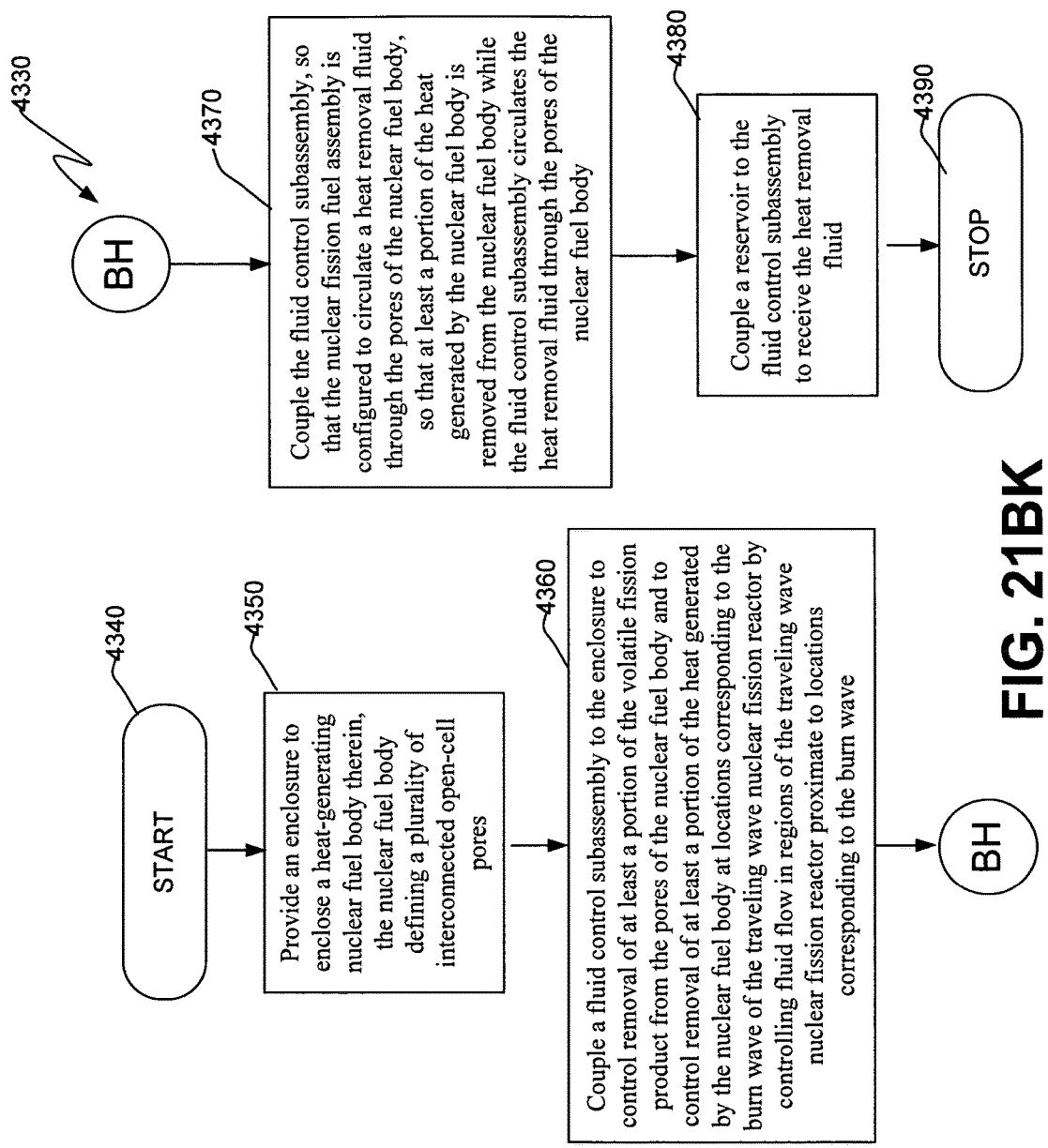

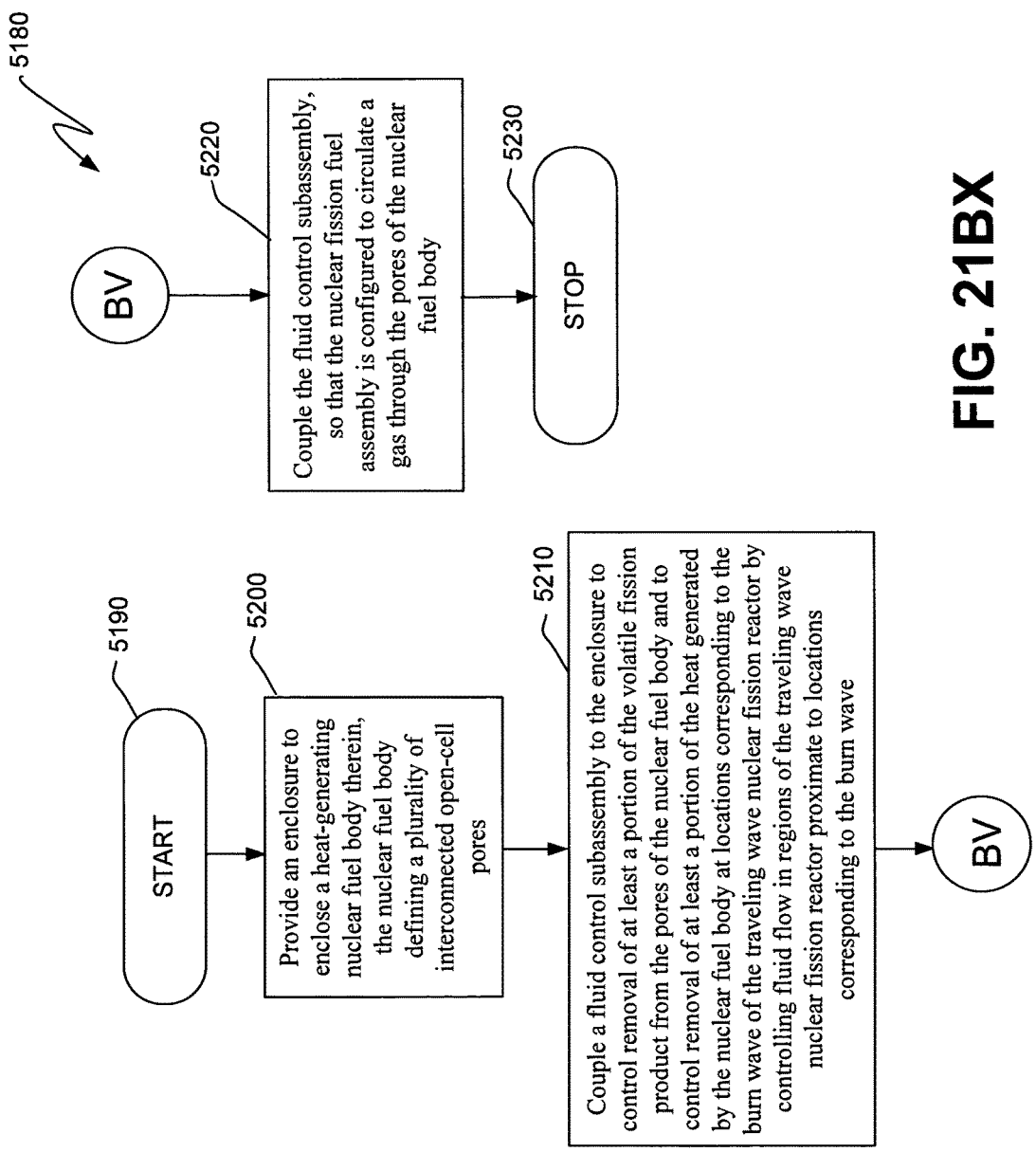

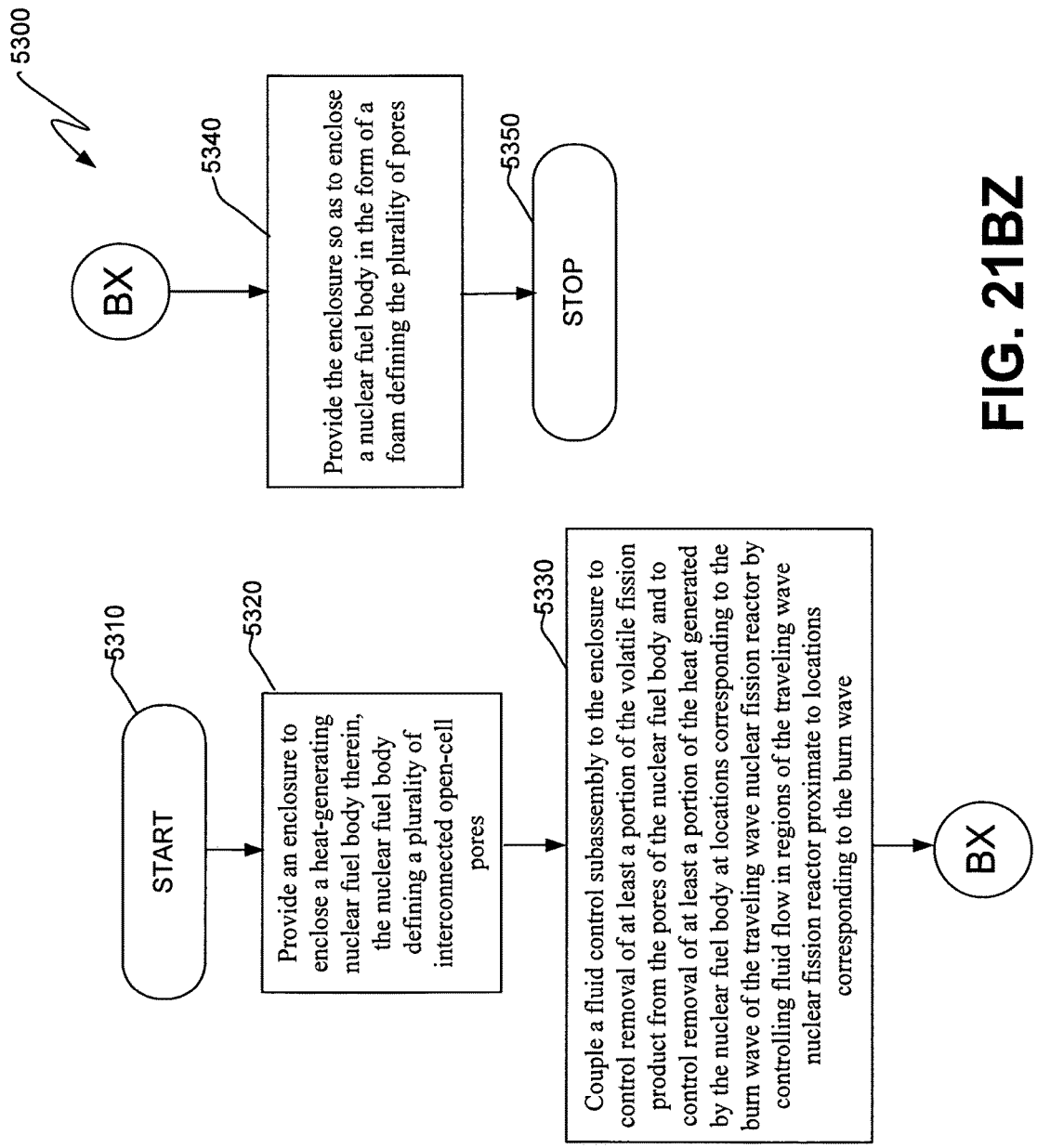

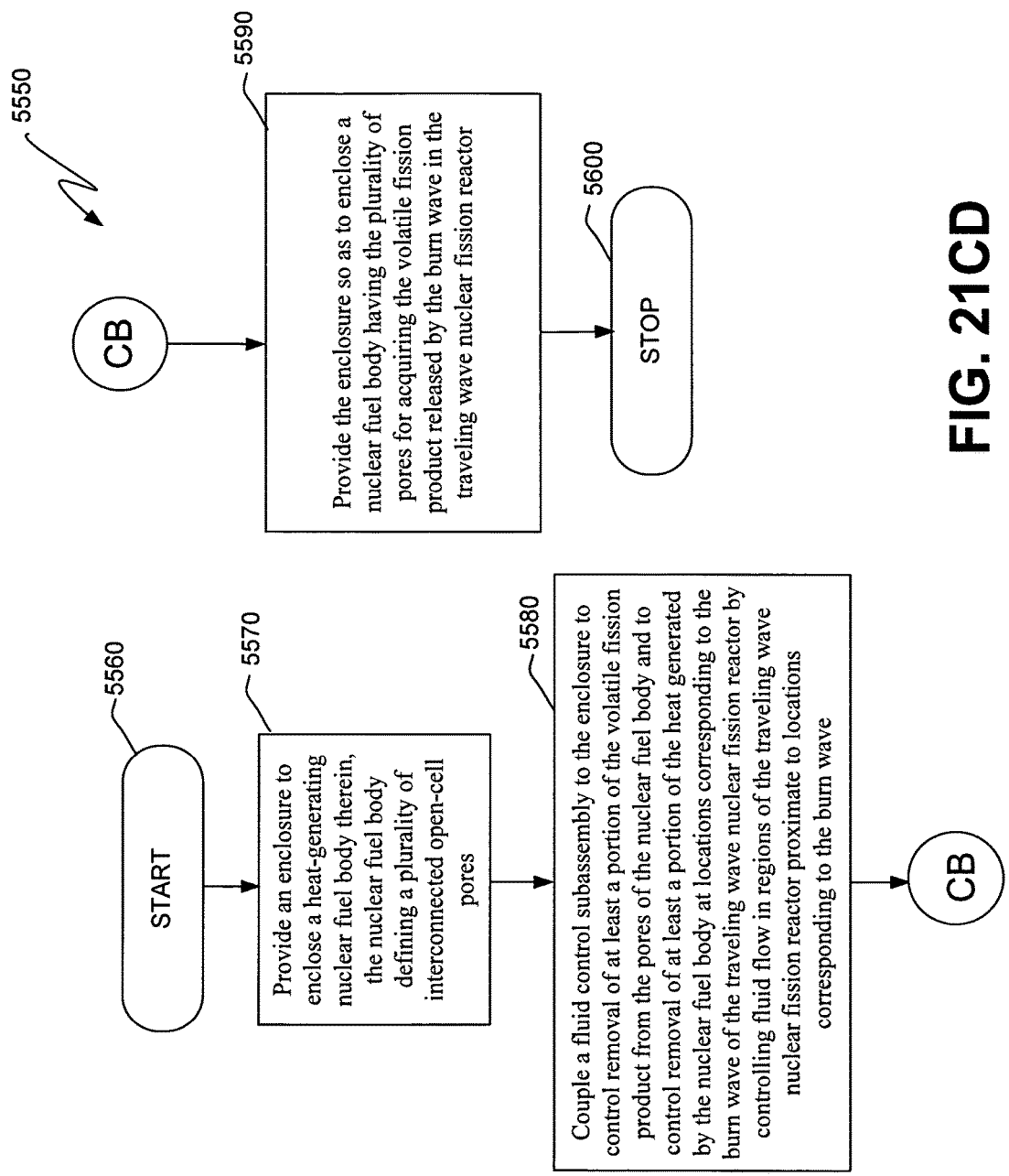

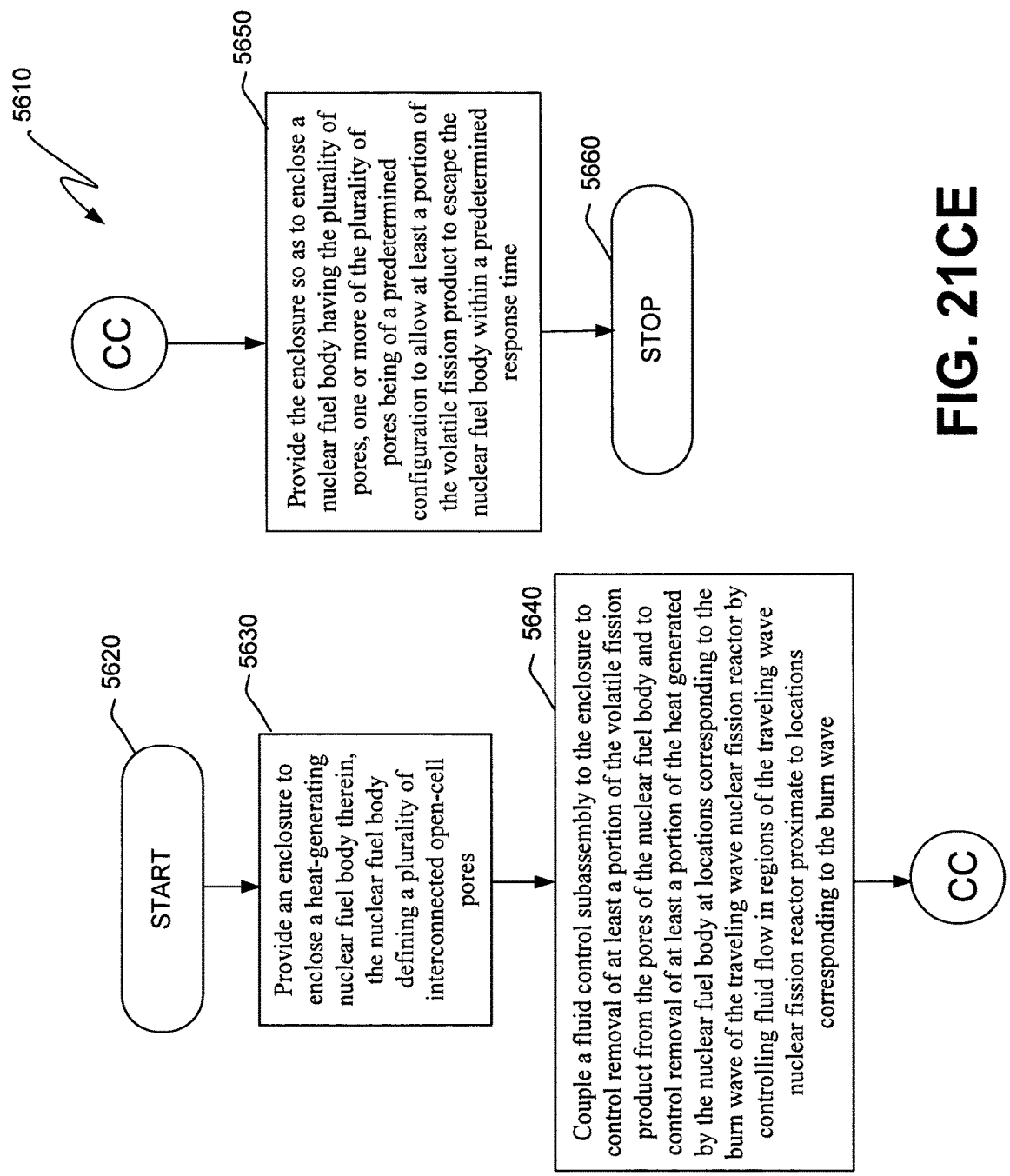

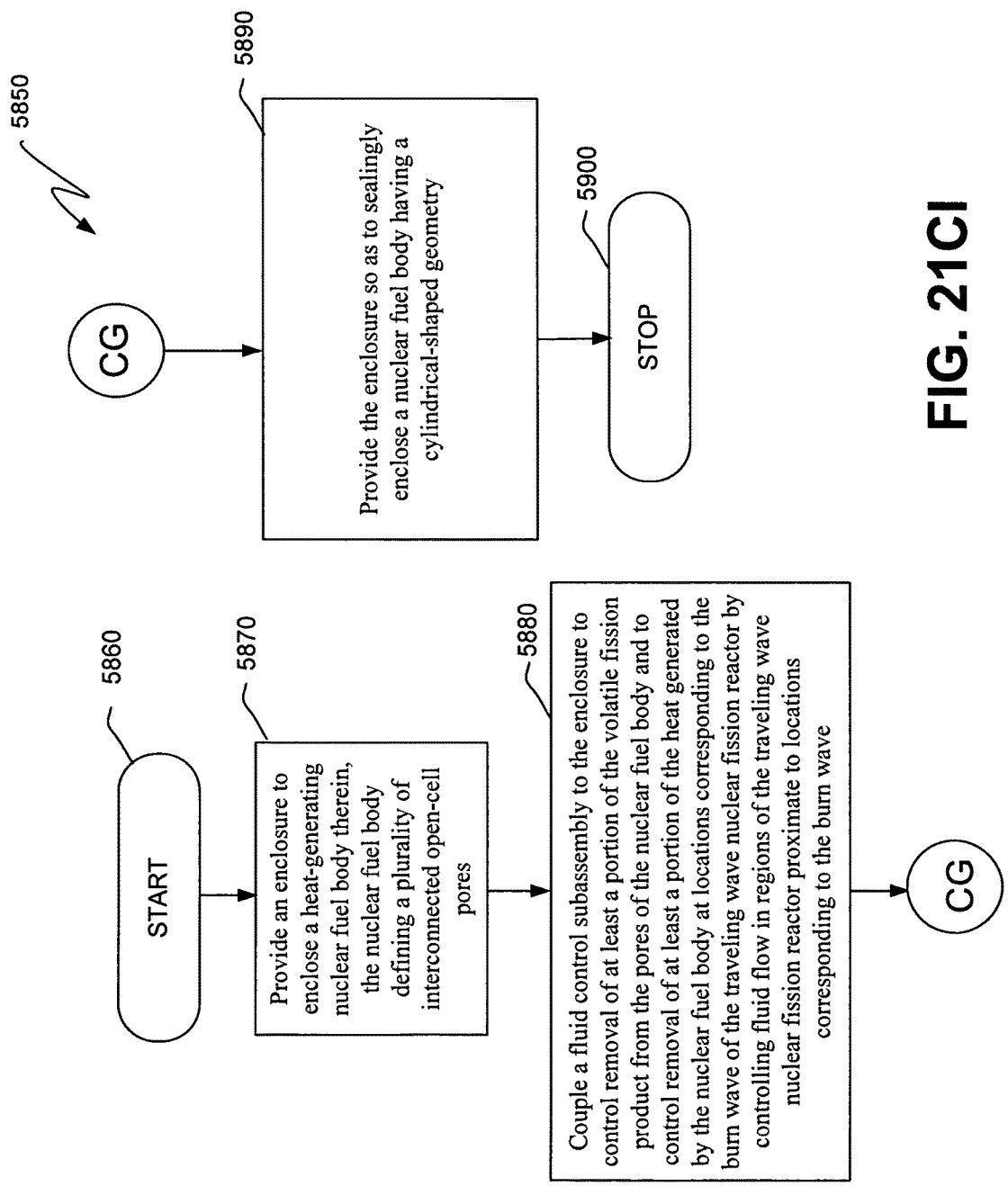

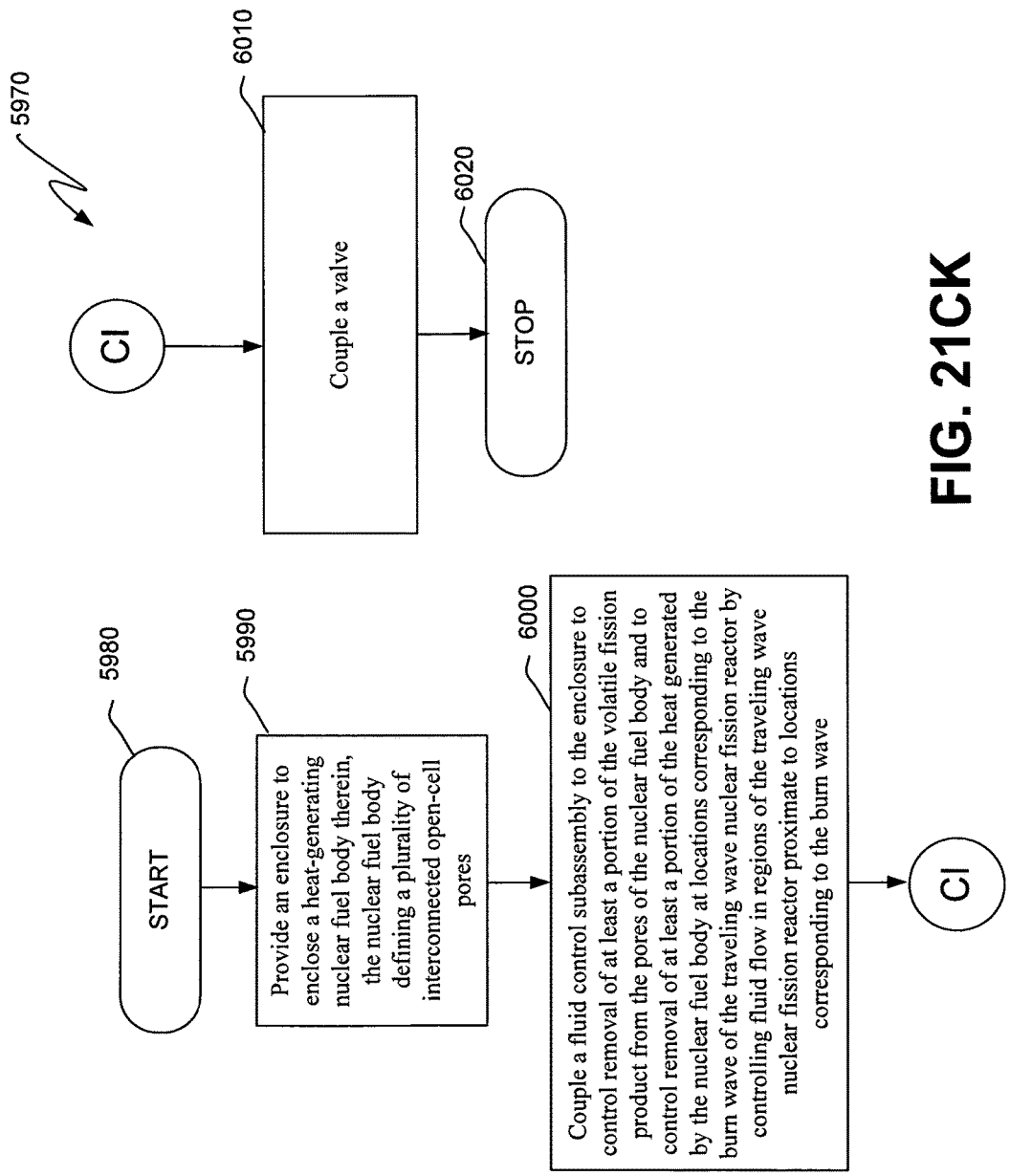

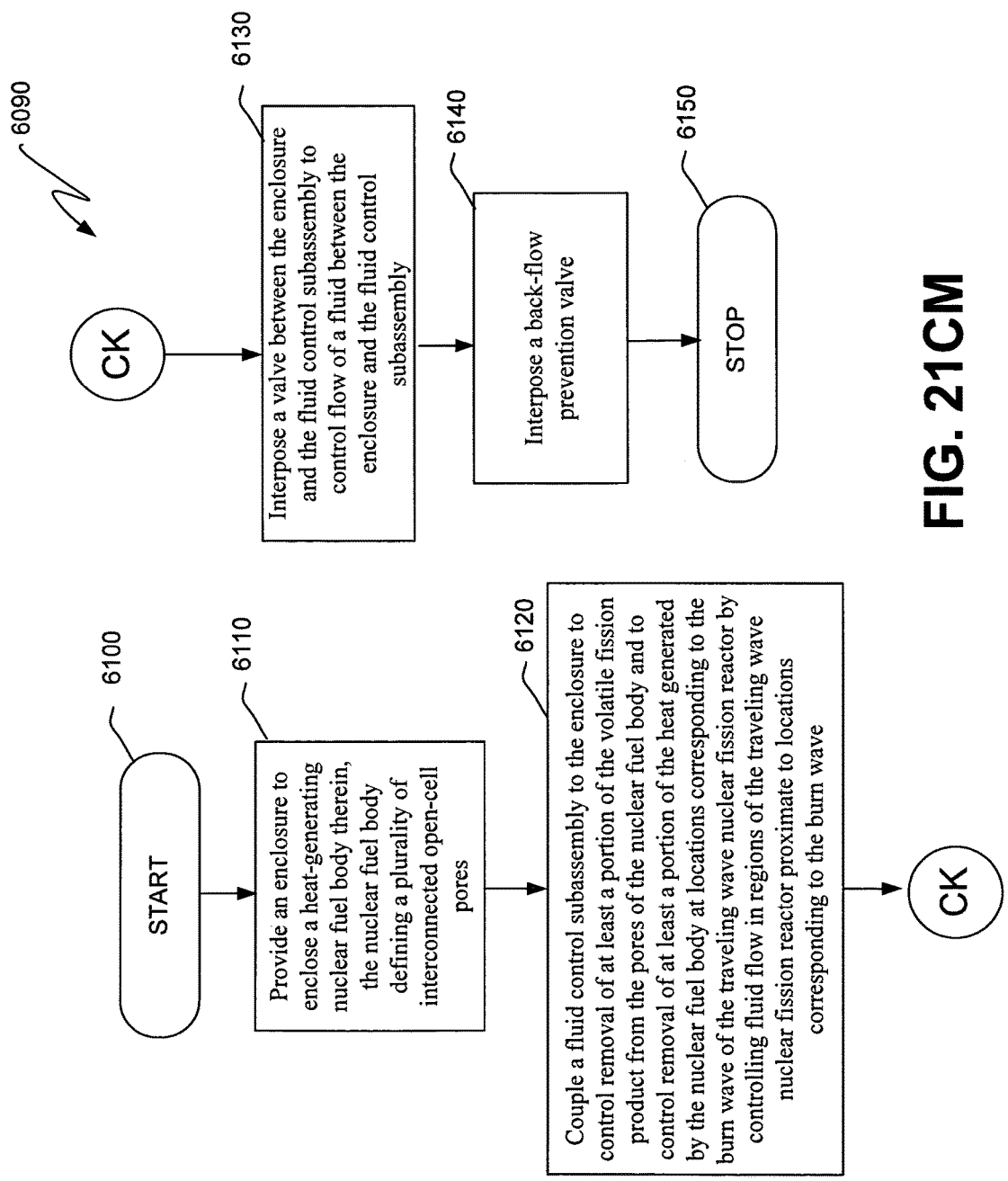

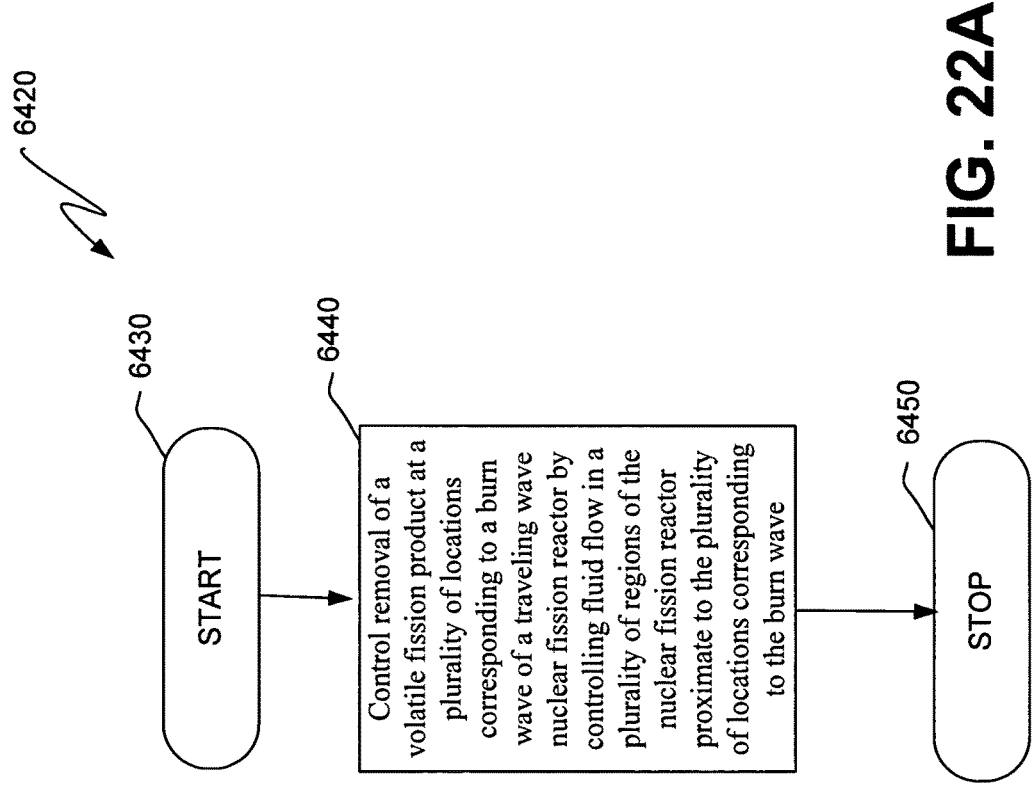

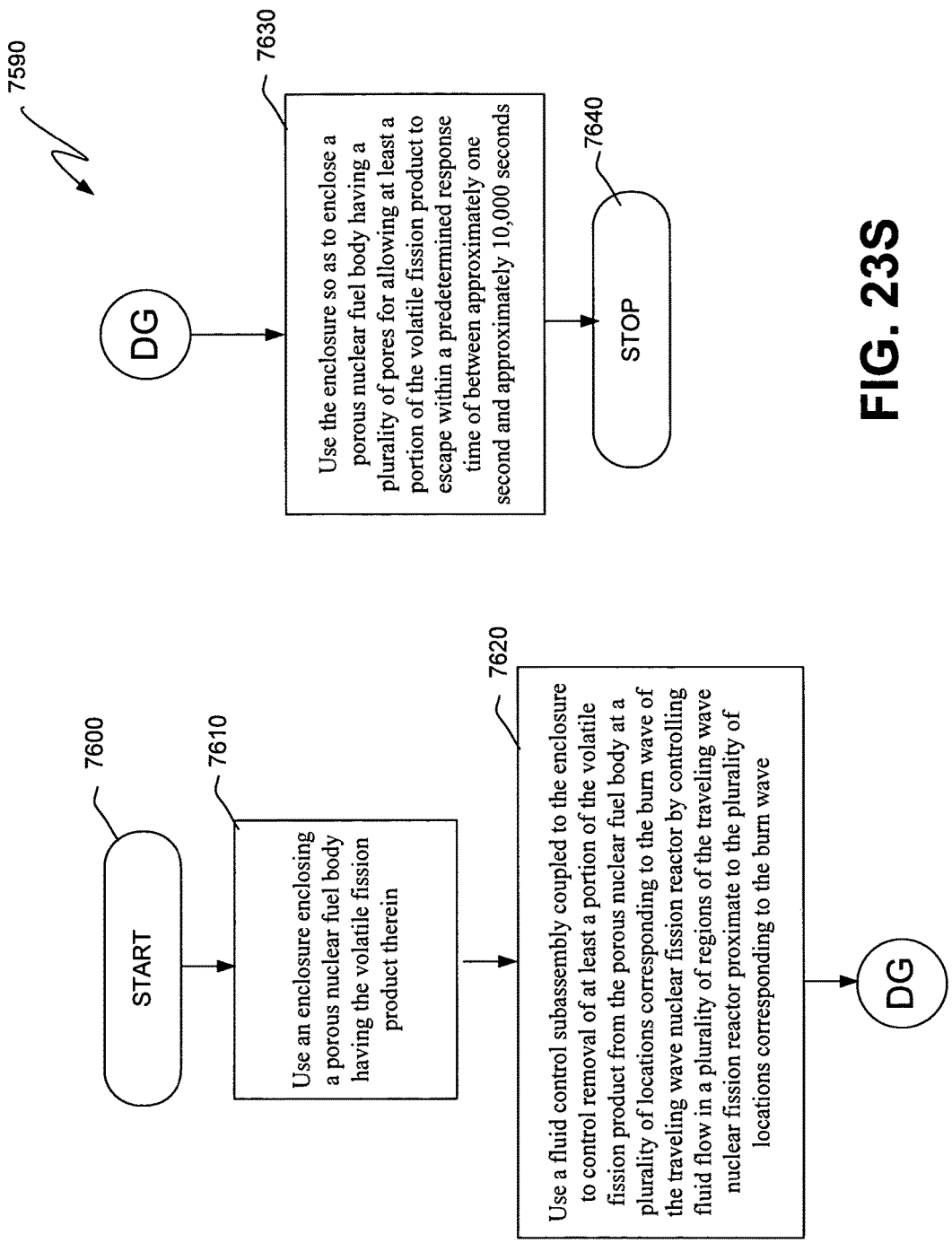

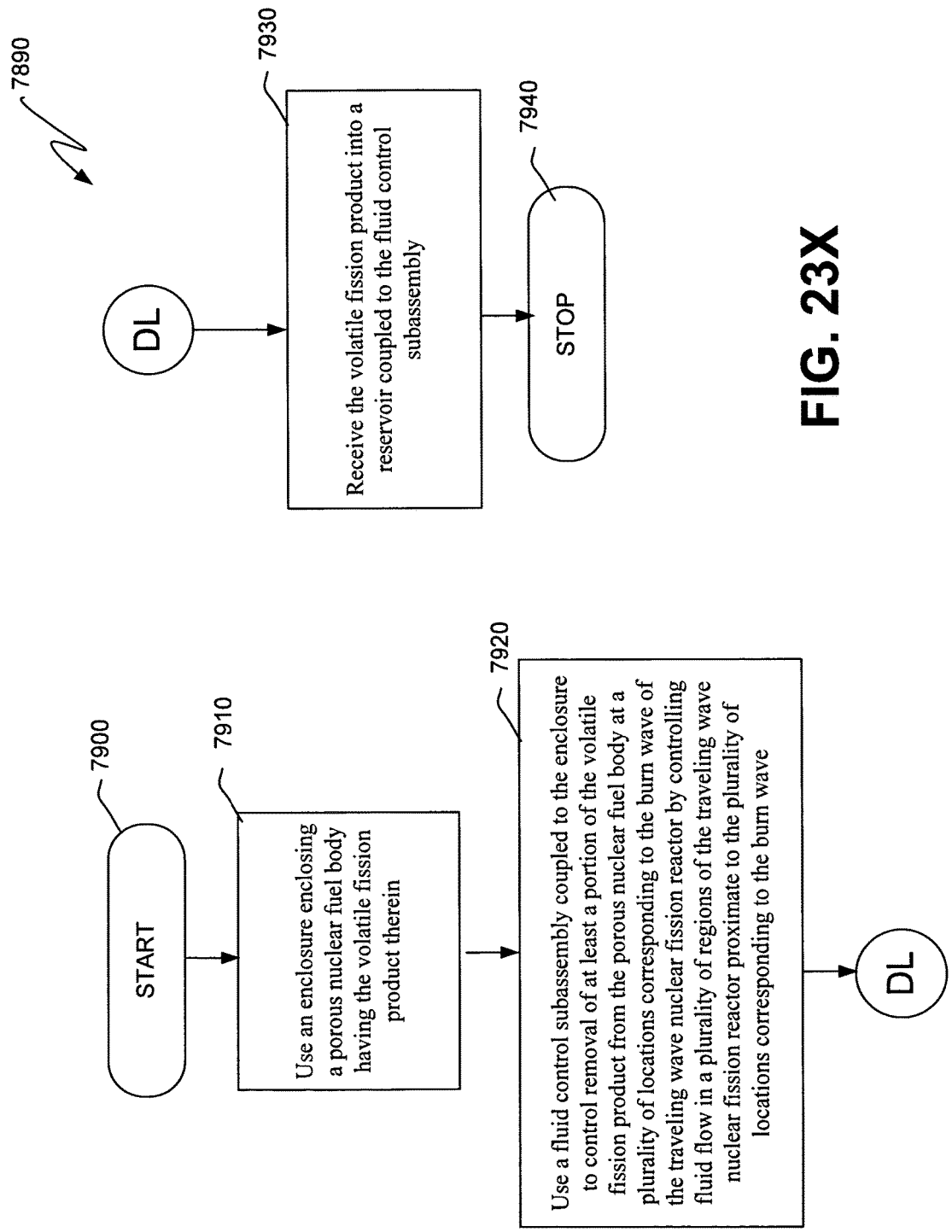

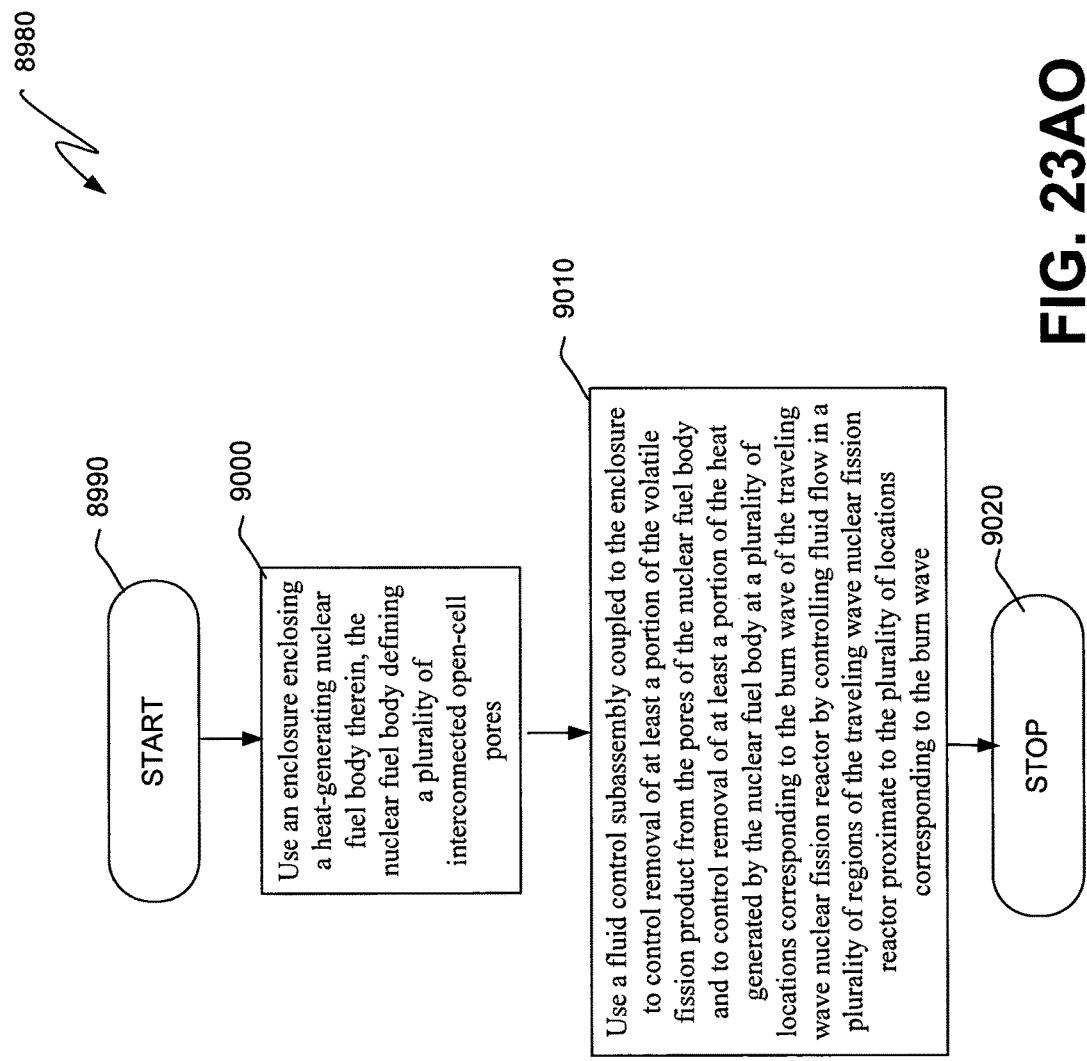

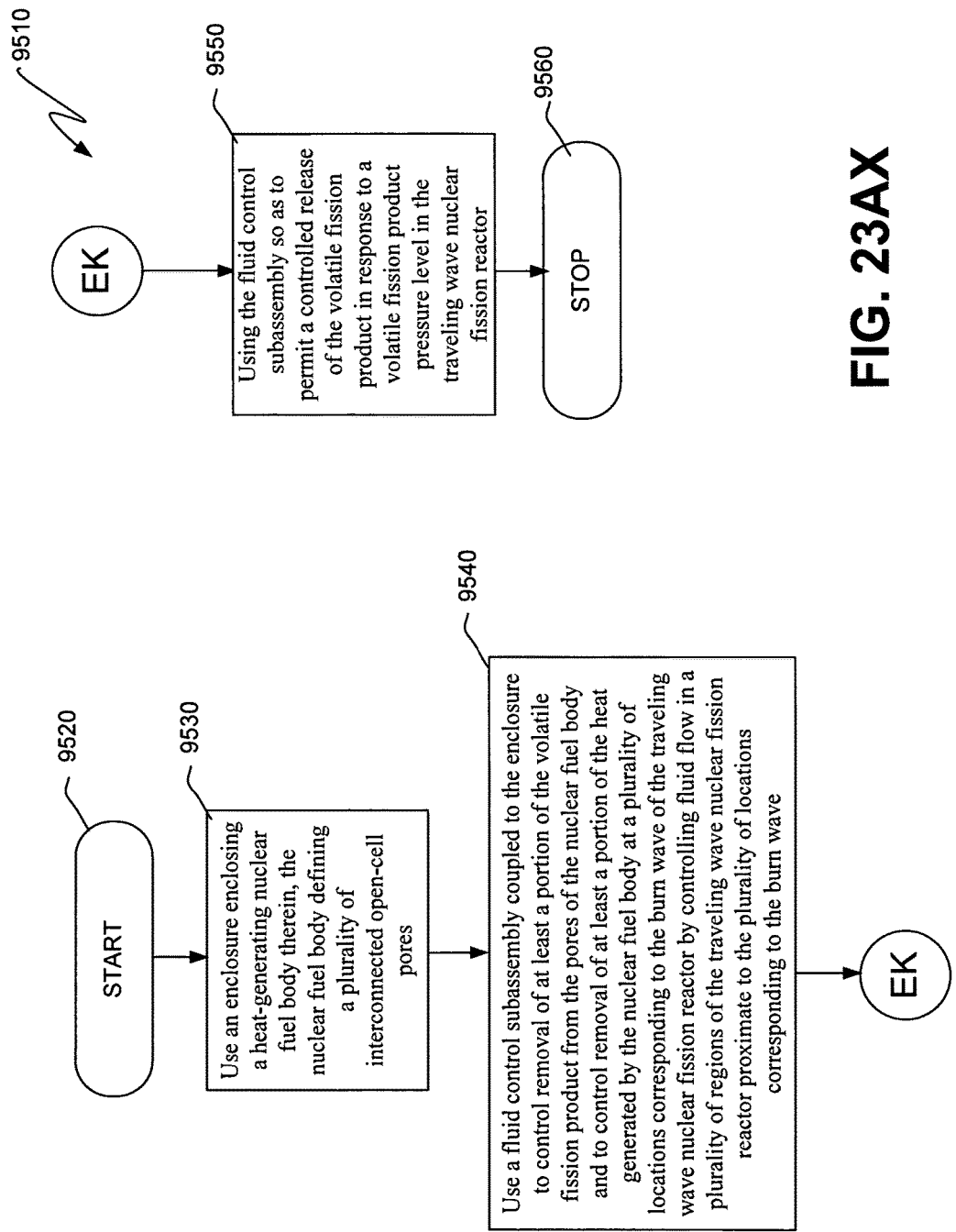

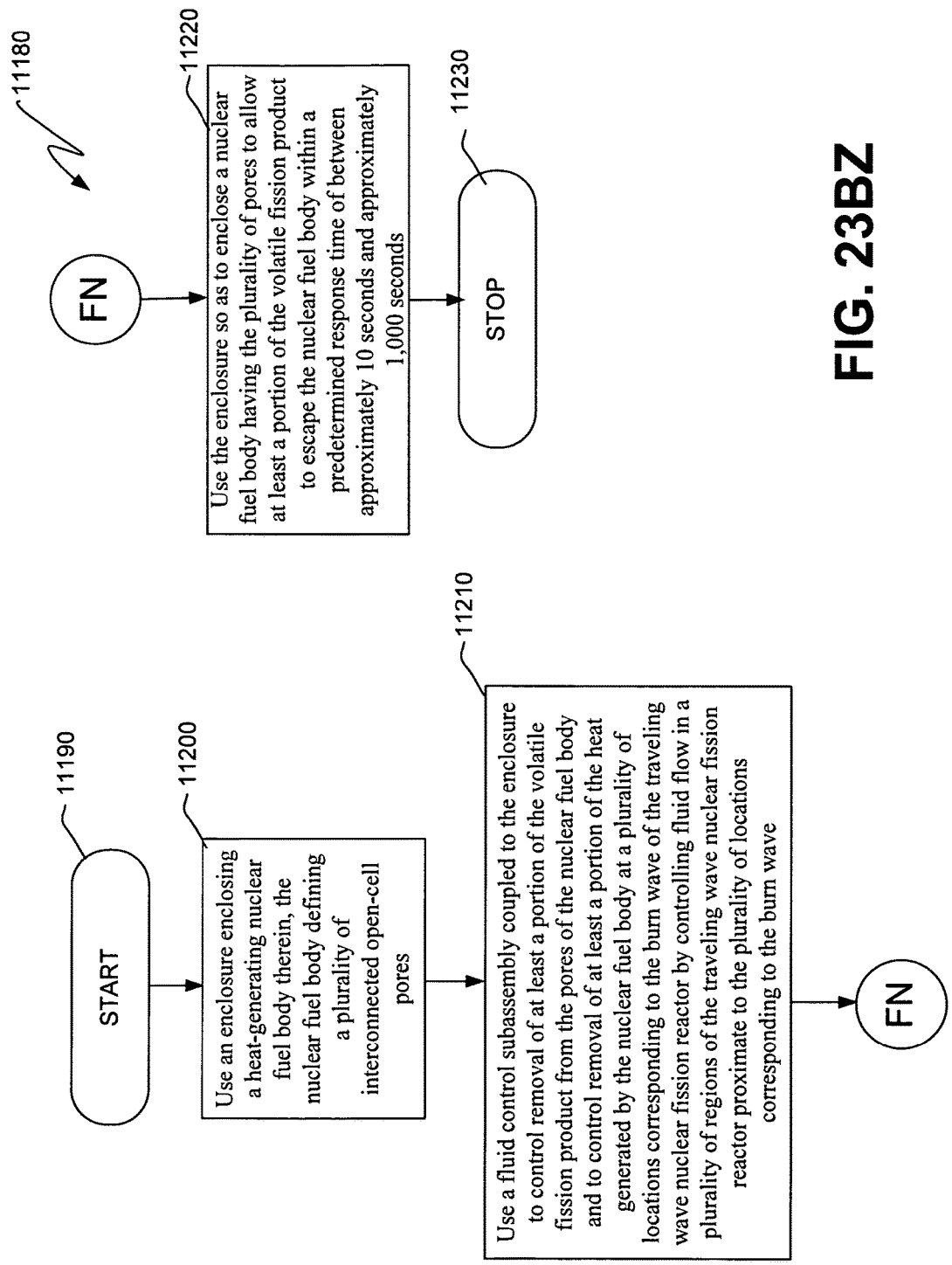

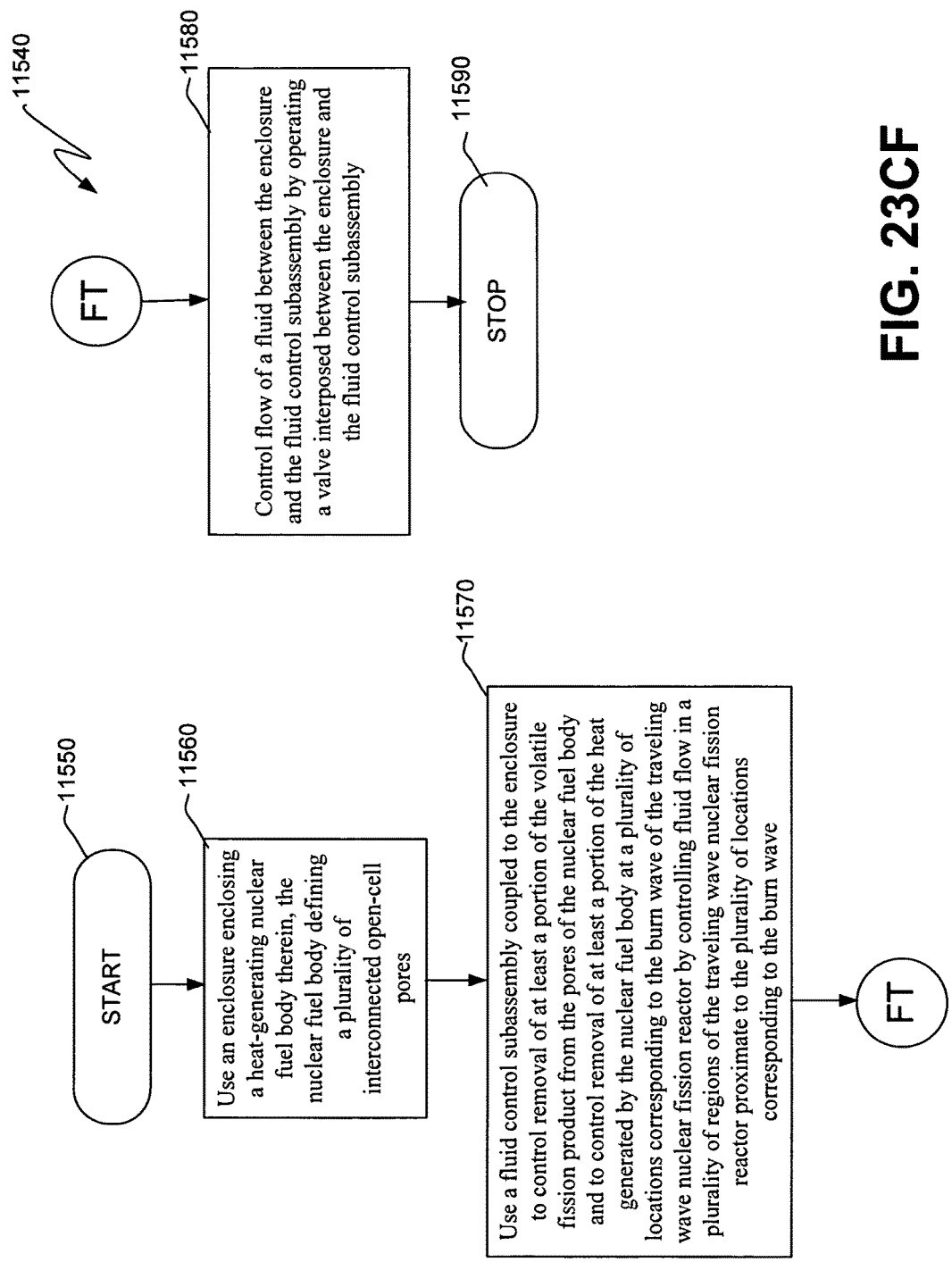

NUCLEAR FISSION REACTOR FUEL ASSEMBLY AND SYSTEM CONFIGURED FOR CONTROLLED REMOVAL OF A VOLATILE FISSION PRODUCT AND HEAT RELEASED BY A BURN WAVE IN A TRAVELING WAVE NUCLEAR FISSION REACTOR AND METHOD FOR SAME

CROSS-REFERENCE TO RELATED APPLICATIONS

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)). All subject matter of the Related Applications and of any and all parent, grandparent, great-grandparent, etc. applications of the Related Applications is incorporated herein by reference to the extent such subject matter is not inconsistent herewith.

Related Applications:

For purposes of the USPTO extra-statutory requirements, the present application constitutes a continuation-in-part of U.S. patent application Ser. No. 12/386,524, entitled A NUCLEAR FISSION REACTOR FUEL ASSEMBLY AND SYSTEM CONFIGURED FOR CONTROLLED REMOVAL OF A VOLATILE FISSION PRODUCT AND HEAT RELEASED BY A BURN WAVE IN A TRAVELING WAVE NUCLEAR FISSION REACTOR AND METHOD FOR SAME, naming Charles E. Ahlfeld; John Rogers Gilleland; Roderick A. Hyde; Muriel Y. Ishikawa; David G. McAlees; Nathan P. Myhrvold; Clarence T. Tegreene; Thomas Allan Weaver; Charles Whitmer; Victoria Y. H. Wood; Lowell L. Wood, Jr.; and George B. Zimmerman as inventors, filed Apr. 16, 2009 now U.S. Pat. No. 9,443,623, or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, Benefit of Prior-Filed Application, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

BACKGROUND

This application generally relates to nuclear reactor fuel assemblies and more particularly relates to a nuclear fission reactor fuel assembly and system configured for controlled removal of a volatile fission product and heat released by a burn wave in a traveling wave nuclear fission reactor and method for same.

It is known that, in an operating nuclear fission reactor, neutrons of a known energy are captured by nuclides having a high atomic mass. The resulting compound nucleus separates into fission products that include two lower atomic mass fission fragments and also decay products. Nuclides known to undergo such fission by neutrons of all energies include uranium-233, uranium-235 and plutonium-239, which are fissile nuclides. For example, thermal neutrons having a kinetic energy of 0.0253 eV (electron volts) can be used to fission U-235 nuclei. Fission of thorium-232 and uranium-238, which are fertile nuclides, will not undergo induced fission, except with fast neutrons that have a kinetic energy of at least 1 MeV (million electron volts). The total kinetic energy released from each fission event is about 200 MeV. This kinetic energy is eventually transformed into heat.

Moreover, the fission process, which starts with an initial source of neutrons, liberates additional neutrons as well as transforms kinetic energy into heat. This results in a self-sustaining fission chain reaction that is accompanied by continued release of heat. For every neutron that is absorbed, more than one neutron is liberated until the fissile nuclei are depleted. This phenomenon is used in a commercial nuclear reactor to produce continuous heat that, in turn, is used to generate electricity.

Attempts have been made to address fission product accumulation during reactor operation. U.S. Pat. No. 4,285,891, issued Aug. 25, 1981 in the names of Lane A. Bray et al. and titled "Method of Removing Fission Gases from Irradiated Fuel" discloses a method for removing volatile fission products from irradiated fuel by first passing a hydrogen-containing inert gas by the fuel which is heated to an elevated temperature of at least 1000° C. and then passing inert gas alone by the fuel which is at the elevated temperature.

Another approach is disclosed in U.S. Pat. No. 5,268,947, issued Dec. 7, 1993 in the names of Bernard Bastide et al. and titled "Nuclear Fuel Elements Comprising a Trap for Fission Products Based on Oxide". This patent discloses a nuclear fuel element comprising sintered pellets which are surrounded by a metallic sheath and permitting trapping of the fission products characterized in that the pellets contain or are coated with or that the sheath is internally coated with an agent for trapping the fission products. The fission products are trapped by forming with the trapping agent oxygenated compounds which are stable at high temperature.

SUMMARY

According to an aspect of this disclosure, there is provided a nuclear fission reactor fuel assembly configured for controlled removal of a volatile fission product released by a burn wave in a traveling wave nuclear fission reactor, comprising an enclosure adapted to enclose a porous nuclear fuel body and a fluid control subassembly coupled to the enclosure and adapted to control removal of at least a portion of the volatile fission product from the porous nuclear fuel body.

According to an aspect of this disclosure, there is provided a nuclear fission reactor fuel assembly configured for controlled removal of a volatile fission product released by a burn wave in the nuclear fission reactor fuel assembly, comprising an enclosure adapted to enclose a heat-generating nuclear fuel body therein, the nuclear fuel body defining a plurality of pores having the volatile fission product therein and a fluid control subassembly coupled to the enclosure to control removal of at least a portion of the volatile fission product from the pores of the nuclear fuel body and for controllably removing at least a portion of the heat generated by the nuclear fuel body.

According to an aspect of this disclosure, there is provided a system for controlled removal of a volatile fission product released by presence of a burn wave in a nuclear fission reactor fuel assembly, comprising an enclosure adapted to enclose a porous nuclear fuel body defining a plurality of pores having the volatile fission product therein and a fluid control subassembly coupled to the enclosure to control removal of at least a portion of the volatile fission product from the porous nuclear fuel body.

According to an aspect of this disclosure, there is provided a system for controlled removal of a volatile fission product released by presence of a burn wave in a nuclear fission reactor fuel assembly, comprising an enclosure adapted to enclose a heat-generating nuclear fuel body therein, the nuclear fuel body defining a plurality of interconnected open-cell pores having the volatile fission product therein and a fluid control subassembly coupled to the enclosure to control removal of at least a portion of the volatile fission product from the pores of the nuclear fuel body and for controllably removing at least a portion of the heat generated by the nuclear fuel body.

According to an aspect of this disclosure, there is provided a method of assembling a nuclear fission reactor fuel assembly configured for controlled removal of a volatile fission product released by a burn wave in a traveling wave nuclear fission reactor, comprising providing an enclosure to enclose a porous nuclear fuel body and coupling a fluid control subassembly to the enclosure to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality locations corresponding to the burn wave.

According to an aspect of this disclosure, there is provided a method of assembling a nuclear fission reactor fuel assembly configured for controlled removal of a volatile fission product released by a burn wave in a traveling wave nuclear fission reactor, comprising providing an enclosure to enclose a heat-generating nuclear fuel body therein, the nuclear fuel body defining a plurality of interconnected open-cell pores and coupling a fluid control subassembly to the enclosure to control removal of at least a portion of the volatile fission product from the pores of the nuclear fuel body and to control removal of at least a portion of the heat generated by the nuclear fuel body at locations corresponding to the burn wave of the traveling wave nuclear fission reactor by controlling fluid flow in regions of the traveling wave nuclear fission reactor proximate to locations corresponding to the burn wave.

According to an aspect of this disclosure, there is provided a method comprising controlling removal of a volatile fission product at a plurality of locations corresponding to a burn wave of a traveling wave nuclear fission reactor by controlling fluid flow in a plurality of regions of the nuclear fission reactor proximate to the plurality of locations corresponding to the burn wave.

According to an aspect of this disclosure, there is provided a method of operating a nuclear fission reactor fuel assembly configured for controlled removal of a volatile fission product released by a burn wave in a traveling wave nuclear fission reactor, comprising using an enclosure enclosing a porous nuclear fuel body having the volatile fission product therein and using a fluid control subassembly coupled to the enclosure to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave.

According to an aspect of this disclosure, there is provided a method of operating a nuclear fission reactor fuel assembly configured for controlled removal of a volatile fission product released by a burn wave in a traveling wave nuclear fission reactor, comprising using an enclosure enclosing a heat-generating nuclear fuel body therein, the nuclear fuel body defining a plurality of interconnected open-cell pores and using a fluid control subassembly coupled to the enclosure to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave.

A feature of the present disclosure is the provision, for use in a traveling wave nuclear fission reactor, of an enclosure adapted to enclose a porous nuclear fuel body having the volatile fission product therein.

Another feature of the present disclosure is the provision, for use in a traveling wave nuclear fission reactor, of a fluid control subassembly coupled to the enclosure and adapted to control removal of at least a portion of the volatile fission product from the porous nuclear fuel body.

Yet another feature of the present disclosure is the provision, for use in a traveling wave nuclear fission reactor, of a fluid control subassembly coupled to the enclosure for controllably removing at least a portion of the heat generated by the nuclear fuel body.

Still another feature of the present disclosure is the provision, for use in a traveling wave nuclear fission reactor, of a dual-purpose circuit coupled to the enclosure for selectively removing the volatile fission product and the heat from the nuclear fuel body.

In addition to the foregoing, various other method and/or device aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

While the specification concludes with claims particularly pointing out and distinctly claiming the subject matter of the present disclosure, it is believed the disclosure will be better understood from the following detailed description when taken in conjunction with the accompanying drawings. In addition, the use of the same symbols in different drawings will typically indicate similar or identical items.

FIG. 6A is a view in partial vertical section of a first embodiment diaphragm valve having a breakable barrier;

FIG. 22A is a flowchart of an illustrative method for removal of a volatile fission product at a plurality of locations corresponding to a burn wave.

DETAILED DESCRIPTION

Figure 1:
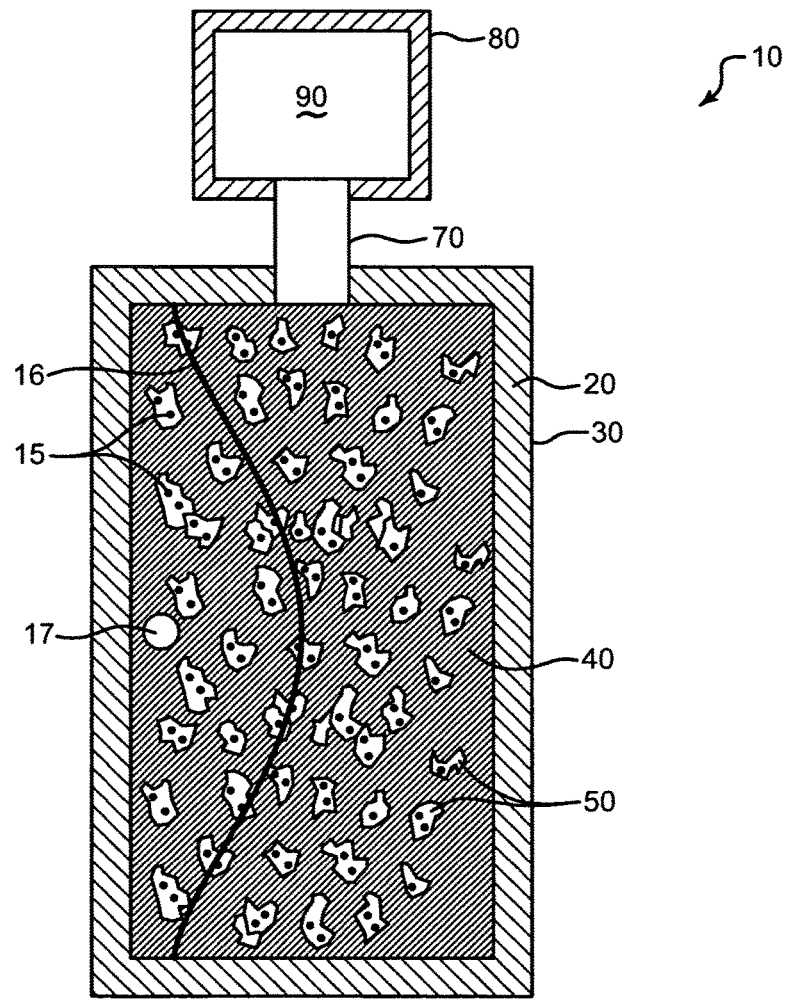
FIG. 1 is a view in partial vertical section of a first embodiment nuclear fission reactor fuel assembly and system, this view also showing volatile fission products residing in a plurality of interconnected open-cell pores defined by a porous nuclear fuel body disposed in the nuclear fission reactor fuel assembly.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein.

In addition, the present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Moreover, the herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

Heat build-up during reactor operation may cause fuel assemblies to undergo expansion leading to misalignment of reactor core components, fuel cladding creep that can increase risk of fuel cladding rupture and fuel swelling during reactor operation. This may increase the risk that the fuel might crack or otherwise degrade. Fuel cracking may precede fuel-cladding failure mechanisms, such as fuel-clad mechanical interaction, and lead to fission gas release. The fission gas release results in higher than normal radiation levels.

Fission products are generated during the fission process and may accumulate in the fuel. Accumulation of fission products, including fission gas, may lead to an undesirable amount of fuel assembly expansion. Such fuel assembly expansion may, in turn, increase the risk of fuel cracking and concomitant release of fission products into the surrounding environment. Although safety margins incorporated into the reactor design and precise quality control during manufacture reduce these risks to a minimal level, in some cases, it may still be appropriate to reduce these risks even further.

Therefore, referring to FIG. 1, there is shown a first embodiment nuclear fission reactor fuel assembly and system, generally referred to as 10, for producing heat due to fission of a fissile nuclide, such as uranium-235, uranium-233 or plutonium-239, or due to fast-fission of a nuclide such as thorium-232 or uranium-238. It will be understood from the description hereinbelow that fuel assembly 10 is also capable of controlled removal of a volatile fission product 15 produced during the fission process. Volatile fission product 15 is produced by a traveling burn wave 16 that is initiated by a comparatively small and removable nuclear fission igniter 17. In this regard, nuclear fission igniter 17, that includes a moderate isotopic enrichment of nuclear fissionable material, such as, without limitation, U-233, U-235 or Pu-239, is suitably located at a predetermined location in fuel assembly 10. Neutrons are released by igniter 17. The neutrons that are released by igniter 17 are captured by fissile and/or fertile material within nuclear fission fuel assembly 10 to initiate a fission chain reaction.

Igniter 17 may be removed once the chain reaction becomes self-sustaining, if desired. It may be appreciated that volatile fission product 15 can be controllably released in response to the controlled positioning of burn wave 16 in nuclear fission reactor fuel assembly 10. It should be understood that any of the embodiments of the fuel assembly described herein may be used as a component of a traveling wave nuclear fission reactor. Such a traveling wave nuclear fission reactor is disclosed in detail in co-pending U.S. patent application Ser. No. 11/605,943 filed Nov. 28, 2006 in the names of Roderick A. Hyde, et al. and titled "Automated Nuclear Power Reactor For Long-Term Operation", which application is assigned to the assignee of the present application, the entire disclosure of which is hereby incorporated by reference.

Still referring to FIG. 1, fuel assembly 10 comprises an enclosure 20 having enclosure walls 30 for sealingly enclosing a porous nuclear fuel body 40 therein. Fuel body 40 comprises the aforementioned fissile nuclide, such as uranium-235, uranium-233 or plutonium-239. Alternatively, fuel body 40 may comprise the aforementioned fertile nuclide, such as thorium-232 and/or uranium-238, which will be transmuted during the fission process into one or more of the fissile nuclides mentioned hereinabove. A further alternative is that fuel body 40 may comprise a predetermined mixture of fissile and fertile nuclides. As described in more detail hereinbelow, fuel body 40 is capable of producing volatile fission product 15, which may be isotopes of iodine, bromine, cesium, potassium, rubidium, strontium, xenon, krypton, barium and mixtures thereof or other gaseous or volatile materials.

Figure 2:
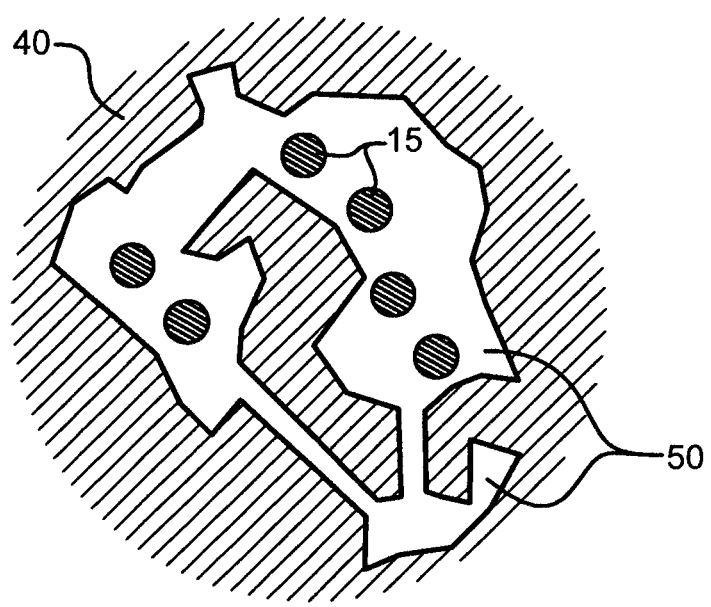
FIG. 2 is a magnified view of a portion of the nuclear fuel body defining the plurality of interconnected open-cell pores exaggerated for clarity, this view also showing volatile fission products residing in the open-cell pores.
Figure 2A:
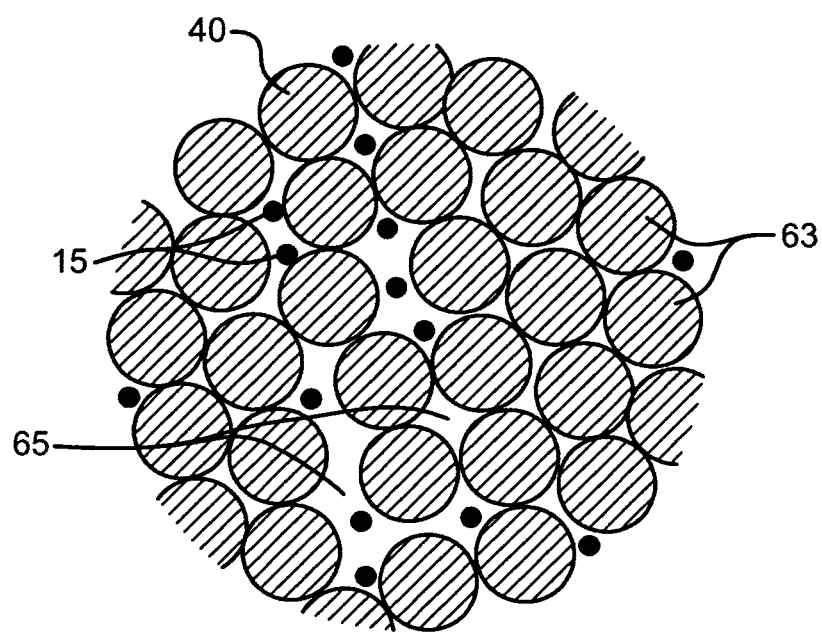
FIG. 2A is a magnified view of a portion of a nuclear fuel body having a plurality of particles defining a plurality of channels therebetween, the particles and channels being exaggerated for clarity, this view also showing volatile fission products residing in the channels.

Referring again to FIG. 1, as previously mentioned, porous nuclear fuel body 40 may substantially comprise a metal, such as uranium, thorium, plutonium, or alloys thereof. More specifically, nuclear fuel body 40 may be a porous material made from an oxide selected from the group consisting essentially of uranium monoxide (UO), uranium dioxide ($UO_2$), thorium dioxide ($ThO_2$) (also referred to as thorium oxide), uranium trioxide ($UO_3$), uranium oxide-plutonium oxide (UO—PuO), triuranium octoxide ($U_3O_8$) and mixtures thereof. Alternatively, fuel body 40 may substantially comprise a carbide of uranium ($UC_x$) or a carbide of thorium ($ThC_x$). For example, fuel body 40 may be a foam material made from a carbide selected from the group consisting essentially of uranium monocarbide (UC), uranium dicarbide ($UC_2$), uranium sesquicarbide ($U_2C_3$), thorium dicarbide ($ThC_2$), thorium carbide (ThC) and mixtures thereof. The uranium carbide or thorium carbide may be sputtered into a matrix of niobium carbide (NbC) and zirconium carbide (ZrC), so as to form fuel body 40. A potential benefit of using niobium carbide and zirconium carbide is that they form a refractory structural substrate for the uranium carbide or thorium carbide. As another example, fuel body 40 may be a porous material made from a nitride selected from the group consisting essentially of uranium nitride ($U_3N_2$), uranium nitride-zirconium nitride ($U_3N_2$—$Zr_3N_4$), uranium-plutonium nitride ((U—Pu)N), thorium nitride (ThN), uranium-zirconium alloy (UZr) and mixtures thereof. As best seen in FIGS. 2 and 2A, porous fuel body 40 may define a plurality of interconnected open-cell pores 50 spatially distributed within fuel body 40. As used herein, the terminology "open-cell pores" means that each pore 50 is interconnected with one or more neighboring pores 50, thereby permitting fluid, such as gas or liquid, to directly travel between pores 50. That is, open-cell pores 50 are disposed within fuel body 40 so as to form a fibrous, rod-like, web-like or honeycomb structure. Alternatively, fuel body 40 may comprise a porous fuel material formed by a collection of fuel particles 63 (such as sintered beads or packed spheres) that define a plurality of interstitial channels 65 therebetween. Also, open-cell pores 50 may be disposed within fuel material having a mixture of foam and porous characteristics. It should be understood that the description hereinbelow pertaining to pores 50 also applies to channels 65.

Referring again to FIGS. 2 and 2A, it may be appreciated that volatile fission product 15 that is produced by burn wave 16 may initially reside in some or all of pores 50 and can naturally vaporize and diffuse through nuclear fuel body 40. It also may be appreciated that at least some of pores 50 are of a predetermined configuration for allowing at least a portion of volatile fission product 15 to escape pores 50 of porous nuclear fuel body 40 within a predetermined response time. The predetermined response time may be between approximately 10 seconds and approximately 1,000 seconds. Alternatively, the predetermined response time may be between approximately one second and approximately 10,000 seconds depending on the predetermined configuration of pores 50.

Returning to FIG. 1, coupled to enclosure 20, such as by a first pipe segment 70, is a fluid control subassembly 80 that defines a first volume 90 containing a first fluid, such as pressurized helium gas. Alternatively, the first fluid may be any suitable pressurized inert gas, such as, without limitation, neon, argon, krypton, xenon, and mixtures thereof. Another alternative is the first fluid may be a suitable liquid, such as liquid lead (Pb), sodium (Na), lithium (Li), mercury (Hg) or similar liquids or liquid mixtures. As described more fully hereinbelow, fluid control subassembly 80 assists in controllably removing volatile fission product 15 and heat from fuel body 40. In other words, fluid control subassembly 80 is capable of circulating the first fluid through porous nuclear fuel body 40. In this manner, heat and volatile fission product 15 are removed from fuel body 40 while the first fluid circulates through fuel body 40.

Figure 3:
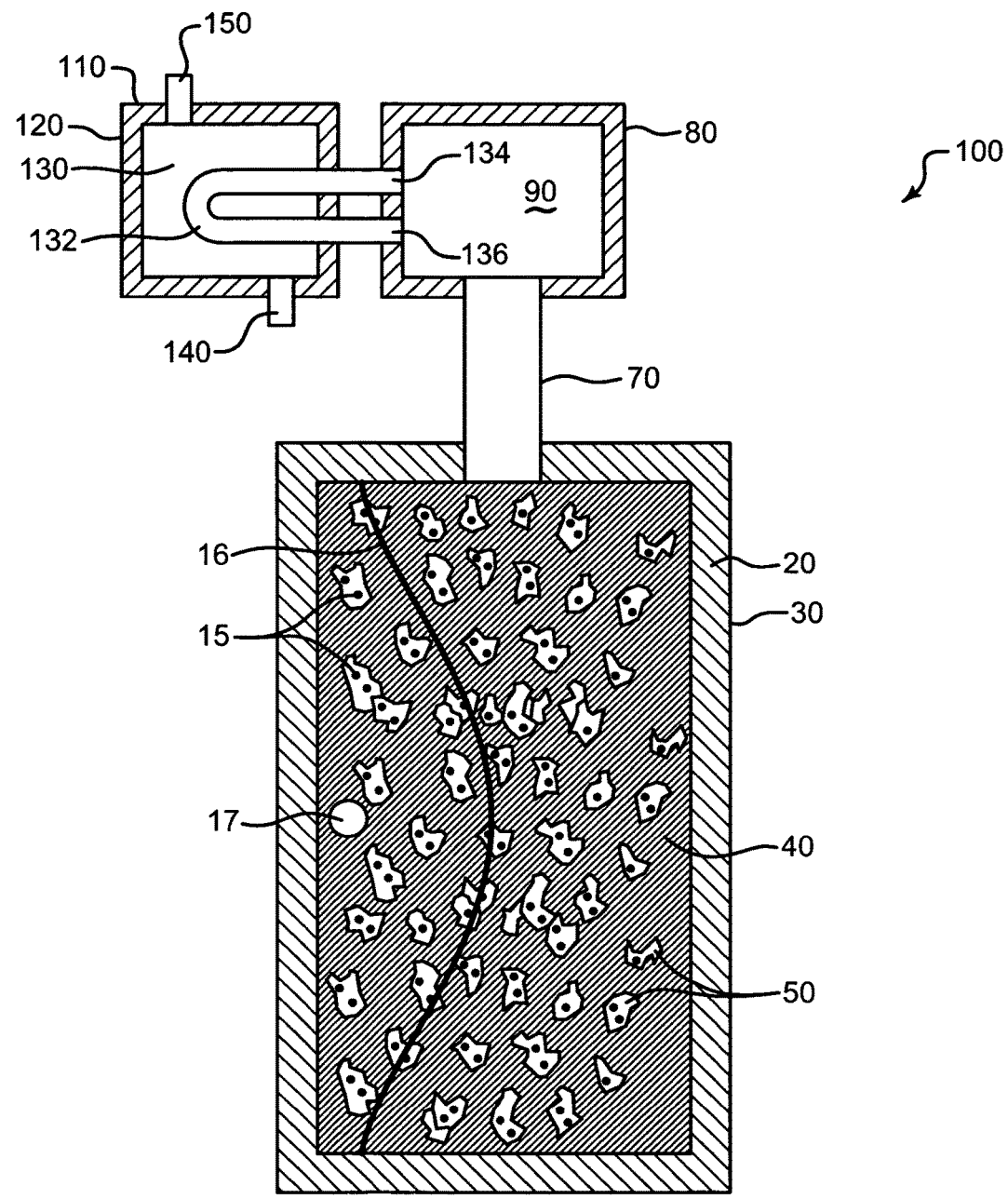
FIG. 3 is a view in partial vertical section of a second embodiment nuclear fission reactor fuel assembly and system.

Turning now to FIG. 3, a second embodiment nuclear fission reactor fuel assembly and system, generally referred to as 100, is there shown. This second embodiment fuel assembly 100 is substantially similar to first embodiment fuel assembly 10, except that a heat exchanger 110 is associated with enclosure 20. Heat exchanger 110 comprises a shell 120 defining an interior 130 capable of containing a second fluid for cooling the first fluid that is used to remove heat and volatile fission product 15 from fuel body 40. The second fluid has a temperature lower than the temperature of the first fluid. Disposed within interior 130 are a plurality of U-shaped tubes 132 (only one of which is shown) having two open ends. In this regard, one end of U-shaped tube 132 has an opening 134 and the other end of U-shaped tube 132 has another opening 136. Openings 134 and 136 are in fluid communication with the first fluid occupying first volume 90 of fluid control subassembly 80. It may be appreciated that there is a density difference between the cooled portion of first fluid residing within tubes 132 and the heated portion of the first fluid in porous nuclear fuel body 40. This temperature difference will give rise to a difference in density between the cooled portion of the first fluid residing within tubes 132 and the heated portion of the first fluid in porous nuclear fuel body 40. The difference in fluid densities will, in turn, cause the molecules of the cooler fluid portion to be exchanged with the molecules of the hotter fluid portion because the cooler fluid portion is located physically higher than or above the hotter fluid portion. Thus, an interchange of cooler and hotter fluid portions will occur and cause a natural convective current that will circulate the first fluid through fuel assembly 100 and nuclear fuel body 40. Moreover, tubes 132 are U-shaped to increase heat transfer surface area to enhance this natural convection. Thus, natural convection is relied upon to circulate the first fluid due to the substantial temperature difference between the cooler and hotter portions of the first fluid. As the first fluid circulates through tubes 132, the second fluid, which is at a substantially lower temperature than the first fluid, will be caused to enter interior 130 through an inlet nozzle 140, such as by means of a pump (not shown). The second fluid will then exit interior 130 through an outlet nozzle 150. As the second fluid enters and exits heat exchanger 110, the lower temperature second fluid will surround the plurality of U-shaped tubes 132. Conductive heat transfer, through the walls of tubes 132, will occur between the first fluid circulating in tubes 132 and the second fluid surrounding tubes 132. In this manner, the heated first fluid will give up its heat to the cooler second fluid.

Referring again to FIG. 3, this second embodiment fuel assembly 100 may be operable with no pumps or valves to circulate the first fluid because the first fluid can be circulated by means of natural convection. Absence of pumps and valves may increase reliability of second embodiment fuel assembly 100 while reducing costs of manufacture and maintenance of second embodiment fuel assembly 100.

Still referring to FIG. 3, heat exchanger 110 may serve as a steam generator, if desired. That is, depending on the temperature and pressure within heat exchanger 110, a portion of the second fluid can vaporize to steam (when the second fluid is water) which exits outlet nozzle 150. The steam exiting outlet nozzle 150 can be transported to a turbine-generator device (not shown) for producing electricity in a manner well known in the art of electricity generation from steam.

Figure 4:
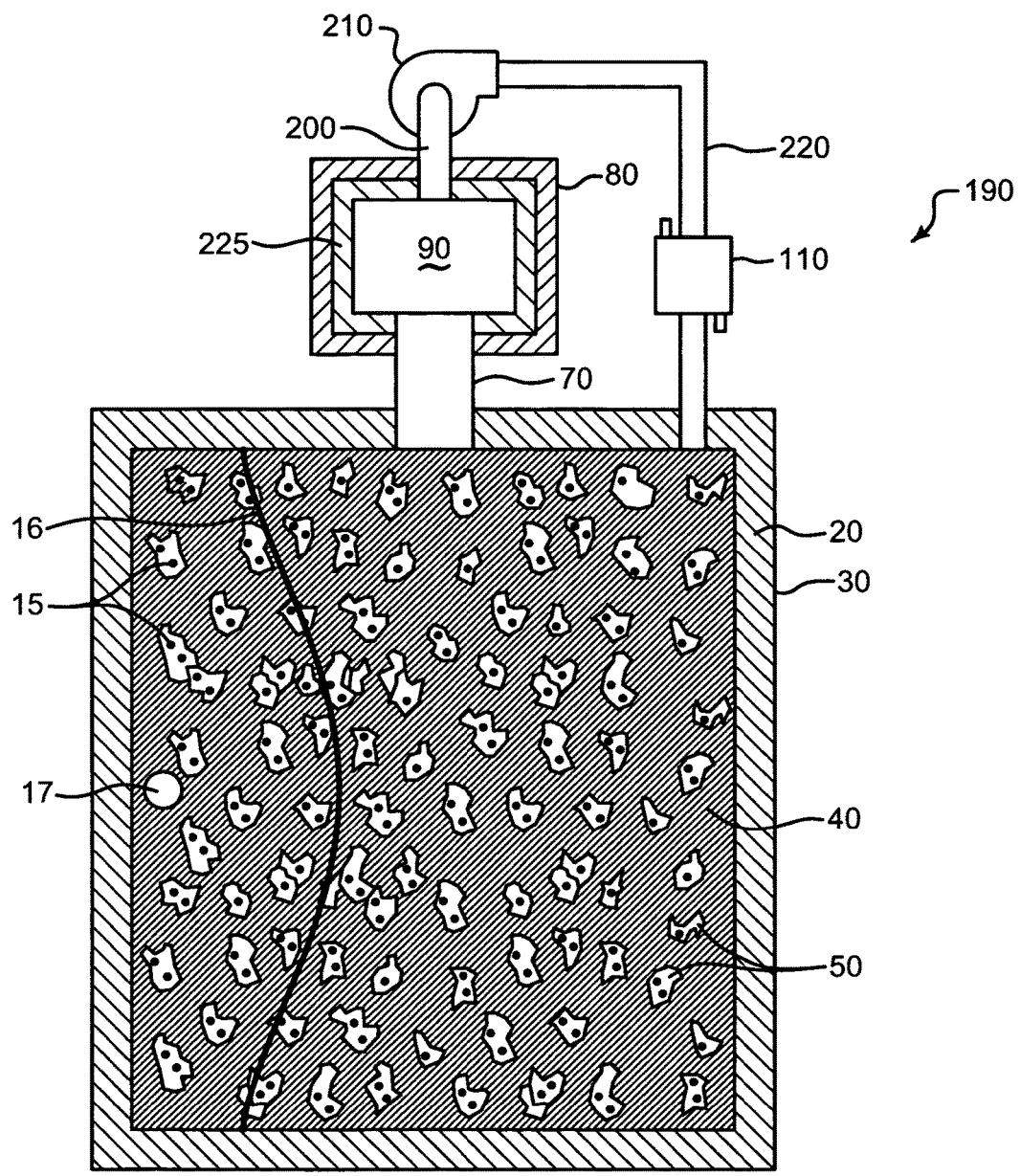
FIG. 4 is a view in partial vertical section of a third embodiment nuclear fission reactor fuel assembly and system.

Referring to FIG. 4, there is shown a third embodiment nuclear fission reactor fuel assembly and system, generally referred to as 190, intended primarily for removing heat and volatile fission products 15 from fuel body 40. Third embodiment nuclear fission reactor fuel assembly 190 comprises a second pipe segment 200 that is in communication with first volume 90 at one end of second pipe segment 200 and is integrally connected at the other end of second pipe segment 200 to an inlet of a first pump 210, which may be a centrifugal pump. Such a pump suitable for this purpose may be of a type that may be available, for example, from Sulzer Pumps, Ltd. located in Winterthur, Switzerland. An outlet of first pump 210 is connected to a third pipe segment 220, which in turn is in communication with fuel body 40. Moreover, heat exchanger 110 may be coupled to third pipe segment 220 for removing heat from the fluid flowing through third pipe segment 220.

Still referring to FIG. 4, to remove heat from fuel body 40, first pump 210 is activated. First pump 210 will draw fluid, such as the previously mentioned helium gas, from second pipe segment 200 and thus from first volume 90, which is defined by fluid control subassembly 80. First pump 210 will pump the fluid through third pipe segment 220. The fluid flowing through third pipe segment 220 is received by the plurality (or multiplicity) of open-cell pores 50 that are defined by fuel body 40. The fluid flowing through open-cell pores 50 will acquire the heat produced by fuel body 40. The heat is acquired by means of forced convective heat transfer as the fluid is pumped through open-cell pores 50 by means of first pump 210. As first pump 210 is operated, the fluid flowing through fuel body 40 and that is experiencing the convective heat transfer, is drawn, due to the pumping action of pump 210, through first pipe segment 70, into first volume 90, through second pipe segment 200 and thence into third pipe segment 220 where the heat is removed by heat exchanger 110. Also, while fluid circulates between fuel body 40 and first volume 90, a portion of volatile fission products 15 originating in fuel body 40 can be scavenged and retained within first volume 90 thereby removing or at least lowering the amount of fission product 15 present in fuel body 40. In this regard, first volume 90 may be lined with a fission product scavenging material 225 which retains fission product 15 as the fission product removal fluid enters volume 90. The fission product scavenging material may be, with limitation, silver zeolite (AgZ) for removing Xenon (Xe) and Krypton (Kr) or the fission product scavenging material may be, without limitation, metallic oxides of silicon dioxide ($SiO_2$) or titanium dioxide ($TiO_2$) for removing radioisotopes of cesium (Cs), rubidium (Rb), iodine ($I_2$), tellurium (Te) and mixtures thereof. A benefit of using this third embodiment fuel assembly 190 is that only a pump 210 is required to circulate the first fluid. No valves are needed. Absence of valves may increase reliability of third embodiment fuel assembly 190 while reducing costs of manufacture and maintenance of third embodiment fuel assembly 190.

Figure 5:
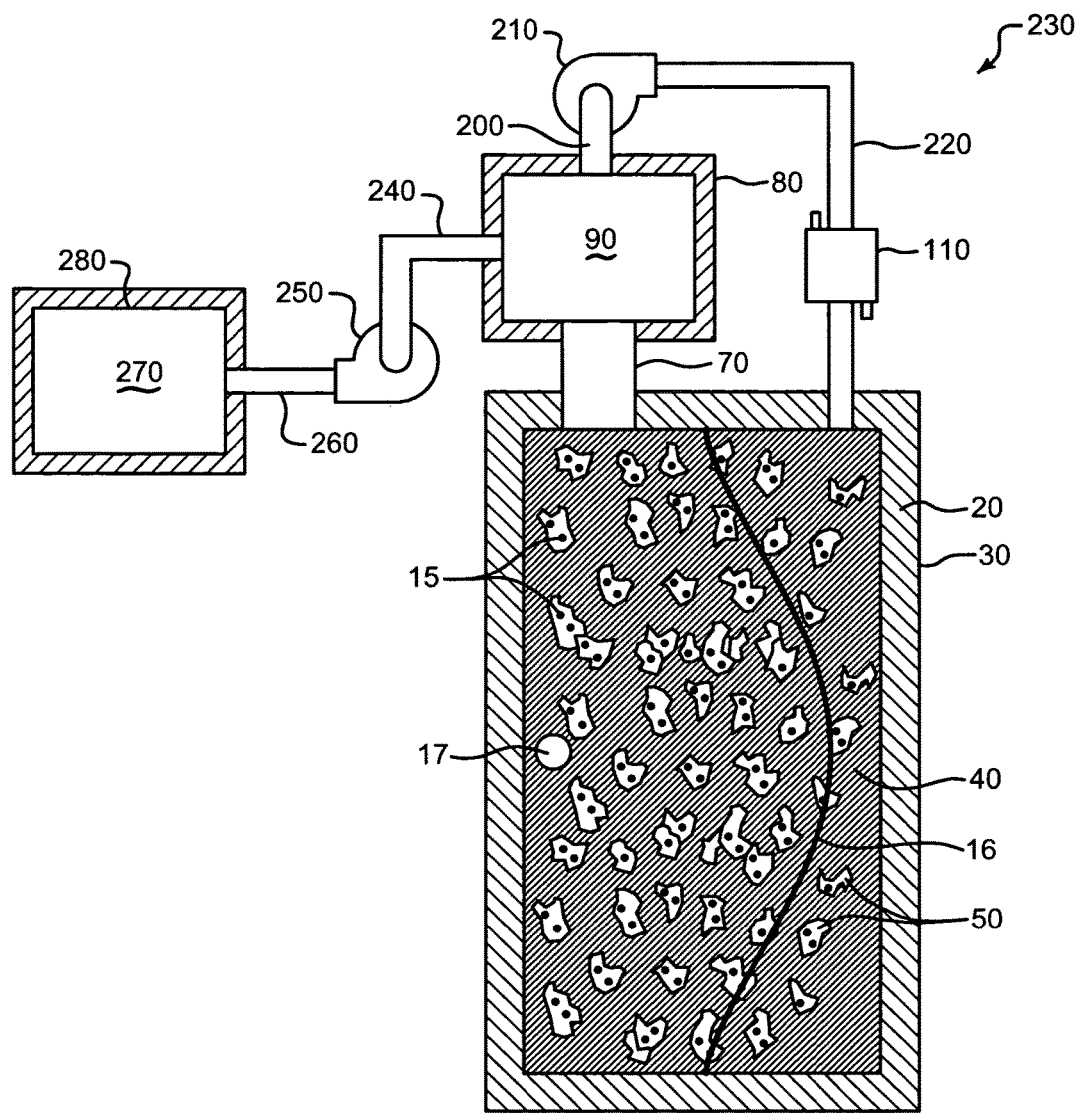
FIG. 5 is a view in partial vertical section of a fourth embodiment nuclear fission reactor fuel assembly and system.

Referring to FIG. 5, a fourth embodiment nuclear fission reactor fuel assembly and system, generally referred to as 230, is capable of further enhancing removal of the previously mentioned volatile fission product 15 as well as heat from fuel body 40. Fourth embodiment nuclear fission reactor fuel assembly 230 is substantially similar to third embodiment nuclear fission reactor fuel assembly 190, except that means is added for enhanced removal of heat and volatile fission product 15. In this regard, a fourth pipe segment 240 has an end thereof in communication with first volume 90 and another end thereof integrally coupled to an intake of a second pump 250. A discharge of second pump 250 is integrally coupled to a sixth pipe segment 260. The sixth pipe segment 260 in turn is in communication with a second volume 270 defined by a first fission product reservoir or holding tank 280. During operation of fourth embodiment fuel assembly 230, pump 210 will pump the first fluid from first volume 90, through second pipe segment 200, through third pipe segment 220, through fuel body 40, through first pipe segment 70 and back into first volume 90. As the first fluid flows through third pipe segment 220, the fluid will surrender its heat to the second fluid in heat exchanger 110. First pump 210 may then be caused to cease operation after a predetermined amount of time. Second pump 250 may then be operated to draw the fission product 15, including the first fluid intermingled therewith, through fourth pipe segment 240, through fifth pipe segment 260 and into second volume 270 that is defined by first fission product reservoir or holding tank 280. Thus, volatile fission product 15 will have been removed from fuel body 40 and then retained in first fission product reservoir or holding tank 280 for subsequent off-site disposal or the fission product 15 in reservoir or holding tank 280 may remain in situ, if desired. In this fourth embodiment fuel assembly 230 only pumps 210/250 are required. No valves are needed. Absence of valves may increase reliability of fourth embodiment fuel assembly 230 while reducing costs of manufacture and maintenance of fourth embodiment fuel assembly 230. Another benefit of fourth embodiment fuel assembly 230 is that volatile fission products 15 are isolated in second volume 270 and can be removed for subsequent off-site disposal or left in place.

Figure 6:
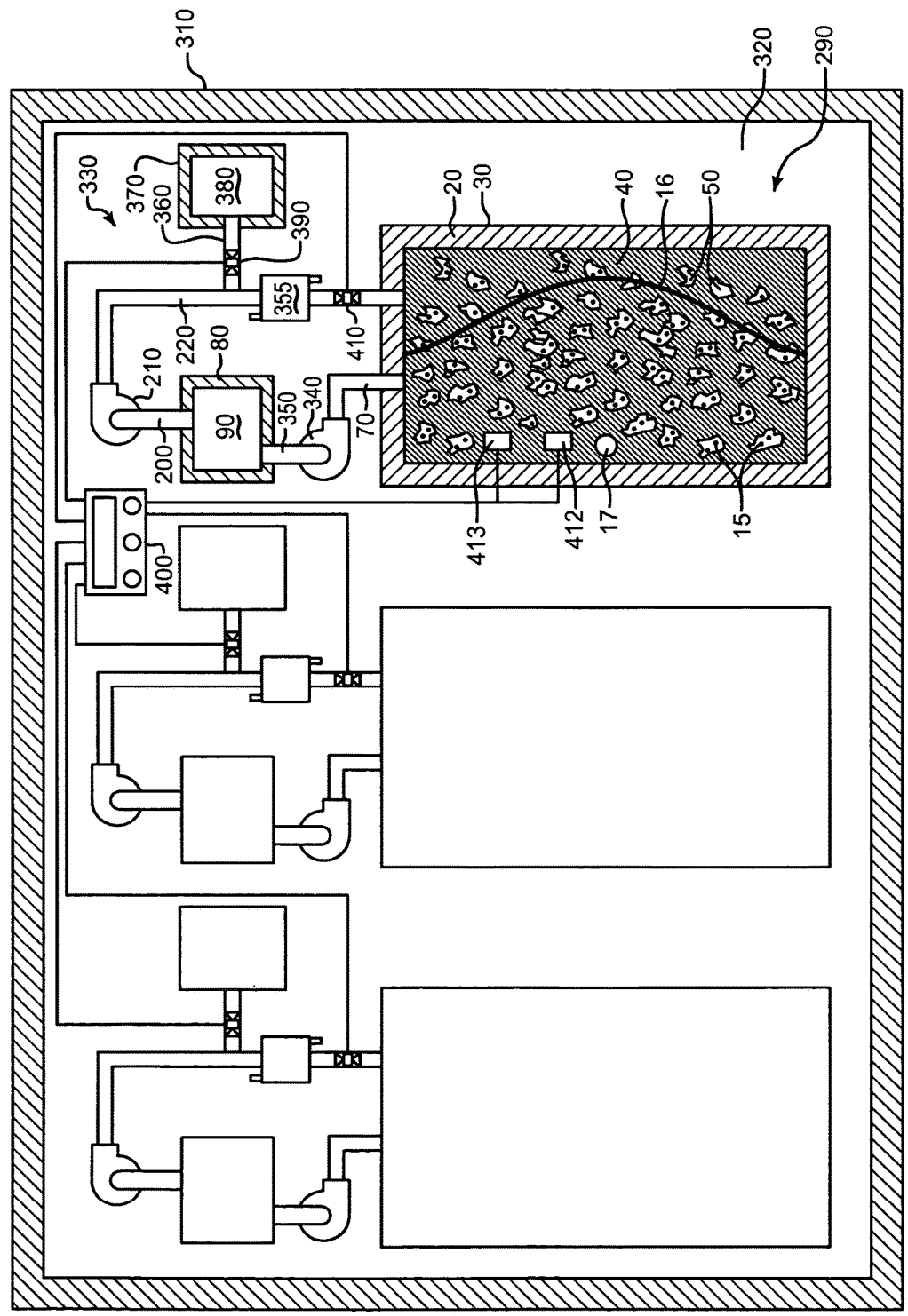
FIG. 6 is a view in partial vertical section of a plurality of fifth embodiment nuclear fission reactor fuel assemblies and systems disposed in a sealable vessel.

Referring to FIG. 6, there is shown a fifth embodiment nuclear fission reactor fuel assembly and system, generally referred to as 290. In this regard, there may be a plurality of fifth embodiment nuclear fission reactor fuel assemblies 290 (only three of which are shown). A sealable vessel 310, such as a pressure vessel or containment vessel, surrounds nuclear fission reactor fuel assemblies 290 for preventing leakage of radioactive particles, gasses or liquids from fuel assembly 290 to the surrounding environment. Vessel 310 may be steel, concrete or other material of suitable size and thickness to reduce risk of such radiation leakage and to support required pressure loads. Although only one vessel 310 is shown, there may be additional containment vessels surrounding vessel 310, one enveloping the other, for added assurance that leakage of radioactive particles, gasses or liquids from nuclear fission reactor fuel assembly 290 is prevented. Vessel 310 defines a well 320 therein in which is disposed fifth embodiment nuclear fission reactor fuel assemblies 290. Fifth embodiment nuclear fission reactor fuel assembly 290 is capable of controlled removal of heat build-up and also controlled removal of volatile fission product 15, as described more fully hereinbelow.

Referring again to FIG. 6, fuel assembly 290 comprises a compact, combined, closed-loop, dual-purpose heat removal and volatile fission product removal circuit, generally referred to as 330. Dual-purpose circuit 330 is capable of selectively removing heat as well as volatile fission products 15 from fuel body 40. In this regard, circuit 330 may be operated to first remove volatile fission products 15 and then remove heat, or vice versa. Thus, circuit 330 is capable of consecutively removing heat and fission products 15.

Referring yet again to FIG. 6, dual-purpose circuit 330 comprises the previously mentioned fluid control subassembly 80 that defines first volume 90 containing the fluid supply. First pipe segment 70 is in communication with fuel body 40 at one end of first pipe segment 70 and is integrally coupled at the other end of first pipe segment 70 to an inlet of a third pump 340, which may be a centrifugal pump. The outlet of third pump 340 is connected to a sixth pipe segment 350, which in turn is in communication with first volume 90. Second pipe segment 200 is in communication with first volume 90 at one end of second pipe segment 200 and is integrally connected to an inlet of first pump 210 at the other end of second pipe segment 200. It is appreciated that pumps 340 and 210 may be selected so that either pump 340 or pump 210 operating alone is capable of circulating a reduced but sufficient flow rate of the fluid within dual-purpose circuit 330. That is, even if either pump 340 or pump 210 is absent, turned off, or otherwise non-functioning, dual purpose circuit will still retain a capability of fluid circulation through dual-purpose circuit 330. A heat exchanger 355 is disposed in third pipe segment 220 between a seventh pipe segment 360 and enclosure 20 for removing heat from the fluid as the fluid circulates through dual-purpose circuit 330. Heat exchanger 355 may be substantially similar in configuration to heat exchanger 110. Connected to any one of the pipe segments 70/200/220/350, such as to seventh pipe segment 360, is a second volatile fission product reservoir or holding tank 370. Second reservoir or holding tank 370 defines a third volume 380 for holding and isolating volatile fission products 15 therein. Second reservoir or holding tank 370 is coupled to third pipe segment 220 by seventh pipe segment 360. Operatively connected to seventh pipe segment 360 is a motor-operated first back-flow prevention valve 390 for allowing flow of volatile fission products 15 into third volume 380; but, not for allowing reverse flow of volatile fission products 15 from third volume 380. Motor-operated first back-flow prevention valve 390 may be operable by action of a controller or control unit 400 electrically connected thereto. Alternatively, valve 390 need not be motor-operated, but may be operated by suitable other means. Such a back-flow prevention valve suitable for this purpose may be available from, for example, Emerson Process Manufacture, Ltd. located in Baar, Switzerland. As described in more detail hereinbelow, volatile fission products 15 produced by fuel body 40 will be captured and held within third volume 380 in order to isolate volatile fission products 15.

Still referring to FIG. 6, operatively connected to third pipe segment 220 and interposed between first back-flow prevention valve 390 and enclosure 20 is a motor-operated second back-flow prevention valve 410. Second back-flow prevention valve 410 allows flow of fluid into enclosure 20; but, does not allow reverse flow of fluid from enclosure 20 back into third pipe segment 220. Motor-operated second back-flow prevention valve 410 may be operable by action of control unit 400 electrically connected thereto. Thus, first pipe segment 70, third pump 340, sixth pipe segment 350, heat exchanger 355, fluid control subassembly 80, second pipe segment 200, first pump 210, third pipe segment 220, seventh pipe segment 360, second fission product reservoir or holding tank 370, first back-flow prevention valve 390, second back-flow prevention valve 410, control unit 400 and fuel body 40 together define dual-purpose circuit 330. As described in more detail presently, dual-purpose circuit 330 is capable of circulating the fluid through open-cell pores 50 of fuel body 40, so that the heat and volatile fission products 15 are selectively removed from fuel body 40 either consecutively or simultaneously. It should be understood from the description herein that a benefit of this fifth embodiment nuclear fission reactor fuel assembly 290 is that dual-purpose circuit 330 can selectively consecutively remove volatile fission products 15 and heat by controlled operation of pumps 210/340, valves 390/410 and control unit 400.

Referring again to FIG. 6, a plurality of sensors or neutron flux detectors 412 (only one of which is shown) may be disposed in fuel body 40 for detecting various operating characteristics of fuel body 40. By way of example only, and not by way of limitation, detector 412 may be adapted to detect the operating characteristics of neutron population level, power level and/or position of burn wave 16 in fuel body 40. Detector 412 is coupled to control unit 400, which control unit 400 controls operation of detector 412. In addition, a plurality of fission product pressure detectors 413 (only one of which is shown) may be disposed in fuel body 40 for detecting fission product pressure level in fuel body 40. Moreover, it should be appreciated that control unit 400 is capable of operating valves 390 and 410 to control release of volatile fission product 15 and heat according to the amount of time nuclear fission reactor fuel assembly 290 is continuously or periodically operated and/or according to any time schedule associated with nuclear fission reactor fuel assembly 290. A controller suitable for use as control unit 400 might be of a type that may be available from, for example, Stolley and Orlebeke, Incorporated located in Elmhurst, Ill., U.S.A. Moreover, neutron flux detectors suitable for this purpose may be available from Thermo Fisher Scientific, Incorporated located in Waltham, Mass. U.S.A. In addition, suitable pressure detectors may be available from Kaman Measuring Systems, Incorporated located in Colorado Springs, Colo. U.S.A.

Figure 6B:
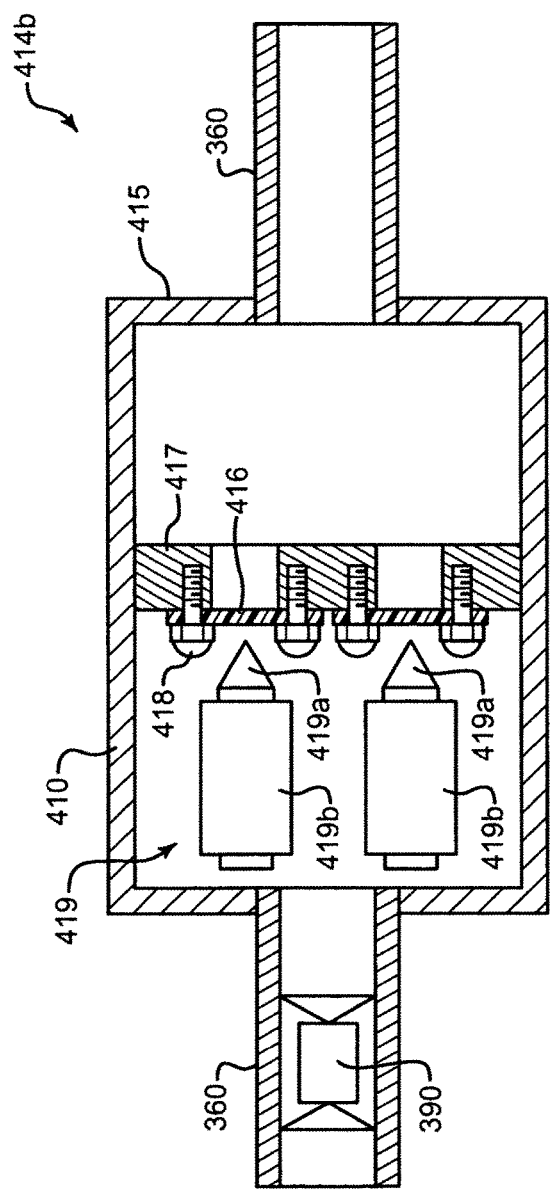
FIG. 6B is a view in partial vertical section of a second embodiment diaphragm valve having the barrier breakable by means of a piston arrangement.

As shown in FIGS. 6A and 6B, a first embodiment diaphragm valve, generally referred to as 414a, having a hollow valve body 415 may be substituted for valves 390 and/or 410, if desired. Alternatively, the previously mentioned back-flow prevention valve 390 or 410 may be used in combination with first embodiment diaphragm valve 414a, as shown. Disposed within hollow valve body 415 is a plurality of breakable barriers or membranes 416, which may be made of a thin elastomer, or metal of thin cross-section. Membranes 416 break or rupture when subjected to a predetermined system pressure. Each membrane 416 is mounted on respective ones of a plurality of supports 417, such as by means of fasteners 418. Supports 417 are integrally connected to valve body 415. Alternatively, either of valves 390 or 410 may be a second embodiment diaphragm valve, generally referred to as 414b, having breakable barriers or membranes 416 that are breakable by means of a piston arrangement, generally referred to as 419. Second embodiment diaphragm valve 414b may be used in combination with back-flow prevention valve 390 or 410, as shown. Piston arrangement 419 has a piston 419a movable to break membrane 416. Each piston 419a is movable by means of a motor 419b. Motors 419b are connected to control unit 400, so that control unit 400 controls motors 419b. Thus, each piston 419a is capable of moving to break membrane 416 by means of operator action as an operator operates control unit 400. Valves 414b may be custom designed valves that may be available from Solenoid Solutions, Incorporated located in Erie, Pa., U.S.A. However, it may be appreciated that valves 414a and 414b may be check valves rather than diaphragm valves, if desired.

Returning to FIG. 6, operation of dual-purpose circuit 330 for removal of volatile fission products 15 from fuel body 40 will now be described. As previously mentioned, circuit 330 can be operated to selectively consecutively remove volatile fission products 15 as well as heat from fuel body 40. To remove volatile fission products 15 from fuel body 40, first valve 390 is opened and second valve 410 is closed, such as by action of control unit 400 to which valves 390/410 are electrically connected. As previously mentioned, volatile fission products 15 are produced in fuel body 40 by burn wave 16 and reside in open-cell pores 50. Third pump 340 is selectively operable, such as by means of control unit 400, so that fission products 15 acquired by open-cell pores 50 are drawn through first pipe segment 70, into sixth pipe segment 350 and then into first volume 90. First pump 210 will then draw the fission products 15 from first volume 90 and then through second pipe segment 200. First pump 210 will pump the fission products 15 from second pipe segment 200 and through third pipe segment 220. The fission products 15 flowing along third pipe segment 220 will be diverted to second fission product reservoir or holding tank 370 because first valve 390 is open and second valve 410 is closed. After a predetermined amount of time, first valve 390 is closed and second valve 410 is opened to resume removal of fission products 15 from fuel body 40, if needed.

Still referring to FIG. 6, operation of circuit 330 for removal of heat from fuel body 40 will now be described. To remove heat from fuel body 40, first valve 390 is closed and second valve 410 is opened, such as by action of control unit 400. First pump 210 and third pump 340 are activated, which also may be by action of control unit 400. First pump 210 will draw the fluid, such as the previously mentioned helium gas, through first pipe segment 200 and thus from first volume 90, which is defined by fluid control subassembly 80. First pump 210 will pump the fluid through third pipe segment 220. The previously mentioned heat exchanger 355 is in heat transfer communication with the fluid flowing through third pipe segment 220 for removing the heat carried by the fluid. The fluid flowing through third pipe segment 220 will not be diverted to reservoir or holding tank 370 because first valve 390 is closed. The fluid flowing through third pipe segment 220 is received by the plurality (or multiplicity) of open-cell pores 50 that are defined by porous fuel body 40. The fluid received by open-cell pores 50 will acquire the heat produced by fuel body 40. The heat is acquired by means of convective heat transfer as the fluid flows through open-cell pores 50. As convective heat transfer occurs within fuel body 40, third pump 340 is operated, such as by means of control unit 400. As third pump 340 is operated, the fluid residing in fuel body 40 and that is experiencing the convective heat transfer, is drawn through first pipe segment 70 and into first volume 90A benefit of using fifth embodiment nuclear fission reactor fuel assembly 290 is that compact, dual-purpose circuit 330 can selectively consecutively remove volatile fission products 15 and then remove heat or vice versa. This result is accomplished by controlled operation of pumps 210/340 and valves 390/410 by means of control unit 400 and also by means of heat exchanger 355.

Figure 7:
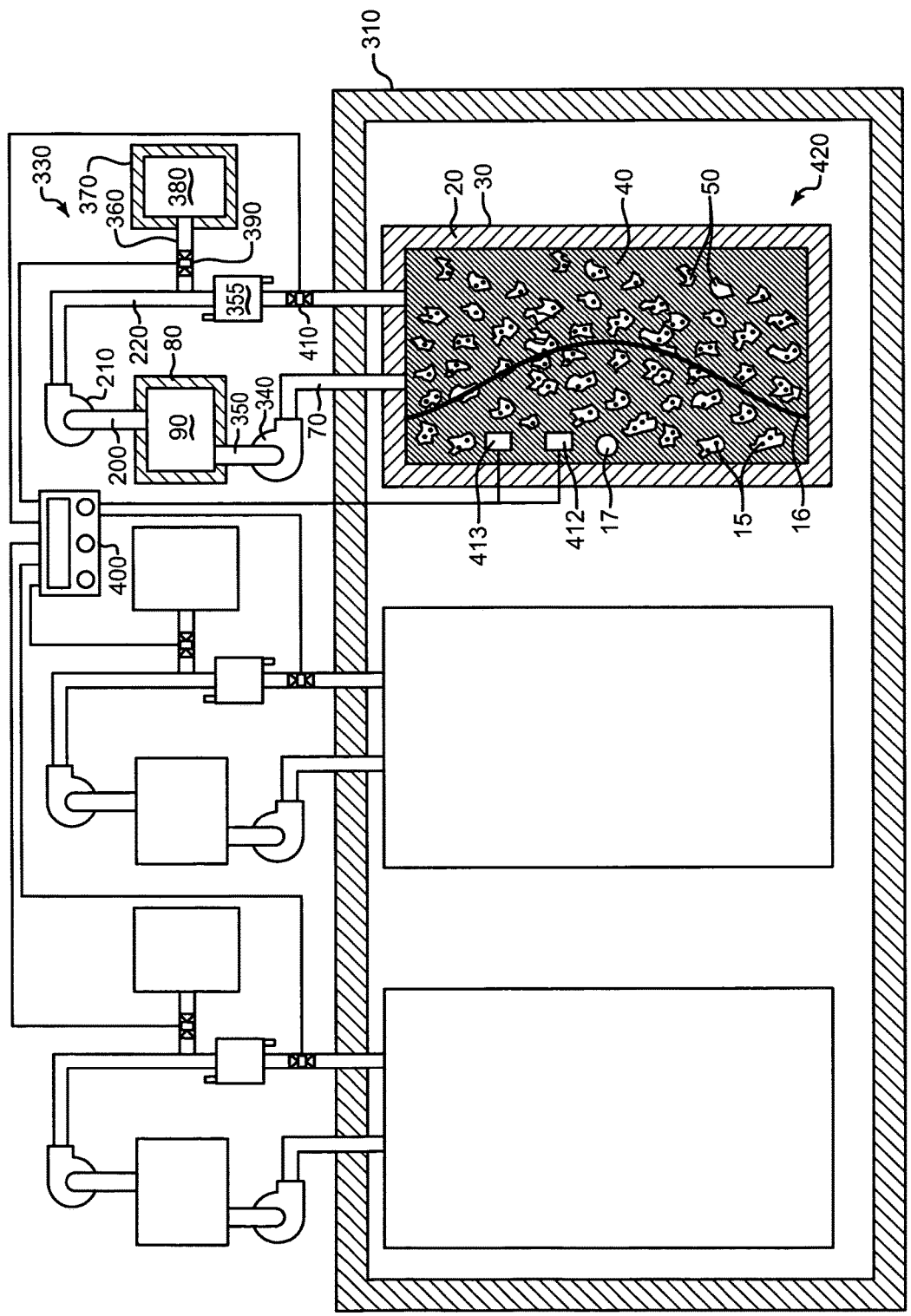
FIG. 7 is a view in partial vertical section of a plurality of sixth embodiment nuclear fission reactor fuel assemblies and systems having portions thereof disposed outside the sealable vessel.

Referring to FIG. 7, a sixth embodiment nuclear fission reactor fuel assembly and system are there shown, generally referred to as 420. Sixth embodiment fuel assembly 420 is substantially similar to fifth embodiment fuel assembly 290, except that the following components are disposed substantially externally to vessel 310: first pipe segment 70, third pump 340, sixth pipe segment 350, fluid control subassembly 80, second pipe segment 200, first pump 210, third pipe segment 220, first valve 390, heat exchanger 355, seventh pipe segment 360, second fission product reservoir or holding tank 370, second valve 410 and control unit 400. In some cases disposing these components externally to vessel 310 may make these components more readily accessible for easier maintenance without exposing maintenance equipment and reactor personnel to radiation levels within vessel 310 while performing such maintenance.

Figure 7A:
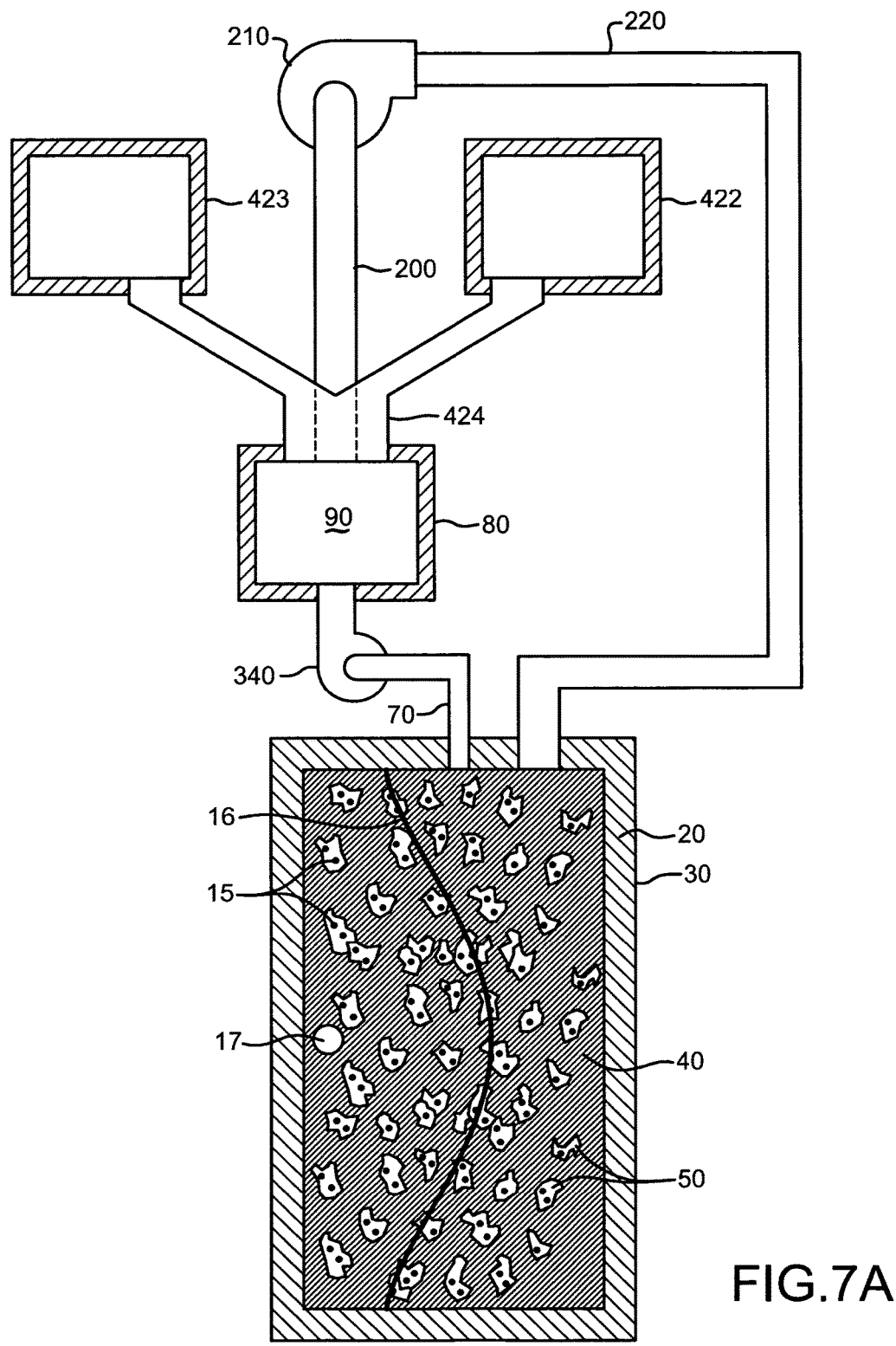
FIG. 7A is a view in partial vertical section of a first supply component, a second supply component and a fluid control subassembly operatively coupled together by a Y-shaped pipe junction.

As seen in FIG. 7A, a first fluid supply reservoir or first component 422, a second fluid supply reservoir or second component 423 and fluid control subassembly 80 are operatively coupled together by a Y-shaped pipe junction 424. First fluid supply component 422 is capable of supplying a fission product removal fluid to fluid control subassembly 80, so as to enable fluid control subassembly 80 to circulate the fission product removal fluid through the open-cell pores 50 of nuclear fuel body 40. In this manner, at least a portion of volatile fission product 15 acquired by pores 50 of nuclear fuel body 40 is removed from pores 50 while fluid control subassembly 80 circulates the fission product removal fluid through pores 50. In addition, second fluid supply component 423 is capable of supplying a heat removal fluid to fluid control subassembly 80, so as to enable fluid control subassembly 80 to circulate the heat removal fluid through the pores of nuclear fuel body 40. In this manner, at least a portion of the heat generated by nuclear fuel body 40 is removed from nuclear fuel body 40 while fluid control subassembly 80 circulates the heat removal fluid through nuclear fuel body 40. The fission product removal fluid may be, with limitation, hydrogen ($H_2$), helium (He), carbon dioxide ($CO_2$), and/or methane ($CH_4$). The heat removal fluid may be, without limitation, hydrogen ($H_2$), helium (He), carbon dioxide ($CO_2$), sodium (Na), lead (Pb), sodium-potassium (NaK), lithium (Li), "light" water ($H_2O$), lead-bismuth (Pb—Bi) alloys, and/or fluorine-lithium-beryllium (FLiBe). First component 422 and second component 423 may be substantially identical in configuration. A pair of back-flow prevention valves (not shown) may be integrally coupled to respective ones of components 422/423 for controlling flow of the fission product removal fluid and heat removal fluid into volume 90, but not reverse flow from volume 90 and back into either first component 422 or second component 423. In this manner, first component 422 and second component 423 are capable of supplying, respectively, the fission product removal fluid and the heat removal fluid to fluid control subassembly 80. In other words, first component 422 and second component 423 are capable of sequentially supplying, respectively, the fission product removal fluid and the heat removal fluid to fluid control subassembly 80. Moreover, a pair of pumps (not shown) is coupled to first component 422 and second component 423, respectively, for pumping the fission product removal fluid and the heat removal fluid to fluid control subassembly 80.

Figure 7B:
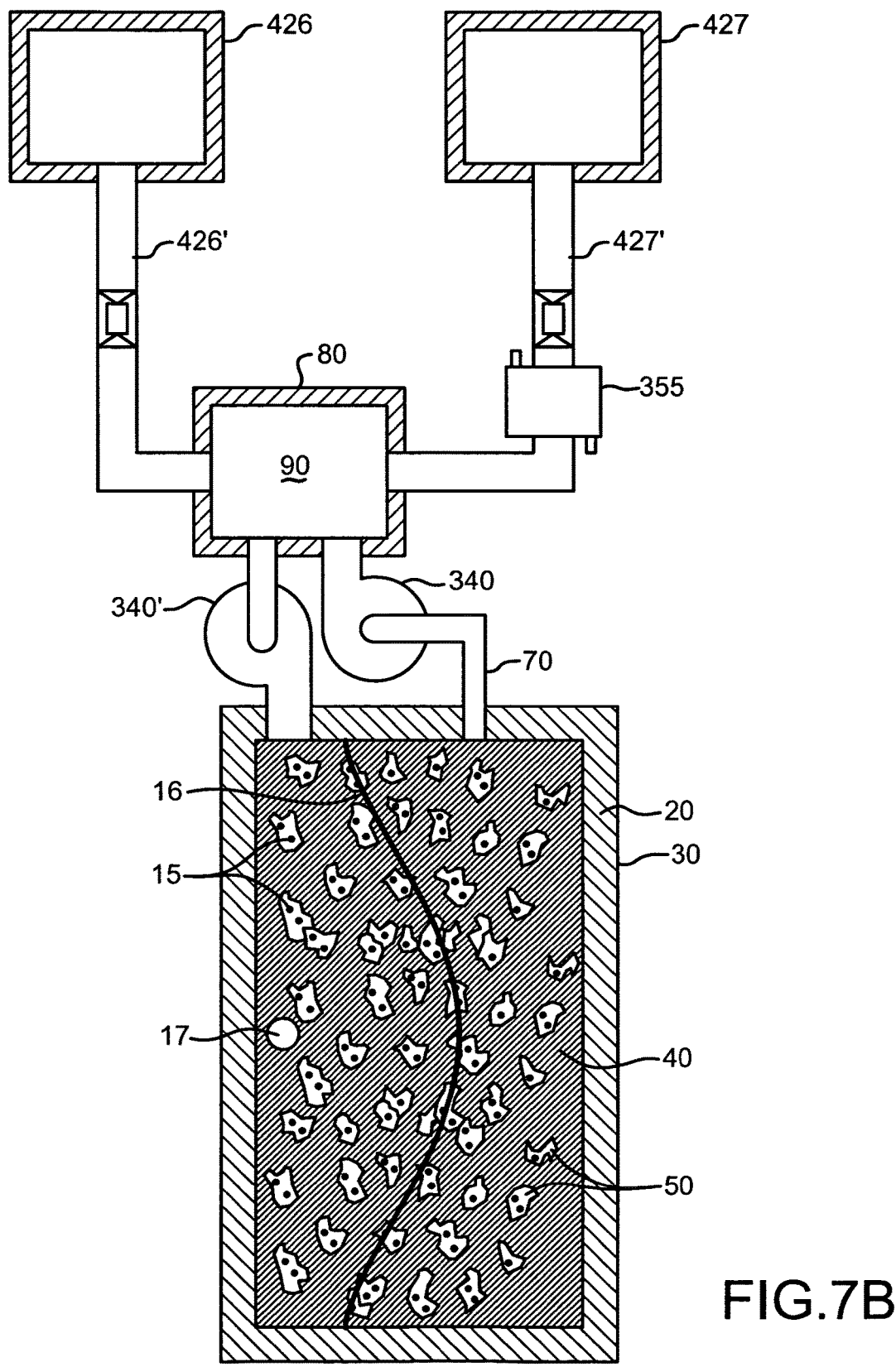
FIG. 7B is a view in partial vertical section of an inlet subassembly and an outlet subassembly coupled to the fluid control subassembly.

Referring to FIG. 7B, a fluid control subassembly may alternatively comprise an inlet subassembly 426 for supplying the fission product removal fluid to fluid control subassembly 80. A valve 426' may be interposed between inlet subassembly 426 and fluid control subassembly 80 for controlling flow of the fission product removal fluid from inlet subassembly 426 to volume 90. A fourth pump 340', that is in communication with volume 90 and that is connected to fuel body 40 may thereafter pump the fission product removal fluid to porous nuclear fuel body 40. An outlet subassembly 427 is also provided for removing the fission product removal fluid from porous nuclear fuel body 40. In this regard, third pump 340 is operated to withdraw the fission product removal fluid from nuclear fuel body 40 and into fluid control subassembly 80. Thereafter, the fission product removal fluid flows into outlet subassembly 427. Another valve 427' may be interposed between outlet subassembly 427 and fluid control subassembly 80 for controlling flow of the fission product removal fluid to outlet subassembly 427. During operation, when valve 427' is closed and valve 426' is opened, the fission product removal fluid in inlet subassembly 426 is drawn by pump 340' into volume 90 and then into fuel body 40. After the fission product removal fluid is substantially exhausted from inlet subassembly 426, pump 340' is caused to cease operation. Valve 426' is then closed and valve 427' is opened. Pump 340 is then operated to draw the fission product removal fluid from fuel body 40 and into volume 90. The fission product removal fluid will thereafter travel to outlet subassembly 427. Heat exchanger 355 may be interposed between fluid control subassembly 80 and outlet subassembly 427 for removing heat from the fluid, if desired.

Figure 7C:
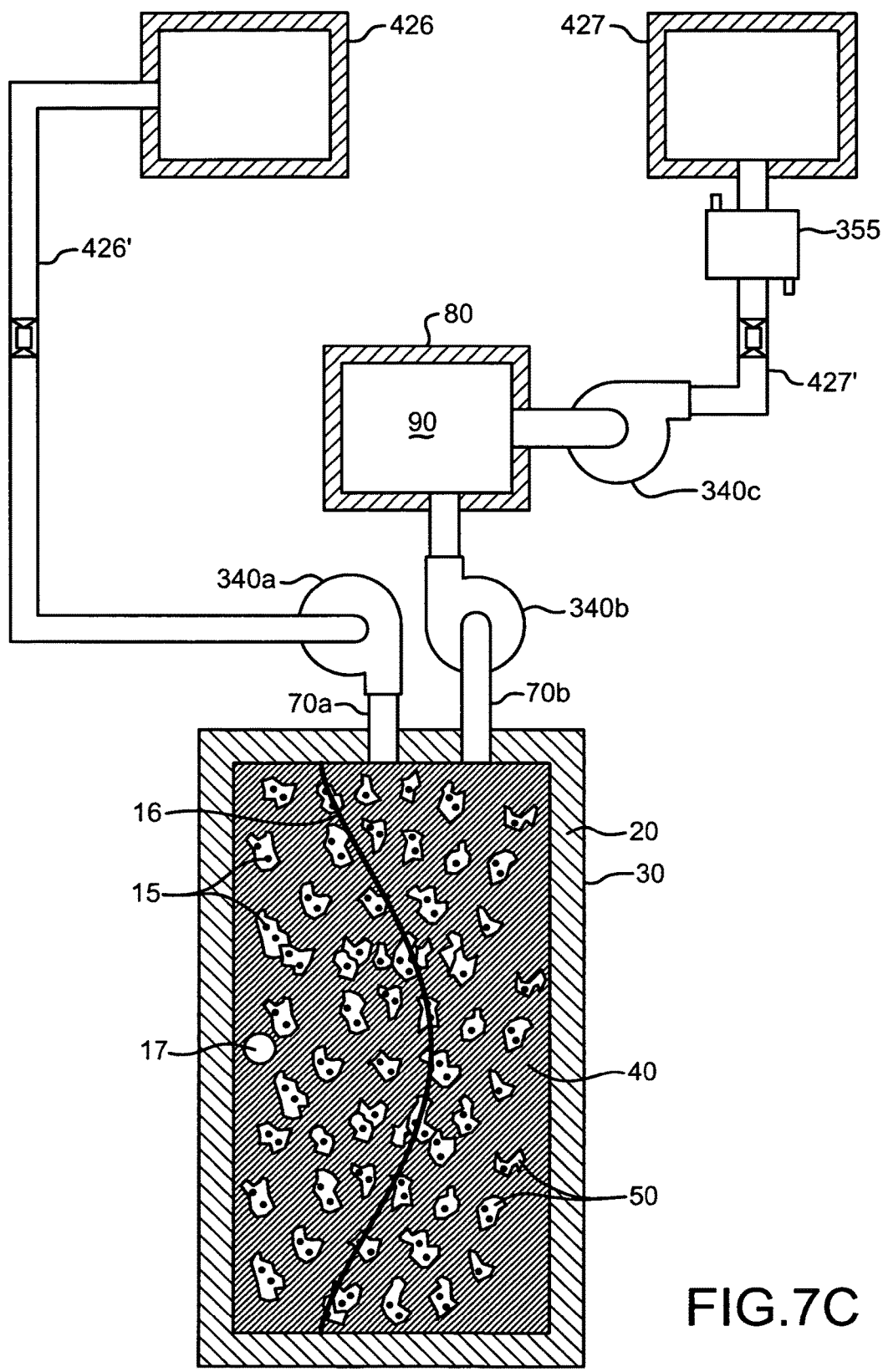
FIG. 7C is a view in partial vertical section of an inlet subassembly coupled to the porous nuclear fuel body and an outlet subassembly coupled to the fluid control subassembly.

Referring to FIG. 7C, a fluid control subassembly may alternatively comprise inlet subassembly 426 that is coupled to enclosure 20. Optional pump 340a pumps the fission product removal fluid from inlet subassembly 426 to fuel body 40 and through pipe 426' and pipe 70a. The fission product removal fluid is drawn from fuel body 40 and through pipe 70b, such as by another optional pump 340b, and then flows to fluid control subassembly 80. From there, the fission product removal fluid is pumped by optional pump 340c so that the fission product removal fluid flows through pipe 427' to outlet subassembly 427. If desired, some or all of the pumps 340a, 340b, and 340c may be omitted. If desired, heat exchanger 355 may be interposed between fluid control subassembly 80 and outlet subassembly 427 for removing heat from the fission product removal fluid.

Figure 7D:
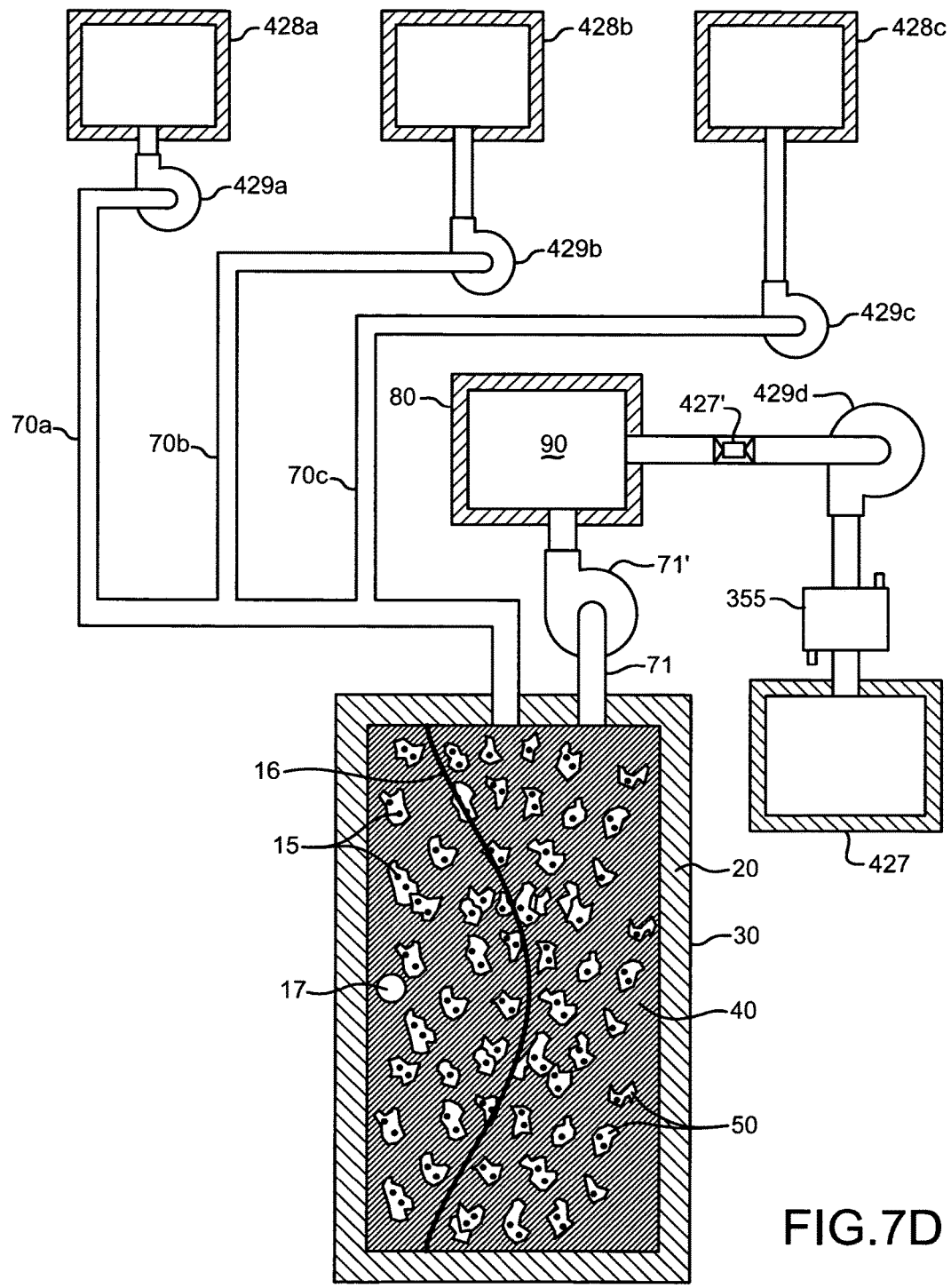
FIG. 7D is a view in partial vertical section of a plurality of inlet subassemblies coupled to the fuel body, a plurality of pumps coupled to respective ones of the inlet subassemblies and also showing an outlet subassembly coupled to the fluid control subassembly.

Referring to FIG. 7D, a fluid control subassembly may alternatively comprise a plurality of outlet subassemblies 428a/428b/428c for receiving the fission product removal fluid from porous nuclear fuel body 40 and may further comprise a plurality of pumps 429a/429b/429c coupled to respective ones of outlet subassemblies 428a/428b/428c. Pumps 429a/429b/429c are configured to pump the fission product removal fluid along pipes 70a/70b/70c to respective ones of the plurality of outlet subassemblies 428a/428b/428c. The fission product removal fluid flows to fluid control subassembly 80 through pipe 71 due to the pumping action of a pump 71'. From there, the fission product removal fluid flows through pipe 427' to a reservoir 427 due to the pumping action of a pump 429d. If desired, either or all of the pumps 429a, 429b, 429c, 429d and 71' may be omitted. If desired, heat exchanger 355 may be interposed between fluid control subassembly 80 and outlet subassembly 427 for removing heat from the fluid.

Figure 7E:
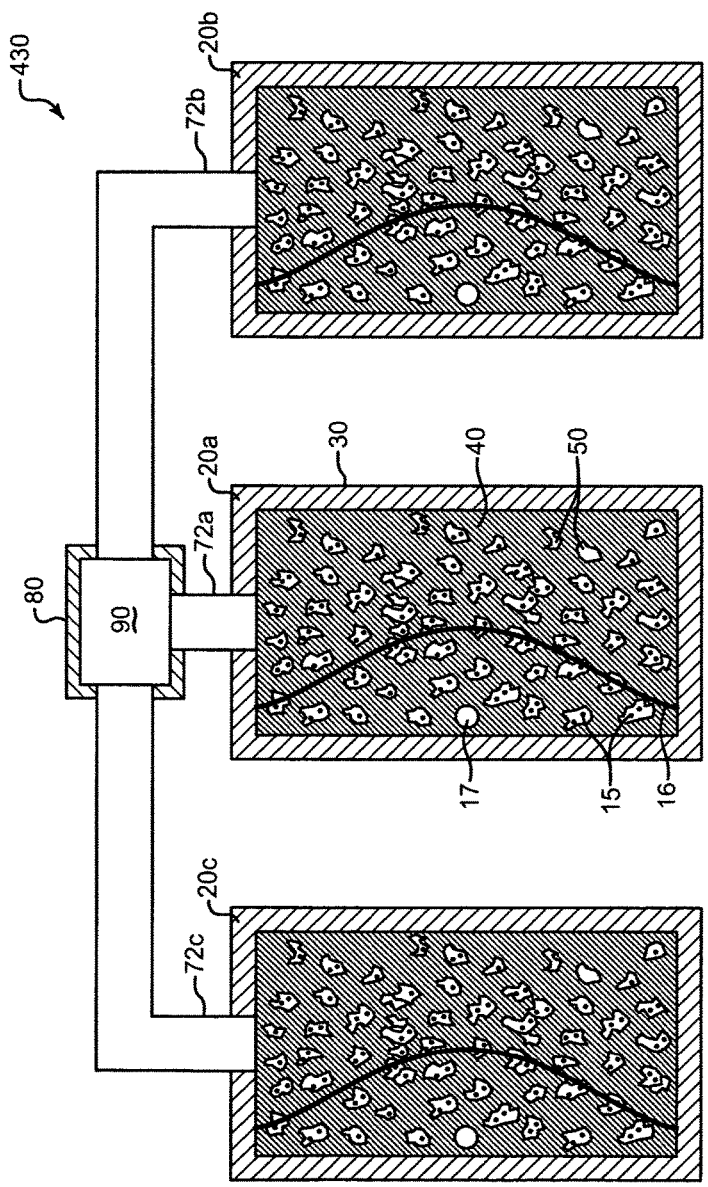
FIG. 7E is a view in partial vertical section of a seventh embodiment nuclear fission reactor fuel assembly and system, this view also showing volatile fission products residing in a plurality of interconnected open-cell pores defined by a porous nuclear fuel body disposed in a plurality of nuclear fission reactor fuel assemblies.

Referring to FIG. 7E, there is shown a seventh embodiment nuclear fission reactor fuel assembly and system, generally referred to as 430, for producing heat due to fission of a fissile nuclide. This seventh embodiment nuclear fission reactor fuel assembly and system is similar to the first embodiment nuclear fission reactor fuel assembly and system 10, except that there are a plurality of enclosures 20a, 20b, and 20c. Each of the enclosures 20a, 20b and 20c is connected to fluid control subassembly 80 by means of respective ones of a plurality of pipe segments 72a, 72b and 72c. Seventh embodiment nuclear fission reactor fuel assembly and system 430 otherwise operates in the same manner as first embodiment nuclear fission reactor fuel assembly and system 10.

Figure 8:
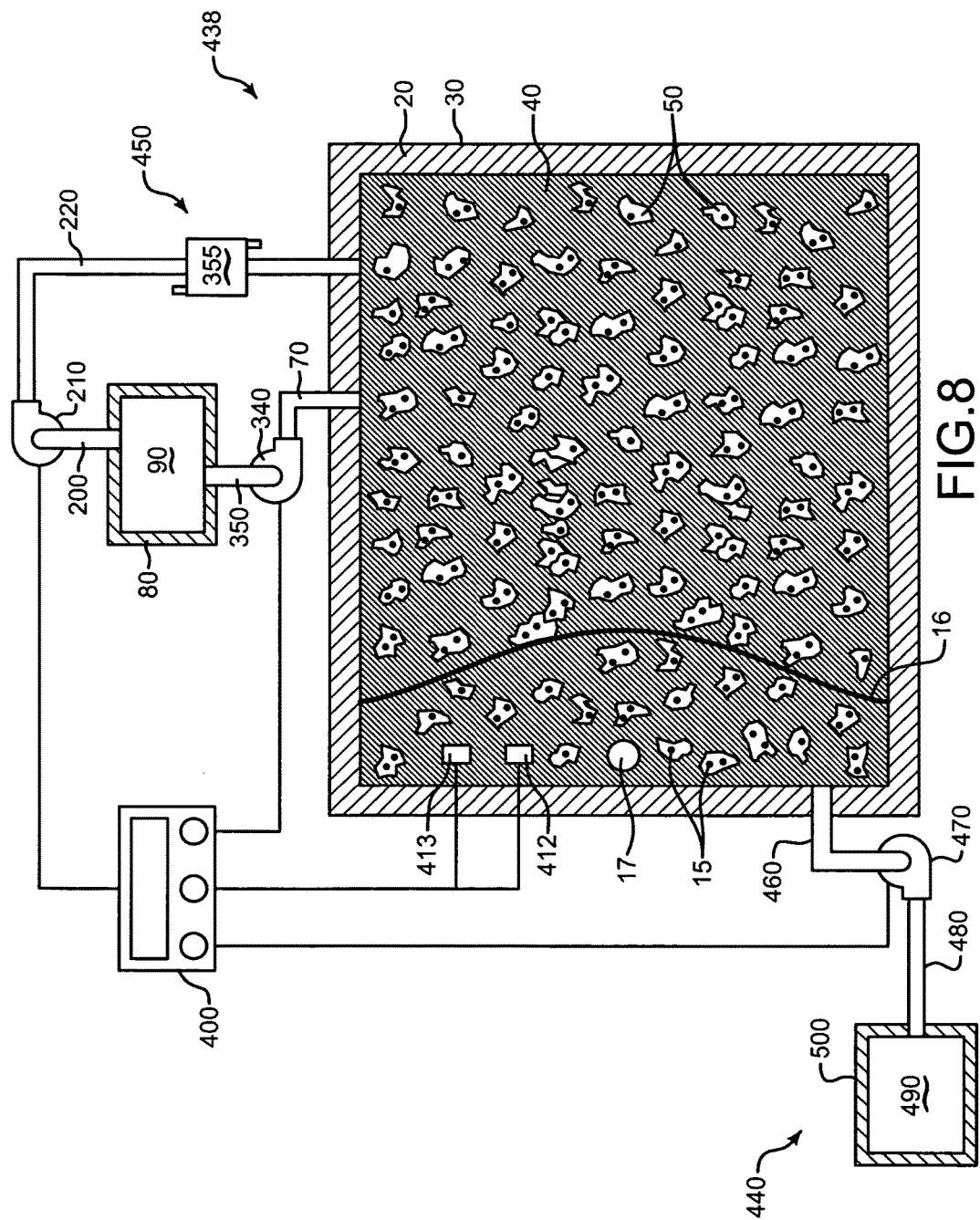
FIG. 8 is a view in partial vertical section of an eighth embodiment nuclear fission reactor fuel assembly and system.

Referring to FIG. 8, there is shown an eighth embodiment nuclear fission reactor fuel assembly and system, generally referred to as 438. This eighth embodiment nuclear fission reactor fuel assembly 438 differs from fifth embodiment nuclear fission reactor fuel assembly 290 and sixth embodiment nuclear fission reactor fuel assembly 420 in that dual purpose circuit 330 is replaced by a fission product flow path, generally referred to as 440 and by a separate heat removal flow path, generally referred to as 450. The purpose of heat removal flow path 450 is to remove heat from fuel body 40. The purpose of fission product flow path 440 is to remove and isolate volatile fission products 15 from fuel body 40. Heat removal flow path 450 comprises the previously mentioned fluid control subassembly 80 that defines first volume 90. The first volume 90 contains the fluid, such as helium gas, that is used to remove heat. First pipe segment 70 is in communication with fuel body 40 at one end of first pipe segment 70 and is integrally connected at the other end of first pipe segment 70 to the inlet of third pump 340. The outlet of third pump 340 is connected to sixth pipe segment 350, which in turn is in communication with first volume 90. Second pipe segment 200 is in communication with first volume 90 at one end of second pipe segment 200 and is integrally connected to the inlet of first pump 210 at the other end of second pipe segment 200. The outlet of first pump 210 is connected to third pipe segment 220, which in turn is in communication with fuel body 40. Heat exchanger 355 is coupled to third pipe segment 220 for removing heat from the fluid. Thus, first pipe segment 70, third pump 340, sixth pipe segment 350, fluid control subassembly 80, second pipe segment 200, first pump 210, third pipe segment 220, fuel body 40 itself and heat exchanger 355, together define heat removal flow path 450. As described in more detail hereinbelow, heat removal flow path 450 is capable of circulating the heat removal fluid through heat exchanger 355 and open-cell pores 50 of fuel body 40, so that heat is removed from fuel body 40.

Still referring to FIG. 8, fission product flow path 440 comprises a first flow pipe 460 having one end thereof in communication with fuel body 40. The other end of first flow pipe 460 is connected to an inlet of a fifth pump 470, which may be a centrifugal pump. The outlet of fifth pump 470 is connected to a second flow pipe 480. Second flow pipe 480 is in communication with a fourth volume 490, which is defined by a third fission product reservoir or holding tank 500. As described in more detail hereinbelow, fission product flow path 440 is capable of removing and isolating fission products 15 from fuel body 40.

Referring again to FIG. 8, operation of heat removal flow path 450 to remove heat from fuel body 40 will now be described. In this regard, to remove heat from fuel body 40, first pump 210 and third pump 340 are activated, which may be by means of control unit 400. First pump 210 will draw the heat removal fluid, such as the previously mentioned helium gas, through first pipe segment 200 and thus from first volume 90, which is defined by fluid control subassembly 80. First pump 210 will pump the fluid through third pipe segment 220. The fluid flowing through third pipe segment 220 is received by the plurality (or multiplicity) of open-cell pores 50 that are defined by fuel body 40. The fluid received by open-cell pores 50 will acquire the heat produced by fuel body 40. The heat is acquired by means of convective heat transfer as the fluid flows through open-cell pores 50. As convective heat transfer is occurring within fuel body 40, third pump 340 is operated, such as by means of control unit 400. As third pump 340 is operated, the fluid that is experiencing the convective heat transfer in fuel body 40 is drawn through first pipe segment 70 by third pump 340 and then pumped by third pump 340 into first volume 90. First pump 210, third pump 340 and fourth pump 470 may each be selectively operated by means of control unit 400. The previously mentioned heat exchanger 355 that is in heat transfer communication with the fluid flowing in third pipe segment 220 removes the heat from the fluid. Pumps 340 and 210 are selected such that heat removal flow path 450 may be implemented with pump 340 alone, with pump 210 alone, or with pumps 340 and 210 together. In other words, simultaneous operation of pumps 340 and 210 will remove heat at a maximum rate. On the other hand, operation of either pump 340 or 210 alone will pump the heat removal fluid at a reduced, but sufficient, rate if either of pumps 340 or 210 is non-functional or otherwise unavailable.

Referring again to FIG. 8, operation of second flow path 440 for removal and isolation of volatile fission product 15 from fuel body 40 will now be described. In this regard, heat removal flow path 450 is caused to cease operation, such as by deactivating pumps 210 and 340. Then, as fifth pump 470 is operated, volatile fission product 15 will be drawn into first flow pipe 460 and then pumped into second flow pipe 480. As volatile fission product 15 is pumped through second flow pipe 480, the fluid will enter fourth volume 490 that is defined by third fission product reservoir or holding tank 500. Thus, volatile fission product 15 will have been removed from fuel body 40 and then retained in third fission product reservoir or holding tank 500 for subsequent off-site disposal or the fission products 15 in reservoir or holding tank 500 may remain in situ, if desired. Fission product flow path 440 and heat removal flow path 450 may be operated either simultaneously or consecutively, as desired. Moreover, it may be appreciated from the description hereinabove, that volatile fission product 15 may remove itself from open-cell pores 50 and travel to volume 90 without assistance of fifth pump 470 by vaporization due to the inherently volatile nature of volatile fission product 15. Accordingly, fission product flow path 440 may be implemented with or without pump 470. Fission product flow path 440 may utilize one or more controllable shut-off valves (not shown) or back-flow prevention valves (also not shown) disposed in flow path 440 and operatively connected to control unit 400 for further isolating fourth volume 490.

Figure 9:
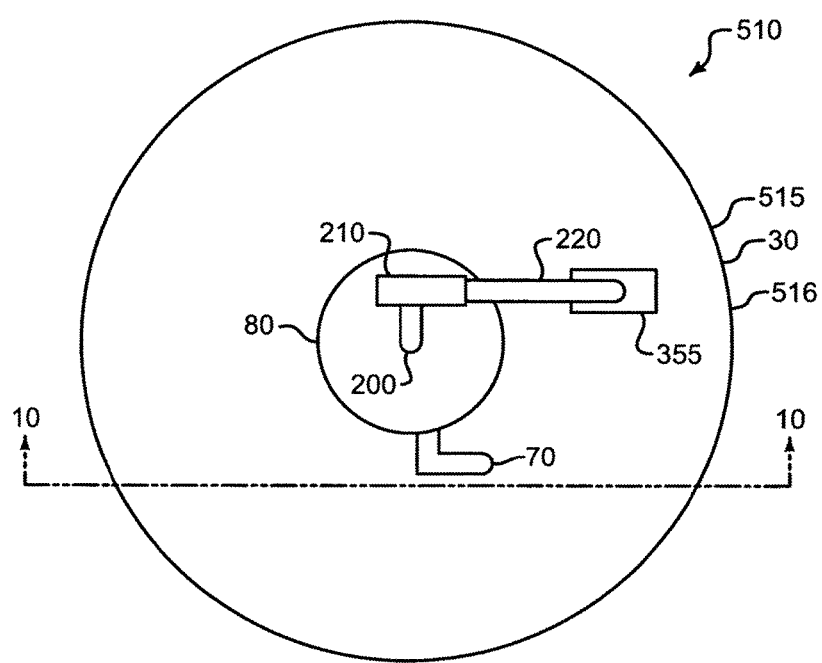
FIG. 9 is a plan view of a ninth embodiment nuclear fission reactor fuel assembly and system.
Figure 10:
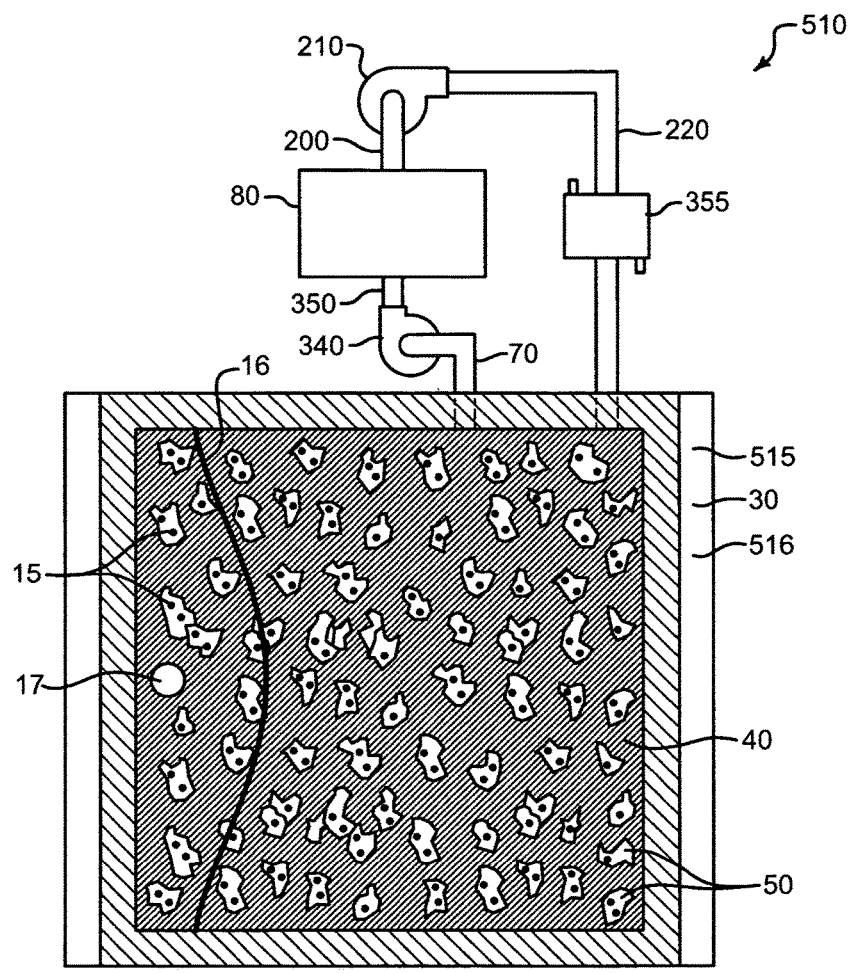
FIG. 10 is a view taken along section line 10-10 of FIG. 9.

Referring to FIGS. 9 and 10, a ninth embodiment nuclear fission reactor fuel assembly and system 510 are there shown. In this ninth embodiment, fuel assembly 510 comprises a generally cylindrical enclosure 515 having enclosure wall 516 for enclosing fuel body 40 therein. The fission product removal fluid, which has the volatile fission product 15 entrained therein, is drawn from fuel body 40 and into fluid control subassembly 80 by pump 340. Heat exchanger 355 may be provided in pipe 220 to remove heat from the fluid. A potential benefit to using the cylindrical enclosure 515 is its utility in shaping fuel profiles. The terminology "fuel profile" is defined herein to mean the geometrical configuration of fissile material, fertile material, and/or neutron moderating material.

Figure 11:
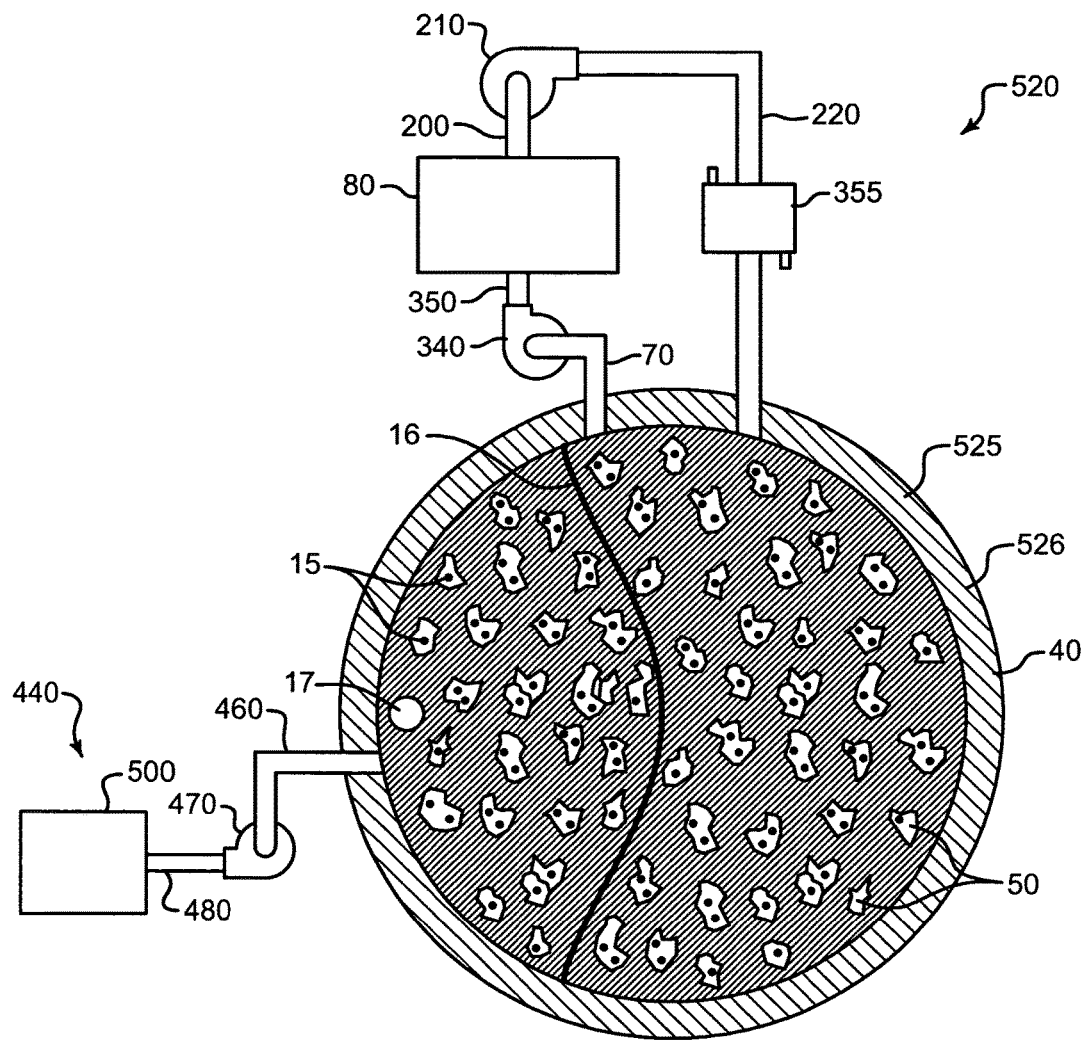
FIG. 11 is a view in partial vertical section of a tenth embodiment nuclear fission reactor fuel assembly and system.

Turning now to FIG. 11, a tenth embodiment nuclear fission reactor fuel assembly and system are there shown, generally referred to as 520. In this tenth embodiment, fuel assembly 520 comprises a generally spherical enclosure 525 having an enclosure wall 526 for enclosing fuel body 40 therein. A potential benefit to using the spherical enclosure 525 is that its spherical shape reduces the amount of cladding or enclosure material 20 required. Another potential benefit to using the spherical enclosure 525 is its utility in shaping fuel profiles.

Figure 12:
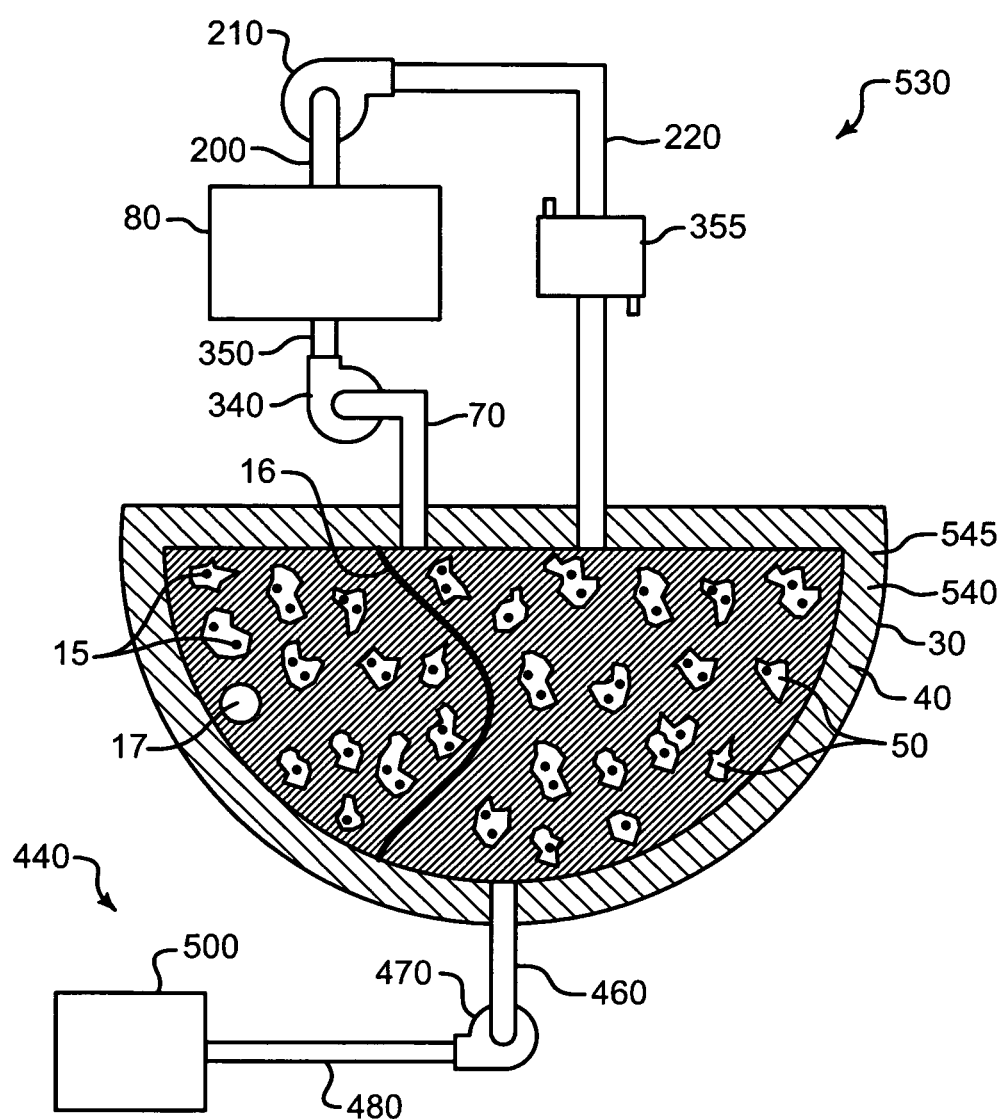
FIG. 12 is a view in partial vertical section of an eleventh embodiment nuclear fission reactor fuel assembly and system.

Referring to FIG. 12, an eleventh embodiment nuclear fission reactor fuel assembly and system are there shown, generally referred to as 530. In this eleventh embodiment, fuel assembly 530 comprises a generally hemi-spherical enclosure 540 having an enclosure wall 545 for enclosing fuel body 40 therein. A potential benefit to using the hemi-spherical enclosure 540 is that it may increase fuel assembly packing densities in well 320 that is defined by vessel 310. Another potential benefit to using the hemi-spherical enclosure 540 is its utility in shaping fuel profiles.

Figure 13:
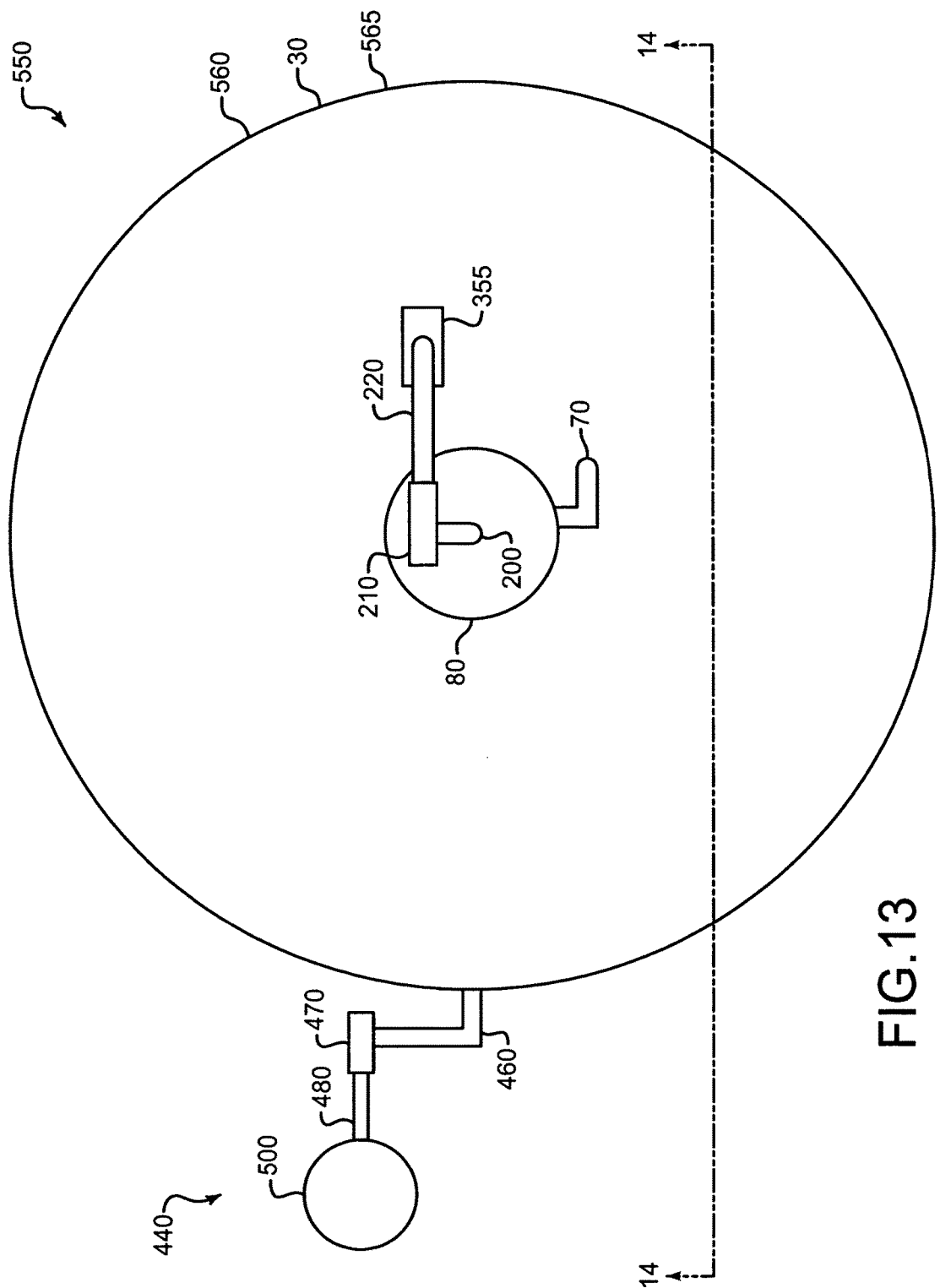
FIG. 13 is a plan view of a twelfth embodiment nuclear fission reactor fuel assembly and system.
Figure 14:
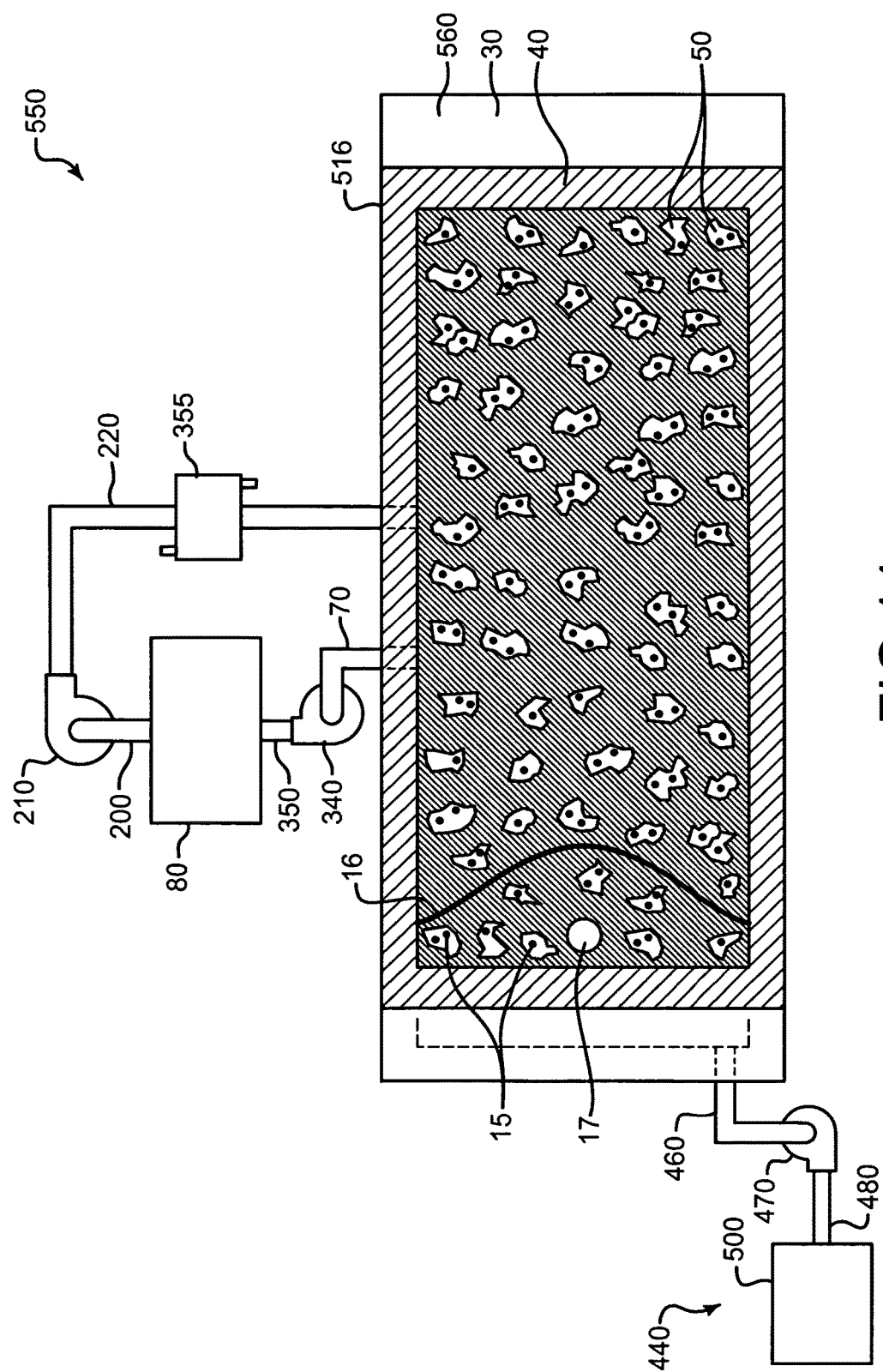
FIG. 14 is a view taken along section line 14-14 of FIG. 13.

Referring to FIGS. 13 and 14, a twelfth embodiment fuel assembly and system are there shown, generally referred to as 550. In this twelfth embodiment, fuel assembly 550 comprises a generally disk-shaped enclosure 560 having an enclosure wall 565 for enclosing fuel body 40 therein. A potential benefit to using the disk-shaped enclosure 560 is its utility in shaping fuel profiles.

Figure 15:
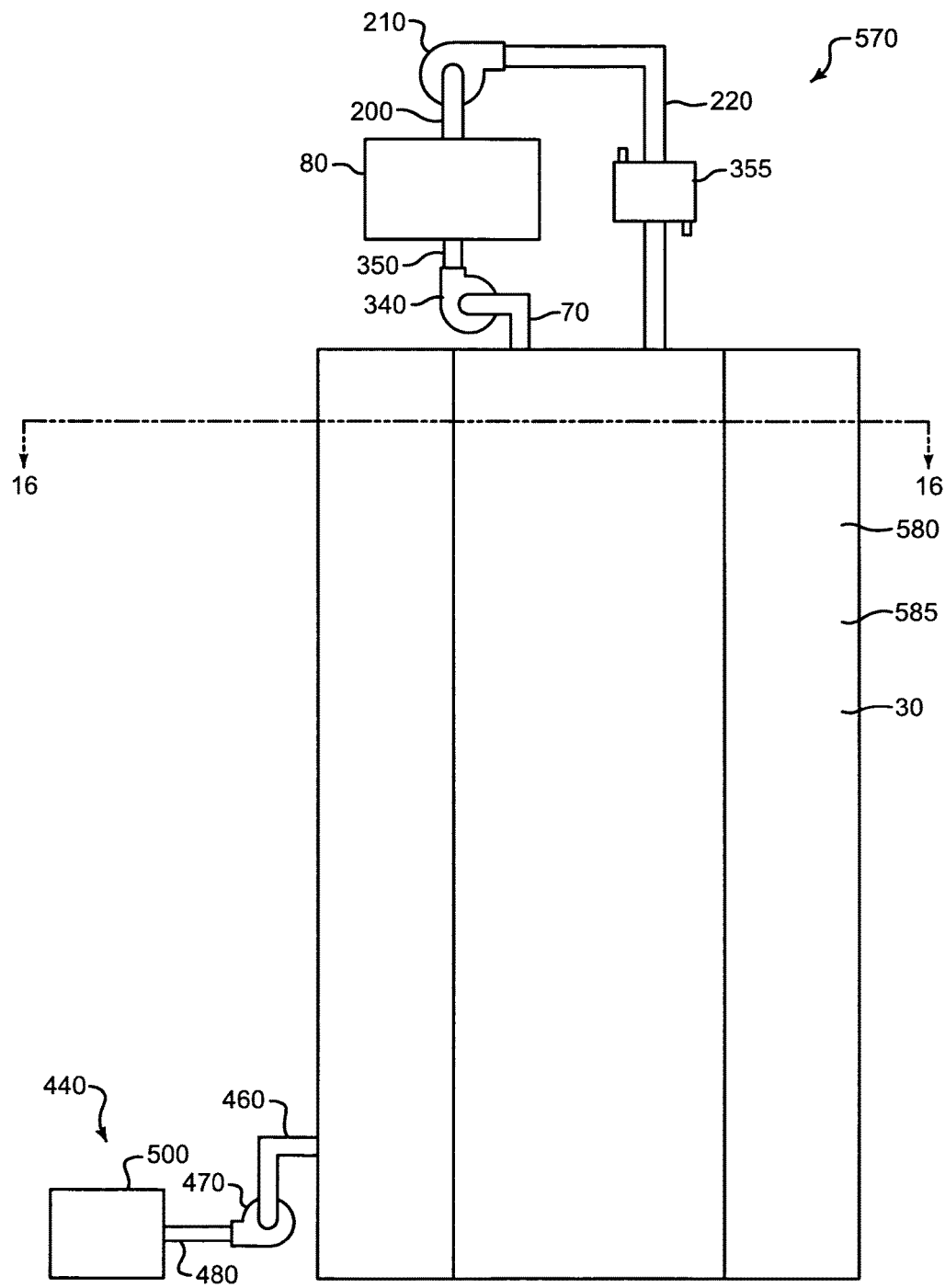
FIG. 15 is a view in partial elevation of a thirteenth embodiment nuclear fission reactor fuel assembly and system.
Figure 16:
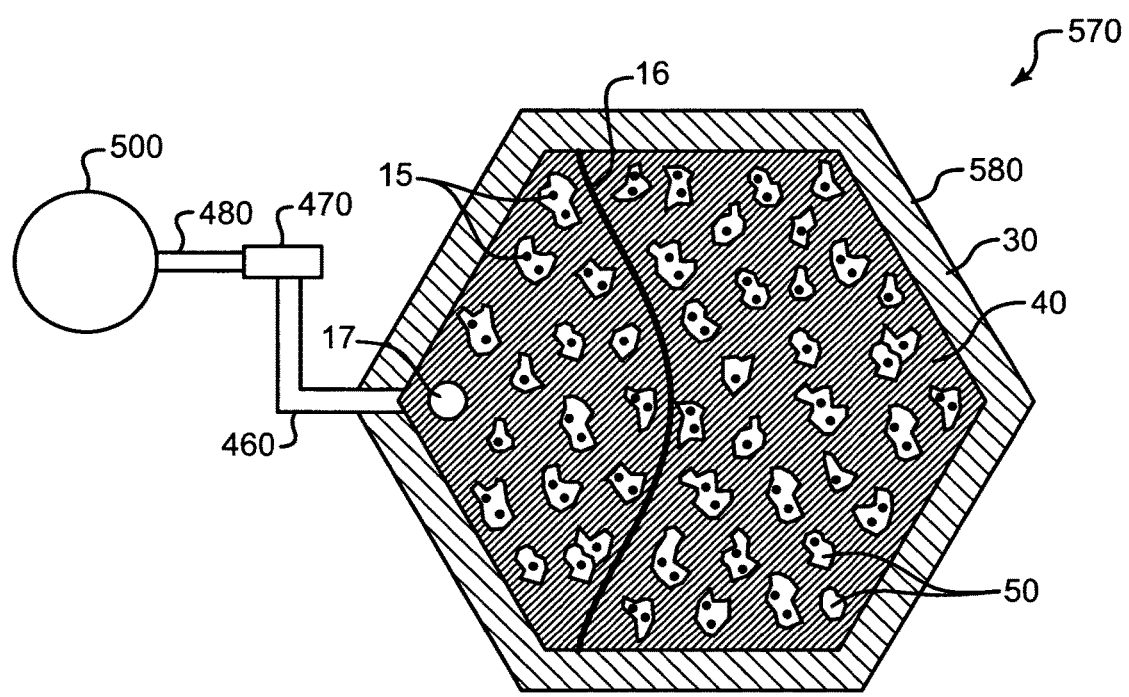
FIG. 16 is a view taken along section line 16-16 of FIG. 15.

Referring to FIGS. 15 and 16, a thirteenth embodiment fuel assembly and system are there shown, generally referred to as 570. In this thirteenth embodiment, fuel assembly 570 comprises a polygonal-shaped (in transverse cross-section) enclosure 580 having an enclosure wall 585 for enclosing fuel body 40 therein. In this regard, enclosure 580 may have a hexagon shape in transverse cross section. A potential benefit attendant to the hexagonally shaped cross section of enclosure 580 is that more fuel assemblies 570 can be packed into well 320 of vessel 310 than otherwise would be allowed by many other geometric shapes for the fuel assembly. Another potential benefit to using the hexagonally shaped enclosure 580 is its utility in shaping fuel profiles.

Figure 17:
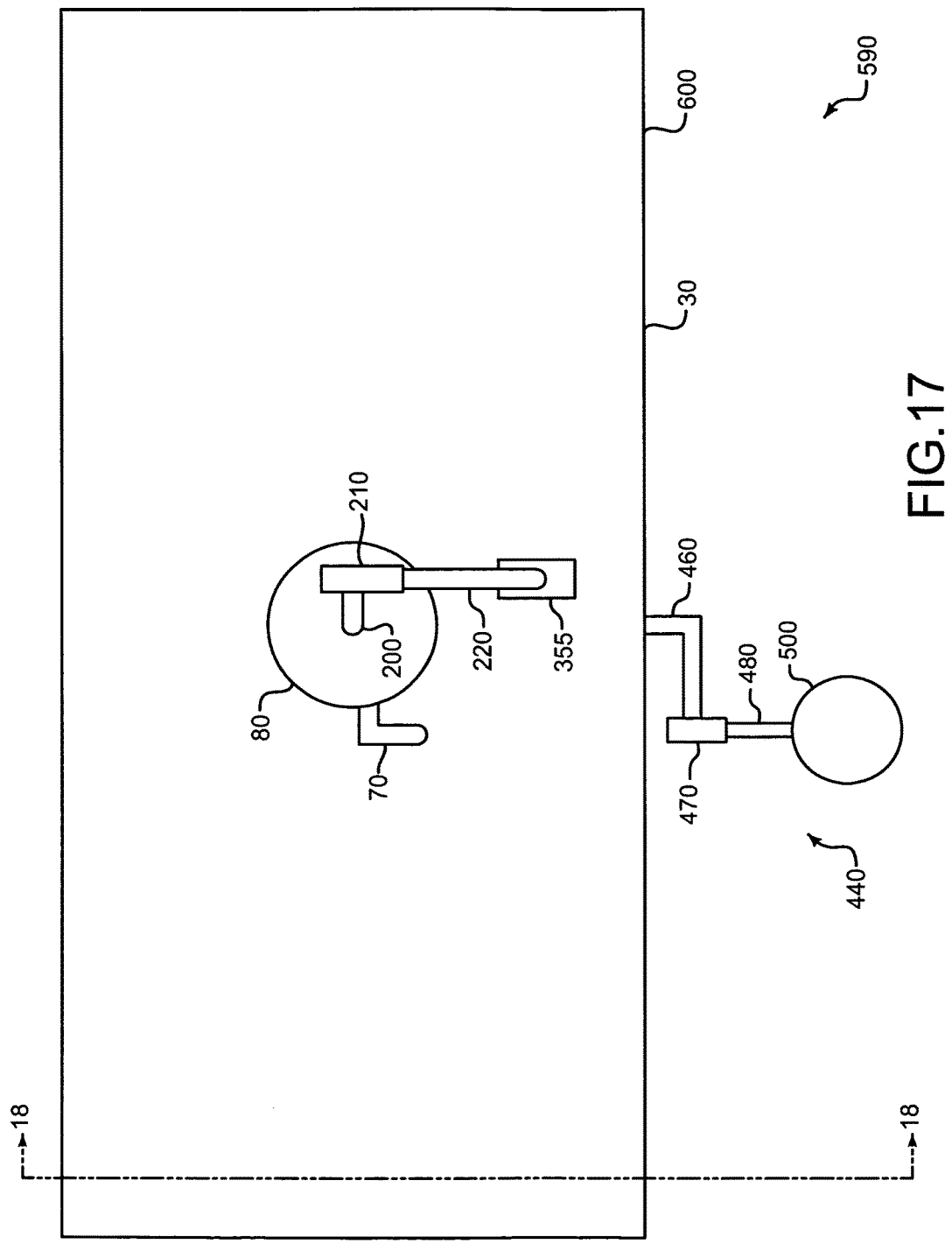
FIG. 17 is a plan view of a fourteenth embodiment nuclear fission reactor fuel assembly and system.
Figure 18:
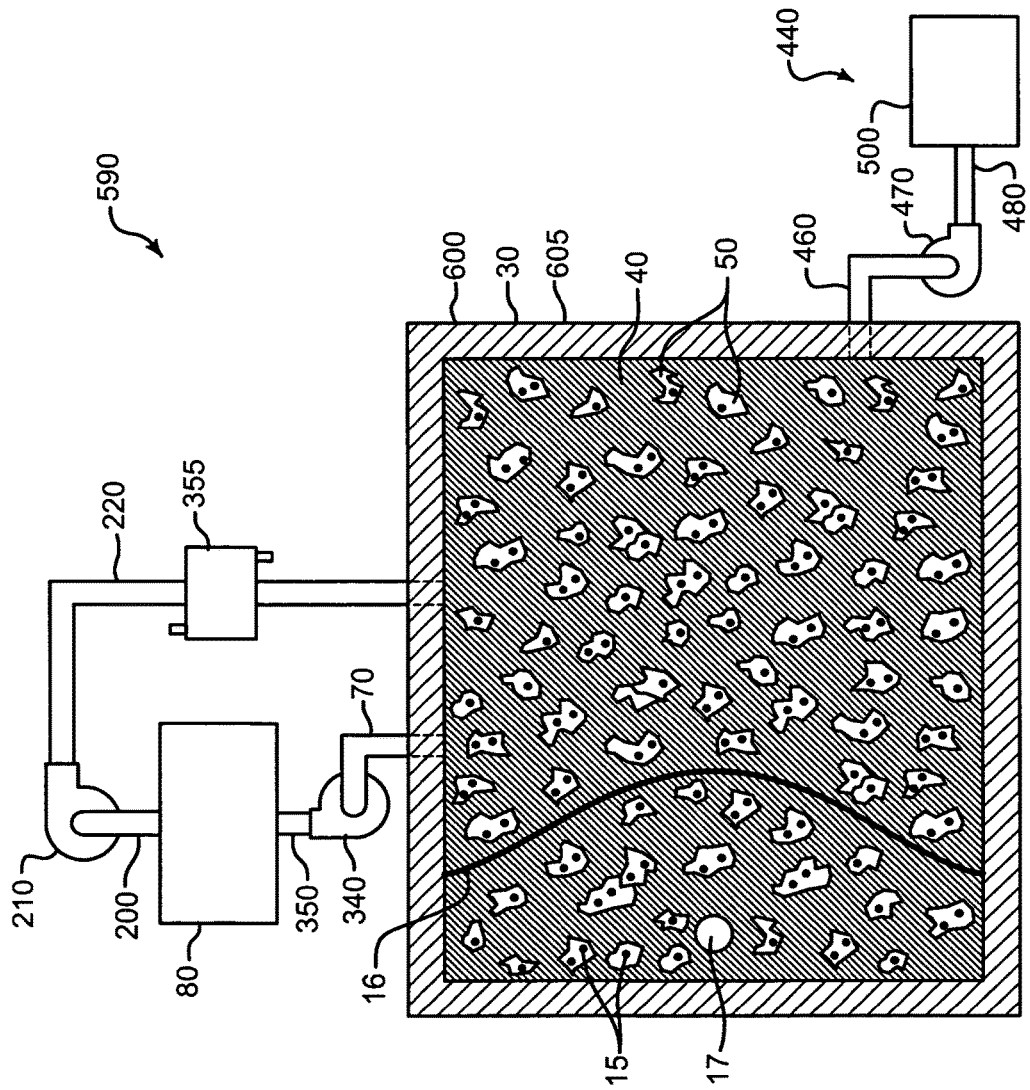
FIG. 18 is a view along section line 18-18 of FIG. 17.

Referring to FIGS. 17 and 18, a fourteenth embodiment fuel assembly and system are there shown, generally referred to as 590. In this fourteenth embodiment, fuel assembly 590 comprises a parallelepiped-shaped enclosure 600 having enclosure walls 605 for enclosing fuel body 40 therein. A potential benefit to using the parallelepiped-shaped enclosure 600 is that it may increase fuel assembly packing densities in well 320 of vessel 310. Another potential benefit to using the parallelepiped-shaped enclosure 600 is its utility in shaping fuel profiles.

Figure 19:
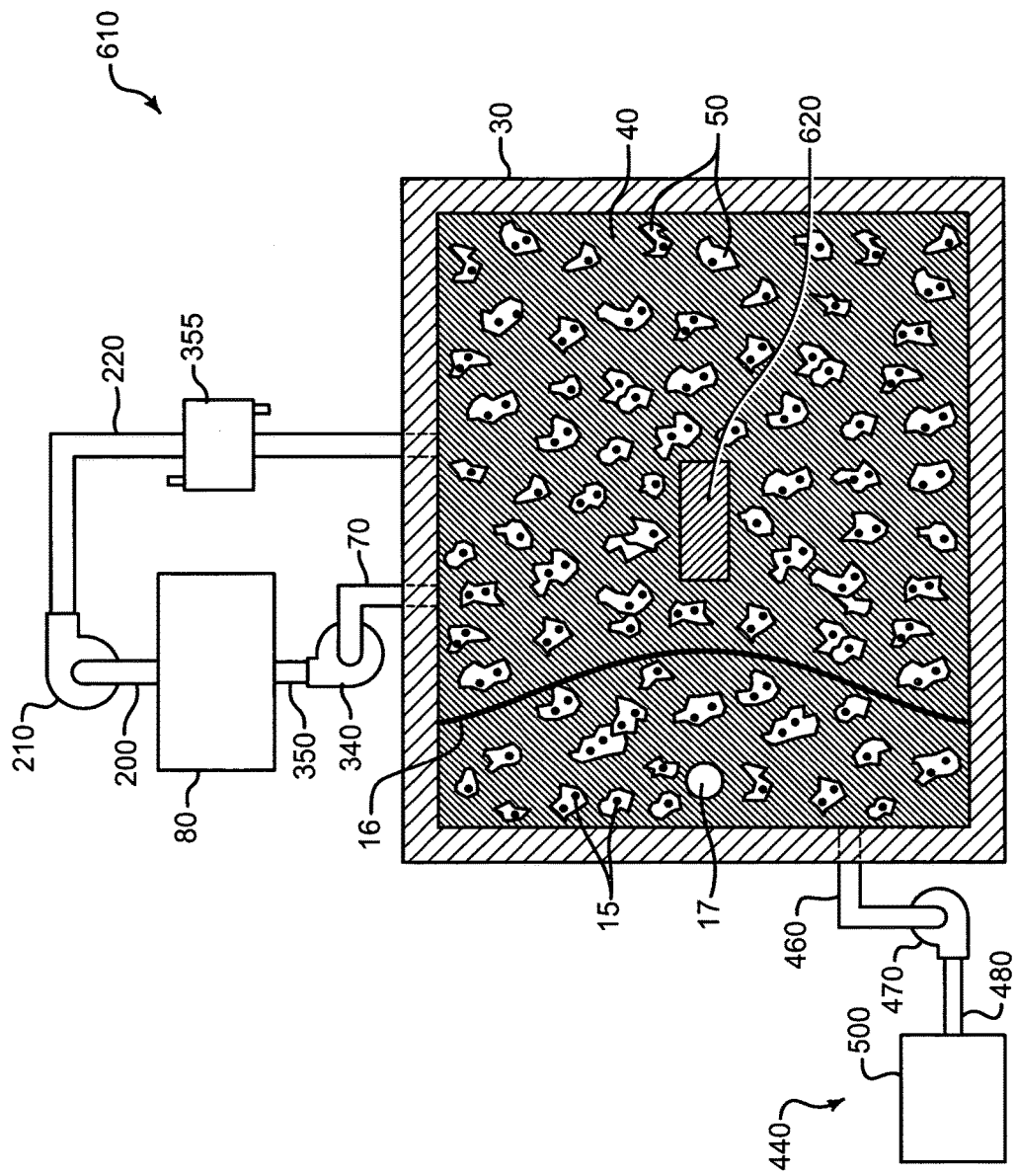
FIG. 19 is a view in partial vertical section of a fifteenth embodiment nuclear fission reactor fuel assembly and system.

Referring to FIG. 19, a fifteenth embodiment nuclear fission reactor fuel assembly and system, generally referred to as 610, is there shown. In this regard, fuel body 40 may include one or more fuel pellets 620 embedded therein. Fuel pellet 620 may function as a higher density fuel component to increase the effective density of fuel body 40.

Figure 20:
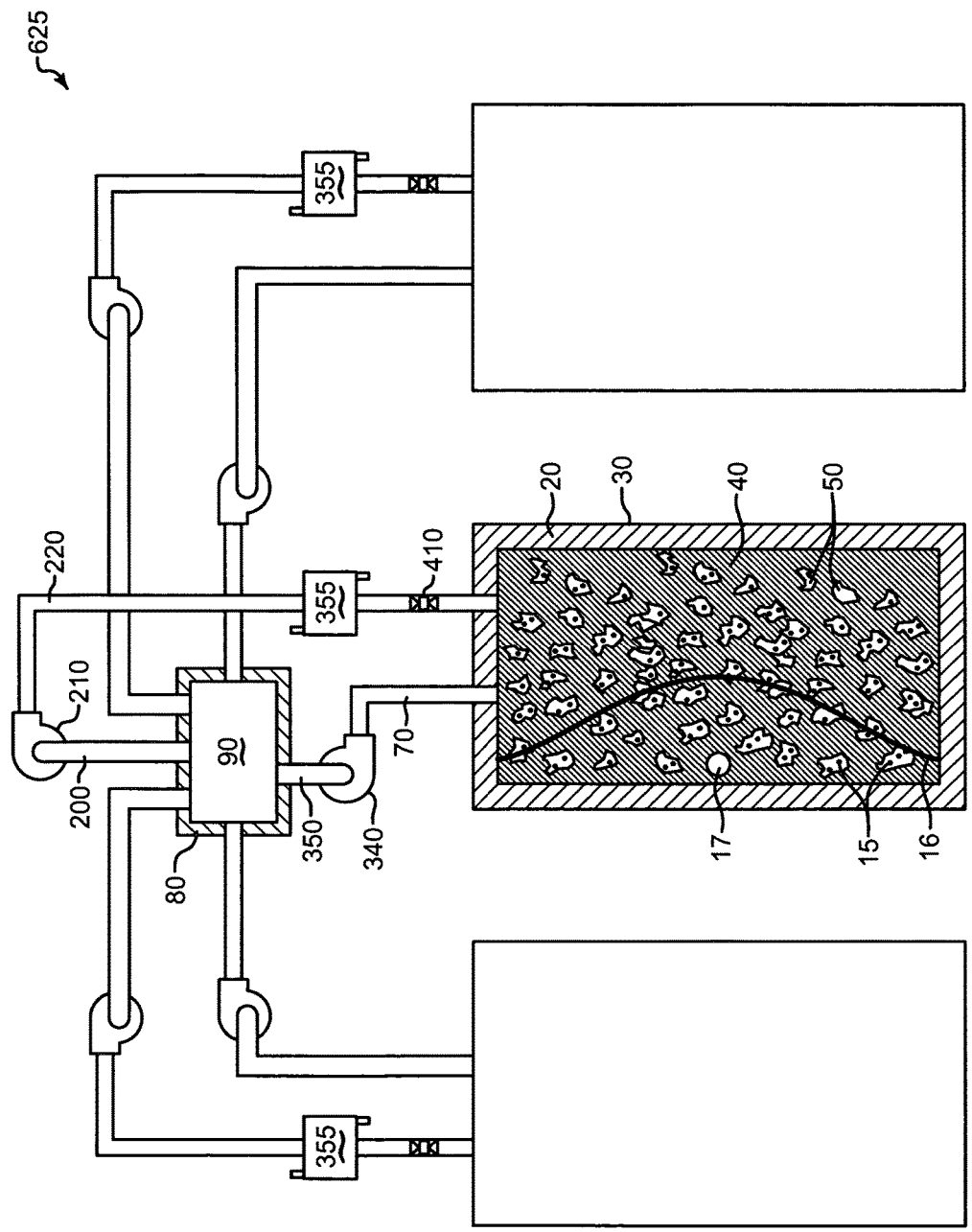
FIG. 20 is a view in partial vertical section of a sixteenth embodiment nuclear fission reactor fuel assembly and system.

Referring to FIG. 20, a sixteenth embodiment nuclear fission rector fuel assembly and system, generally referred to as 625, is there shown. In this regard, fluid control subassembly 80 is coupled to a plurality of enclosures 20.

Illustrative Methods

Illustrative methods associated with exemplary embodiments of nuclear fission reactor fuel assemblies and systems 10, 100, 190, 230, 290, 420, 430, 510, 520, 530, 550, 570, 590, 610, and 625 will now be described.

Figure 21A:
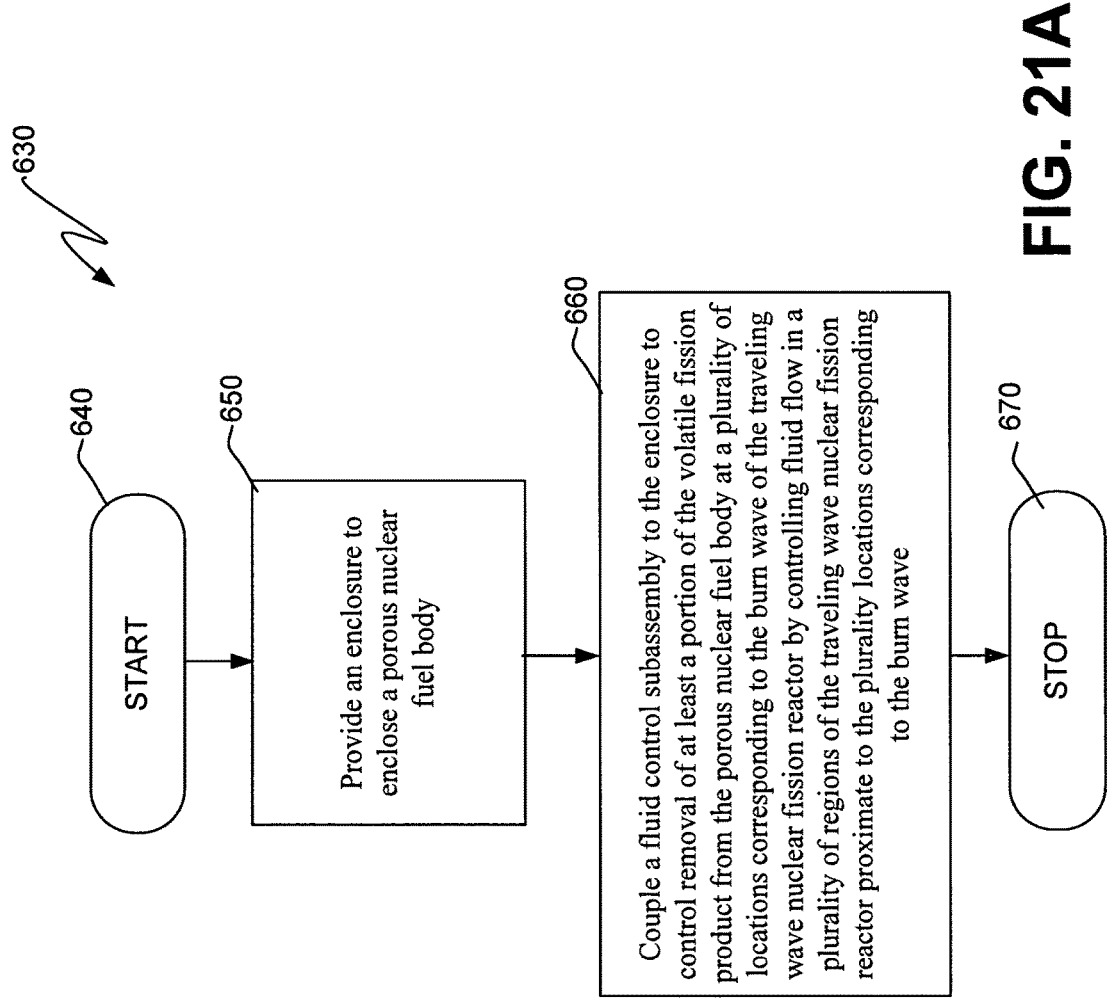
FIGS. 21A-21CQ are flowcharts of illustrative methods of assembling a nuclear fission reactor fuel assembly configured for controlled removal of a volatile fission product and heat released by a burn wave in a traveling wave nuclear fission reactor.
Figure 21B:
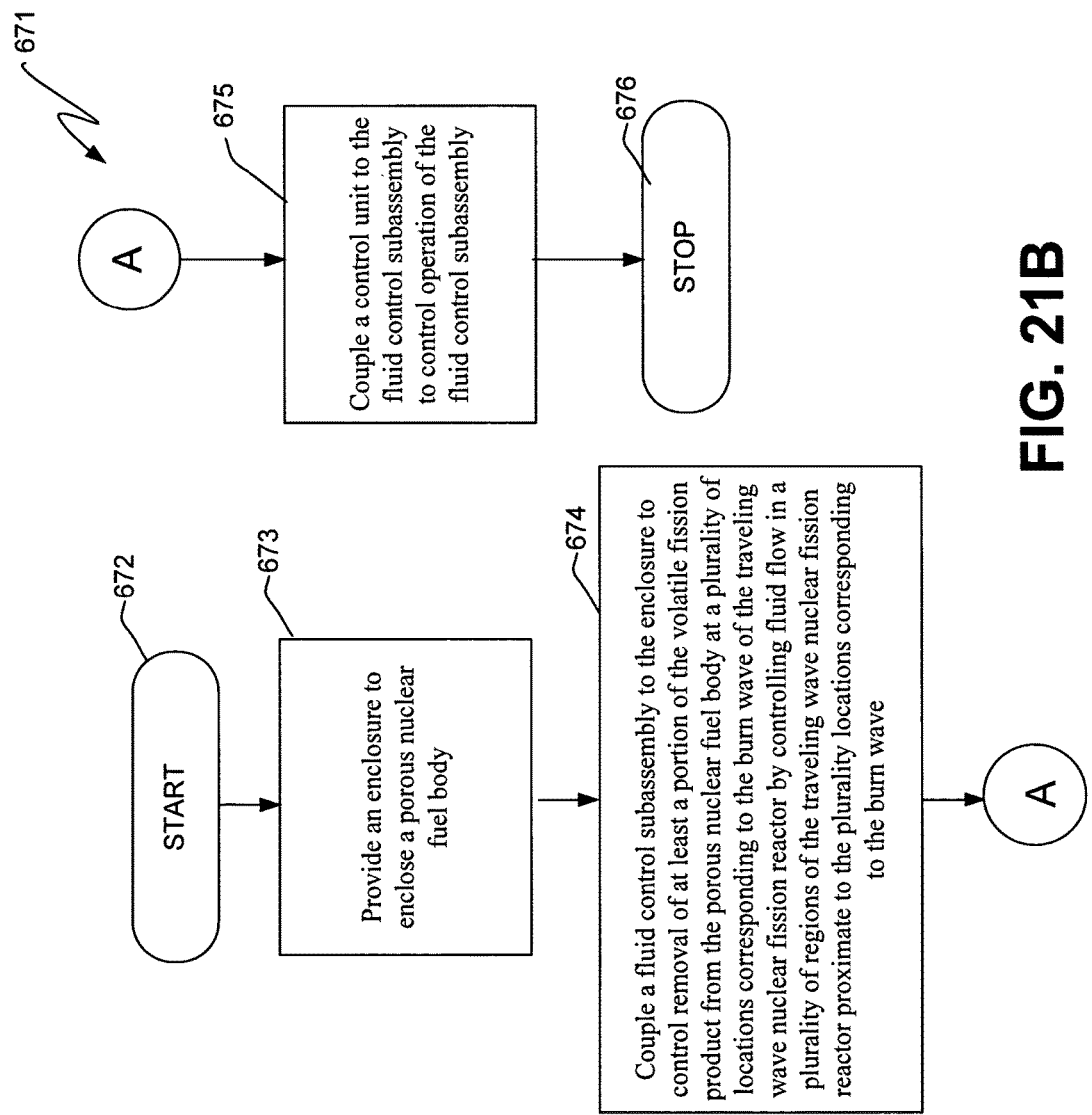
Figure 21C:
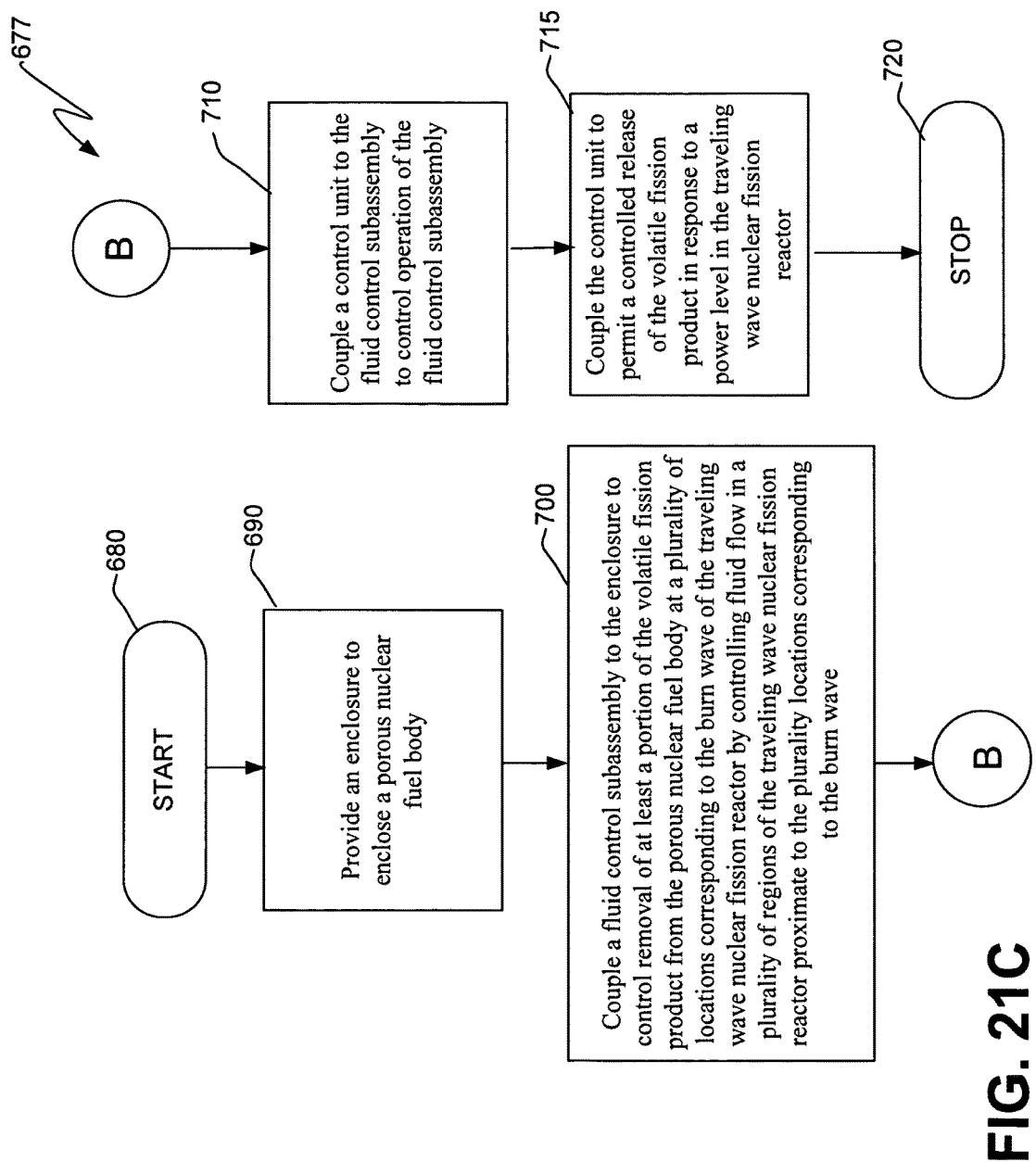

Referring to FIGS. 21A-21CQ, illustrative methods are provided for assembling the nuclear fission reactor fuel assembly and system.

Referring now to FIG. 21A, an illustrative method 630 for assembling the nuclear fission reactor fuel assembly starts at a block 640. At a block 650, an enclosure is provided that encloses a porous nuclear fuel body. At a block 660, a fluid control subassembly is coupled to the enclosure 20 for removal of at least a portion of a volatile fission product at locations corresponding to a burn wave. The fluid control subassembly controls fluid flow in regions of the reactor proximate to locations corresponding to the burn wave. The method 630 stops at a block 670.

Referring to FIG. 21B, an illustrative method 671 for assembling the nuclear fission reactor fuel assembly starts at a block 672. At a block 673, an enclosure is provided that encloses a nuclear fuel body. At a block 674, a fluid control subassembly is coupled to the enclosure for removal of at least a portion of a volatile fission product as previously mentioned. The fluid control subassembly controls fluid flow in regions of the reactor proximate locations corresponding to a burn wave. At a block 675, a control unit is coupled to the fluid control subassembly to control operation of the fluid control subassembly. The method 671 stops at a block 676.

Referring to FIG. 21C, an illustrative method 677 for assembling the nuclear fission reactor fuel assembly starts at a block 680. At a block 690, an enclosure is provided that encloses a nuclear fuel body in the manner previously mentioned. At a block 700, a fluid control subassembly is coupled to the enclosure for removal of at least a portion of a volatile fission product as previously mentioned. The fluid control subassembly controls fluid flow in regions of the reactor proximate locations corresponding to a burn wave. At a block 710, a control unit is coupled to the fluid control subassembly to control operation of the fluid control subassembly. At a block 715, the control unit is coupled to permit a controlled release of the volatile fission product in response to a power level in the traveling wave nuclear fission reactor. The method 677 stops at a block 720.

Figure 21D:
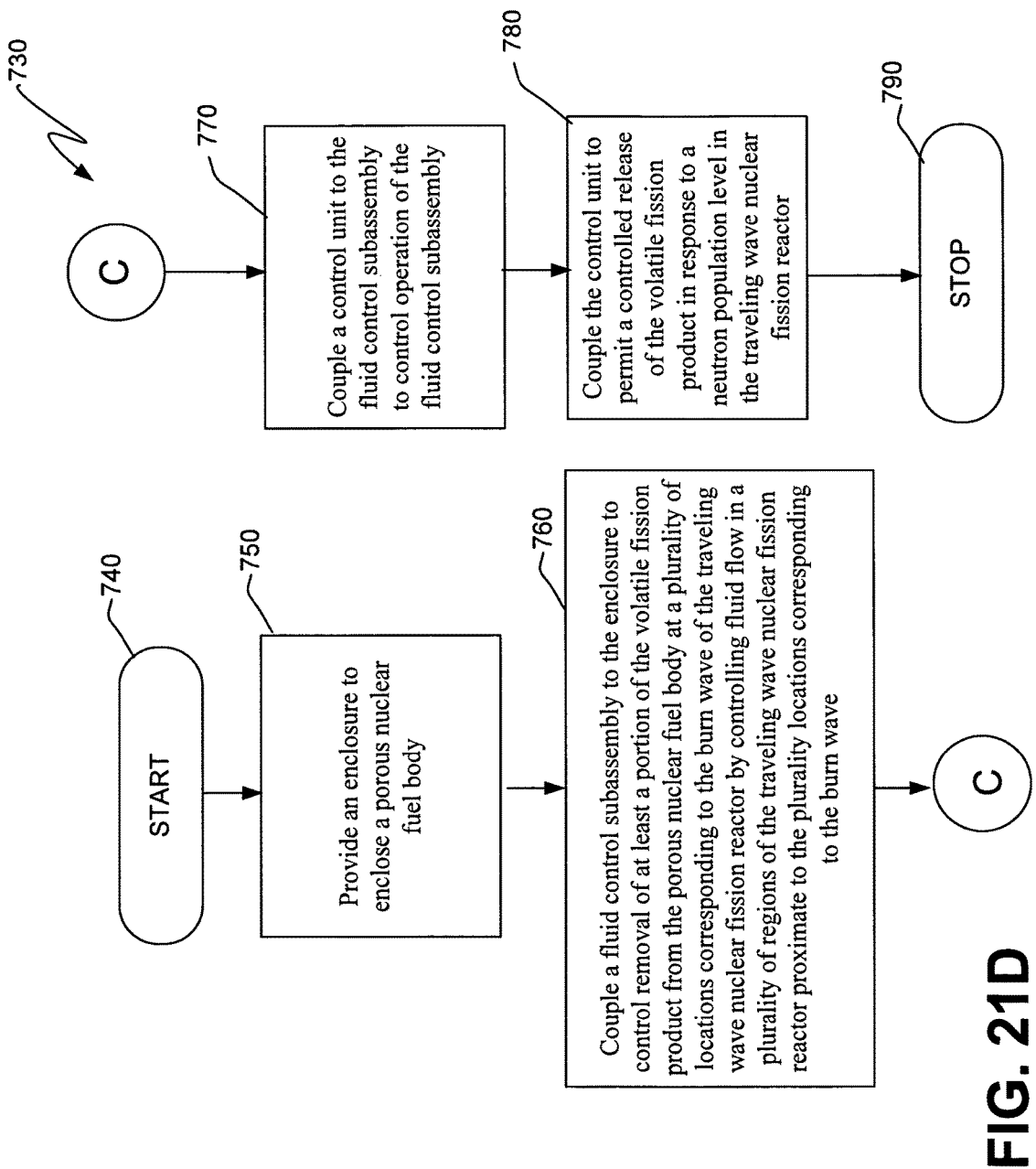

Referring to FIG. 21D, an illustrative method 730 for assembling the nuclear fission reactor fuel assembly starts at a block 740. At a block 750, an enclosure is provided that encloses a nuclear fuel body in the manner previously mentioned. At a block 760, a fluid control subassembly is coupled to the enclosure for removal of at least a portion of a volatile fission product as previously mentioned. The fluid control subassembly controls fluid flow in regions of the reactor proximate locations corresponding to a burn wave. At a block 770, a control unit is coupled to the fluid control subassembly to control operation of the fluid control subassembly. At a block 780, the control unit is coupled to permit a controlled release of the volatile fission product in response to neutron population level in the traveling wave nuclear fission reactor. The method 730 stops at a block 790.

Figure 21E:
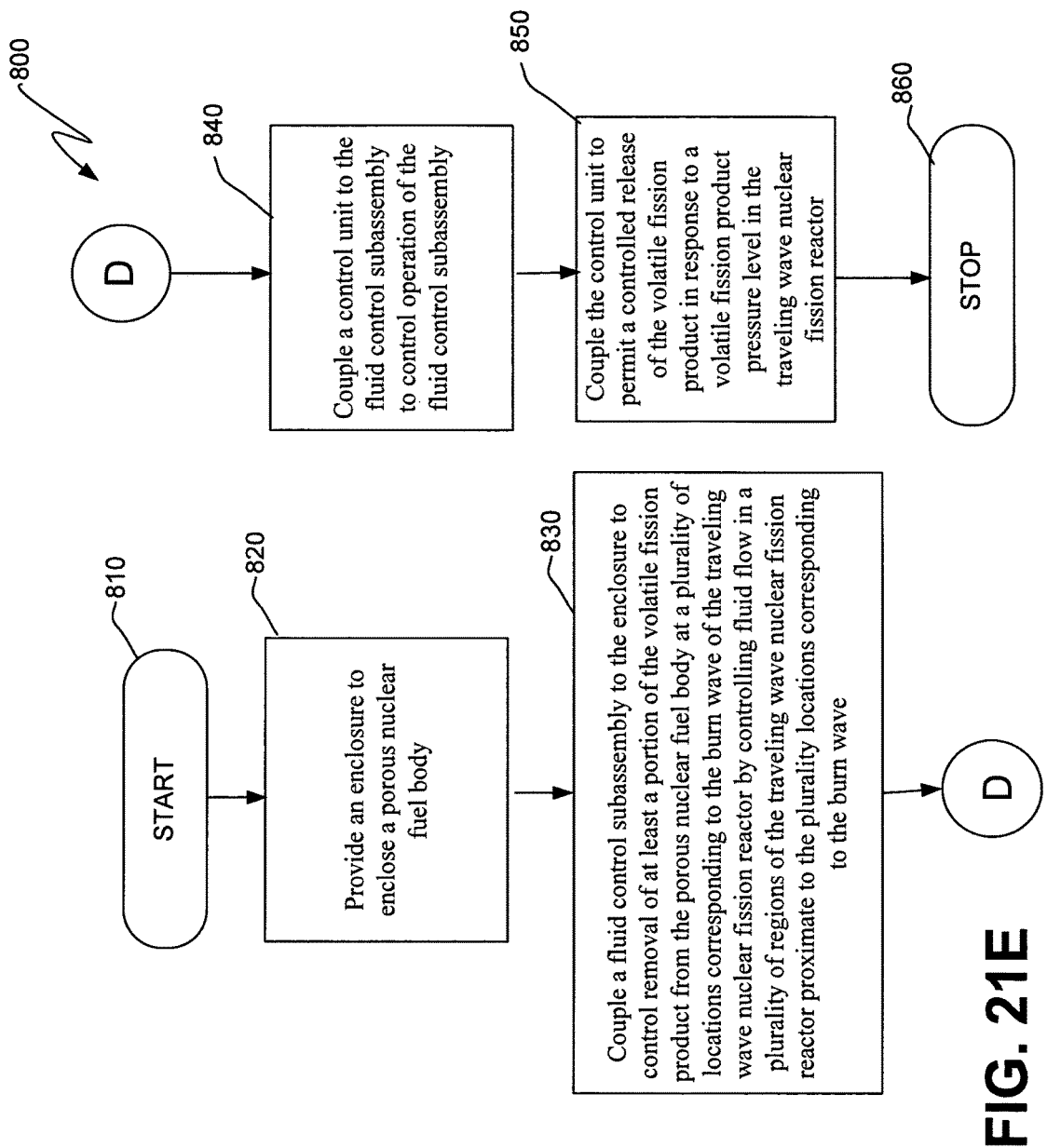

Referring to FIG. 21E, an illustrative method 800 for assembling the nuclear fission reactor fuel assembly starts at a block 810. At a block 820, an enclosure is provided that encloses a nuclear fuel body in the manner previously mentioned. At a block 830, a fluid control subassembly is coupled to the enclosure for removal of at least a portion of a volatile fission product as previously mentioned. The fluid control subassembly controls fluid flow in regions of the reactor proximate locations corresponding to a burn wave. At a block 840, a control unit is coupled to the fluid control subassembly to control operation of the fluid control subassembly. At a block 850, the control unit is coupled to permit a controlled release of the volatile fission product in response to a volatile fission product pressure level in the traveling wave nuclear fission reactor. The method 800 stops at a block 860.

Figure 21F:
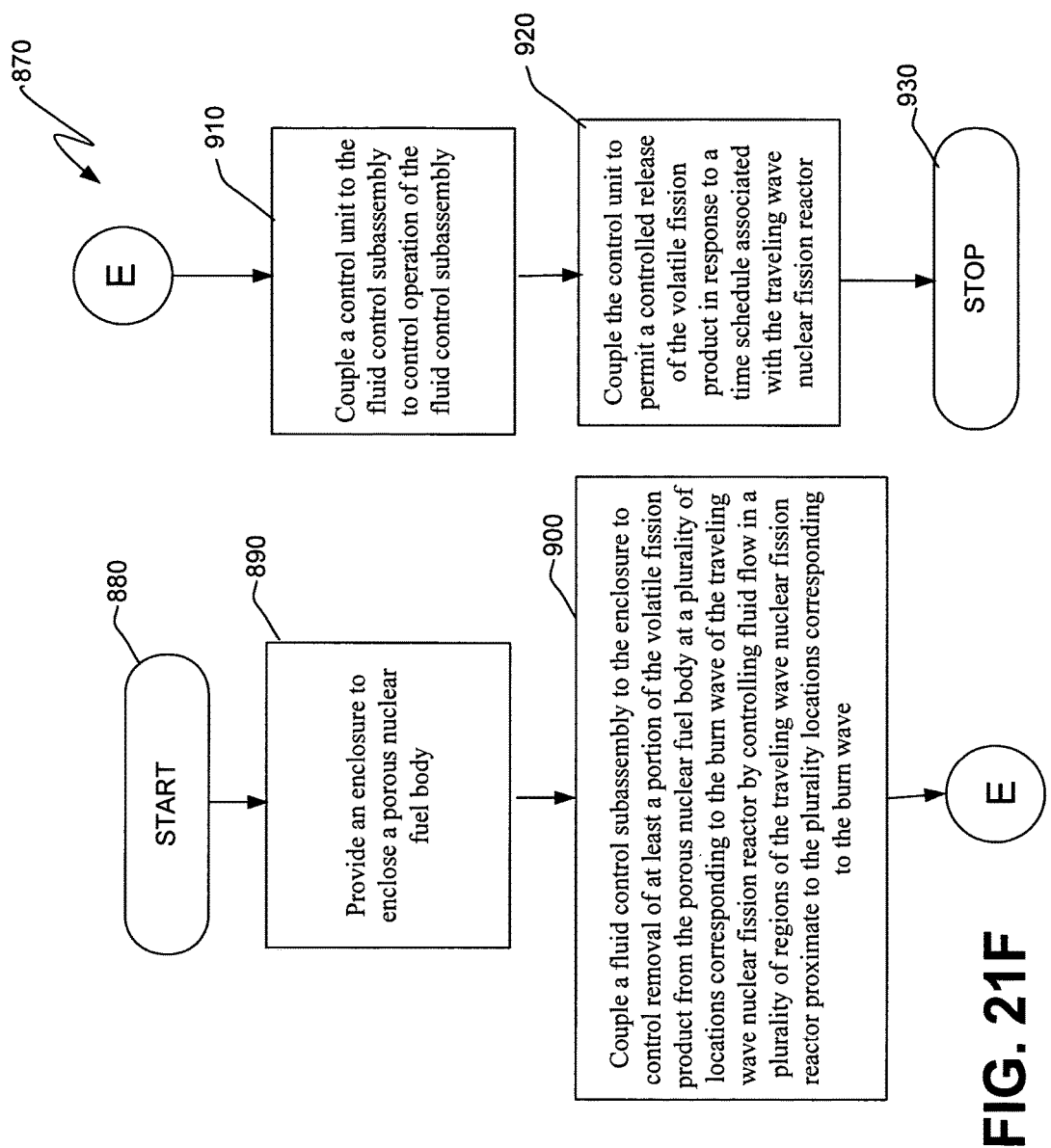

Referring to FIG. 21F, an illustrative method 870 for assembling the nuclear fission reactor fuel assembly starts at a block 880. At a block 890, an enclosure is provided that encloses a nuclear fuel body in the manner previously mentioned. At a block 900, a fluid control subassembly is coupled to the enclosure for removal of at least a portion of a volatile fission product as previously mentioned. The fluid control subassembly controls fluid flow in regions of the reactor proximate locations corresponding to a burn wave. At a block 910, a control unit is coupled to the fluid control subassembly to control operation of the fluid control subassembly. At a block 920, the control unit is coupled to permit a controlled release of the volatile fission product in response to a time schedule associated with the traveling wave nuclear fission reactor. The method 870 stops at a block 930.

Figure 21G:
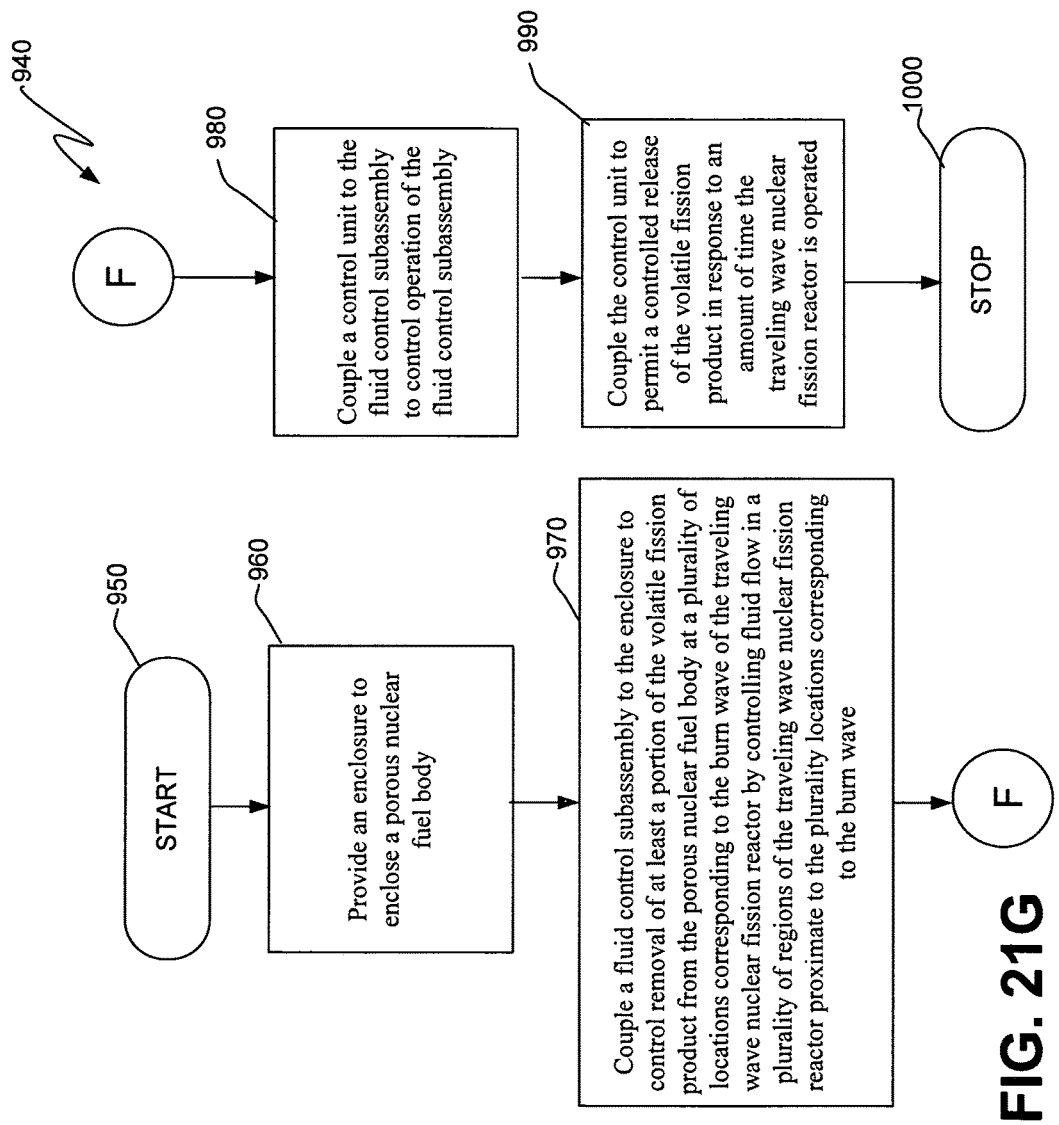

Referring to FIG. 21G, an illustrative method 940 for assembling the nuclear fission reactor fuel assembly starts at a block 950. At a block 960, an enclosure is provided that encloses a nuclear fuel body in the manner previously mentioned. At a block 970, a fluid control subassembly is coupled to the enclosure for removal of at least a portion of a volatile fission product as previously mentioned. The fluid control subassembly controls fluid flow in regions of the reactor proximate locations corresponding to a burn wave. At a block 980, a control unit is coupled to the fluid control subassembly to control operation of the fluid control subassembly. At a block 990, the control unit is coupled to permit a controlled release of the volatile fission product in response to an amount of time the nuclear fission reactor is operated. The method 940 stops at a block 1000.

Figure 21H:
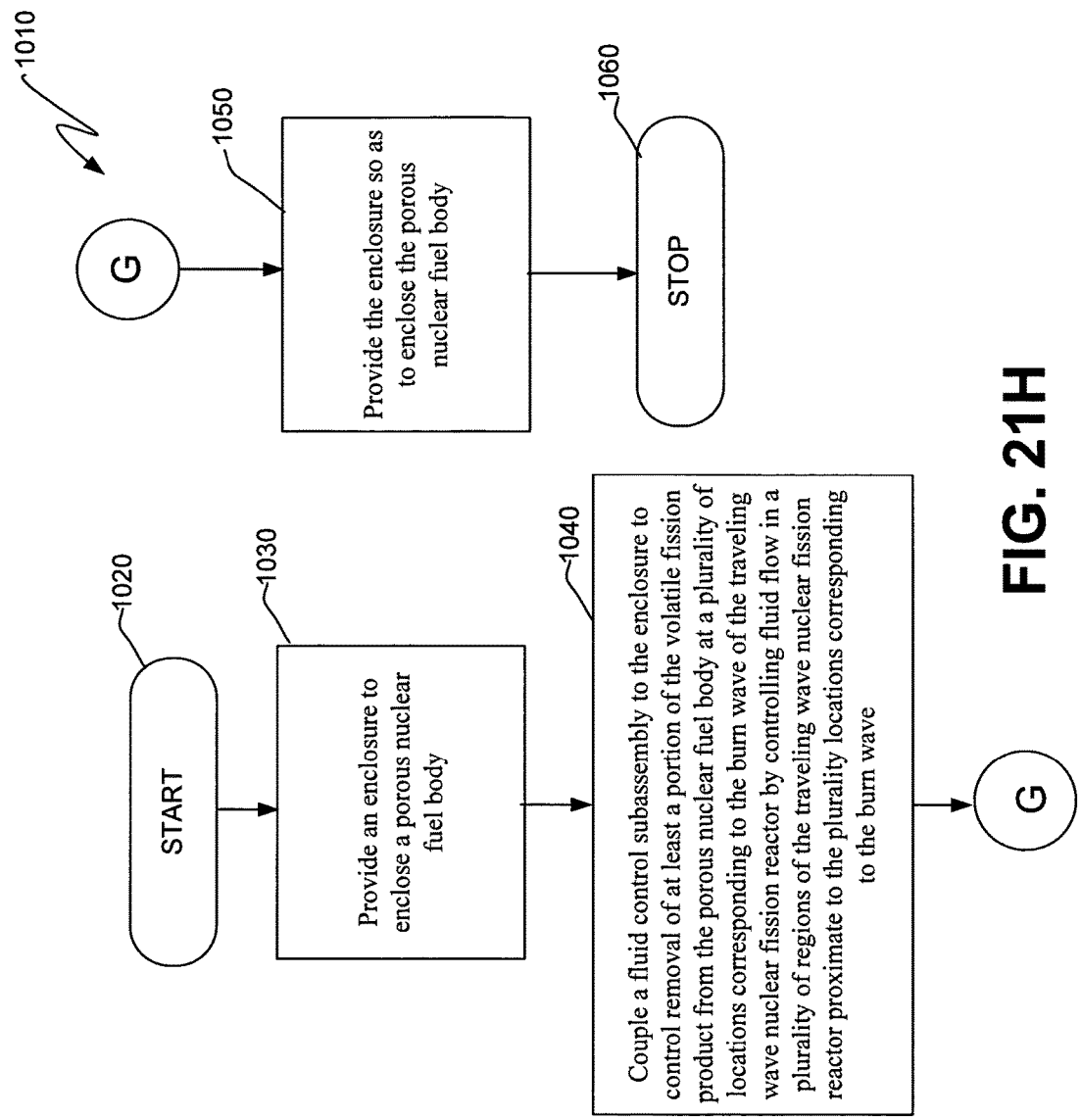

Referring to FIG. 21H, an illustrative method 1010 for assembling the nuclear fission reactor fuel assembly starts at a block 1020. At a block 1030, an enclosure is provided that encloses a nuclear fuel body in the manner previously mentioned. At a block 1040, a fluid control subassembly is coupled to the enclosure for removal of at least a portion of a volatile fission product as previously mentioned. The fluid control subassembly controls fluid flow in regions of the reactor proximate locations corresponding to a burn wave. At a block 1050, the enclosure is provided so as to enclose the nuclear fuel body. The method 1010 stops at a block 1060.

Figure 21I:
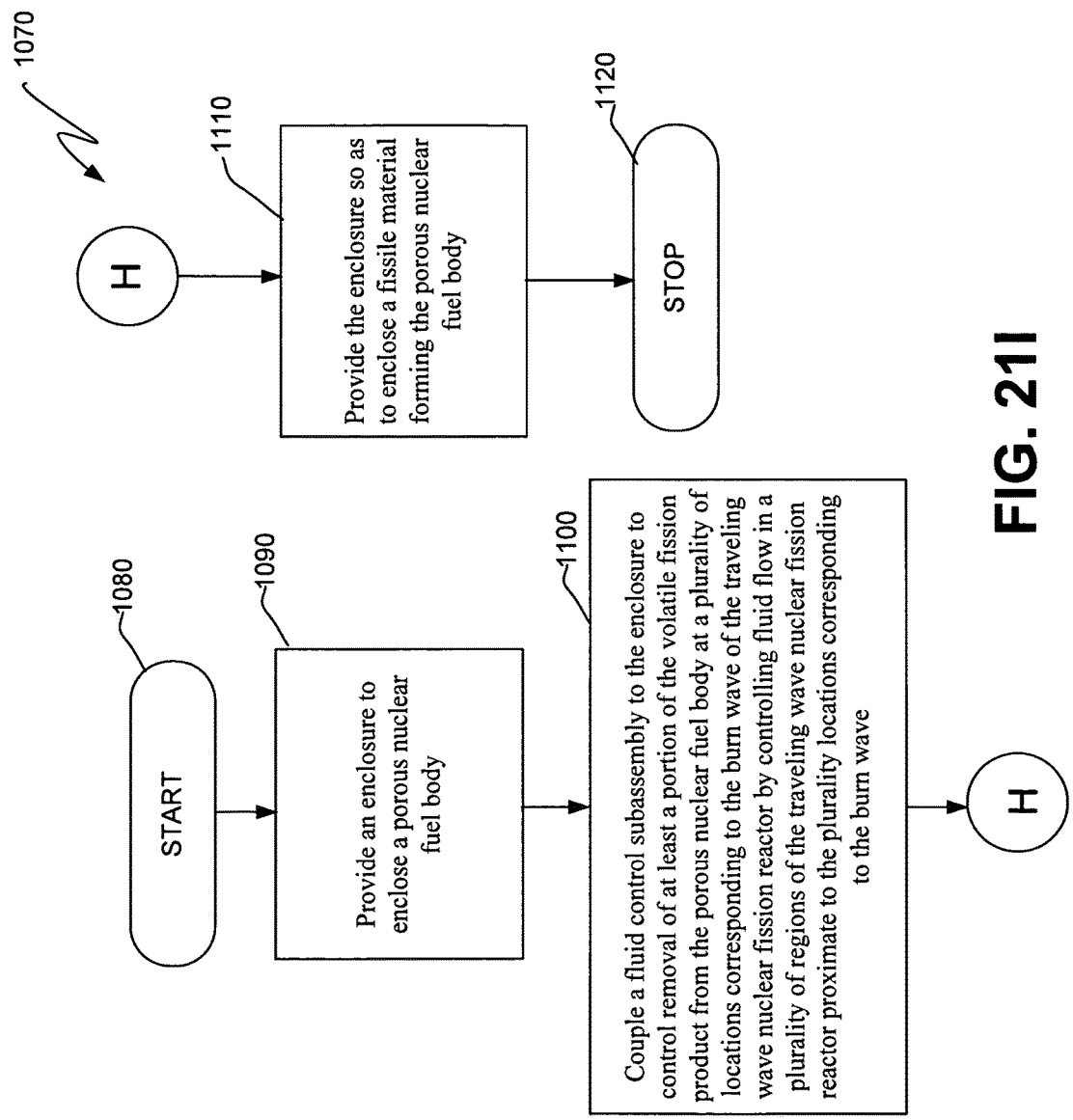

Referring to FIG. 21I, an illustrative method 1070 for assembling the nuclear fission reactor fuel assembly starts at a block 1080. At a block 1090, an enclosure is provided that encloses a nuclear fuel body in the manner previously mentioned. At a block 1100, a fluid control subassembly is coupled to the enclosure for removal of at least a portion of a volatile fission product as previously mentioned. The fluid control subassembly controls fluid flow in regions of the reactor proximate locations corresponding to a burn wave. At a block 1110, the enclosure is provided so as to enclose a fissile material forming the nuclear fuel body. The method 1070 stops at a block 1120.

Figure 21J:
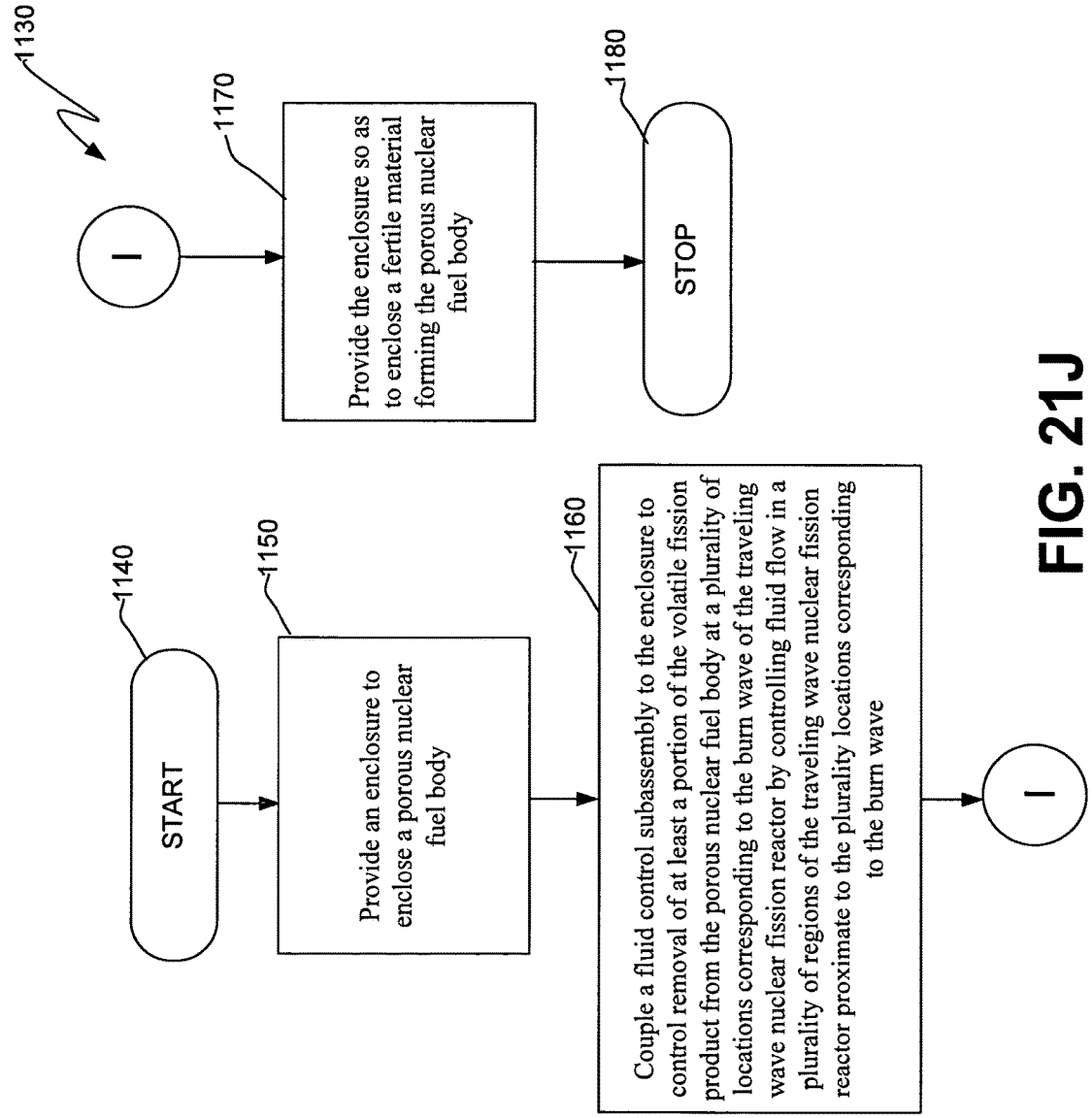

Referring to FIG. 21J, an illustrative method 1130 for assembling the nuclear fission reactor fuel assembly starts at a block 1140. At a block 1150, an enclosure is provided that encloses a nuclear fuel body in the manner previously mentioned. At a block 1160, a fluid control subassembly is coupled to the enclosure for removal of at least a portion of a volatile fission product as previously mentioned. The fluid control subassembly controls fluid flow in regions of the reactor proximate locations corresponding to a burn wave. At a block 1170, the enclosure is provided so as to enclose a fissile material forming the nuclear fuel body. The method 1130 stops at a block 1180.

Figure 21K:
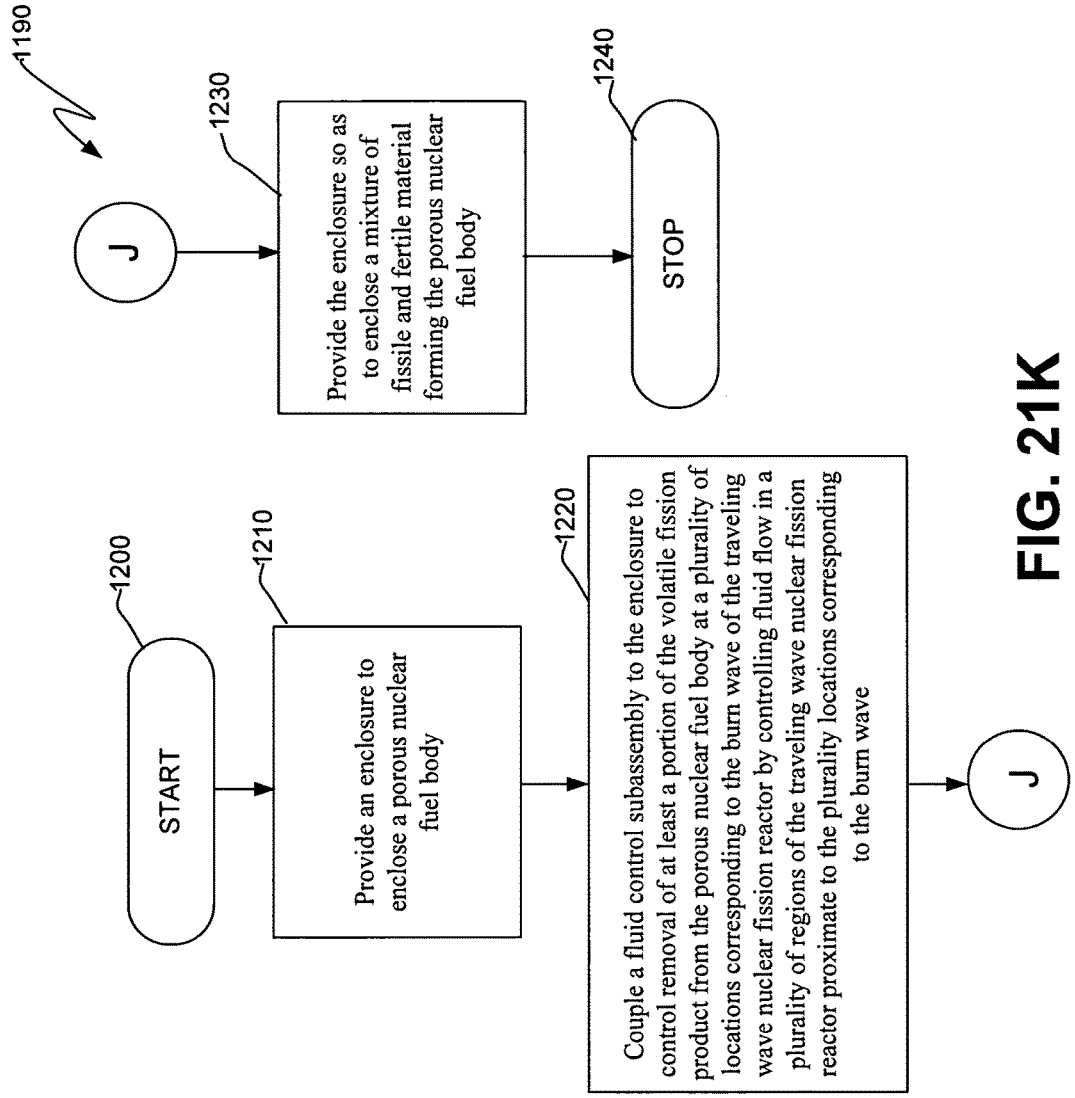

Referring to FIG. 21K, an illustrative method 1190 for assembling the nuclear fission reactor fuel assembly starts at a block 1200. At a block 1210, an enclosure is provided that encloses a nuclear fuel body in the manner previously mentioned. At a block 1220, a fluid control subassembly is coupled to the enclosure for removal of at least a portion of a volatile fission product as previously mentioned. The fluid control subassembly controls fluid flow in regions of the reactor proximate locations corresponding to a burn wave. At a block 1230, the enclosure is provided so as to enclose a fissile and fertile material forming the nuclear fuel body. The method 1190 stops at a block 1240.

Figure 21L:
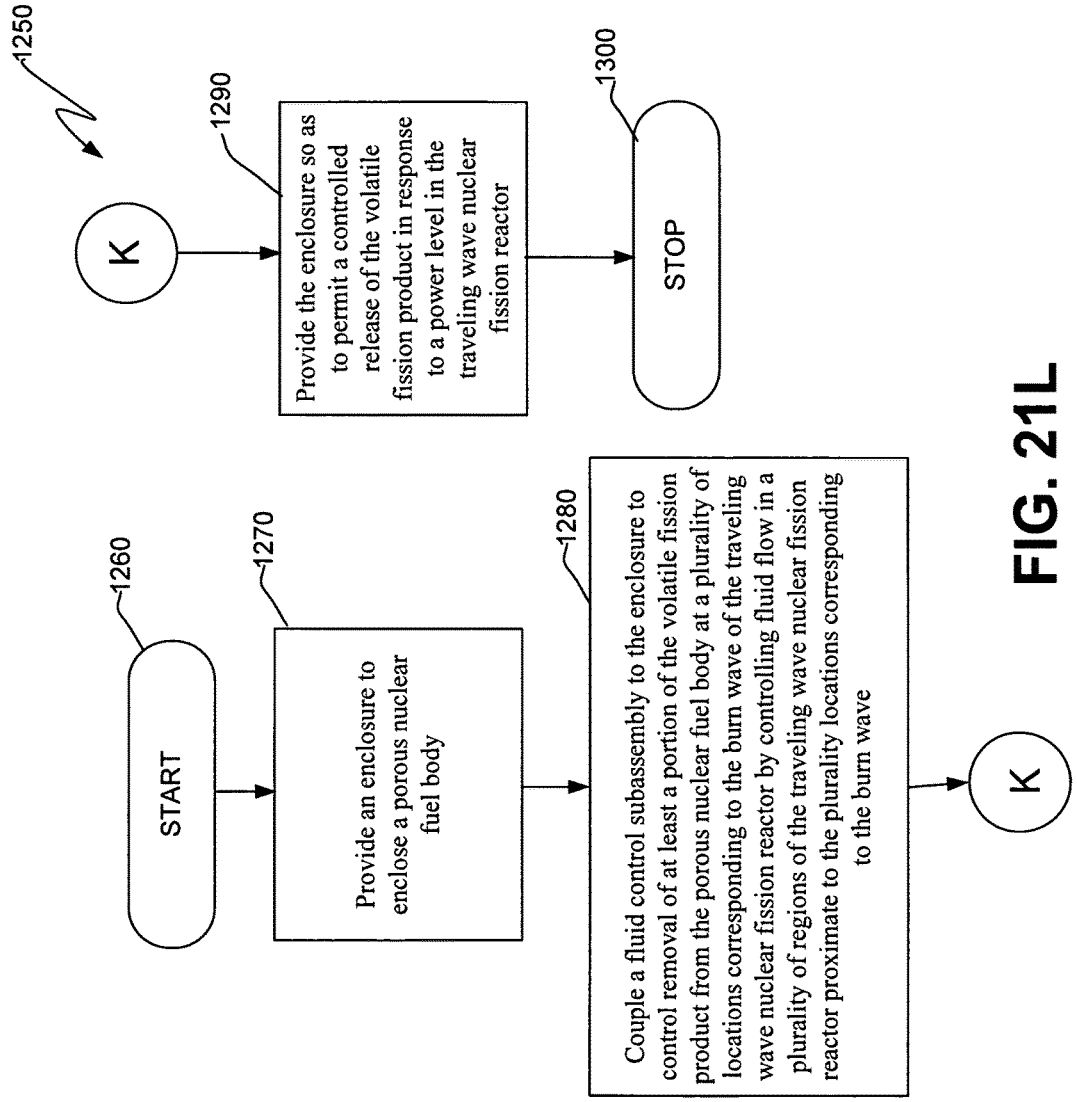

Referring to FIG. 21L, an illustrative method 1250 for assembling the nuclear fission reactor fuel assembly starts at a block 1260. At a block 1270, an enclosure is provided that encloses a nuclear fuel body in the manner previously mentioned. At a block 1280, a fluid control subassembly is coupled to the enclosure for removal of at least a portion of a volatile fission product as previously mentioned. The fluid control subassembly controls fluid flow in regions of the reactor proximate locations corresponding to a burn wave. At a block 1290, the enclosure is provided so as to permit a controlled release of the volatile fission product in response to a power level in the traveling wave nuclear fission reactor. The method 1250 stops at a block 1300.

Figure 21M:
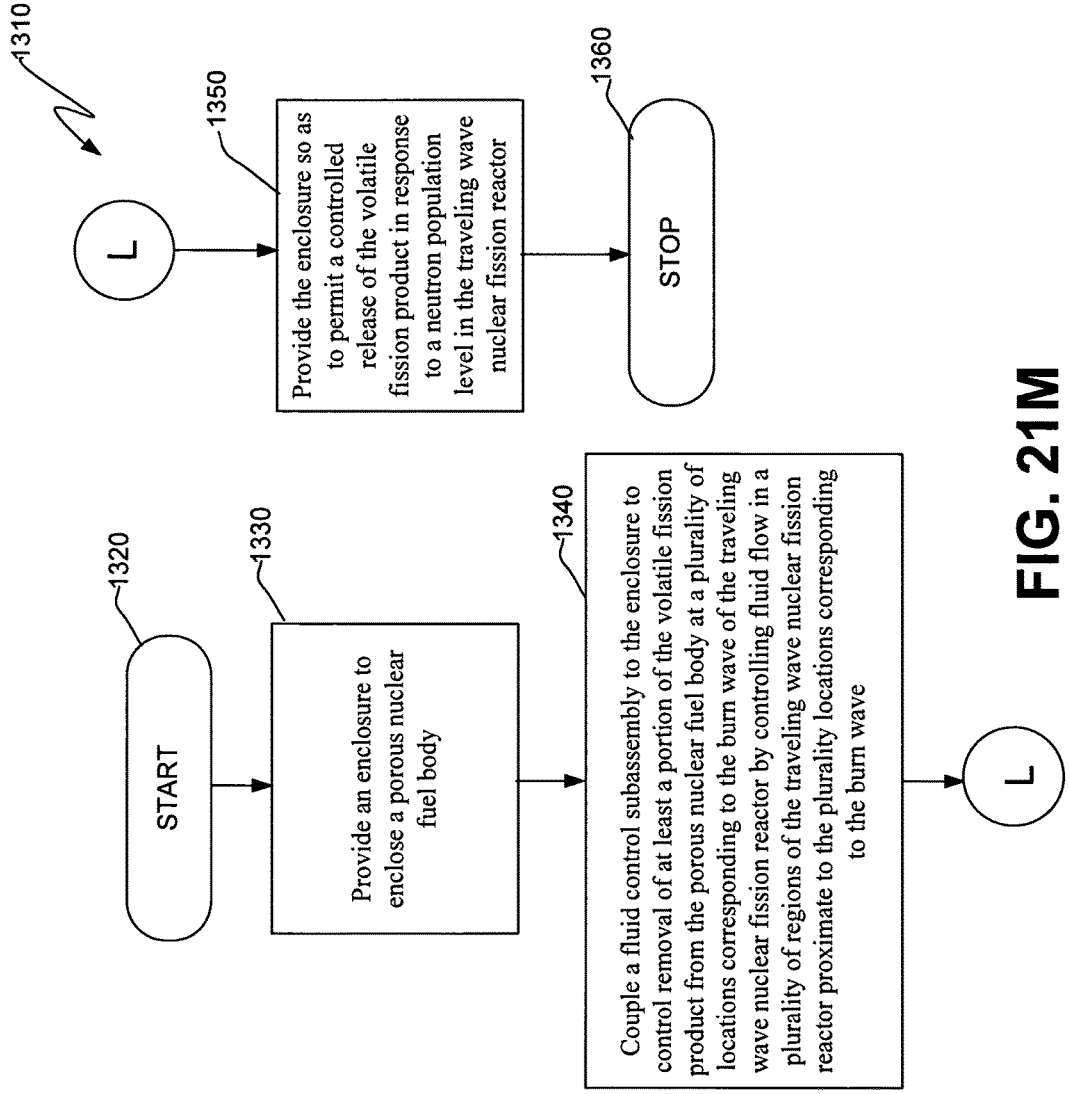

Referring to FIG. 21M, an illustrative method 1310 for assembling the nuclear fission reactor fuel assembly starts at a block 1320. At a block 1330, an enclosure is provided that encloses a nuclear fuel body in the manner previously mentioned. At a block 1340, a fluid control subassembly is coupled to the enclosure for removal of at least a portion of a volatile fission product as previously mentioned. The fluid control subassembly controls fluid flow in regions of the reactor proximate locations corresponding to a burn wave. At a block 1350, the enclosure is provided so as to permit a controlled release of the volatile fission product in response to a neutron population level in the traveling wave nuclear fission reactor. The method 1310 stops at a block 1360.

Figure 21N:
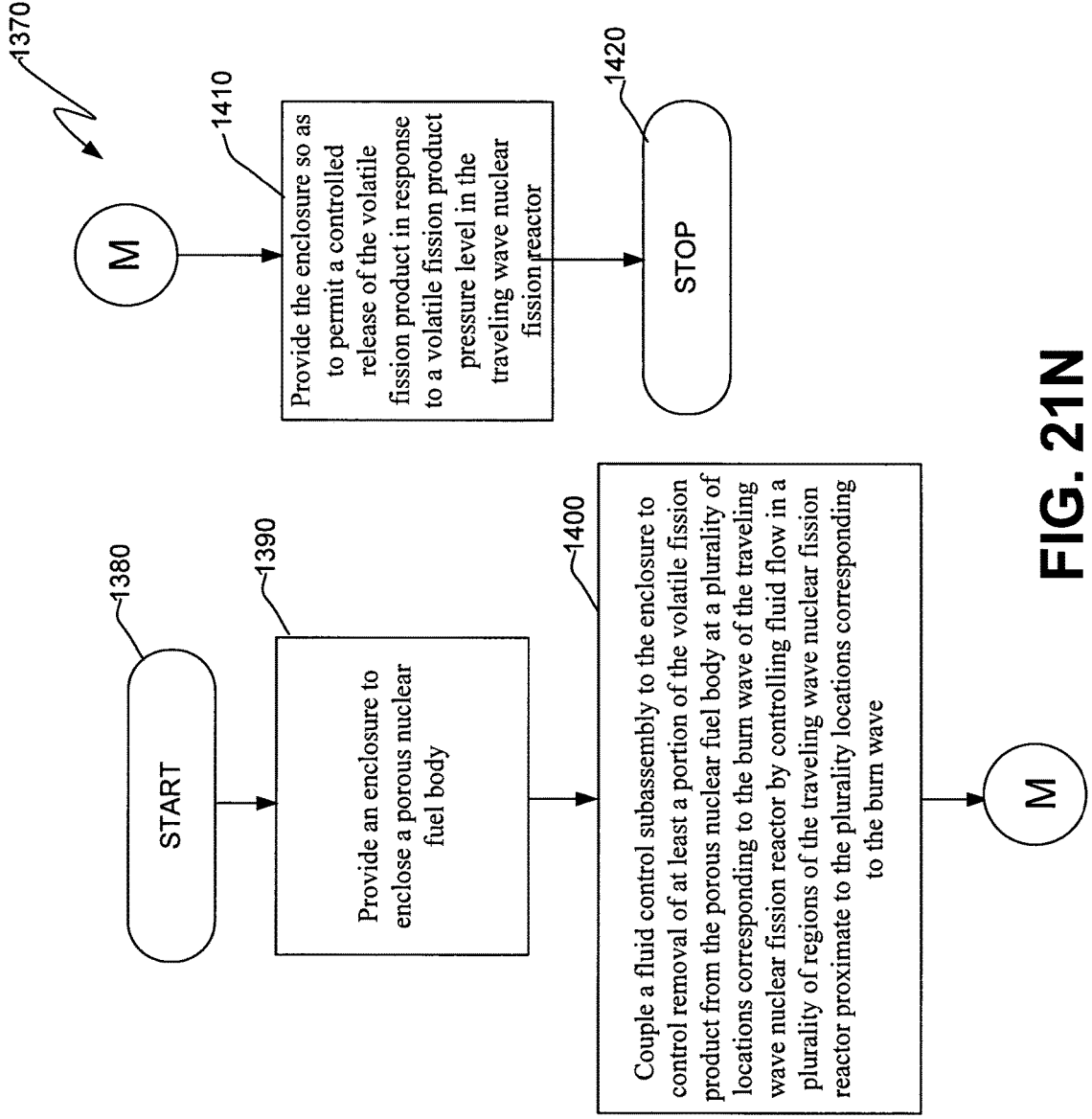

Referring to FIG. 21N, an illustrative method 1370 for assembling the nuclear fission reactor fuel assembly starts at a block 1380. At a block 1390, an enclosure is provided that encloses a nuclear fuel body in the manner previously mentioned. At a block 1400, a fluid control subassembly is coupled to the enclosure for removal of at least a portion of a volatile fission product as previously mentioned. The fluid control subassembly controls fluid flow in regions of the reactor proximate locations corresponding to a burn wave. At a block 1410, the enclosure is provided so as to permit a controlled release of the volatile fission product in response to a volatile fission product pressure level in the traveling wave nuclear fission reactor. The method 1370 stops at a block 1420.

Figure 21O:
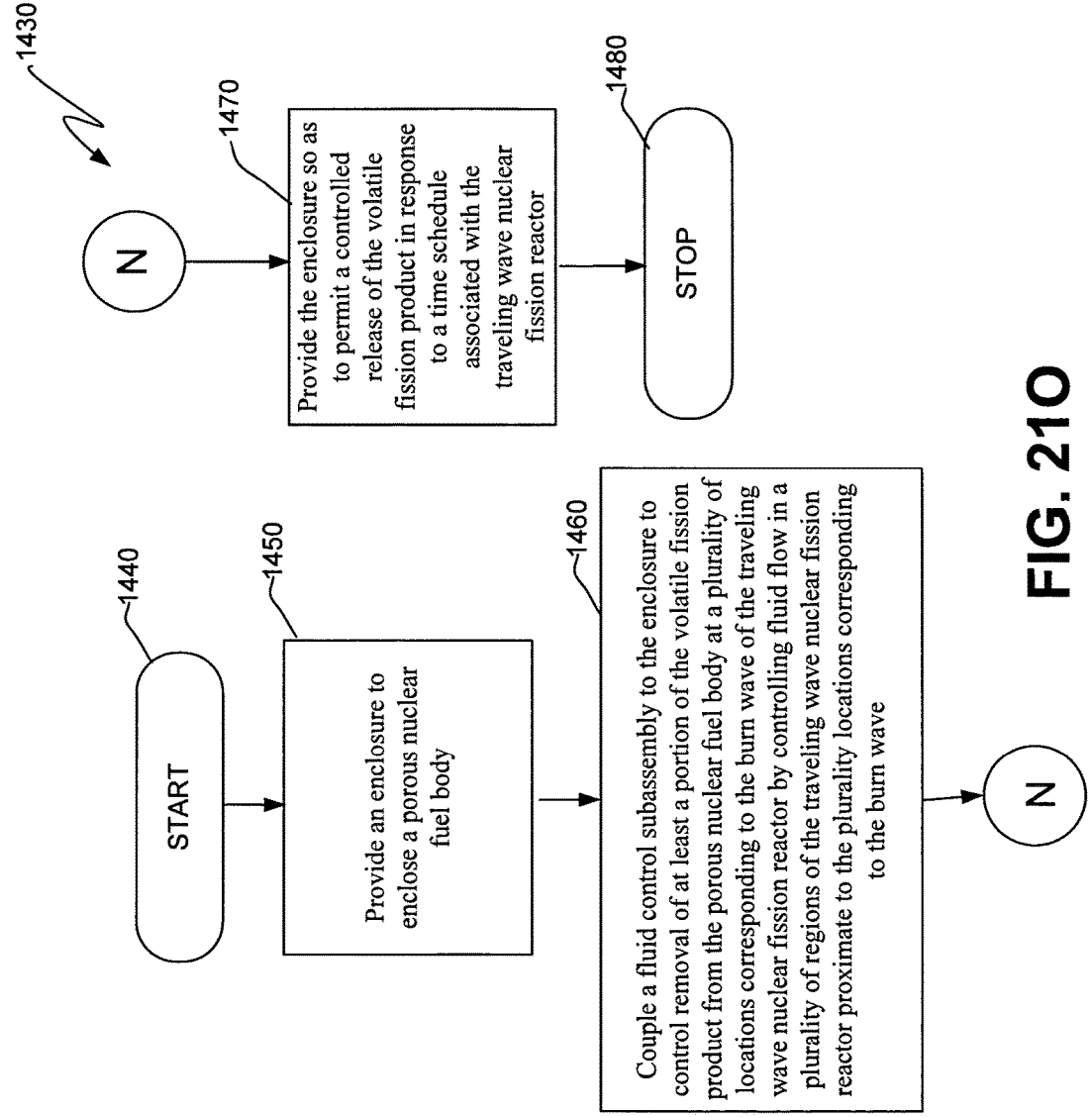

Referring to FIG. 21O, an illustrative method 1430 for assembling the nuclear fission reactor fuel assembly starts at a block 1440. At a block 1450, an enclosure is provided that encloses a nuclear fuel body in the manner previously mentioned. At a block 1460, a fluid control subassembly is coupled to the enclosure for removal of at least a portion of a volatile fission product as previously mentioned. The fluid control subassembly controls fluid flow in regions of the reactor proximate locations corresponding to a burn wave. At a block 1470, the enclosure is provided so as to permit a controlled release of the volatile fission product in response to a time schedule associated with the traveling wave nuclear fission reactor. The method 1430 stops at a block 1480.

Figure 21P:
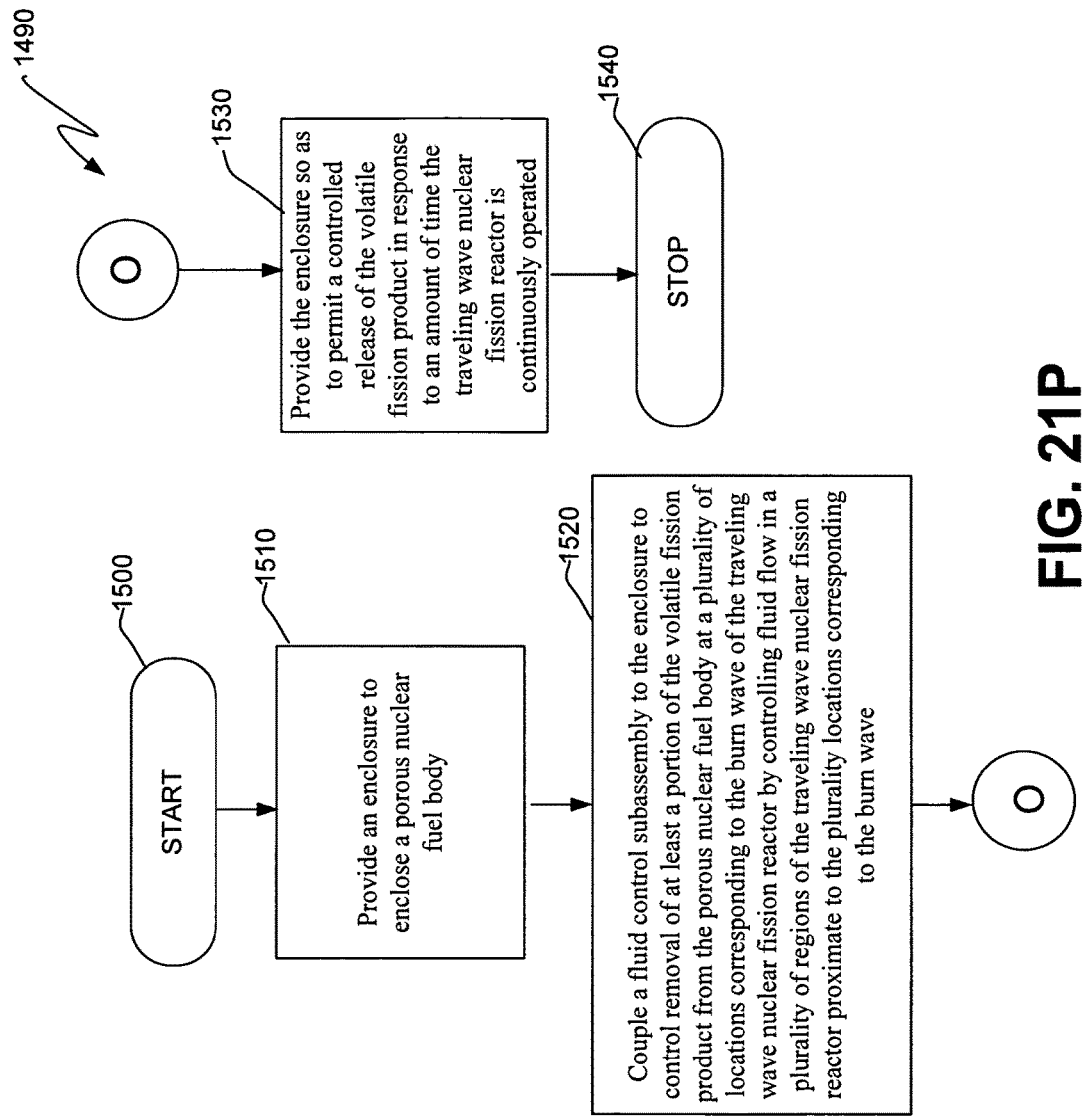

Referring to FIG. 21P, an illustrative method 1490 for assembling the nuclear fission reactor fuel assembly starts at a block 1500. At a block 1510, an enclosure is provided that encloses a nuclear fuel body in the manner previously mentioned. At a block 1520, a fluid control subassembly is coupled to the enclosure for removal of at least a portion of a volatile fission product as previously mentioned. The fluid control subassembly controls fluid flow in regions of the reactor proximate locations corresponding to a burn wave. At a block 1530, the enclosure is provided so as to permit a controlled release of the volatile fission product in response to an amount of time the traveling wave nuclear fission reactor is continuously operated. The method 1490 stops at a block 1540.

Figure 21Q:
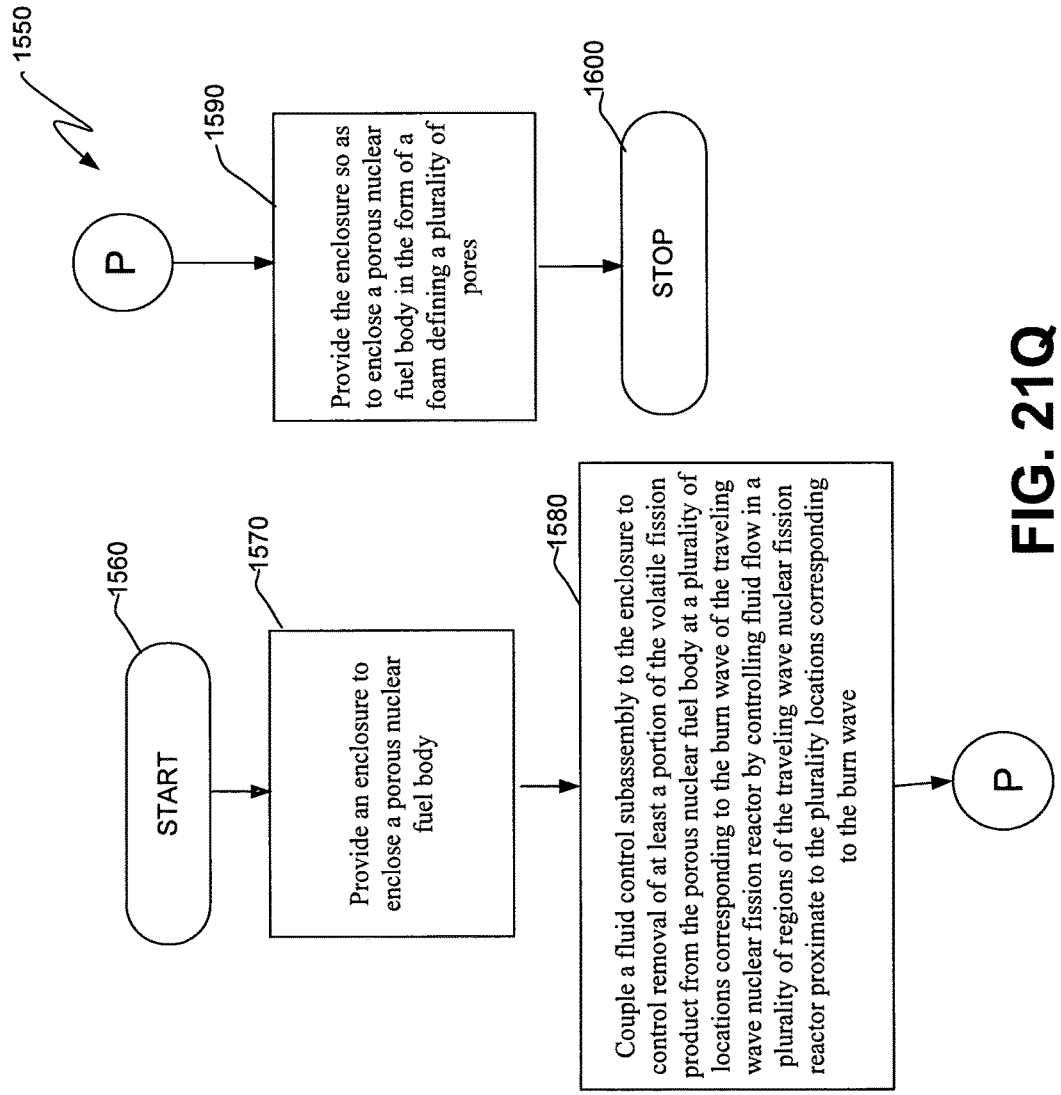

Referring to FIG. 21Q, an illustrative method 1550 for assembling the nuclear fission reactor fuel assembly starts at a block 1560. At a block 1570, an enclosure is provided that encloses a nuclear fuel body in the manner previously mentioned. At a block 1580, a fluid control subassembly is coupled to the enclosure for removal of at least a portion of a volatile fission product as previously mentioned. The fluid control subassembly controls fluid flow in regions of the reactor proximate locations corresponding to a burn wave. At a block 1590, the enclosure is provided so as to enclose a porous nuclear fuel body in the form of a foam defining a plurality of pores. The method 1550 stops at a block 1600.

Figure 21R:
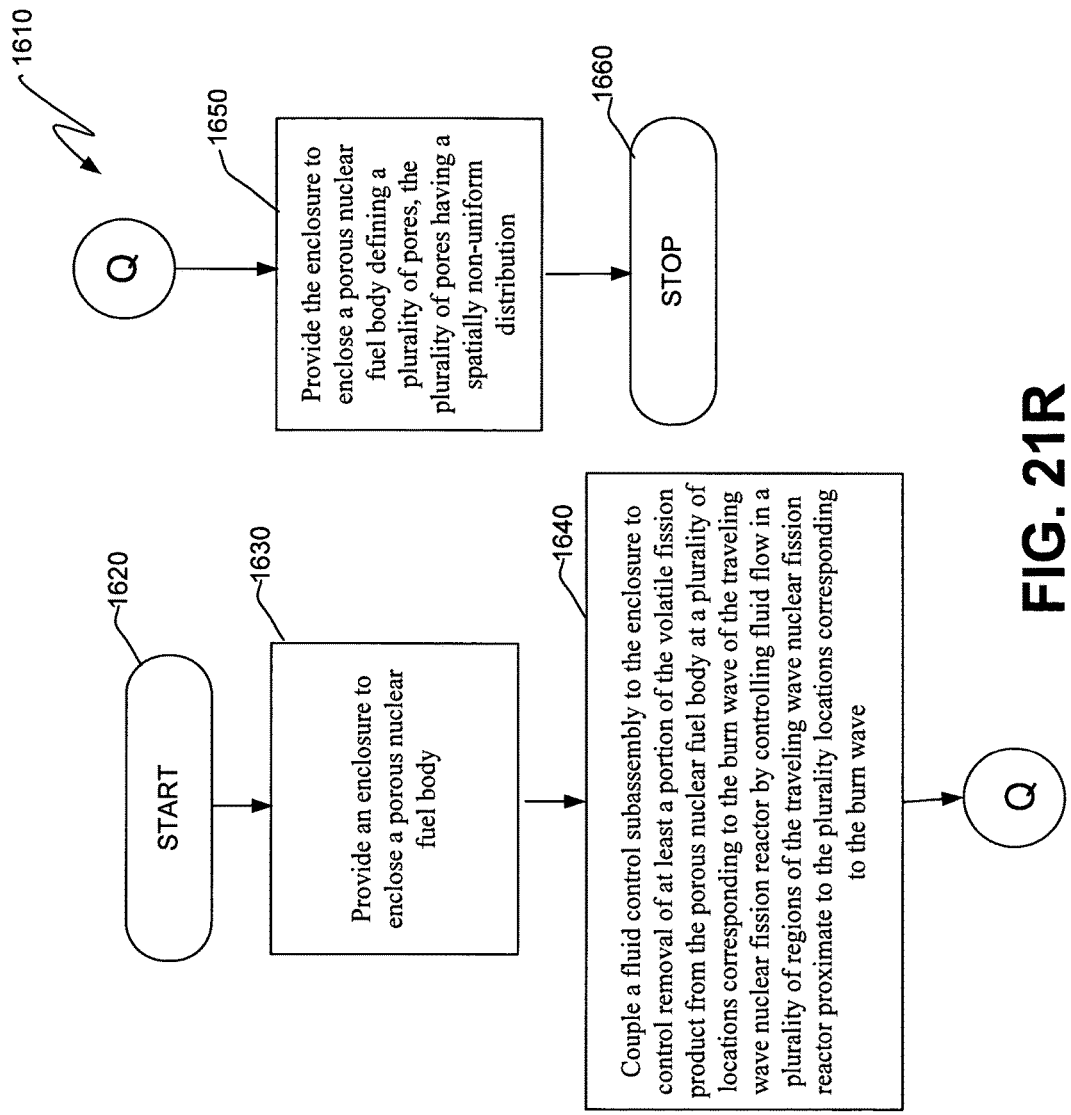

Referring to FIG. 21R, an illustrative method 1610 for assembling the nuclear fission reactor fuel assembly starts at a block 1620. At a block 1630, an enclosure is provided that encloses a nuclear fuel body in the manner previously mentioned. At a block 1640, a fluid control subassembly is coupled to the enclosure for removal of at least a portion of a volatile fission product as previously mentioned. The fluid control subassembly controls fluid flow in regions of the reactor proximate locations corresponding to a burn wave. At a block 1650, the enclosure is provided to enclose a nuclear fuel body defining a plurality of pores, the plurality of pores having a spatially non-uniform distribution. The method 1610 stops at a block 1660.

Figure 21S:
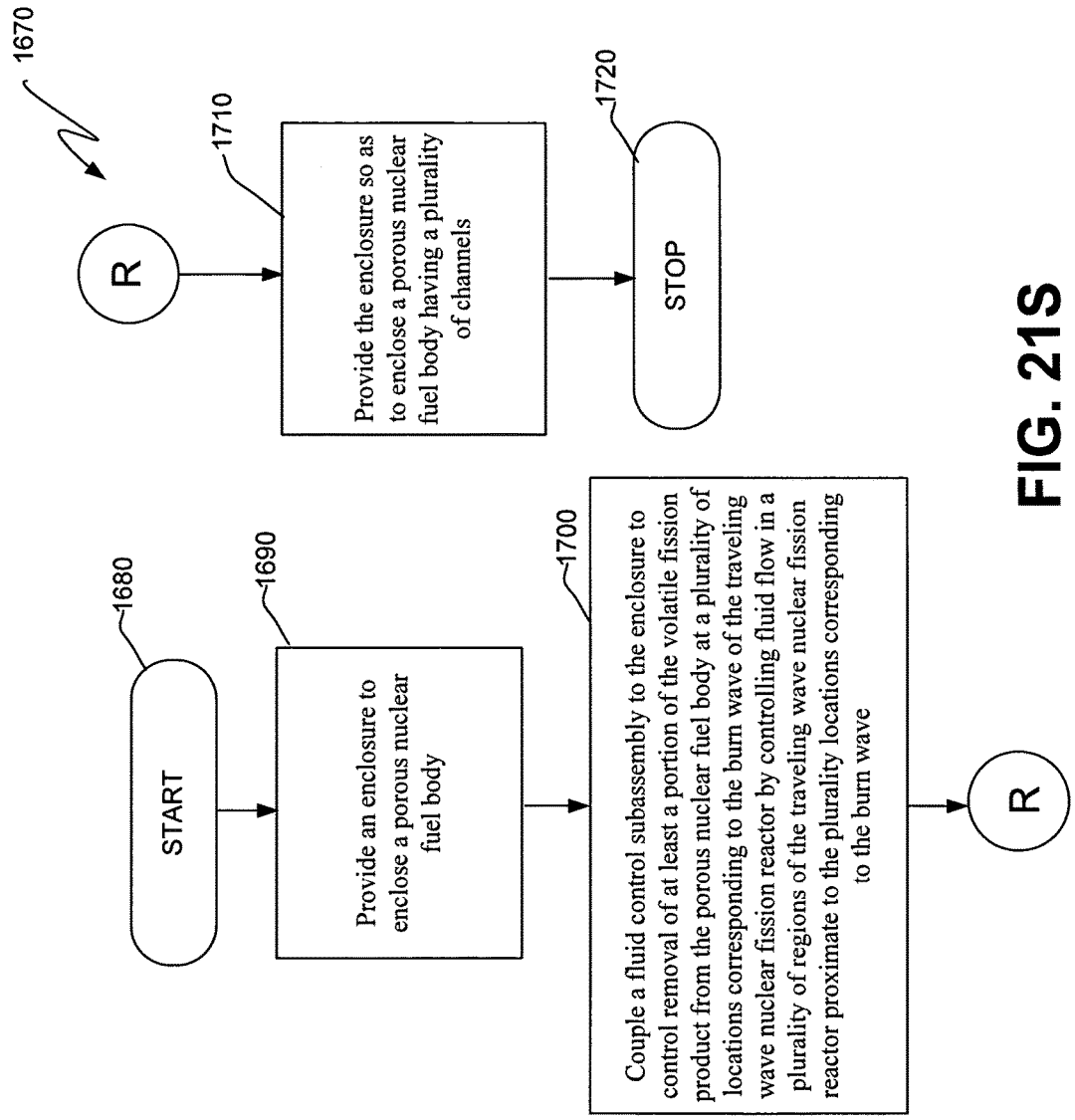

Referring to FIG. 21S, an illustrative method 1670 for assembling the nuclear fission reactor fuel assembly starts at a block 1680. At a block 1690, an enclosure is provided that encloses a nuclear fuel body in the manner previously mentioned. At a block 1700, a fluid control subassembly is coupled to the enclosure for removal of at least a portion of a volatile fission product as previously mentioned. The fluid control subassembly controls fluid flow in regions of the reactor proximate locations corresponding to a burn wave. At a block 1710, the enclosure is provided to enclose a nuclear fuel body having a plurality of channels. The method 1670 stops at a block 1720.

Figure 21T:
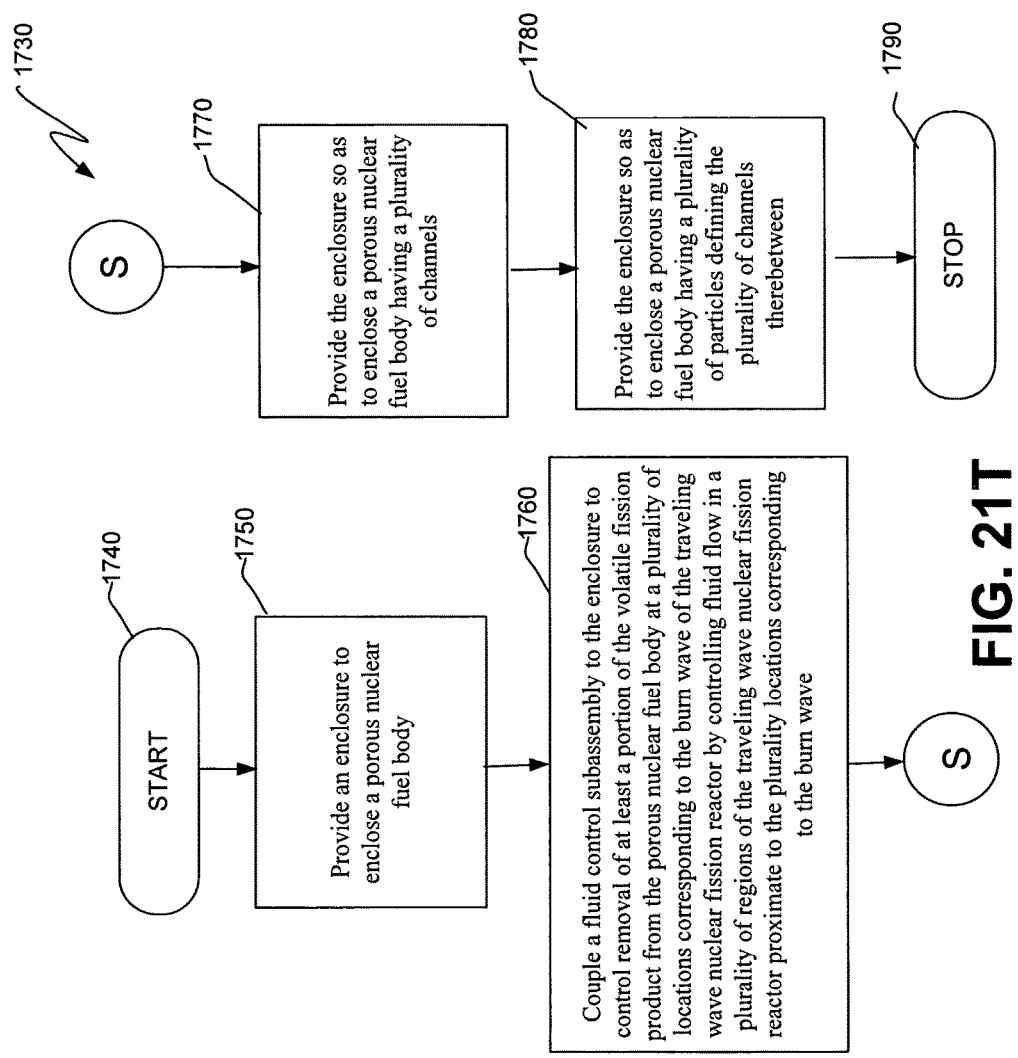

Referring to FIG. 21T, an illustrative method 1730 for assembling the nuclear fission reactor fuel assembly starts at a block 1740. At a block 1750, an enclosure is provided that encloses a nuclear fuel body in the manner previously mentioned. At a block 1760, a fluid control subassembly is coupled to the enclosure for removal of at least a portion of a volatile fission product as previously mentioned. The fluid control subassembly controls fluid flow in regions of the reactor proximate locations corresponding to a burn wave. At a block 1770, the enclosure is provided so as to enclose a porous nuclear fuel body having a plurality of particles defining the plurality of channels therebetween. The method 1730 stops at a block 1790.

Figure 21U:
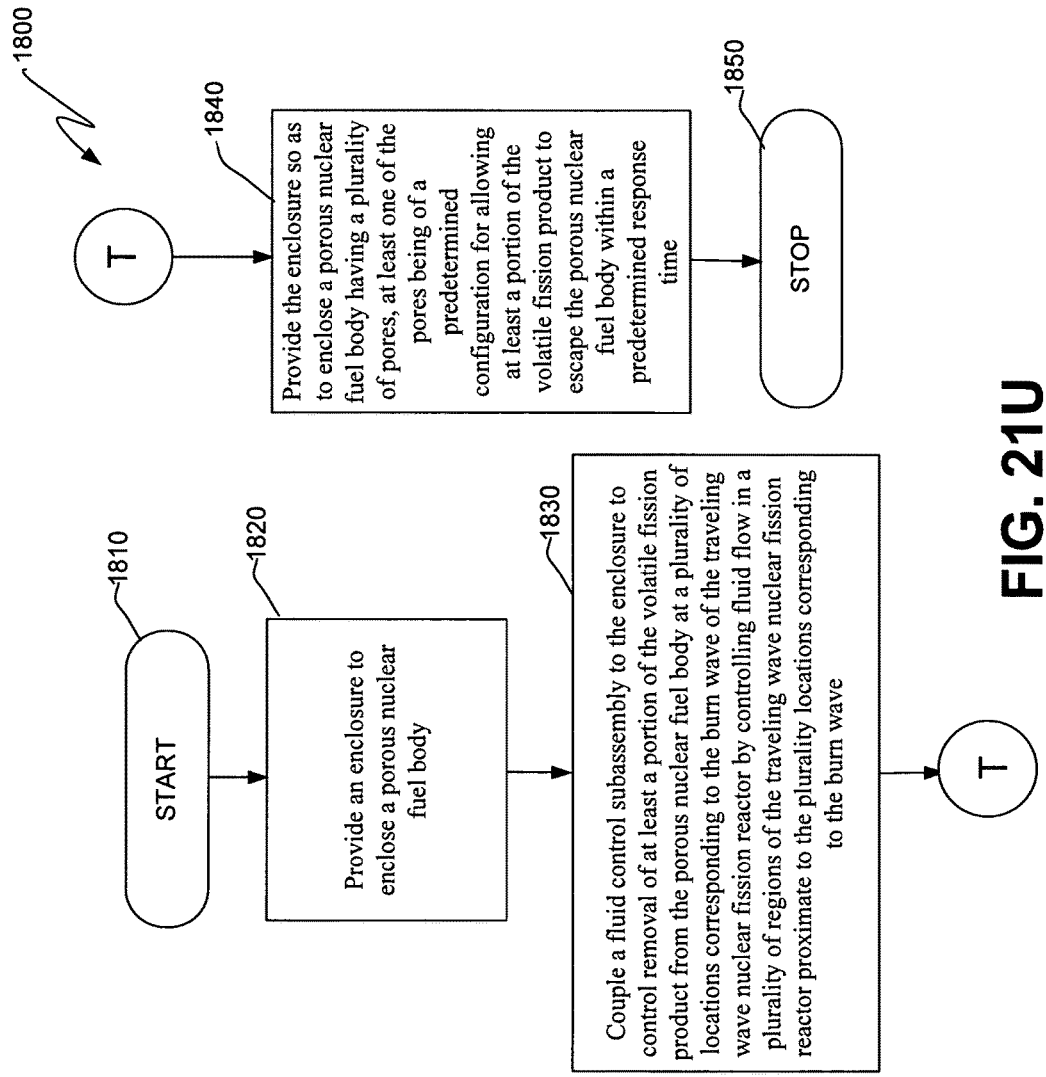

Referring to FIG. 21U, an illustrative method 1800 for assembling the nuclear fission reactor fuel assembly starts at a block 1810. At a block 1820, an enclosure is provided that encloses a nuclear fuel body in the manner previously mentioned. At a block 1830, a fluid control subassembly is coupled to the enclosure for removal of at least a portion of a volatile fission product as previously mentioned. The fluid control subassembly controls fluid flow in regions of the reactor proximate locations corresponding to a burn wave. At a block 1840, the enclosure is provided so as to enclose a porous nuclear fuel body having a plurality of pores, at least one of the pores being of a predetermined configuration for allowing at least a portion of the volatile fission product to escape the porous nuclear fuel body within a predetermined response time. The method 1800 stops at a block 1850.

Figure 21V:
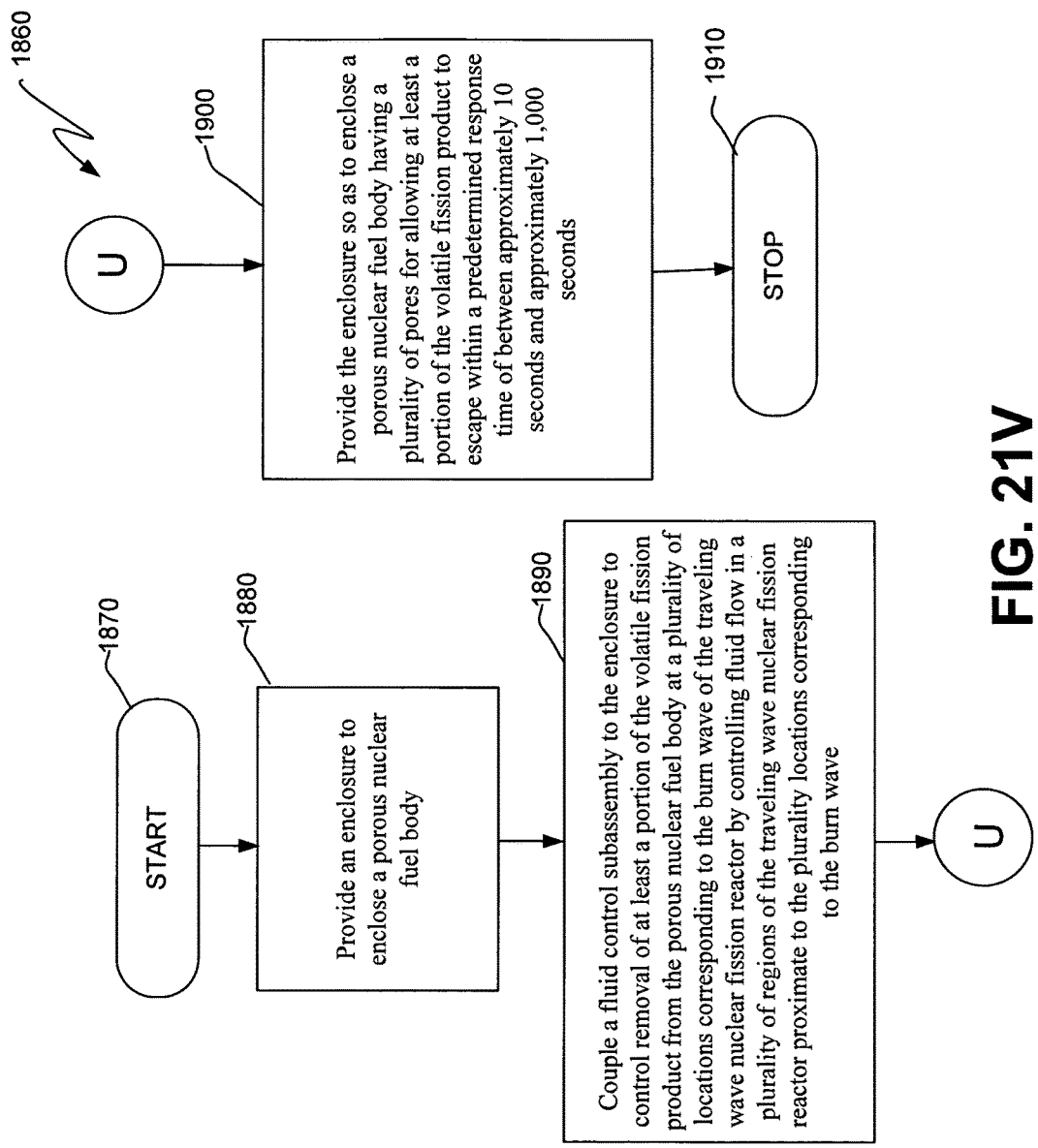

Referring to FIG. 21V, an illustrative method 1860 for assembling the nuclear fission reactor fuel assembly starts at a block 1870. At a block 1880, an enclosure is provided that encloses a nuclear fuel body in the manner previously mentioned. At a block 1890, a fluid control subassembly is coupled to the enclosure for removal of at least a portion of a volatile fission product as previously mentioned. The fluid control subassembly controls fluid flow in regions of the reactor proximate locations corresponding to a burn wave. At a block 1900, the enclosure is provided so as to enclose a porous nuclear fuel body having a plurality of pores for allowing at least a portion of the volatile fission product to escape within a predetermined response time of between approximately 10 seconds and approximately 1,000 seconds. The method 1860 stops at a block 1910.

Figure 21W:
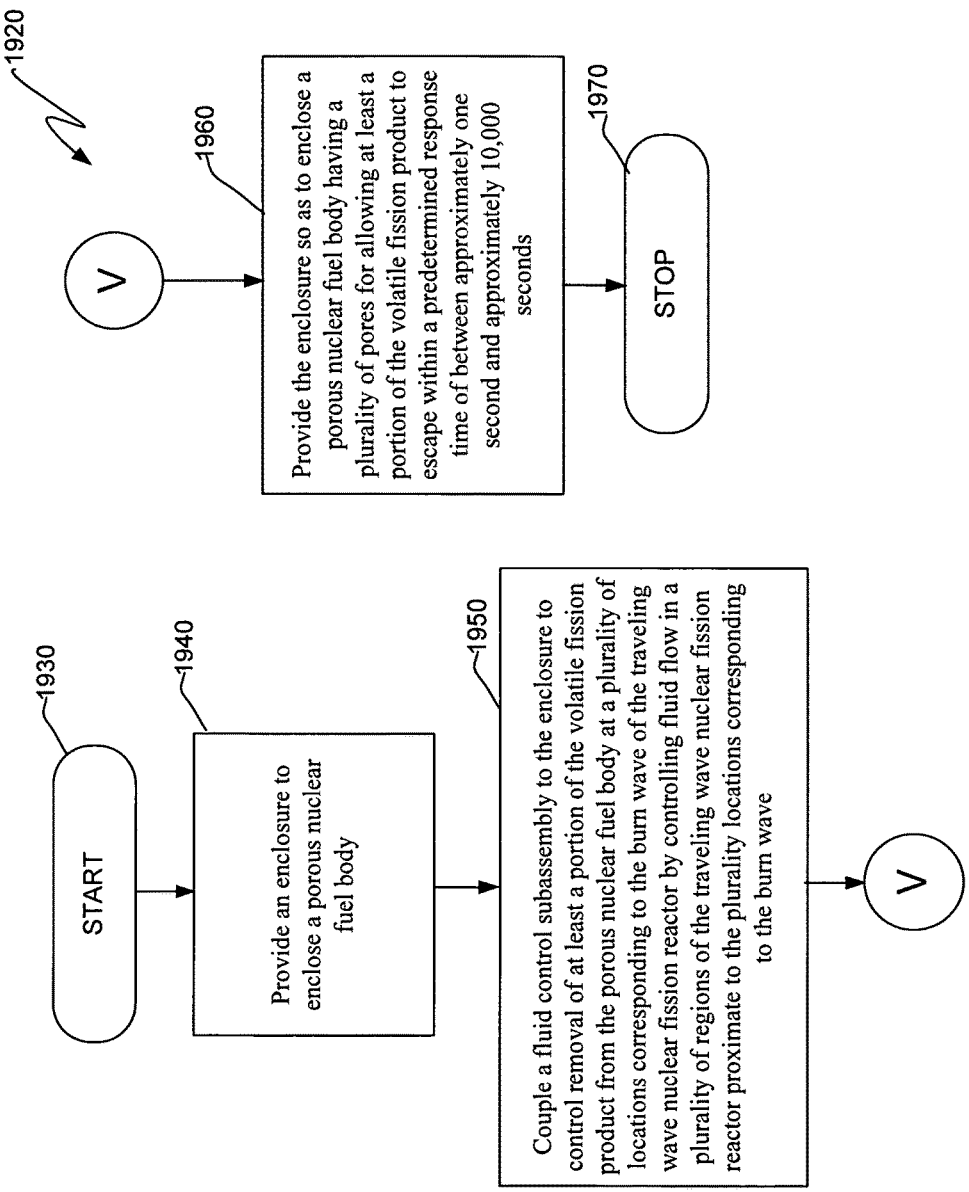

Referring to FIG. 21W, an illustrative method 1920 for assembling the nuclear fission reactor fuel assembly starts at a block 1930. At a block 1940, an enclosure is provided that encloses a nuclear fuel body in the manner previously mentioned. At a block 1950, a fluid control subassembly is coupled to the enclosure for removal of at least a portion of a volatile fission product as previously mentioned. The fluid control subassembly controls fluid flow in regions of the reactor proximate locations corresponding to a burn wave. At a block 1960, the enclosure is provided fuel body having a plurality of pores for allowing at least a portion of the volatile fission product to escape within a predetermined response time of between approximately 10 seconds and approximately 1,000 seconds. The method 1920 stops at a block 1970.

Figure 21X:
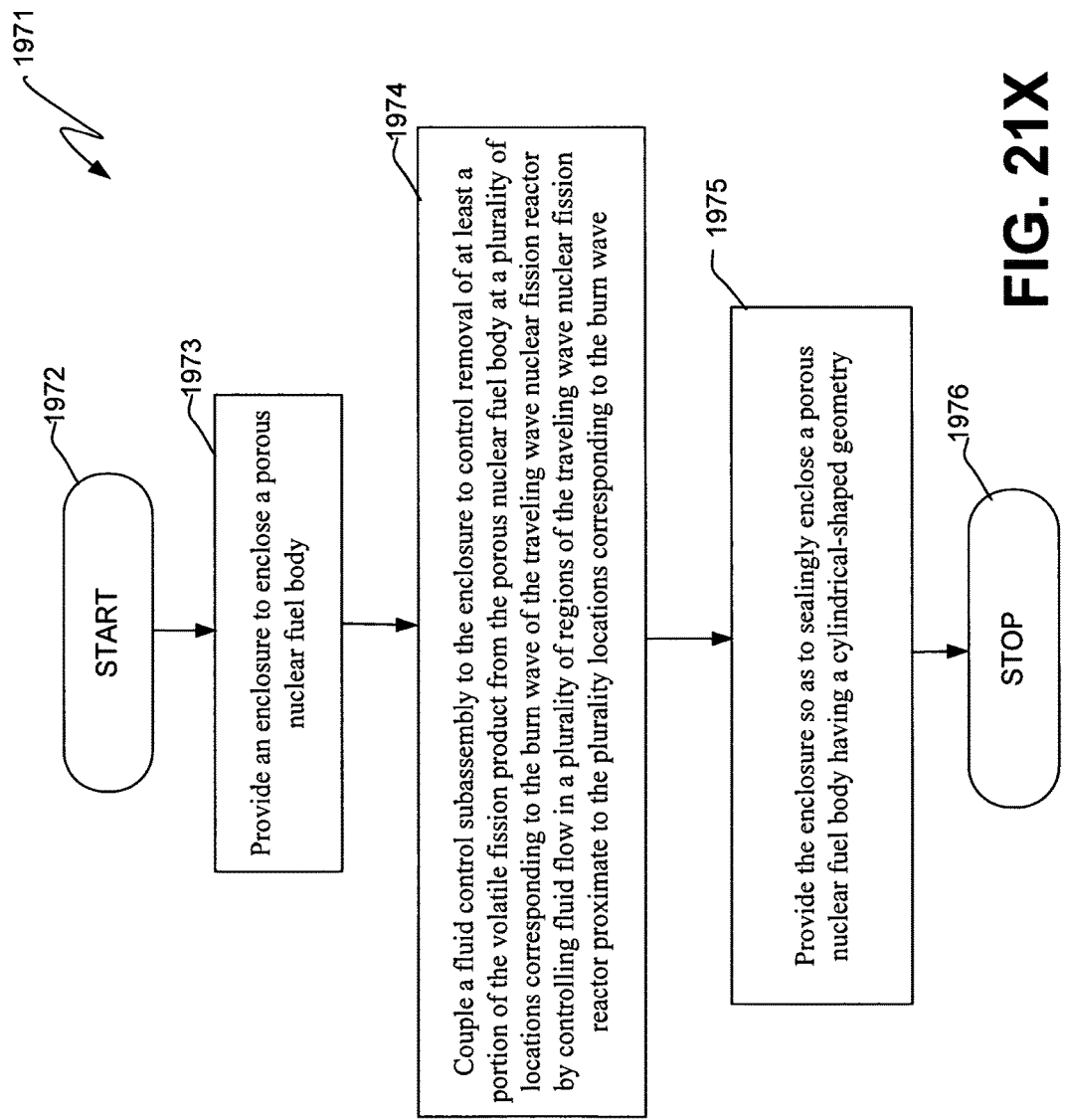

Referring to FIG. 21X, an illustrative method 1971 for assembling the nuclear fission reactor fuel assembly starts at a block 1972. At a block 1973, an enclosure is provided that encloses a nuclear fuel body in the manner previously mentioned. At a block 1974, a fluid control subassembly is coupled to the enclosure for removal of at least a portion of a volatile fission product as previously mentioned. The fluid control subassembly controls fluid flow in regions of the reactor proximate locations corresponding to a burn wave. At a block 1975, the enclosure is provided so as to sealingly enclose a porous nuclear fuel body having a cylindrical-shaped geometry. The method 1971 stops at a block 1976.

Figure 21Y:
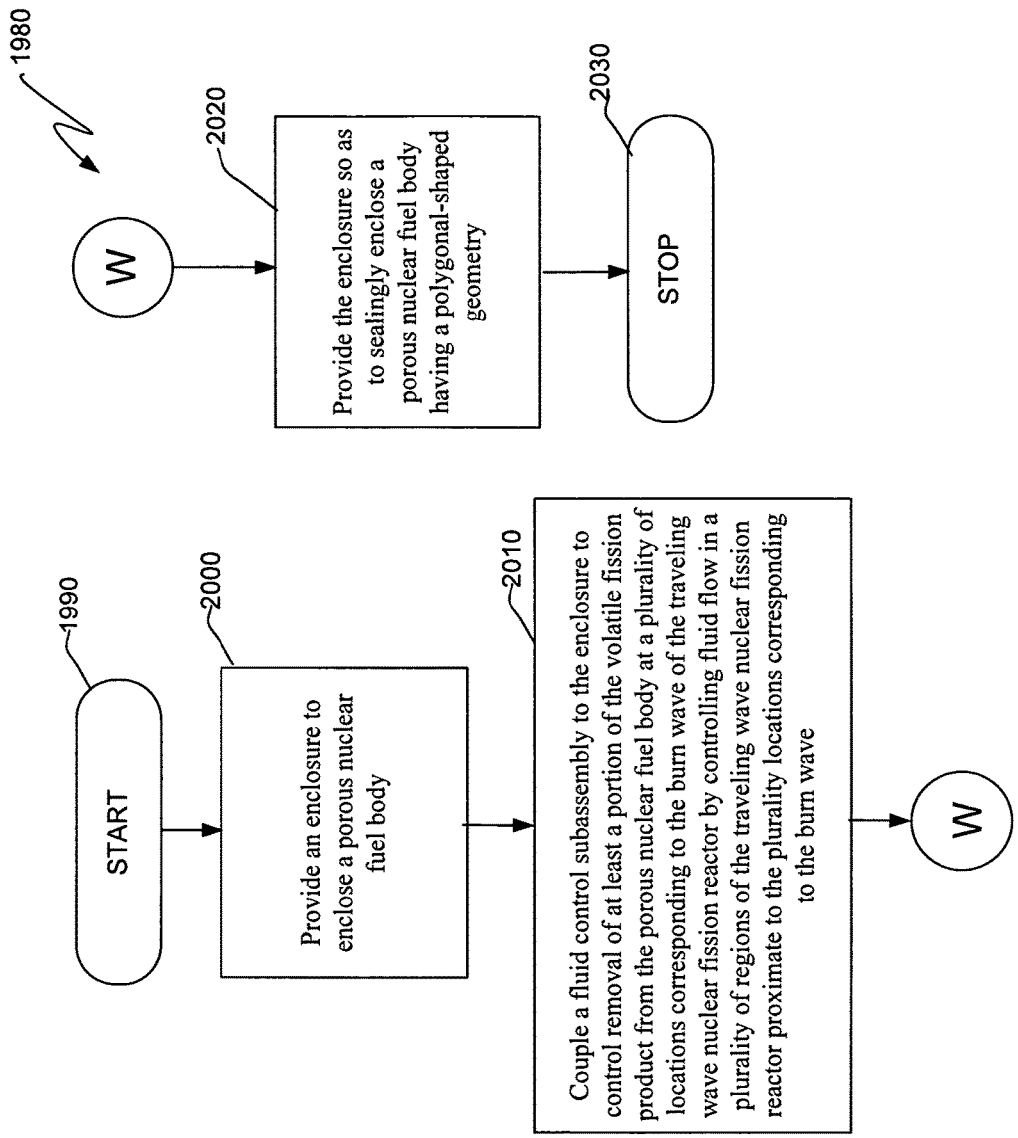

Referring to FIG. 21Y, an illustrative method 1980 for assembling the nuclear fission reactor fuel assembly starts at a block 1990. At a block 2000, an enclosure is provided that encloses a nuclear fuel body in the manner previously mentioned. At a block 2010, a fluid control subassembly is coupled to the enclosure for removal of at least a portion of a volatile fission product as previously mentioned. The fluid control subassembly controls fluid flow in regions of the reactor proximate locations corresponding to a burn wave. At a block 2020, the enclosure is provided so as to sealingly enclose a porous nuclear fuel body having a polygonal-shaped geometry. The method 1980 stops at a block 2030.

Figure 21Z:
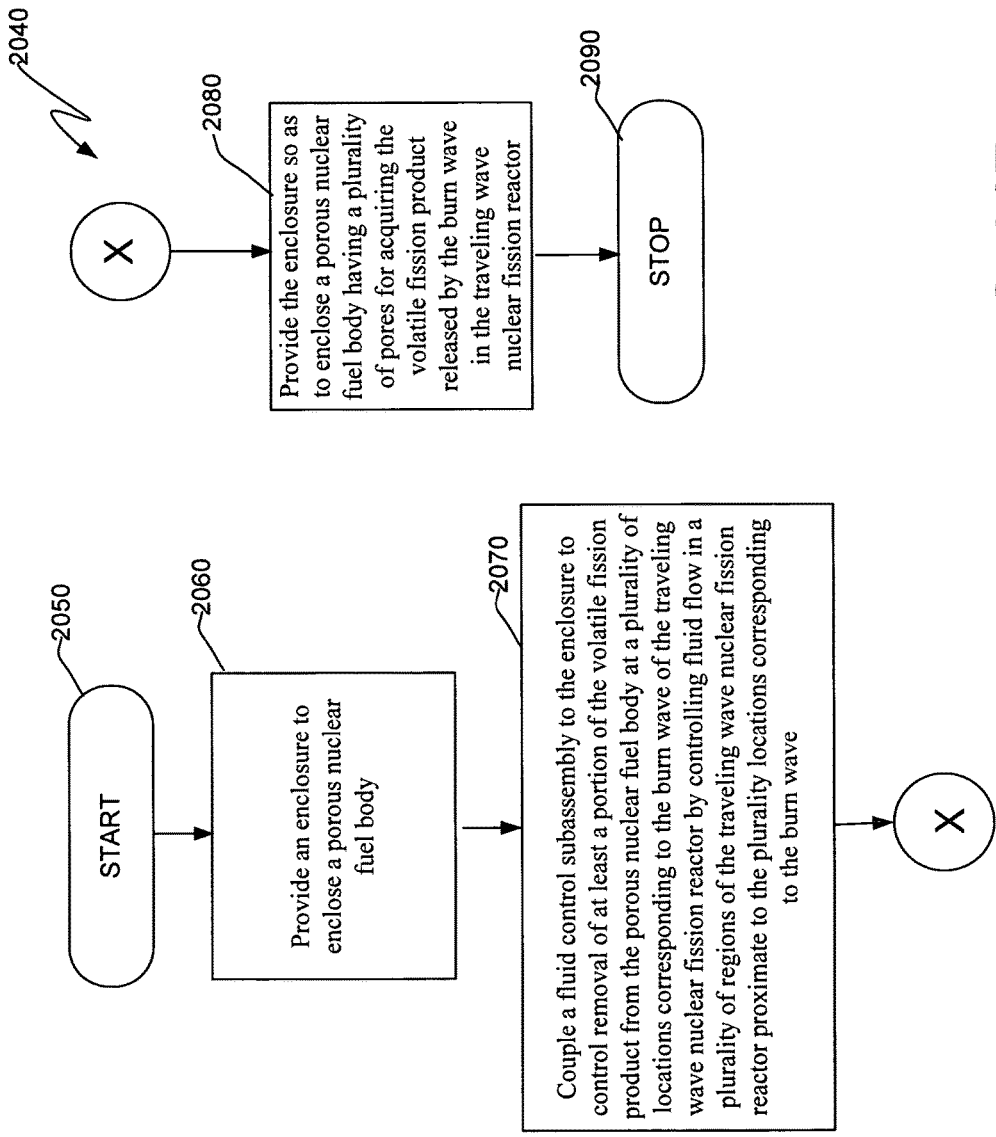
Figure 21A:
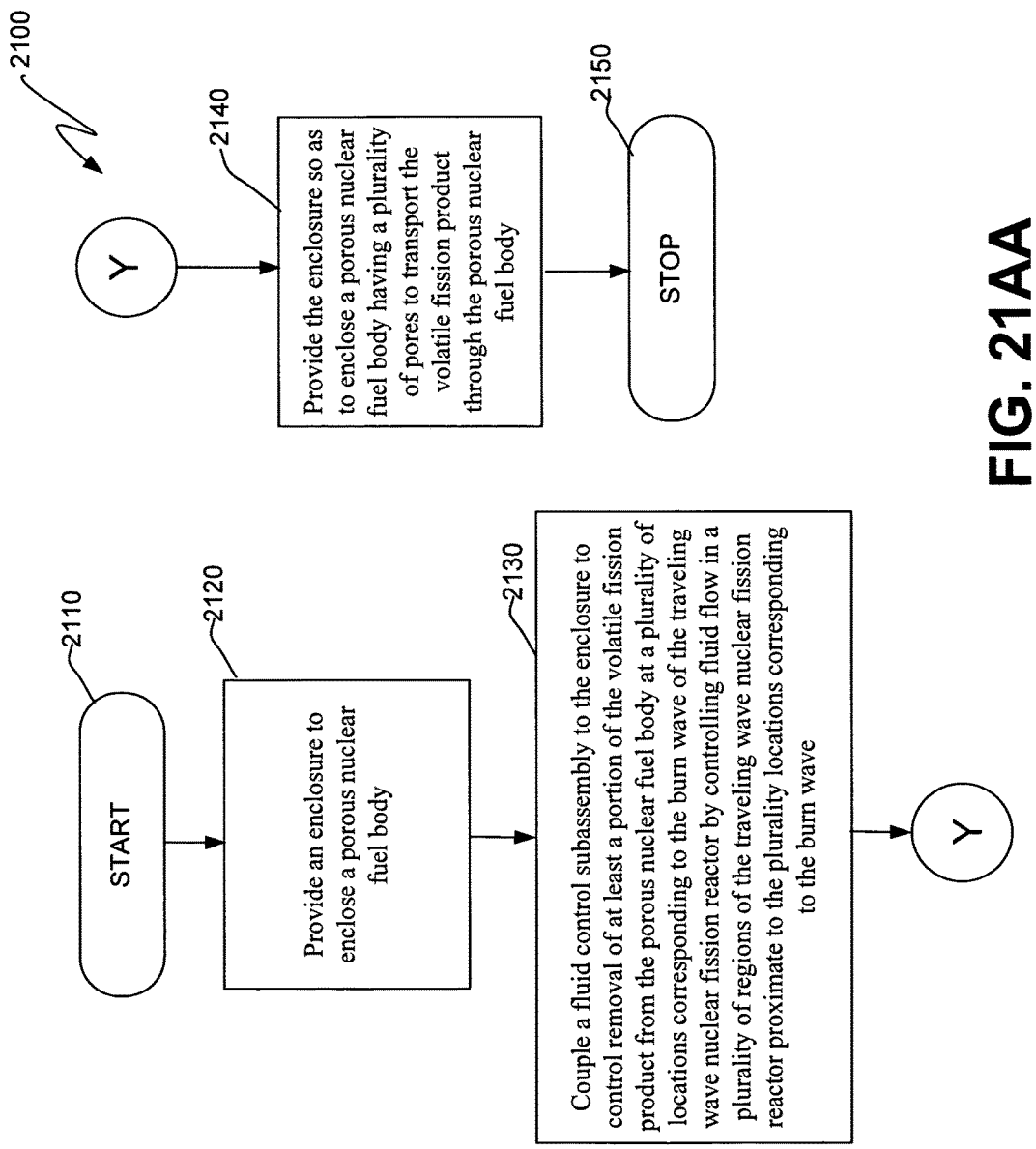
Figure 21A:
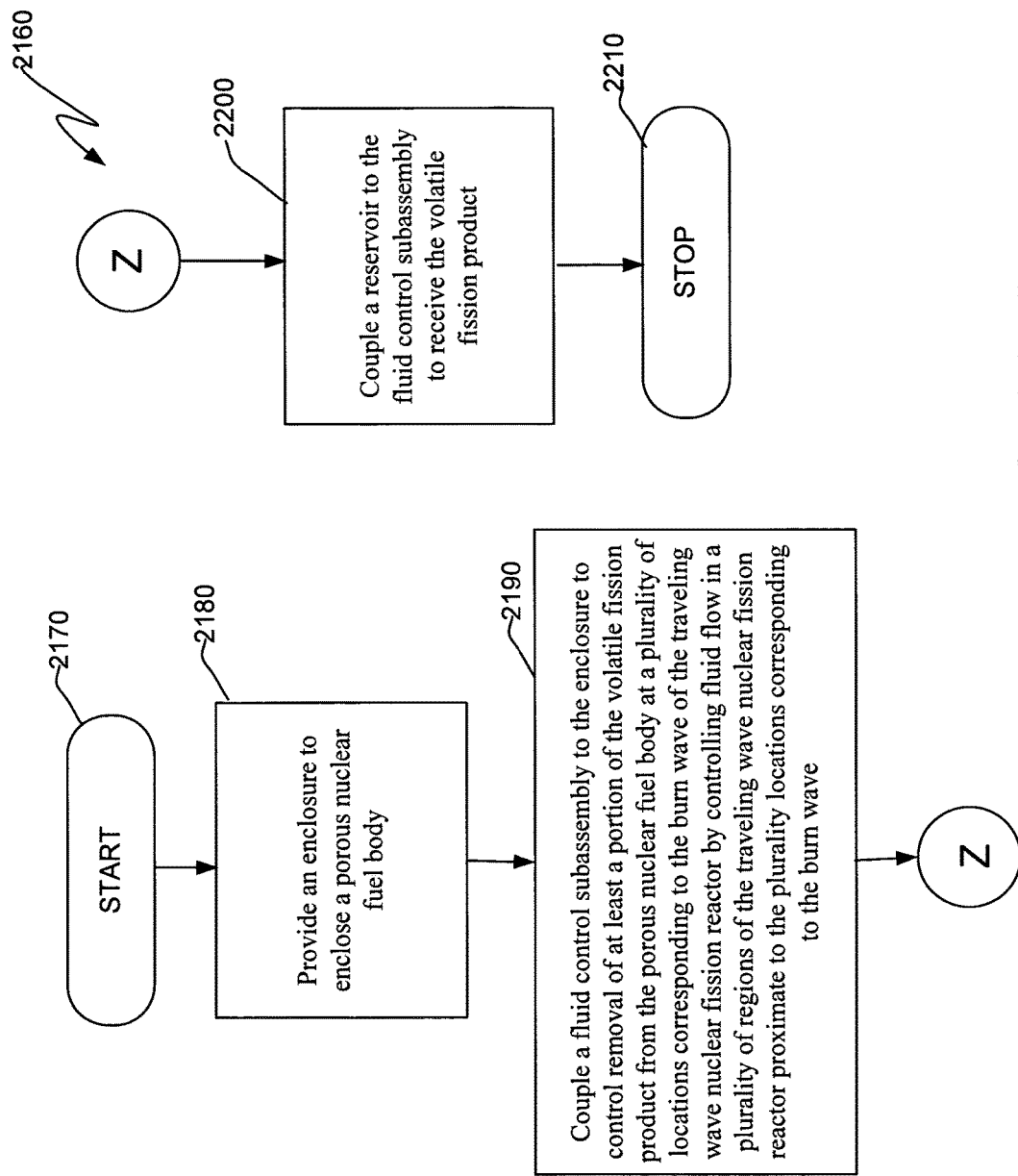
Figure 21A:
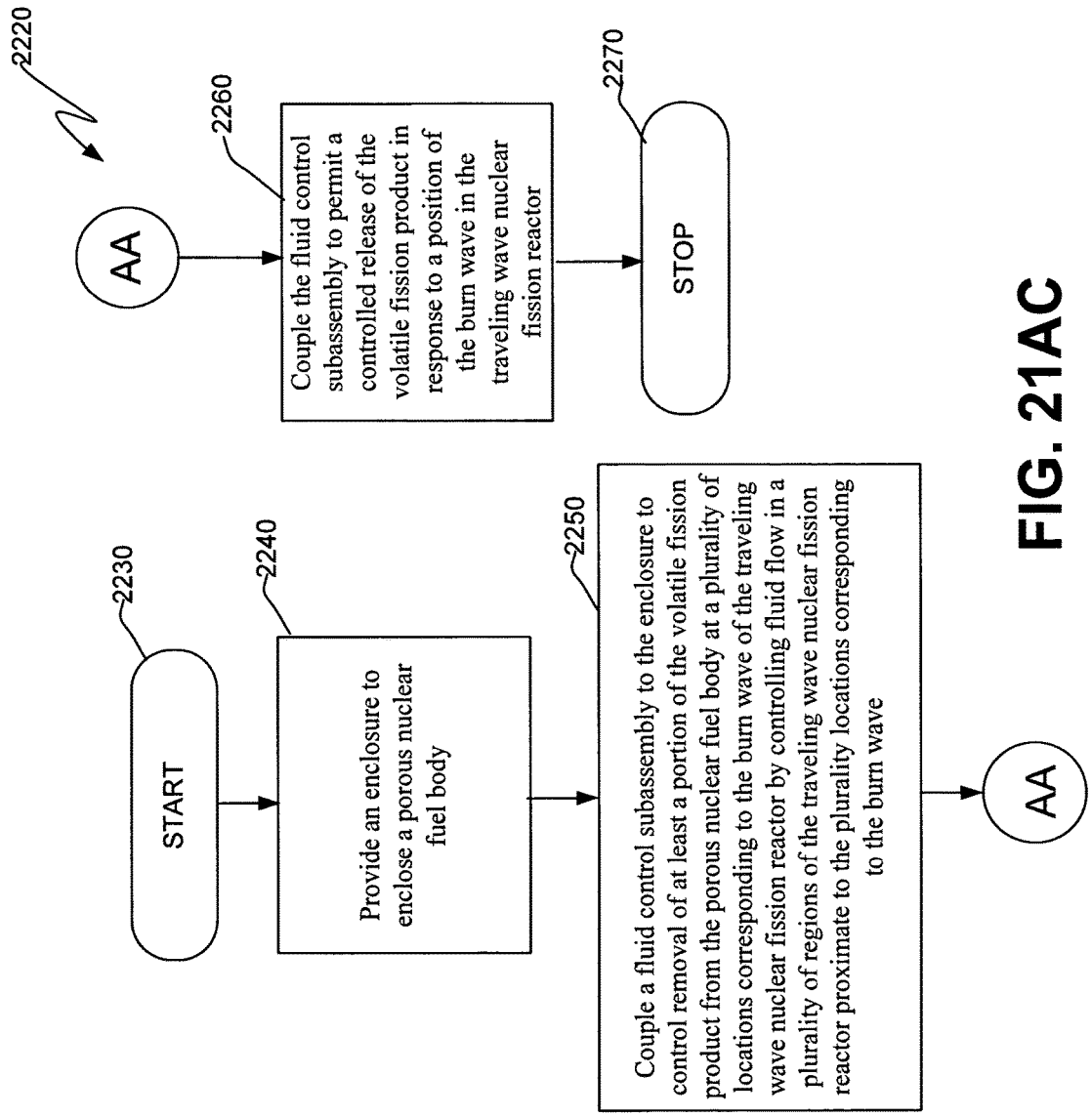
Figure 21A:
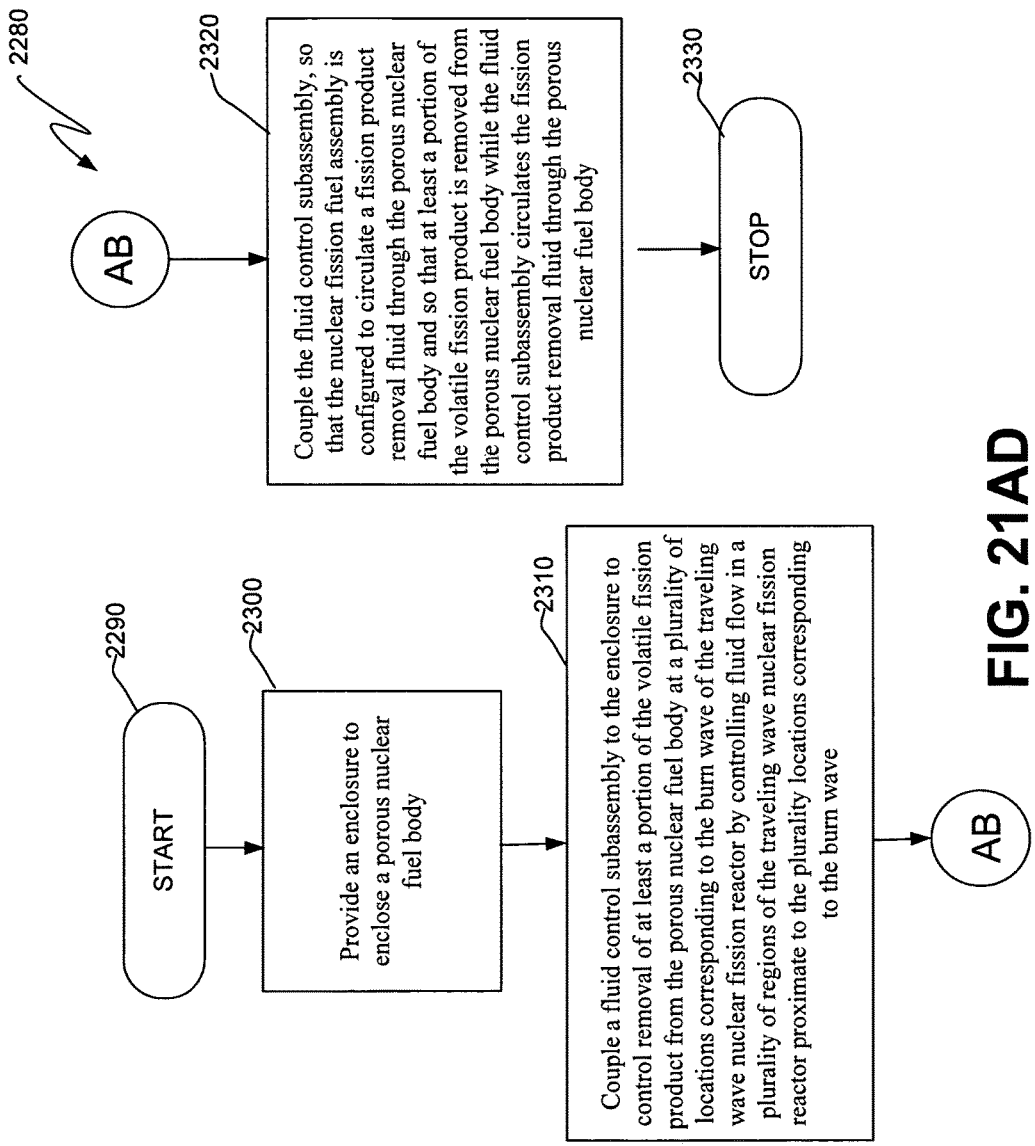
Figure 21A:
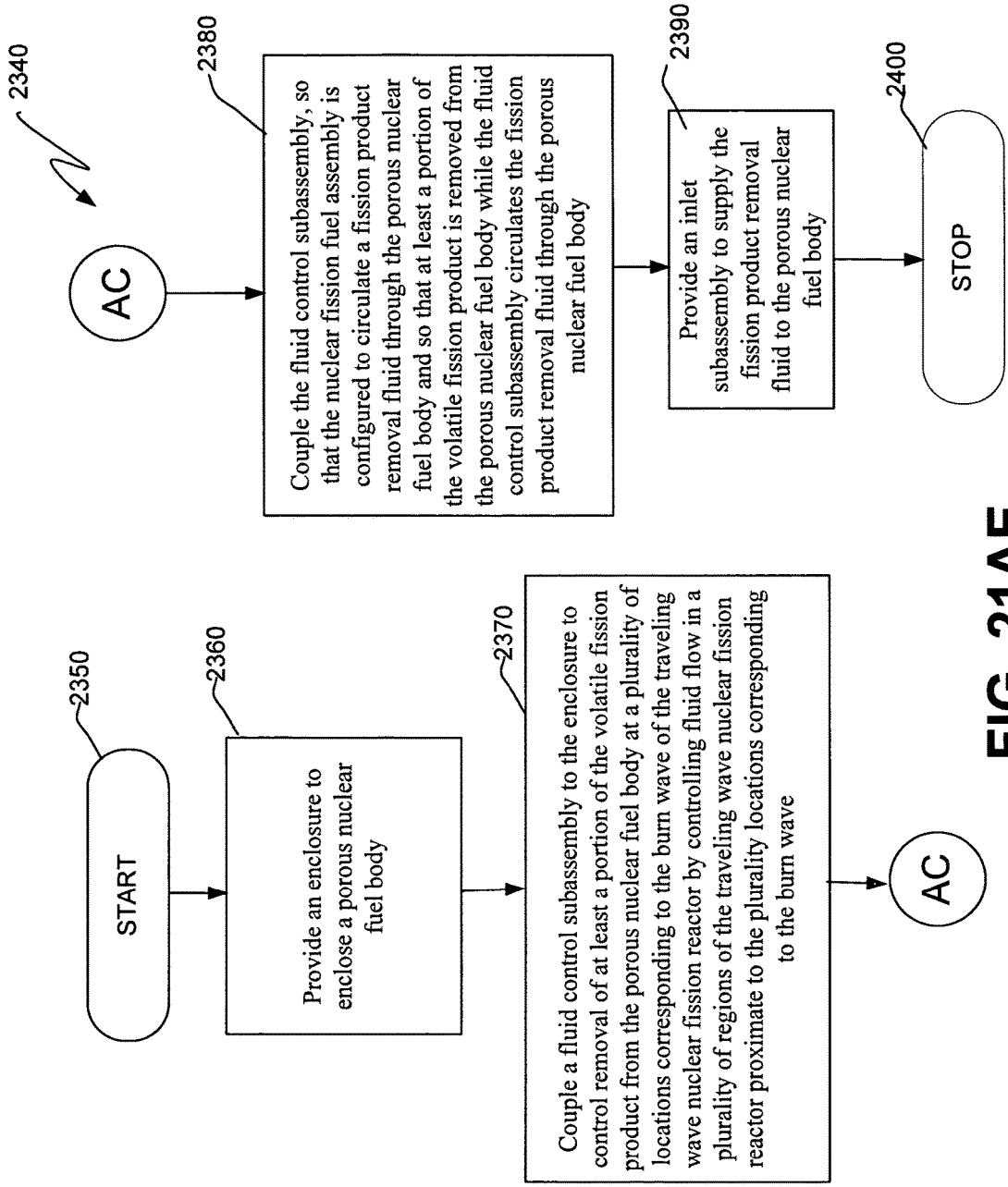
Figure 21A:
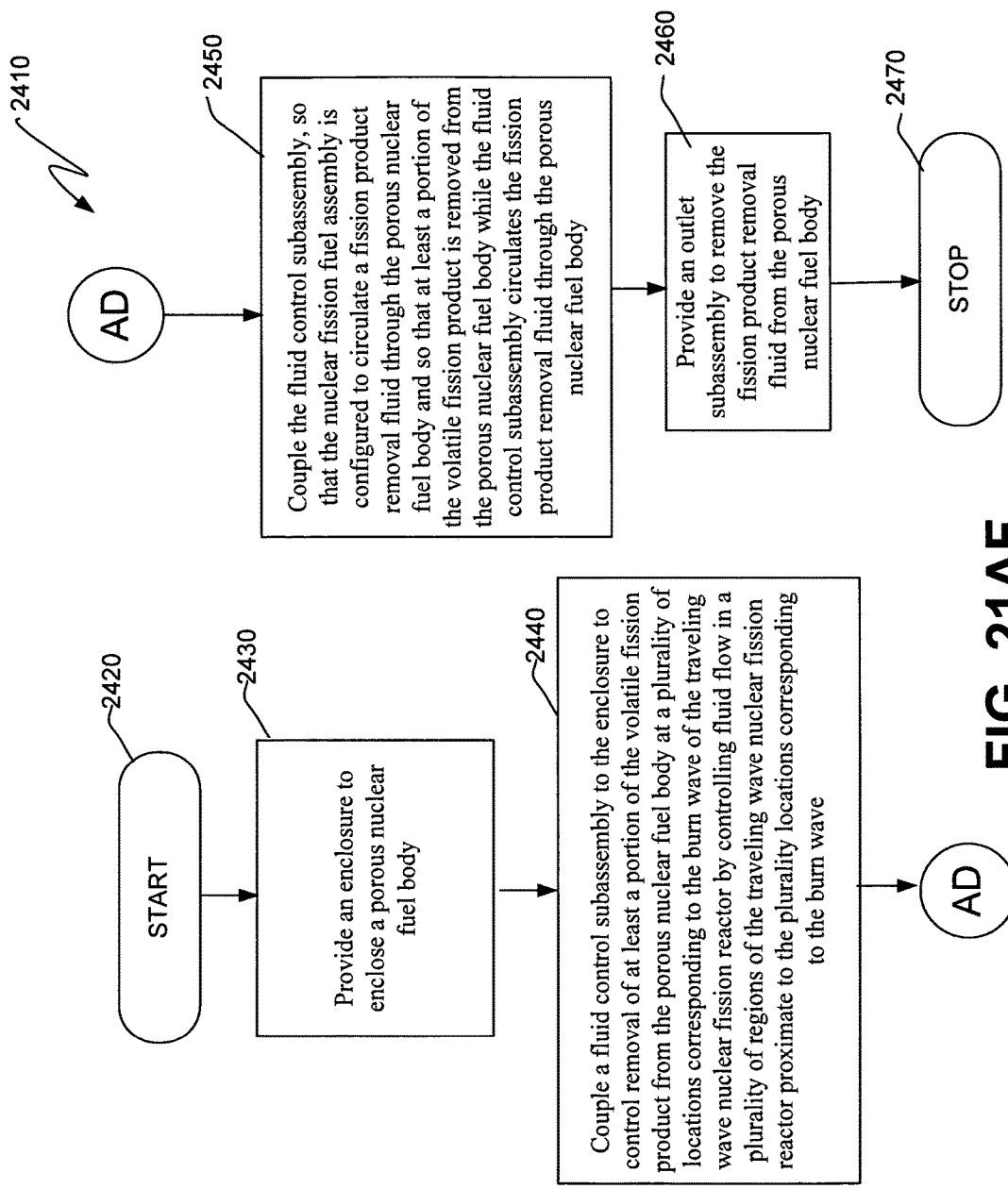
Figure 21A:
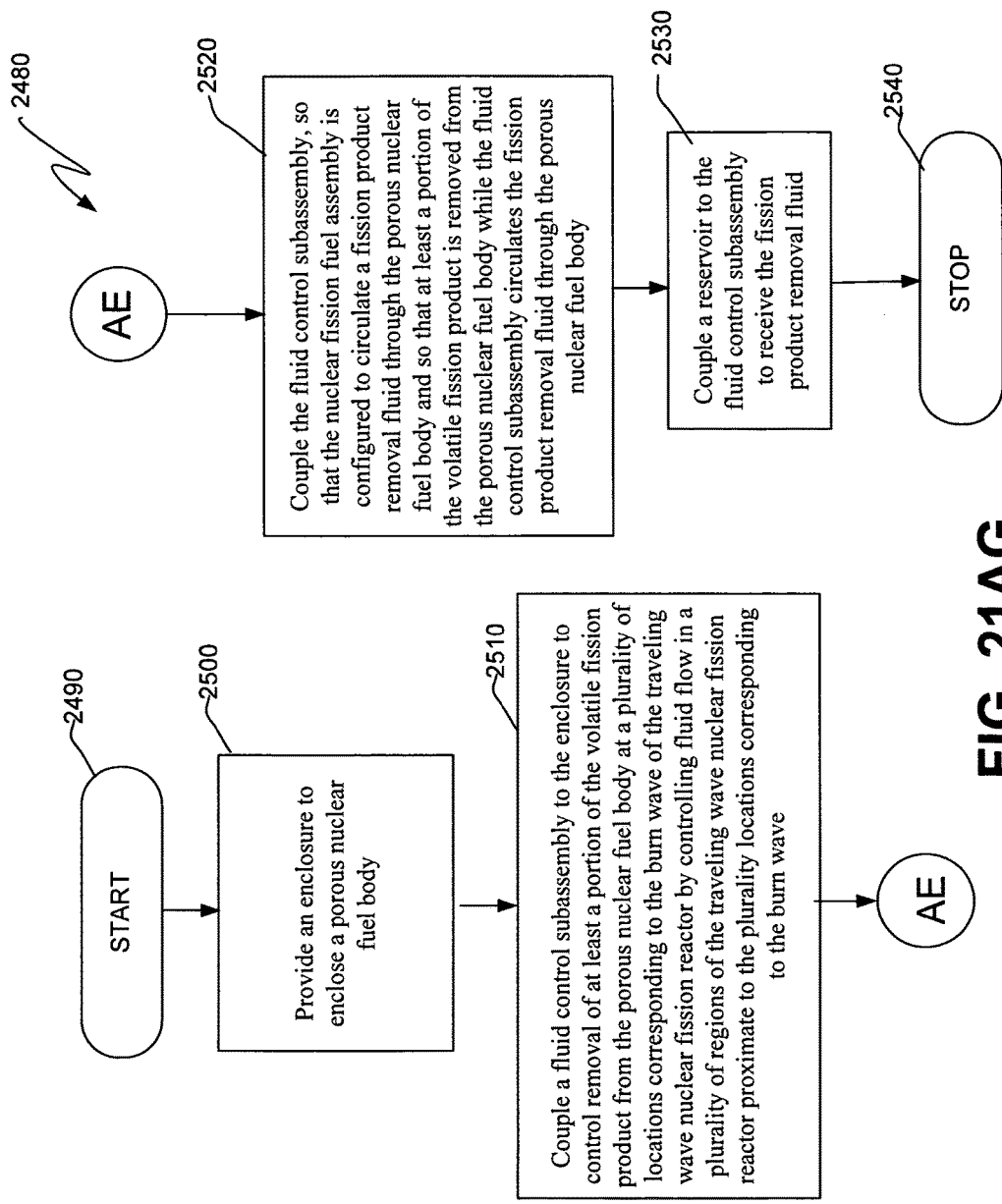
Figure 21A:
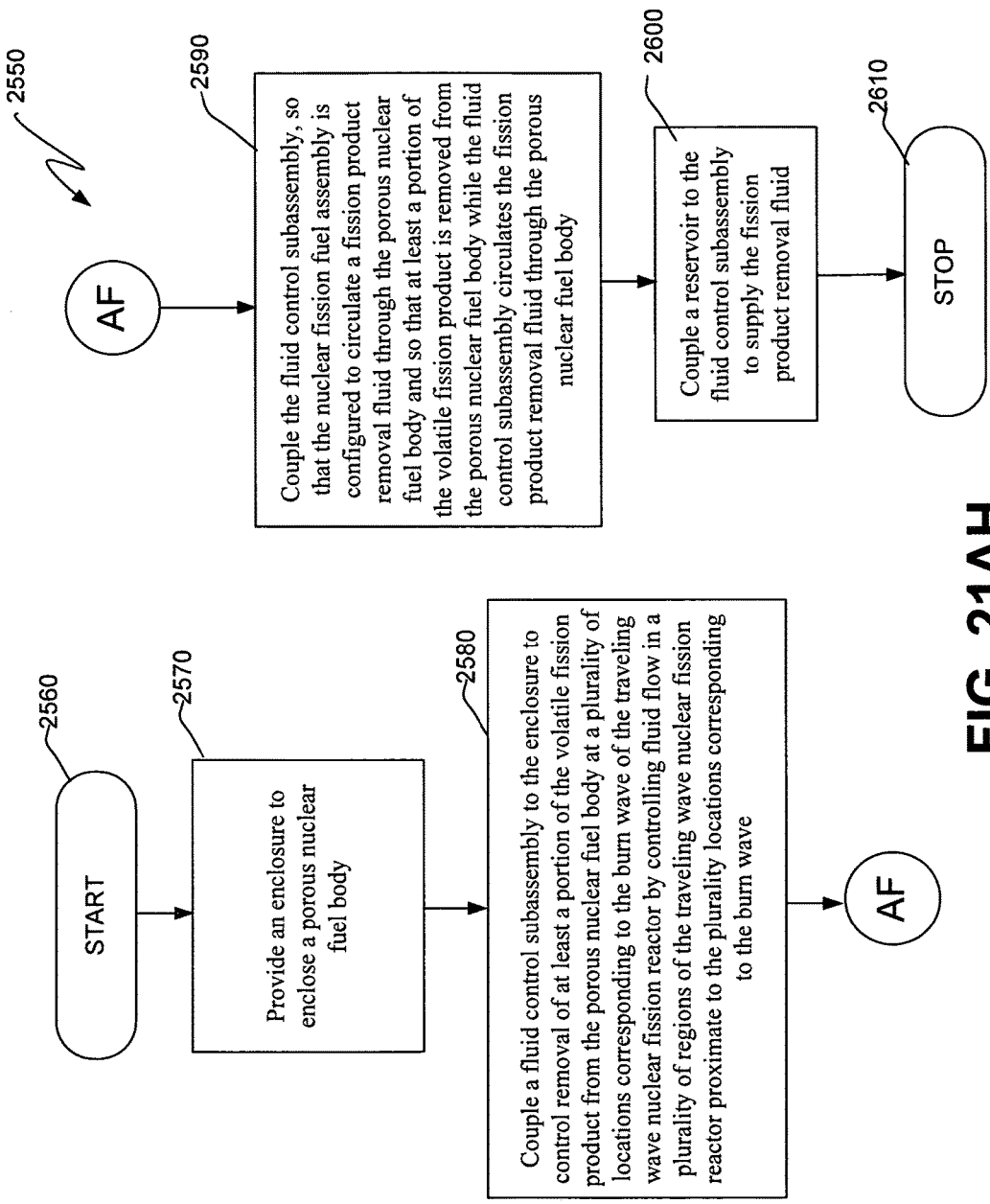
Figure 21A:
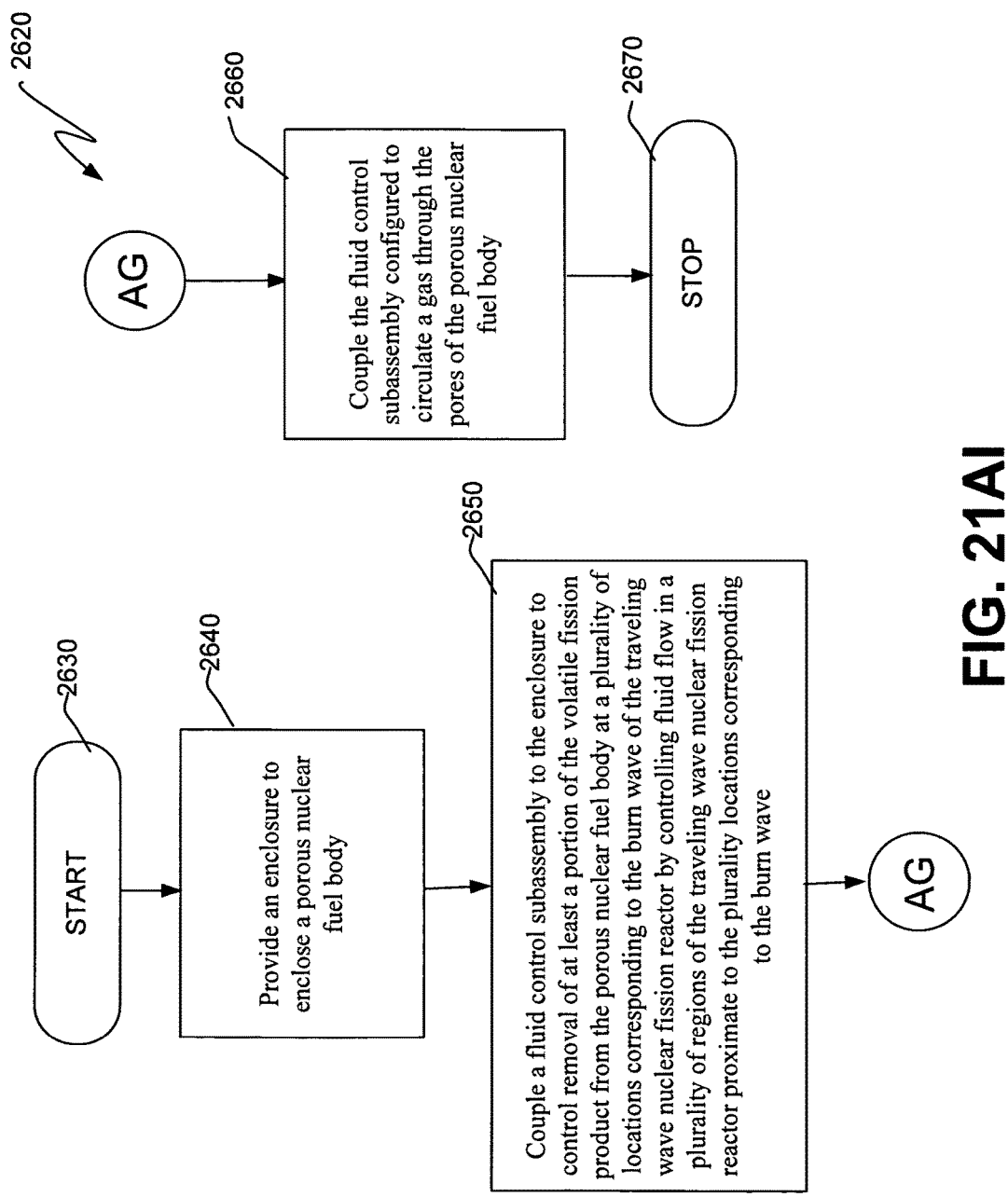
Figure 21A:
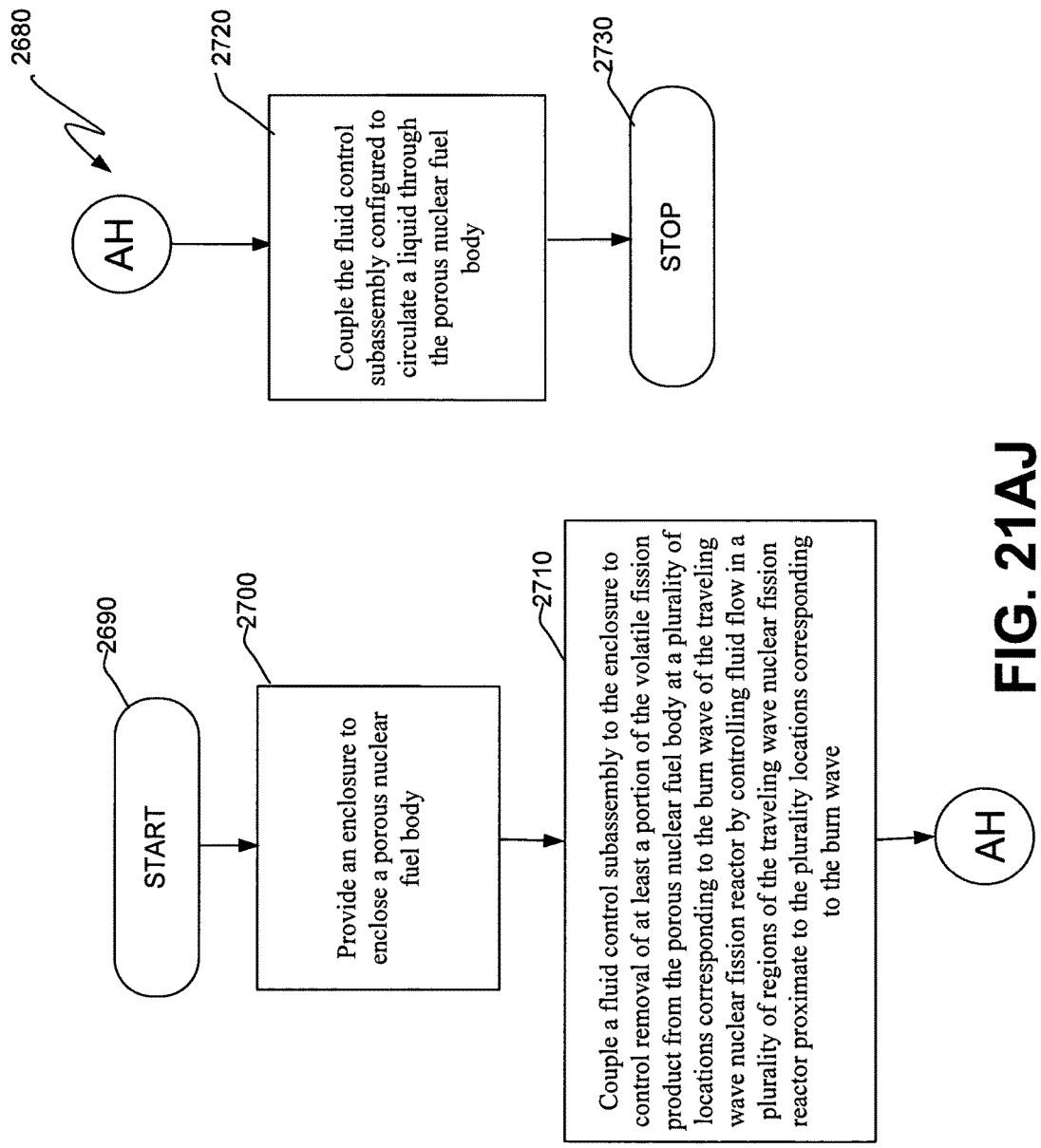
Figure 21A:
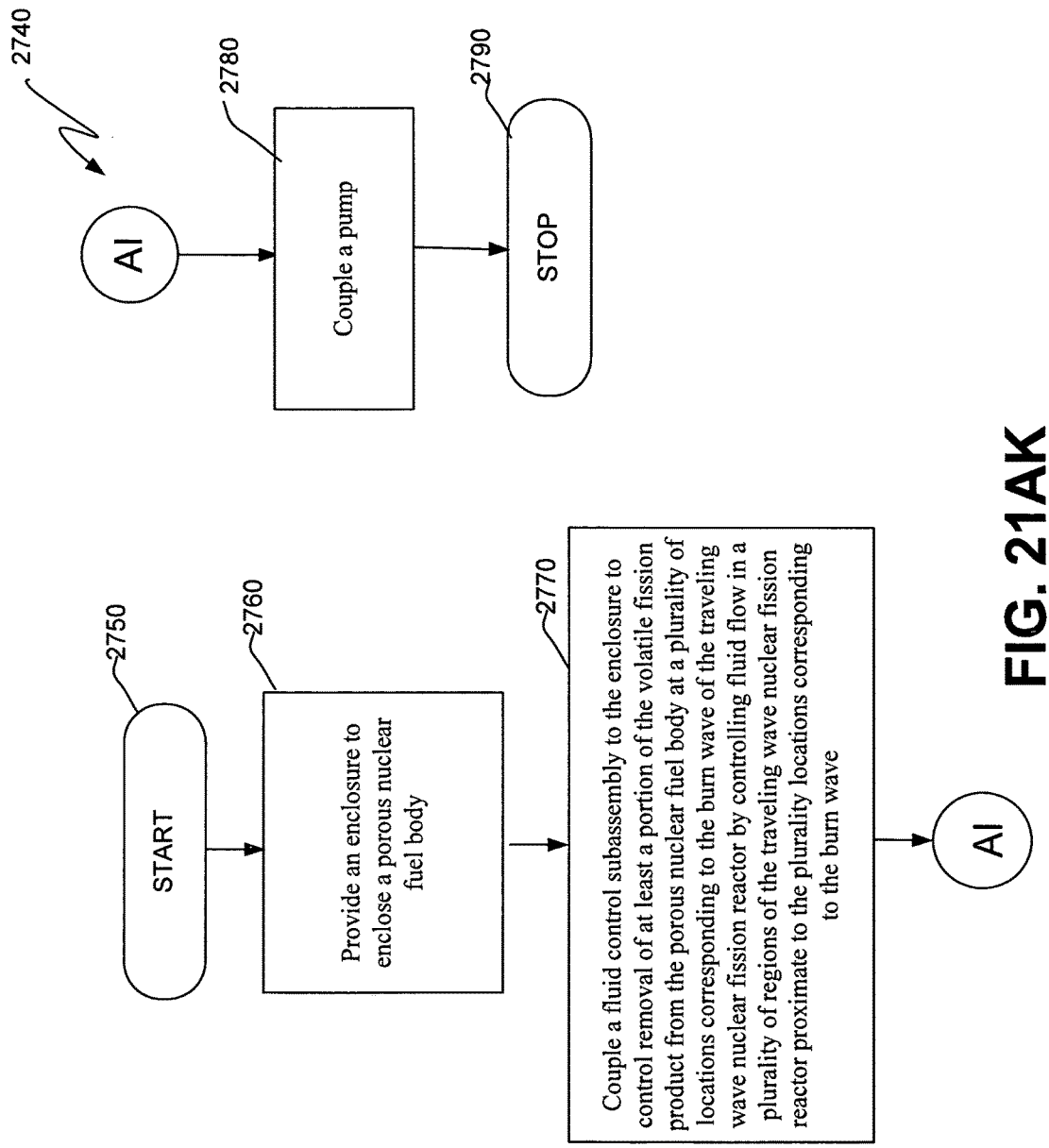
Figure 21A:
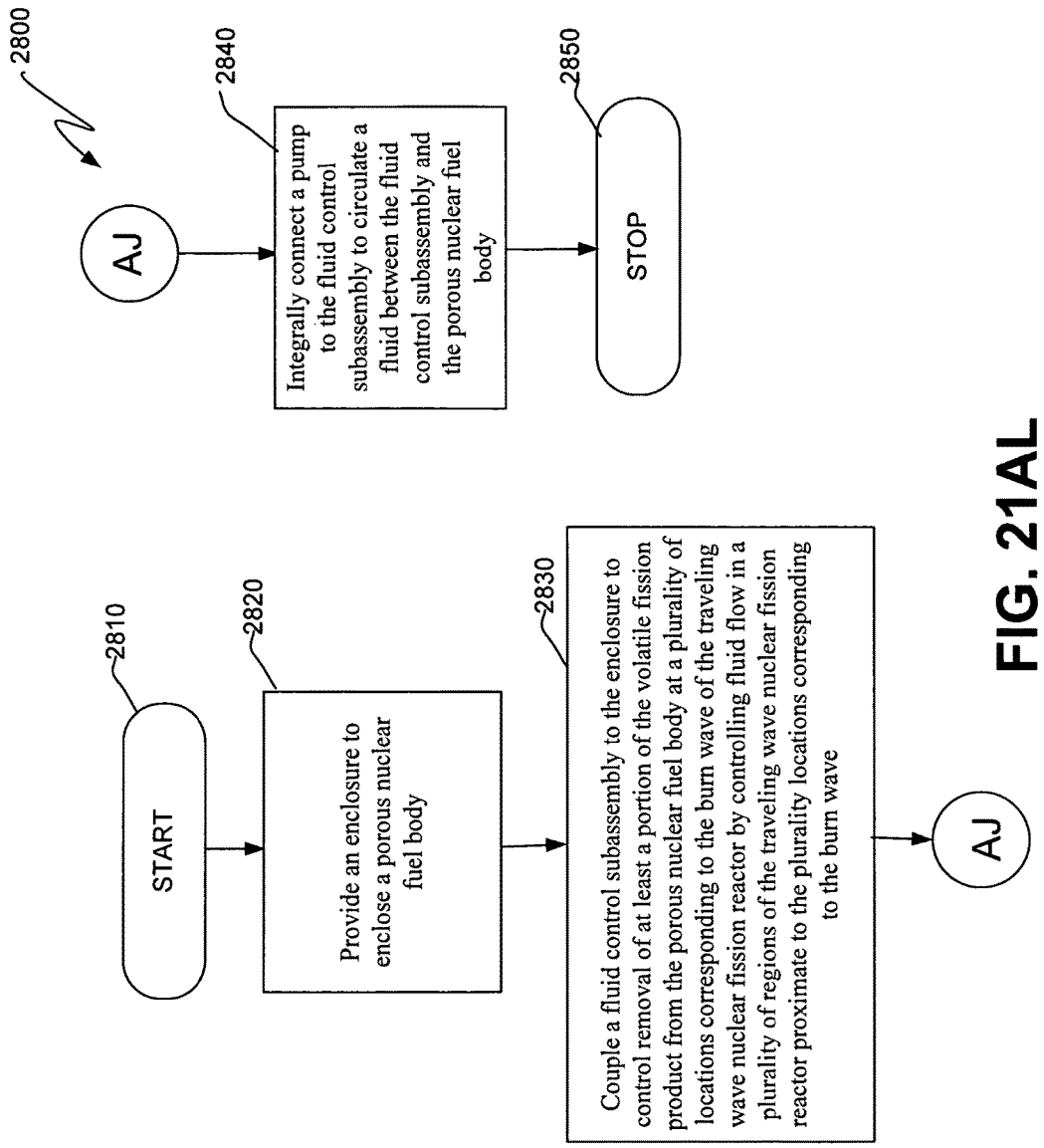
Figure 21A:
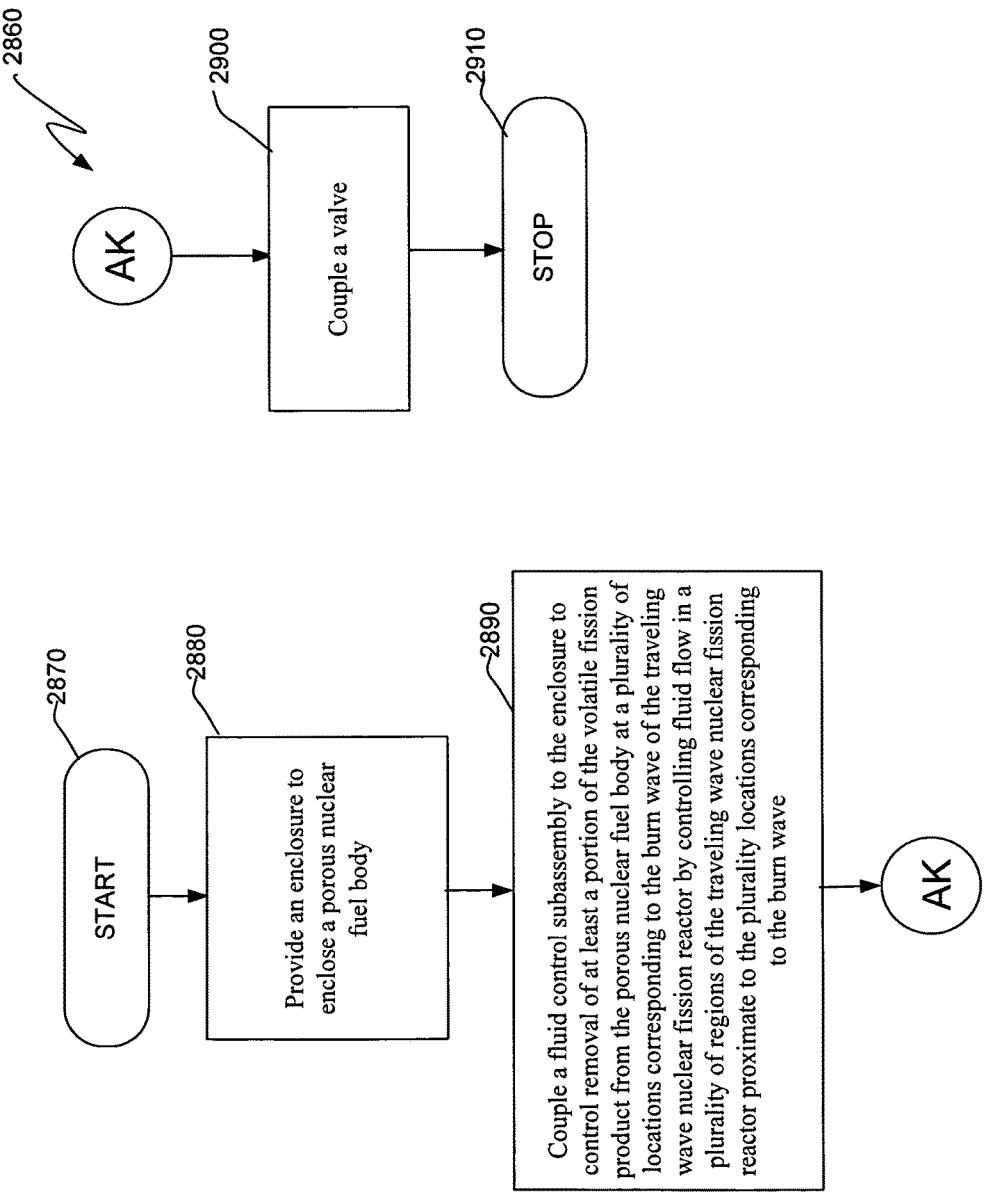
Figure 21A:
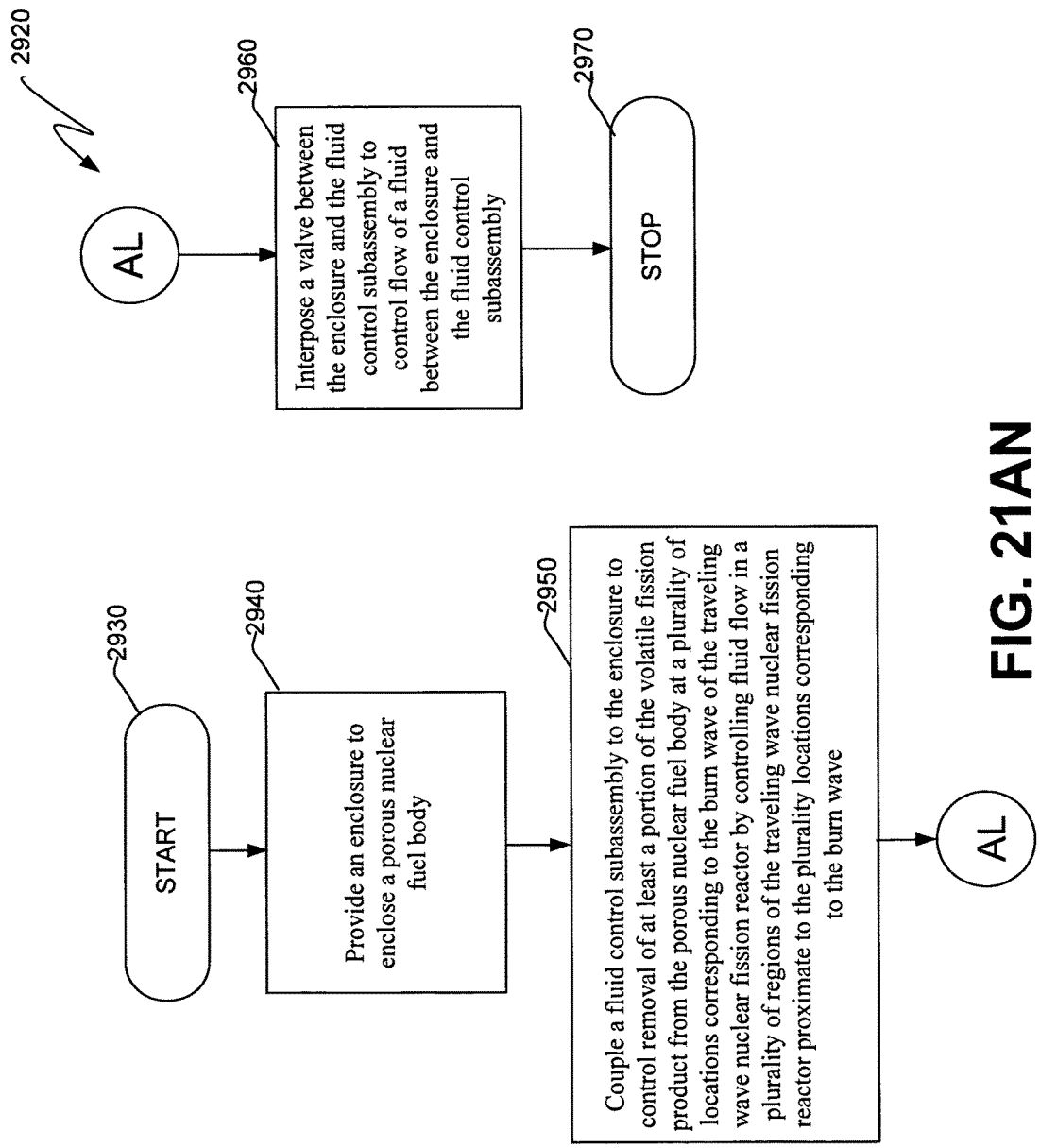
Figure 21A:
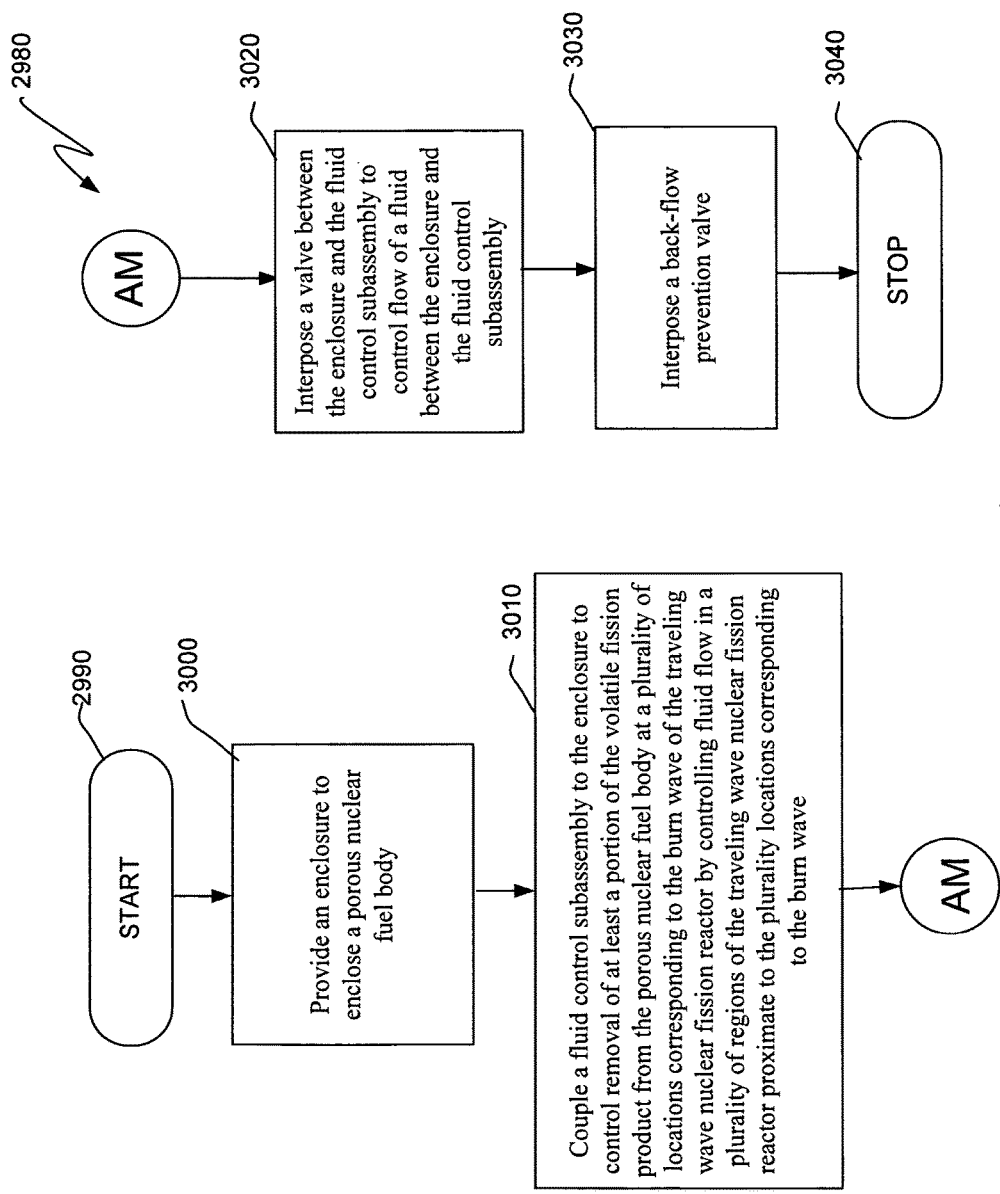
Figure 21A:
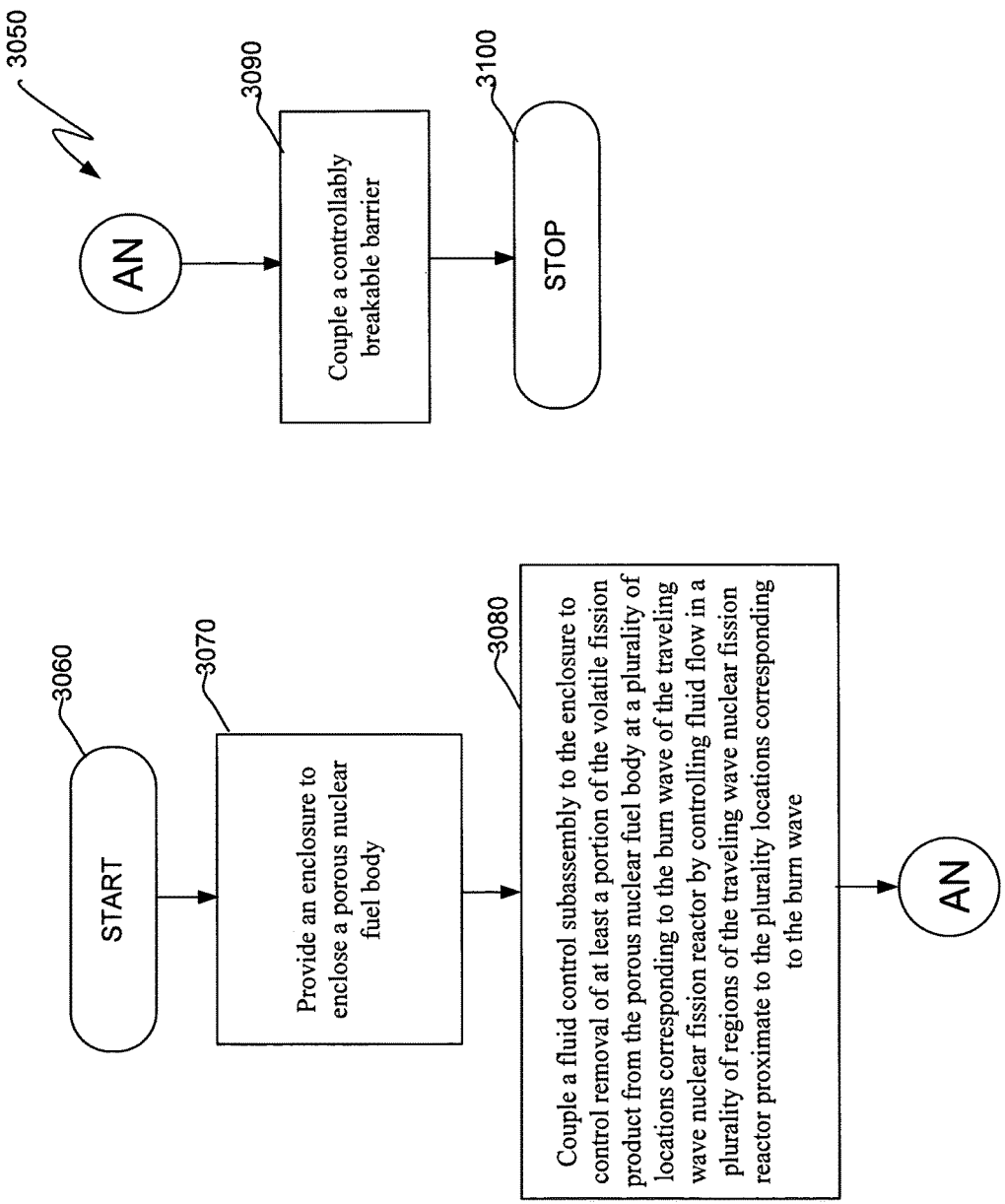
Figure 21A:
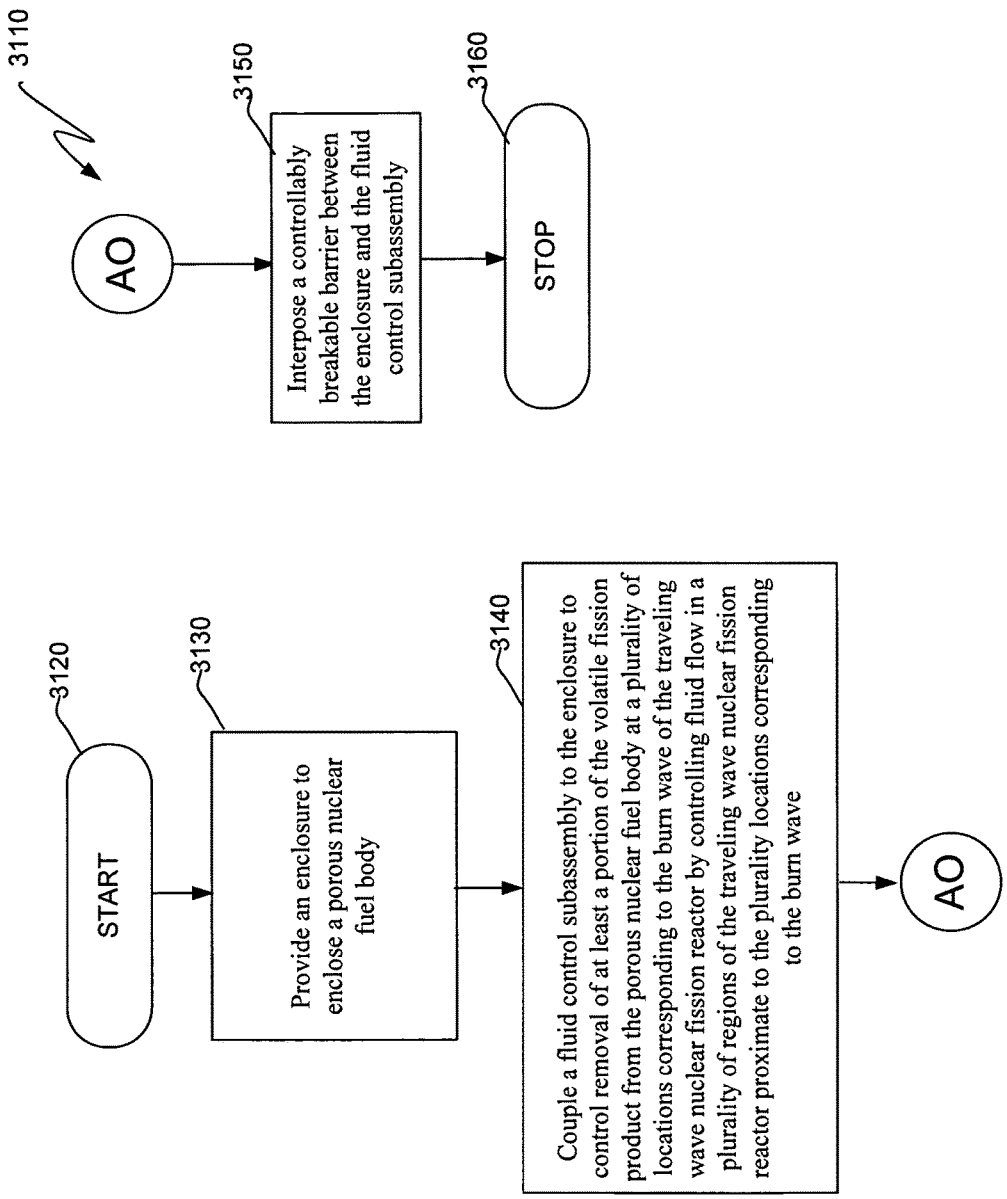
Figure 21A:
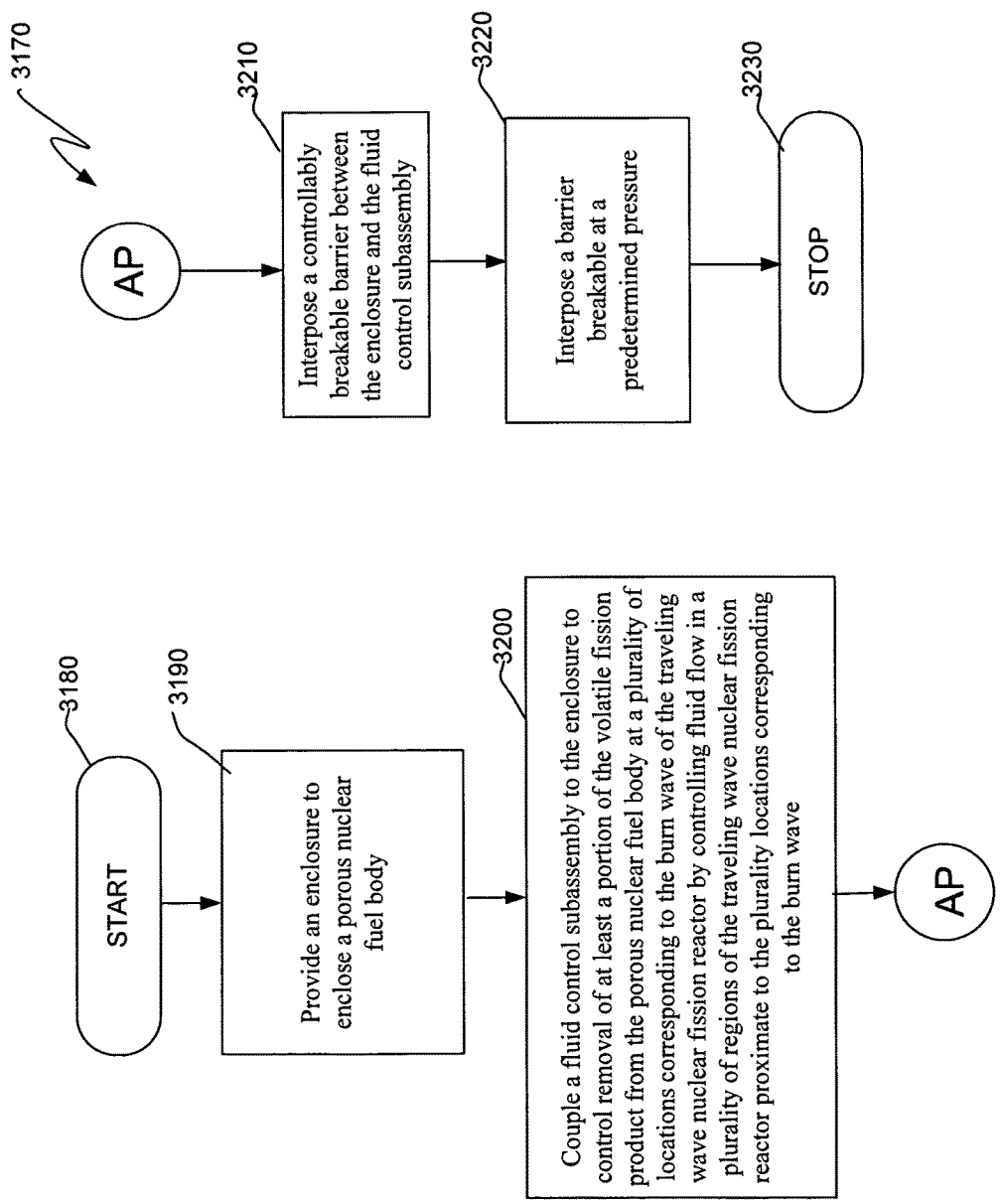
Figure 21A:
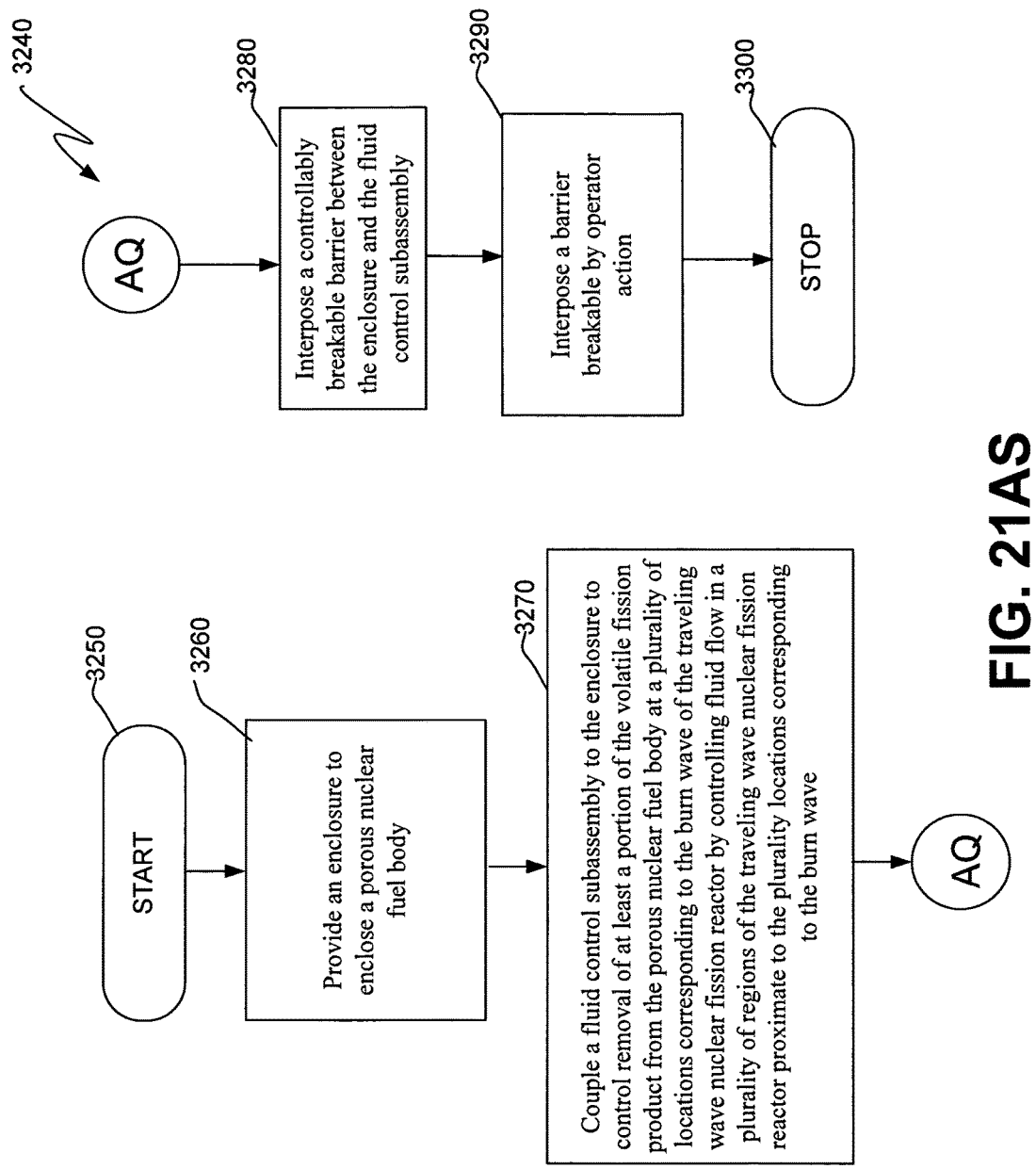
Figure 21A:
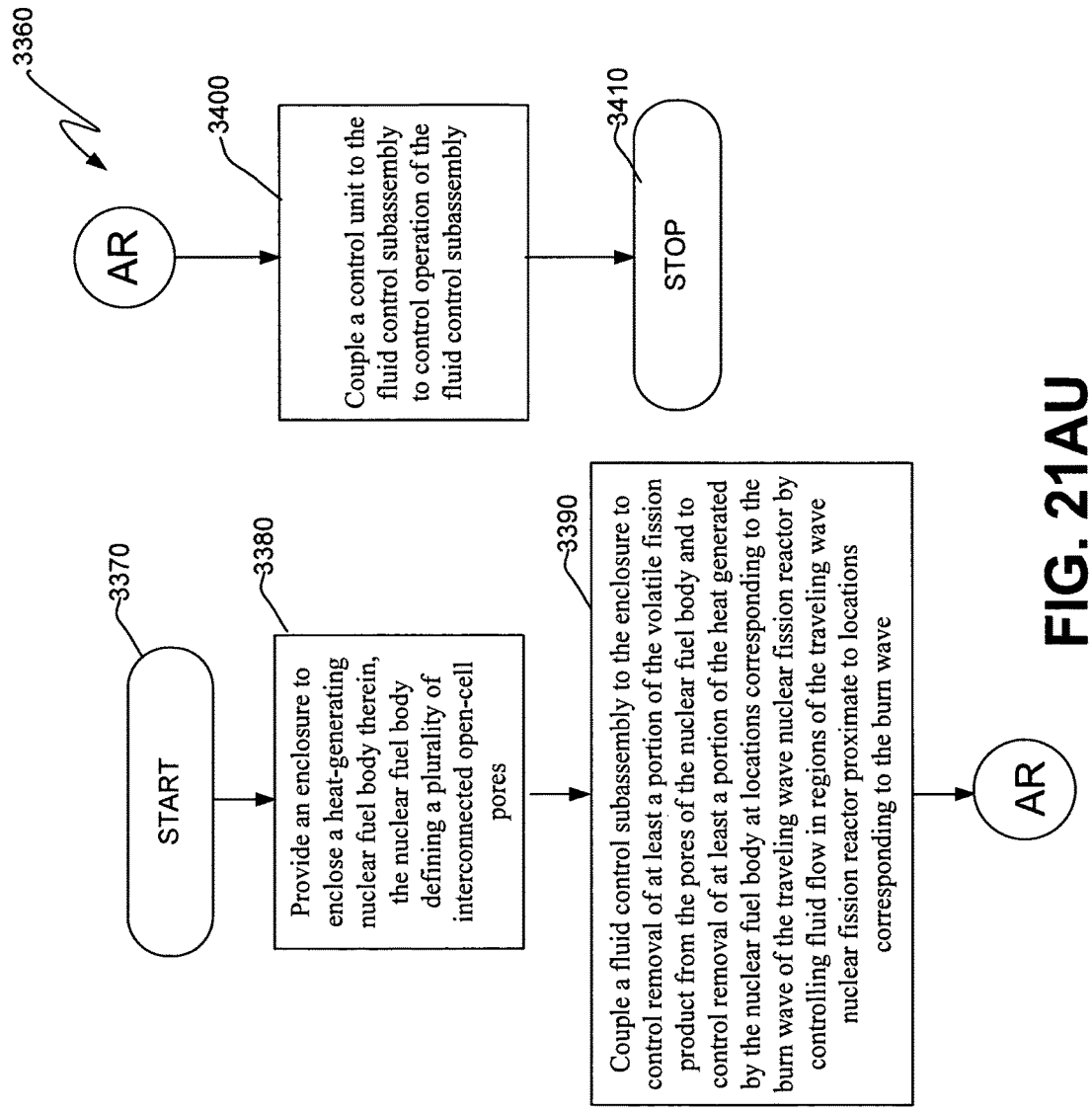
Figure 21A:
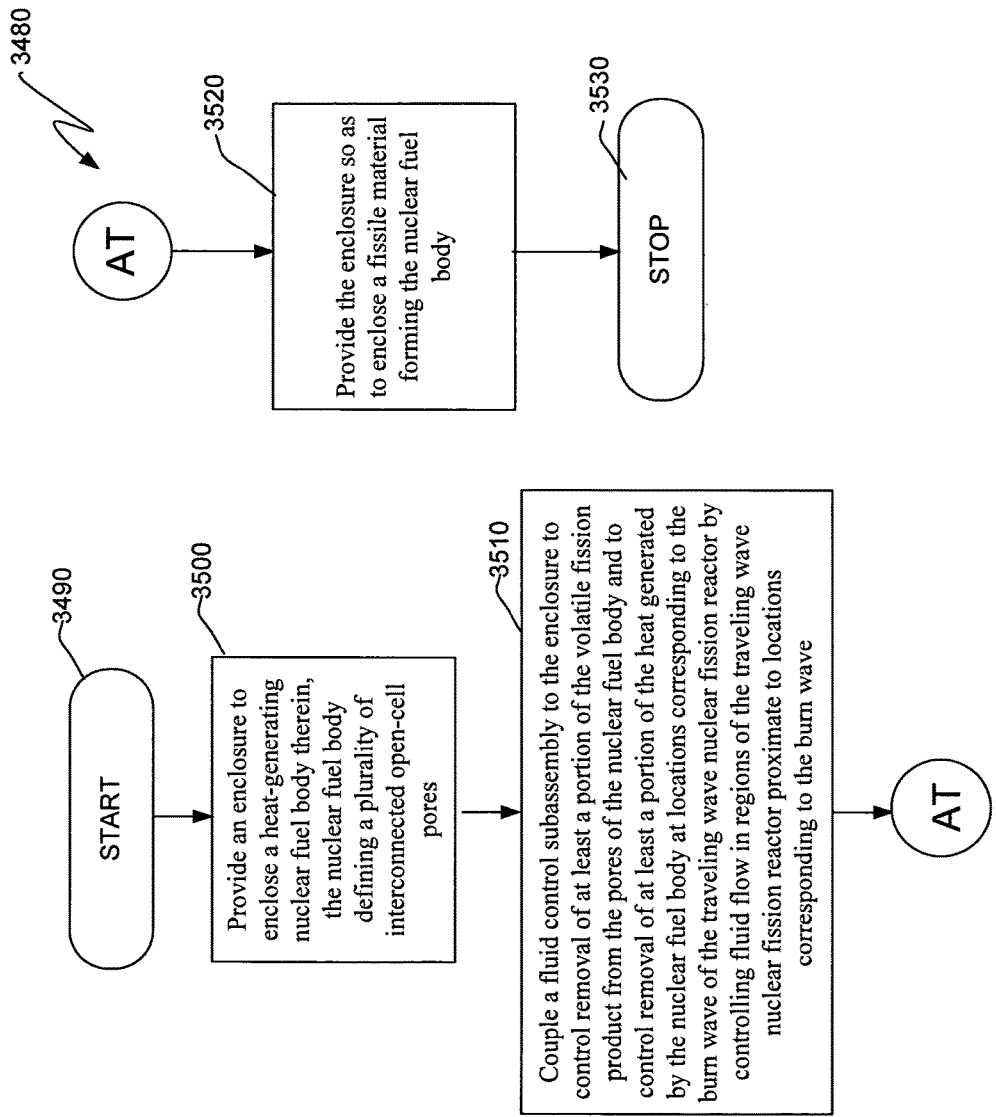
Figure 21A:
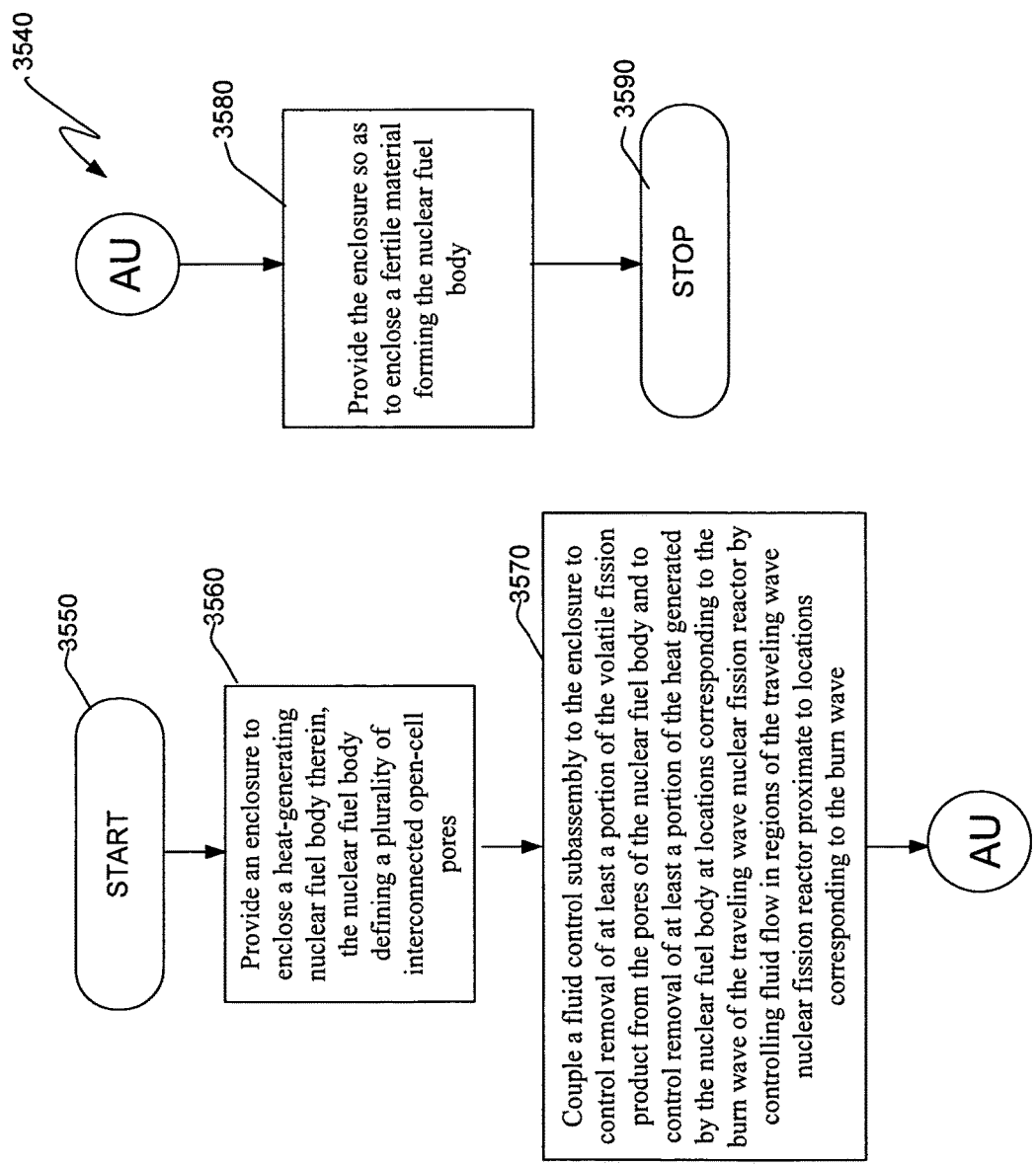
Figure 21A:
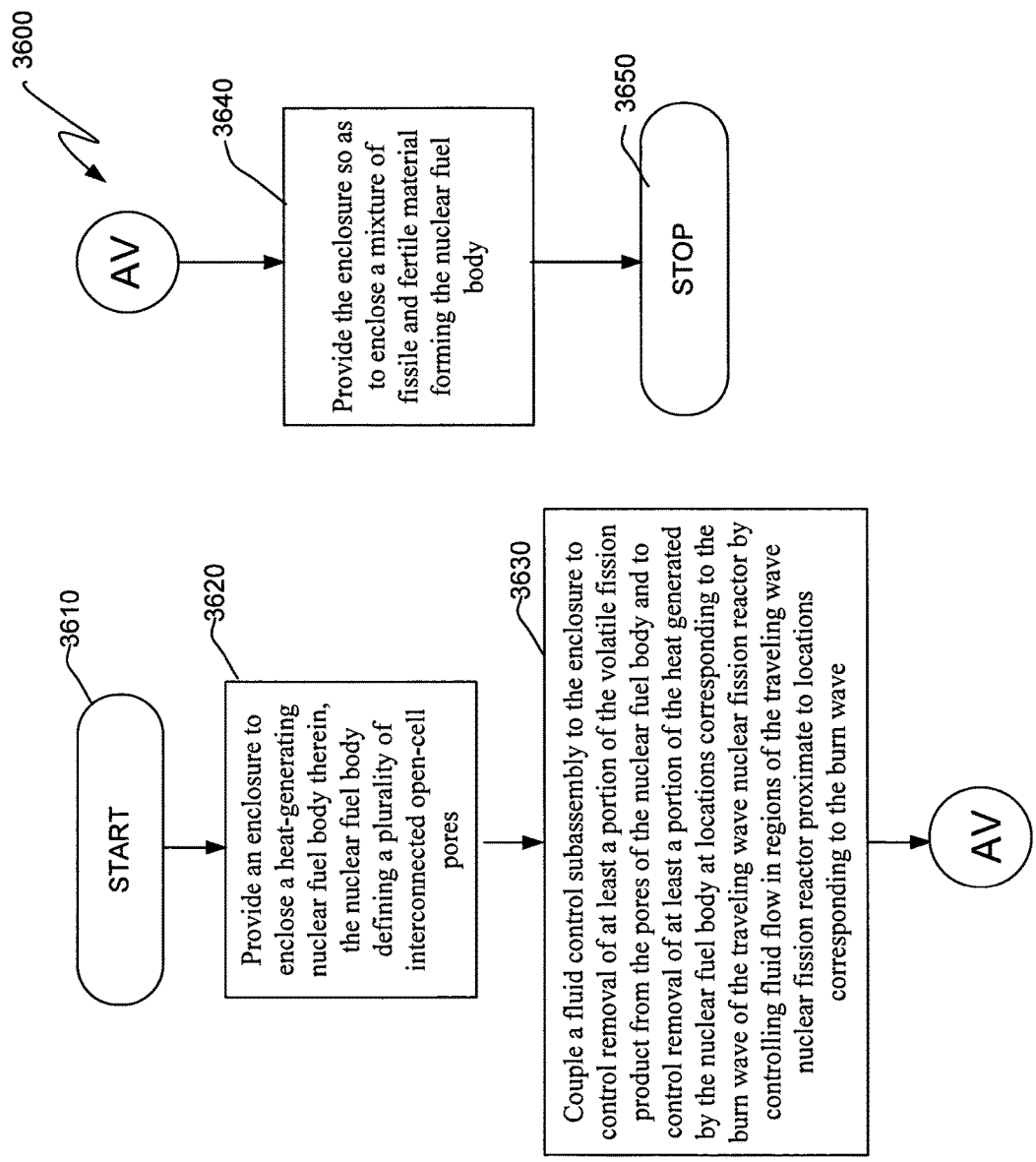
Figure 21A:
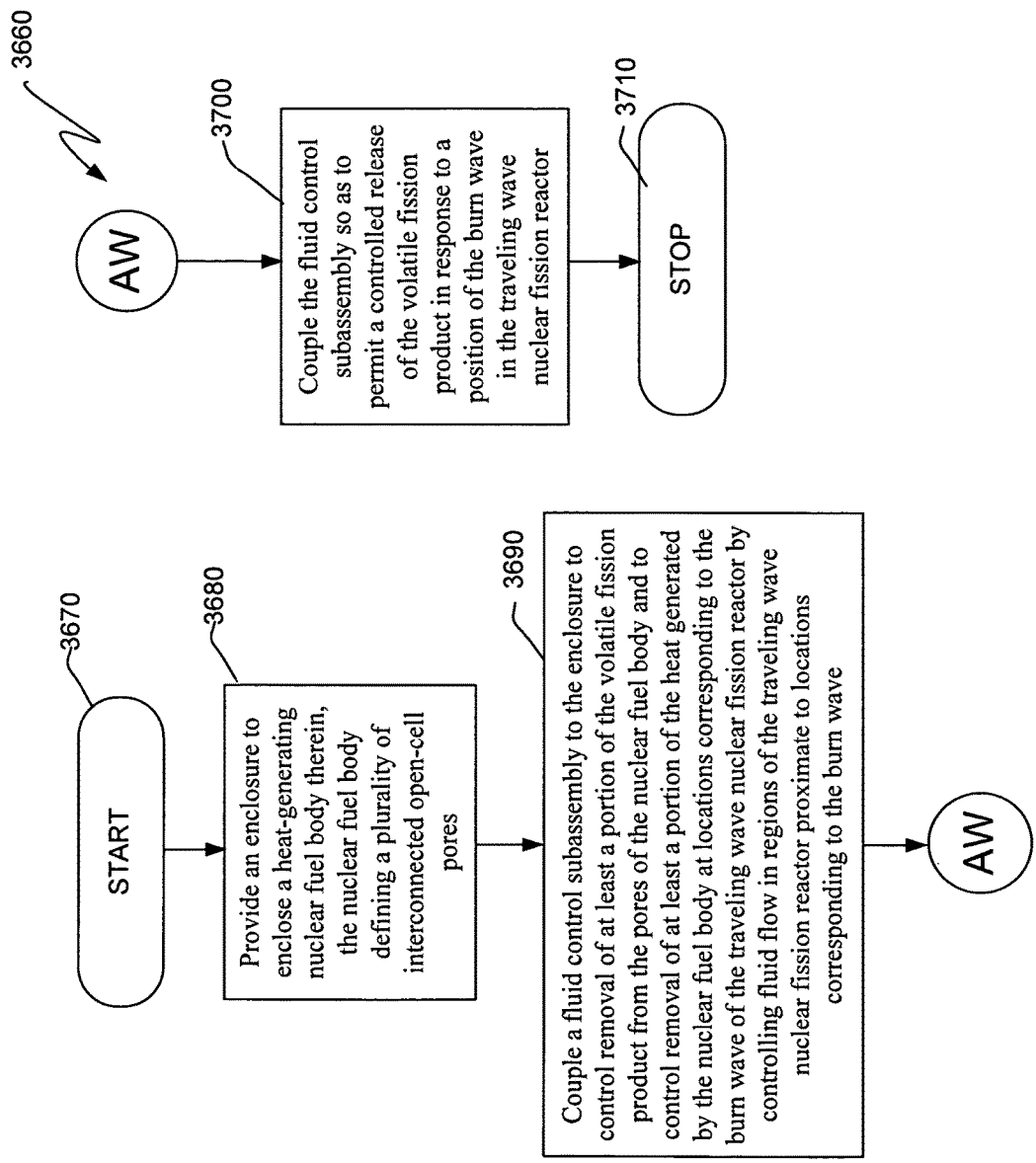
Figure 21B:
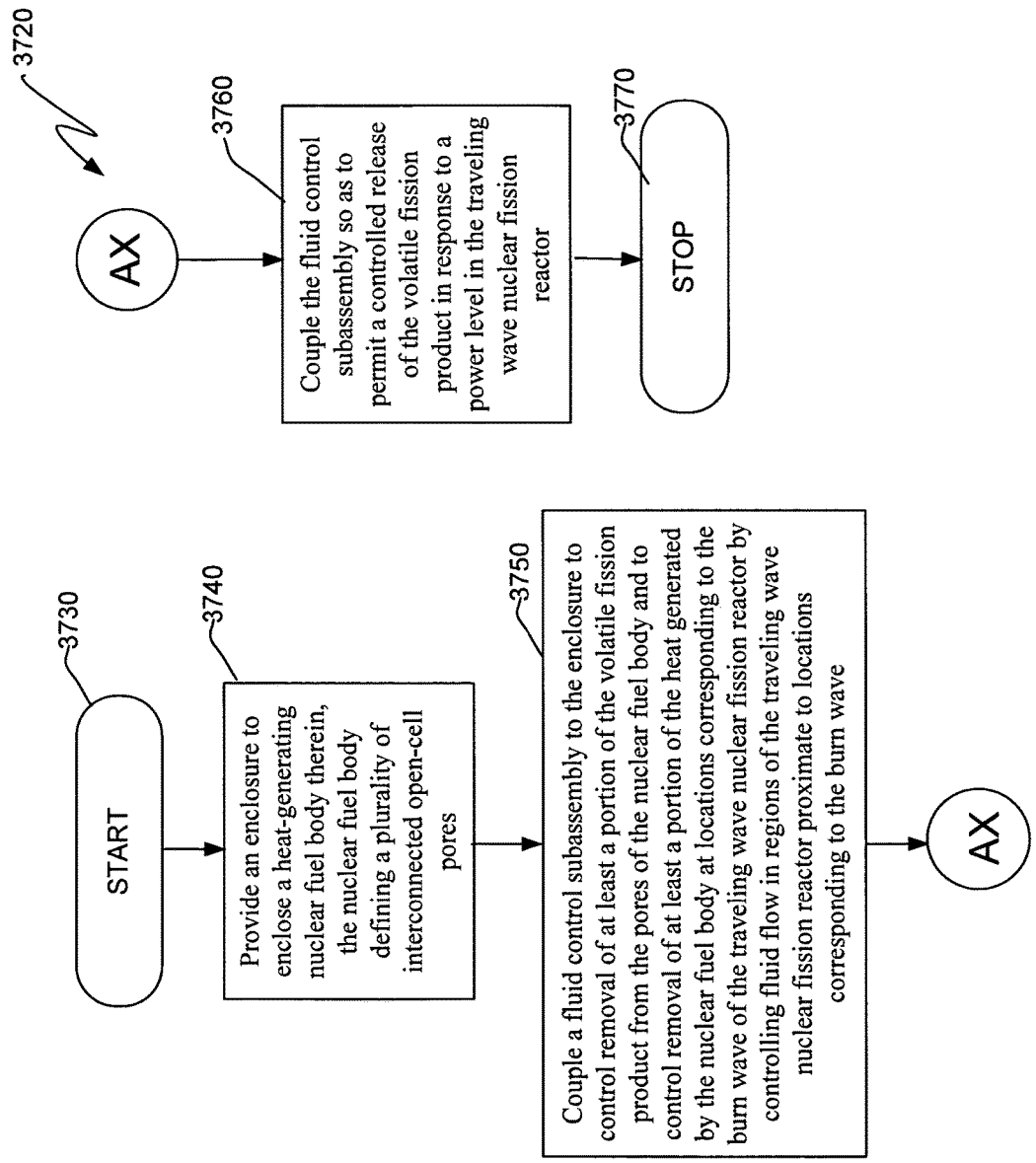
Figure 21B:
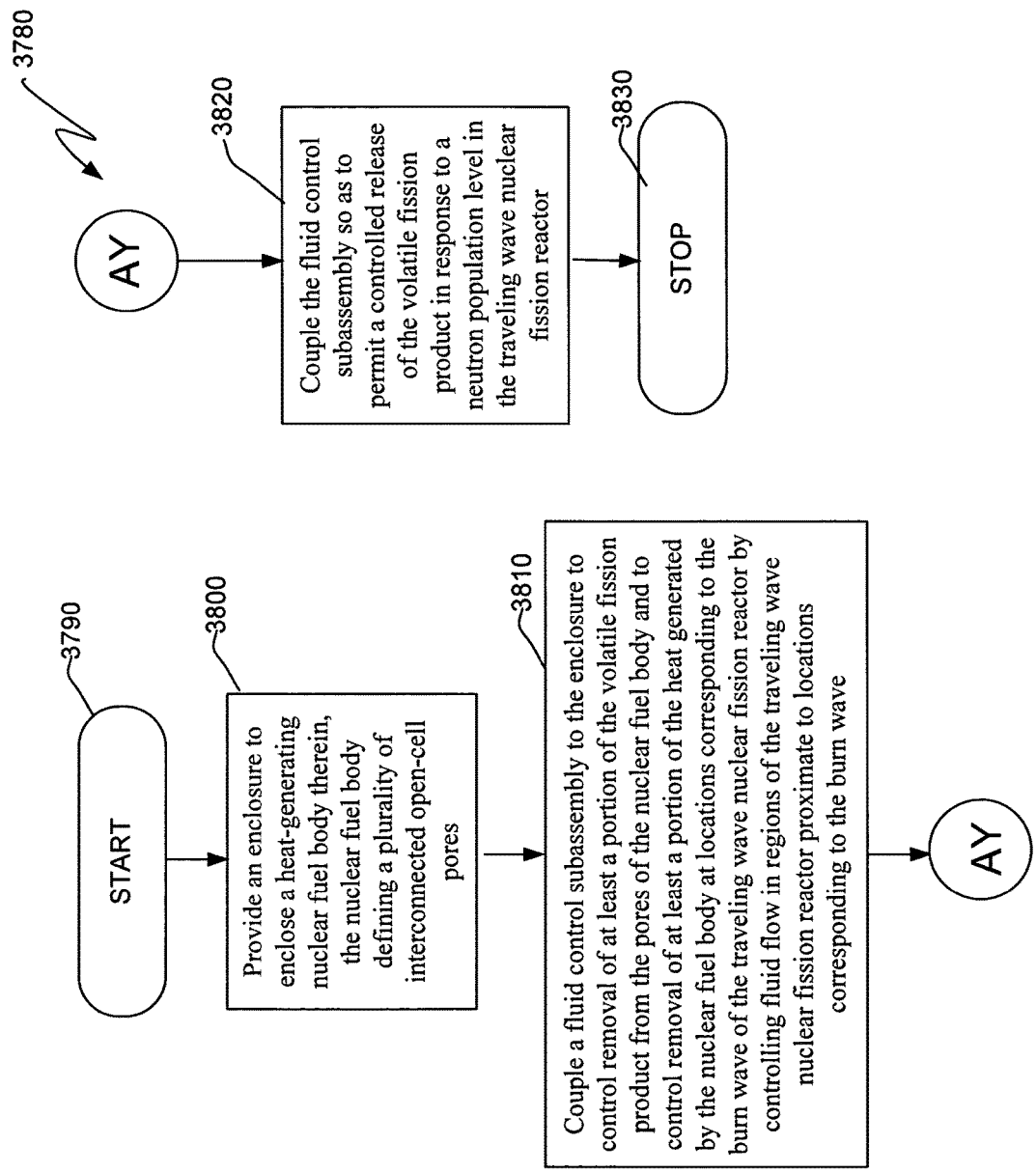
Figure 21B:
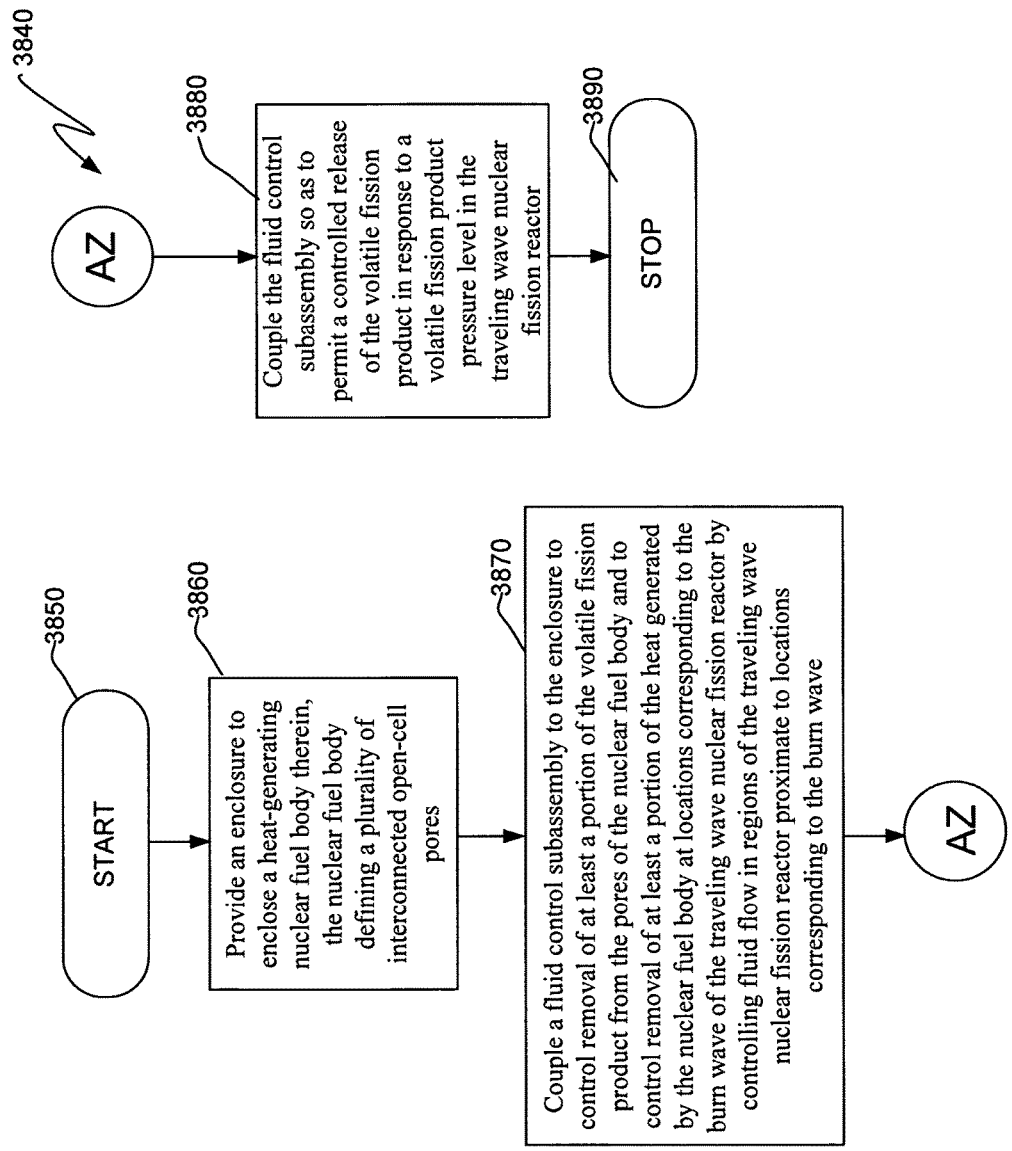
Figure 21B:
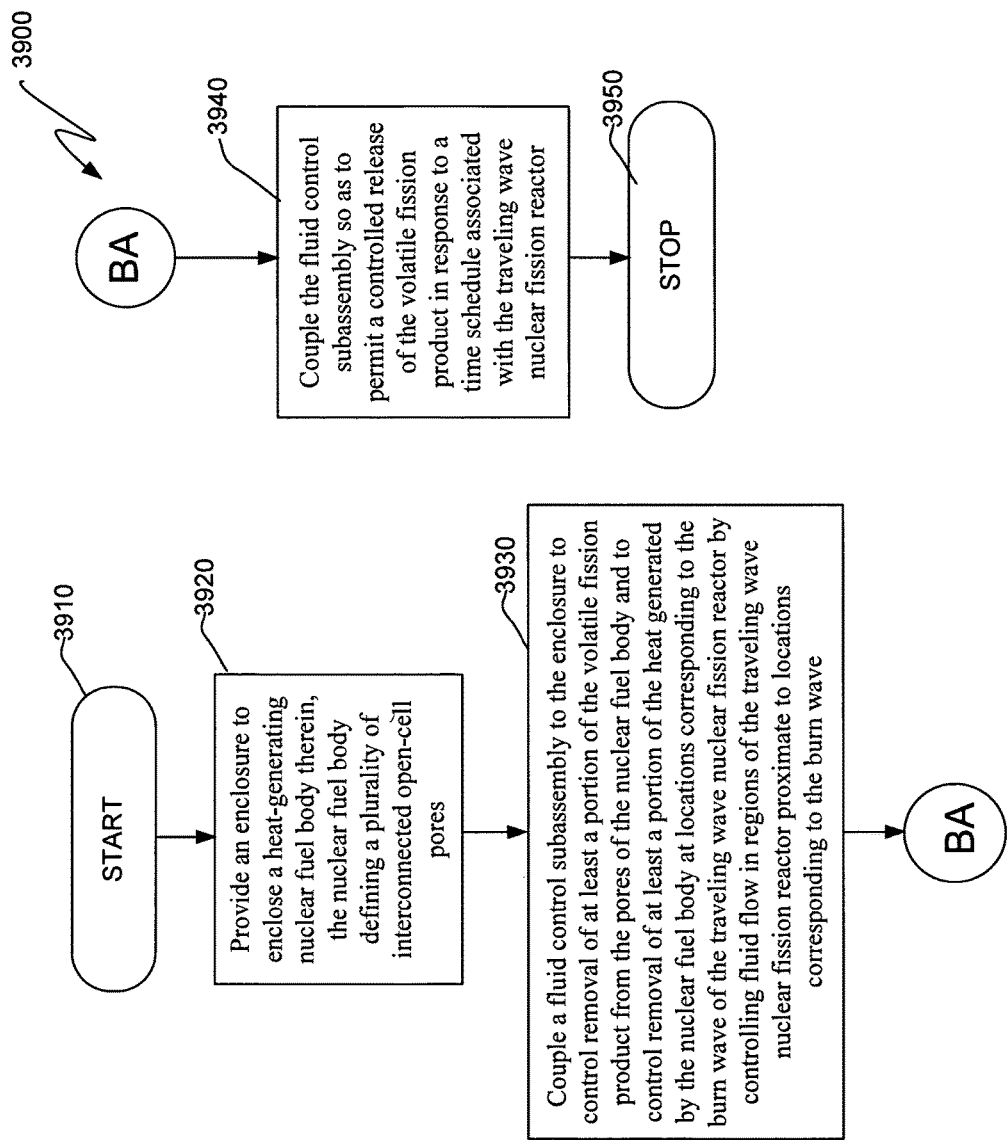
Figure 21B:
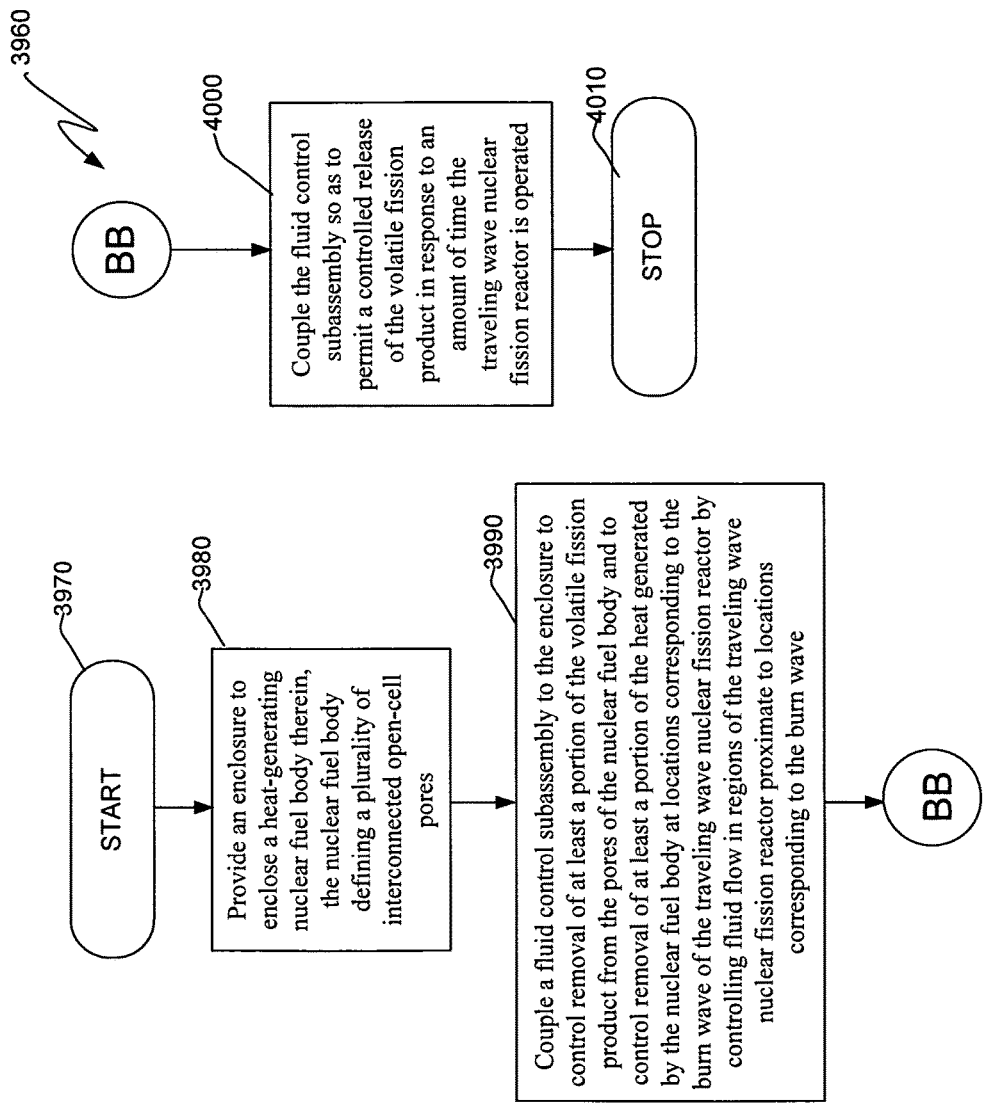
Figure 21B:
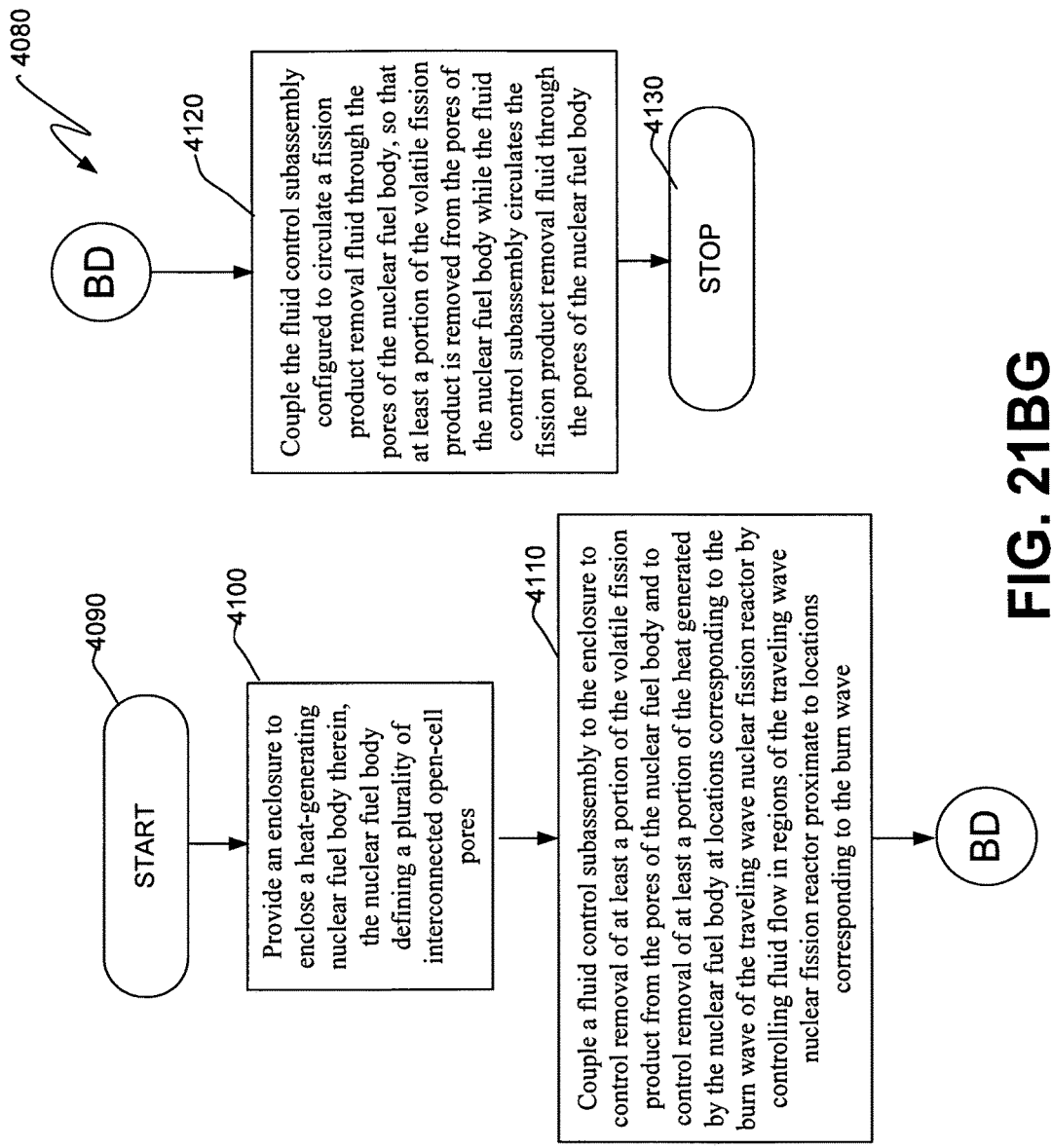
Figure 21B:
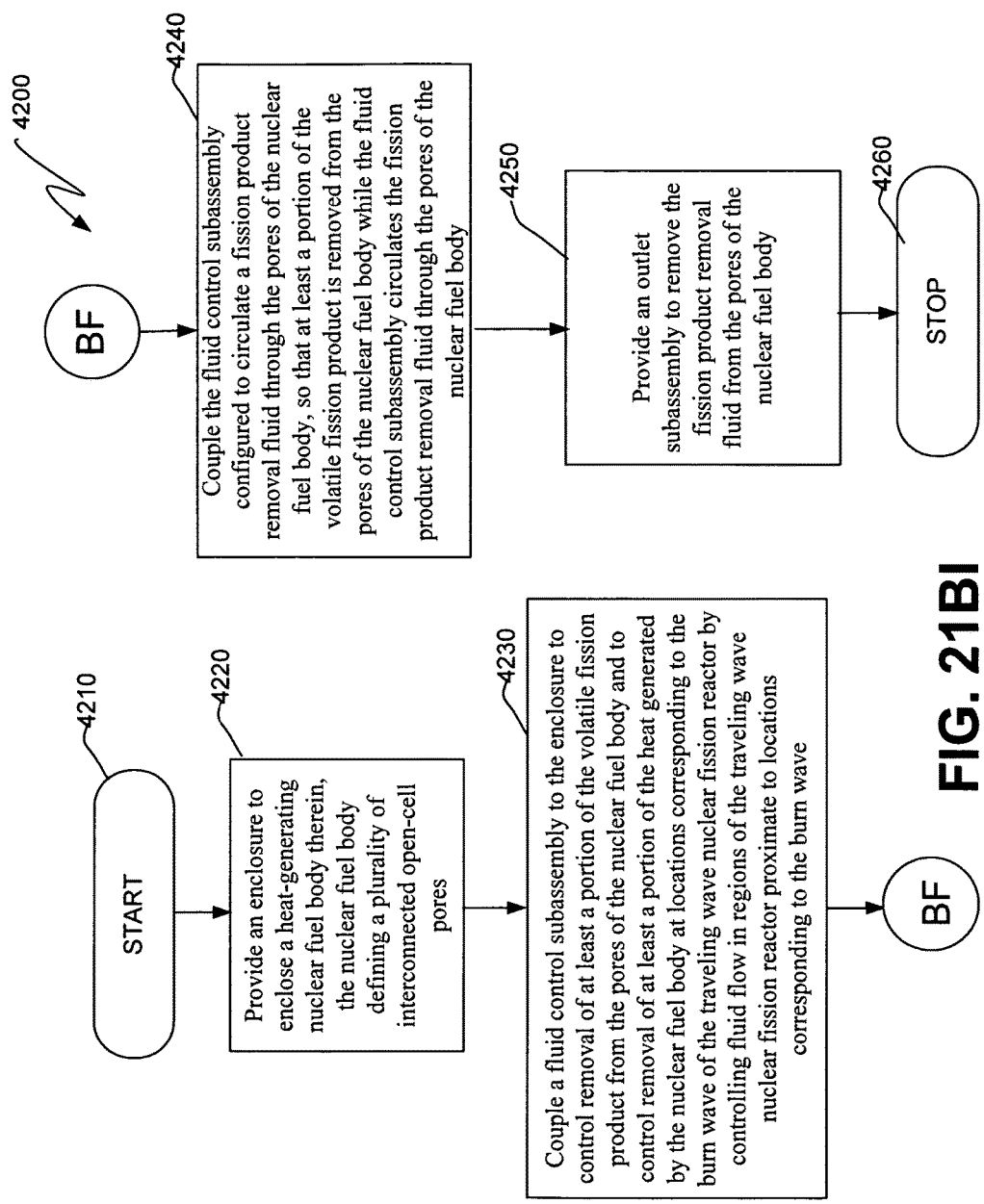
Figure 21B:
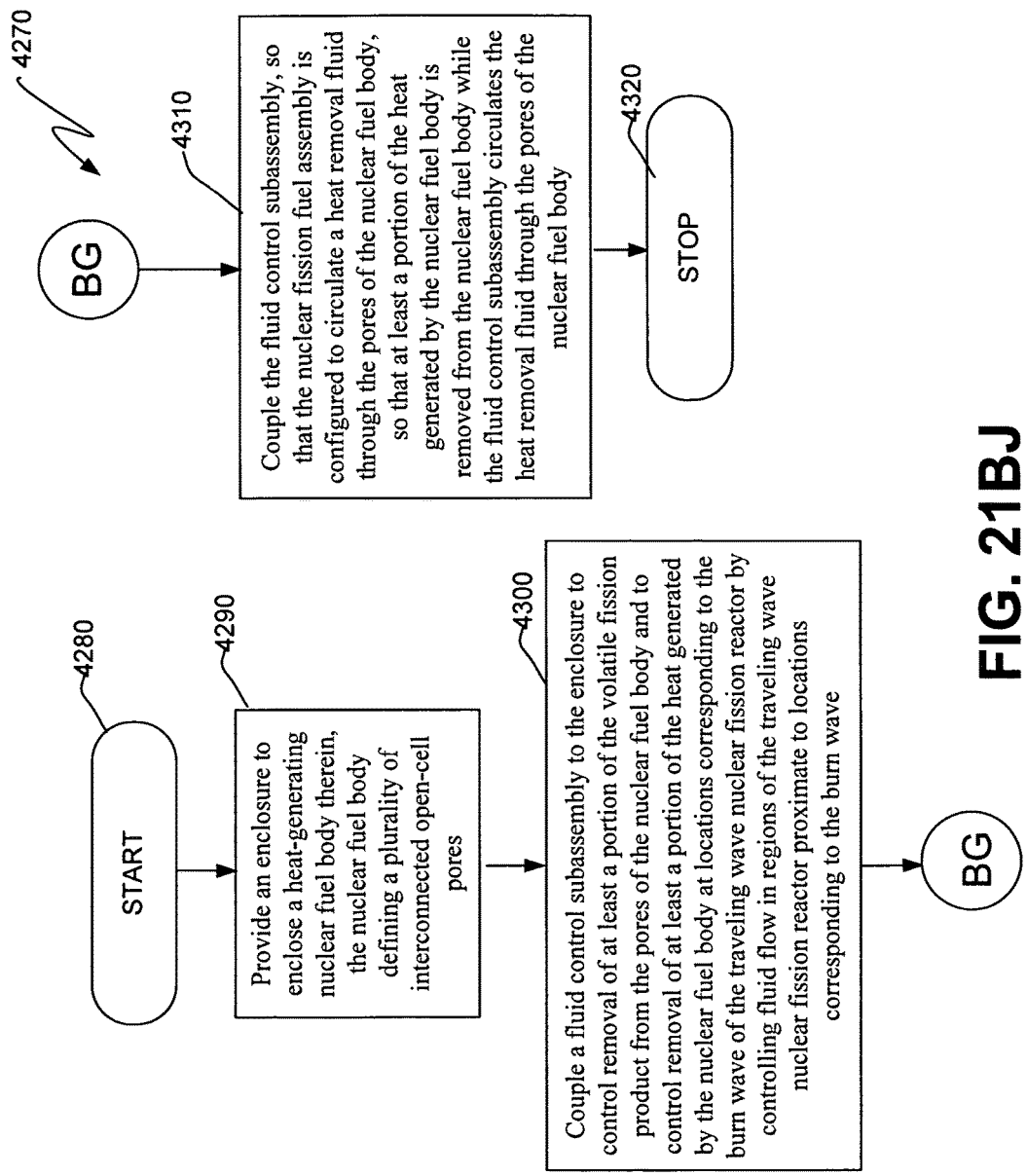
Figure 21B:
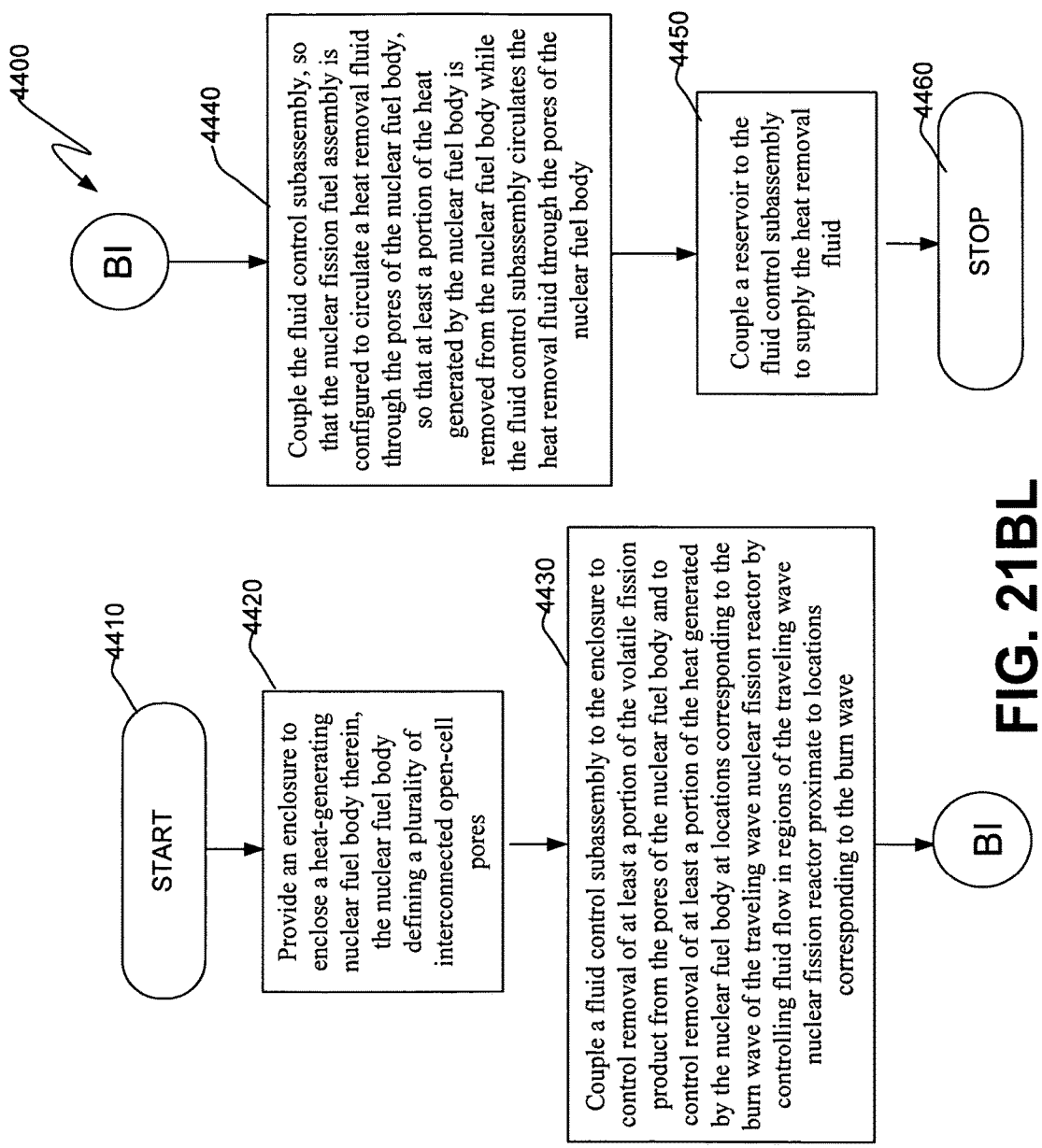
Figure 21B:
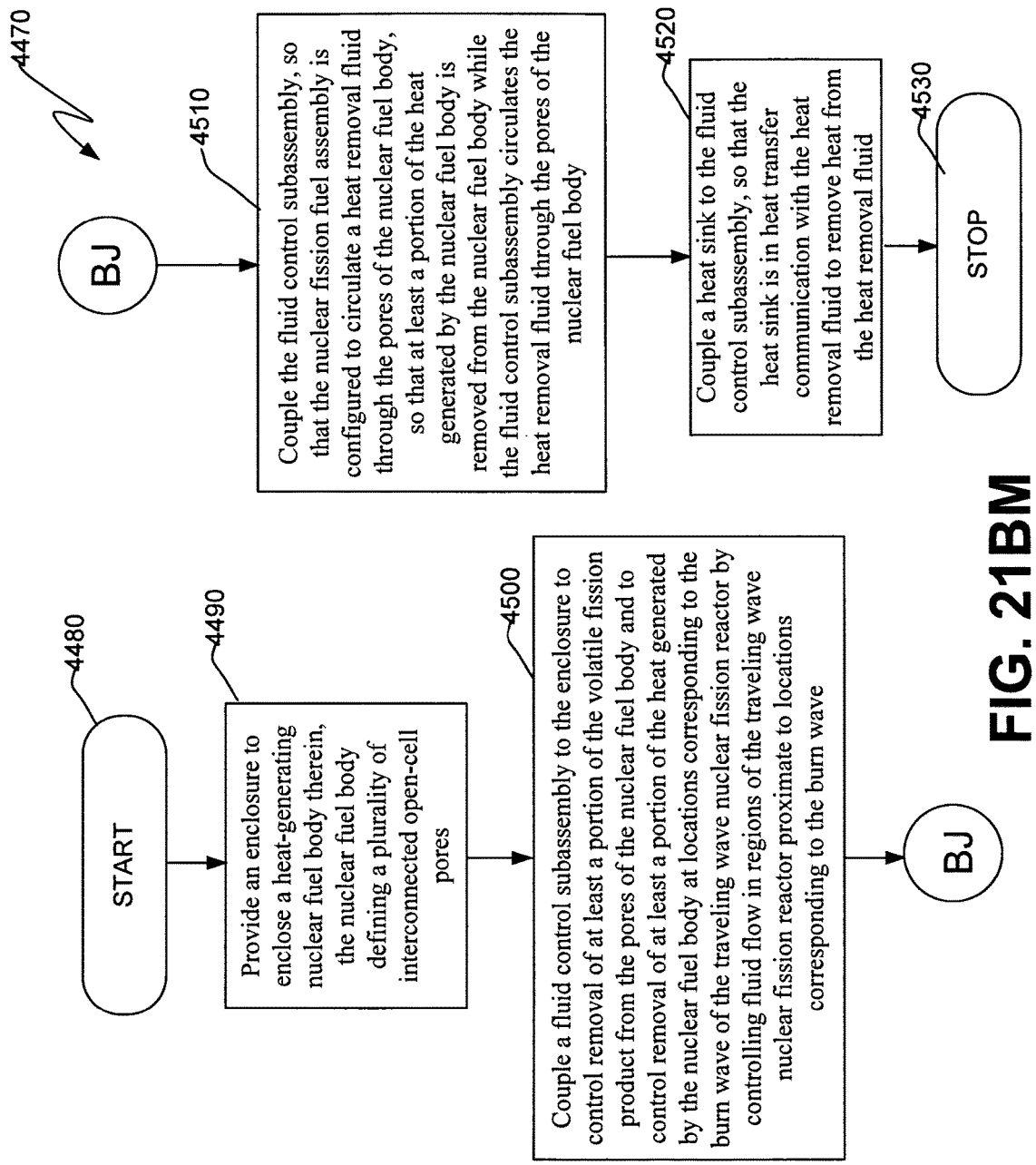
Figure 21B:
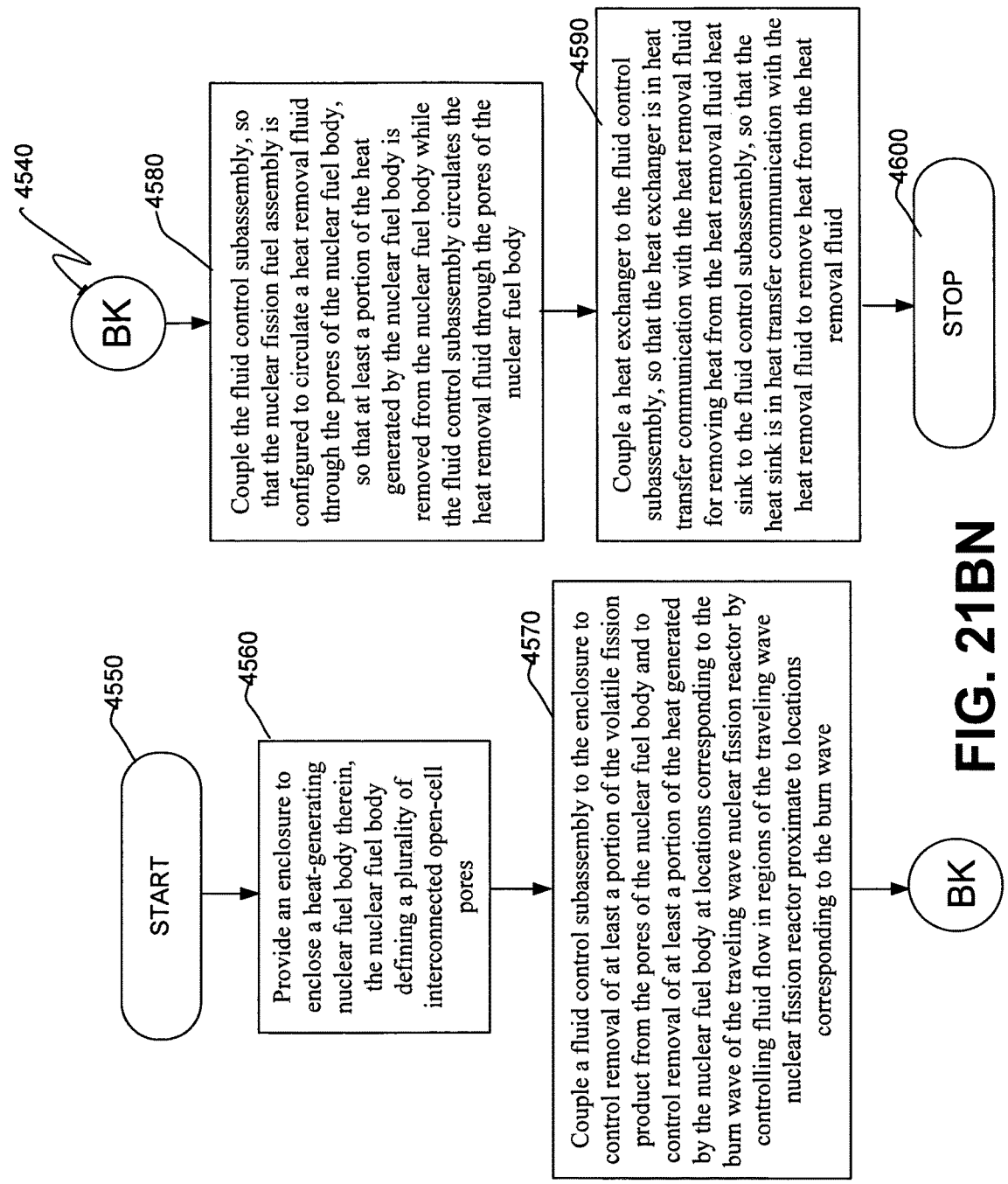
Figure 21B:
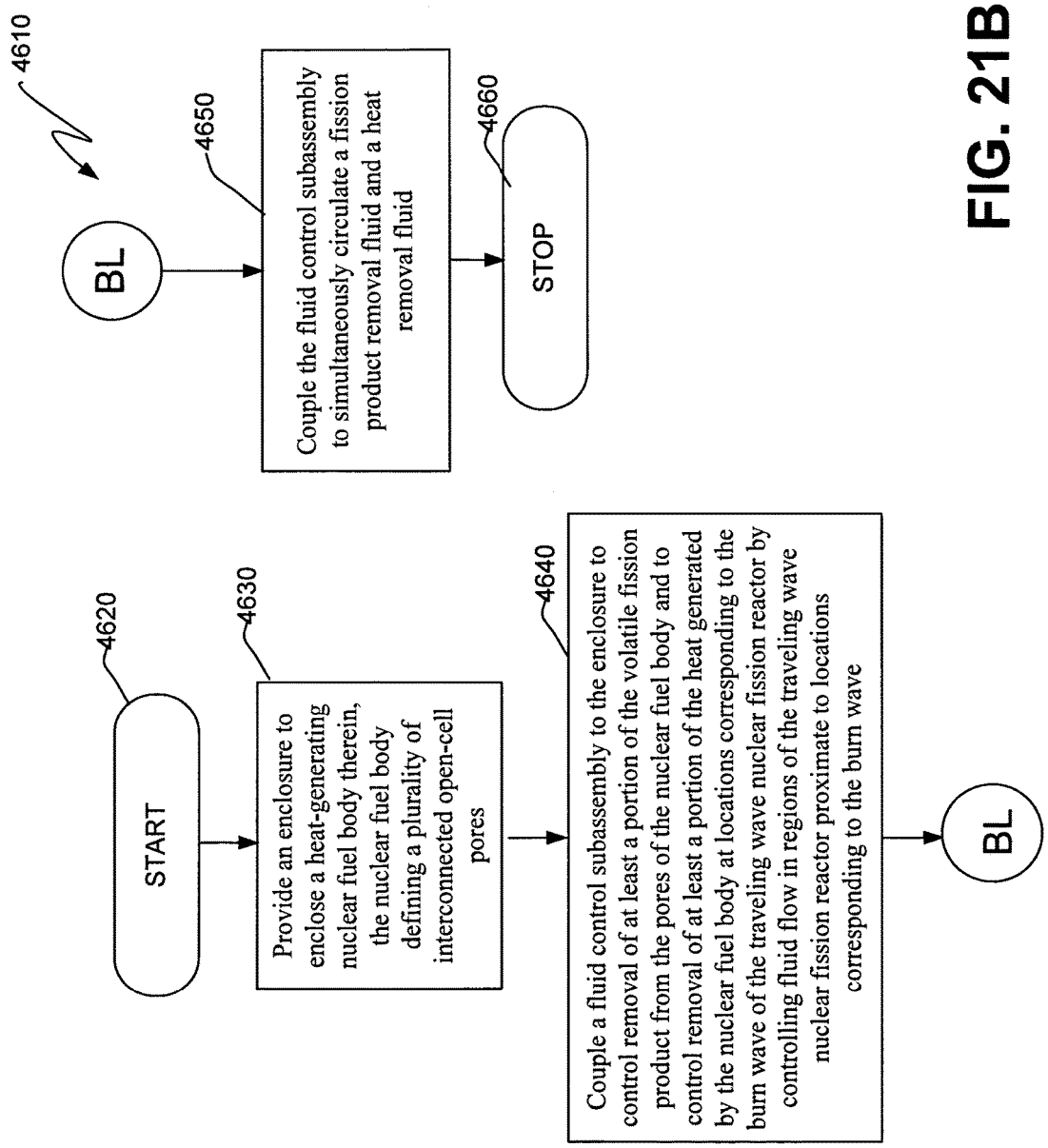
Figure 21B:
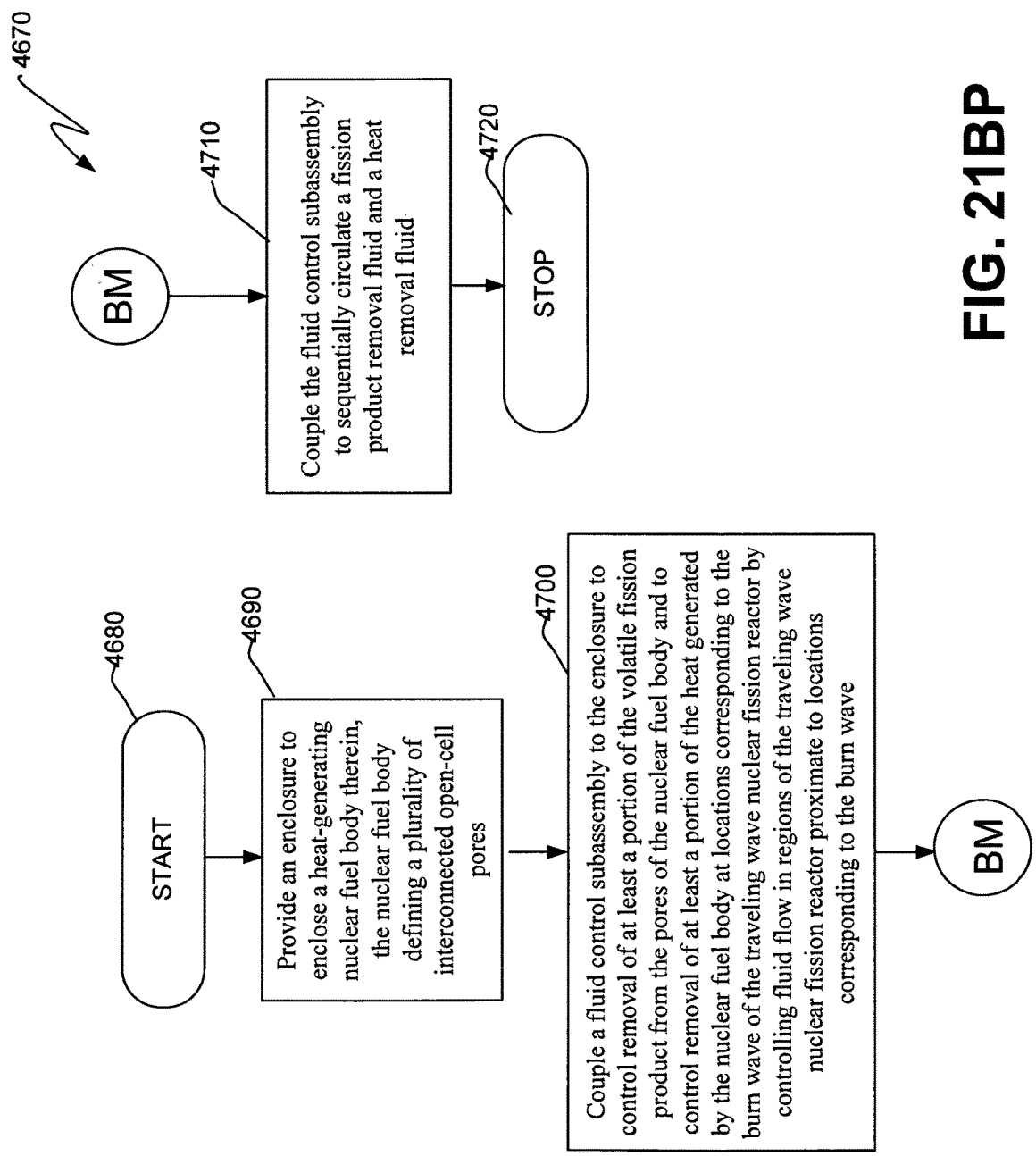
Figure 21B:
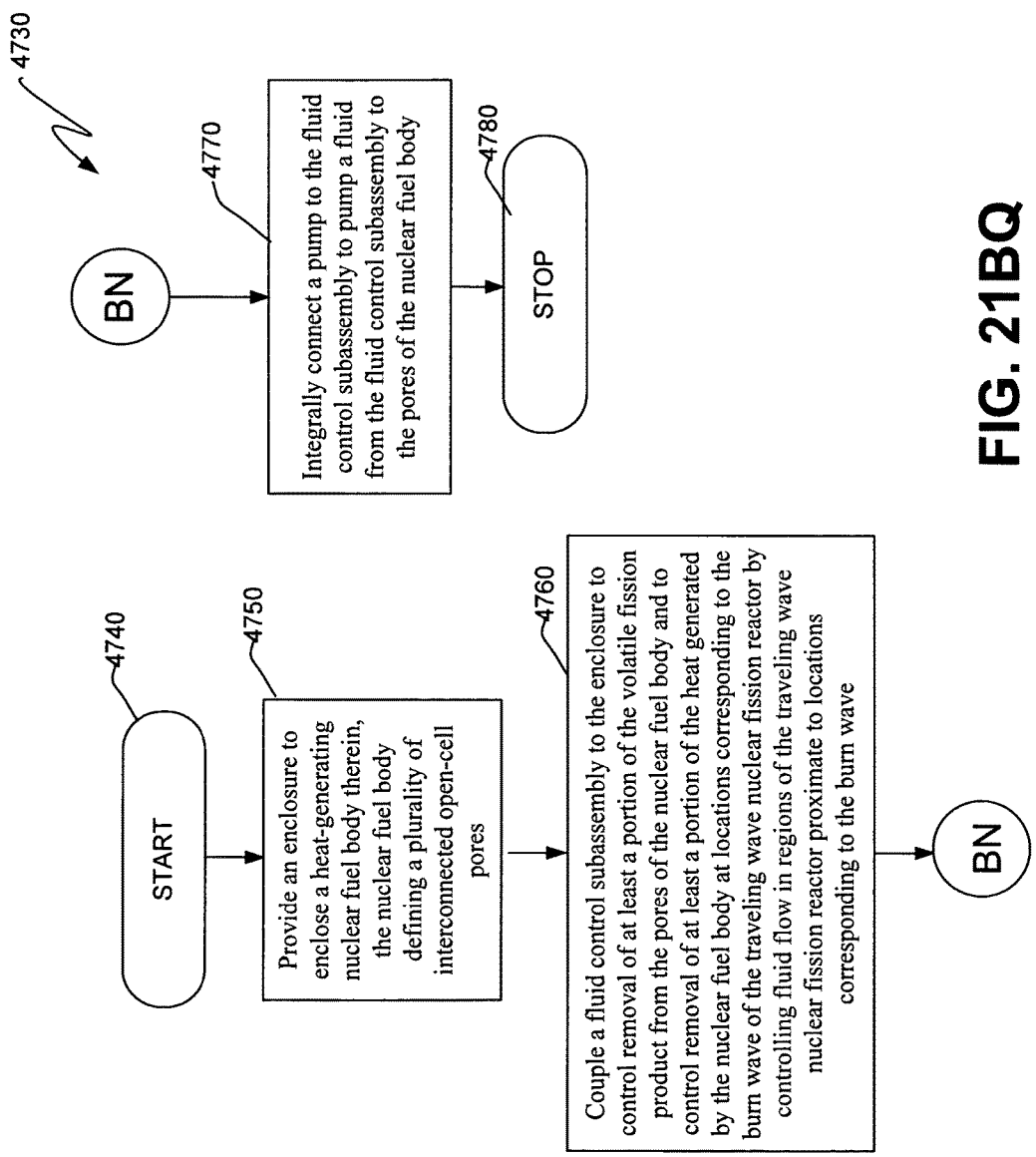
Figure 21B:
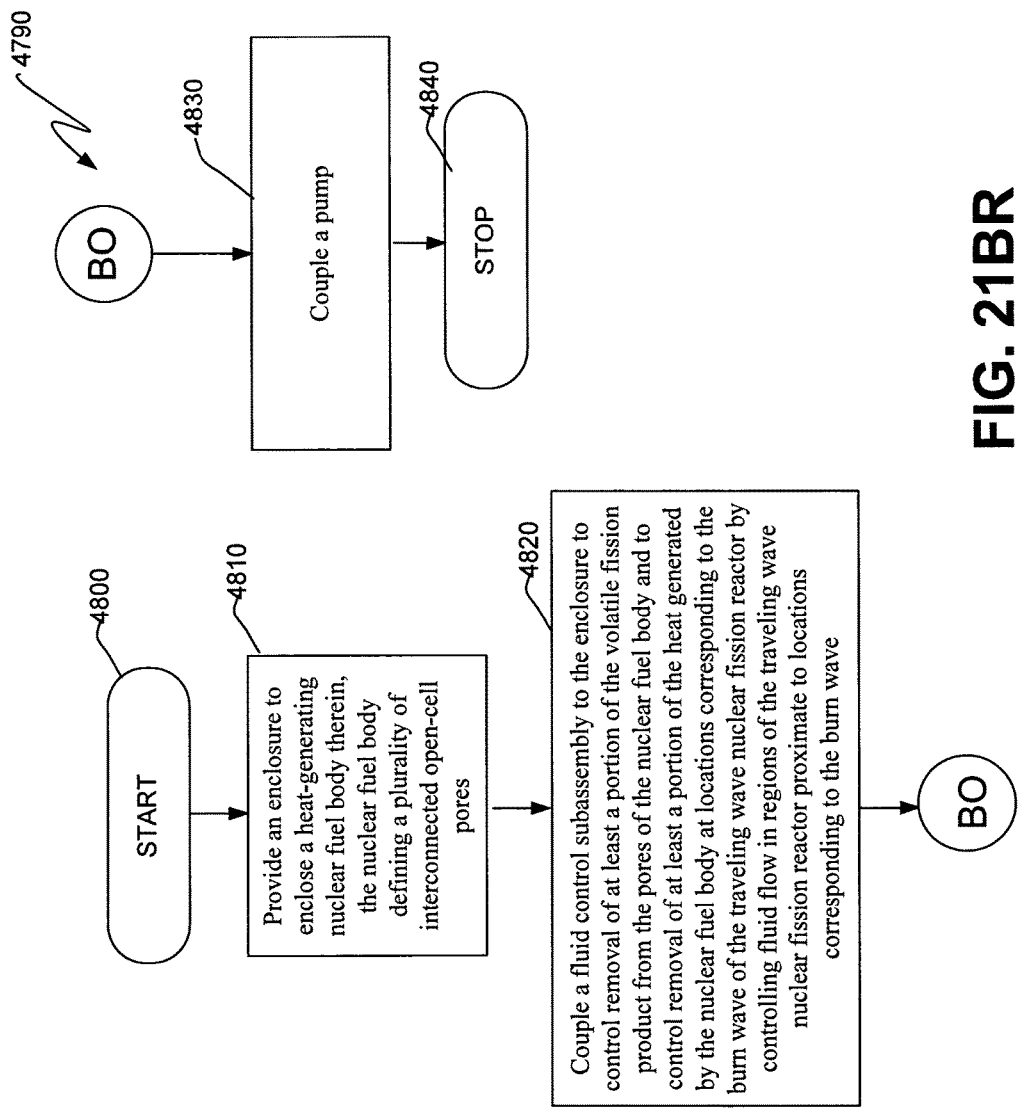
Figure 21B:
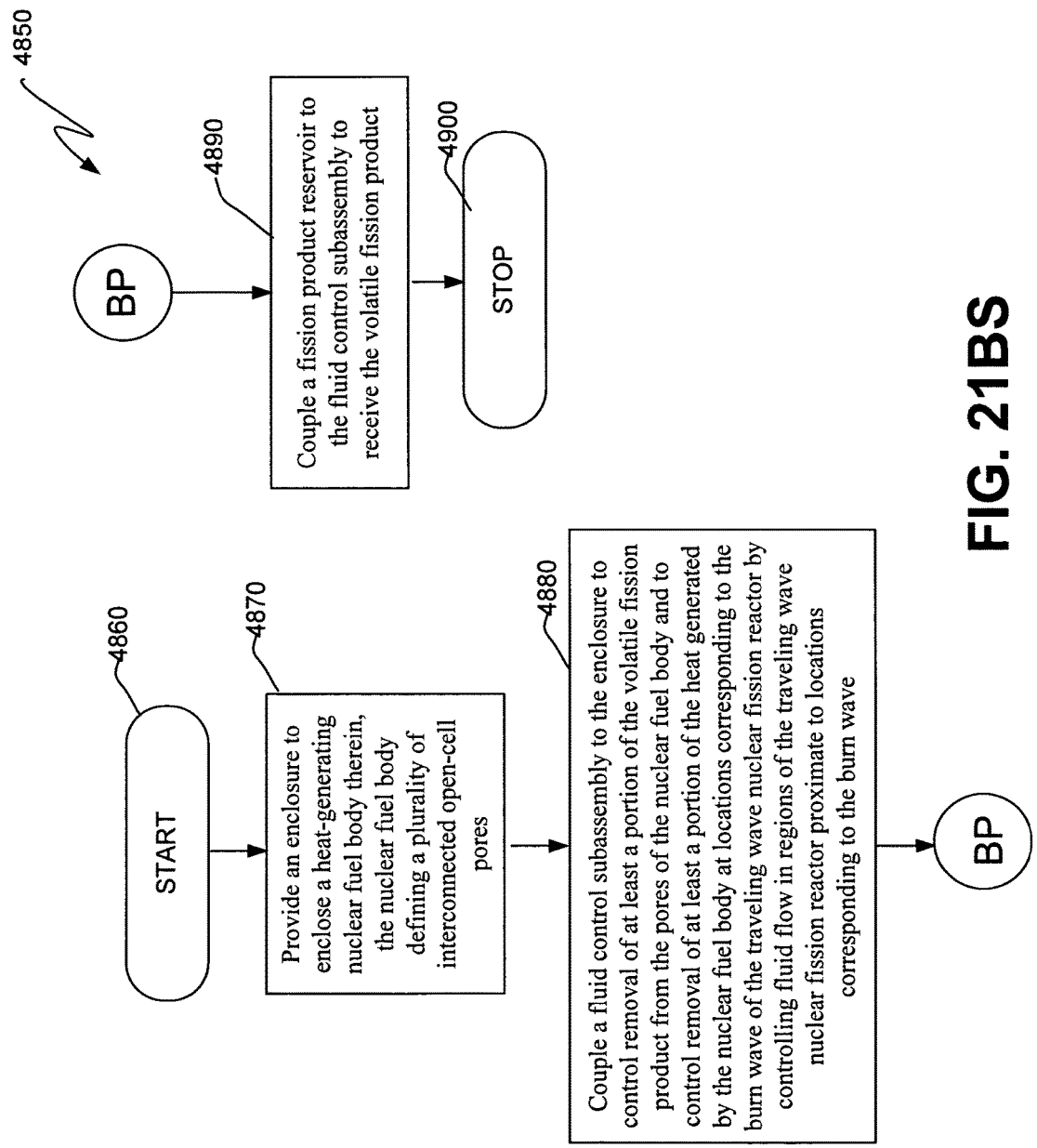
Figure 21B:
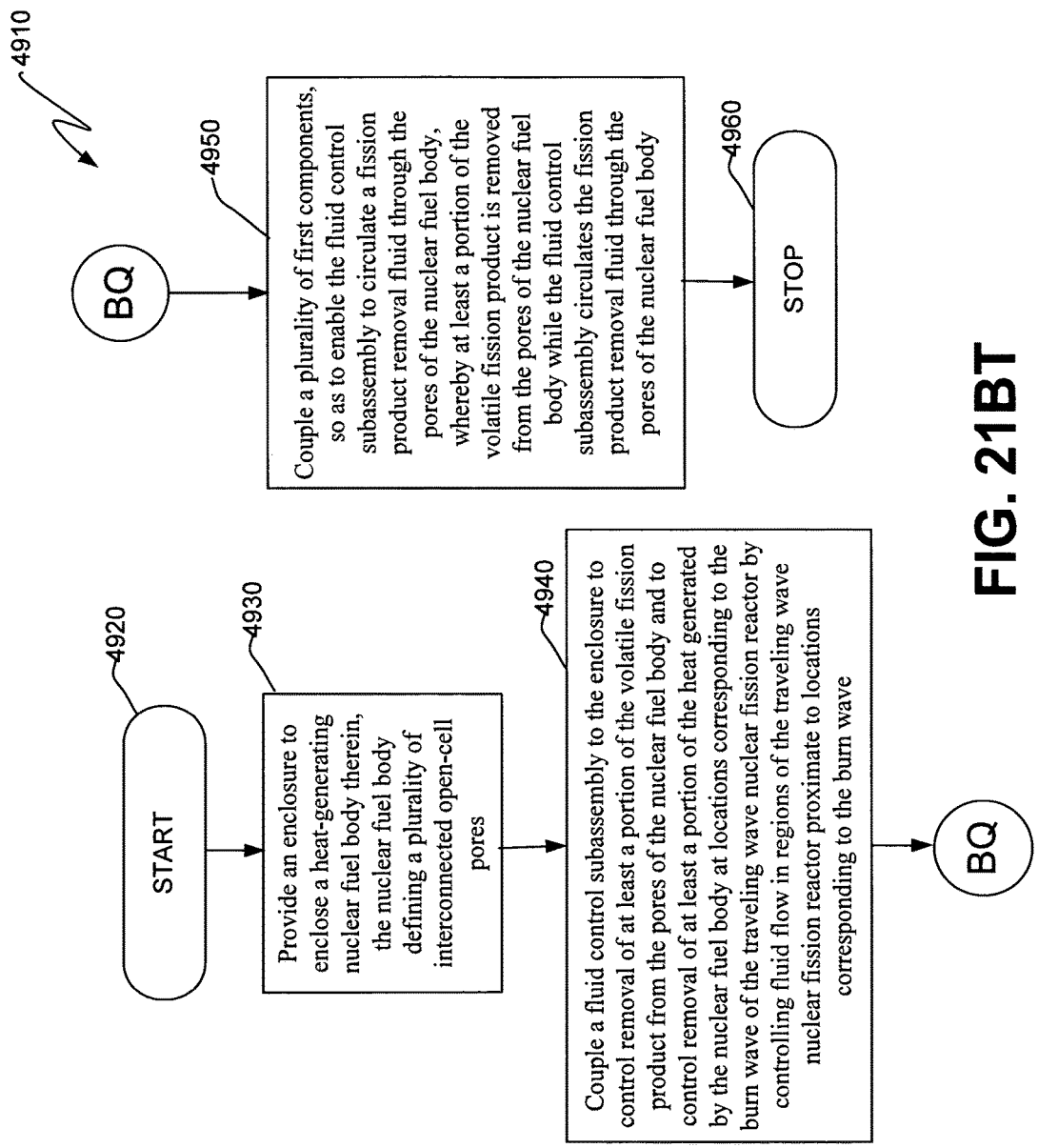
Figure 21B:
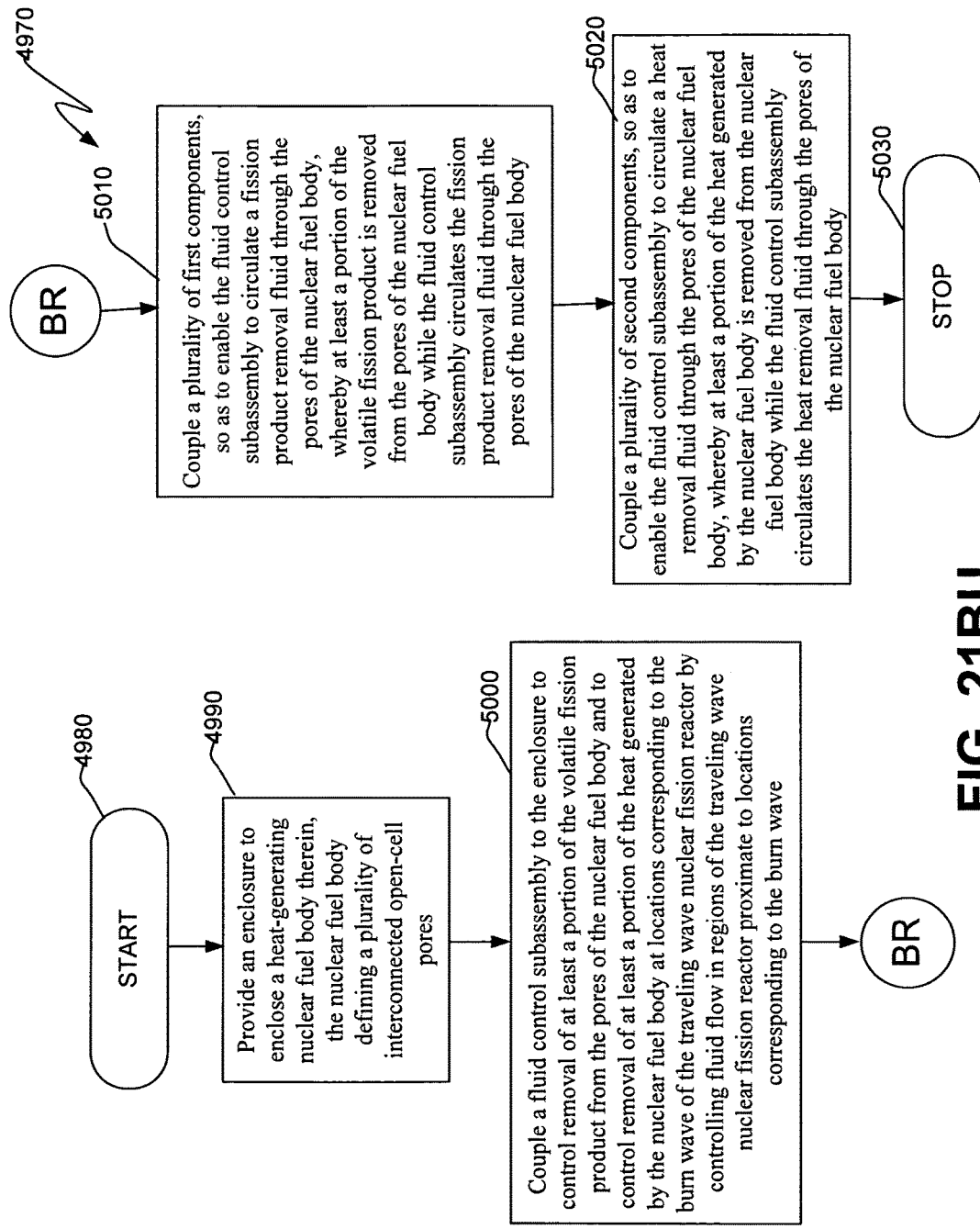
Figure 21B:
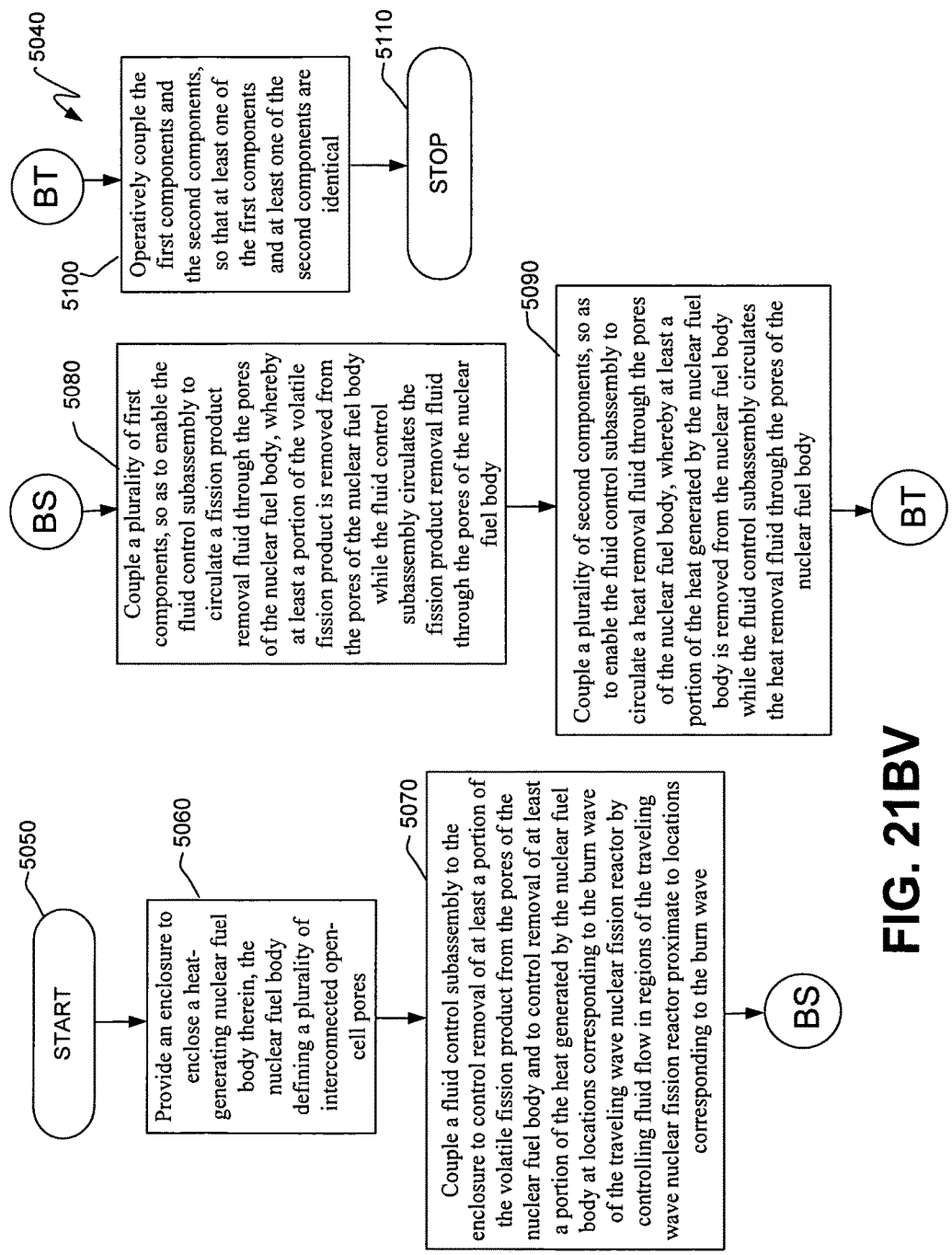
Figure 21B:
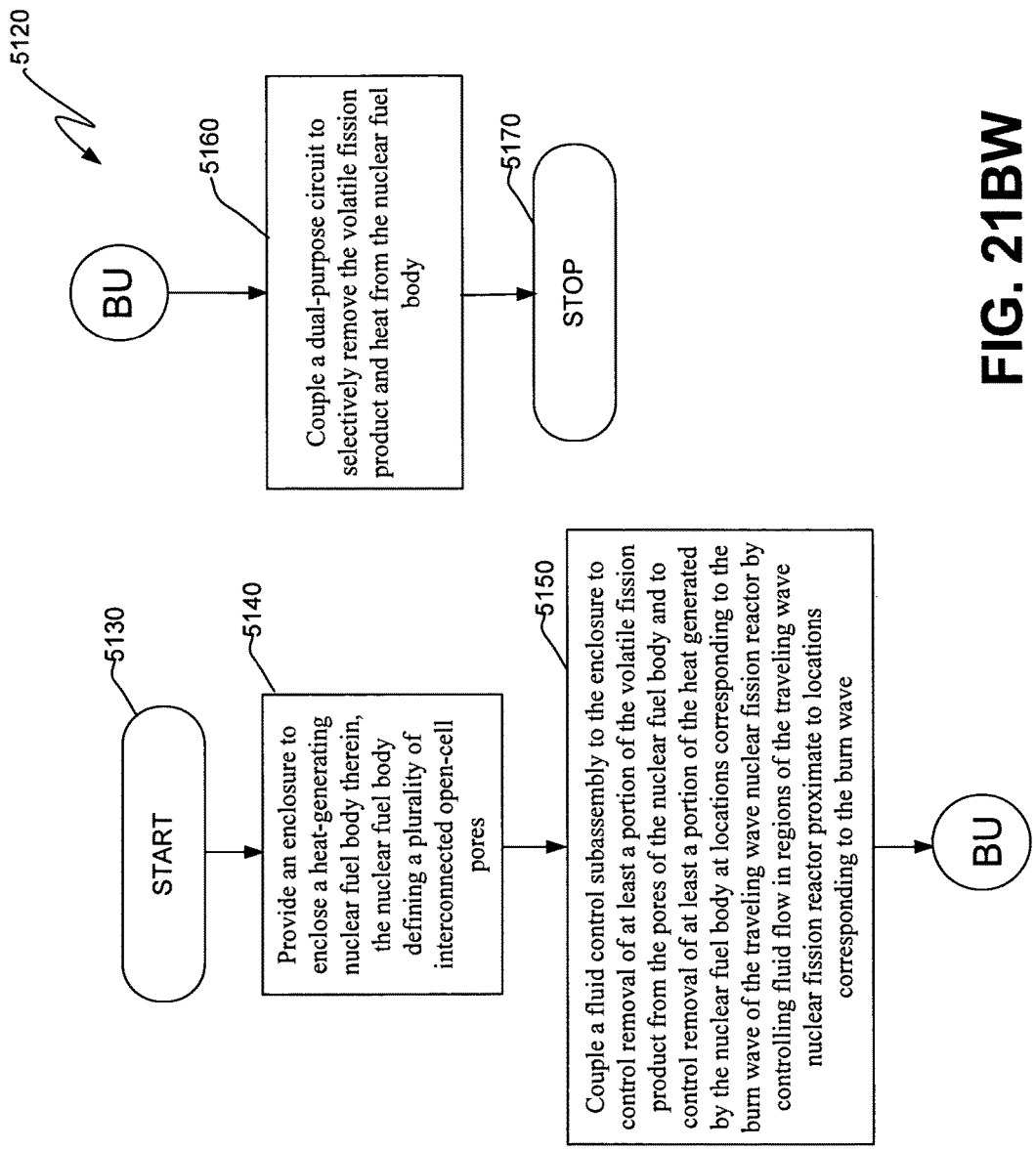
Figure 21B:
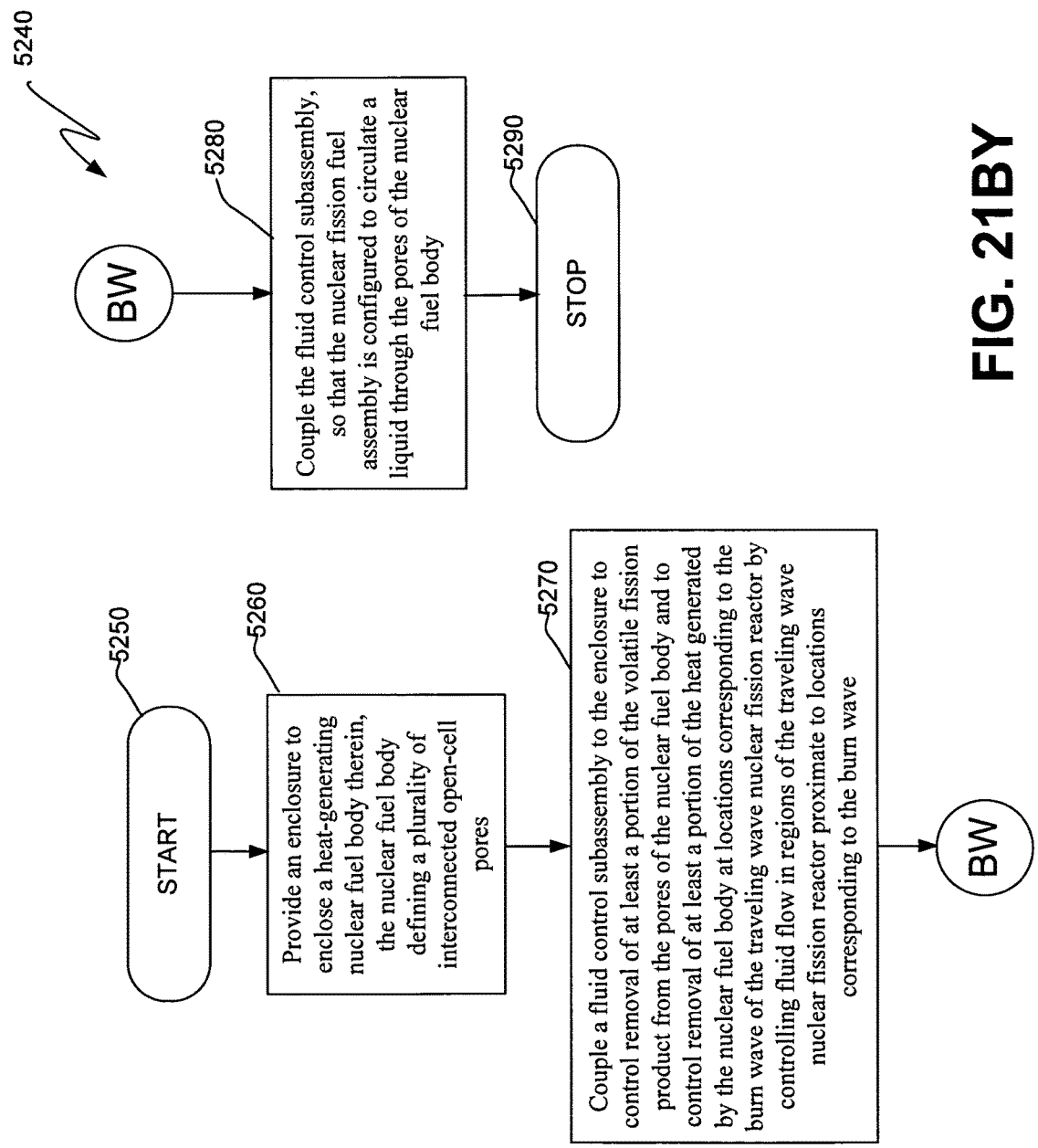
Figure 21C:
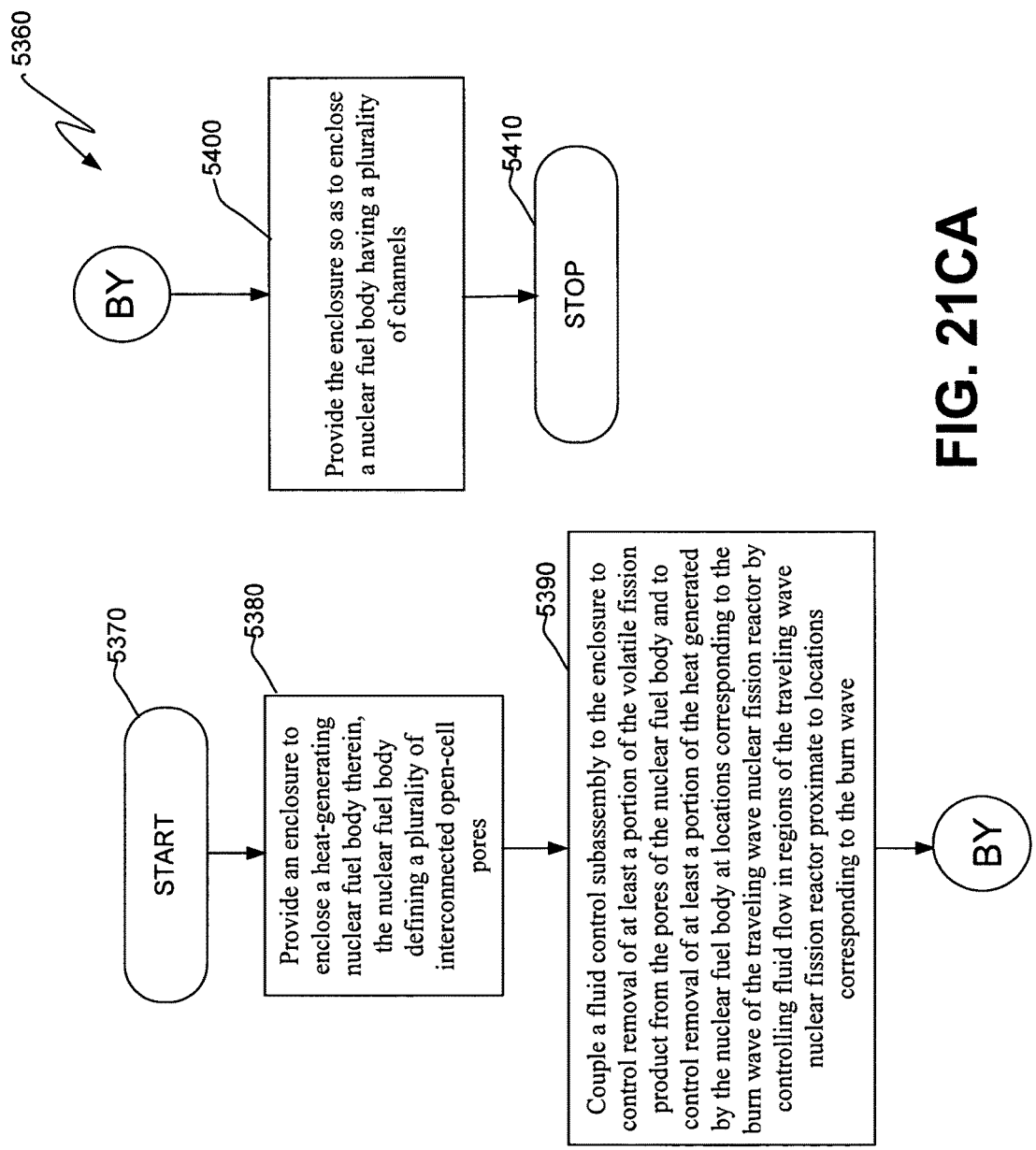
Figure 21C:
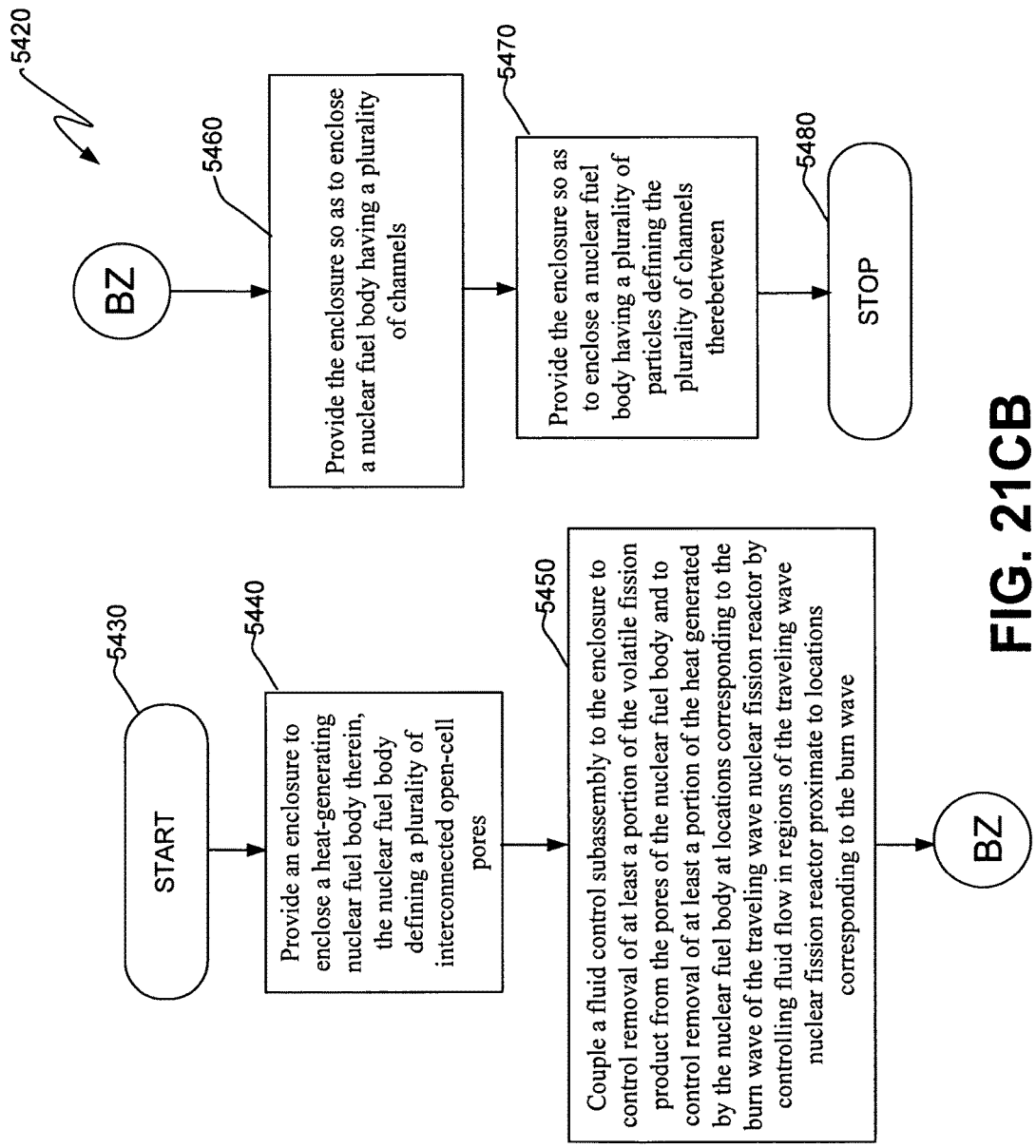
Figure 21C:
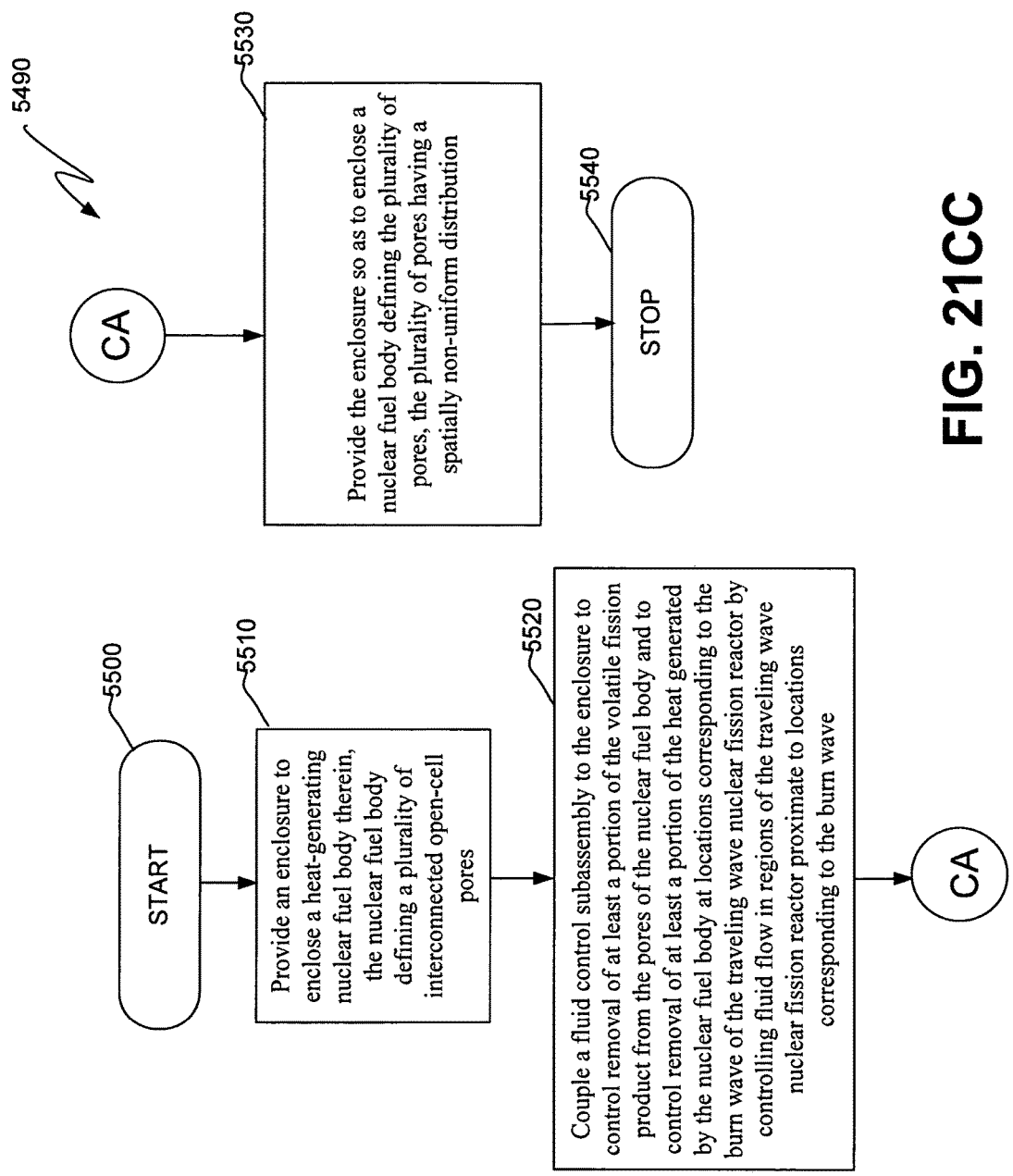
Figure 21C:
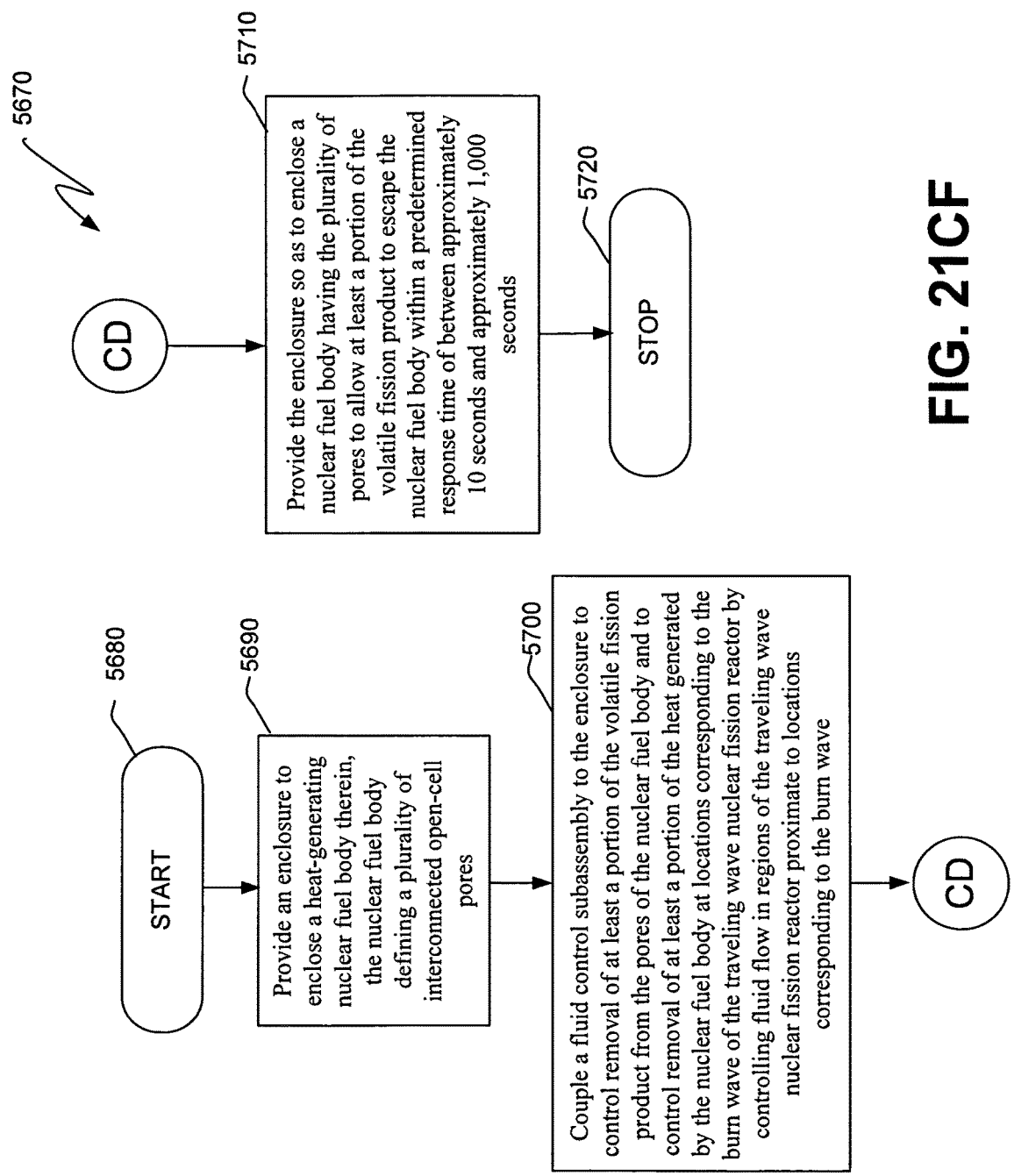
Figure 21C:
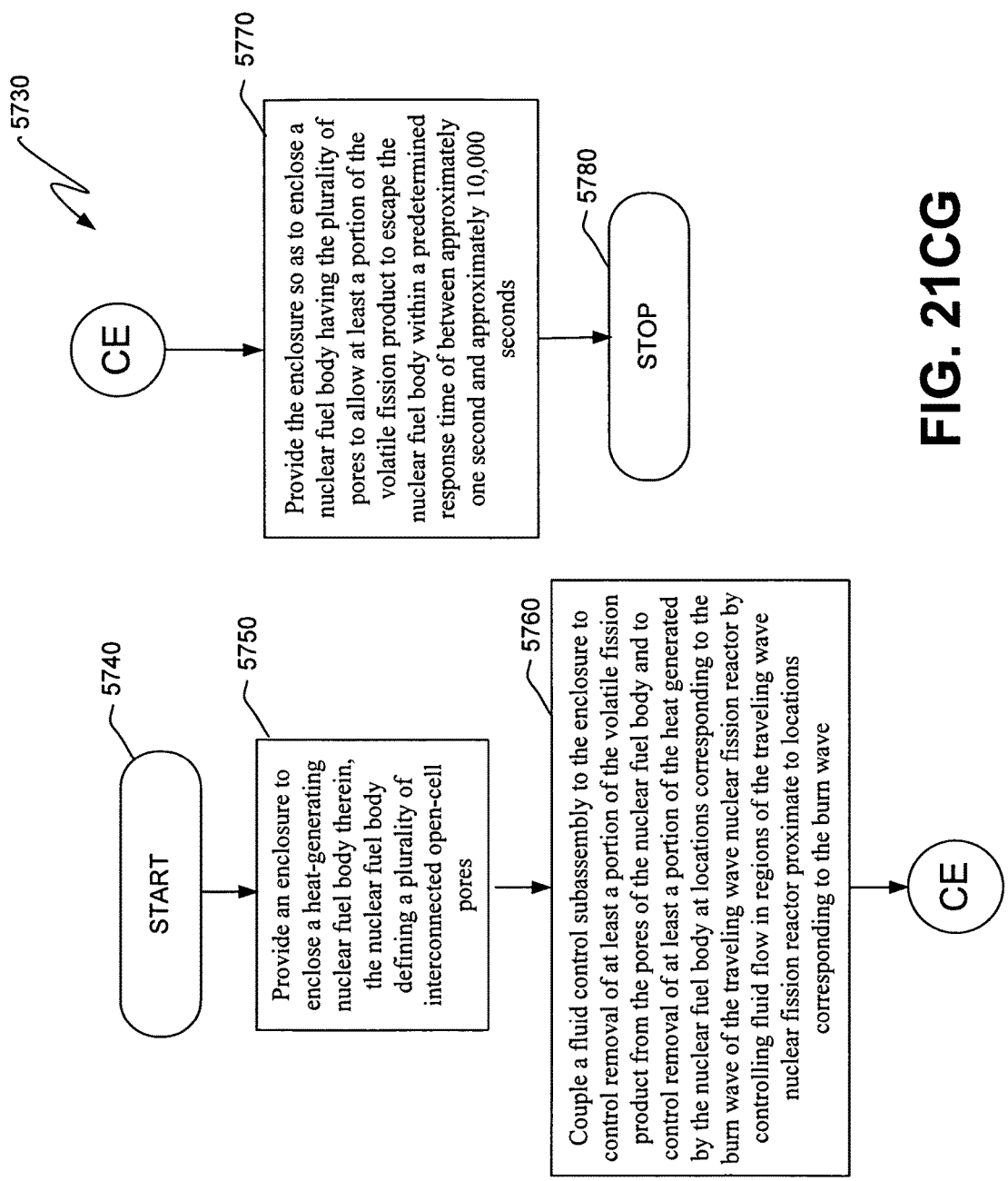
Figure 21C:
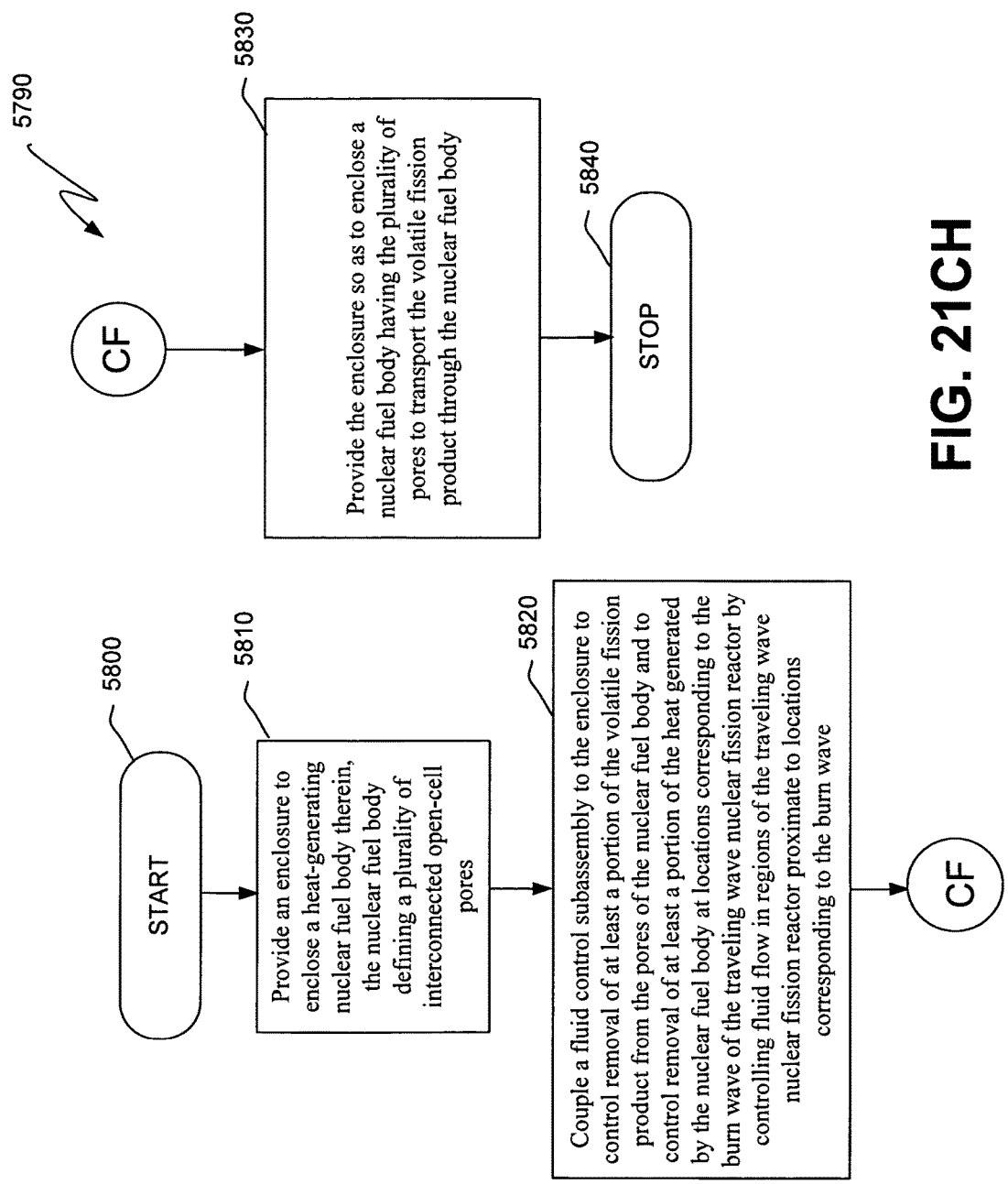
Figure 21C:
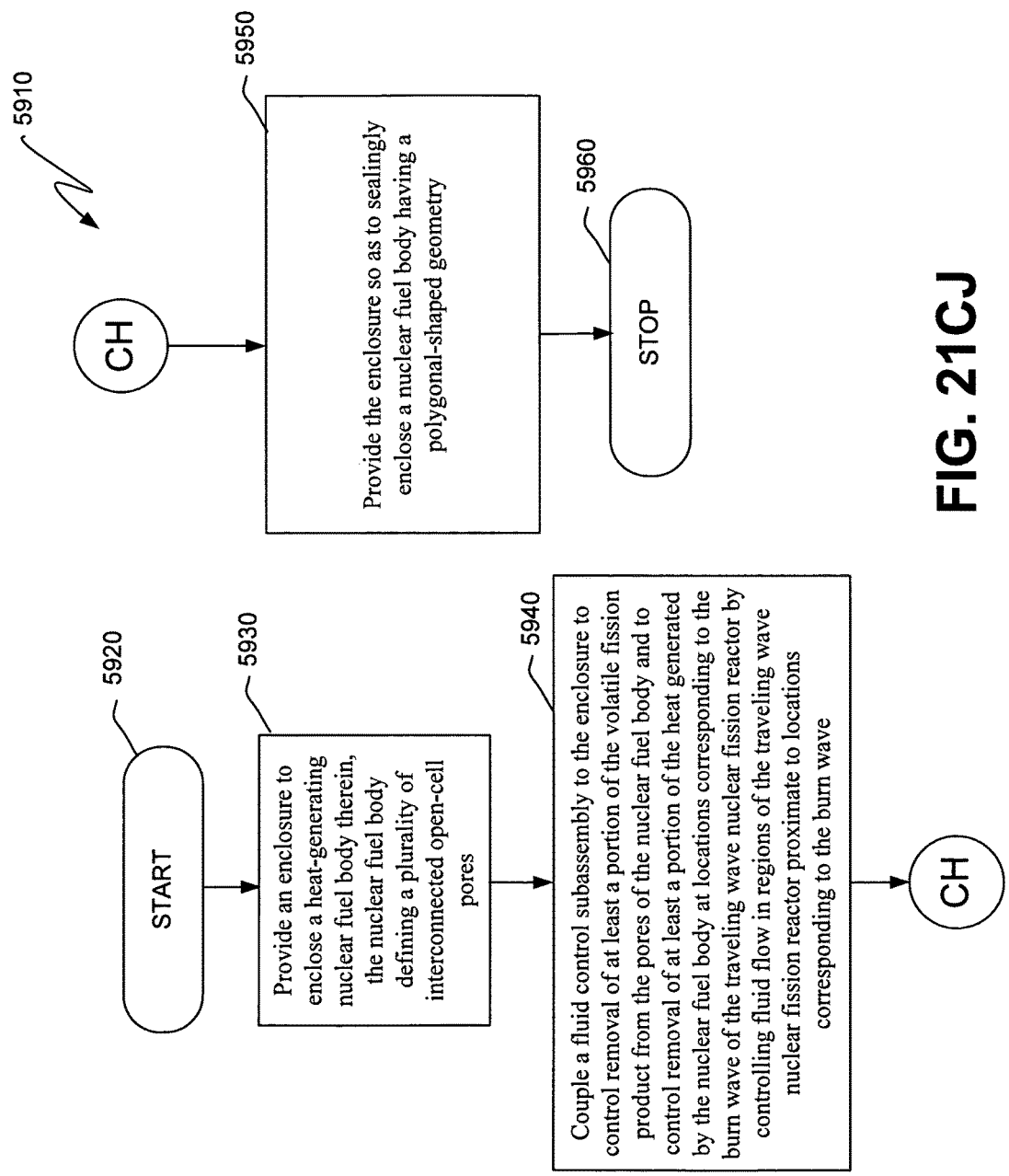
Figure 21C:
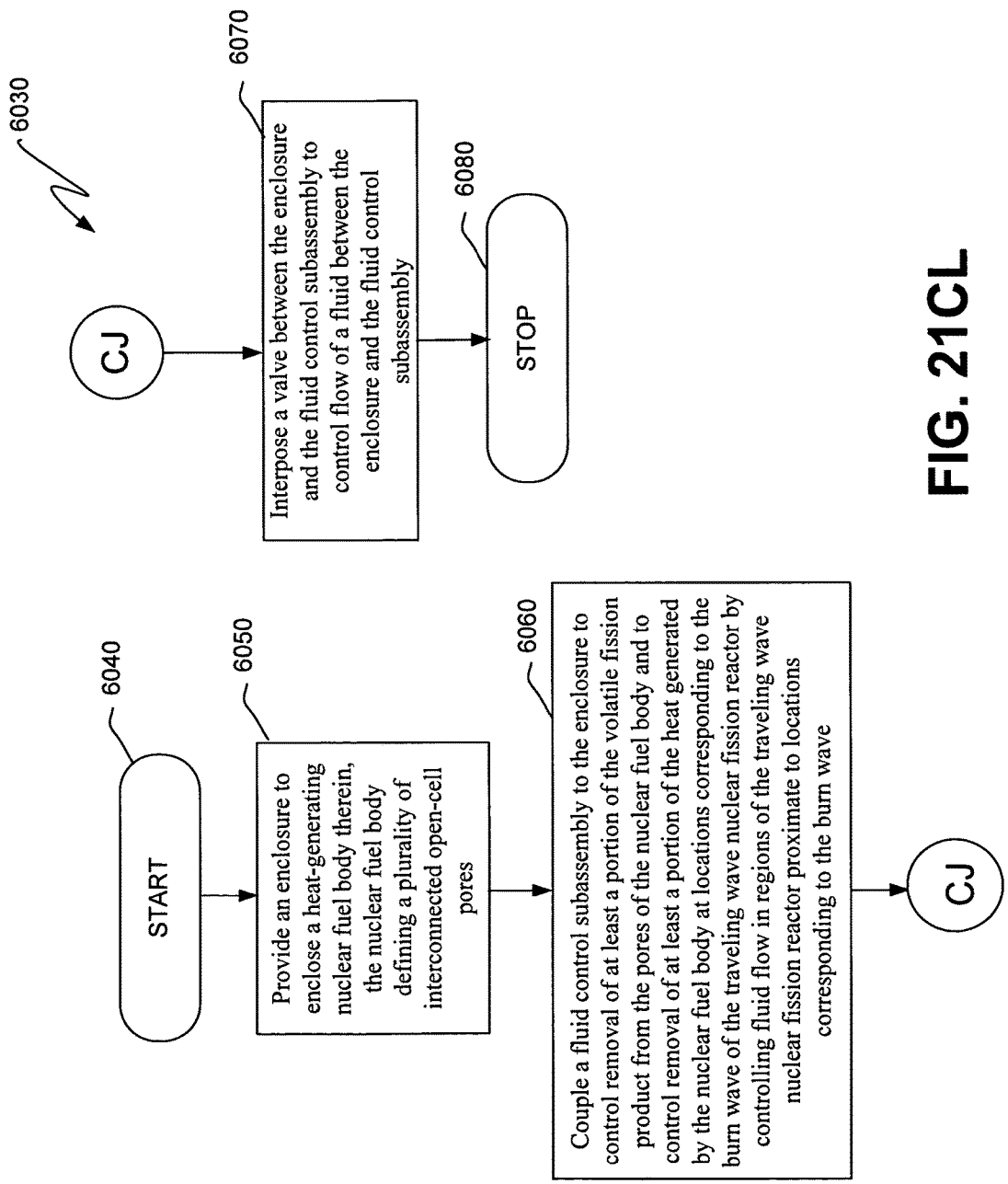
Figure 21C:
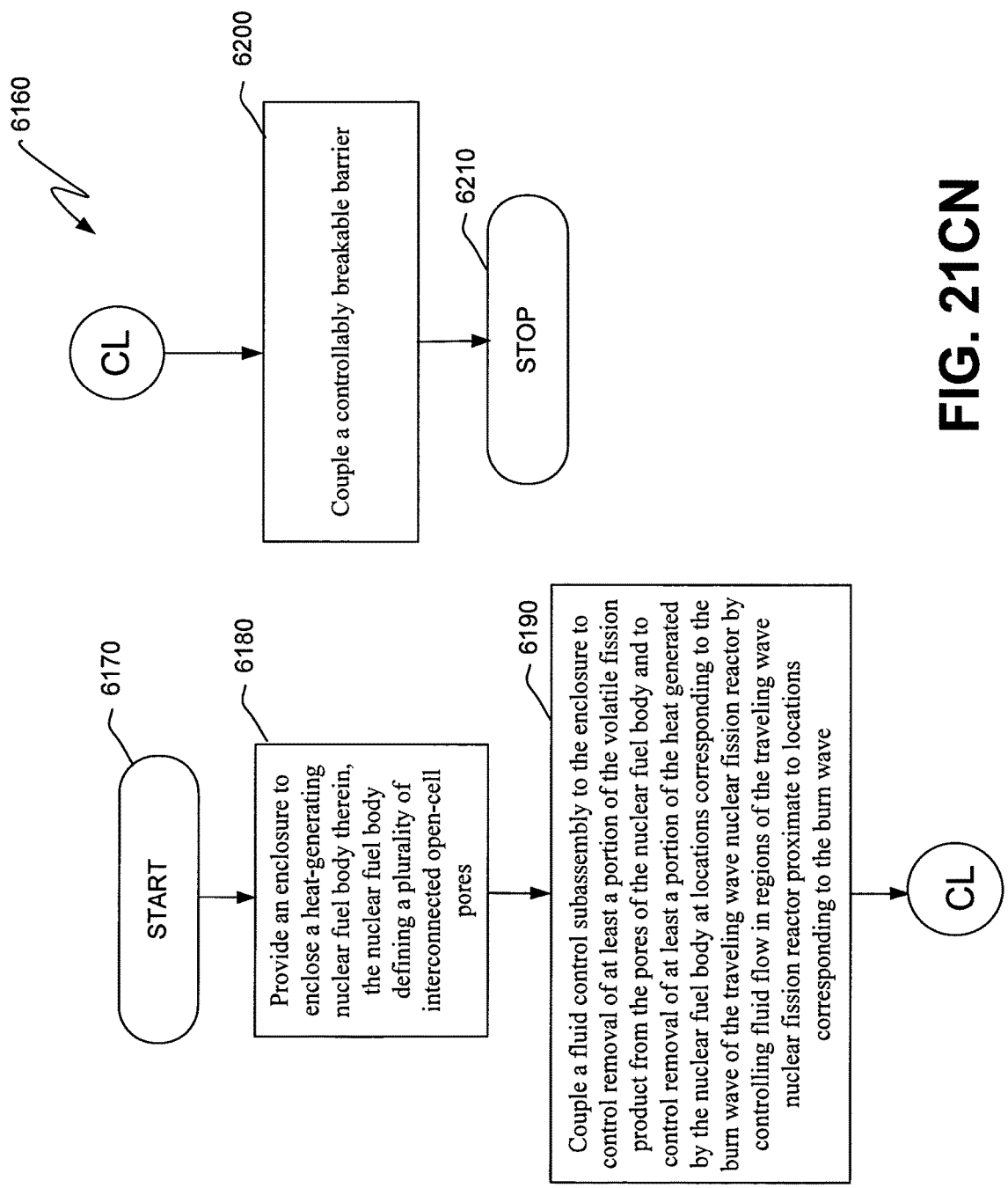
Figure 21C:
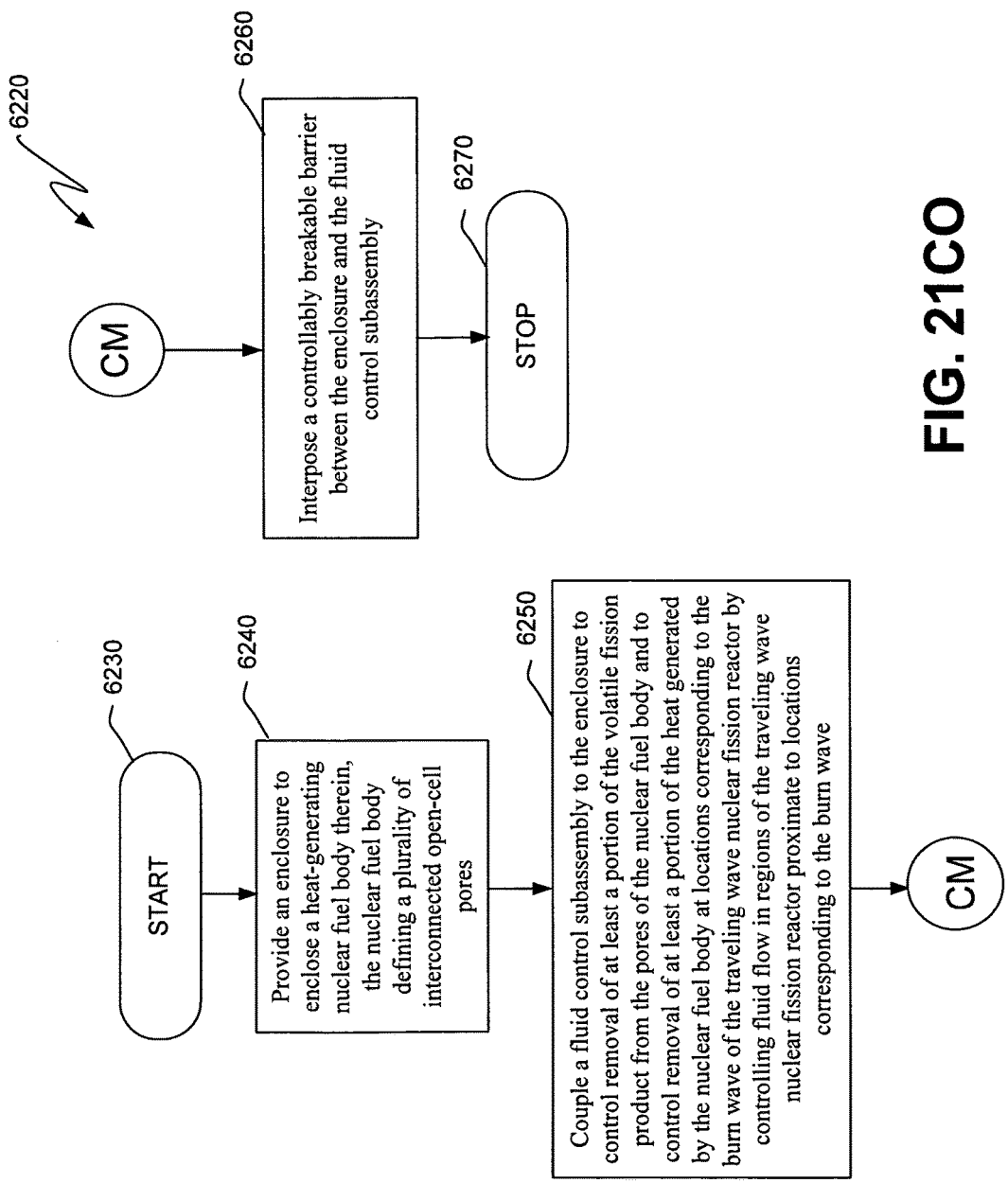
Figure 21C:
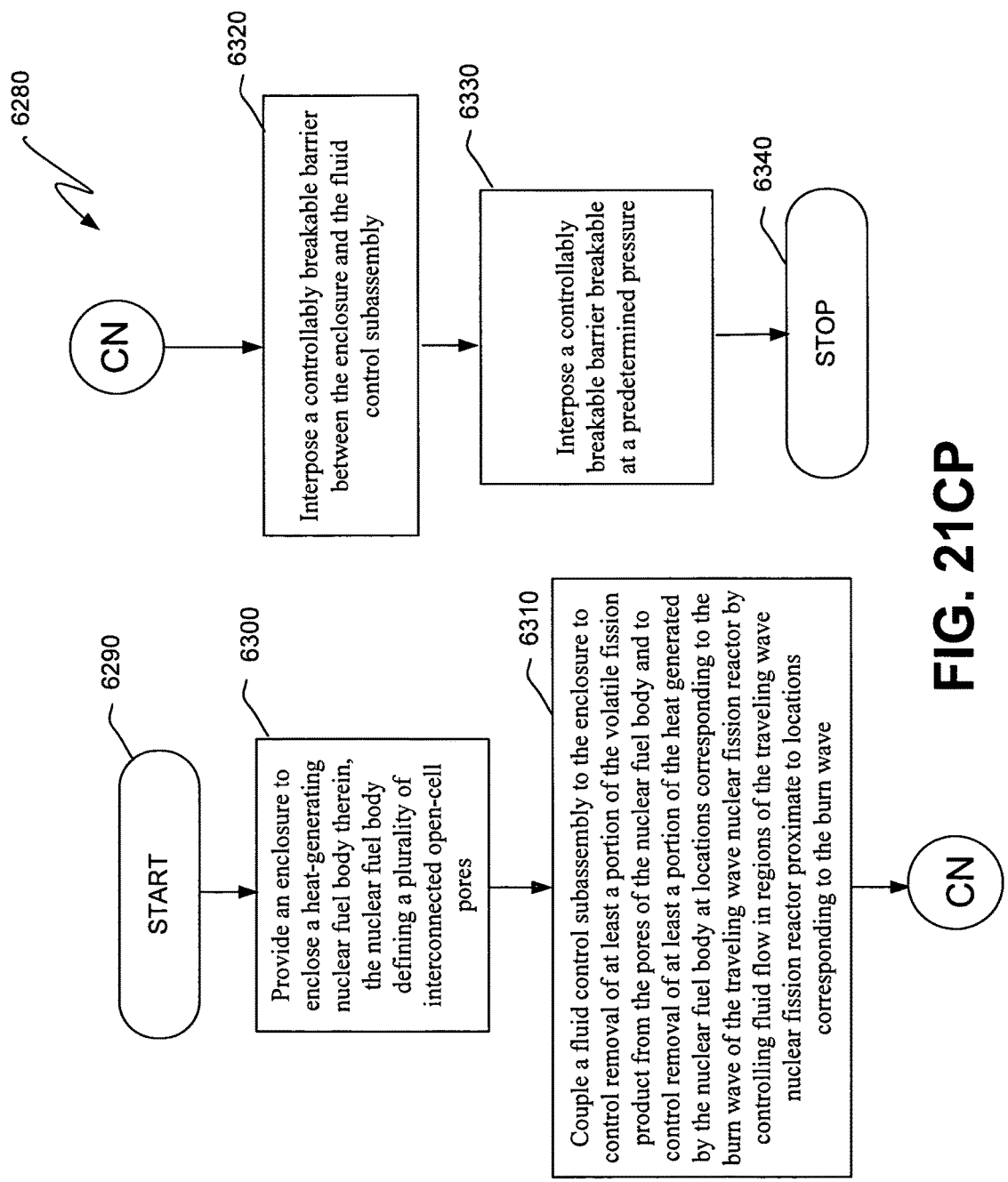
Figure 21C:
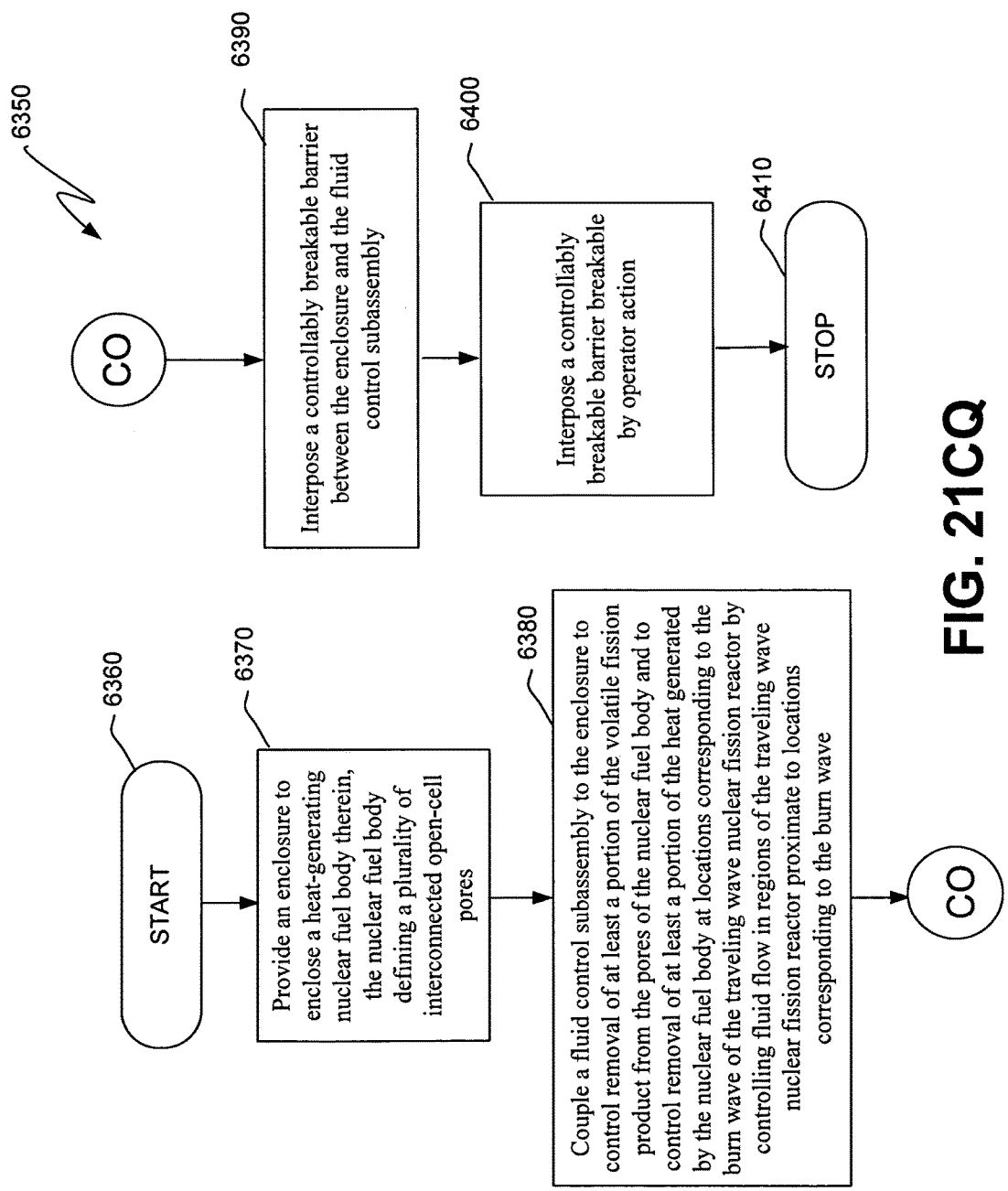

Referring to FIG. 21Z, an illustrative method 2040 for assembling the nuclear fission reactor fuel assembly starts at a block 2050. At a block 2060, an enclosure is provided that encloses a nuclear fuel body in the manner previously mentioned. At a block 2070, a fluid control subassembly is coupled to the enclosure for removal of at least a portion of a volatile fission product as previously mentioned. The fluid control subassembly controls fluid flow in regions of the reactor proximate locations corresponding to a burn wave. At a block 2080, the enclosure is provided so as to enclose a porous nuclear fuel body having a plurality of pores for acquiring the volatile fission product released by the burn wave in the traveling wave nuclear fission reactor. The method 2040 stops at a block 2090.

Referring to FIG. 21AA, an illustrative method 2100 for assembling the nuclear fission reactor fuel assembly starts at a block 2110. At a block 2120, an enclosure is provided that encloses a nuclear fuel body in the manner previously mentioned. At a block 2130, a fluid control subassembly is coupled to the enclosure for removal of at least a portion of a volatile fission product as previously mentioned. The fluid control subassembly controls fluid flow in regions of the reactor proximate locations corresponding to a burn wave. At a block 2140, the enclosure is provided so as to enclose a porous nuclear fuel body having a plurality of pores to transport the volatile fission product through the porous nuclear fuel body. The method 2100 stops at a block 2150.

Referring to FIG. 21AB, an illustrative method 2160 for assembling the nuclear fission reactor fuel assembly starts at a block 2170. At a block 2180, an enclosure is provided that encloses a nuclear fuel body in the manner previously mentioned. At a block 2190, a fluid control subassembly is coupled to the enclosure for removal of at least a portion of a volatile fission product as previously mentioned. The fluid control subassembly controls fluid flow in regions of the reactor proximate locations corresponding to a burn wave. At a block 2200, a reservoir is coupled to the fluid control subassembly to receive the volatile fission product. The method 2160 stops at a block 2210.

Referring to FIG. 21AC, an illustrative method 2220 for assembling the nuclear fission reactor fuel assembly starts at a block 2230. At a block 2240, an enclosure is provided that encloses a nuclear fuel body in the manner previously mentioned. At a block 2250, a fluid control subassembly is coupled to the enclosure for removal of at least a portion of a volatile fission product as previously mentioned. The fluid control subassembly controls fluid flow in regions of the reactor proximate locations corresponding to a burn wave. At a block 2260, the fluid control subassembly is coupled to permit a controlled release of the volatile fission product in response to a position of the burn wave in the traveling wave nuclear fission reactor. The method 2220 stops at a block 2270.

Referring to FIG. 21AD, an illustrative method 2280 for assembling the nuclear fission reactor fuel assembly starts at a block 2290. At a block 2300, an enclosure is provided that encloses a nuclear fuel body in the manner previously mentioned. At a block 2310, a fluid control subassembly is coupled to the enclosure for removal of at least a portion of a volatile fission product as previously mentioned. The fluid control subassembly controls fluid flow in regions of the reactor proximate locations corresponding to a burn wave. At a block 2320, the fluid control subassembly is coupled so that the nuclear fission fuel assembly is configured to circulate a fission product removal fluid through the porous nuclear fuel body and so that at least a portion of the volatile fission product is removed from the porous nuclear fuel body while the fluid control subassembly circulates the fission product removal fluid through the porous nuclear fuel body. The method 2280 stops at a block 2330.

Referring to FIG. 21AE, an illustrative method 2340 for assembling the nuclear fission reactor fuel assembly starts at a block 2350. At a block 2360, an enclosure is provided that encloses a nuclear fuel body in the manner previously mentioned. At a block 2370, a fluid control subassembly is coupled to the enclosure for removal of at least a portion of a volatile fission product as previously mentioned. The fluid control subassembly controls fluid flow in regions of the reactor proximate locations corresponding to a burn wave. At a block 2380, the fluid control subassembly is coupled so that the nuclear fission fuel assembly is configured to circulate a fission product removal fluid through the porous nuclear fuel body and so that at least a portion of the volatile fission product is removed from the porous nuclear fuel body while the fluid control subassembly circulates the fission product removal fluid through the porous nuclear fuel body. At a block 2390, an inlet subassembly is provided to supply the fission product removal fluid to the porous nuclear fuel body. The method 2340 stops at a block 2400.

Referring to FIG. 21AF, an illustrative method 2410 for assembling the nuclear fission reactor fuel assembly starts at a block 2420. At a block 2430, an enclosure is provided that encloses a nuclear fuel body in the manner previously mentioned. At a block 2440, a fluid control subassembly is coupled to the enclosure for removal of at least a portion of a volatile fission product as previously mentioned. The fluid control subassembly controls fluid flow in regions of the reactor proximate locations corresponding to a burn wave. At a block 2450, the fluid control subassembly is coupled so that the nuclear fission fuel assembly is configured to circulate a fission product removal fluid through the porous nuclear fuel body and so that at least a portion of the volatile fission product is removed from the porous nuclear fuel body while the fluid control subassembly circulates the fission product removal fluid through the porous nuclear fuel body. At a block 2460, an inlet subassembly is provided to remove the fission product removal fluid from the porous nuclear fuel body. The method 2410 stops at a block 2470.

Referring to FIG. 21AG, an illustrative method 2480 for assembling the nuclear fission reactor fuel assembly starts at a block 2490. At a block 2500, an enclosure is provided that encloses a porous nuclear fuel body in the manner previously mentioned. At a block 2510, a fluid control subassembly is coupled to the enclosure for removal of at least a portion of a volatile fission product as previously mentioned.

The fluid control subassembly controls fluid flow in regions of the reactor proximate locations corresponding to a burn wave. At a block 2520, the fluid control subassembly is coupled so that the nuclear fission fuel assembly is configured to circulate a fission product removal fluid through the porous nuclear fuel body and so that at least a portion of the volatile fission product is removed from the porous nuclear fuel body while the fluid control subassembly circulates the fission product removal fluid through the porous nuclear fuel body. At a block 2530, a reservoir is provided to receive the fission product removal fluid from. The method 2480 stops at a block 2540.

Referring to FIG. 21AH, an illustrative method 2550 for assembling the nuclear fission reactor fuel assembly starts at a block 2560. At a block 2570, an enclosure is provided that encloses a porous nuclear fuel body in the manner previously mentioned. At a block 2580, a fluid control subassembly is coupled to the enclosure for removal of at least a portion of a volatile fission product as previously mentioned. The fluid control subassembly controls fluid flow in regions of the reactor proximate locations corresponding to a burn wave. At a block 2590, the fluid control subassembly is coupled so that the nuclear fission fuel assembly is configured to circulate a fission product removal fluid through the porous nuclear fuel body and so that at least a portion of the volatile fission product is removed from the porous nuclear fuel body while the fluid control subassembly circulates the fission product removal fluid through the porous nuclear fuel body. At a block 2600, a reservoir is coupled to supply the fission product removal fluid. The method 2550 stops at a block 2610.

Referring to FIG. 21AI, an illustrative method 2620 for assembling the nuclear fission reactor fuel assembly starts at a block 2630. At a block 2640, an enclosure is provided that encloses a porous nuclear fuel body in the manner previously mentioned. At a block 2650, a fluid control subassembly is coupled to the enclosure for removal of at least a portion of a volatile fission product as previously mentioned. The fluid control subassembly controls fluid flow in regions of the reactor proximate locations corresponding to a burn wave. At a block 2590, the fluid control subassembly is coupled so that the nuclear fission fuel assembly is configured to circulate a gas fluid through the porous nuclear fuel body and so that at least a portion of the volatile fission product is removed from the porous nuclear fuel. The method 2620 stops at a block 2670.

Referring to FIG. 21AJ, an illustrative method 2680 for assembling the nuclear fission reactor fuel assembly starts at a block 2690. At a block 2700, an enclosure is provided that encloses a porous nuclear fuel body in the manner previously mentioned. At a block 2710, a fluid control subassembly is coupled to the enclosure for removal of at least a portion of a volatile fission product as previously mentioned. The fluid control subassembly controls fluid flow in regions of the reactor proximate locations corresponding to a burn wave. At a block 2720, the fluid control subassembly is coupled so that the fluid control subassembly is configured to circulate a liquid through the porous nuclear fuel body. The method 2680 stops at a block 2730.

Referring to FIG. 21AK, an illustrative method 2740 for assembling the nuclear fission reactor fuel assembly starts at a block 2750. At a block 2760, an enclosure is provided that encloses a porous nuclear fuel body in the manner previously mentioned. At a block 2770, a fluid control subassembly is coupled to the enclosure for removal of at least a portion of a volatile fission product as previously mentioned. The fluid control subassembly controls fluid flow in regions of the reactor proximate locations corresponding to a burn wave. At a block 2780, the method comprises coupling a pump. The method 2740 stops at a block 2790.

Referring to FIG. 21AL, an illustrative method 2800 for assembling the nuclear fission reactor fuel assembly starts at a block 2810. At a block 2820, an enclosure is provided that encloses a porous nuclear fuel body in the manner previously mentioned. At a block 2830, a fluid control subassembly is coupled to the enclosure for removal of at least a portion of a volatile fission product as previously mentioned. The fluid control subassembly controls fluid flow in regions of the reactor proximate locations corresponding to a burn wave. At a block 2840, a pump is integrally connected to the fluid control subassembly to circulate a fluid between the fluid control subassembly and the porous nuclear fuel body. The method 2800 stops at a block 2850.

Referring to FIG. 21AM, an illustrative method 2860 for assembling the nuclear fission reactor fuel assembly starts at a block 2870. At a block 2880, an enclosure is provided that encloses a porous nuclear fuel body in the manner previously mentioned. At a block 2890, a fluid control subassembly is coupled to the enclosure for removal of at least a portion of a volatile fission product as previously mentioned. The fluid control subassembly controls fluid flow in regions of the reactor proximate locations corresponding to a burn wave. At a block 2900, the method comprises coupling a valve. The method 2860 stops at a block 2910.

Referring to FIG. 21AN, an illustrative method 2920 for assembling the nuclear fission reactor fuel assembly starts at a block 2930. At a block 2940, an enclosure is provided that encloses a porous nuclear fuel body in the manner previously mentioned. At a block 2950, a fluid control subassembly is coupled to the enclosure for removal of at least a portion of a volatile fission product as previously mentioned. The fluid control subassembly controls fluid flow in regions of the reactor proximate locations corresponding to a burn wave. At a block 2960, a valve is interposed between the enclosure and the fluid control subassembly to control flow of a fluid between the enclosure and the fluid control subassembly. The method 2920 stops at a block 2970.

Referring to FIG. 21AO, an illustrative method 2980 for assembling the nuclear fission reactor fuel assembly starts at a block 2990. At a block 3000, an enclosure is provided that encloses a porous nuclear fuel body in the manner previously mentioned. At a block 3010, a fluid control subassembly is coupled to the enclosure for removal of at least a portion of a volatile fission product as previously mentioned. The fluid control subassembly controls fluid flow in regions of the reactor proximate locations corresponding to a burn wave. At a block 3020, a valve is interposed between the enclosure and the fluid control subassembly to control flow of a fluid between the enclosure and the fluid control subassembly. At a block 3030, a back-flow prevention valve is interposed between the enclosure and the fluid control subassembly. The method 2980 stops at a block 3040.

Referring to FIG. 21AP, an illustrative method 3050 for assembling the nuclear fission reactor fuel assembly starts at a block 3060. At a block 3070, an enclosure is provided that encloses a porous nuclear fuel body in the manner previously mentioned. At a block 3080, a fluid control subassembly is coupled to the enclosure for removal of at least a portion of a volatile fission product as previously mentioned. The fluid control subassembly controls fluid flow in regions of the reactor proximate locations corresponding to a burn wave. At a block 3090, the method comprises coupling a controllably breakable barrier. The method 3050 stops at a block 3100.

Referring to FIG. 21AQ, an illustrative method 3110 for assembling the nuclear fission reactor fuel assembly starts at a block 3120. At a block 3130, an enclosure is provided that encloses a porous nuclear fuel body in the manner previously mentioned. At a block 3140, a fluid control subassembly is coupled to the enclosure for removal of at least a portion of a volatile fission product as previously mentioned. The fluid control subassembly controls fluid flow in regions of the reactor proximate locations corresponding to a burn wave. At a block 3150, a controllably breakable barrier is interposed between the enclosure and the fluid control subassembly. The method 3110 stops at block 3160.

Referring to FIG. 21AR, an illustrative method 3170 for assembling the nuclear fission reactor fuel assembly starts at a block 3180. At a block 3190, an enclosure is provided that encloses a porous nuclear fuel body in the manner previously mentioned. At a block 3200, a fluid control subassembly is coupled to the enclosure for removal of at least a portion of a volatile fission product as previously mentioned. The fluid control subassembly controls fluid flow in regions of the reactor proximate locations corresponding to a burn wave. At a block 3210, a controllably breakable barrier is interposed between the enclosure and the fluid control subassembly. At a block 3220, a barrier breakable at a predetermined pressure is interposed between the enclosure and the fluid control subassembly. The method 3170 stops at a block 3230.

Referring to FIG. 21AS, an illustrative method 3240 for assembling the nuclear fission reactor fuel assembly starts at a block 3250. At a block 3260, an enclosure is provided that encloses a porous nuclear fuel body in the manner previously mentioned. At a block 3270, a fluid control subassembly is coupled to the enclosure for removal of at least a portion of a volatile fission product as previously mentioned. The fluid control subassembly controls fluid flow in regions of the reactor proximate locations corresponding to a burn wave. At a block 3280, a controllably breakable barrier is interposed between the enclosure and the fluid control subassembly. At a block 3290, a barrier breakable by operator action is interposed between the enclosure and the fluid control subassembly. The method 3240 stops at a block 3300.

Referring to FIG. 21AT, an illustrative method 3310 for assembling the nuclear fission reactor fuel assembly starts at a block 3320. At a block 3330, an enclosure is provided to enclose a heat-generating nuclear fuel body therein, the nuclear fuel body defining a plurality of interconnected open-cell pores. At a block 3340, a fluid control subassembly is coupled to the enclosure to control removal of at least a portion of the volatile fission product from the pores of the nuclear fuel body and to control removal of at least a portion of the heat generated by the nuclear fuel body at locations corresponding to the burn wave of the traveling wave nuclear fission reactor by controlling fluid flow in regions of the traveling wave nuclear fission reactor proximate to locations corresponding to the burn wave. The method 3310 stops at a block 3350.

Referring to FIG. 21AU, an illustrative method 3360 for assembling the nuclear fission reactor fuel assembly starts at a block 3370. At a block 3380, an enclosure is provided to enclose a heat-generating nuclear fuel body therein, the nuclear fuel body defining a plurality of interconnected open-cell pores. At a block 3390, a fluid control subassembly is coupled to the enclosure to control removal of at least a portion of the volatile fission product from the pores of the nuclear fuel body and to control removal of at least a portion of the heat generated by the nuclear fuel body at locations corresponding to the burn wave of the traveling wave nuclear fission reactor by controlling fluid flow in regions of the traveling wave nuclear fission reactor proximate to locations corresponding to the burn wave. At a block 3400, a control unit is coupled to the fluid control subassembly to control operation of the fluid control subassembly. The method 3360 stops at a block 3410.

Referring to FIG. 21AV, an illustrative method 3420 for assembling the nuclear fission reactor fuel assembly starts at a block 3430. At a block 3440, an enclosure is provided to enclose a heat-generating nuclear fuel body therein, the nuclear fuel body defining a plurality of interconnected open-cell pores. At a block 3450, a fluid control subassembly is coupled to the enclosure to control removal of at least a portion of the volatile fission product from the pores of the nuclear fuel body and to control removal of at least a portion of the heat generated by the nuclear fuel body at locations corresponding to the burn wave of the traveling wave nuclear fission reactor by controlling fluid flow in regions of the traveling wave nuclear fission reactor proximate to locations corresponding to the burn wave. At a block 3460, the enclosure is provided so as to enclose the nuclear fuel body. The method 3420 stops at a block 3470.

Referring to FIG. 21AW, an illustrative method 3480 for assembling the nuclear fission reactor fuel assembly starts at a block 3490. At a block 3500, an enclosure is provided to enclose a heat-generating nuclear fuel body therein, the nuclear fuel body defining a plurality of interconnected open-cell pores. At a block 3510, a fluid control subassembly is coupled to the enclosure to control removal of at least a portion of the volatile fission product from the pores of the nuclear fuel body and to control removal of at least a portion of the heat generated by the nuclear fuel body at locations corresponding to the burn wave of the traveling wave nuclear fission reactor by controlling fluid flow in regions of the traveling wave nuclear fission reactor proximate to locations corresponding to the burn wave. At a block 3520, the enclosure is provided so as to enclose a fissile material forming the nuclear fuel body. The method 3480 stops at a block 3530.

Referring to FIG. 21AX, an illustrative method 3540 for assembling the nuclear fission reactor fuel assembly starts at a block 3550. At a block 3560, an enclosure is provided to enclose a heat-generating nuclear fuel body therein, the nuclear fuel body defining a plurality of interconnected open-cell pores. At a block 3570, a fluid control subassembly is coupled to the enclosure to control removal of at least a portion of the volatile fission product from the pores of the nuclear fuel body and to control removal of at least a portion of the heat generated by the nuclear fuel body at locations corresponding to the burn wave of the traveling wave nuclear fission reactor by controlling fluid flow in regions of the traveling wave nuclear fission reactor proximate to locations corresponding to the burn wave. At a block 3580, the enclosure is provided so as to enclose a fertile material forming the nuclear fuel body. The method 3540 stops at a block 3590.

Referring to FIG. 21AY, an illustrative method 3600 for assembling the nuclear fission reactor fuel assembly starts at a block 3610. At a block 3620, an enclosure is provided to enclose a heat-generating nuclear fuel body therein, the nuclear fuel body defining a plurality of interconnected open-cell pores. At a block 3630, a fluid control subassembly is coupled to the enclosure to control removal of at least a portion of the volatile fission product from the pores of the nuclear fuel body and to control removal of at least a portion of the heat generated by the nuclear fuel body at locations corresponding to the burn wave of the traveling wave nuclear fission reactor by controlling fluid flow in regions of the traveling wave nuclear fission reactor proximate to locations corresponding to the burn wave. At a block 3640, the enclosure is provided so as to enclose a mixture of fissile and fertile material forming the nuclear fuel body. The method 3600 stops at a block 3650.

Referring to FIG. 21AZ, an illustrative method 3660 for assembling the nuclear fission reactor fuel assembly starts at a block 3670. At a block 3680, an enclosure is provided to enclose a heat-generating nuclear fuel body therein, the nuclear fuel body defining a plurality of interconnected open-cell pores. At a block 3690, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 3700, the fluid control subassembly is coupled so as to permit a controlled release of the volatile fission product in response to a position of the burn wave in the traveling wave nuclear fission reactor. The method 3660 stops at a block 3710.

Referring to FIG. 21BA, an illustrative method 3720 for assembling the nuclear fission reactor fuel assembly starts at a block 3730. At a block 3740, an enclosure is provided to enclose a heat-generating nuclear fuel body therein, the nuclear fuel body defining a plurality of interconnected open-cell pores. At a block 3750, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 3760, the fluid control subassembly is coupled so as to permit a controlled release of the volatile fission product in response to a power level in the traveling wave nuclear fission reactor. The method 3720 stops at a block 3770.

Referring to FIG. 21BB, an illustrative method 3780 for assembling the nuclear fission reactor fuel assembly starts at a block 3790. At a block 3800, an enclosure is provided to enclose a heat-generating nuclear fuel body therein, the nuclear fuel body defining a plurality of interconnected open-cell pores. At a block 3810, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 3820, the fluid control subassembly is coupled so as to permit a controlled release of the volatile fission product in response to a neutron population level in the traveling wave nuclear fission reactor. The method 3780 stops at a block 3830.

Referring to FIG. 21BC, an illustrative method 3840 for assembling the nuclear fission reactor fuel assembly starts at a block 3850. At a block 3860, an enclosure is provided to enclose a heat-generating nuclear fuel body therein, the nuclear fuel body defining a plurality of interconnected open-cell pores. At a block 3870, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 3880, the fluid control subassembly is coupled so as to permit a controlled release of the volatile fission product in response to a volatile fission product pressure level in the traveling wave nuclear fission reactor. The method 3840 stops at a block 3890.

Referring to FIG. 21BD, an illustrative method 3900 for assembling the nuclear fission reactor fuel assembly starts at a block 3910. At a block 3920, an enclosure is provided to enclose a heat-generating nuclear fuel body therein, the nuclear fuel body defining a plurality of interconnected open-cell pores. At a block 3930, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 3940, the fluid control subassembly is coupled so as to permit a controlled release of the volatile fission product in response to a time schedule associated with the traveling wave nuclear fission reactor. The method 3900 stops at a block 3950.

Referring to FIG. 21BE, an illustrative method 3960 for assembling the nuclear fission reactor fuel assembly starts at a block 3970. At a block 3980, an enclosure is provided to enclose a heat-generating nuclear fuel body therein, the nuclear fuel body defining a plurality of interconnected open-cell pores. At a block 3990, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 4000, the fluid control subassembly is coupled so as to permit a controlled release of the volatile fission product in response to an amount of time the traveling wave nuclear fission reactor is operated. The method 3960 stops at a block 4010.

Referring to FIG. 21BF, an illustrative method 4020 for assembling the nuclear fission reactor fuel assembly starts at a block 4030. At a block 4040, an enclosure is provided to enclose a heat-generating nuclear fuel body therein, the nuclear fuel body defining a plurality of interconnected open-cell pores. At a block 4050, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 4060, a reservoir is coupled to the fluid control subassembly to receive the volatile fission product. The method 4020 stops at a block 4070.

Referring to FIG. 21BG, an illustrative method 4080 for assembling the nuclear fission reactor fuel assembly starts at a block 4090. At a block 4100, an enclosure is provided to enclose a heat-generating nuclear fuel body therein, the nuclear fuel body defining a plurality of interconnected open-cell pores. At a block 4110, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 4120, the fluid control subassembly that is configured to circulate a fission product removal fluid through the pores of the nuclear fuel body is coupled so that at least a portion of the volatile fission product is removed from the pores of the nuclear fuel body while the fluid control subassembly circulates the fission product removal fluid through the pores of the nuclear fuel body. The method 4080 stops at a block 4130.

Referring to FIG. 21BH, an illustrative method 4140 for assembling the nuclear fission reactor fuel assembly starts at a block 4150. At a block 4160, an enclosure is provided to enclose a heat-generating nuclear fuel body therein, the nuclear fuel body defining a plurality of interconnected open-cell pores. At a block 4170, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 4175, the fluid control subassembly that is configured to circulate a fission product removal fluid through the pores of the nuclear fuel body is coupled so that at least a portion of the volatile fission product is removed from the pores of the nuclear fuel body while the fluid control subassembly circulates the fission product removal fluid through the pores of the nuclear fuel body. At a block 4180, an inlet subassembly is provided to supply the fission product removal fluid to the pores of the nuclear fuel body. The method 4140 stops at a block 4190.

Referring to FIG. 21BI, an illustrative method 4200 for assembling the nuclear fission reactor fuel assembly starts at a block 4210. At a block 4220, an enclosure is provided to enclose a heat-generating nuclear fuel body therein, the nuclear fuel body defining a plurality of interconnected open-cell pores. At a block 4230, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 4240, the fluid control subassembly that is configured to circulate a fission product removal fluid through the pores of the nuclear fuel body is coupled so that at least a portion of the volatile fission product is removed from the pores of the nuclear fuel body while the fluid control subassembly circulates the fission product removal fluid through the pores of the nuclear fuel body. At a block 4250, an outlet subassembly is provided to remove the fission product removal fluid from the pores of the nuclear fuel body. The method 4200 stops at a block 4260.

Referring to FIG. 21BJ, an illustrative method 4270 for assembling the nuclear fission reactor fuel assembly starts at a block 4280. At a block 4290, an enclosure is provided to enclose a heat-generating nuclear fuel body therein, the nuclear fuel body defining a plurality of interconnected open-cell pores. At a block 4300, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 4310, the fluid control subassembly that is configured to circulate a fission product removal fluid through the pores of the nuclear fuel body is coupled so that at least a portion of the heat generated by the nuclear fuel body is removed from the nuclear fuel body while the fluid control subassembly circulates the heat removal fluid through the pores of the nuclear fuel body. The method 4270 stops at a block 4320.

Referring to FIG. 21BK, an illustrative method 4330 for assembling the nuclear fission reactor fuel assembly starts at a block 4340. At a block 4350, an enclosure is provided to enclose a heat-generating nuclear fuel body therein, the nuclear fuel body defining a plurality of interconnected open-cell pores. At a block 4360, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 4370, the fluid control subassembly that is configured to circulate a fission product removal fluid through the pores of the nuclear fuel body is coupled so that at least a portion of the heat generated by the nuclear fuel body is removed from the nuclear fuel body while the fluid control subassembly circulates the heat removal fluid through the pores of the nuclear fuel body. At a block 4380, a reservoir is coupled to the fluid control subassembly to receive the heat removal fluid. The method 4330 stops at a block 4390.

Referring to FIG. 21BL, an illustrative method 4400 for assembling the nuclear fission reactor fuel assembly starts at a block 4410. At a block 4420, an enclosure is provided to enclose a heat-generating nuclear fuel body therein, the nuclear fuel body defining a plurality of interconnected open-cell pores. At a block 4430, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 4440, the fluid control subassembly that is configured to circulate a fission product removal fluid through the pores of the nuclear fuel body is coupled so that at least a portion of the heat generated by the nuclear fuel body is removed from the nuclear fuel body while the fluid control subassembly circulates the heat removal fluid through the pores of the nuclear fuel body. At a block 4450, a reservoir is coupled to the fluid control subassembly to supply the heat removal fluid. The method 4400 stops at a block 4460.

Referring to FIG. 21BM, an illustrative method 4470 for assembling the nuclear fission reactor fuel assembly starts at a block 4480. At a block 4490, an enclosure is provided to enclose a heat-generating nuclear fuel body therein, the nuclear fuel body defining a plurality of interconnected open-cell pores. At a block 4500, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 4510, the fluid control subassembly that is configured to circulate a fission product removal fluid through the pores of the nuclear fuel body is coupled so that at least a portion of the heat generated by the nuclear fuel body is removed from the nuclear fuel body while the fluid control subassembly circulates the heat removal fluid through the pores of the nuclear fuel body. At a block 4520, a heat sink is coupled to the fluid control subassembly, so that the heat sink is in heat transfer communication with the heat removal fluid to remove heat from the heat removal fluid. The method 4470 stops at a block 4530.

Referring to FIG. 21BN, an illustrative method 4540 for assembling the nuclear fission reactor fuel assembly starts at a block 4550. At a block 4560, an enclosure is provided to enclose a heat-generating nuclear fuel body therein, the nuclear fuel body defining a plurality of interconnected open-cell pores. At a block 4570, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 4580, the fluid control subassembly that is configured to circulate a fission product removal fluid through the pores of the nuclear fuel body is coupled so that at least a portion of the heat generated by the nuclear fuel body is removed from the nuclear fuel body while the fluid control subassembly circulates the heat removal fluid through the pores of the nuclear fuel body. At a block 4590, a heat exchanger is coupled to the fluid control subassembly, so that the heat exchanger is in heat transfer communication with the heat removal fluid to remove heat from the heat removal fluid. The method 4540 stops at a block 4600.

Referring to FIG. 21BO, an illustrative method 4610 for assembling the nuclear fission reactor fuel assembly starts at a block 4620. At a block 4630, an enclosure is provided to enclose a heat-generating nuclear fuel body therein, the nuclear fuel body defining a plurality of interconnected open-cell pores. At a block 4640, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 4650, the fluid control subassembly is coupled so as to simultaneously circulate a fission product removal fluid and a heat removal fluid. The method 4610 stops at a block 4660.

Referring to FIG. 21BP, an illustrative method 4670 for assembling the nuclear fission reactor fuel assembly starts at a block 4680. At a block 4690, an enclosure is provided to enclose a heat-generating nuclear fuel body therein, the nuclear fuel body defining a plurality of interconnected open-cell pores. At a block 4700, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 4710, the fluid control subassembly is coupled so as to sequentially circulate a fission product removal fluid and a heat removal fluid. The method 4670 stops at a block 4720.

Referring to FIG. 21BQ, an illustrative method 4730 for assembling the nuclear fission reactor fuel assembly starts at a block 4740. At a block 4750, an enclosure is provided to enclose a heat-generating nuclear fuel body therein, the nuclear fuel body defining a plurality of interconnected open-cell pores. At a block 4760, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 4770, a pump is integrally connected to the fluid control subassembly to pump a fluid from the fluid control subassembly to the pores of the nuclear fuel body. The method 4730 stops at a block 4780.

Referring to FIG. 21BR, an illustrative method 4790 for assembling the nuclear fission reactor fuel assembly starts at a block 4800. At a block 4810, an enclosure is provided to enclose a heat-generating nuclear fuel body therein, the nuclear fuel body defining a plurality of interconnected open-cell pores. At a block 4820, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 4830, the method comprises coupling a pump. The method 4790 stops at a block 4840.

Referring to FIG. 21BS, an illustrative method 4850 for assembling the nuclear fission reactor fuel assembly starts at a block 4860. At a block 4870, an enclosure is provided to enclose a heat-generating nuclear fuel body therein, the nuclear fuel body defining a plurality of interconnected open-cell pores. At a block 4880, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 4890, a fission product reservoir is coupled to the fluid control subassembly to receive the volatile fission product. The method 4850 stops at a block 4900.

Referring to FIG. 21BT, an illustrative method 4910 for assembling the nuclear fission reactor fuel assembly starts at a block 4920. At a block 4930, an enclosure is provided to enclose a heat-generating nuclear fuel body therein, the nuclear fuel body defining a plurality of interconnected open-cell pores. At a block 4940, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 4950, a plurality of first components are coupled so as to enable the fluid control subassembly to circulate a fission product removal fluid through the pores of the nuclear fuel body, whereby at least a portion of the volatile fission product is removed from the pores of the nuclear fuel body while the fluid control subassembly circulates the fission product removal fluid through the pores of the nuclear fuel body. The method 4910 stops at a block 4960.

Referring to FIG. 21BU, an illustrative method 4970 for assembling the nuclear fission reactor fuel assembly starts at a block 4980. At a block 4990, an enclosure is provided to enclose a heat-generating nuclear fuel body therein, the nuclear fuel body defining a plurality of interconnected open-cell pores. At a block 5000, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 5010, a plurality of first components are coupled so as to enable the fluid control subassembly to circulate a fission product removal fluid through the pores of the nuclear fuel body, whereby at least a portion of the volatile fission product is removed from the pores of the nuclear fuel body while the fluid control subassembly circulates the fission product removal fluid through the pores of the nuclear fuel body. At a block 5020, a plurality of second components are coupled so as to enable the fluid control subassembly to circulate a heat removal fluid through the pores of the nuclear fuel body, whereby at least a portion of the heat generated by the nuclear fuel body is removed from the nuclear fuel body while the fluid control subassembly circulates the heat removal fluid through the pores of the nuclear fuel body. The method 4970 stops at a block 5030.

Referring to FIG. 21BV, an illustrative method 5040 for assembling the nuclear fission reactor fuel assembly starts at a block 5050. At a block 5060, an enclosure is provided to enclose a heat-generating nuclear fuel body therein, the nuclear fuel body defining a plurality of interconnected open-cell pores. At a block 5070, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 5080, a plurality of first components are coupled so as to enable the fluid control subassembly to circulate a fission product removal fluid through the pores of the nuclear fuel body, whereby at least a portion of the volatile fission product is removed from the pores of the nuclear fuel body while the fluid control subassembly circulates the fission product removal fluid through the pores of the nuclear fuel body. At a block 5090, a plurality of second components are coupled so as to enable the fluid control subassembly to circulate a heat removal fluid through the pores of the nuclear fuel body, whereby at least a portion of the heat generated by the nuclear fuel body is removed from the nuclear fuel body while the fluid control subassembly circulates the heat removal fluid through the pores of the nuclear fuel body. At a block 5100, the method comprises operatively coupling the first components and the second components, so that at least one of the first components and at least one of the second components are identical. The method 5040 stops at a block 5110.

Referring to FIG. 21BW, an illustrative method 5120 for assembling the nuclear fission reactor fuel assembly starts at a block 5130. At a block 5140, an enclosure is provided to enclose a heat-generating nuclear fuel body therein, the nuclear fuel body defining a plurality of interconnected open-cell pores. At a block 5150, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 5160, the method comprises coupling a dual-purpose circuit to selectively remove the volatile fission product and heat from the nuclear fuel. The method 5120 stops at a block 5170.

Referring to FIG. 21BX, an illustrative method 5180 for assembling the nuclear fission reactor fuel assembly starts at a block 5190. At a block 5200, an enclosure is provided to enclose a heat-generating nuclear fuel body therein, the nuclear fuel body defining a plurality of interconnected open-cell pores. At a block 5210, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 5220, the fluid control subassembly is coupled so that the nuclear fission fuel assembly is configured to circulate a gas through the pores of the nuclear fuel body. The method 5180 stops at a block 5230.

Referring to FIG. 21BY, an illustrative method 5240 for assembling the nuclear fission reactor fuel assembly starts at a block 5250. At a block 5260, an enclosure is provided to enclose a heat-generating nuclear fuel body therein, the nuclear fuel body defining a plurality of interconnected open-cell pores. At a block 5270, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 5280, the fluid control subassembly is coupled so that the nuclear fission fuel assembly is configured to circulate a liquid through the pores of the nuclear fuel body. The method 5240 stops at a block 5290.

Referring to FIG. 21BZ, an illustrative method 5300 for assembling the nuclear fission reactor fuel assembly starts at a block 5310. At a block 5320, an enclosure is provided to enclose a heat-generating nuclear fuel body therein, the nuclear fuel body defining a plurality of interconnected open-cell pores. At a block 5330, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 5340, the enclosure is provided so as to enclose a nuclear fuel body in the form of a foam defining the plurality of pores. The method 5300 stops at a block 5350.

Referring to FIG. 21CA, an illustrative method 5360 for assembling the nuclear fission reactor fuel assembly starts at a block 5370. At a block 5380, an enclosure is provided to enclose a heat-generating nuclear fuel body therein, the nuclear fuel body defining a plurality of interconnected open-cell pores. At a block 5390, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 5400, the enclosure is provided so as to enclose a nuclear fuel body having a plurality of channels. The method 5360 stops at a block 5410.

Referring to FIG. 21CB, an illustrative method 5420 for assembling the nuclear fission reactor fuel assembly starts at a block 5430. At a block 5440, an enclosure is provided to enclose a heat-generating nuclear fuel body therein, the nuclear fuel body defining a plurality of interconnected open-cell pores. At a block 5450, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 5460, the enclosure is provided so as to enclose a nuclear fuel body having a plurality of channels. At a block 5470, the enclosure is provided so as to enclose a nuclear fuel body having a plurality of particles defining the plurality of channels therebetween. The method 5420 stops at a block 5480.

Referring to FIG. 21CC, an illustrative method 5490 for assembling the nuclear fission reactor fuel assembly starts at a block 5500. At a block 5510, an enclosure is provided to enclose a heat-generating nuclear fuel body therein, the nuclear fuel body defining a plurality of interconnected open-cell pores. At a block 5520, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 5530, the enclosure is provided so as to enclose a nuclear fuel body defining the plurality of pores, the plurality of pores having a spatially non-uniform distribution. The method 5490 stops at a block 5540.

Referring to FIG. 21CD, an illustrative method 5550 for assembling the nuclear fission reactor fuel assembly starts at a block 5560. At a block 5570, an enclosure is provided to enclose a heat-generating nuclear fuel body therein, the nuclear fuel body defining a plurality of interconnected open-cell pores. At a block 5580, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 5590, the enclosure is provided so as to enclose a nuclear fuel body having the plurality of pores for acquiring the volatile fission product released by the burn wave in the traveling wave nuclear fission reactor. The method 5550 stops at a block 5600.

Referring to FIG. 21CE, an illustrative method 5610 for assembling the nuclear fission reactor fuel assembly starts at a block 5620. At a block 5630, an enclosure is provided to enclose a heat-generating nuclear fuel body therein, the nuclear fuel body defining a plurality of interconnected open-cell pores. At a block 5640, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 5650, the enclosure is provided so as to enclose a nuclear fuel body having the plurality of pores, one or more of the plurality of pores being of a predetermined configuration to allow at least a portion of the volatile fission product to escape the nuclear fuel body within a predetermined response time. The method 5610 stops at a block 5660.

Referring to FIG. 21CF, an illustrative method 5670 for assembling the nuclear fission reactor fuel assembly starts at a block 5680. At a block 5690, an enclosure is provided to enclose a heat-generating nuclear fuel body therein, the nuclear fuel body defining a plurality of interconnected open-cell pores. At a block 5700, a fluid control subassembly is coupled to the enclosure to control removal of at least a portion of the volatile fission product from the pores of the nuclear fuel body and to control removal of at least a portion of the heat generated by the nuclear fuel body as previously mentioned. At block a 5710, the enclosure is provided so as to enclose a nuclear fuel body having the plurality of pores to allow at least a portion of the volatile fission product to escape the nuclear fuel body within a predetermined response time of between approximately 10 seconds and approximately 1,000 seconds. The method 5670 stops at a block 5720.

Referring to FIG. 21CG, an illustrative method 5730 for assembling the nuclear fission reactor fuel assembly starts at a block 5740. At a block 5750, an enclosure is provided to enclose a heat-generating nuclear fuel body therein, the nuclear fuel body defining a plurality of interconnected open-cell pores. At a block 5760, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 5770, the enclosure is provided so as to enclose a nuclear fuel body having the plurality of pores to allow at least a portion of the volatile fission product to escape the nuclear fuel body within a predetermined response time of between approximately one second and approximately 10,000 seconds. The method 5730 stops at a block 5780.

Referring to FIG. 21CH, an illustrative method 5790 for assembling the nuclear fission reactor fuel assembly starts at a block 5800. At a block 5810, an enclosure is provided to enclose a heat-generating nuclear fuel body therein, the nuclear fuel body defining a plurality of interconnected open-cell pores. At a block 5820, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 5830, the enclosure is provided so as to enclose a nuclear fuel body having the plurality of pores to transport the volatile fission product through the nuclear fuel body. The method 5790 stops at a block 5840.

Referring to FIG. 21CI, an illustrative method 5850 for assembling the nuclear fission reactor fuel assembly starts at a block 5860. At a block 5870, an enclosure is provided to enclose a heat-generating nuclear fuel body therein, the nuclear fuel body defining a plurality of interconnected open-cell pores. At a block 5880, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 5890, the enclosure is provided so as to sealingly enclose a nuclear fuel body having a cylindrical-shaped geometry. The method 5850 stops at a block 5900.

Referring to FIG. 21CJ, an illustrative method 5910 for assembling the nuclear fission reactor fuel assembly starts at a block 5920. At a block 5930, an enclosure is provided to enclose a heat-generating nuclear fuel body therein, the nuclear fuel body defining a plurality of interconnected open-cell pores. At a block 5940, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 5950, the enclosure is provided so as to sealingly enclose a nuclear fuel body having a polygonal-shaped geometry. The method 5910 stops at a block 5960.

Referring to FIG. 21CK, an illustrative method 5970 for assembling the nuclear fission reactor fuel assembly starts at a block 5980. At a block 5990, an enclosure is provided to enclose a heat-generating nuclear fuel body therein, the nuclear fuel body defining a plurality of interconnected open-cell pores. At a block 6000, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 6010, the method comprises coupling a valve. The method 5970 stops at a block 6020.

Referring to FIG. 21CL, an illustrative method 6030 for assembling the nuclear fission reactor fuel assembly starts at a block 6040. At a block 6050, an enclosure is provided to enclose a heat-generating nuclear fuel body therein, the nuclear fuel body defining a plurality of interconnected open-cell pores. At a block 6060, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 6070, a valve is interposed between the enclosure and the fluid control subassembly to control flow of a fluid between the enclosure and the fluid control subassembly. The method 6030 stops at a block 6080.

Referring to FIG. 21CM, an illustrative method 6090 for assembling the nuclear fission reactor fuel assembly starts at a block 6100. At a block 6110, an enclosure is provided to enclose a heat-generating nuclear fuel body therein, the nuclear fuel body defining a plurality of interconnected open-cell pores. At a block 6120, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 6130, a valve is interposed between the enclosure and the fluid control subassembly to control flow of a fluid between the enclosure and the fluid control subassembly. At a block 6140, the method comprises interposing a back-flow prevention valve. The method 6090 stops at a block 6150.

Referring to FIG. 21CN, an illustrative method 6160 for assembling the nuclear fission reactor fuel assembly starts at a block 6170. At a block 6180, an enclosure is provided to enclose a heat-generating nuclear fuel body therein, the nuclear fuel body defining a plurality of interconnected open-cell pores. At a block 6190, a fluid control subassembly is coupled to the enclosure to control removal of at least a portion of the volatile fission product from the pores of the nuclear fuel body and to control removal of at least a portion of the heat generated by the nuclear fuel body as previously mentioned. At block 6200, the method comprises coupling a controllably breakable barrier. The method 6160 stops at a block 6210.

Referring to FIG. 21CO, an illustrative method 6220 for assembling the nuclear fission reactor fuel assembly starts at a block 6230. At a block 6240, an enclosure is provided to enclose a heat-generating nuclear fuel body therein, the nuclear fuel body defining a plurality of interconnected open-cell pores. At a block 6250, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 6260, a controllably breakable barrier is interposed between the enclosure and the fluid control subassembly. The method 6220 stops at a block 6270.

Referring to FIG. 21CP, an illustrative method 6280 for assembling the nuclear fission reactor fuel assembly starts at a block 6290. At a block 6300, an enclosure is provided to enclose a heat-generating nuclear fuel body therein, the nuclear fuel body defining a plurality of interconnected open-cell pores. At a block 6310, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 6320, a controllably breakable barrier is interposed between the enclosure and the fluid control subassembly. At a block 6330, the method comprises interposing a controllably breakable barrier breakable at a predetermined pressure. The method 6280 stops at a block 6340.

Referring to FIG. 21CQ, an illustrative method 6350 for assembling the nuclear fission reactor fuel assembly starts at a block 6360. At a block 6370, an enclosure is provided to enclose a heat-generating nuclear fuel body therein, the nuclear fuel body defining a plurality of interconnected open-cell pores. At a block 6380, a fluid control subassembly is coupled to the enclosure to control removal of at least a portion of the volatile fission product from the pores of the nuclear fuel body and to control removal of at least a portion of the heat generated by the nuclear fuel body as previously mentioned. At a block 6390, a controllably breakable barrier is interposed between the enclosure and the fluid control subassembly. At a block 6400, the method comprises interposing a controllably breakable barrier breakable by operator action. The method 6350 stops at a block 6410.

Referring to FIG. 22A, an illustrative method is provided for removal of a volatile fission product at a plurality of locations corresponding to a burn wave. In this regard, the illustrative method 6420 for removal of the volatile fission product starts at a block 6430. At a block 6440, removal of a volatile fission product is controlled at a plurality of locations corresponding to a burn wave of a traveling wave nuclear fission reactor by controlling fluid flow in a plurality of regions of the nuclear fission reactor proximate to the plurality of locations corresponding to the burn wave. The method 6420 stops at a block 6450.

Figure 23A:
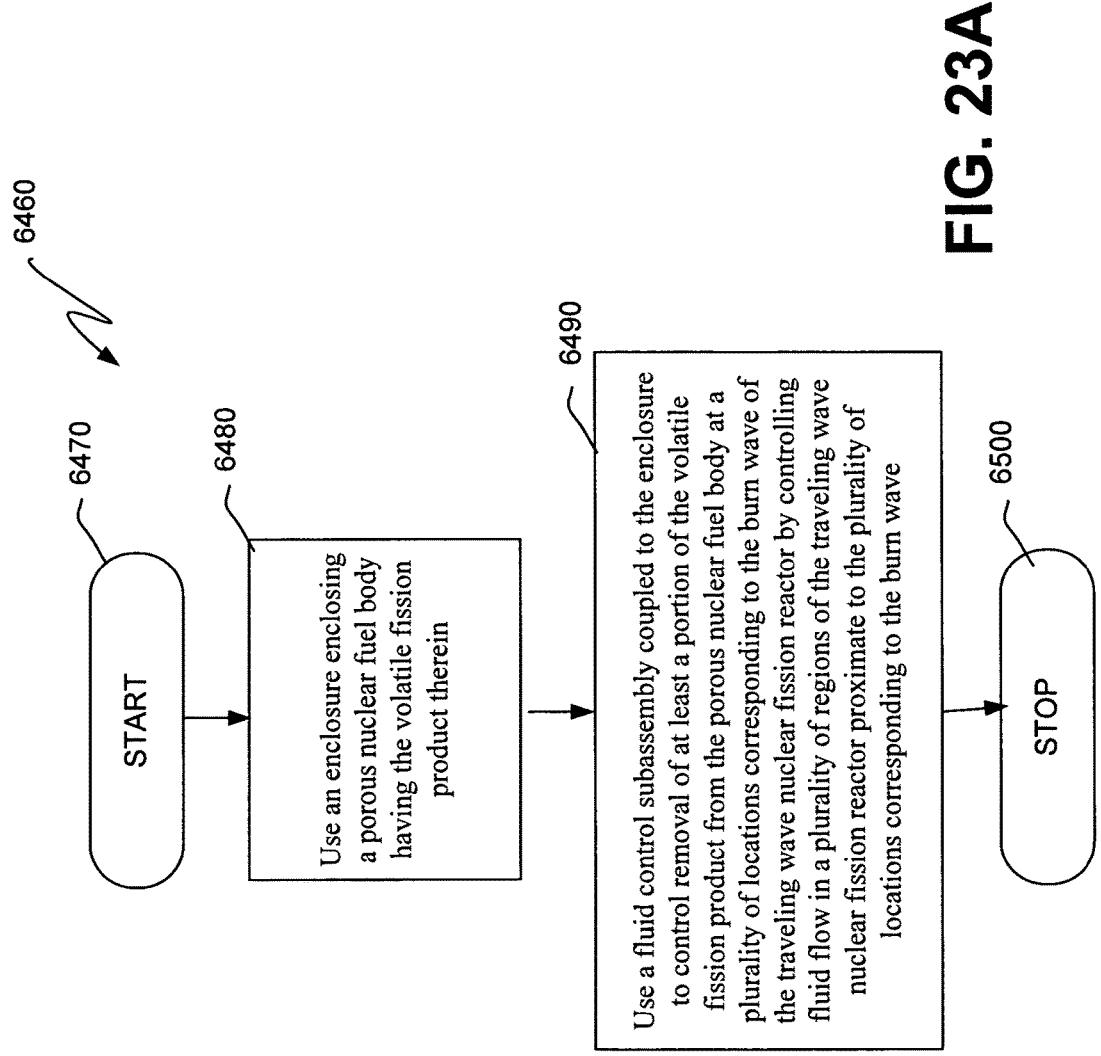
FIGS. 23A-23CK are flowcharts of illustrative methods of operating a nuclear fission reactor fuel assembly configured for controlled removal of a volatile fission product and heat released by a burn wave in a traveling wave nuclear fission reactor.
Figure 23B:
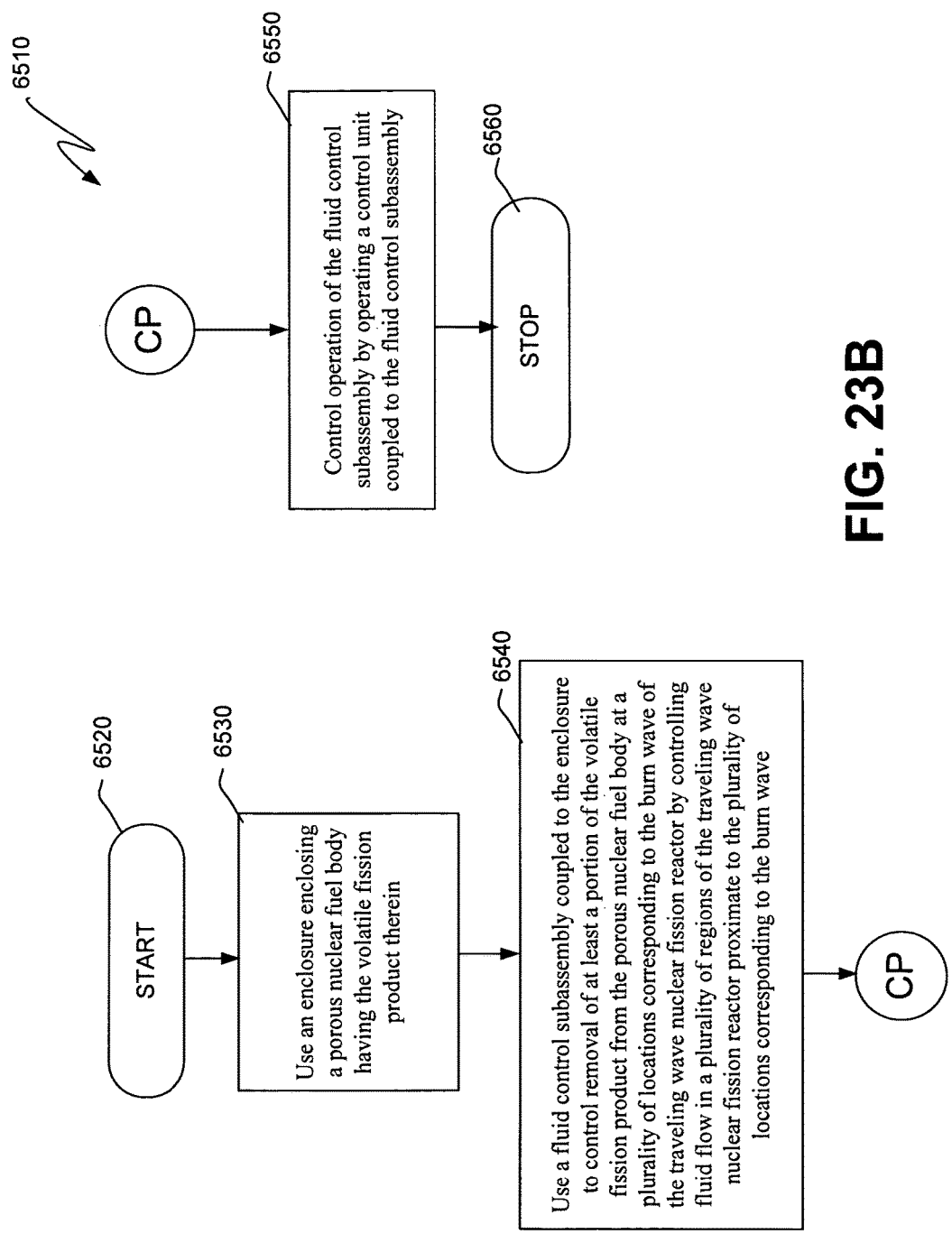
Figure 23C:
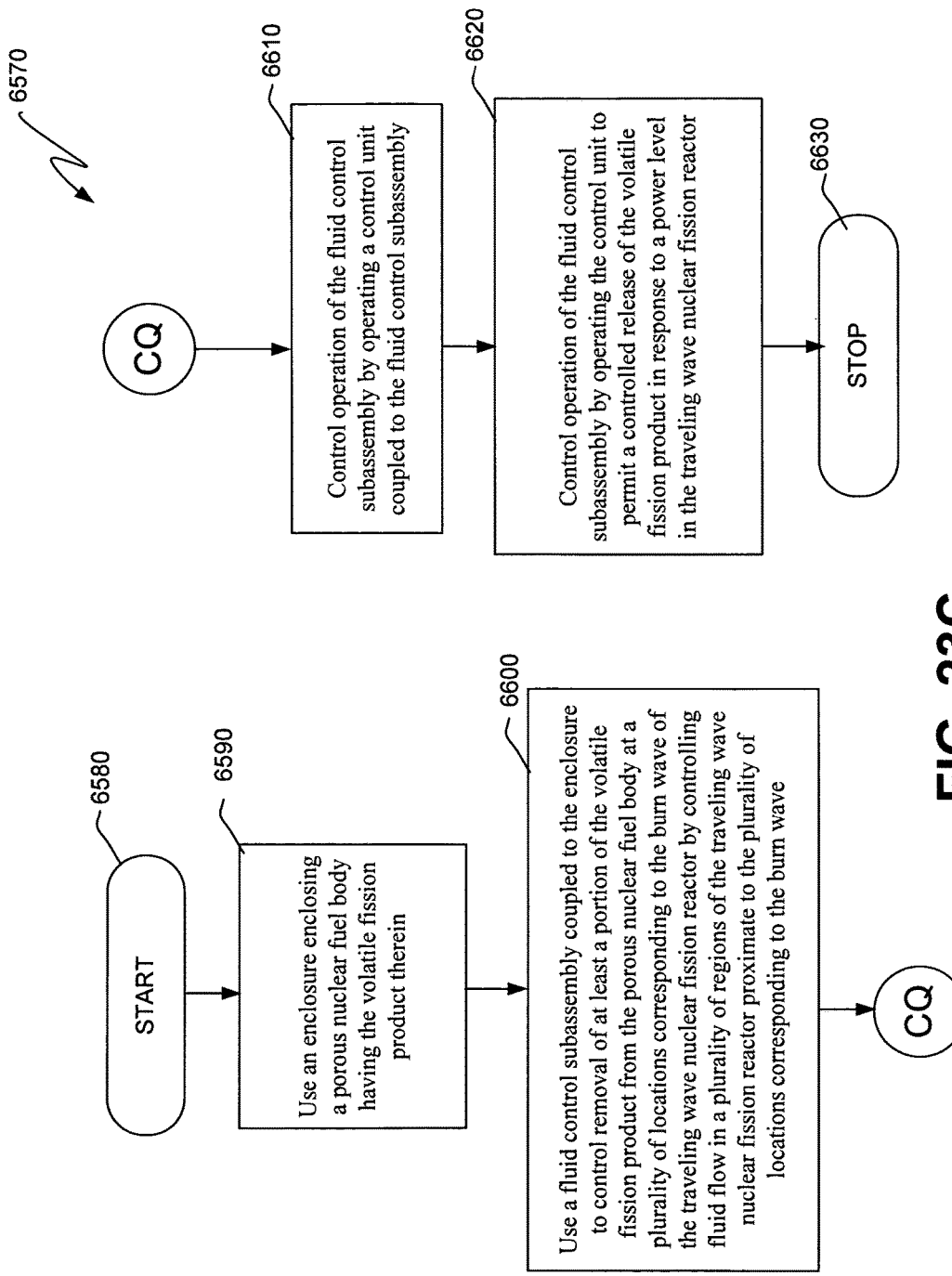

Referring to FIGS. 23A-23CK, illustrative methods are provided for operating the nuclear fission reactor fuel assembly and system.

Referring to FIG. 23A, an illustrative method 6460 for operating a nuclear fission reactor fuel assembly starts at a block 6470. At a block 6480, an enclosure is used that encloses a porous nuclear fuel body having the volatile fission product therein. At a block 6490, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. The method 6460 stops at a block 6500.

Referring to FIG. 23B, an illustrative method 6510 for operating a nuclear fission reactor fuel assembly starts at a block 6520. At a block 6530, an enclosure is used that encloses a porous nuclear fuel body having the volatile fission product therein. At a block 6540, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 6550, operation of the fluid control subassembly is controlled by operating a control unit coupled to the fluid control subassembly. The method 6510 stops at a block 6560.

Referring to FIG. 23C, an illustrative method 6570 for operating a nuclear fission reactor fuel assembly starts at a block 6580. At a block 6590, an enclosure is used that encloses a porous nuclear fuel body having the volatile fission product therein. At a block 6600, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 6610, operation of the fluid control subassembly is controlled by operating a control unit coupled to the fluid control subassembly. At a block 6620, operation of the fluid control subassembly is controlled by operating the control unit to permit a controlled release of the volatile fission product in response to a power level in the traveling wave nuclear fission reactor. The method 6570 stops at a block 6630.

Figure 23D:
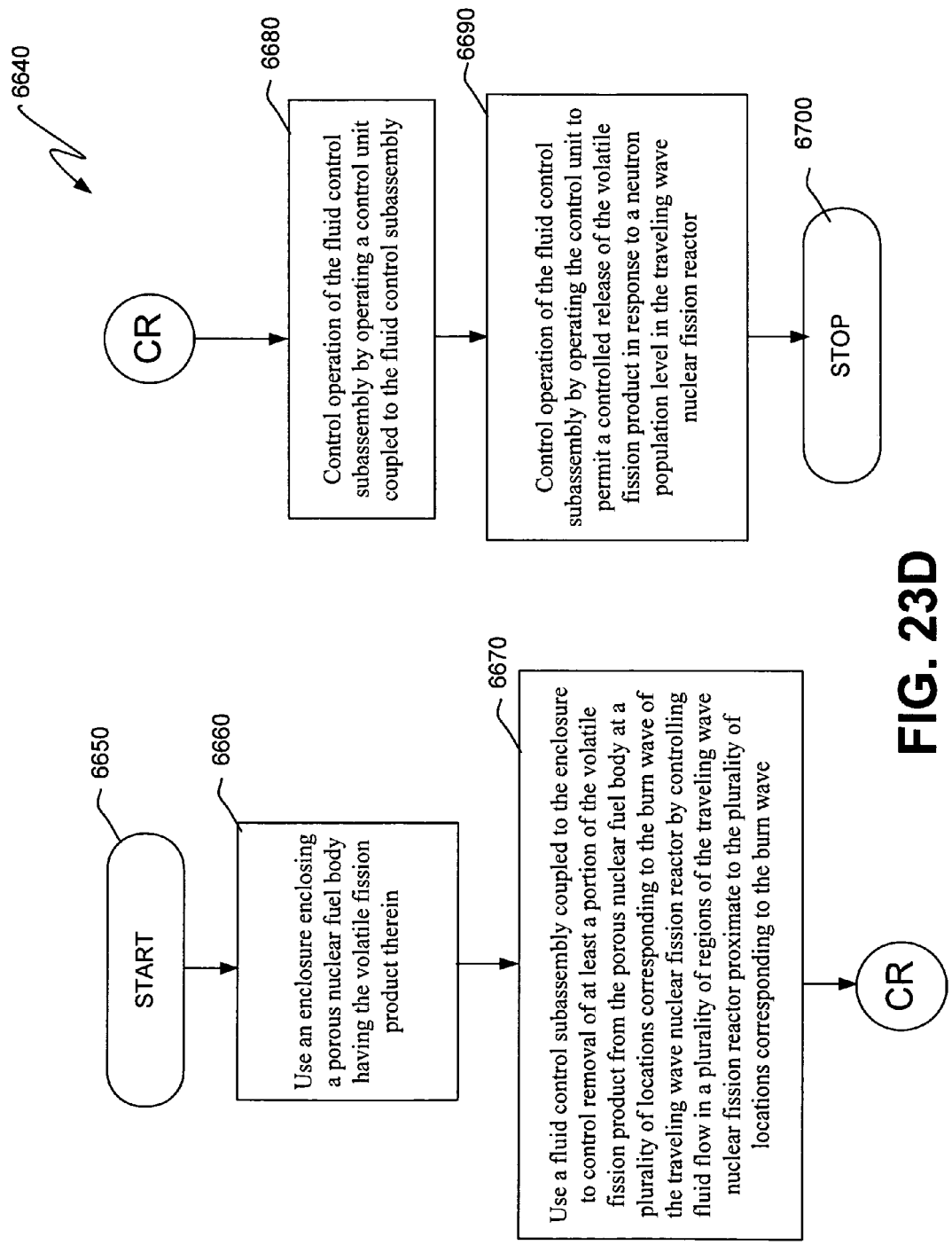

Referring to FIG. 23D, an illustrative method 6640 for operating a nuclear fission reactor fuel assembly starts at a block 6650. At a block 6660, an enclosure is used that encloses a porous nuclear fuel body having the volatile fission product therein. At a block 6670, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 6680, operation of the fluid control subassembly is controlled by operating a control unit coupled to the fluid control subassembly. At a block 6690, operation of the fluid control subassembly is controlled by operating the control unit to permit a controlled release of the volatile fission product in response to a neutron population level in the traveling wave nuclear fission reactor. The method 6640 stops at a block 6700.

Figure 23E:
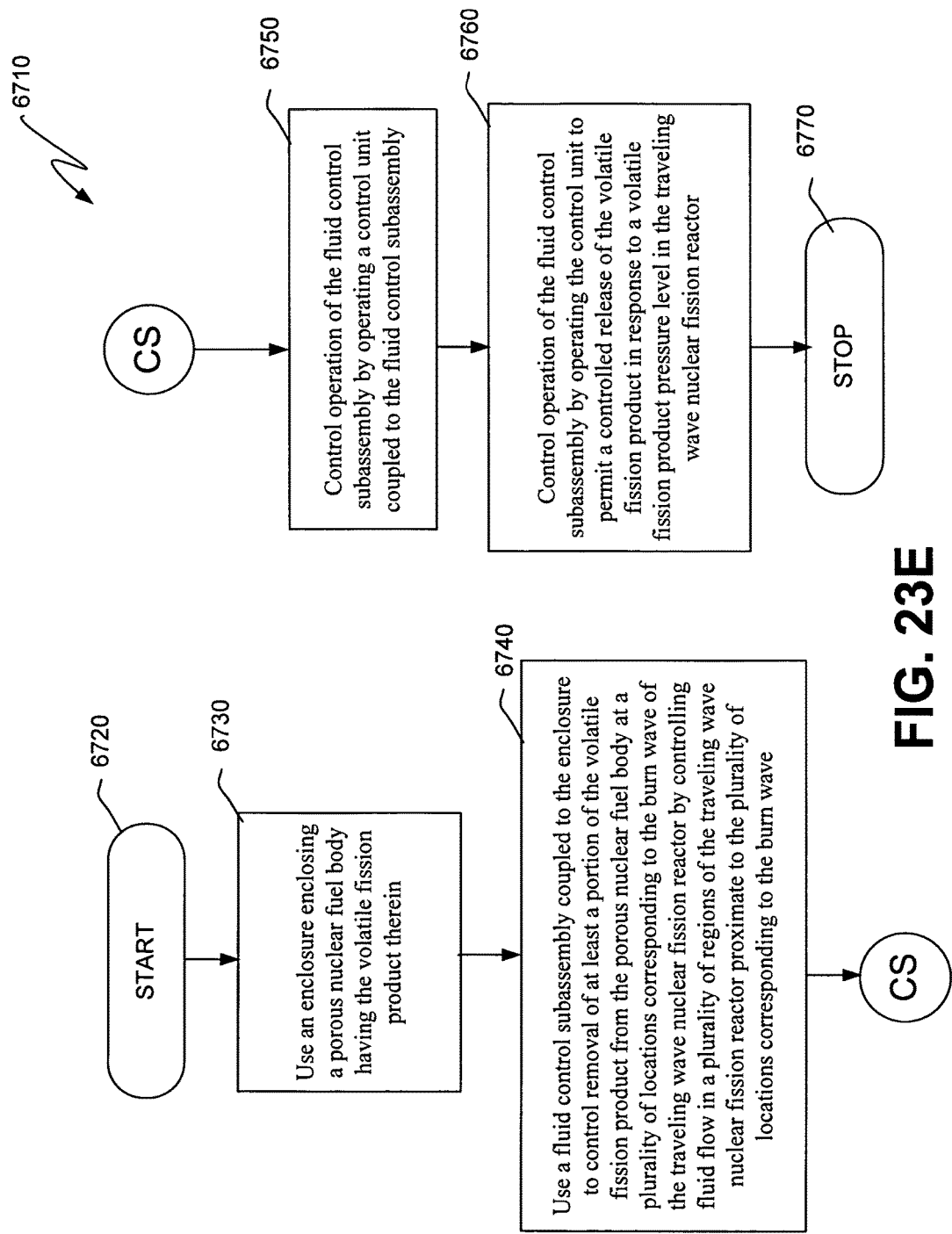

Referring to FIG. 23E, an illustrative method 6710 for operating a nuclear fission reactor fuel assembly starts at a block 6720. At a block 6730, an enclosure is used that encloses a porous nuclear fuel body having the volatile fission product therein. At a block 6740, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 6750, operation of the fluid control subassembly is controlled by operating a control unit coupled to the fluid control subassembly. At a block 6760, operation of the fluid control subassembly is controlled by operating the control unit to permit a controlled release of the volatile fission product in response to a volatile fission product pressure level in the traveling wave nuclear fission reactor. The method 6710 stops at a block 6770.

Figure 23F:
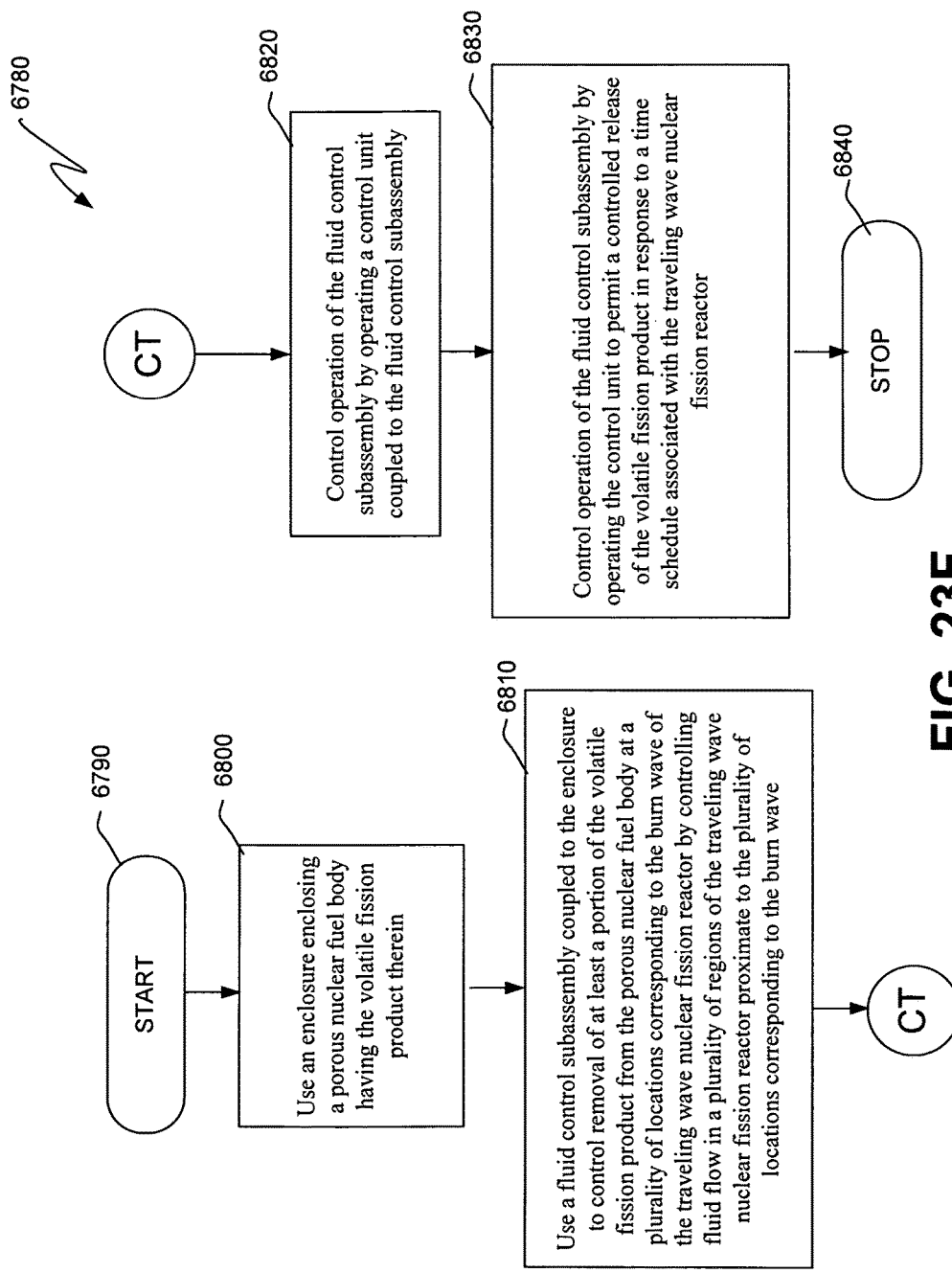

Referring to FIG. 23F, an illustrative method 6780 for operating a nuclear fission reactor fuel assembly starts at a block 6790. At a block 6800, an enclosure is used that encloses a porous nuclear fuel body having the volatile fission product therein. At a block 6810, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 6820, operation of the fluid control subassembly is controlled by operating a control unit coupled to the fluid control subassembly. At a block 6830, operation of the fluid control subassembly is controlled by operating the control unit to permit a controlled release of the volatile fission product in response to a time schedule associated with the traveling wave nuclear fission reactor. The method 6780 stops at a block 6840.

Figure 23G:
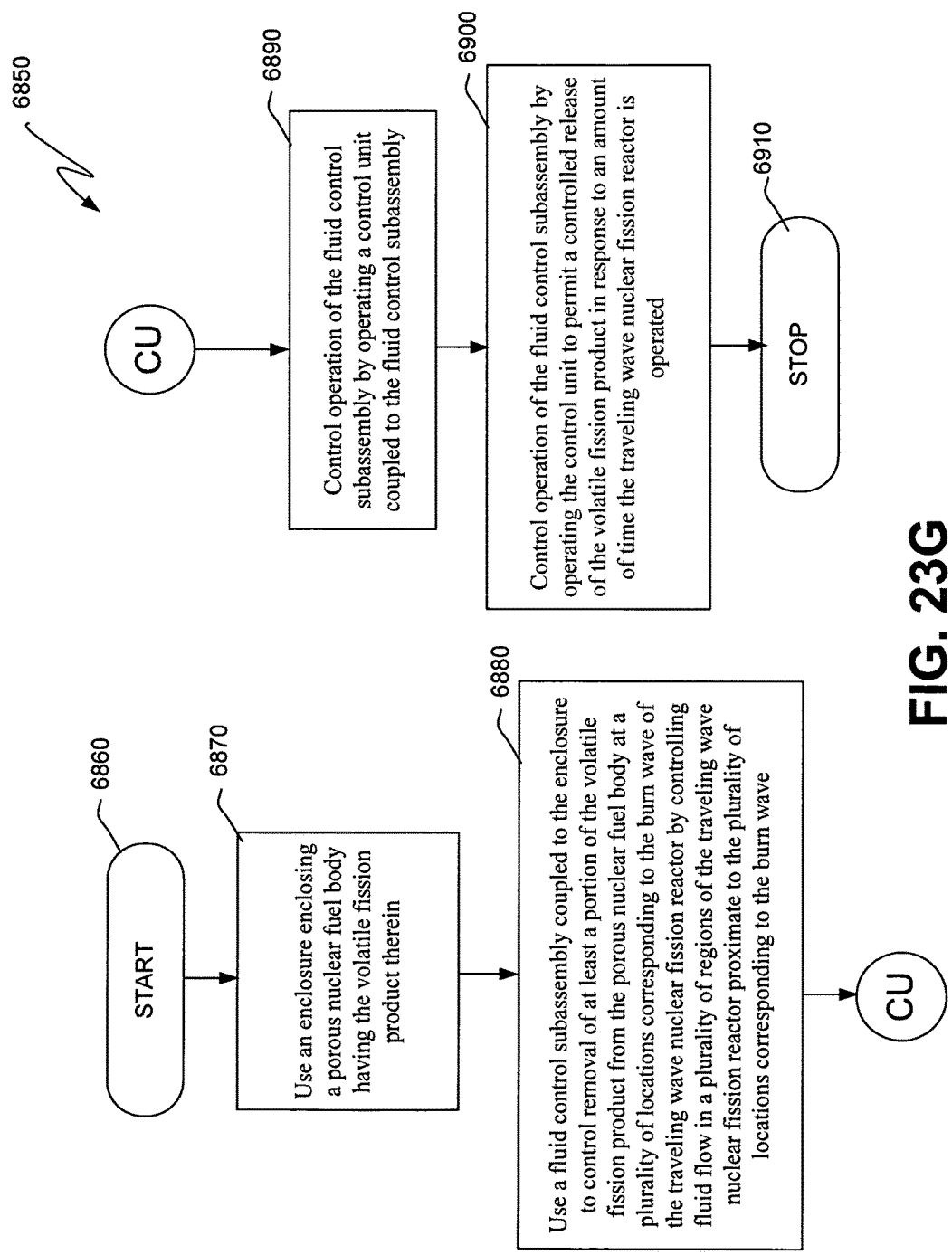

Referring to FIG. 23G, an illustrative method 6850 for operating a nuclear fission reactor fuel assembly starts at a block 6860. At a block 6870, an enclosure is used that encloses a porous nuclear fuel body having the volatile fission product therein. At a block 6880, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 6890, operation of the fluid control subassembly is controlled by operating a control unit coupled to the fluid control subassembly. At a block 6900, operation of the fluid control subassembly is controlled by operating the control unit to permit a controlled release of the volatile fission product in response to an amount of time the traveling wave nuclear fission reactor is operated. The method 6850 stops at a block 6910.

Figure 23H:
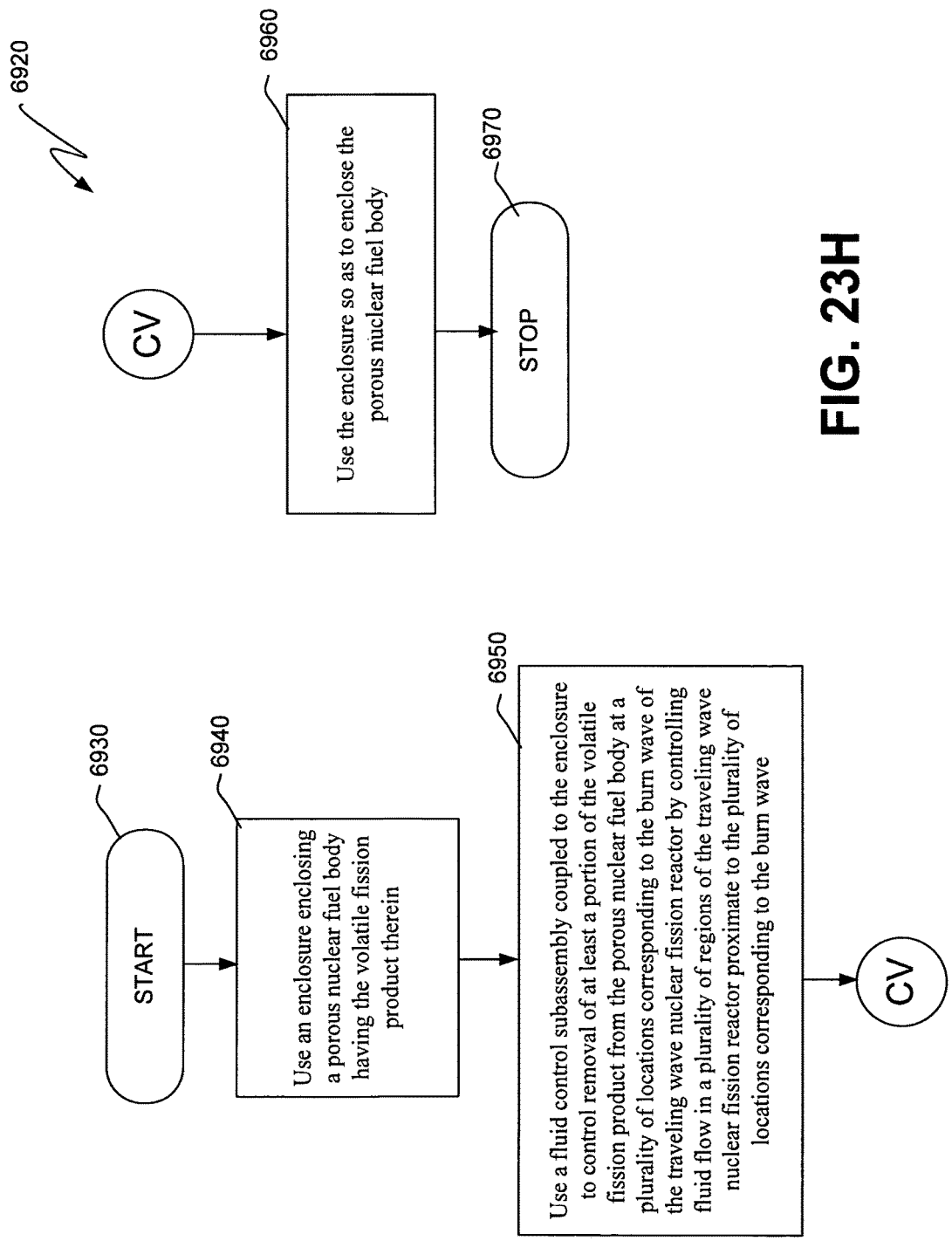

Referring to FIG. 23H, an illustrative method 6920 for operating a nuclear fission reactor fuel assembly starts at a block 6930. At a block 6940, an enclosure is used that encloses a porous nuclear fuel body having the volatile fission product therein. At a block 6950, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 6960, the enclosure is used so as to enclose the porous nuclear fuel body. The method 6920 stops at a block 6970.

Figure 23I:
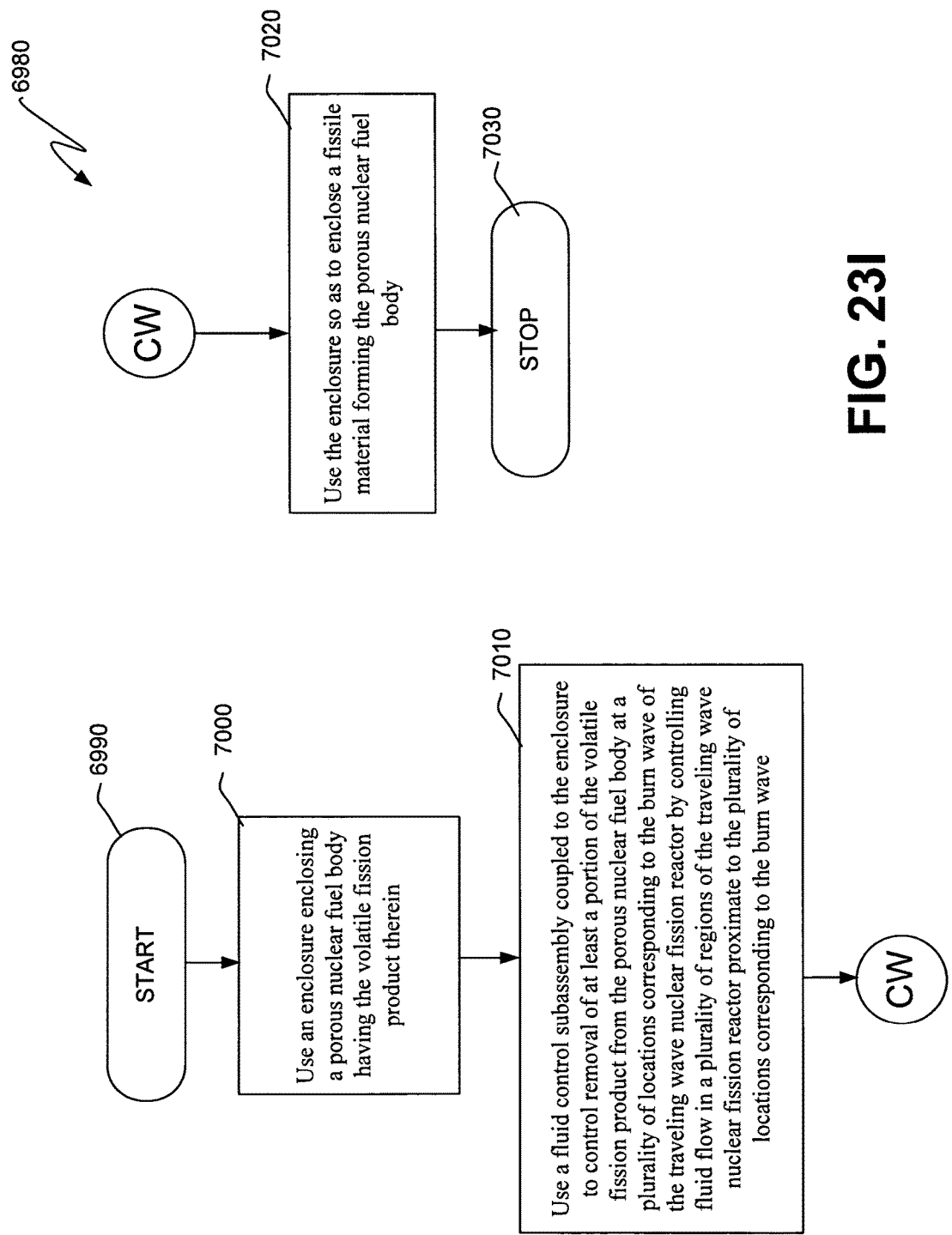

Referring to FIG. 23I, an illustrative method 6980 for operating a nuclear fission reactor fuel assembly starts at a block 6990. At a block 7000, an enclosure is used that encloses a porous nuclear fuel body having the volatile fission product therein. At a block 7010, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 7020, the enclosure is used so as to enclose a fissile material forming the porous nuclear fuel body. The method 6980 stops at a block 7030.

Figure 23J:
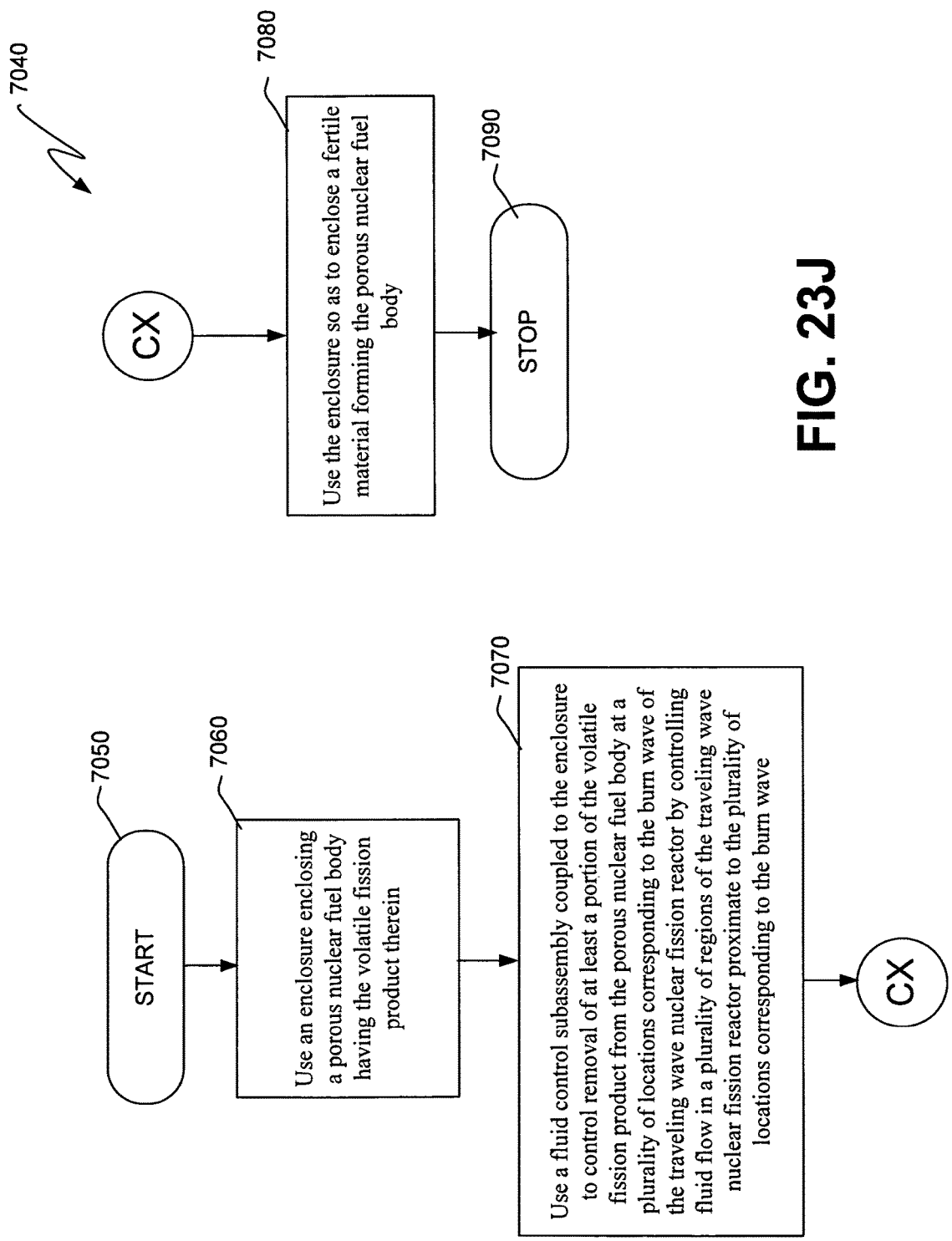

Referring to FIG. 23J, an illustrative method 7040 for operating a nuclear fission reactor fuel assembly starts at a block 7050. At a block 7060, an enclosure is used that encloses a porous nuclear fuel body having the volatile fission product therein. At a block 7070, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 7080, the enclosure is used so as to enclose a fertile material forming the porous nuclear fuel body. The method 7040 stops at a block 7090.

Figure 23K:
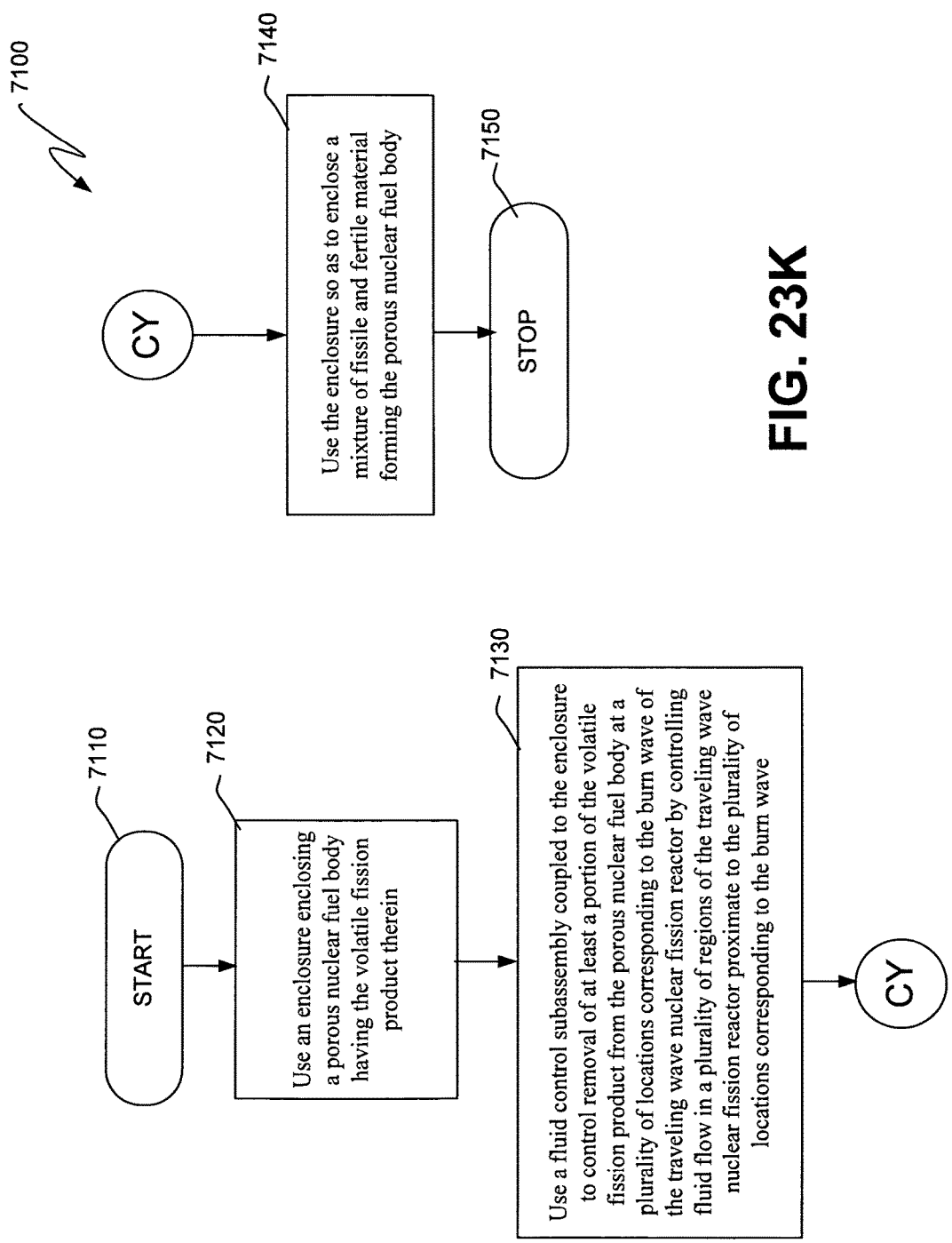

Referring to FIG. 23K, an illustrative method 7100 for operating a nuclear fission reactor fuel assembly starts at a block 7110. At a block 7120, an enclosure is used that encloses a porous nuclear fuel body having the volatile fission product therein. At a block 7130, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 7140, the enclosure is used so as to enclose a mixture of fissile and fertile material forming the porous nuclear fuel body. The method 7100 stops at a block 7150.

Figure 23L:
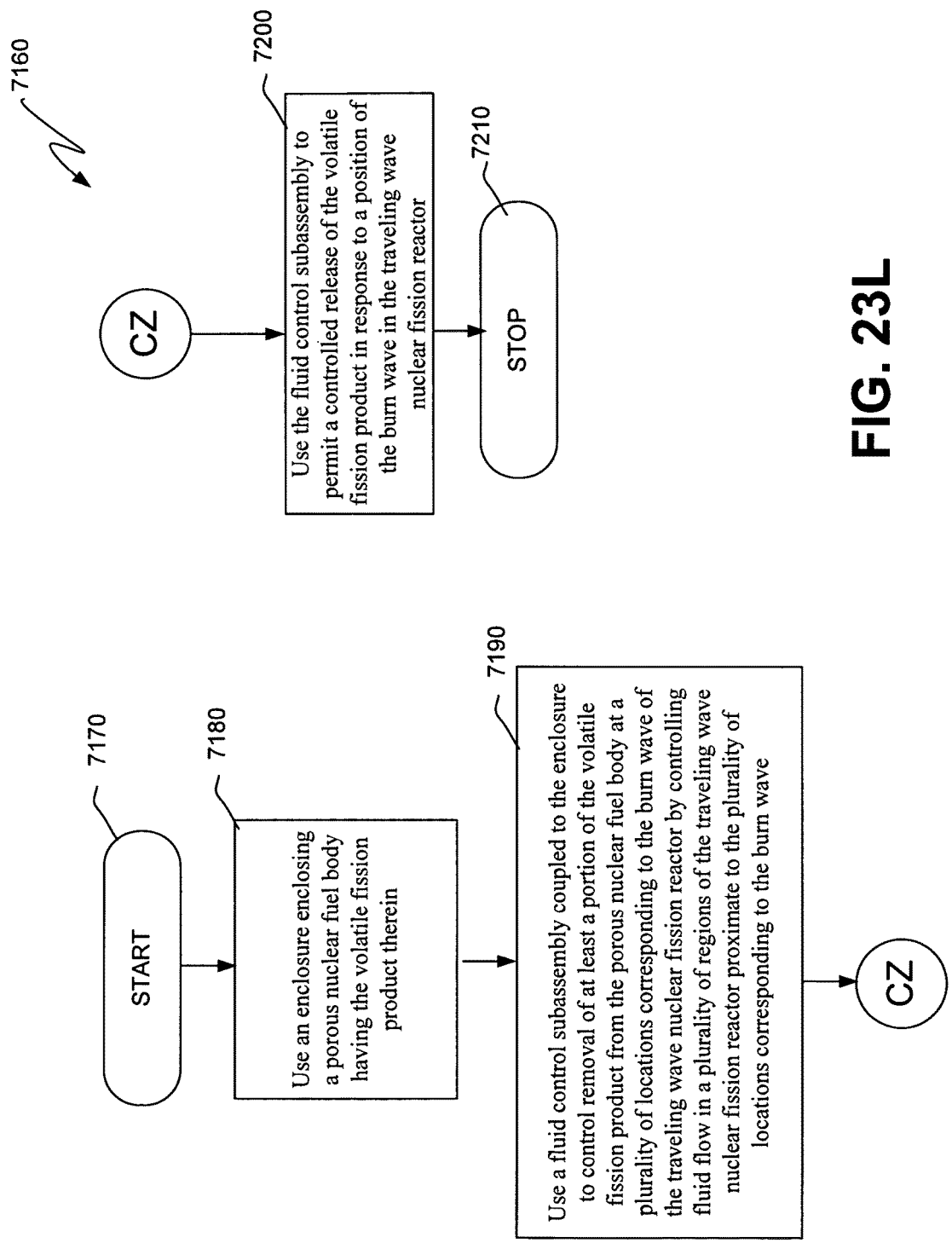

Referring to FIG. 23L, an illustrative method 7160 for operating a nuclear fission reactor fuel assembly starts at a block 7170. At a block 7180, an enclosure is used that encloses a porous nuclear fuel body having the volatile fission product therein. At a block 7190, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 7200, the fluid control subassembly is used to permit a controlled release of the volatile fission product in response to a position of the burn wave in the traveling wave nuclear fission reactor. The method 7160 stops at a block 7210.

Figure 23M:
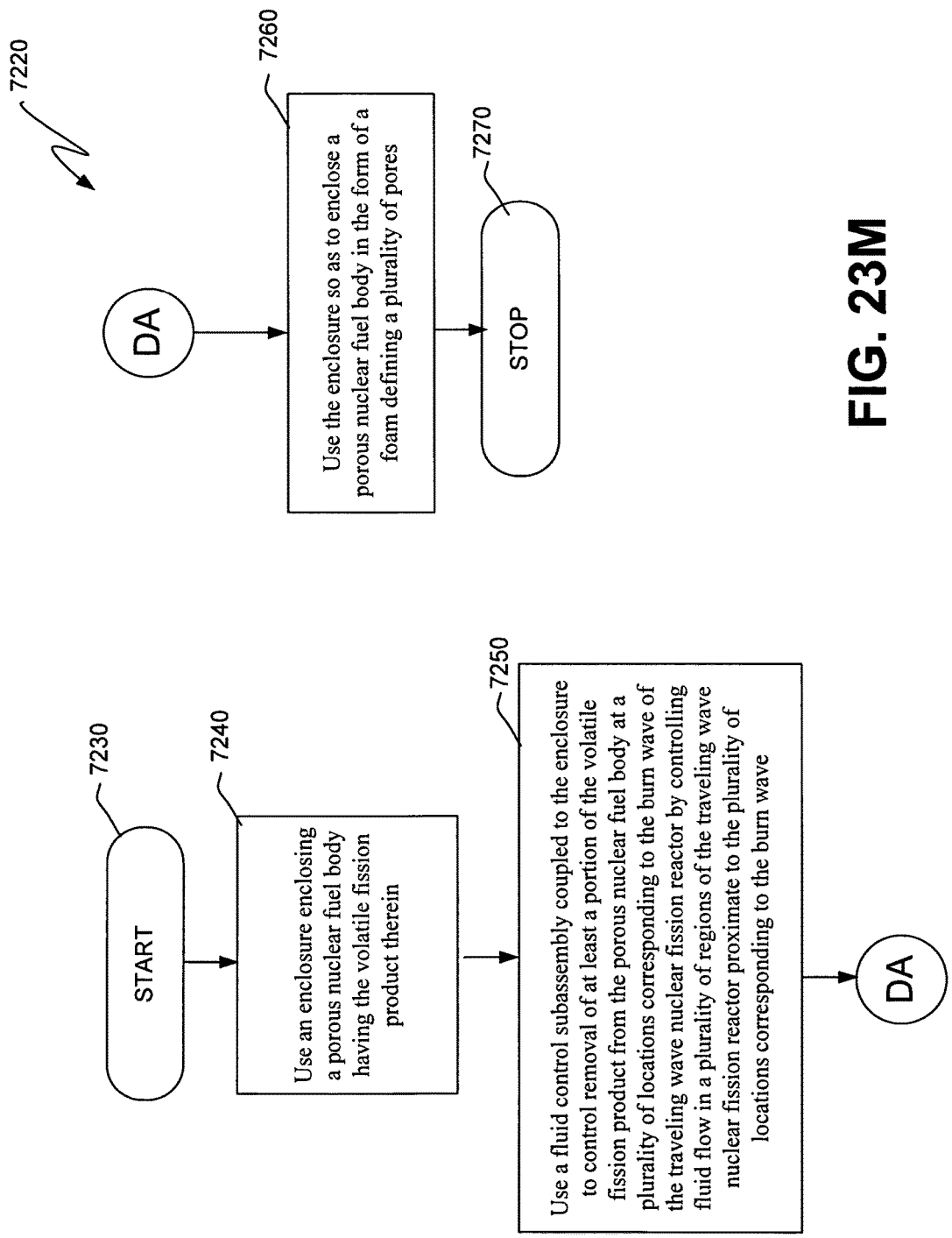

Referring to FIG. 23M, an illustrative method 7220 for operating a nuclear fission reactor fuel assembly starts at a block 7230. At a block 7240, an enclosure is used that encloses a porous nuclear fuel body having the volatile fission product therein. At a block 7250, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 7260, the enclosure is used so as to enclose a porous nuclear fuel body in the form of a foam defining a plurality of pores. The method 7220 stops at a block 7270.

Figure 23N:
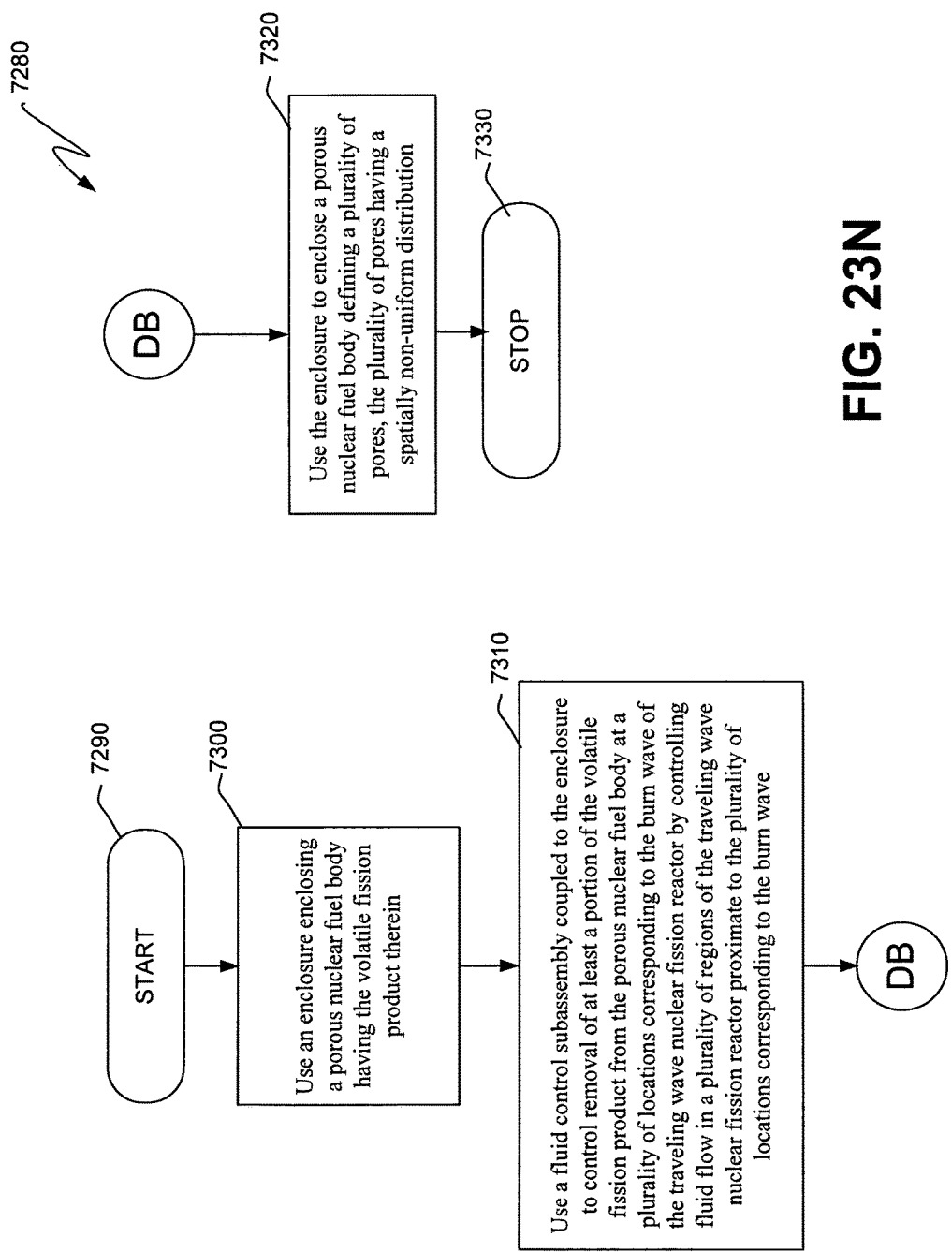

Referring to FIG. 23N, an illustrative method 7280 for operating a nuclear fission reactor fuel assembly starts at a block 7290. At a block 7300, an enclosure is used that encloses a porous nuclear fuel body having the volatile fission product therein. At a block 7310, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 7320, the enclosure is used to enclose a porous nuclear fuel body defining a plurality of pores, the plurality of pores having a spatially non-uniform distribution. The method 7280 stops at a block 7330.

Figure 23O:
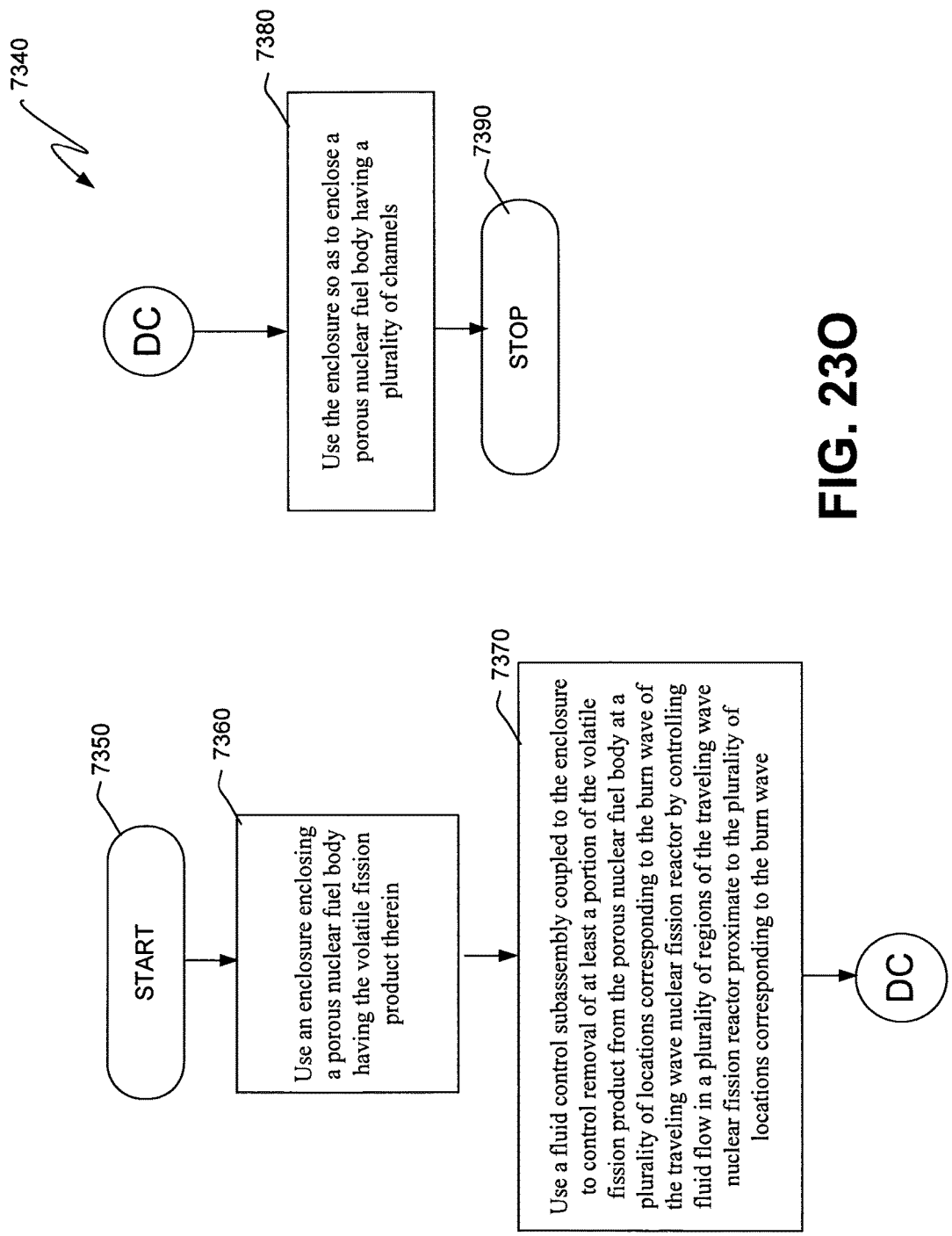

Referring to FIG. 23O, an illustrative method 7340 for operating a nuclear fission reactor fuel assembly starts at a block 7350. At a block 7360, an enclosure is used that encloses a porous nuclear fuel body having the volatile fission product therein. At a block 7370, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 7380, the enclosure is used so as to enclose a porous nuclear fuel body having a plurality of channels. The method 7340 stops at a block 7390.

Figure 23P:
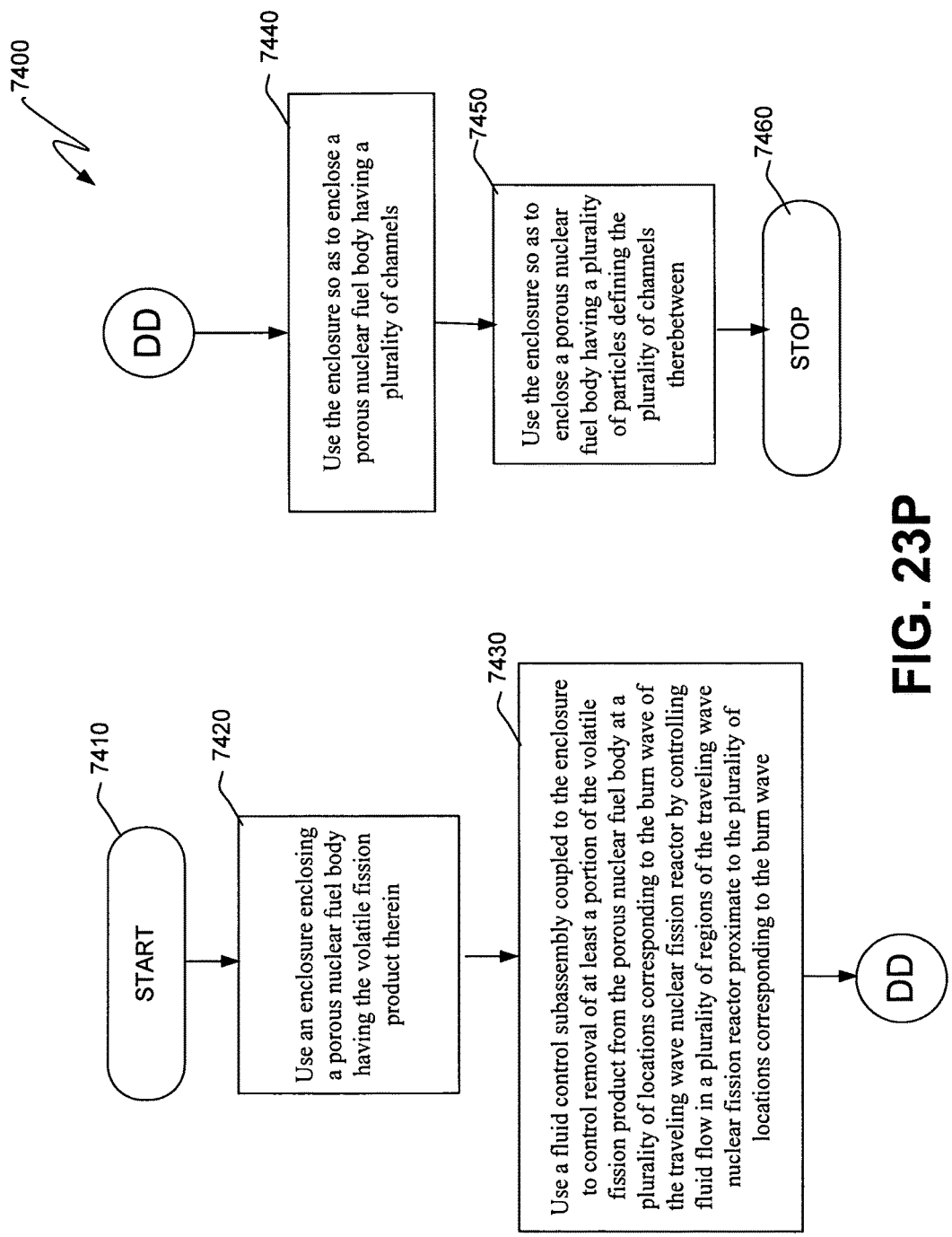

Referring to FIG. 23P, an illustrative method 7400 for operating a nuclear fission reactor fuel assembly starts at a block 7410. At a block 7420, an enclosure is used that encloses a porous nuclear fuel body having the volatile fission product therein. At a block 7430, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 7440, the enclosure is used so as to enclose a porous nuclear fuel body having a plurality of channels. At a block 7450, the enclosure is used so as to enclose a porous nuclear fuel body having a plurality of particles defining the plurality of channels therebetween. The method 7400 stops at a block 7460.

Figure 23Q:
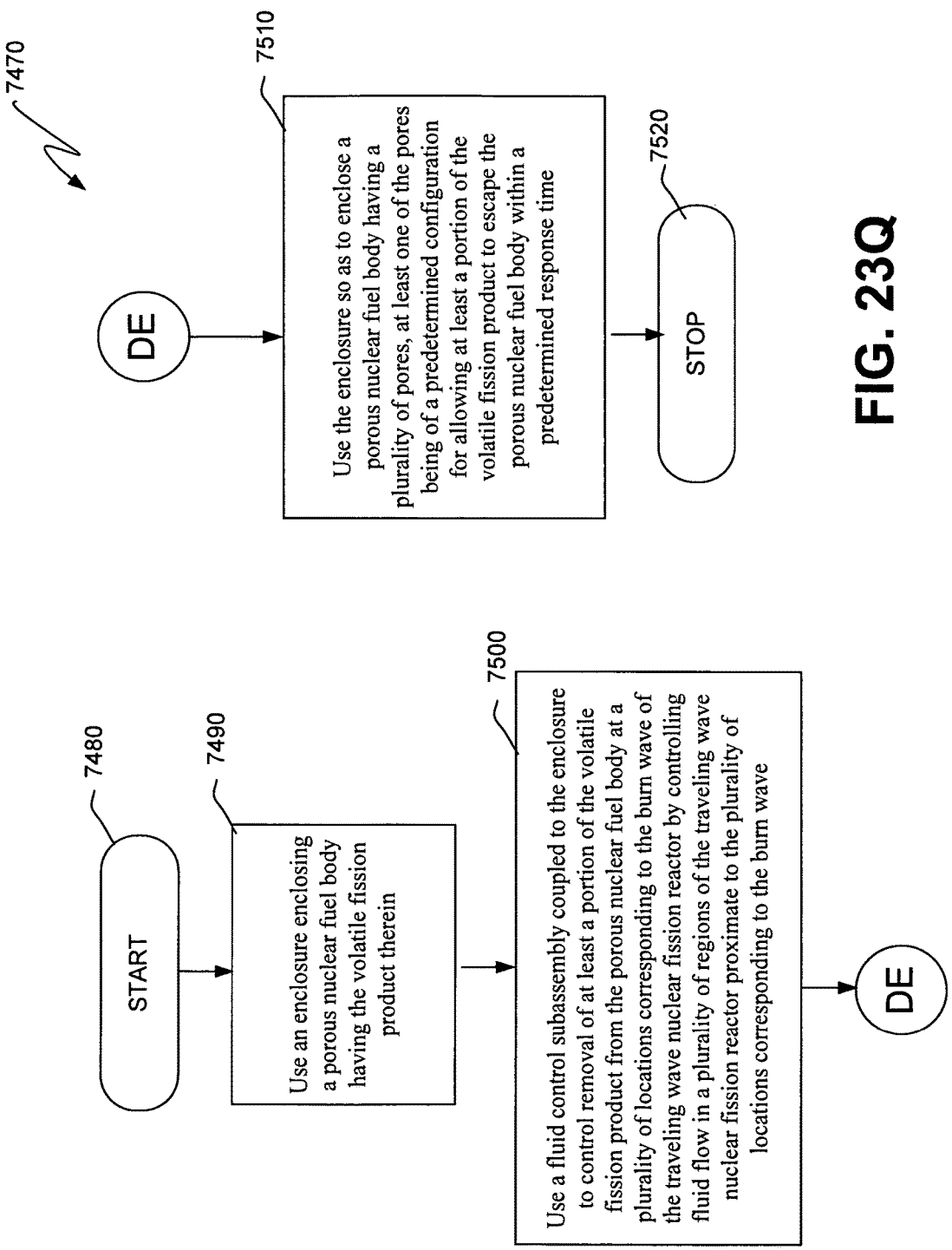

Referring to FIG. 23Q, an illustrative method 7470 for operating a nuclear fission reactor fuel assembly starts at a block 7480. At a block 7490, an enclosure is used that encloses a porous nuclear fuel body having the volatile fission product therein. At a block 7500, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 7510, the enclosure is used so as to enclose a porous nuclear fuel body having a plurality of pores, at least one of the pores being of a predetermined configuration for allowing at least a portion of the volatile fission product to escape the porous nuclear fuel body within a predetermined response time. The method 7470 stops at a block 7520.

Figure 23R:
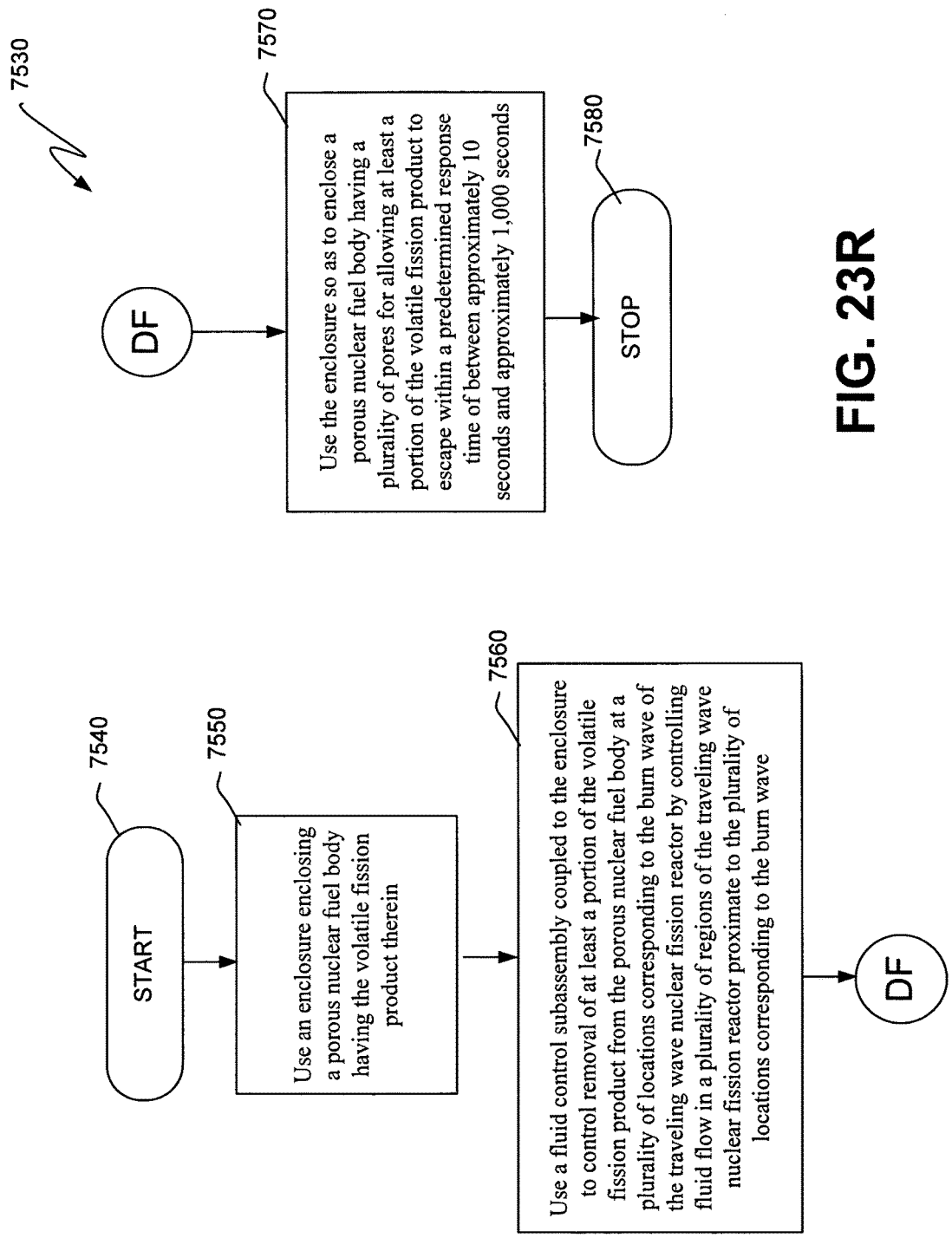

Referring to FIG. 23R, an illustrative method 7530 for operating a nuclear fission reactor fuel assembly starts at a block 7540. At a block 7550, an enclosure is used that encloses a porous nuclear fuel body having the volatile fission product therein. At a block 7560, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 7570, the enclosure is used so as to enclose a porous nuclear fuel body having a plurality of pores for allowing at least a portion of the volatile fission product to escape within a predetermined response time of between approximately 10 seconds and approximately 1,000 seconds. The method 7530 stops at a block 7580.

Referring to FIG. 23S, an illustrative method 7590 for operating a nuclear fission reactor fuel assembly starts at a block 7600. At a block 7610, an enclosure is used that encloses a porous nuclear fuel body having the volatile fission product therein. At a block 7620, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 7630, the enclosure so as to enclose a porous nuclear fuel body having a plurality of pores for allowing at least a portion of the volatile fission product to escape within a predetermined response time of between approximately one second and approximately 10,000 seconds. The method 7590 stops at a block 7640.

Figure 23T:
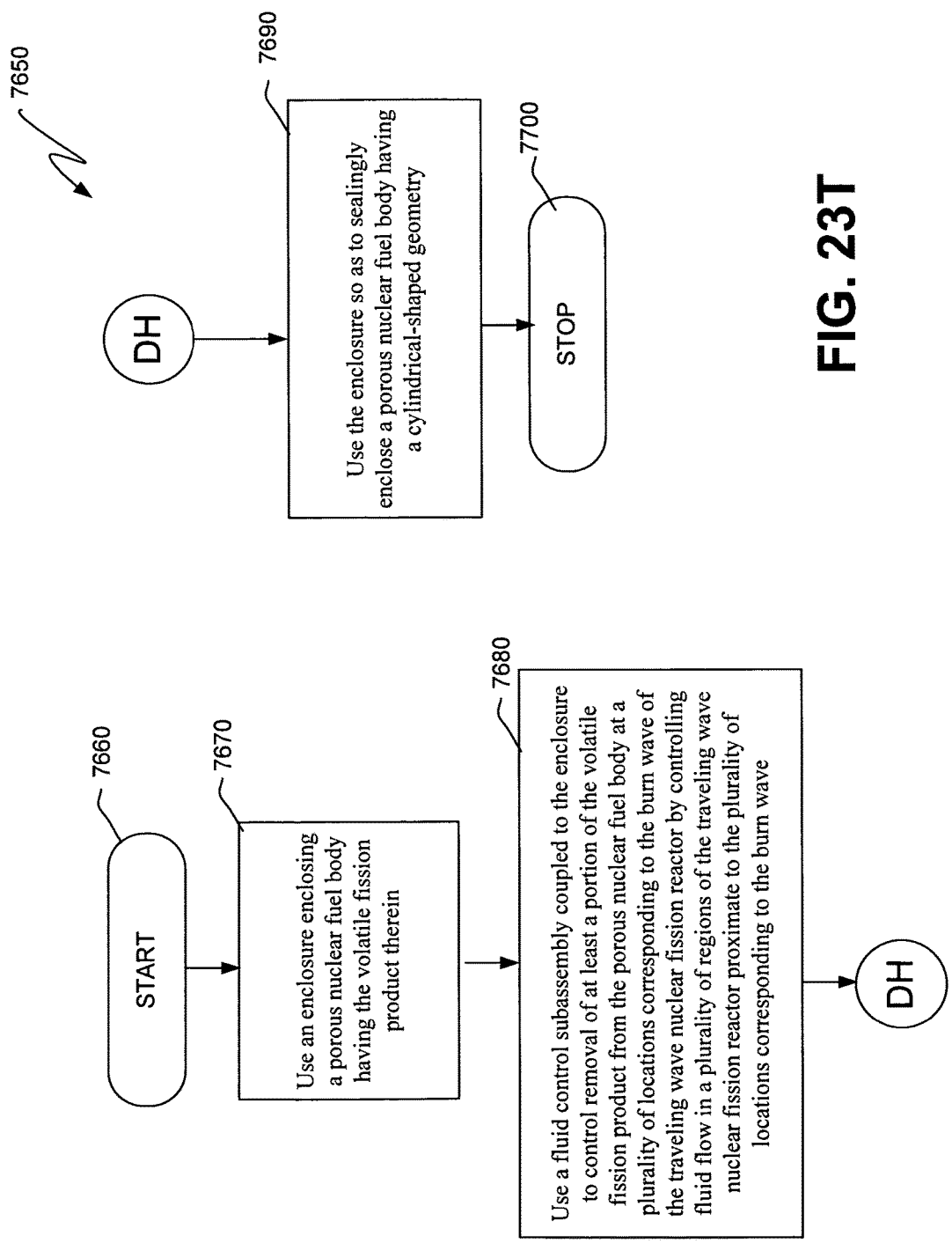

Referring to FIG. 23T, an illustrative method 7650 for operating a nuclear fission reactor fuel assembly starts at a block 7660. At a block 7670, an enclosure is used that encloses a porous nuclear fuel body having the volatile fission product therein. At a block 7680, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 7690, the enclosure is used so as to sealingly enclose a porous nuclear fuel body having a cylindrical-shaped geometry. The method 7650 stops at a block 7700.

Figure 23U:
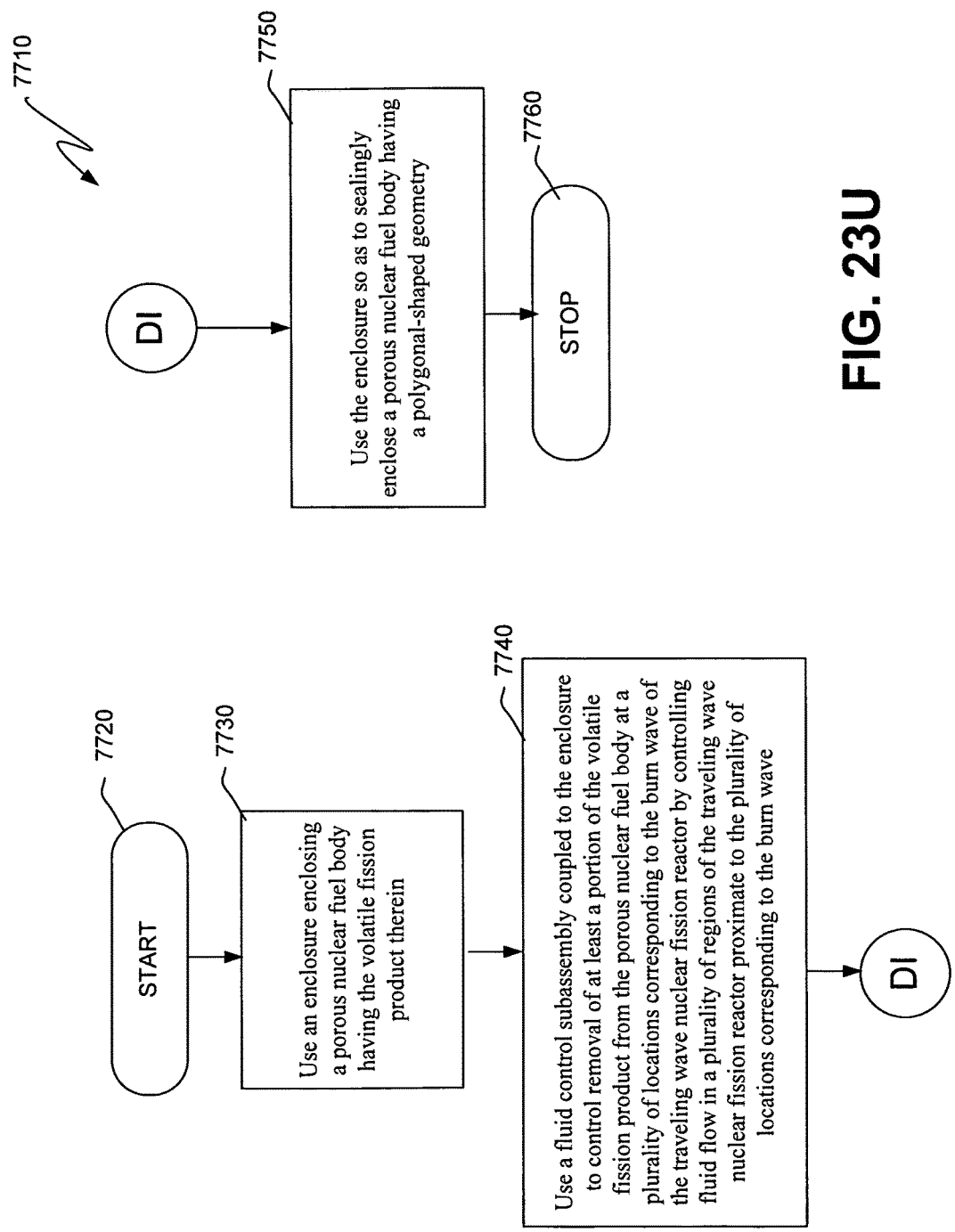

Referring to FIG. 23U, an illustrative method 7710 for operating a nuclear fission reactor fuel assembly starts at a block 7720. At a block 7730, an enclosure is used that encloses a porous nuclear fuel body having the volatile fission product therein. At a block 7740, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 7750, the enclosure is used so as to sealingly enclose a porous nuclear fuel body having a polygonal-shaped geometry. The method 7710 stops at a block 7760.

Figure 23V:
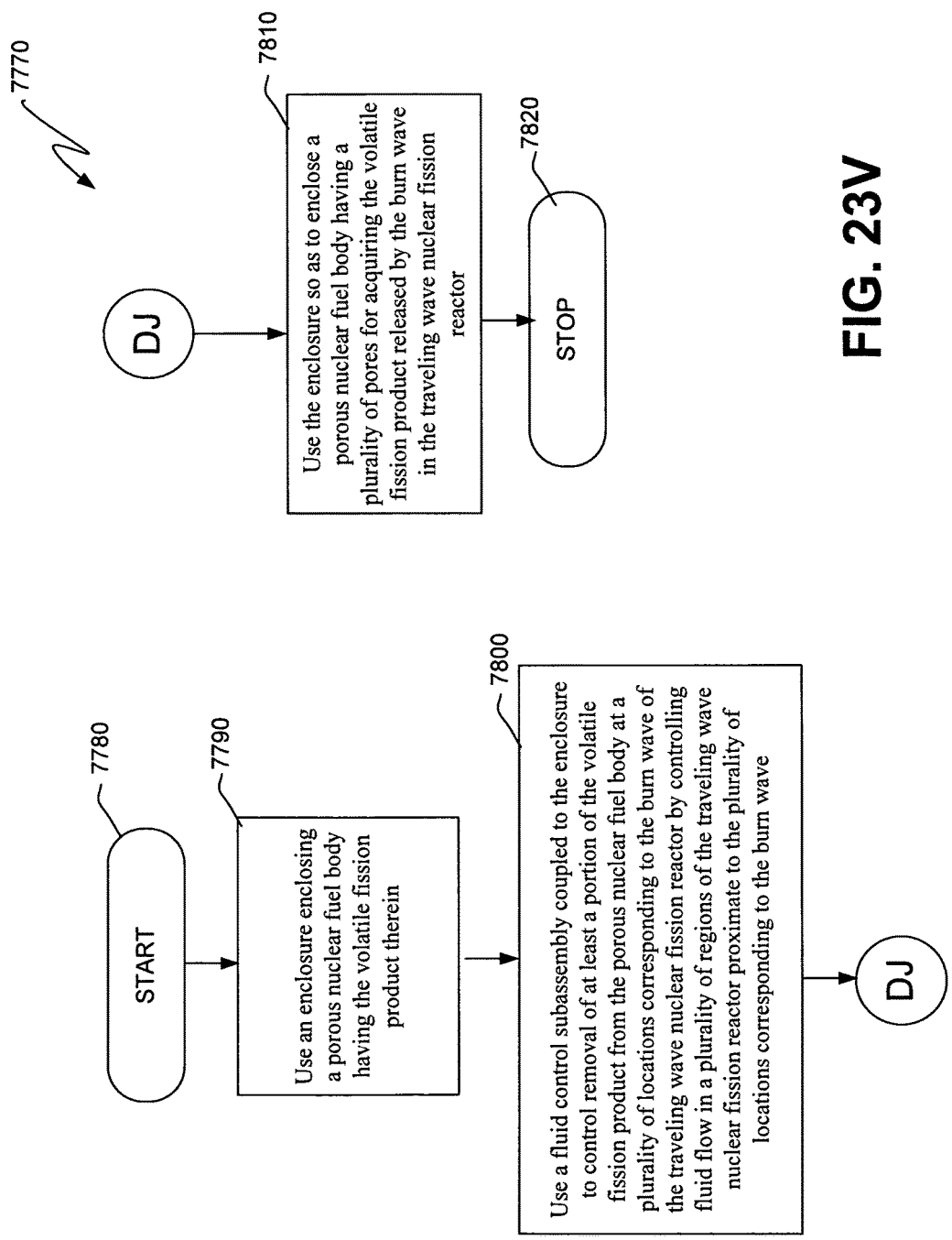

Referring to FIG. 23V, an illustrative method 7770 for operating a nuclear fission reactor fuel assembly starts at a block 7780. At a block 7790, an enclosure is used that encloses a porous nuclear fuel body having the volatile fission product therein. At a block 7800, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 7810, the enclosure is used so as to enclose a porous nuclear fuel body having a plurality of pores for acquiring the volatile fission product released by the burn wave in the traveling wave nuclear fission reactor. The method 7770 stops at a block 7820.

Figure 23W:
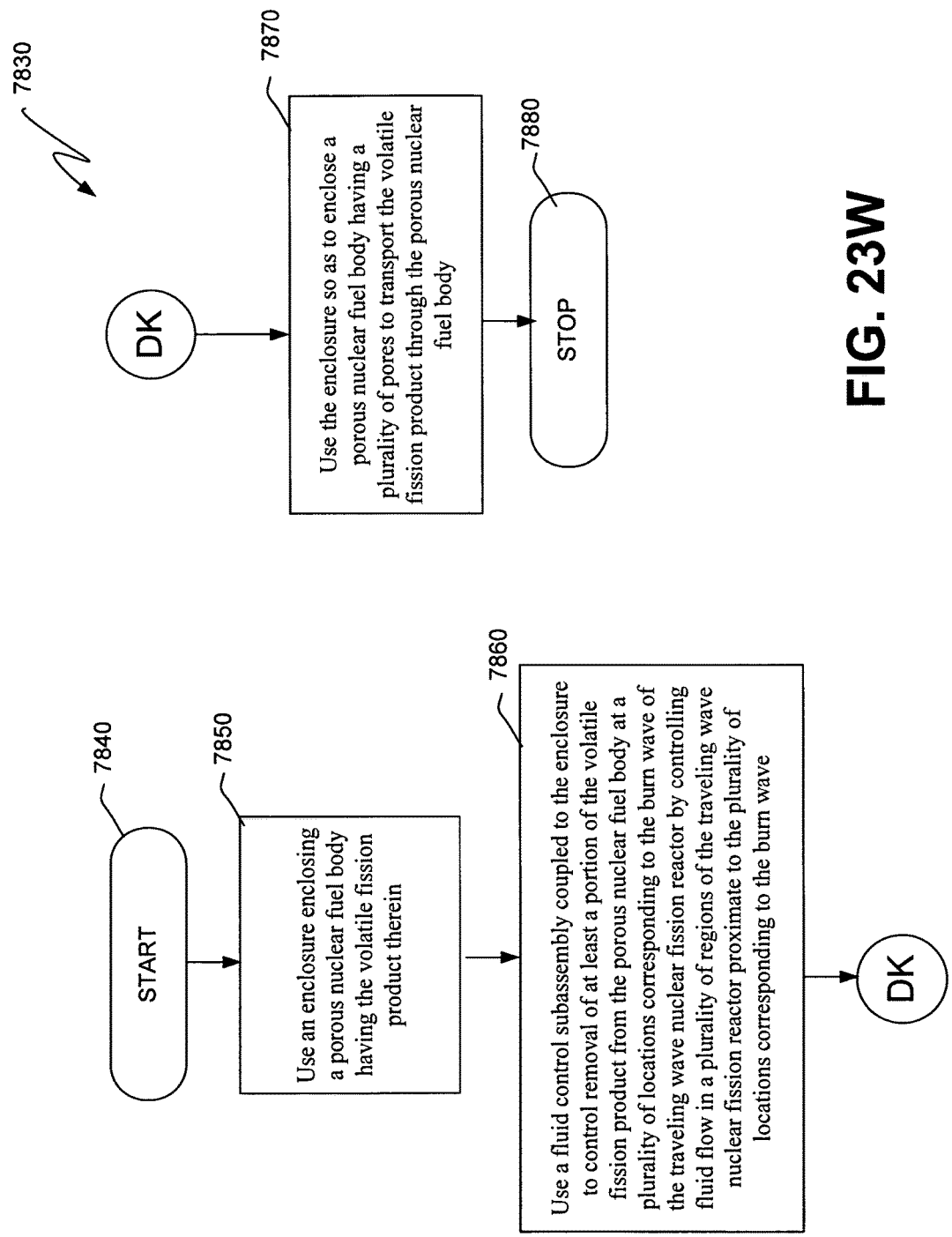

Referring to FIG. 23W, an illustrative method 7830 for operating a nuclear fission reactor fuel assembly starts at a block 7840. At a block 7850, an enclosure is used that encloses a porous nuclear fuel body having the volatile fission product therein. At a block 7860, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 7870, the enclosure is used so as to enclose a porous nuclear fuel body having a plurality of pores to transport the volatile fission product through the porous nuclear fuel body. The method 7830 stops at a block 7880.

Referring to FIG. 23X, an illustrative method 7890 for operating a nuclear fission reactor fuel assembly starts at a block 7900. At a block 7910, an enclosure is used that encloses a porous nuclear fuel body having the volatile fission product therein. At a block 7920, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 7930, the volatile fission product is received into a reservoir coupled to the fluid control subassembly. The method 7890 stops at a block 7940.

Figure 23Y:
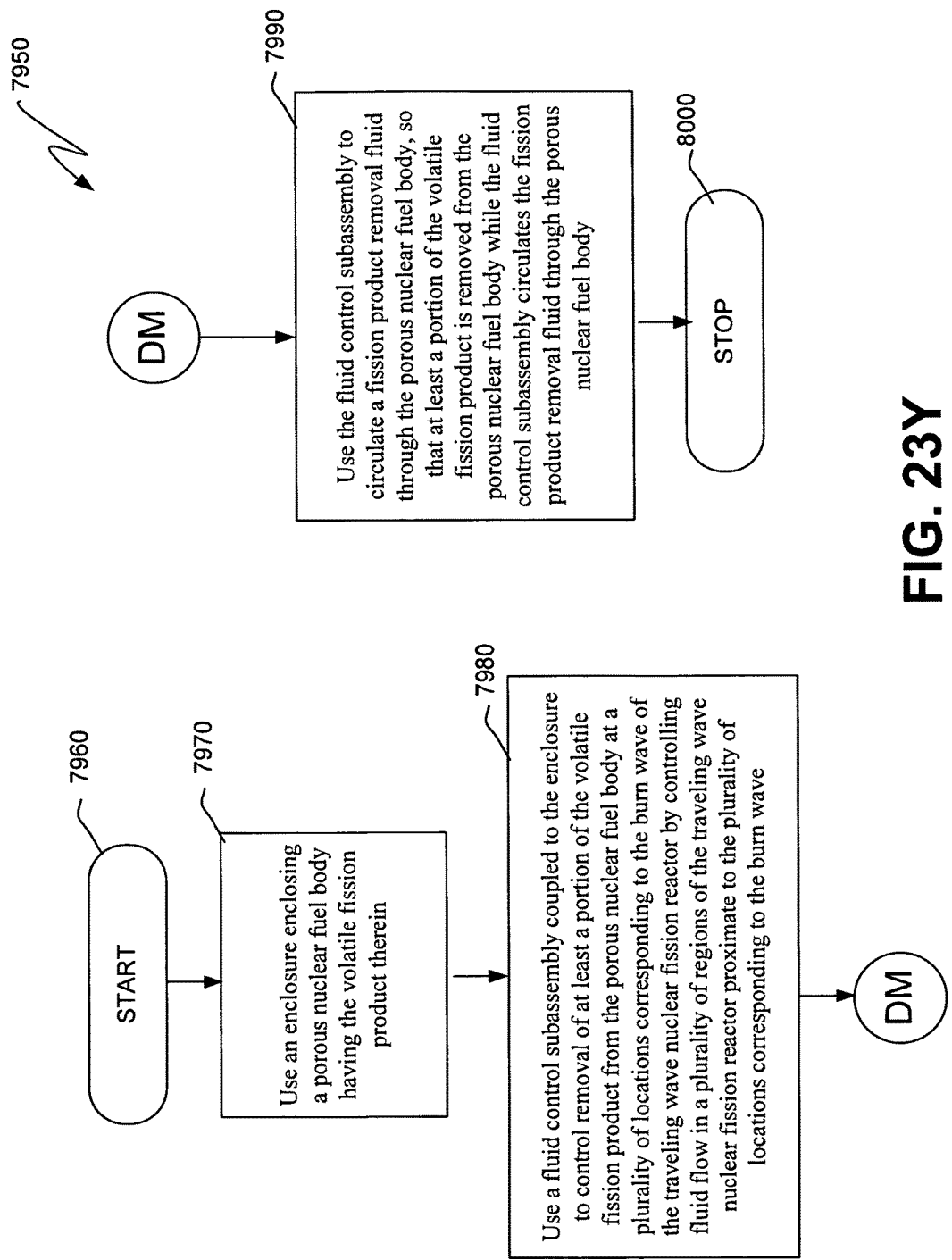

Referring to FIG. 23Y, an illustrative method 7950 for operating a nuclear fission reactor fuel assembly starts at a block 7960. At a block 7970, an enclosure is used that encloses a porous nuclear fuel body having the volatile fission product therein. At a block 7980, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 7990, the fluid control subassembly is used to circulate a fission product removal fluid through the porous nuclear fuel body, so that at least a portion of the volatile fission product is removed from the porous nuclear fuel body while the fluid control subassembly circulates the fission product removal fluid through the porous nuclear fuel body. The method 7950 stops at a block 8000.

Figure 23Z:
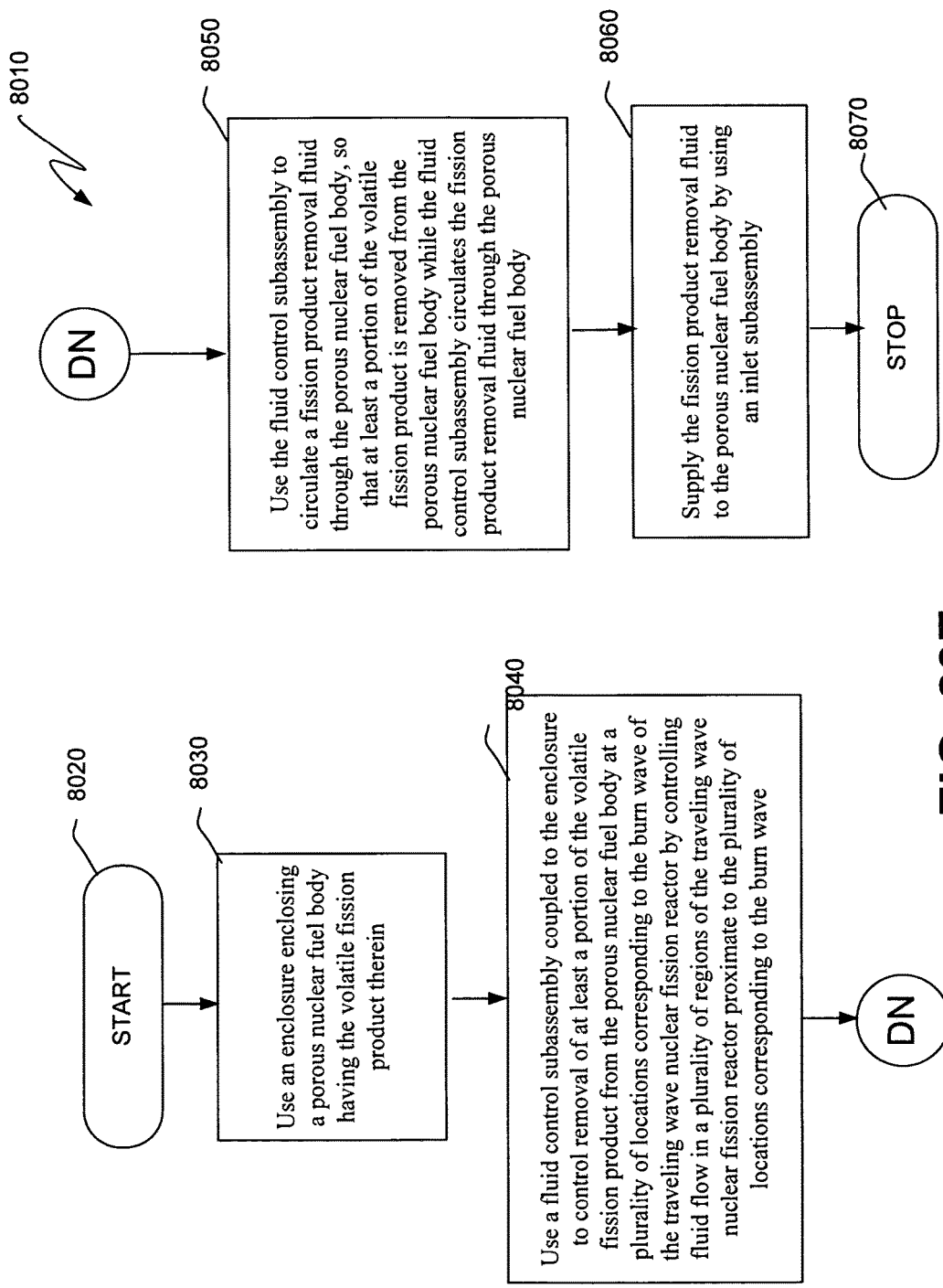
Figure 23A:
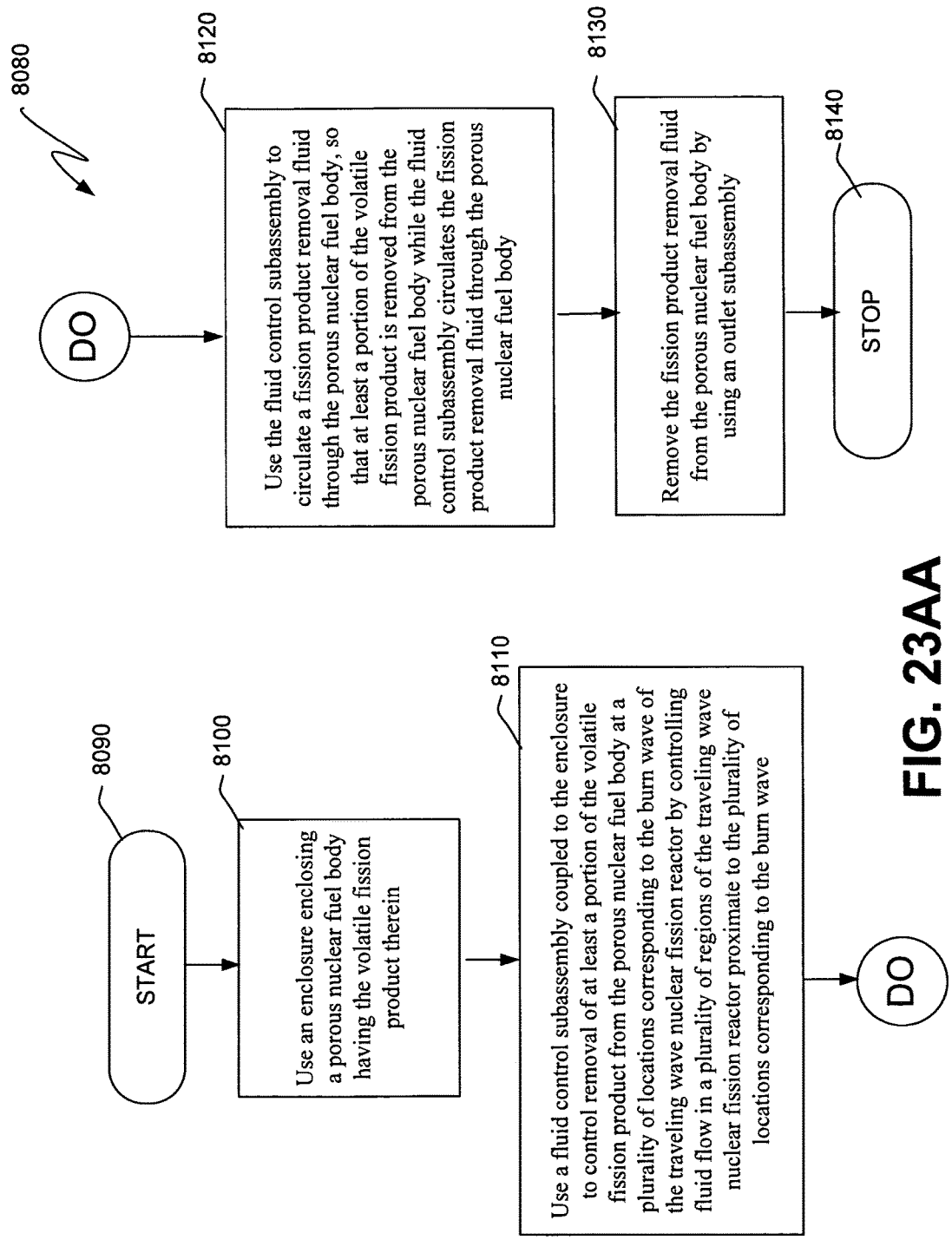
Figure 23A:
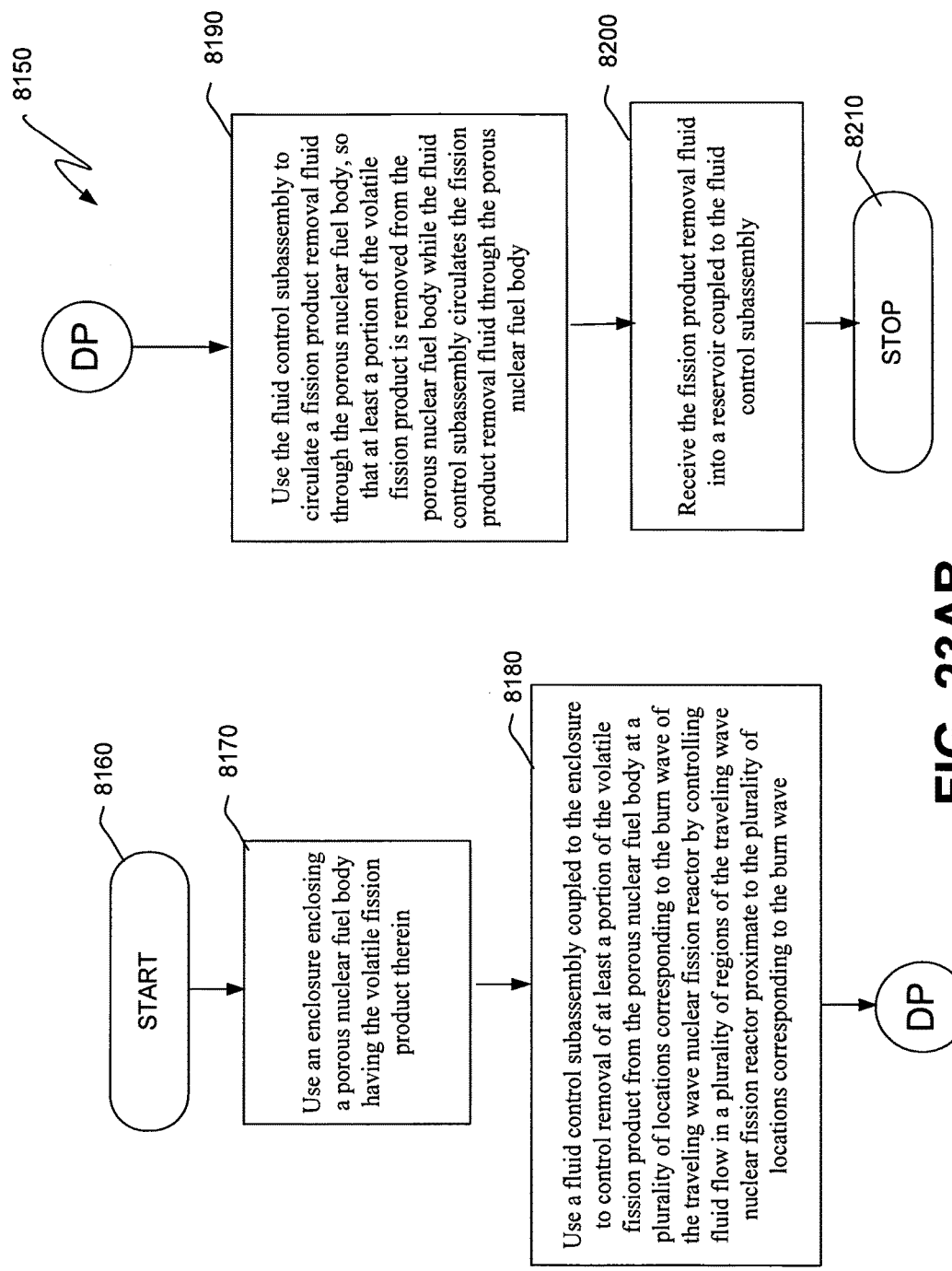
Figure 23A:
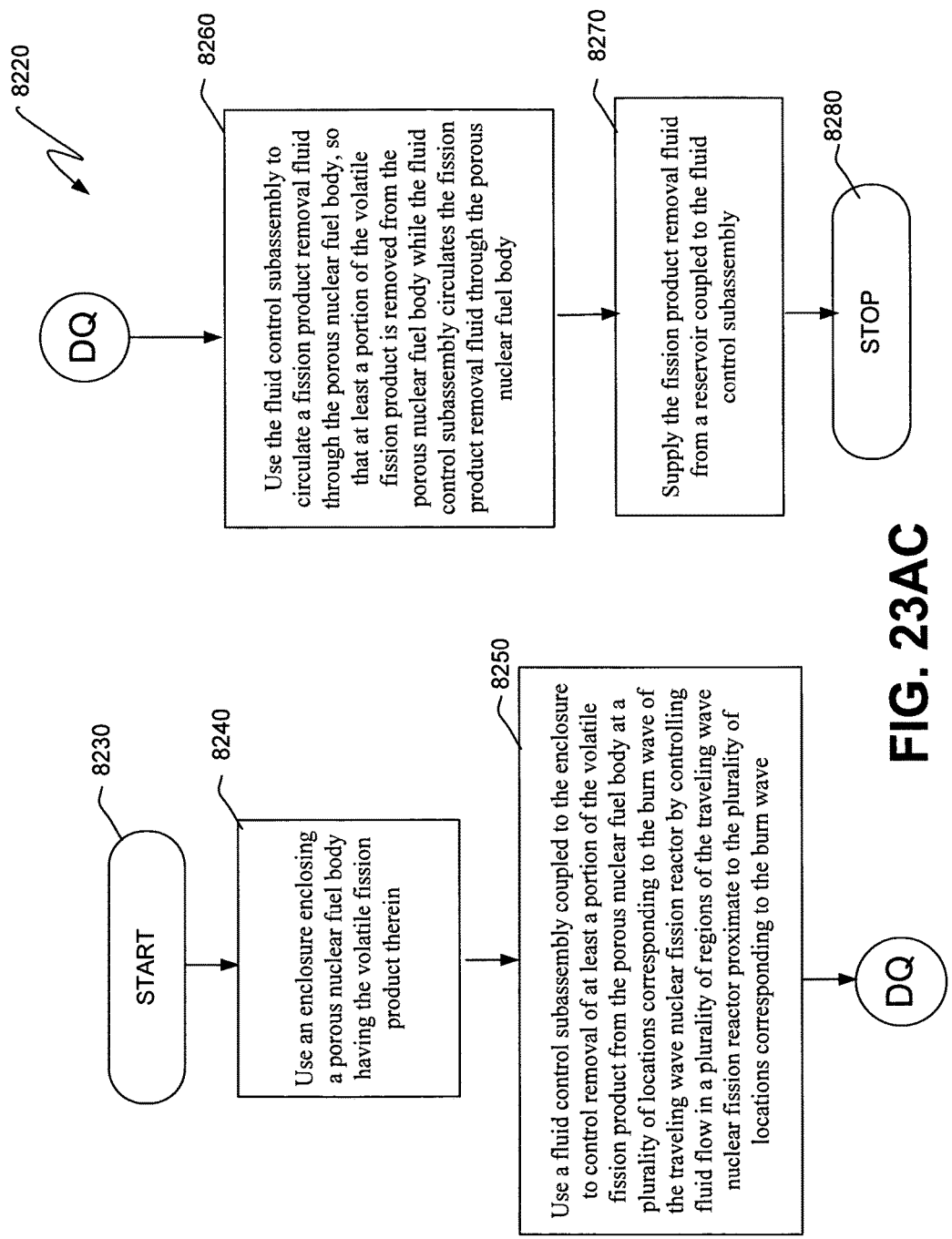
Figure 23A:
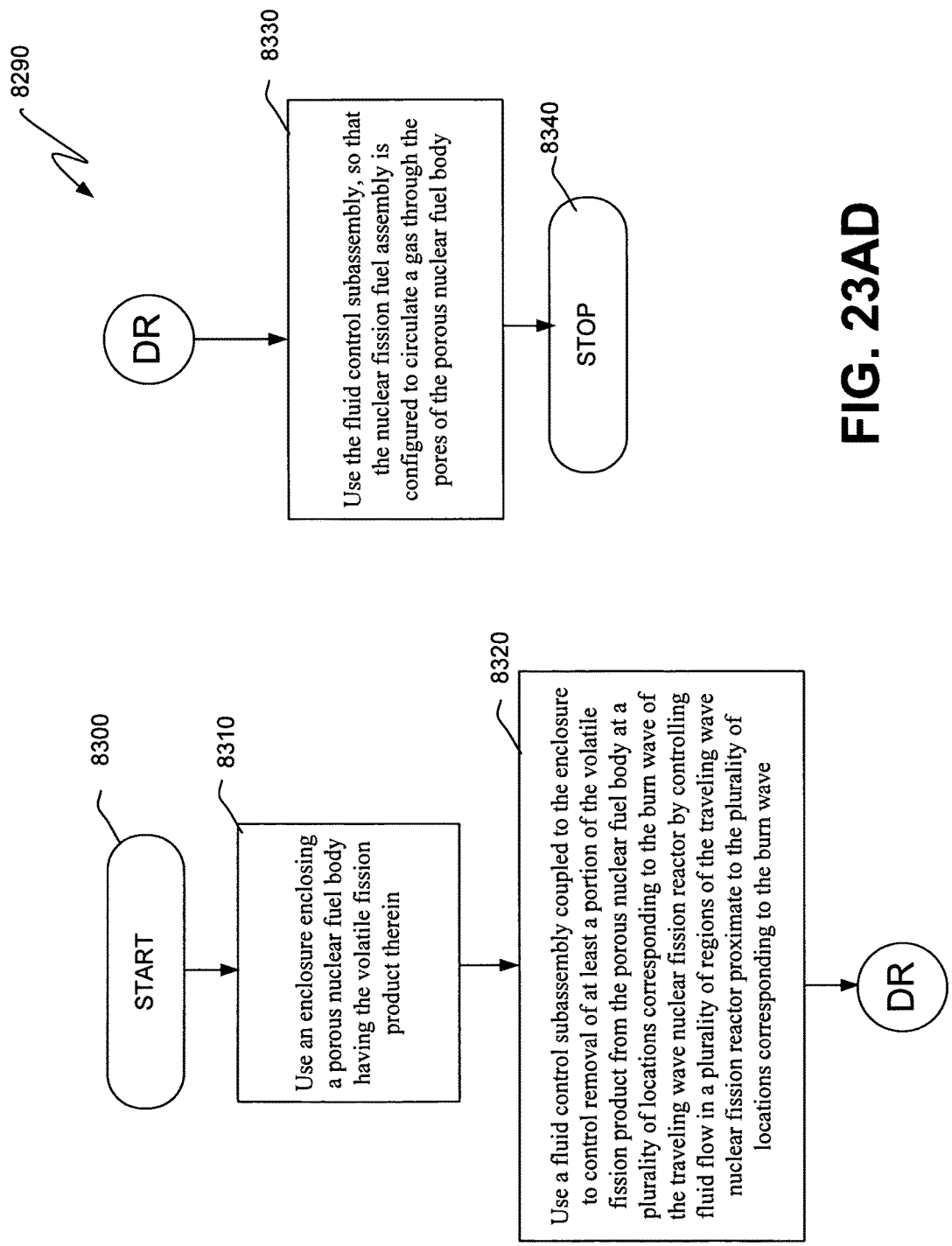
Figure 23A:
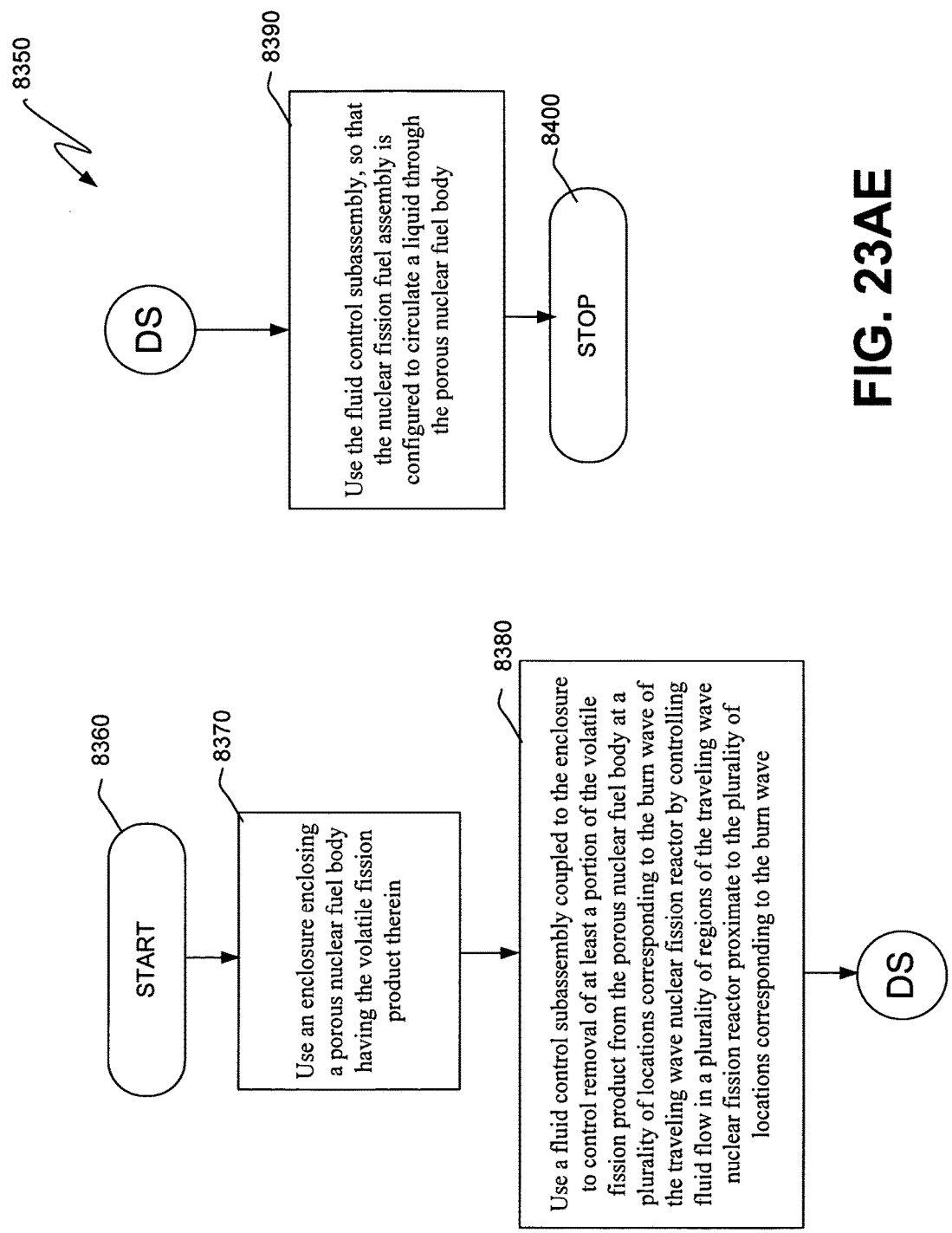
Figure 23A:
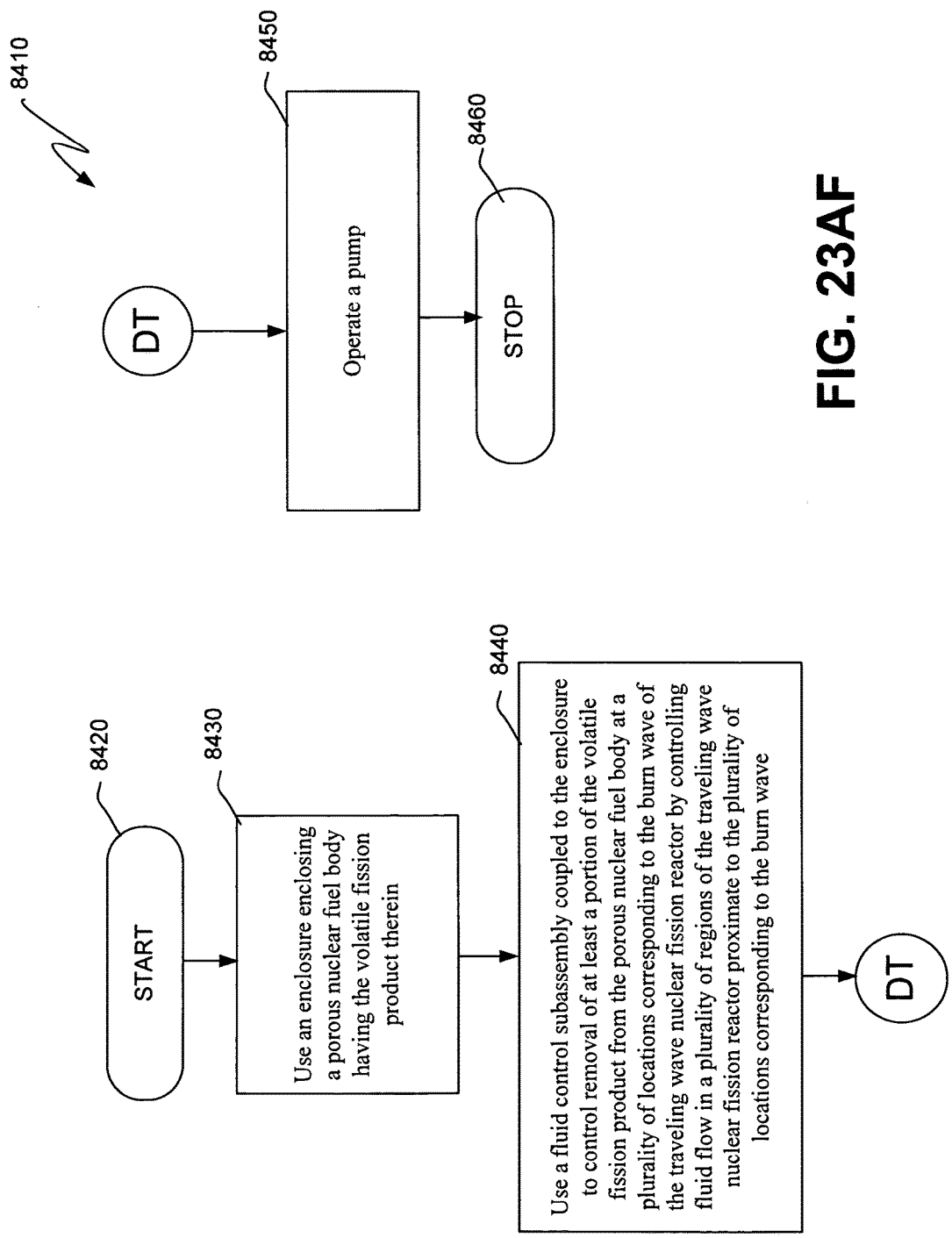
Figure 23A:
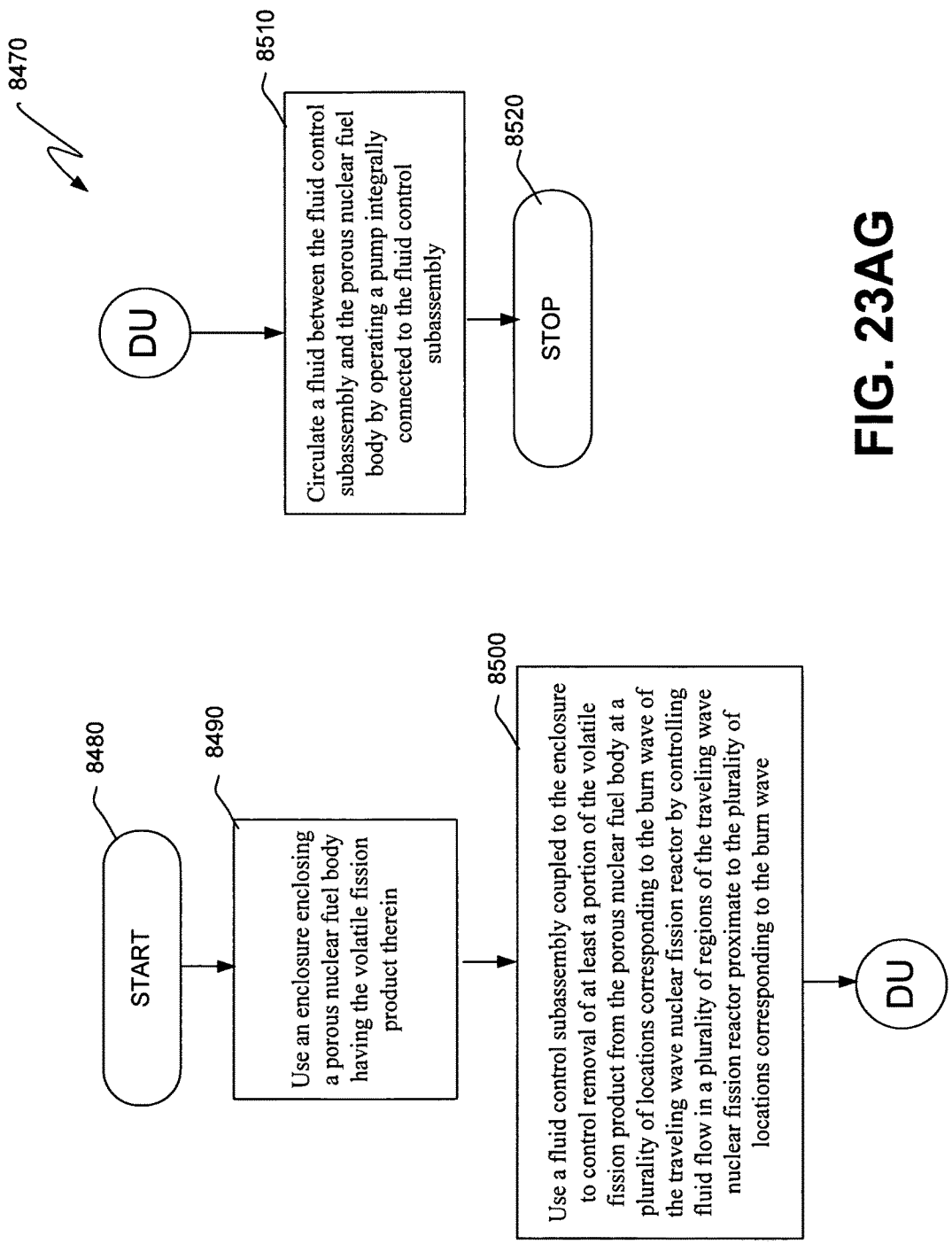
Figure 23A:
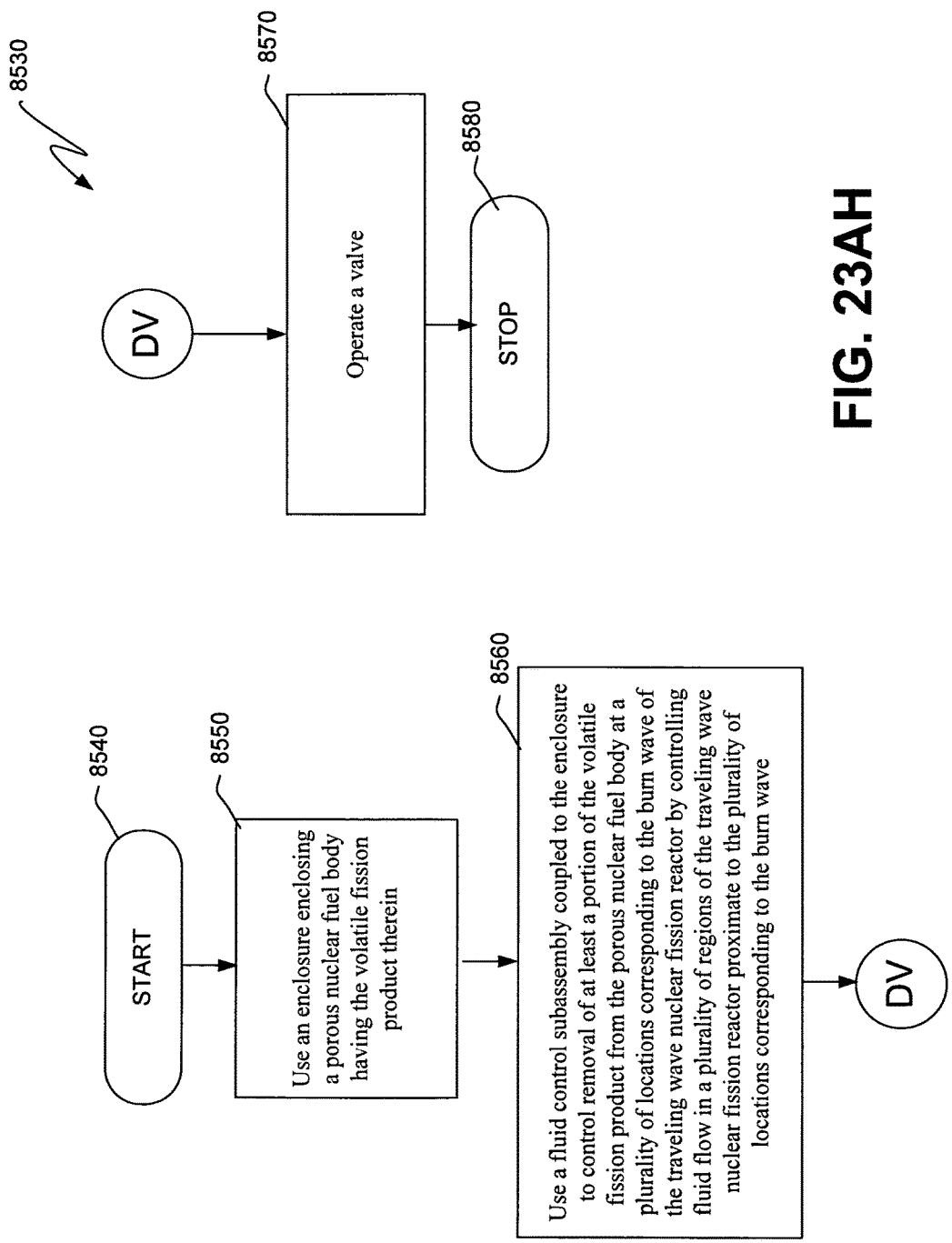
Figure 23A:
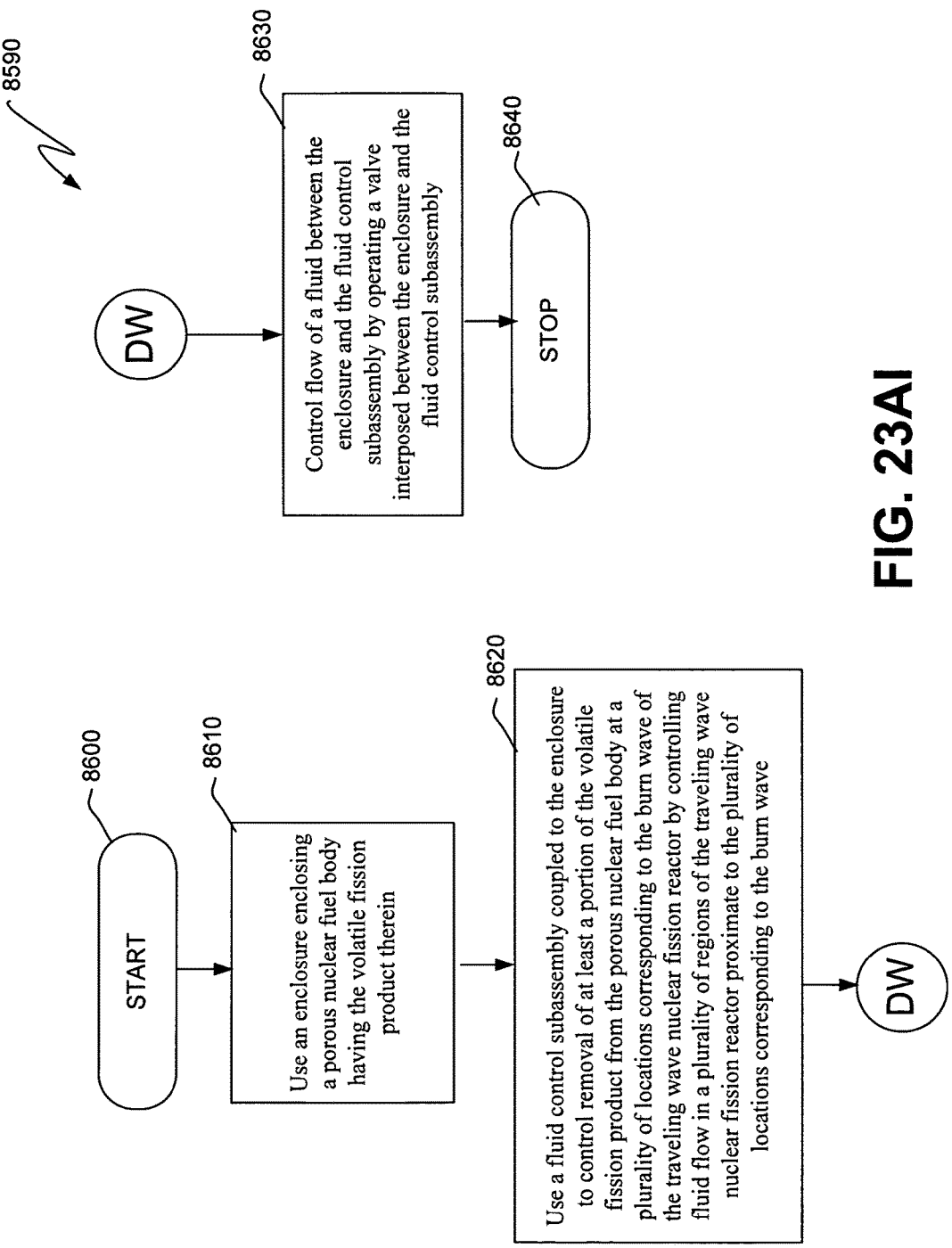
Figure 23A:
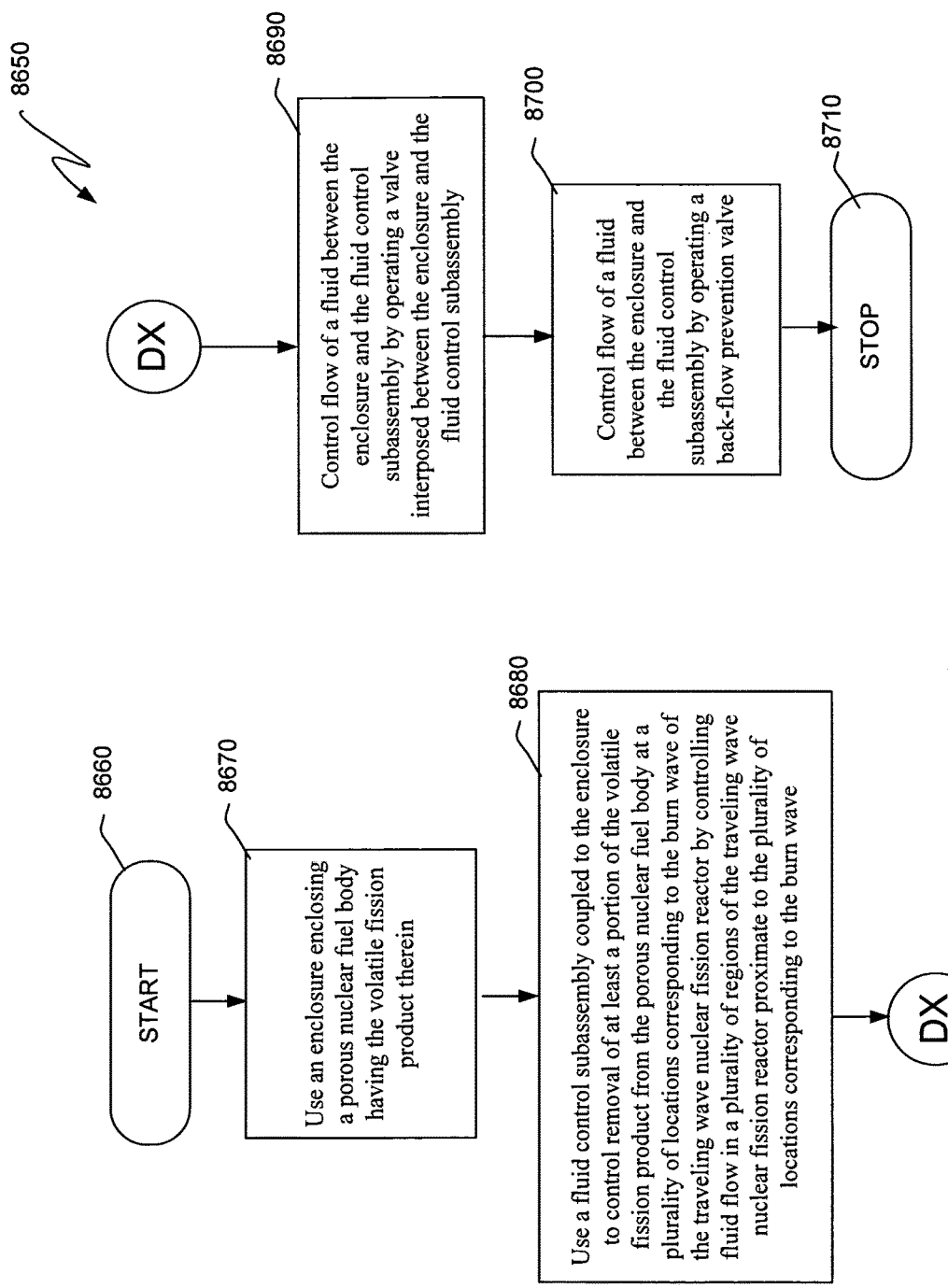
Figure 23A:
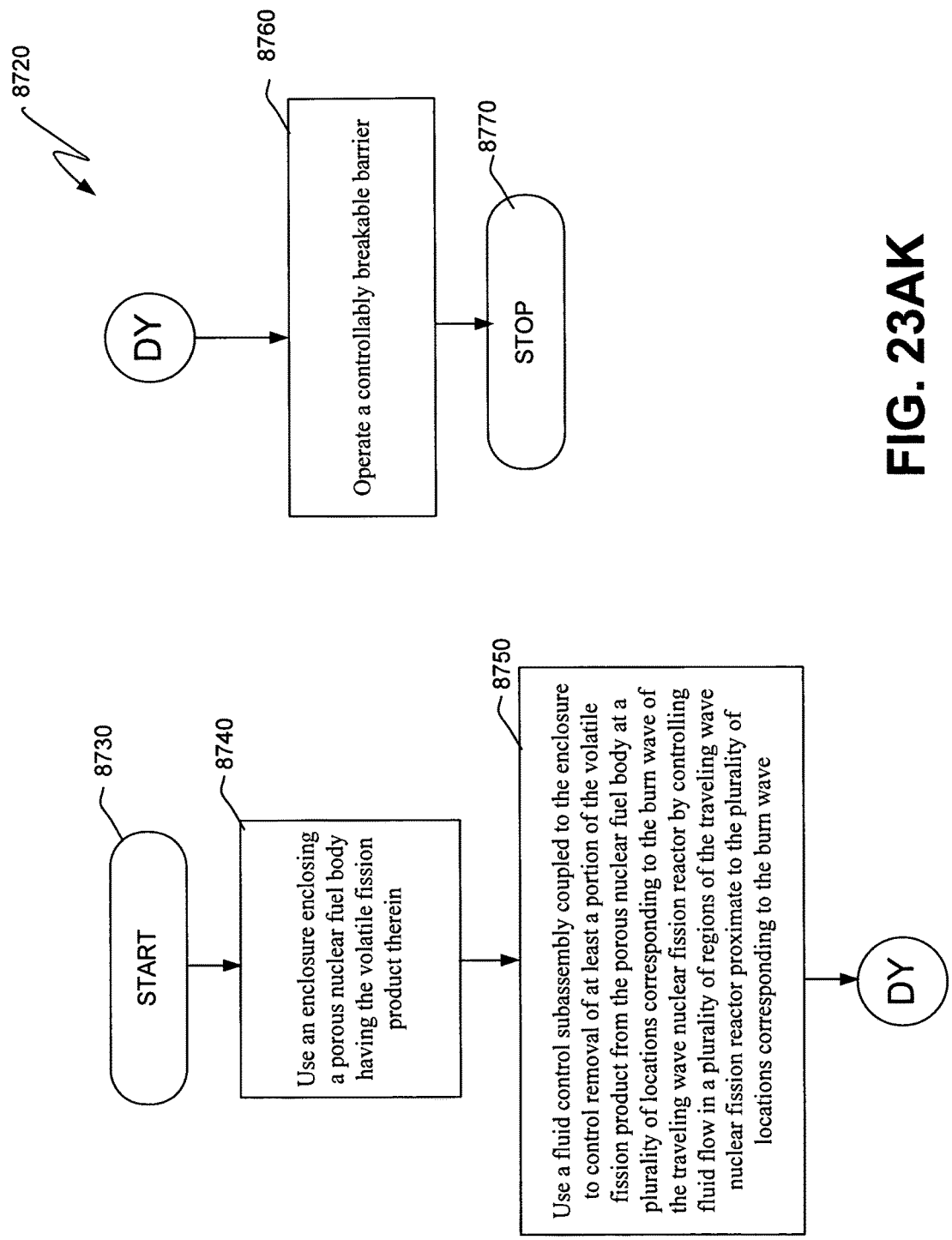
Figure 23A:
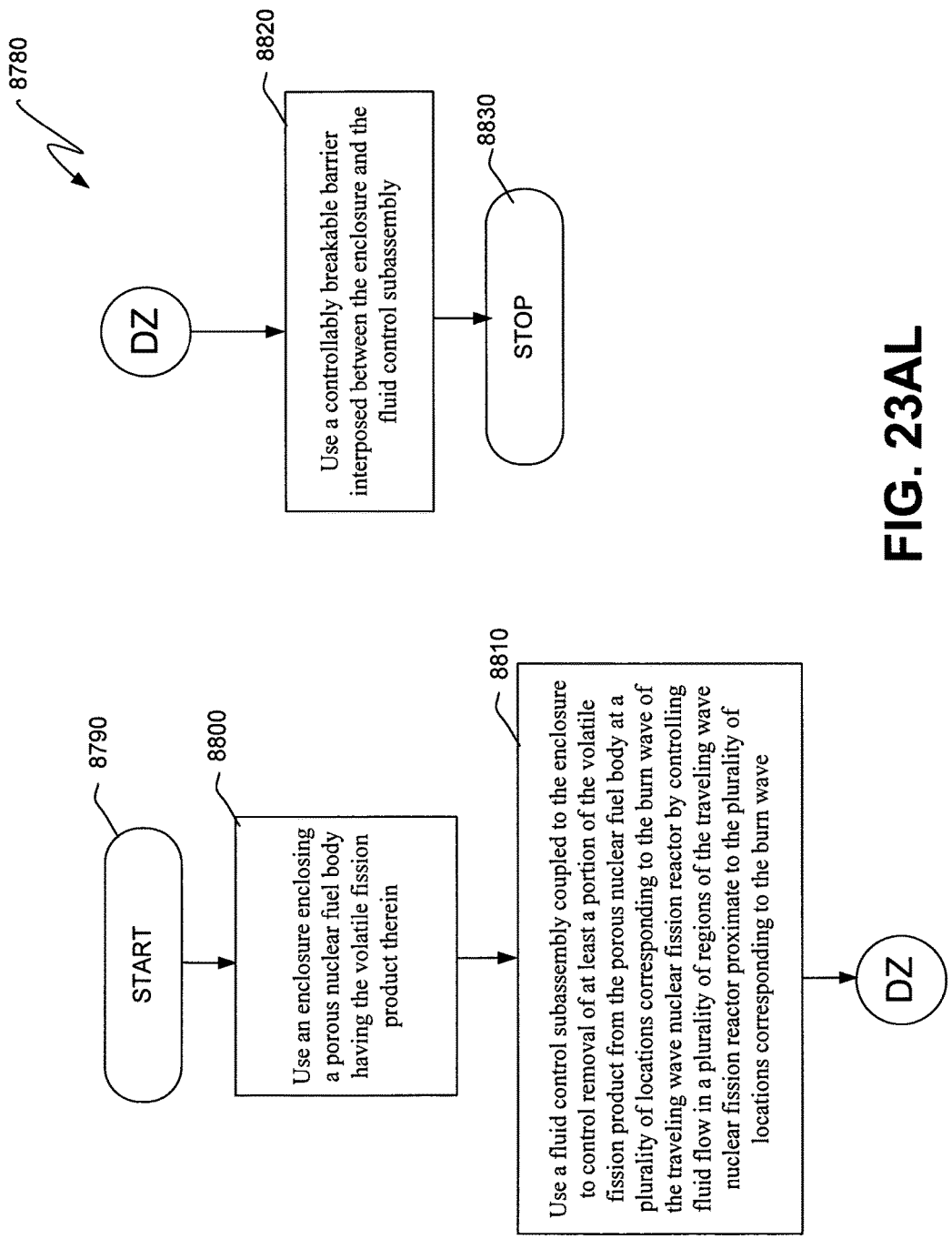
Figure 23A:
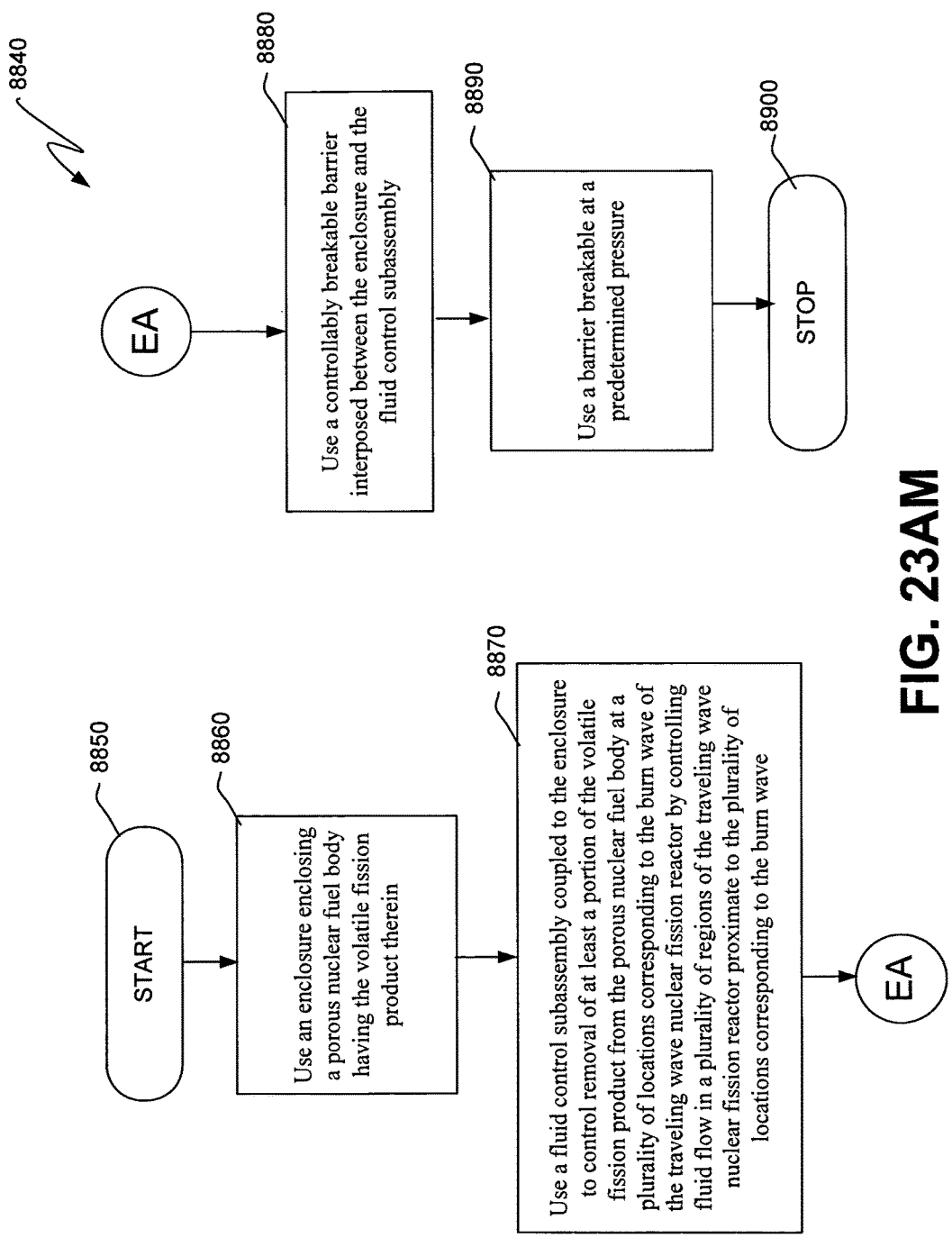
Figure 23A:
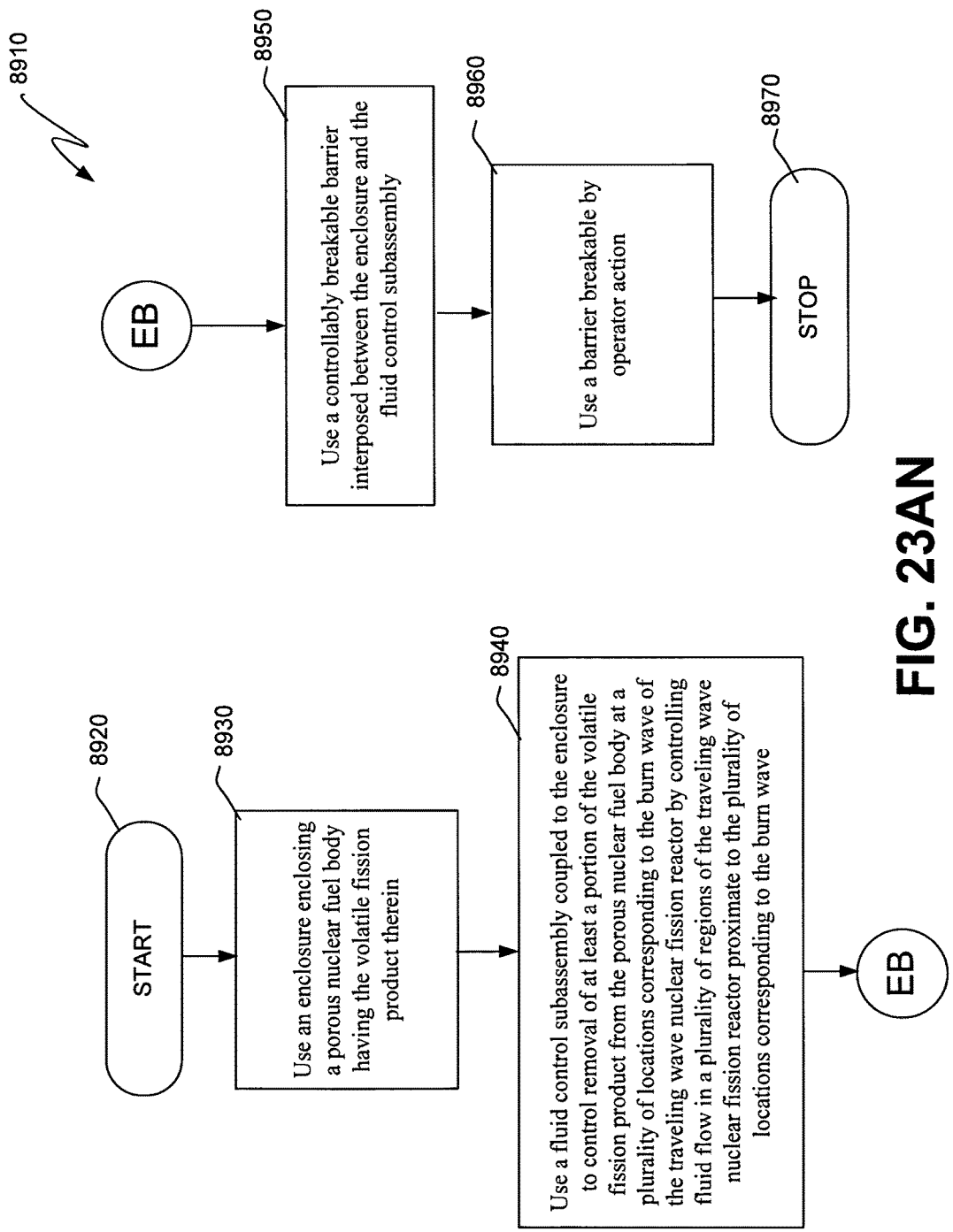
Figure 23A:
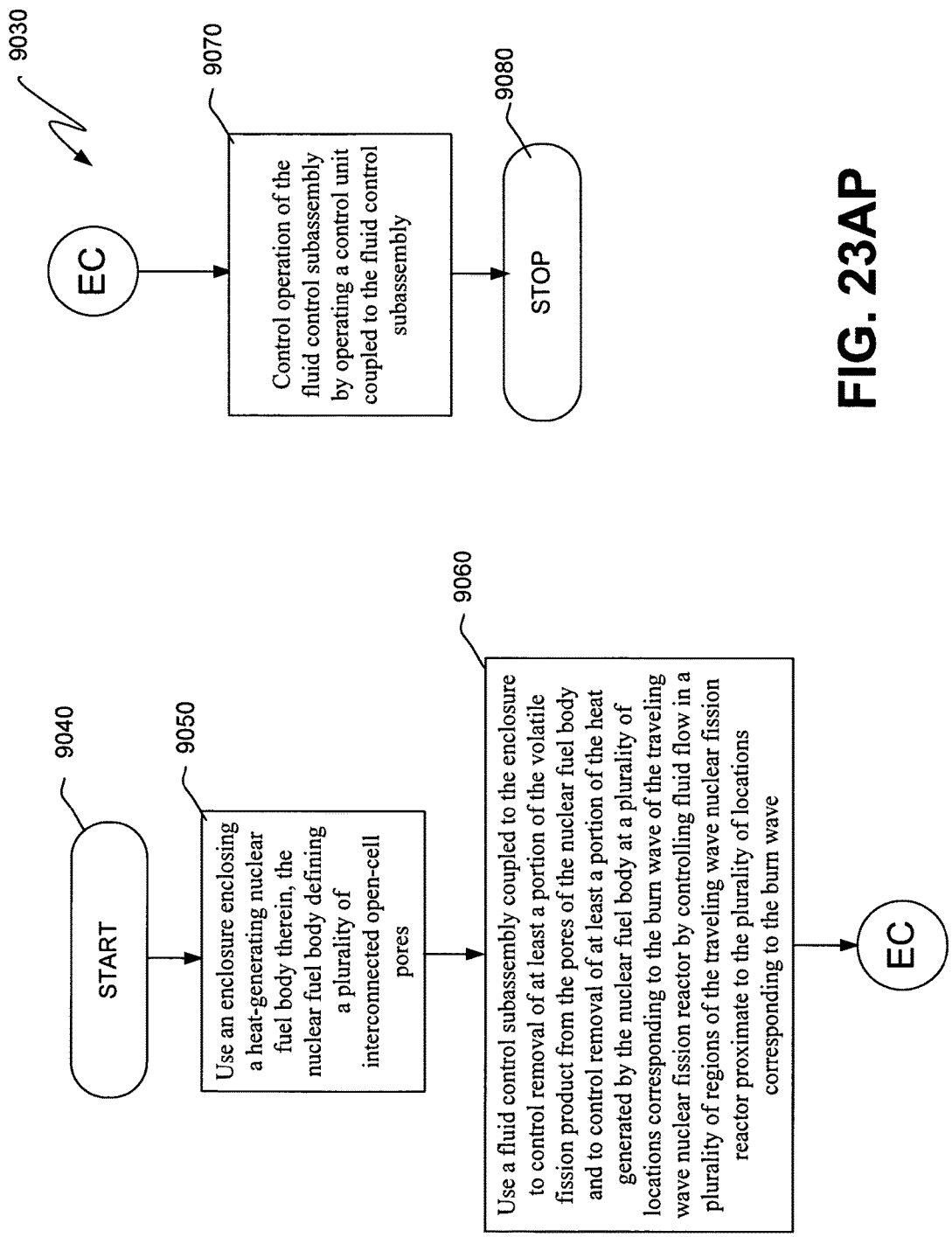
Figure 23A:
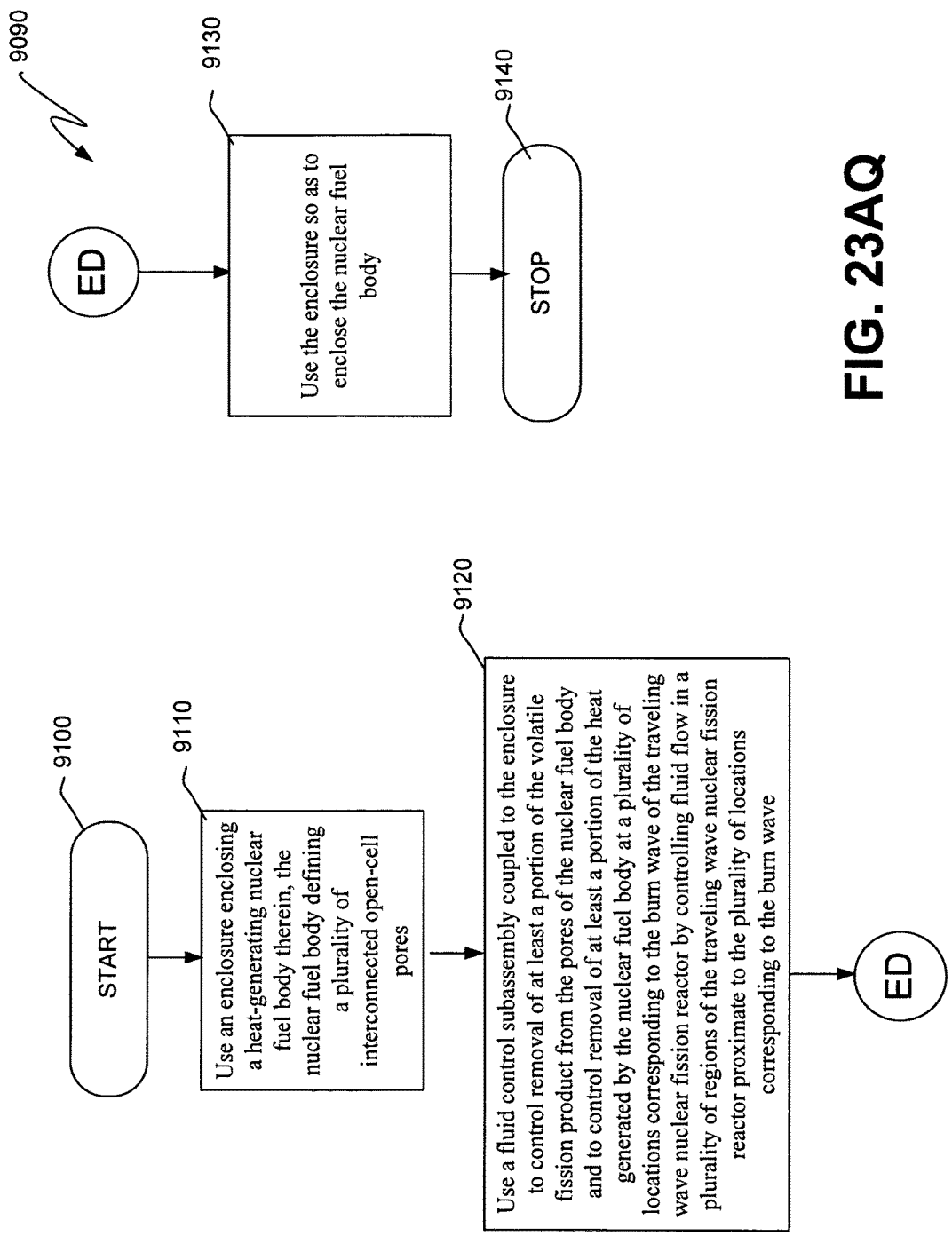
Figure 23A:
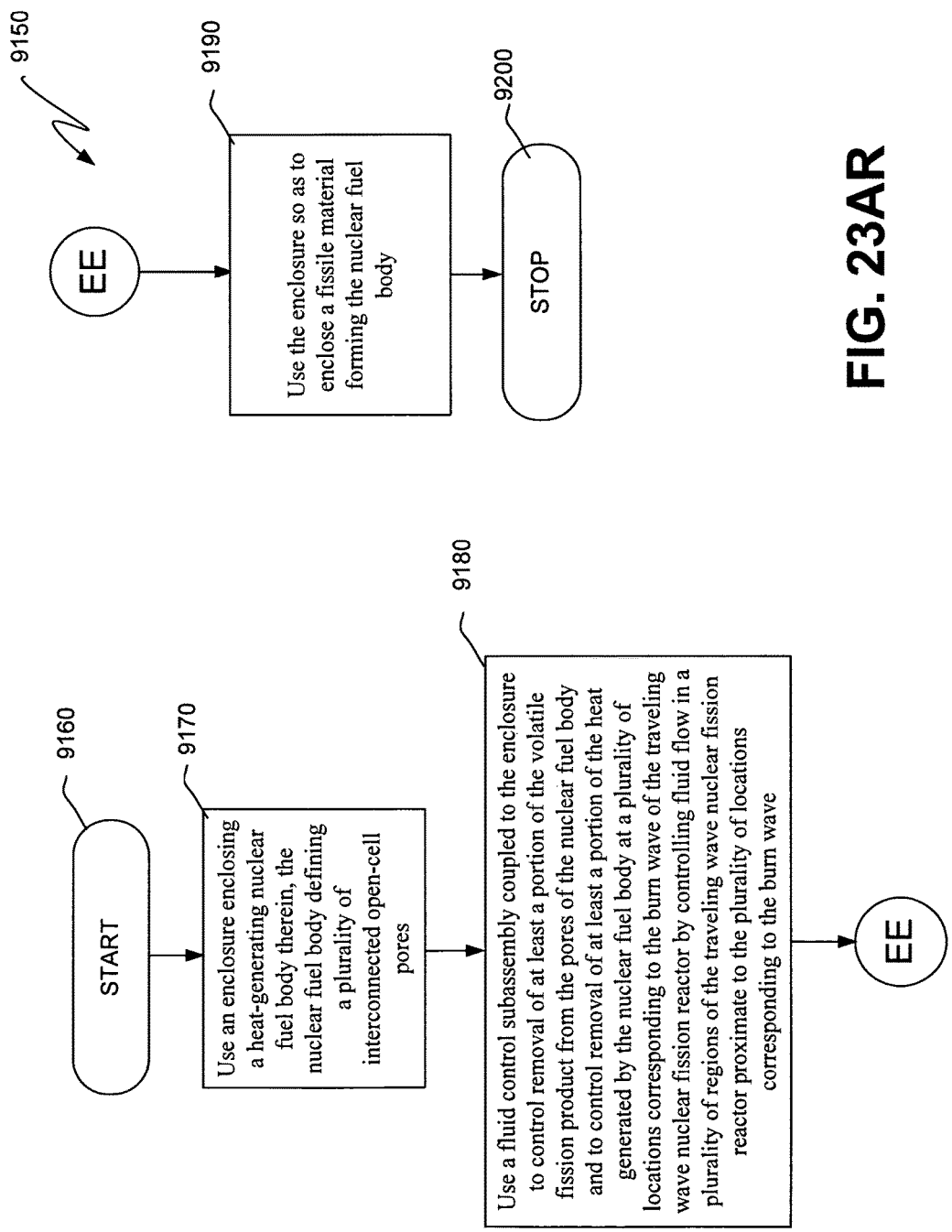
Figure 23A:
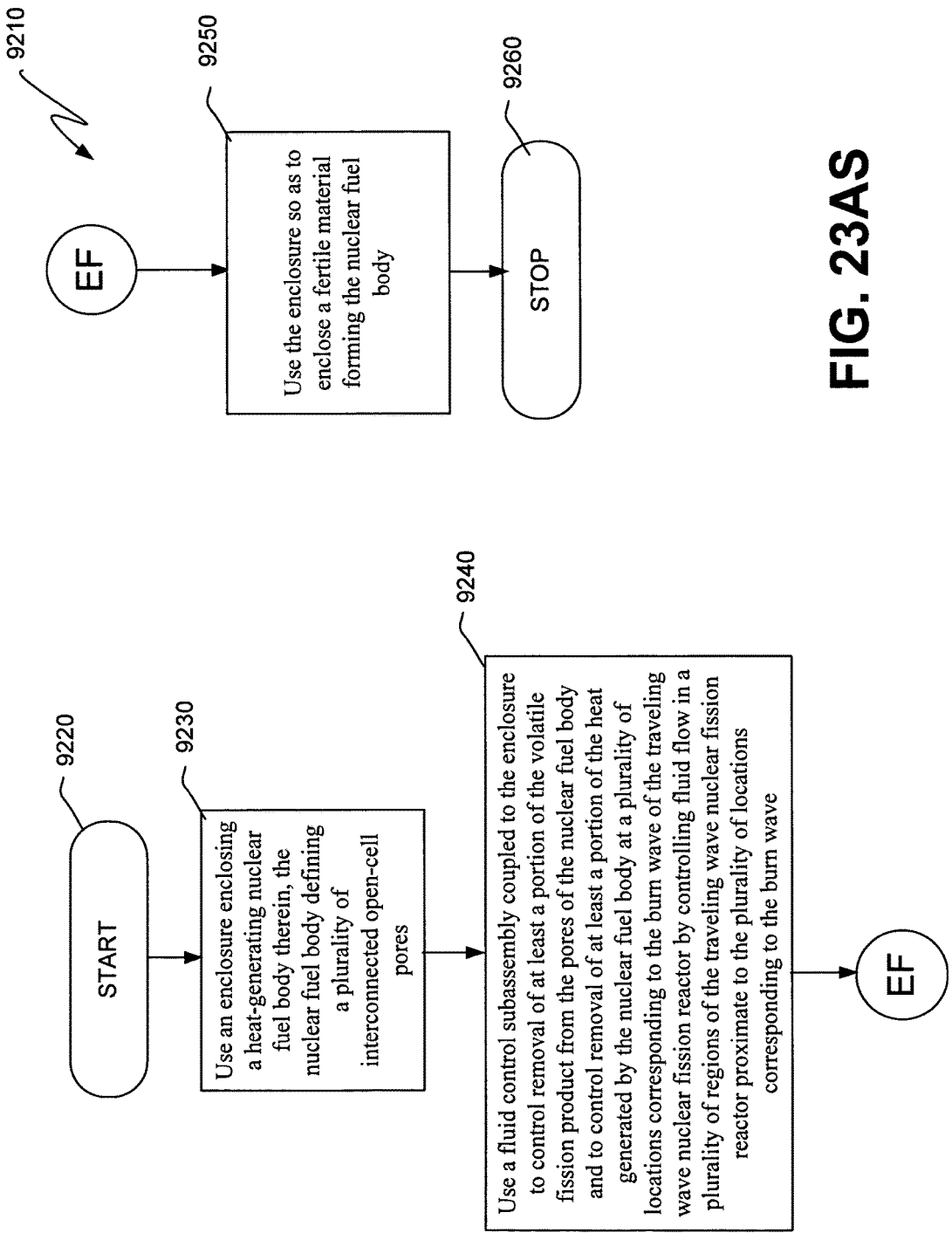
Figure 23A:
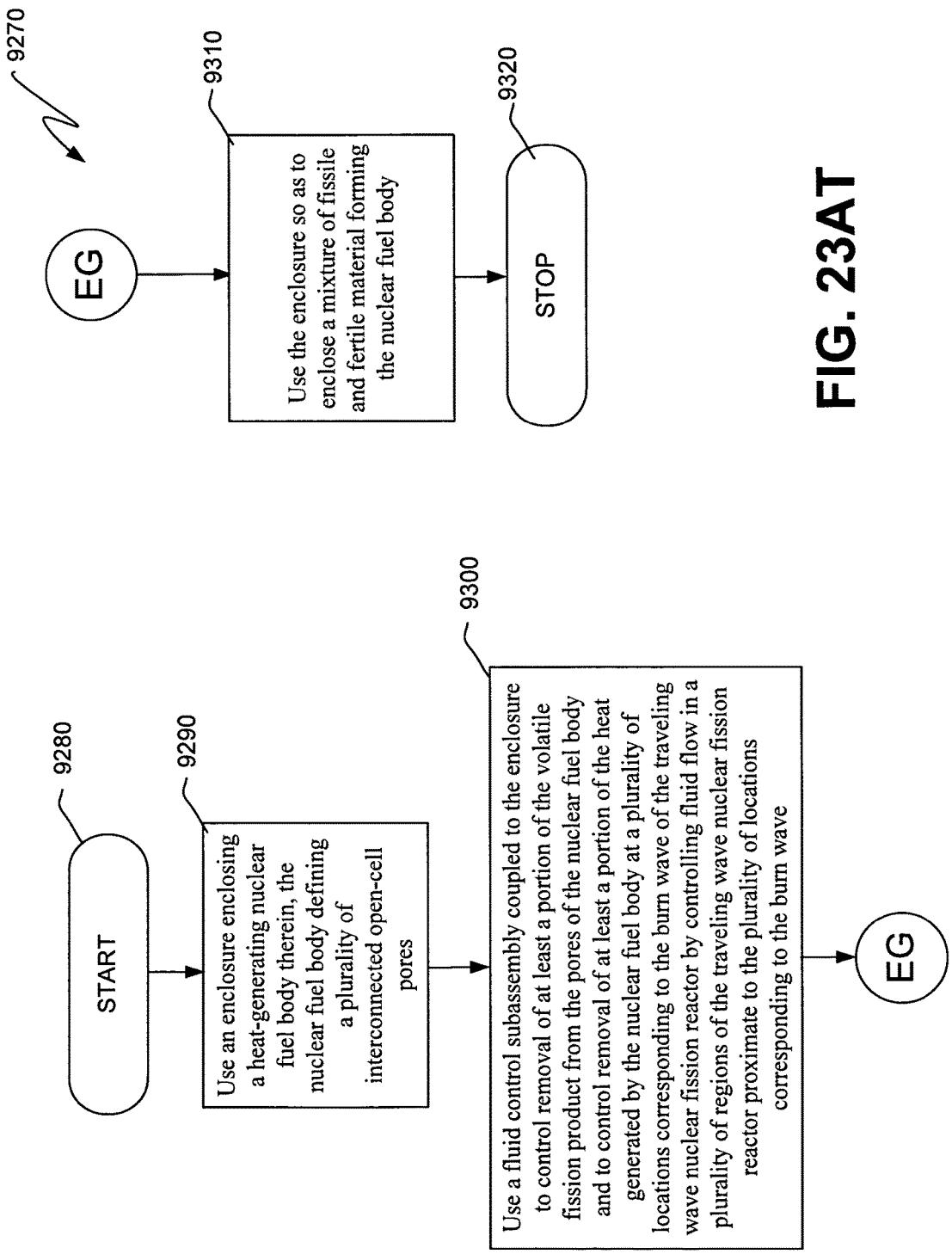
Figure 23A:
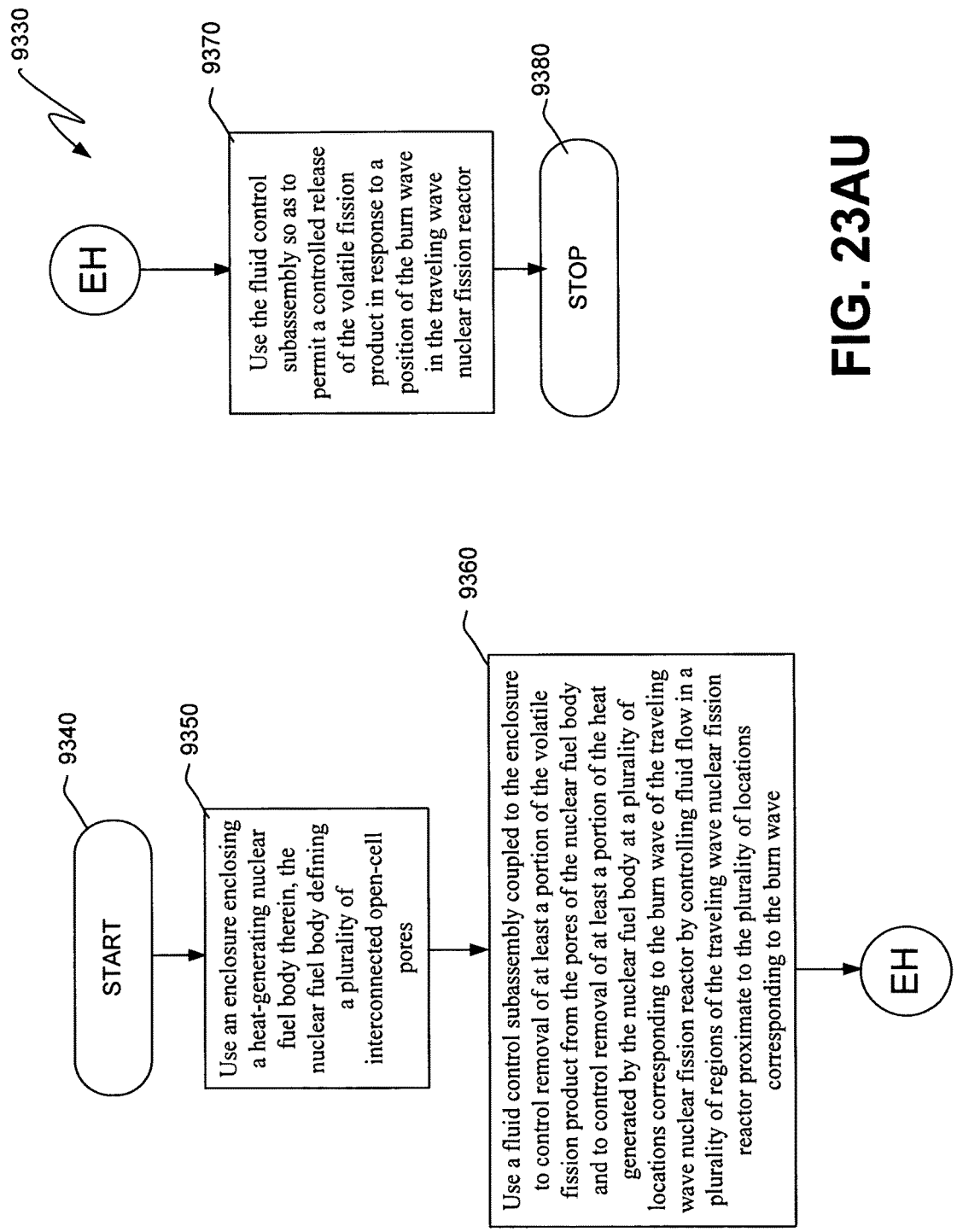
Figure 23A:
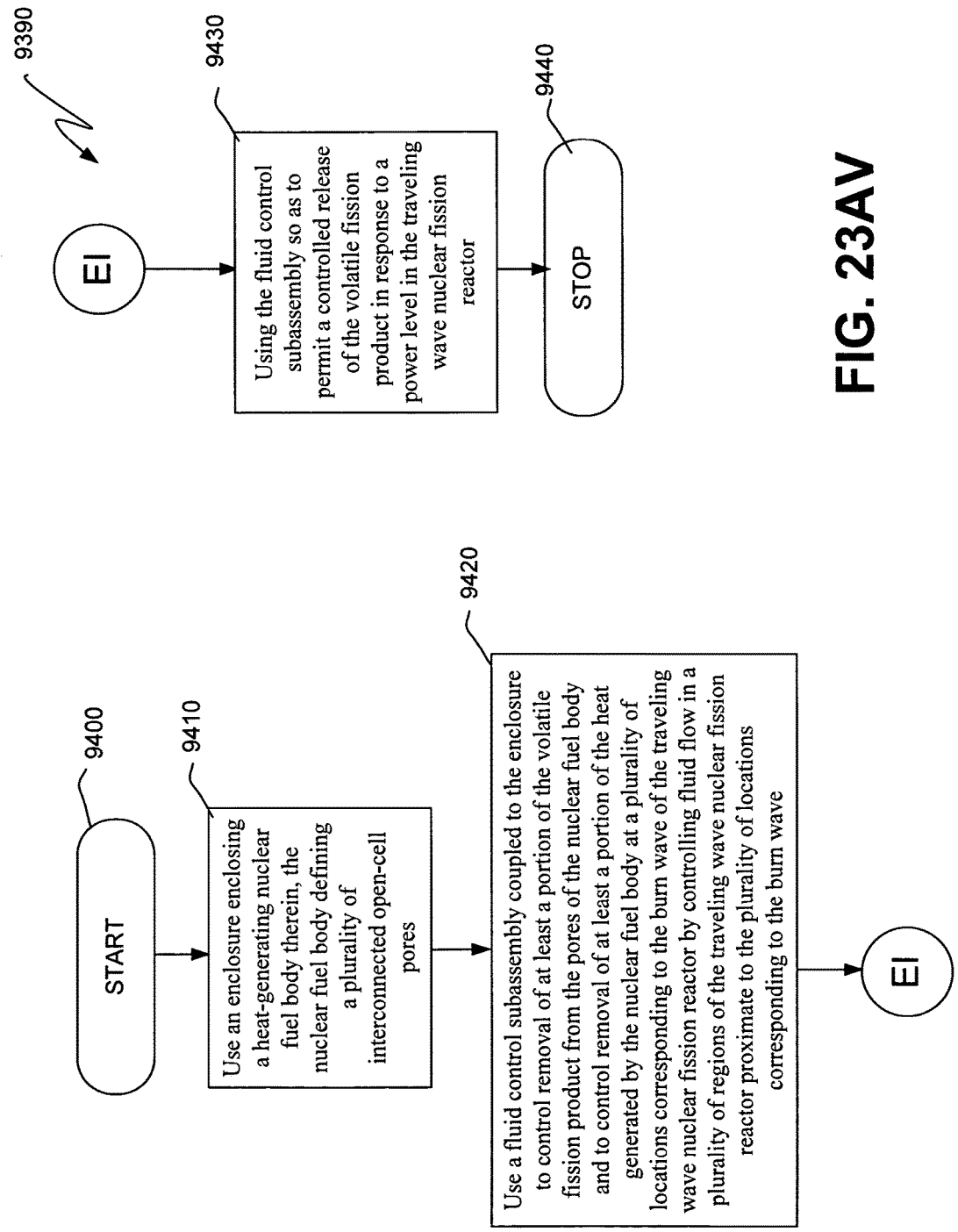
Figure 23A:
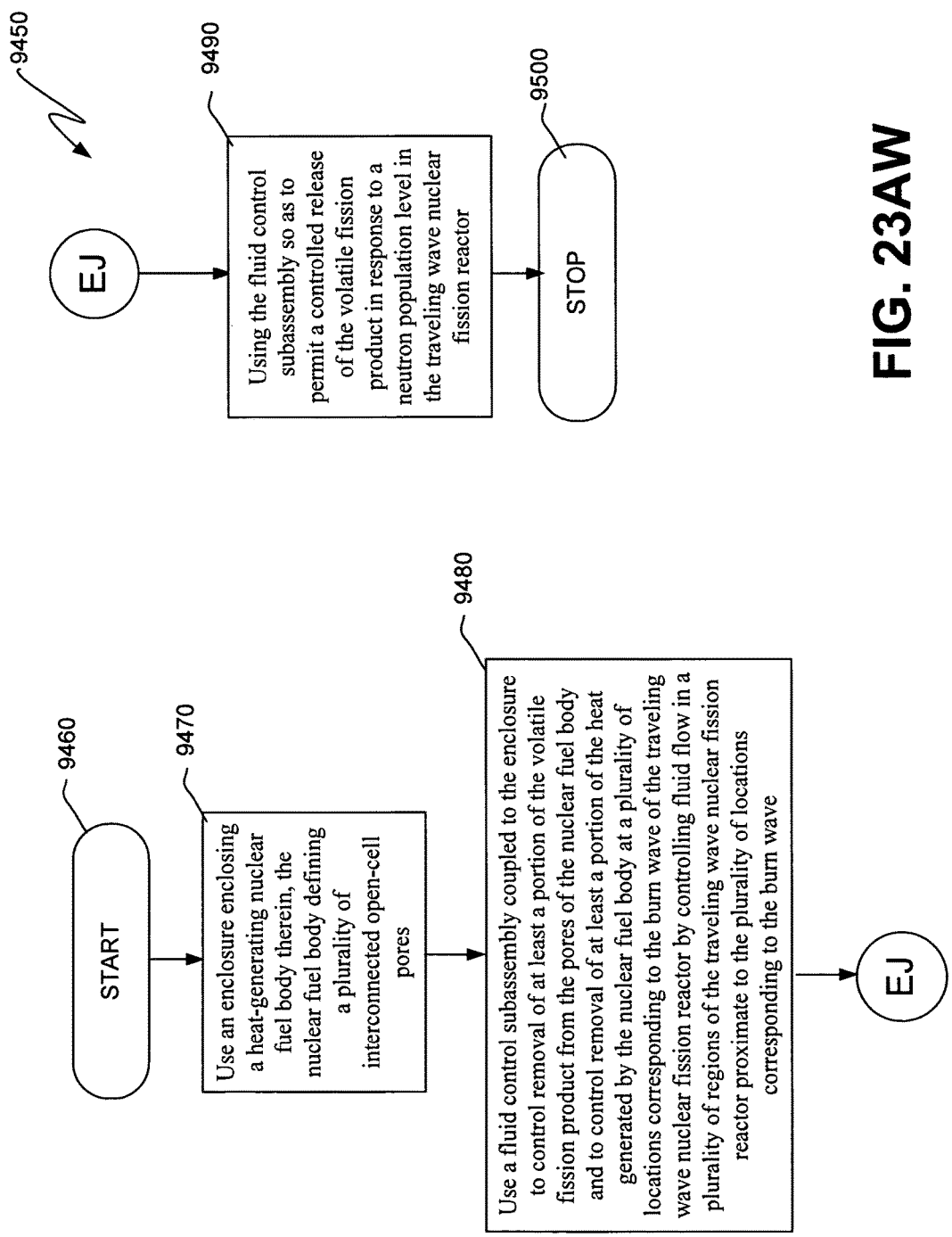
Figure 23A:
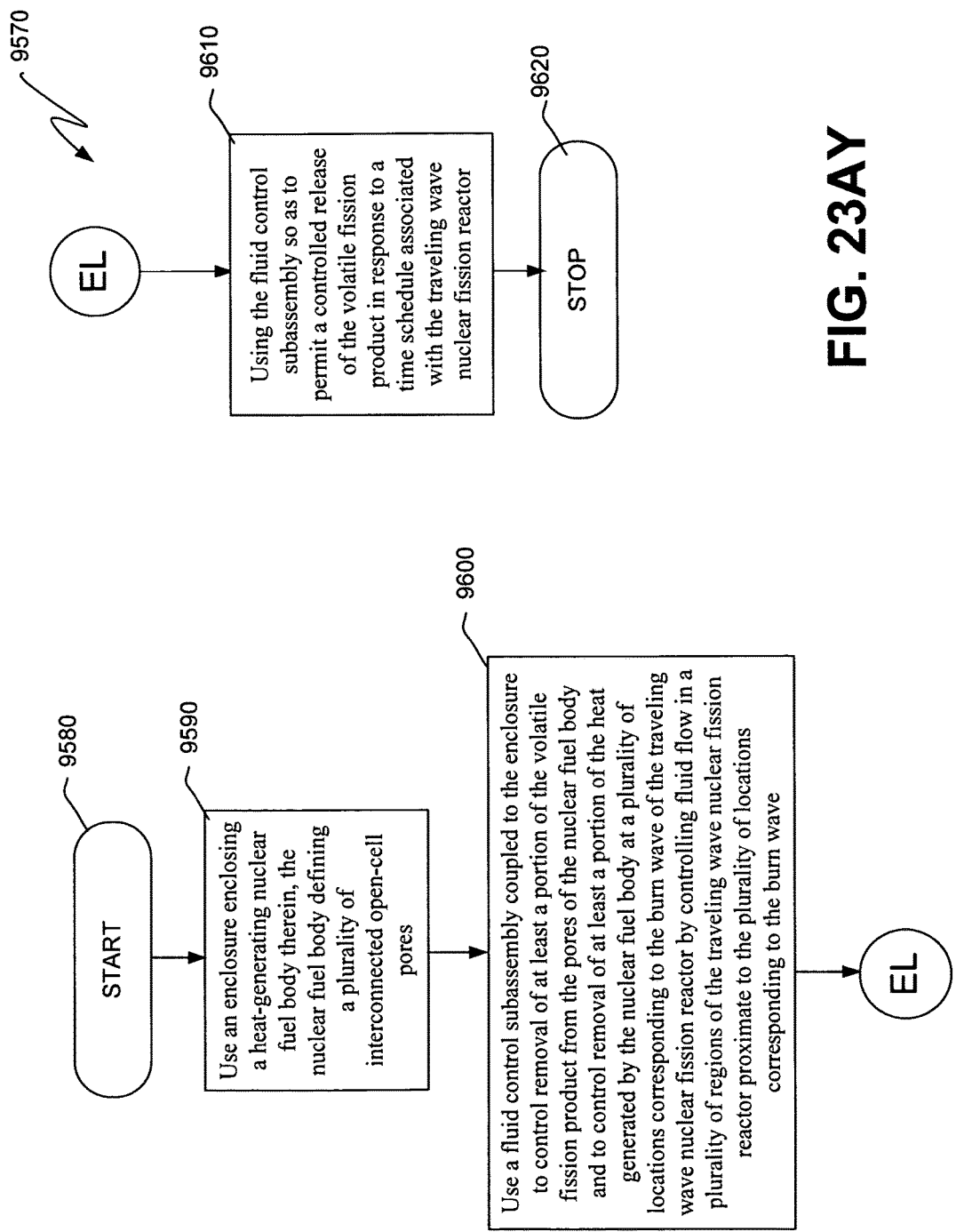
Figure 23A:
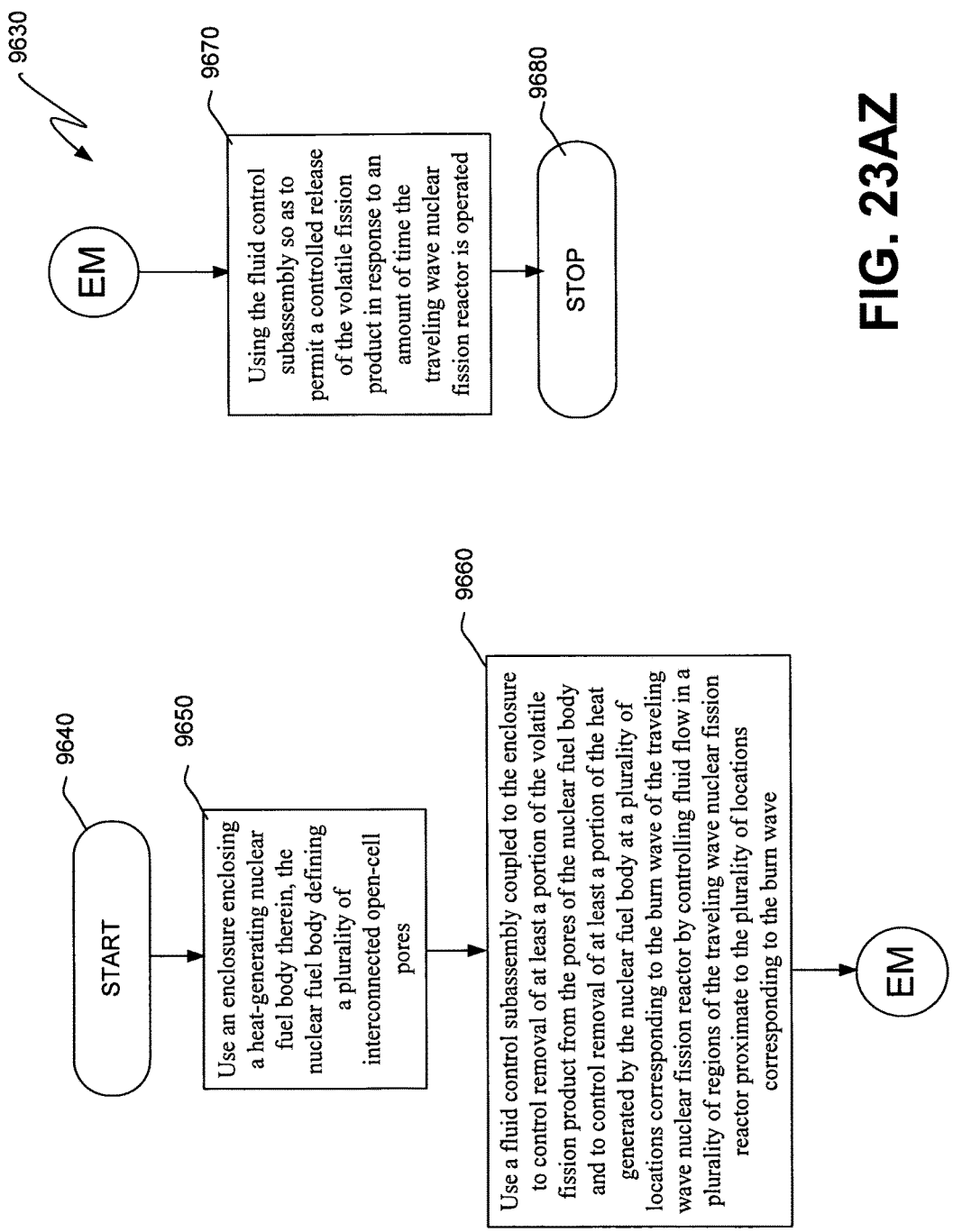
Figure 23B:
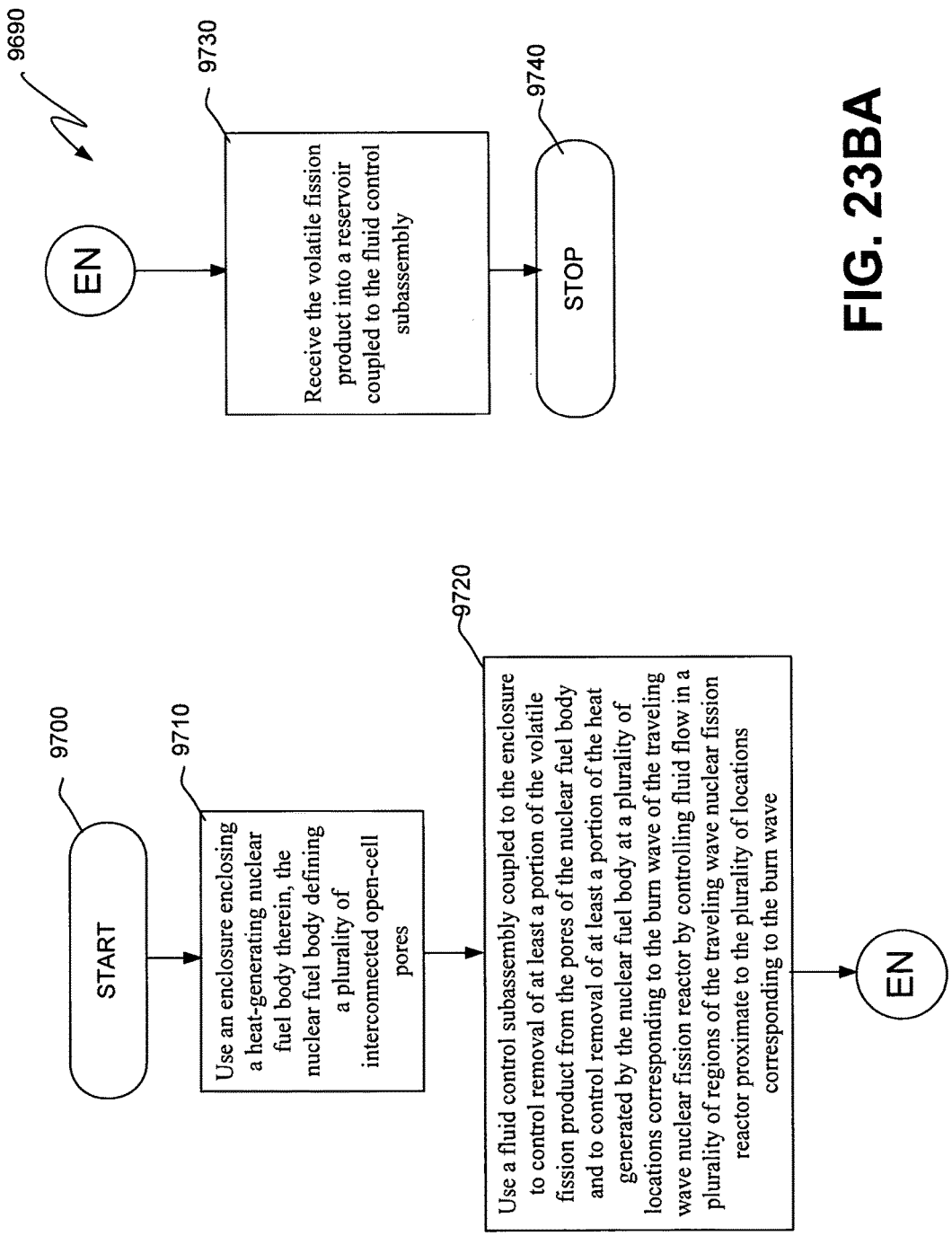
Figure 23B:
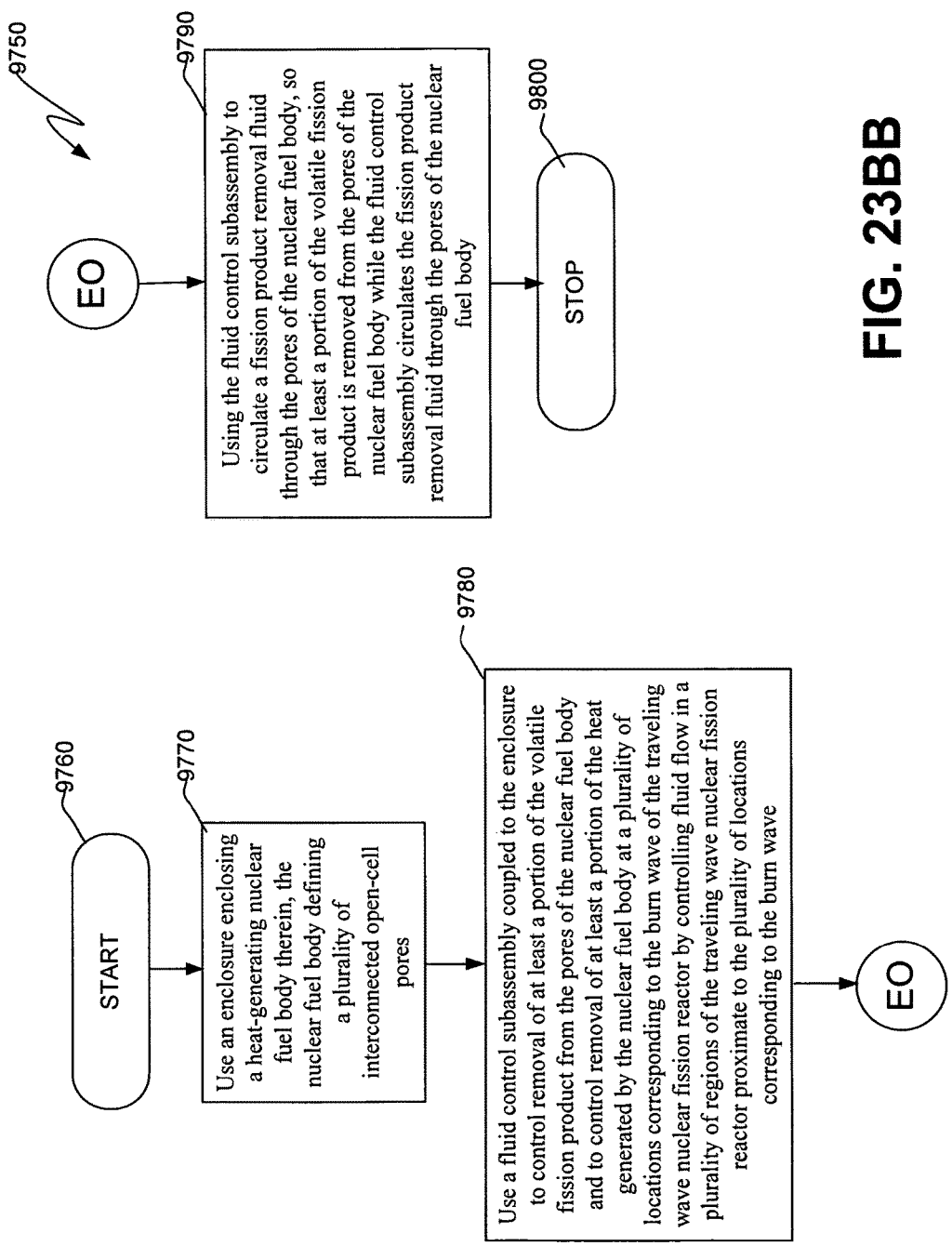
Figure 23B:
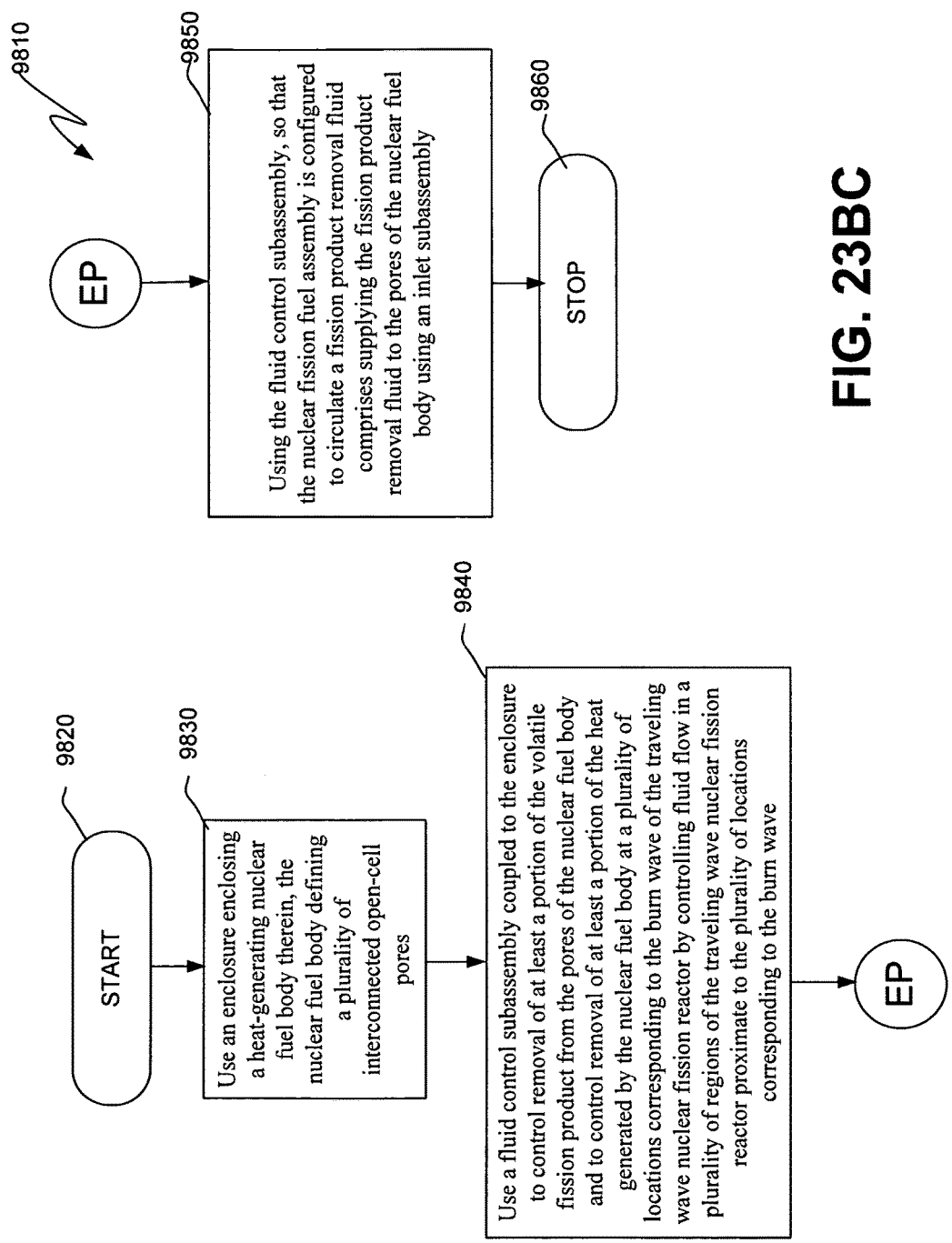
Figure 23B:
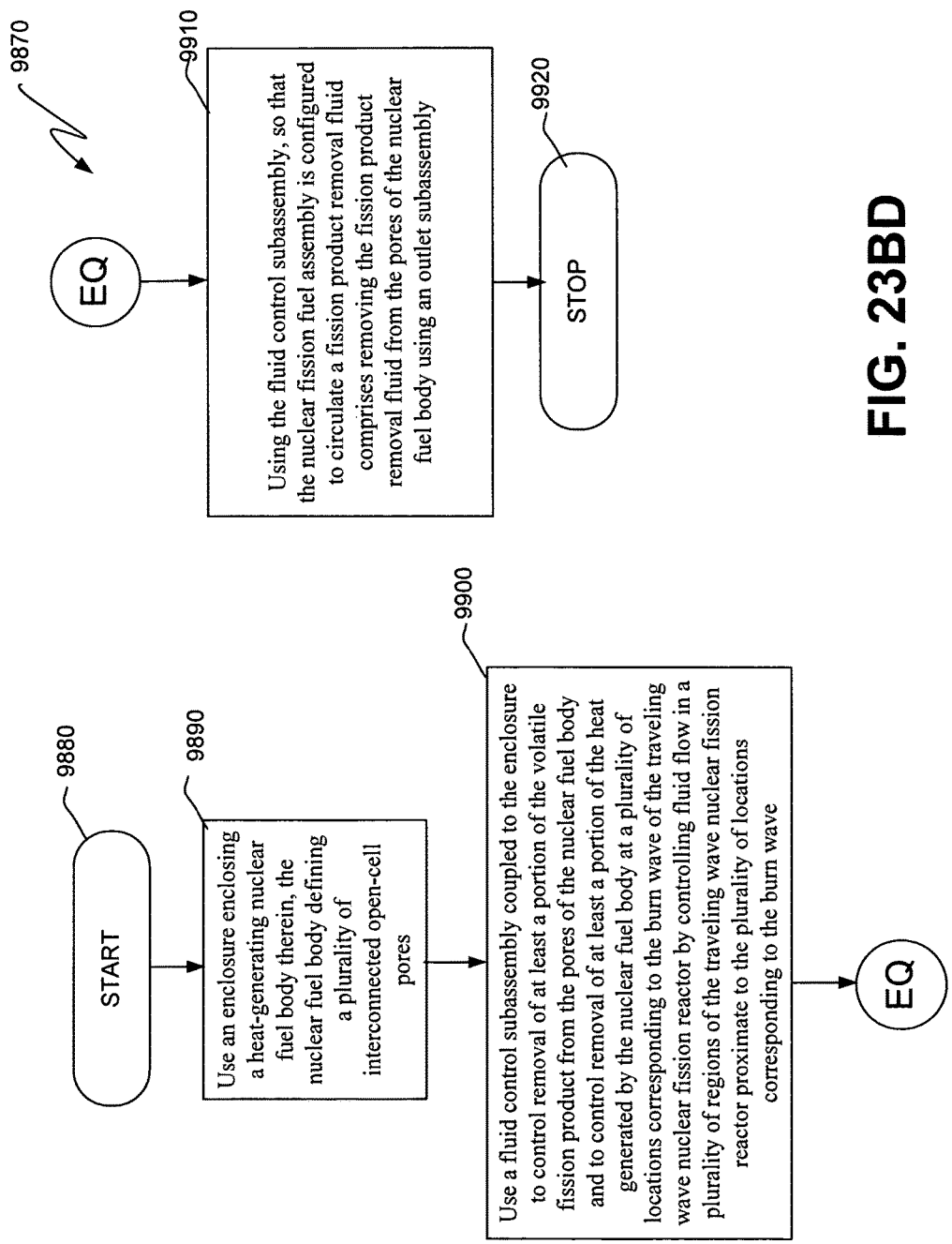
Figure 23B:
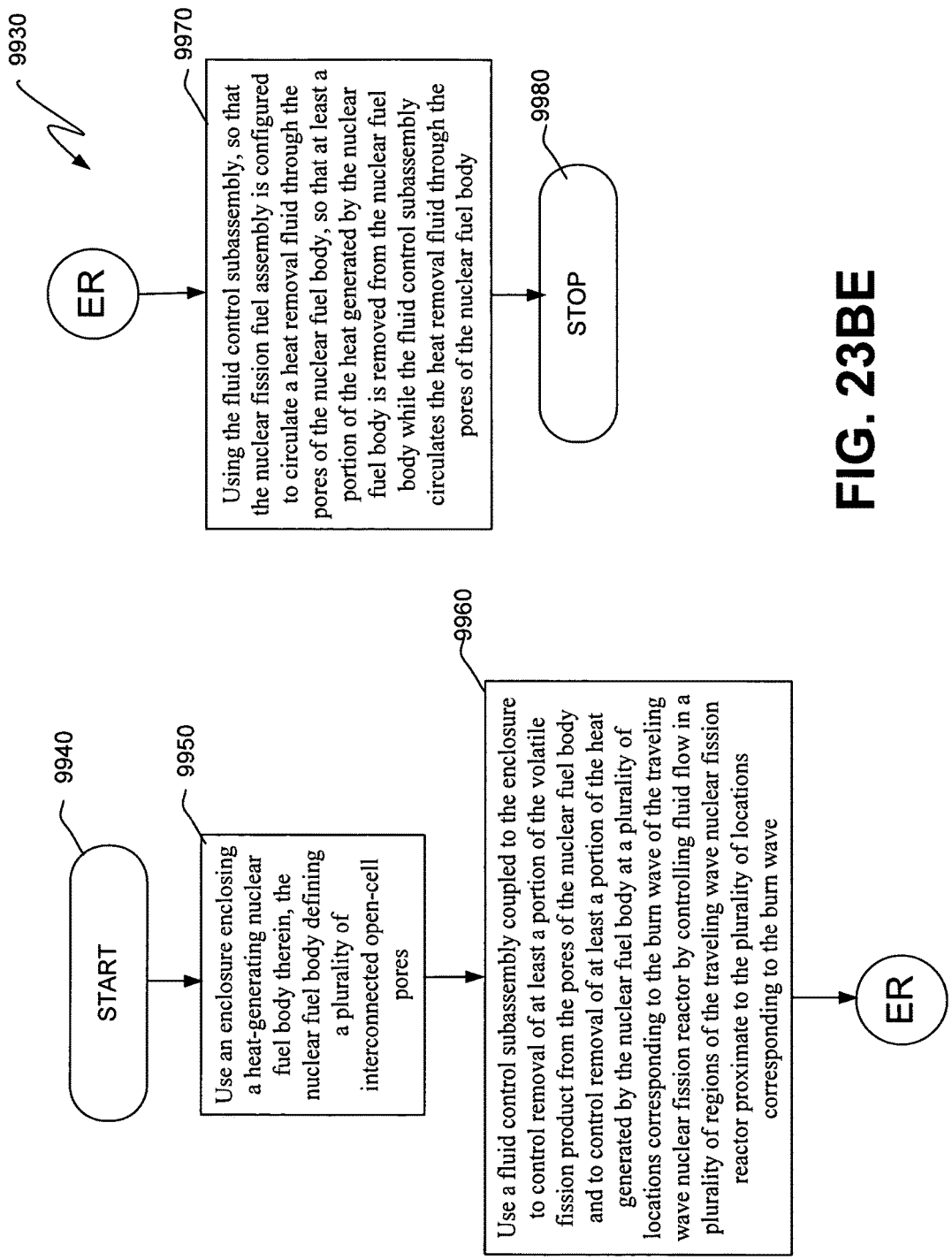
Figure 23B:
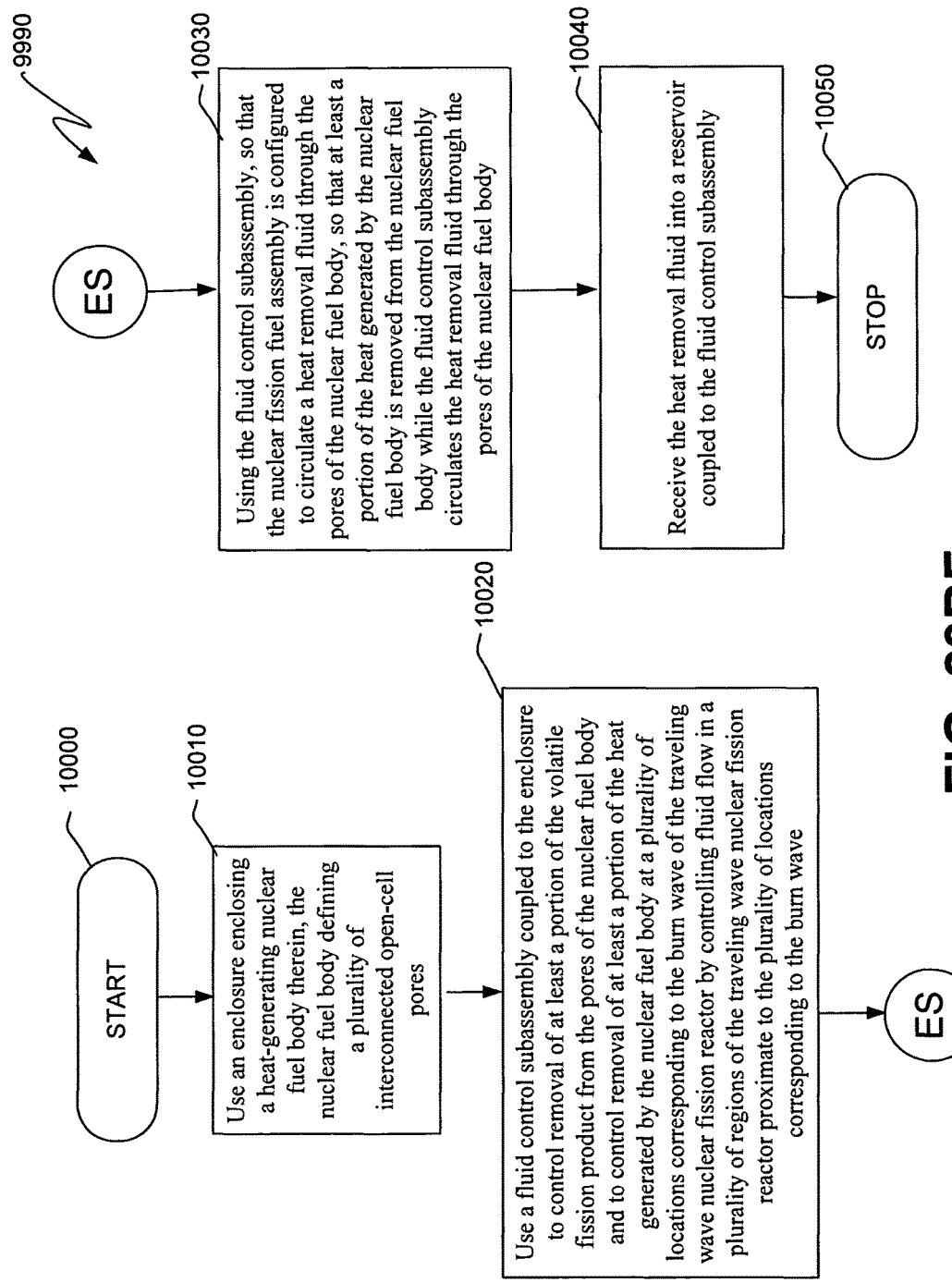
Figure 23B:
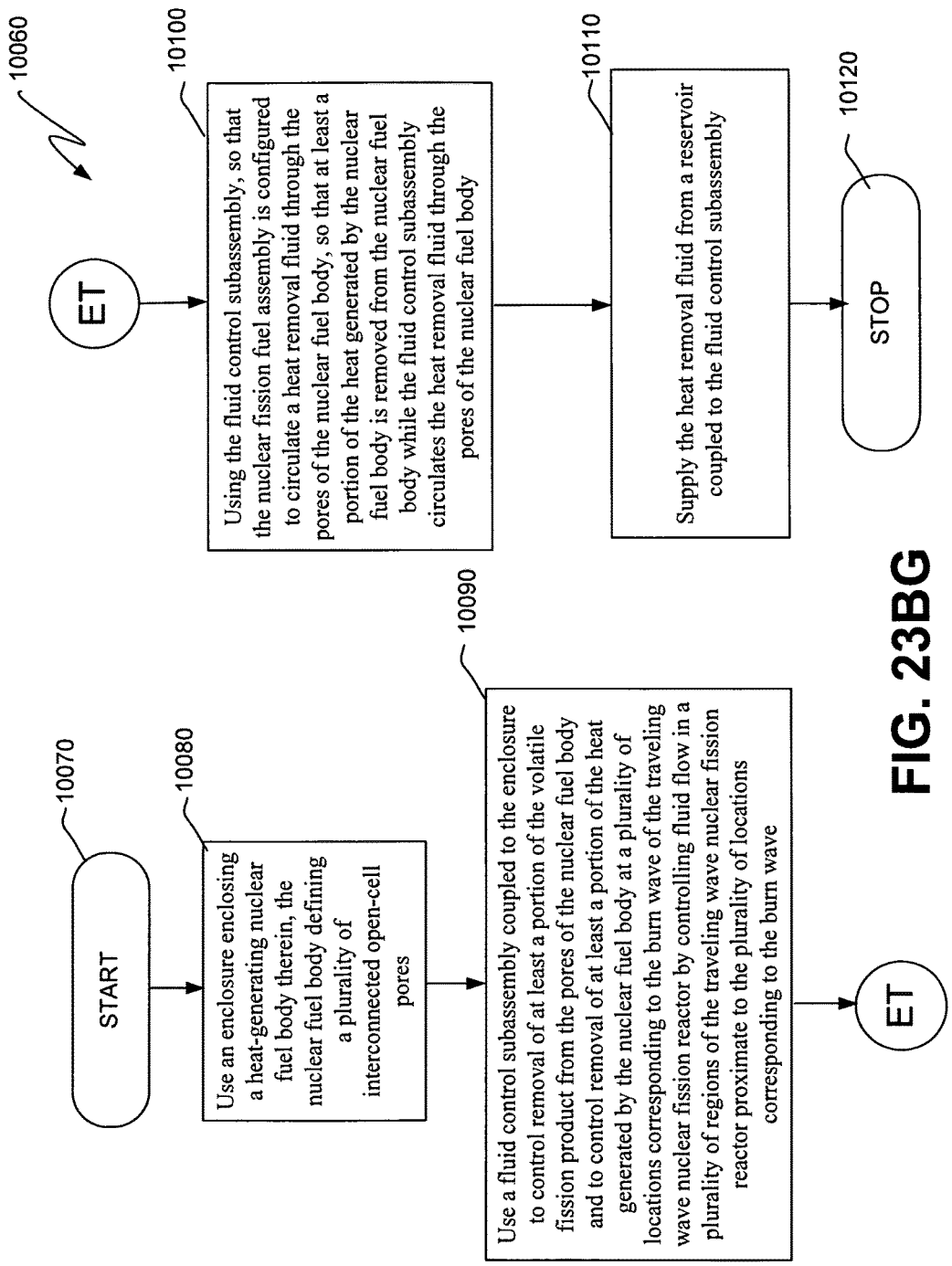
Figure 23B:
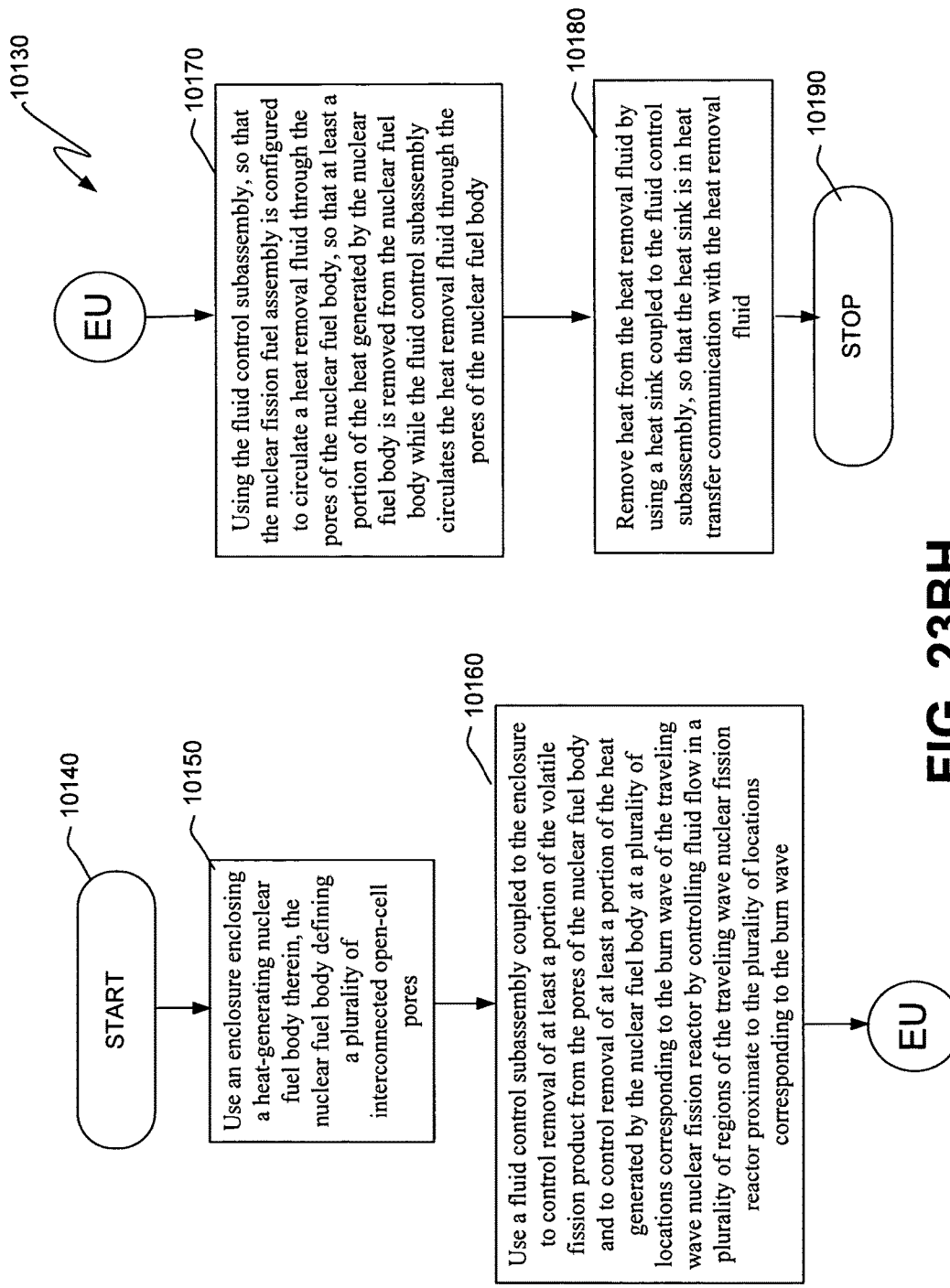
Figure 23B:
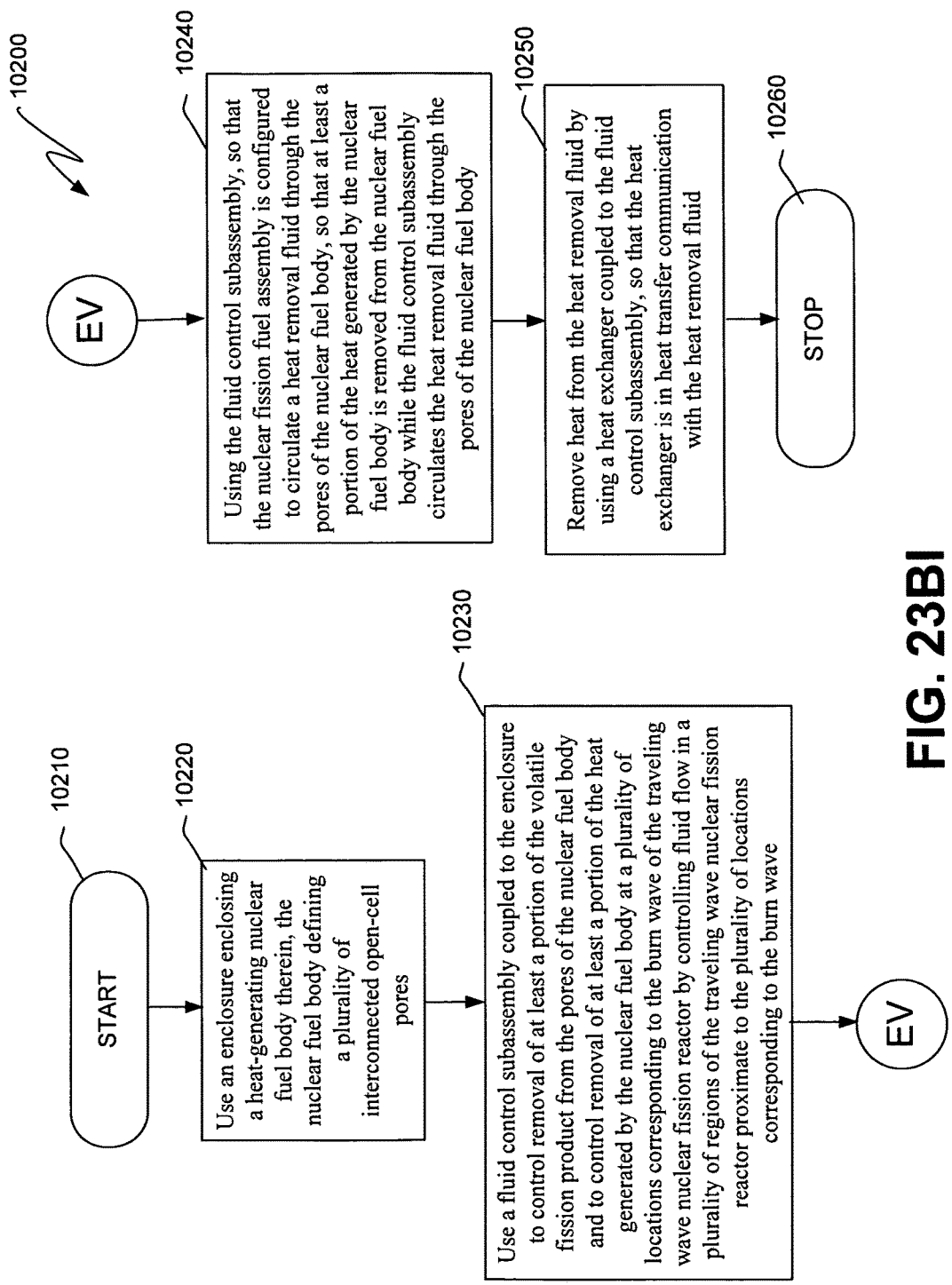
Figure 23B:
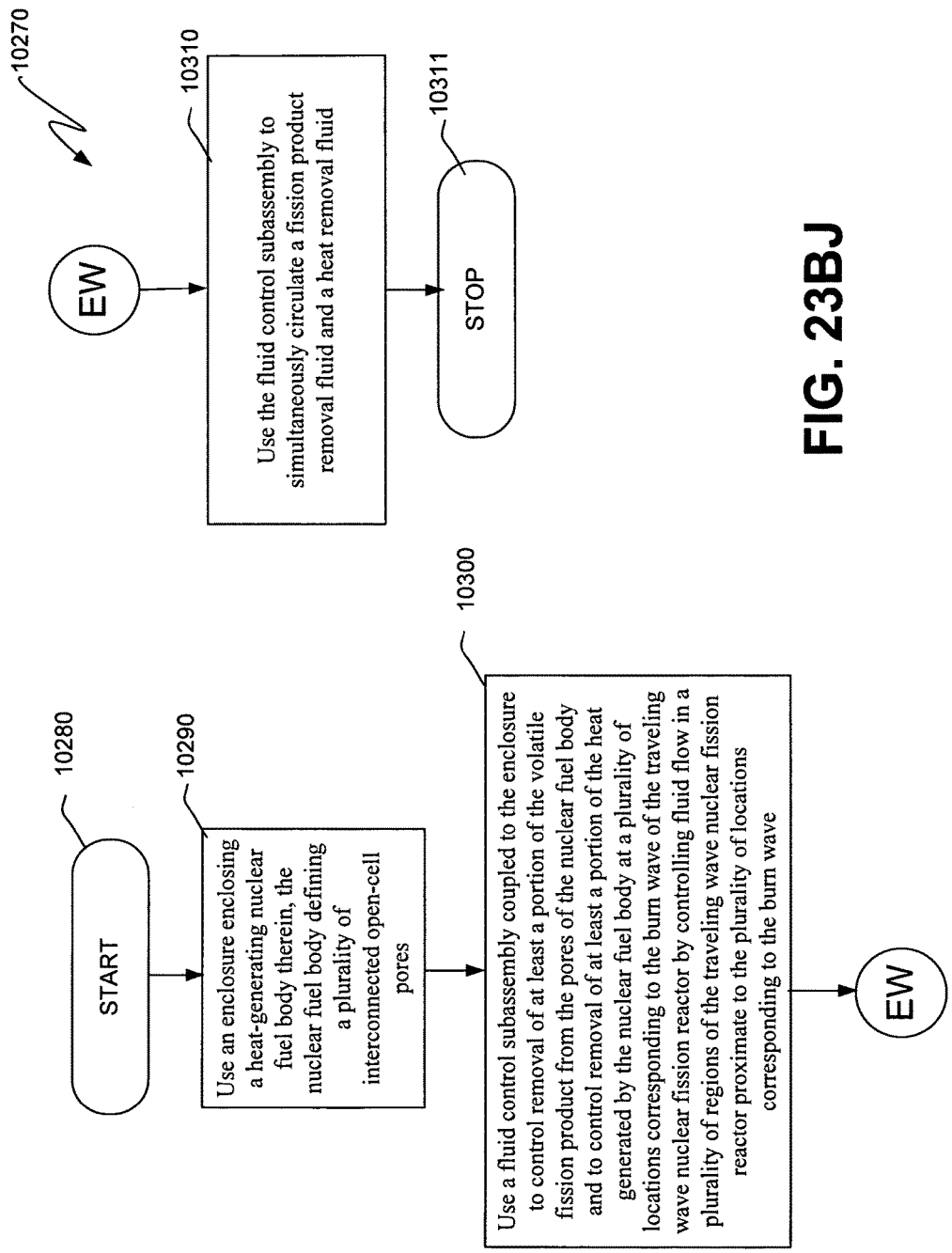
Figure 23B:
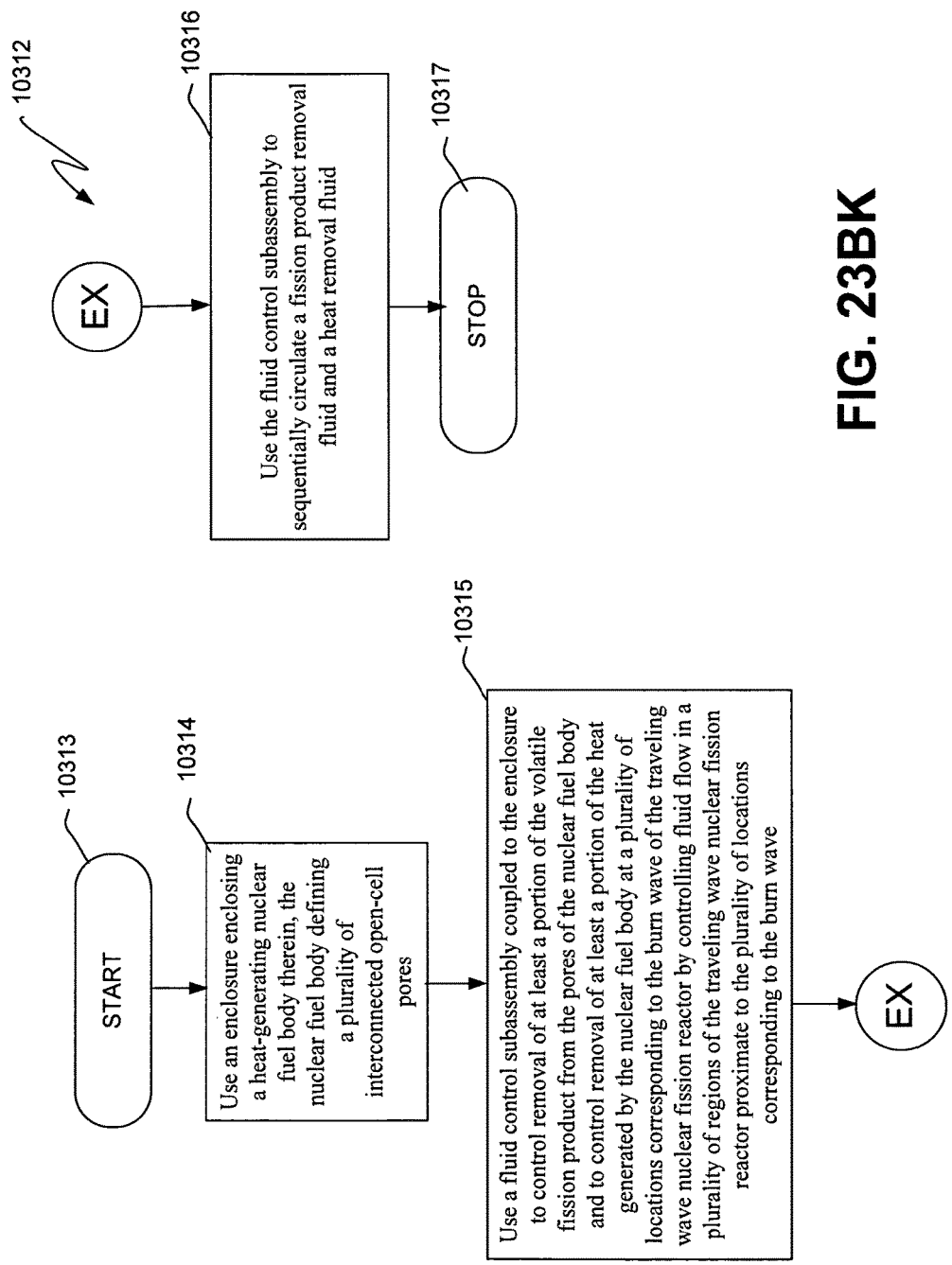
Figure 23B:
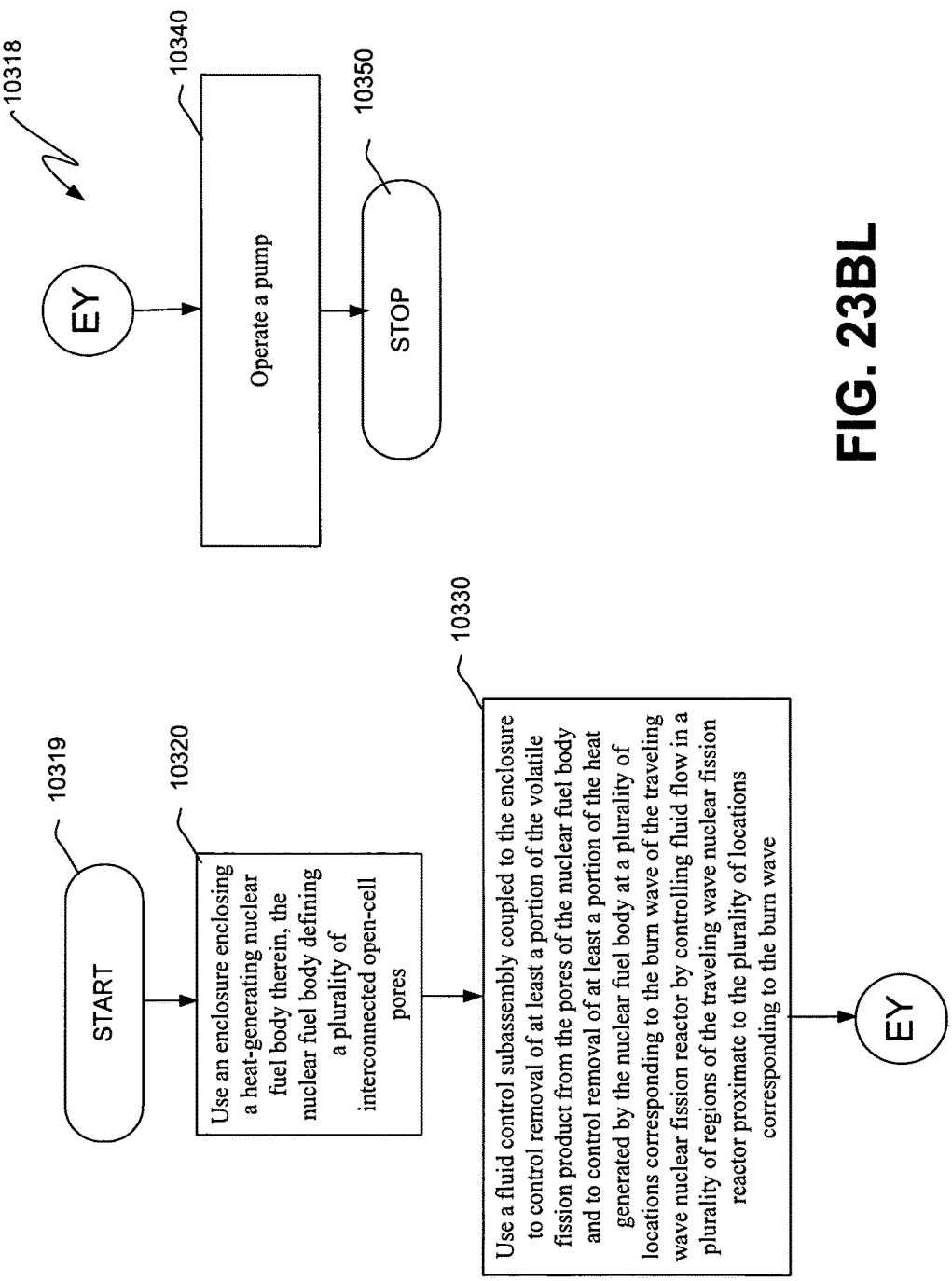
Figure 23B:
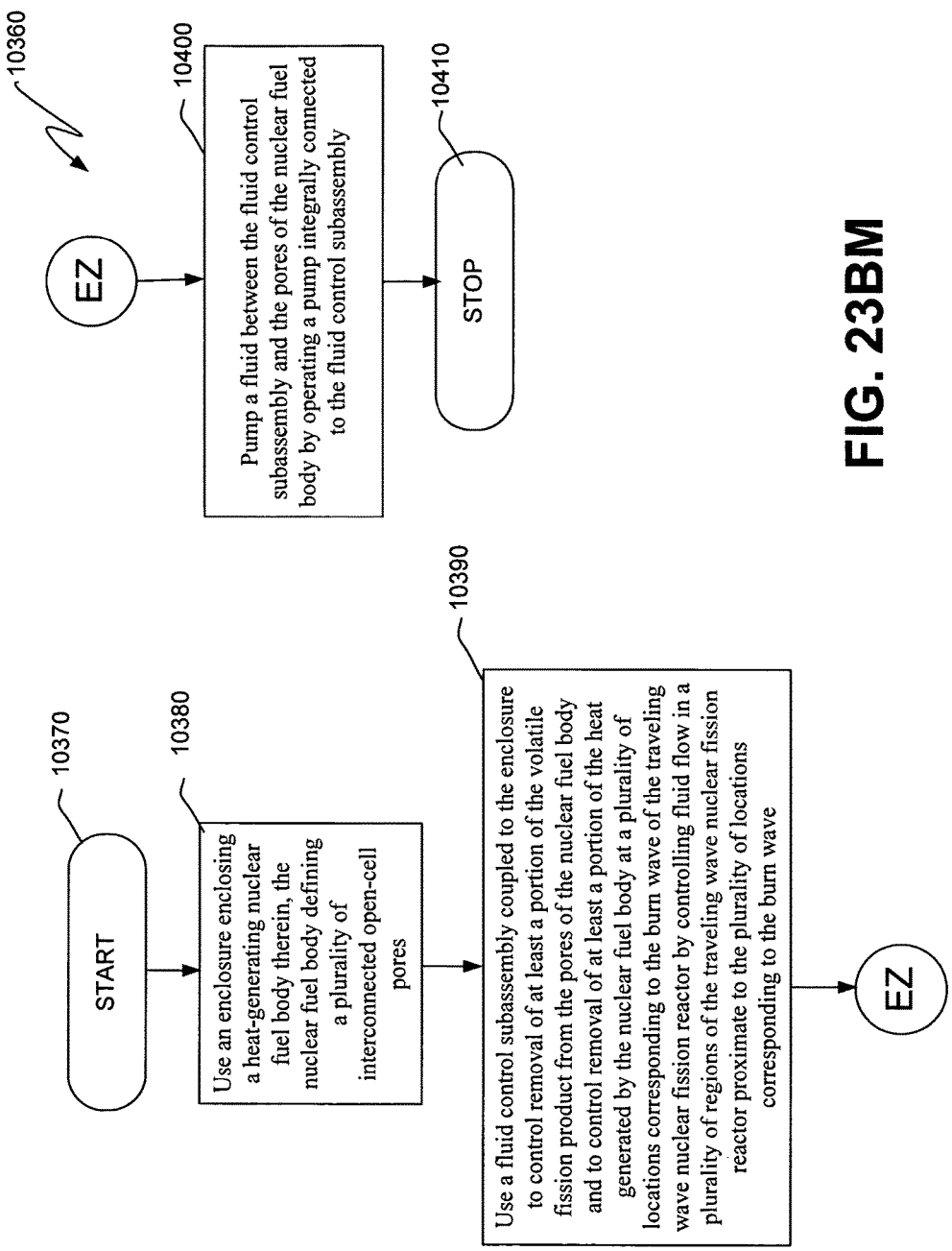
Figure 23B:
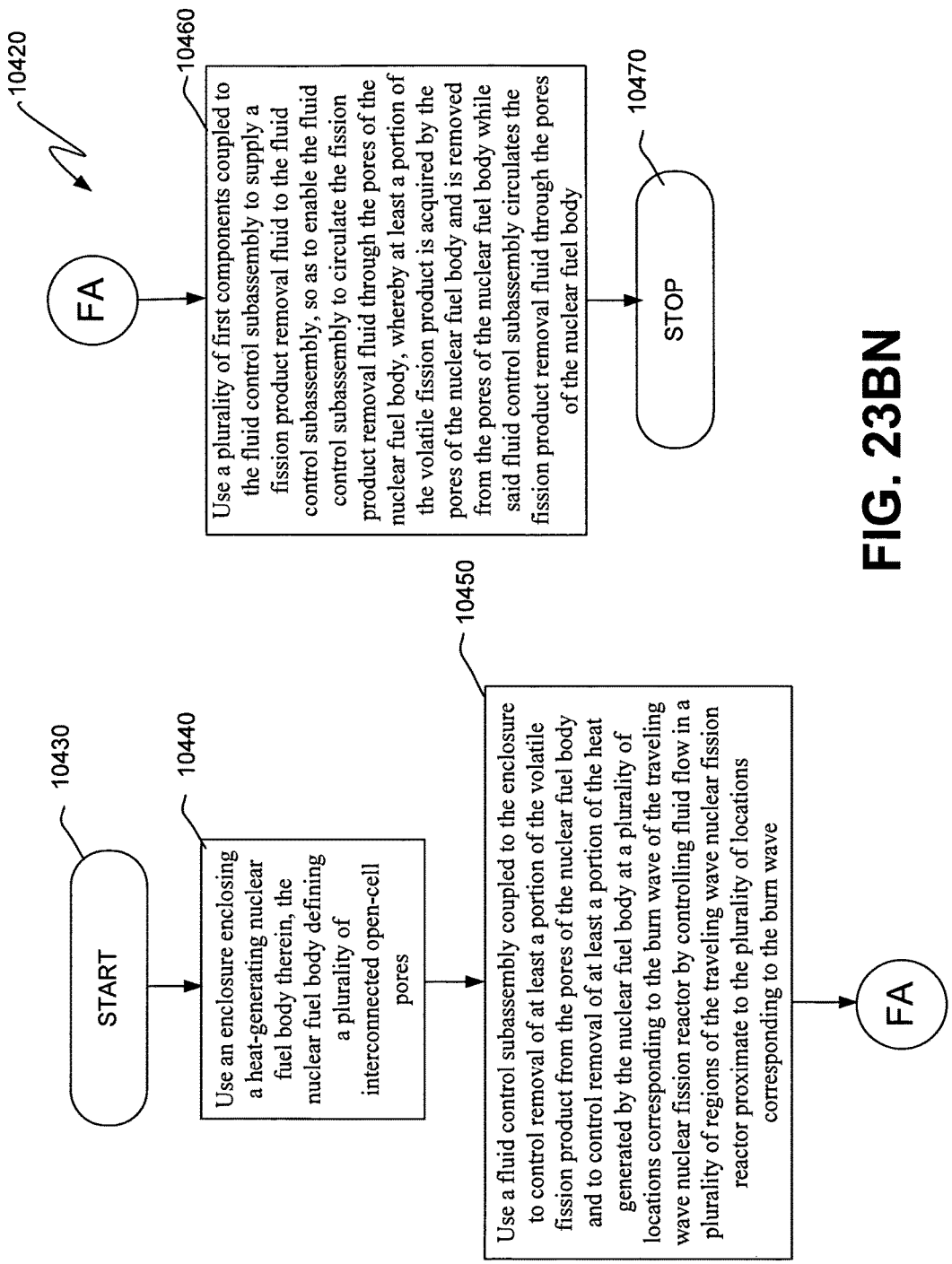
Figure 23B:
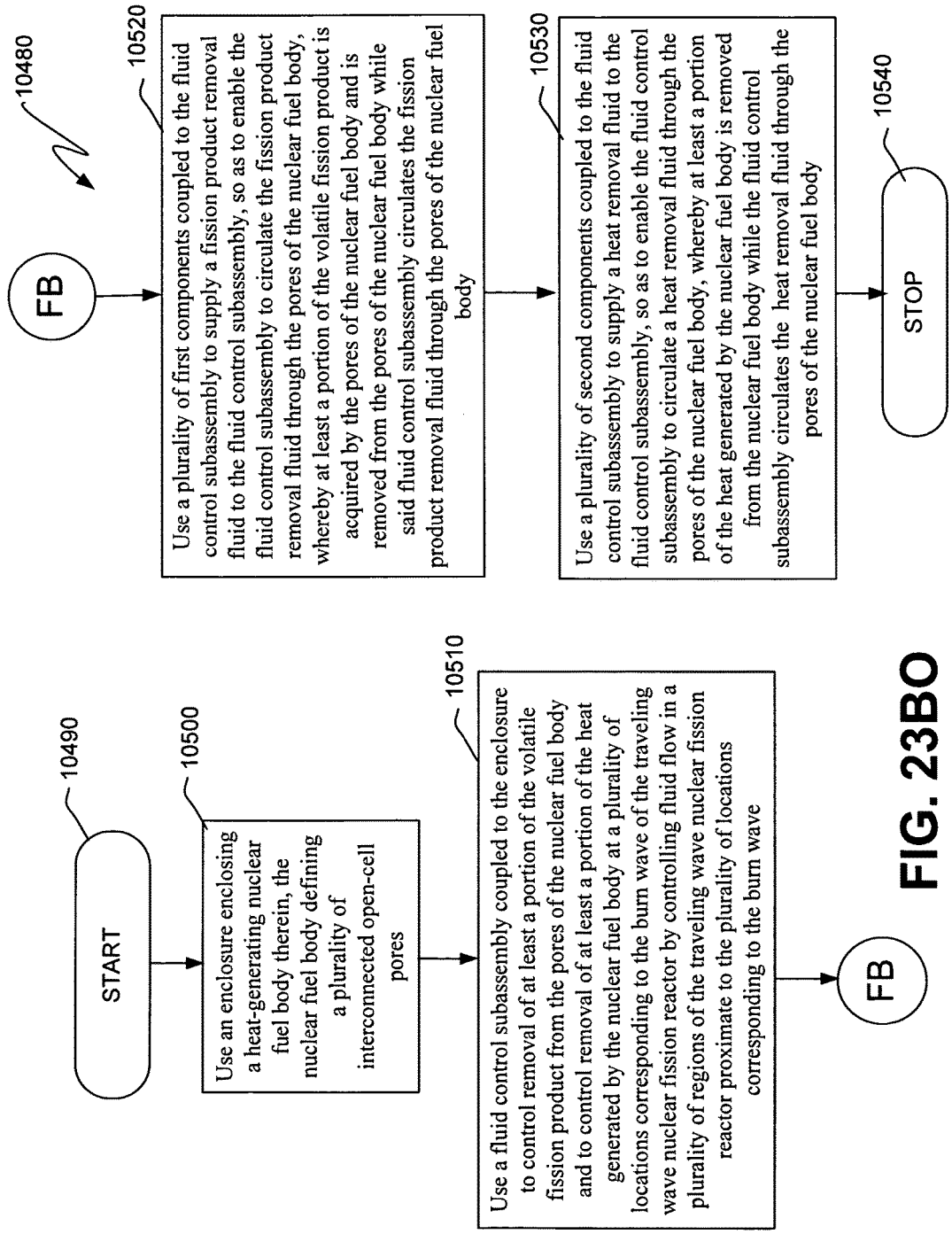
Figure 23B:
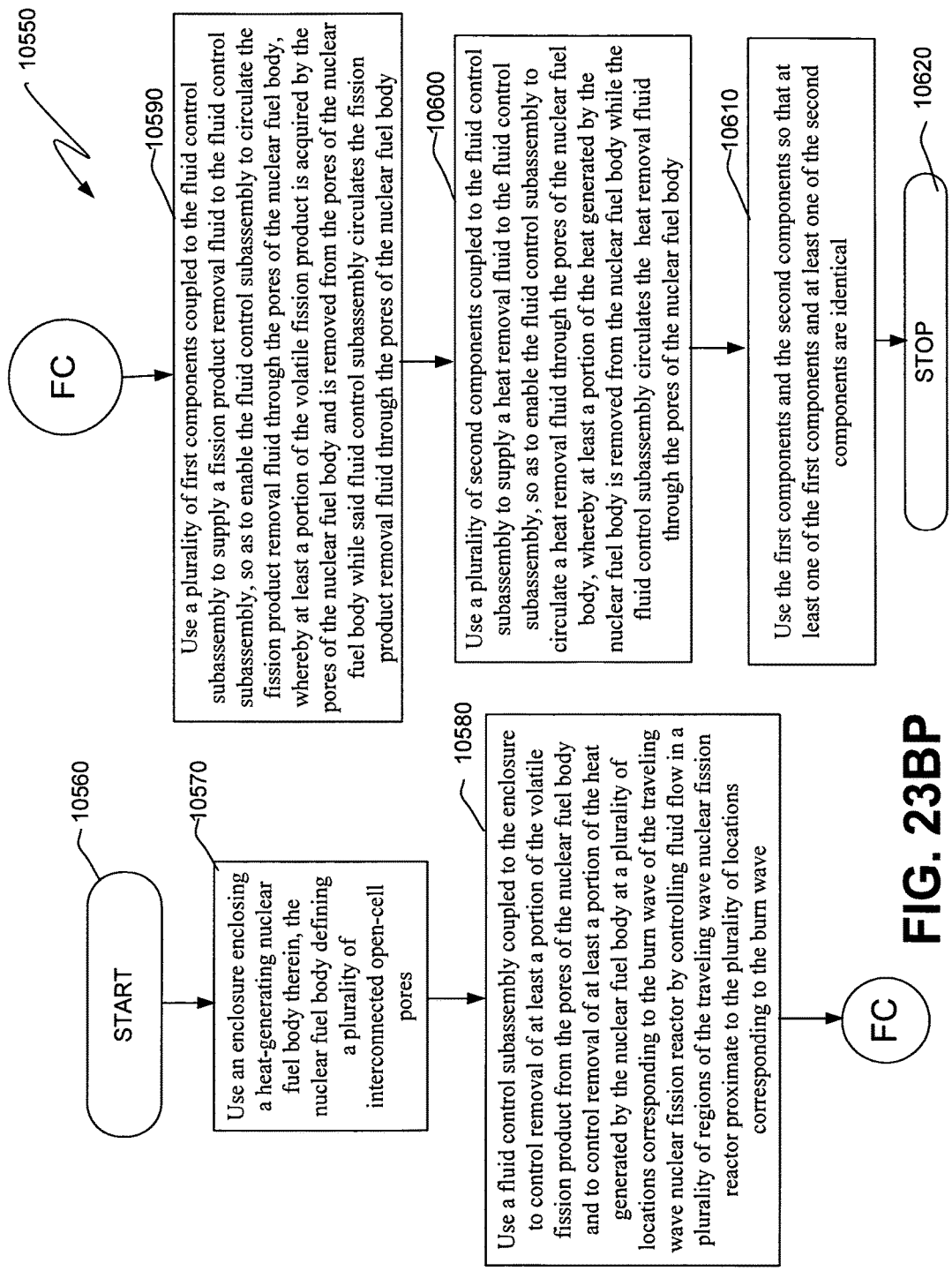
Figure 23B:
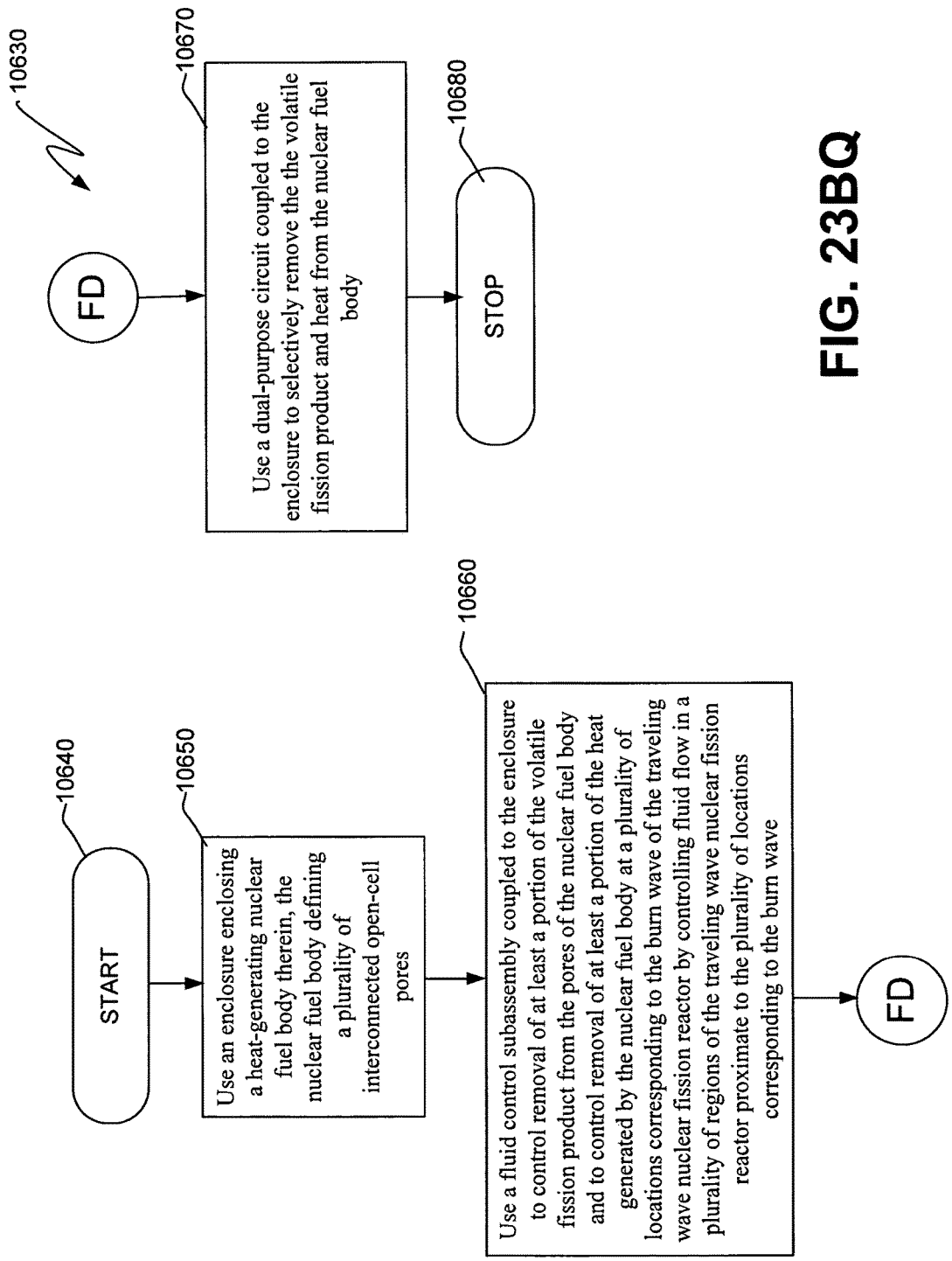
Figure 23B:
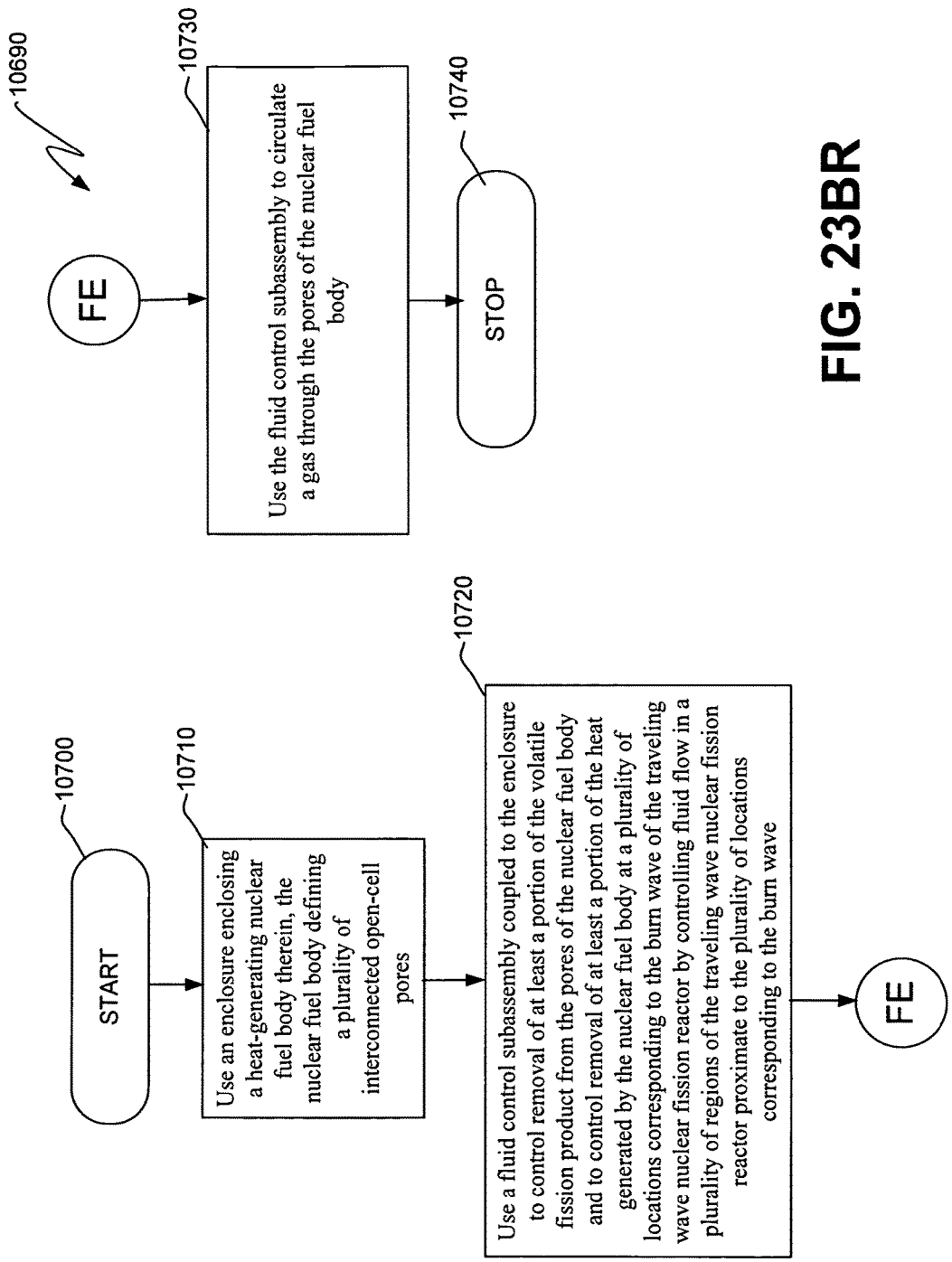
Figure 23B:
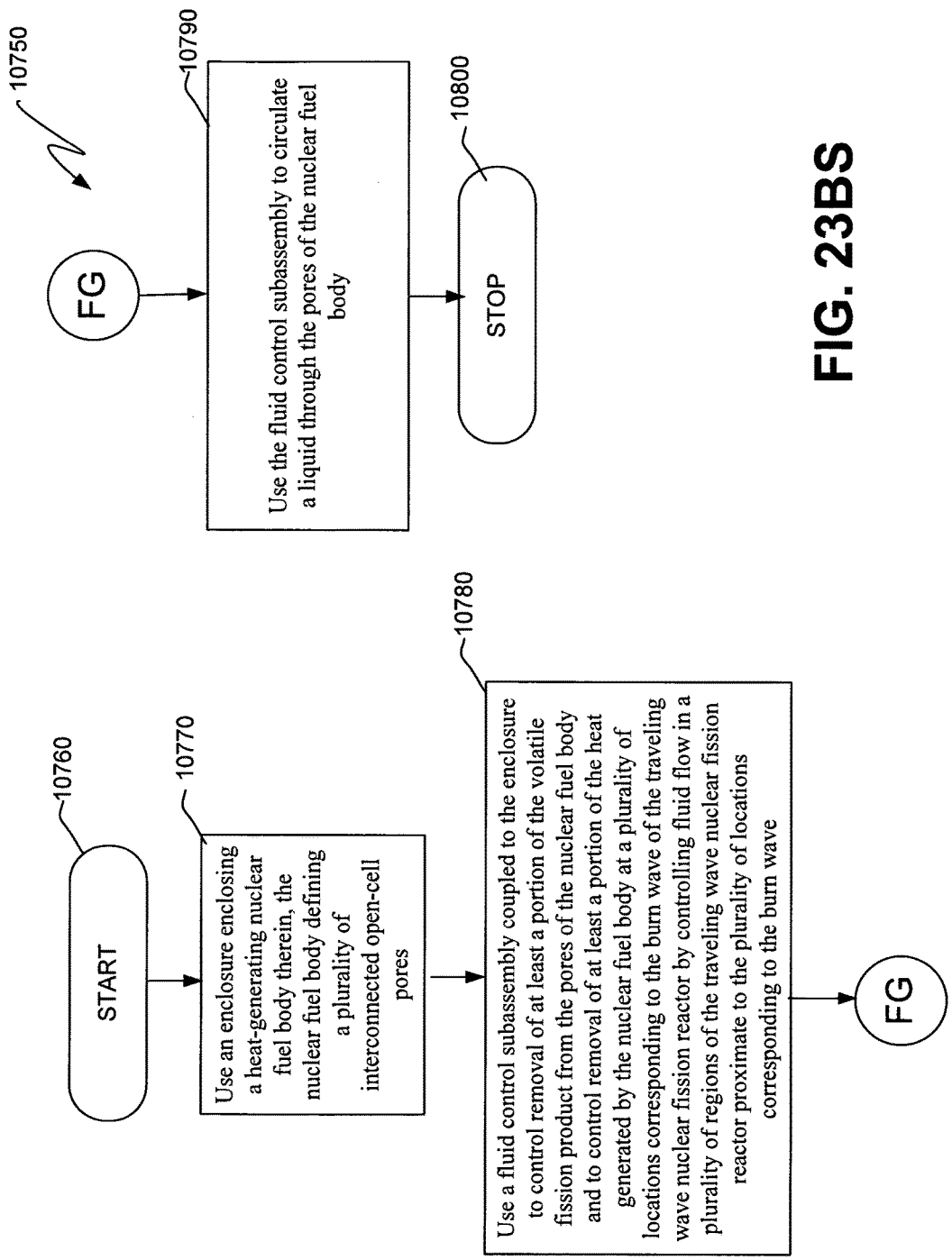
Figure 23B:
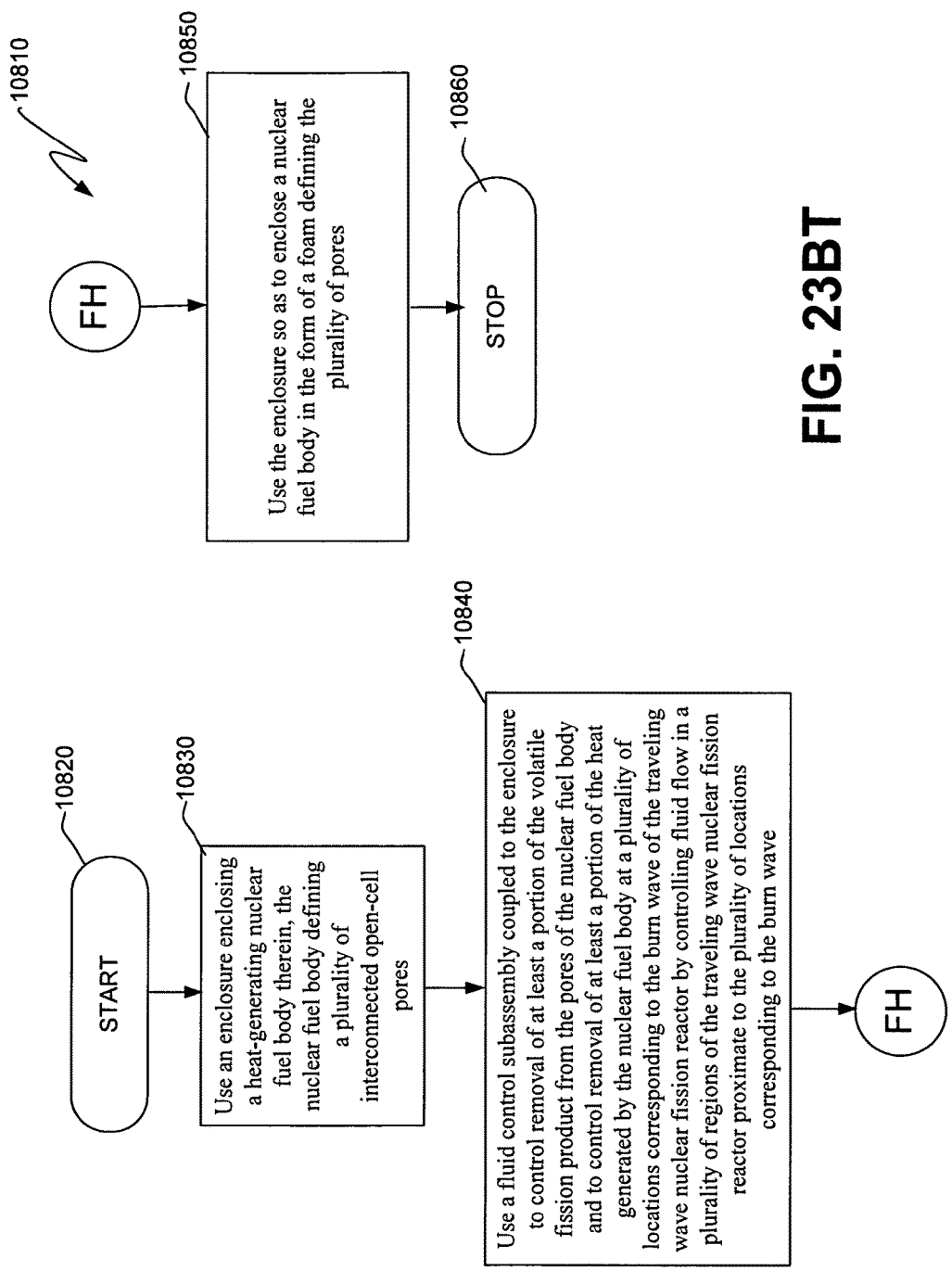
Figure 23B:
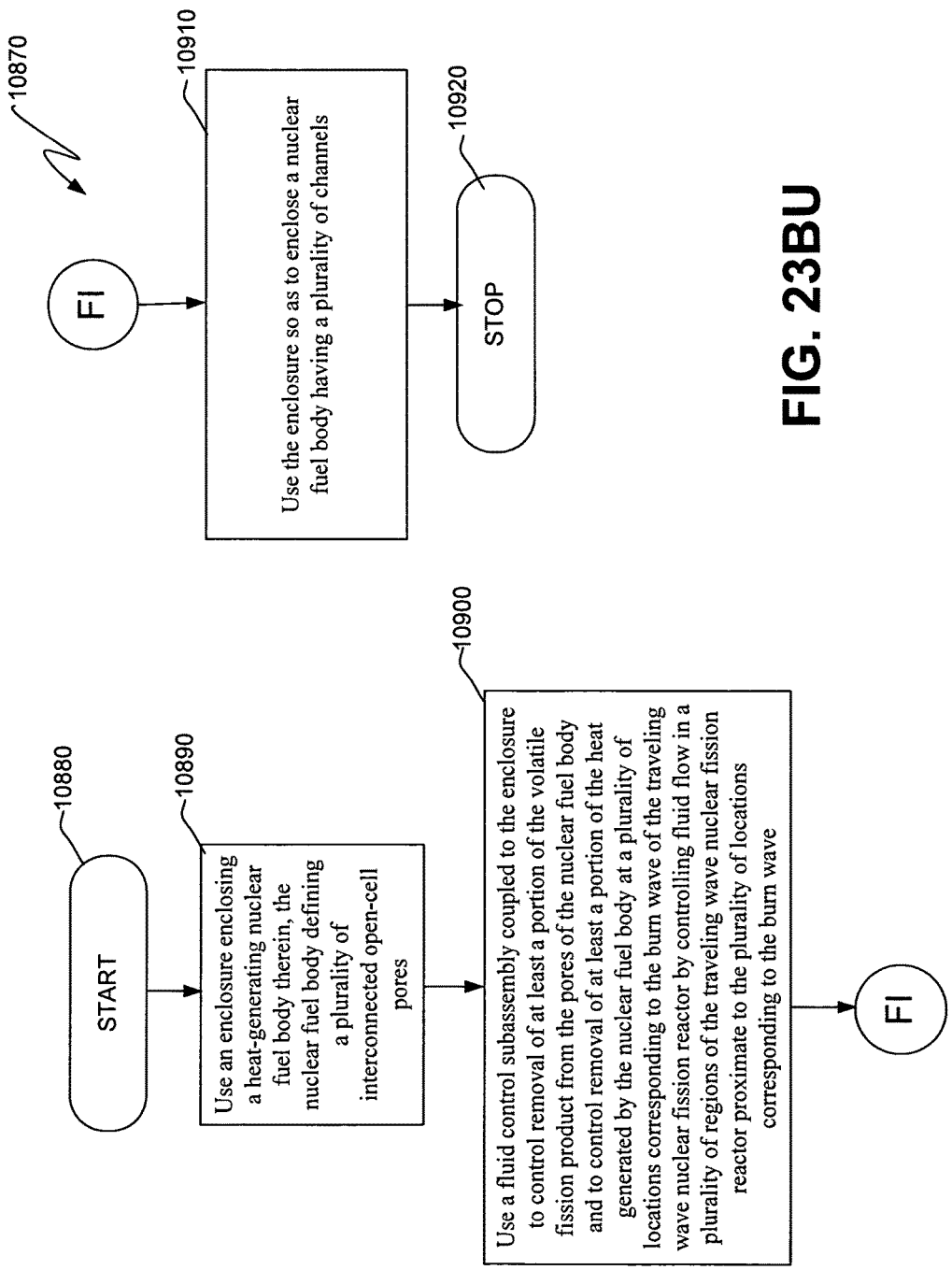
Figure 23B:
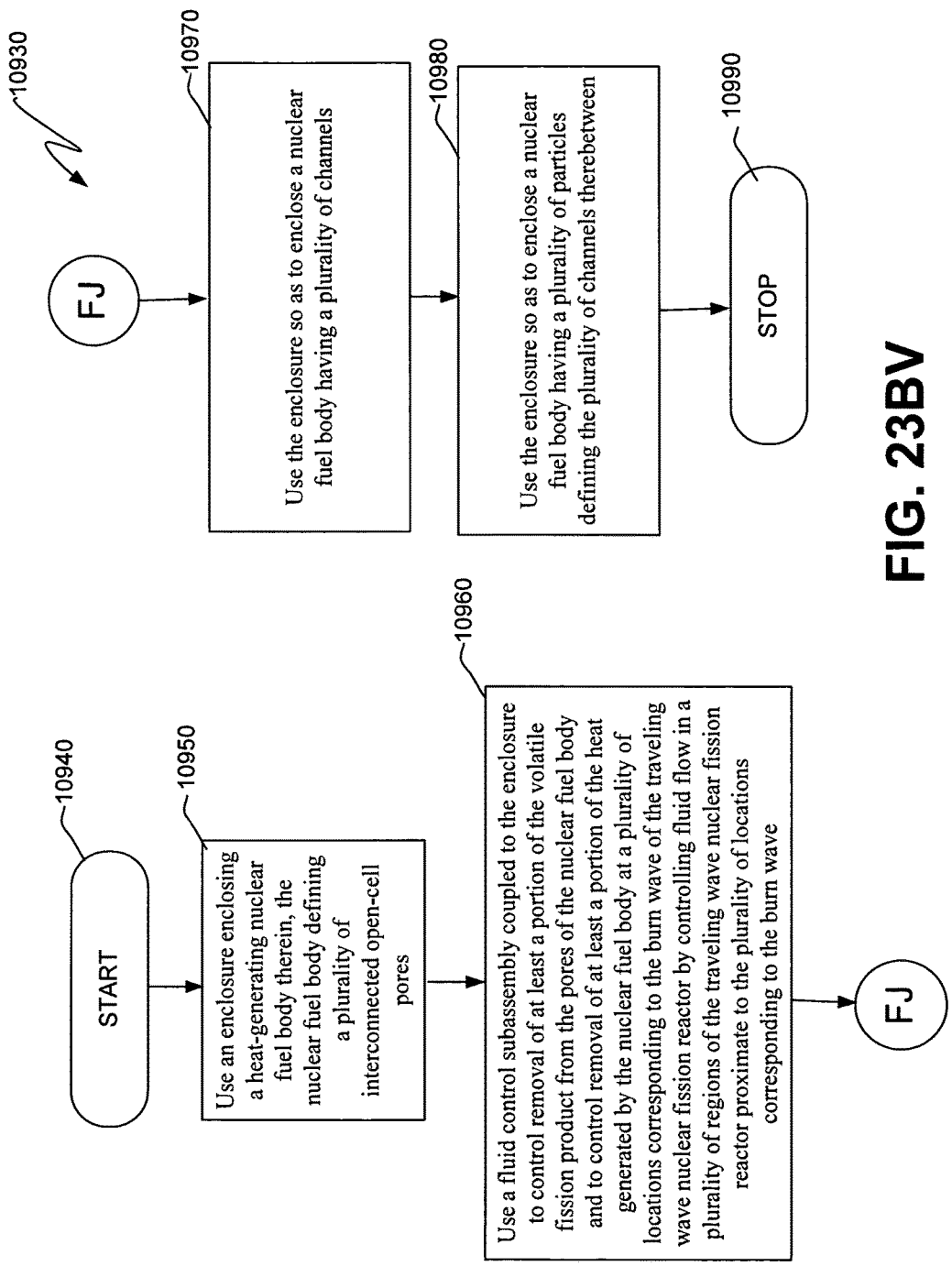
Figure 23B:
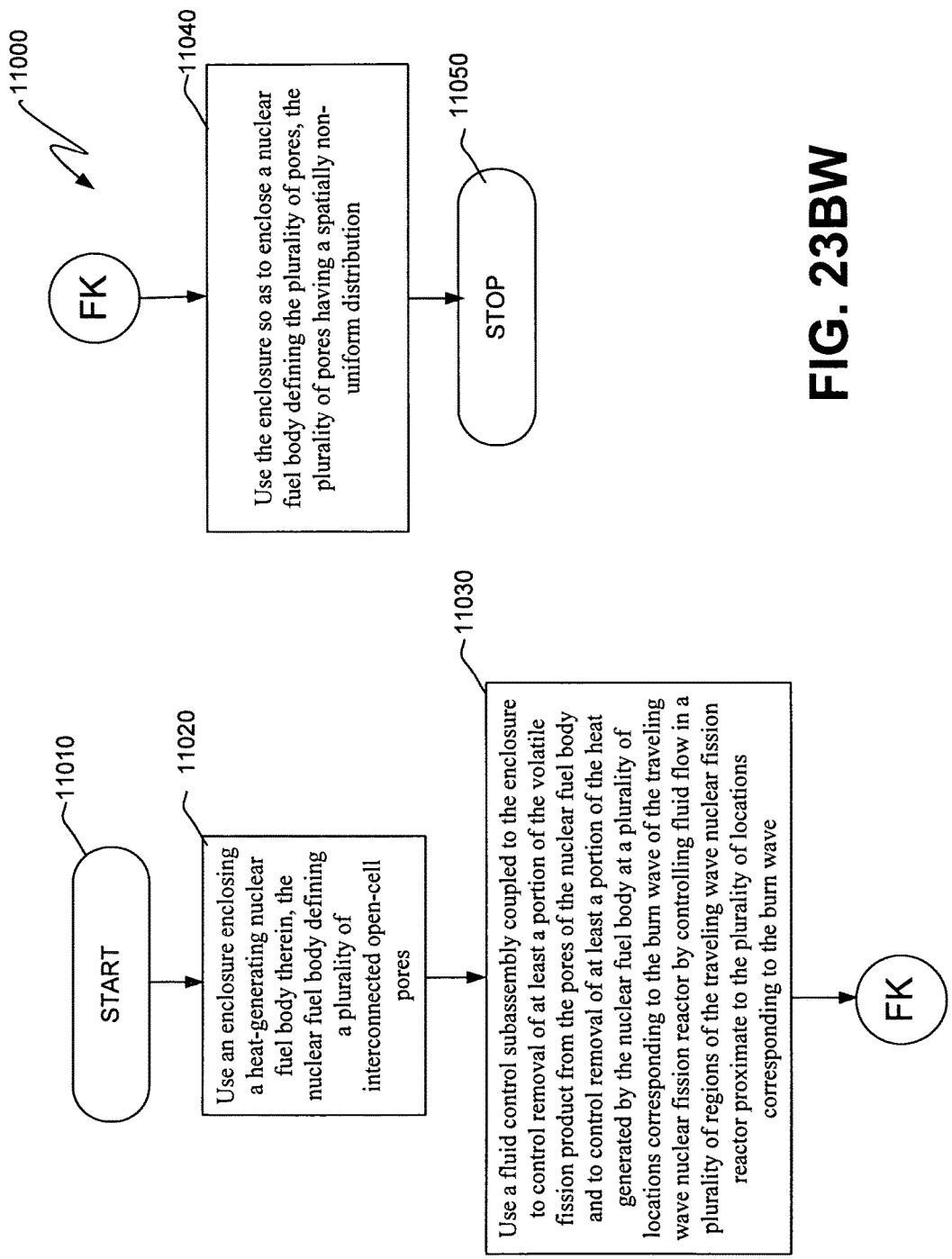
Figure 23B:
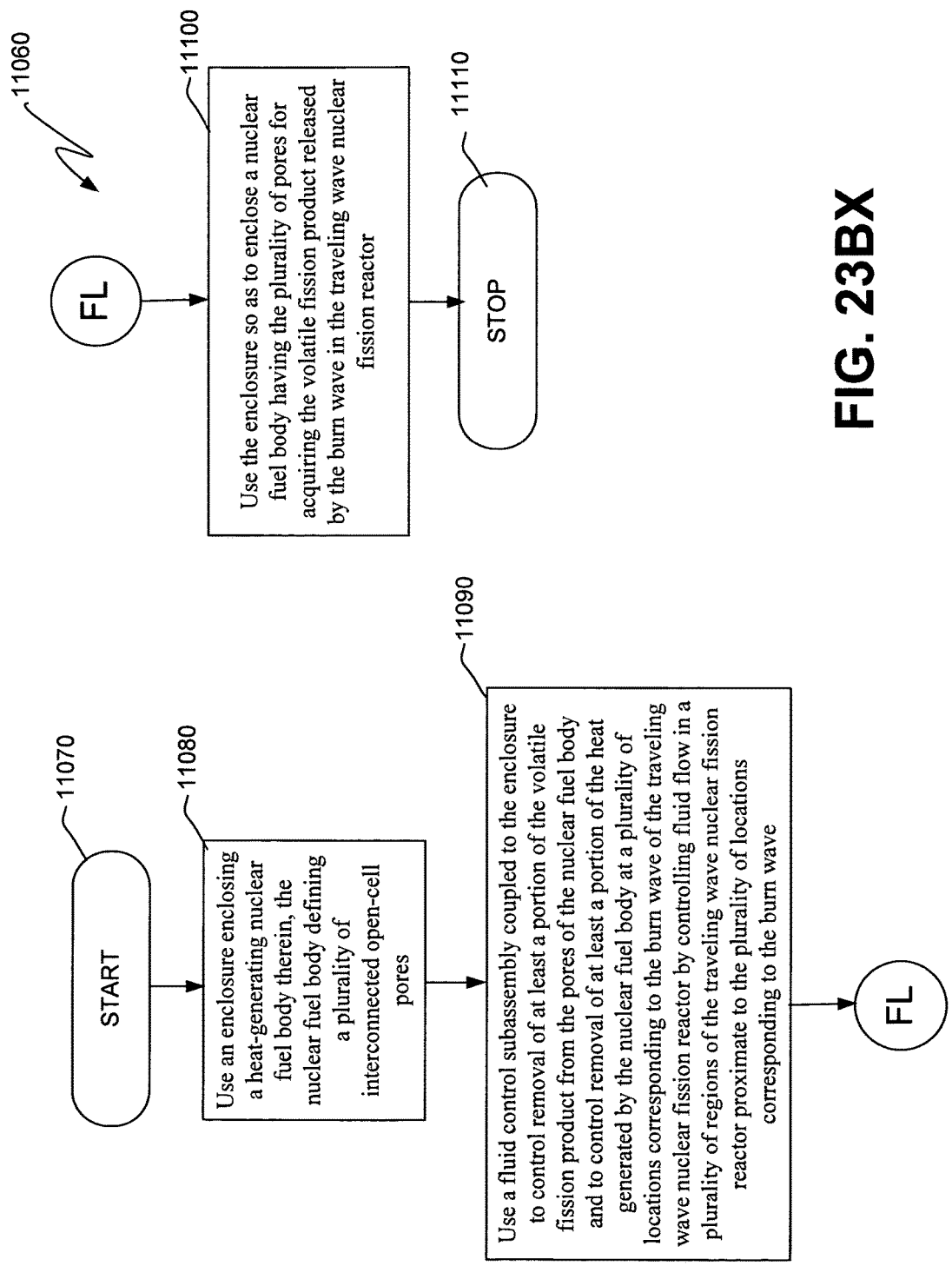
Figure 23B:
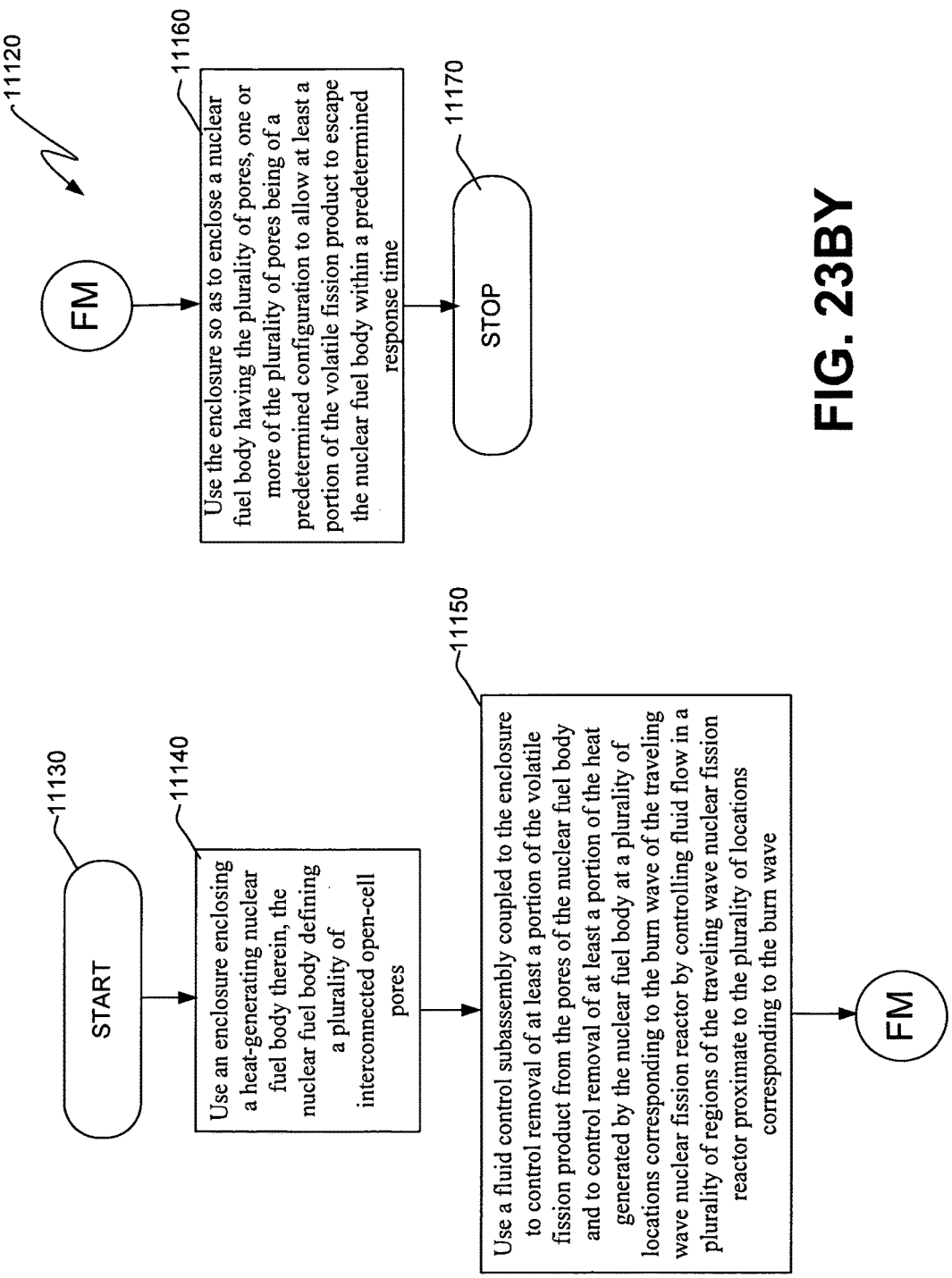
Figure 23C:
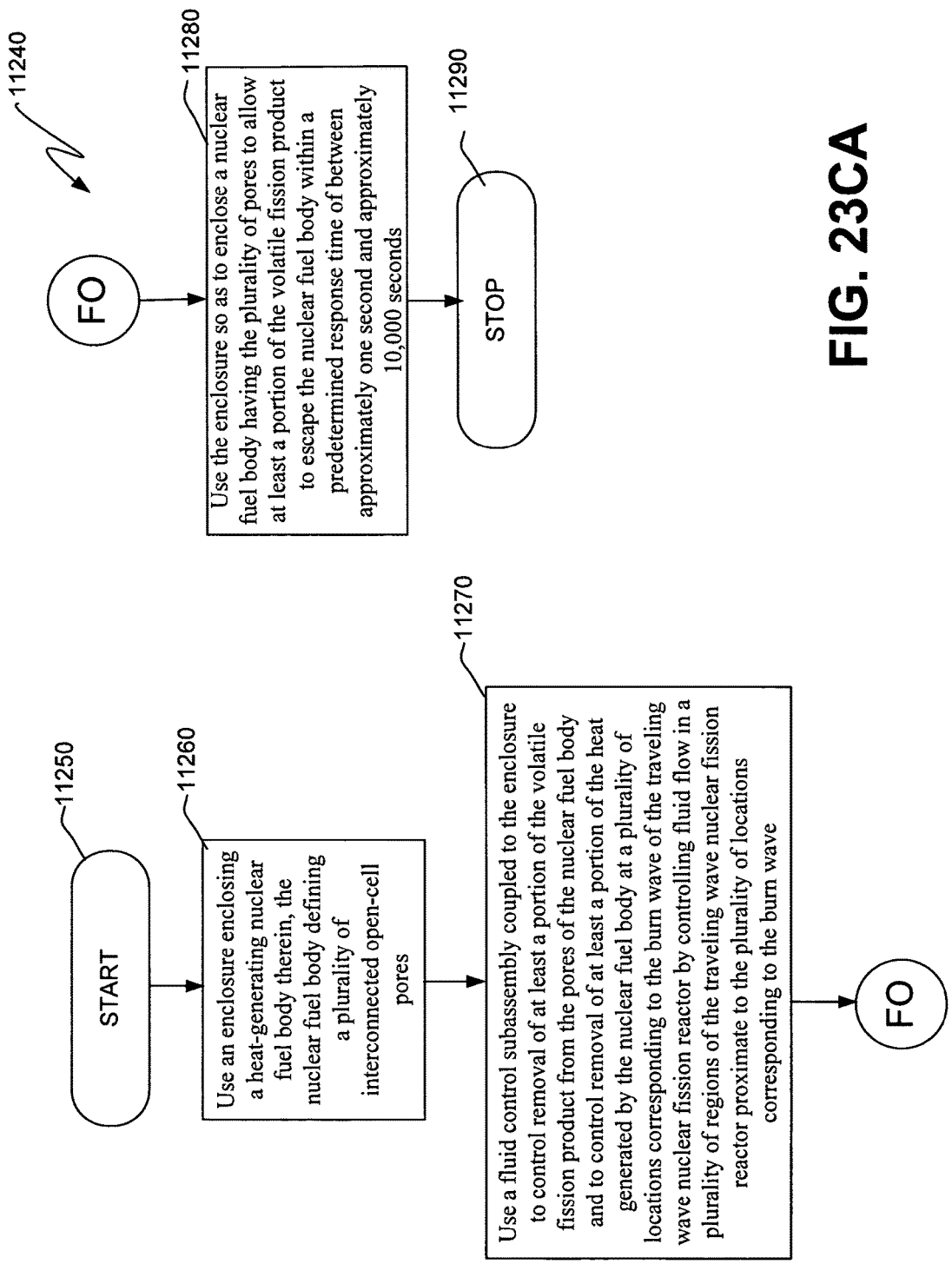
Figure 23C:
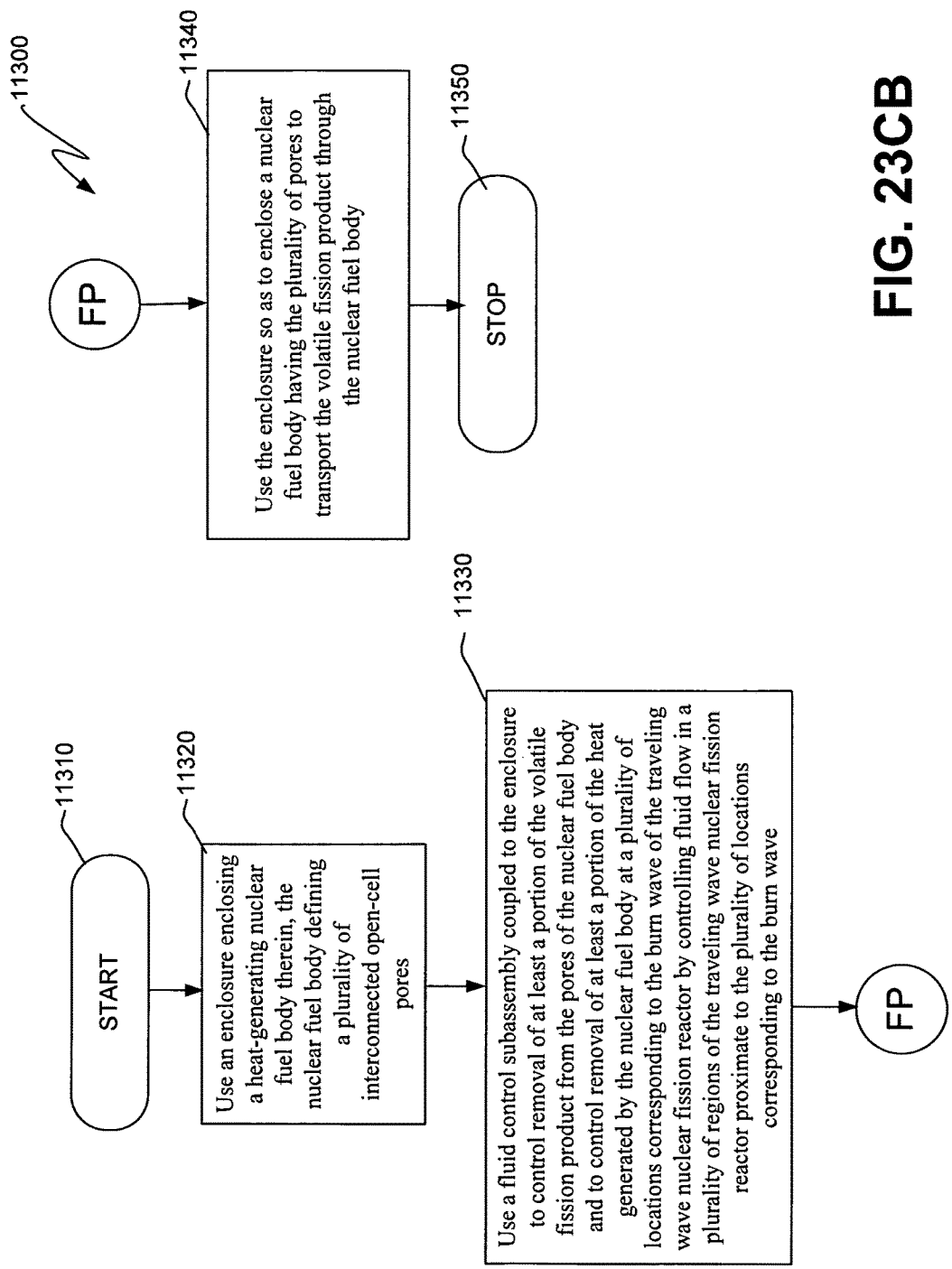
Figure 23C:
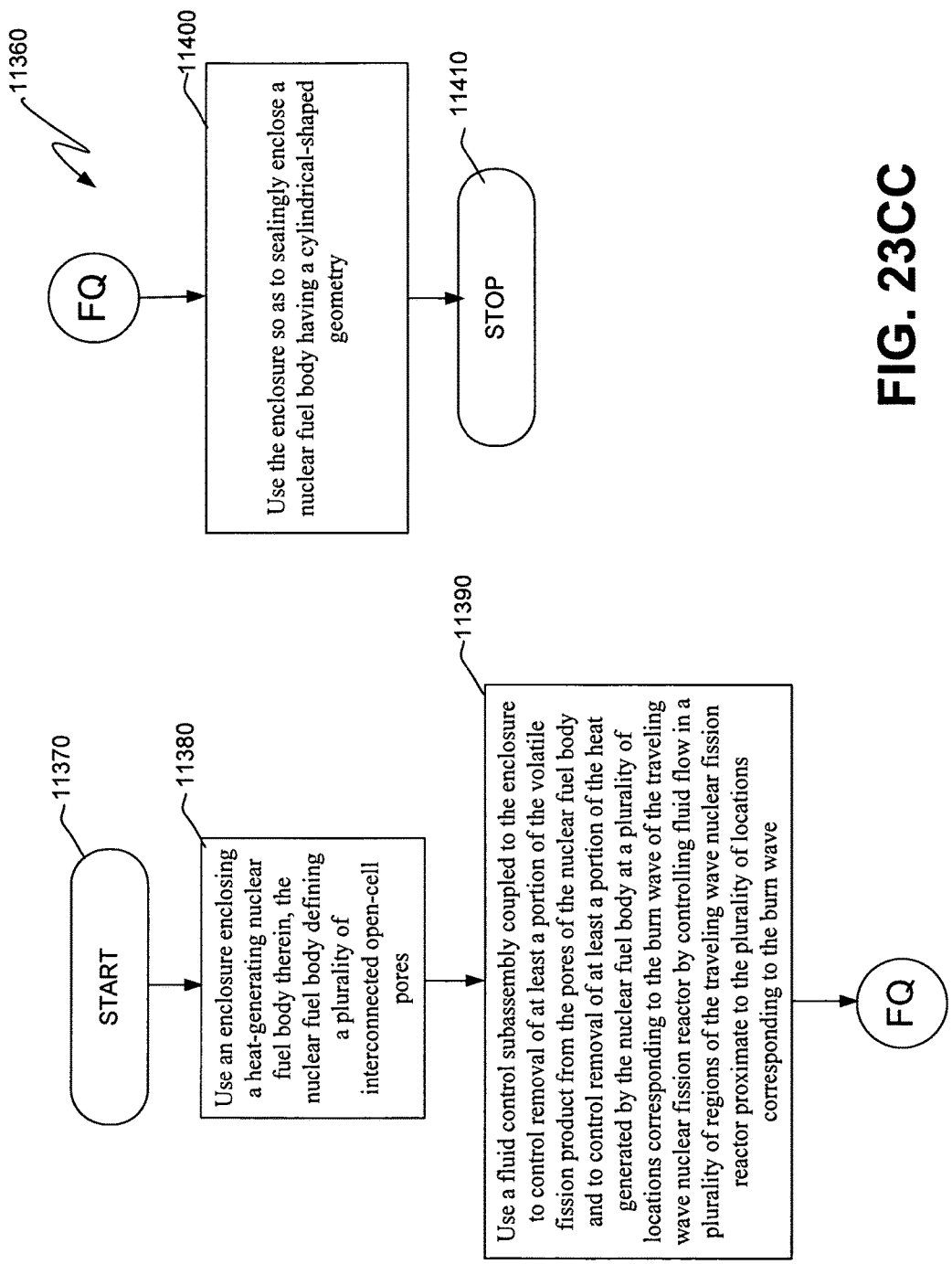
Figure 23C:
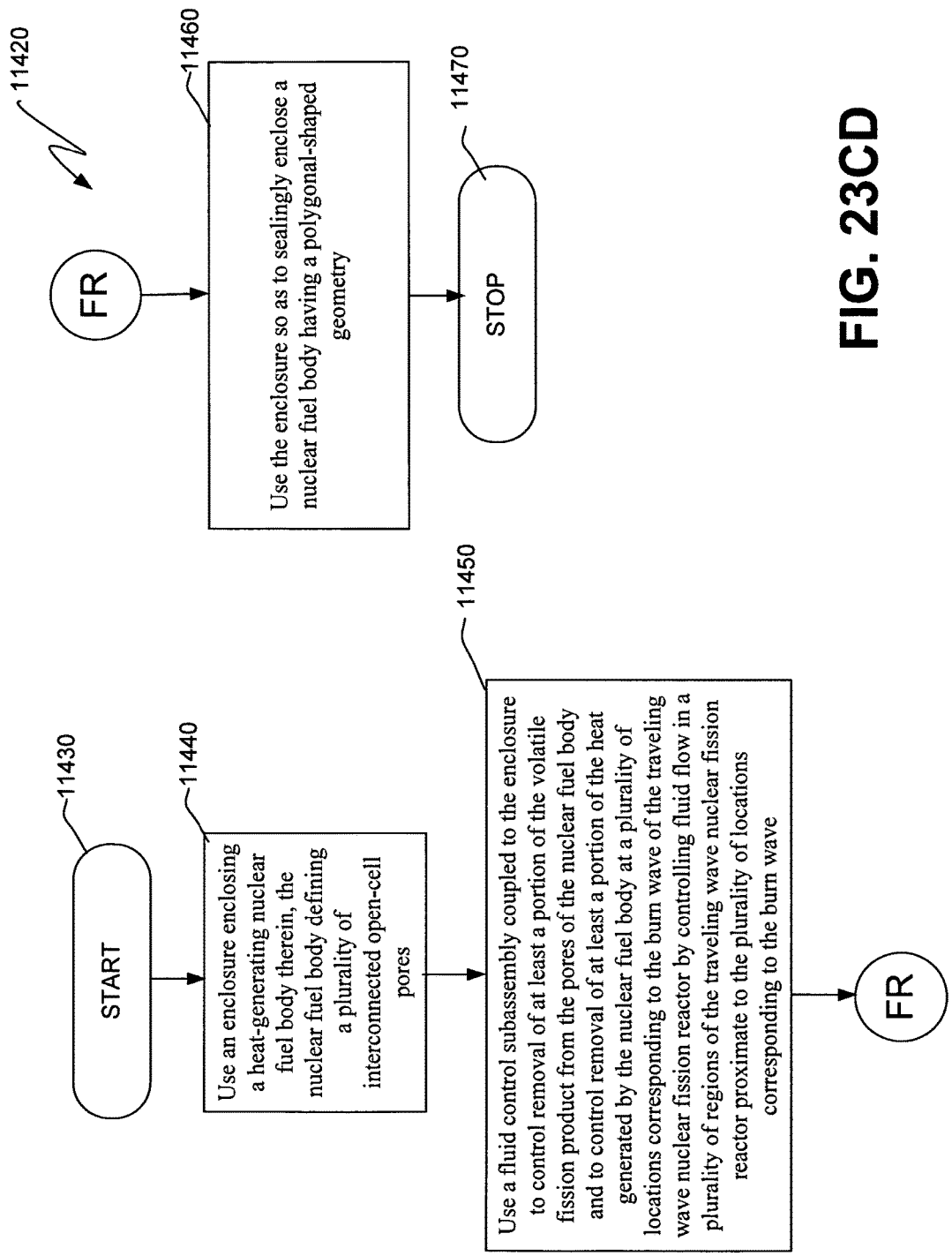
Figure 23C:
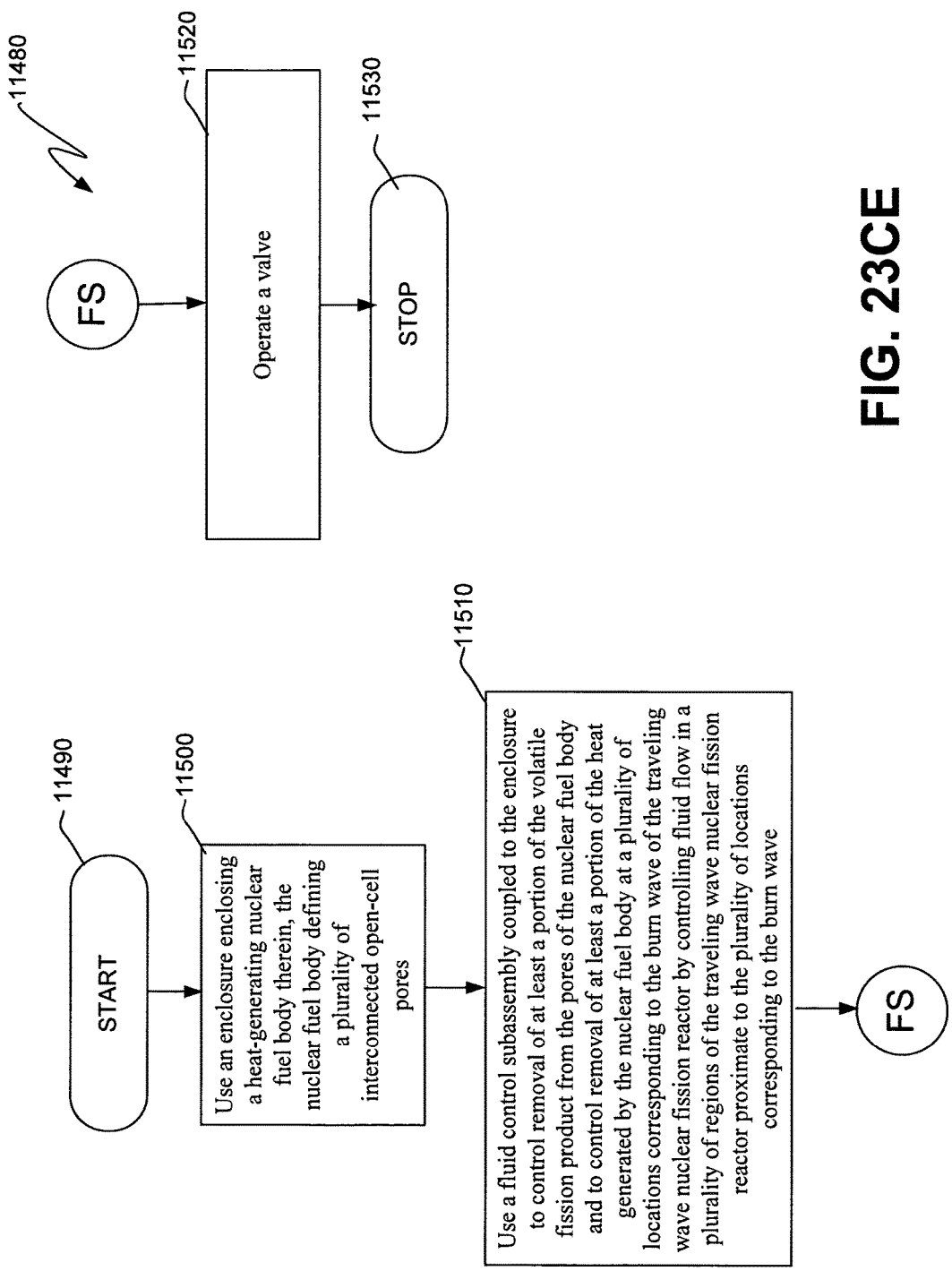
Figure 23C:
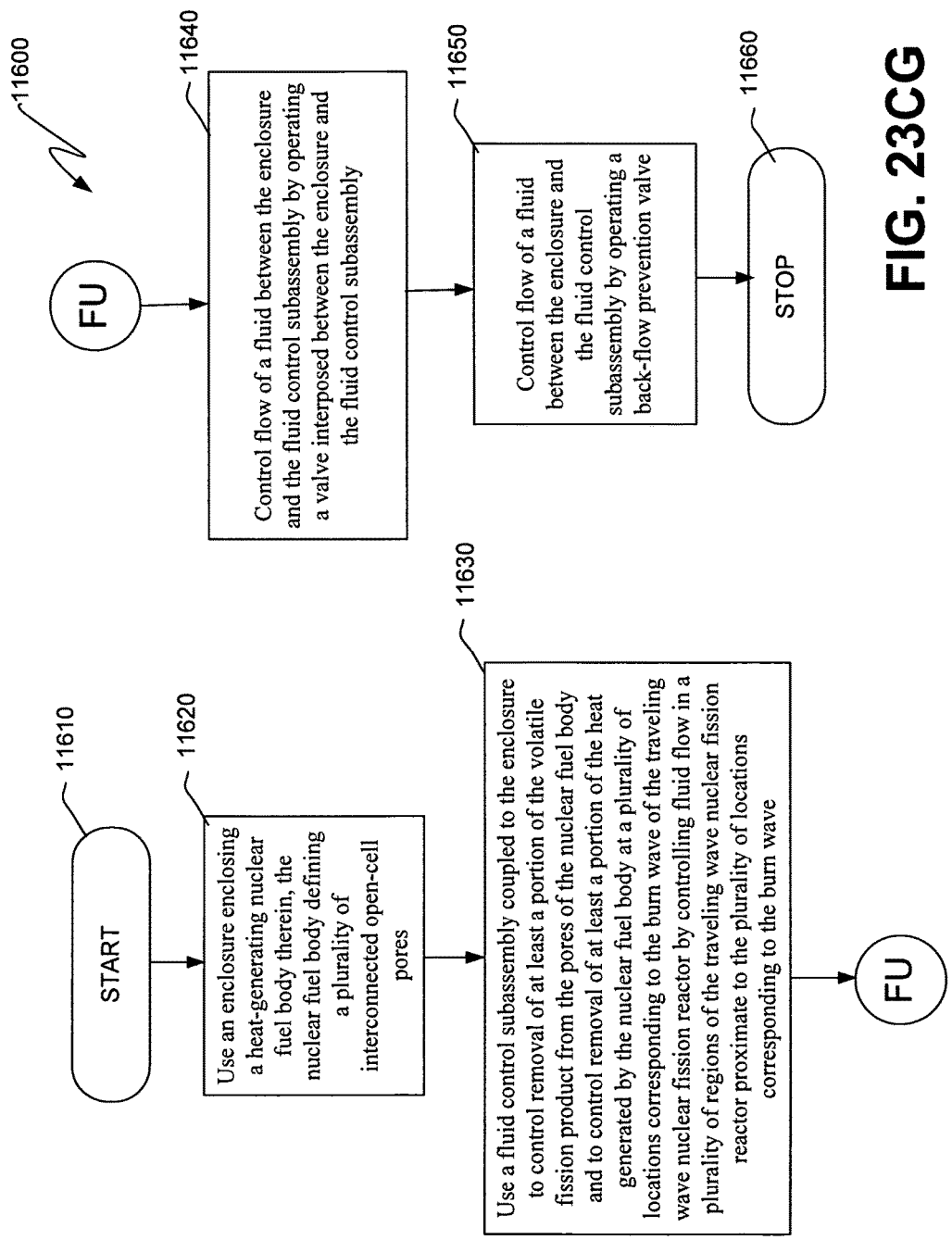
Figure 23C:
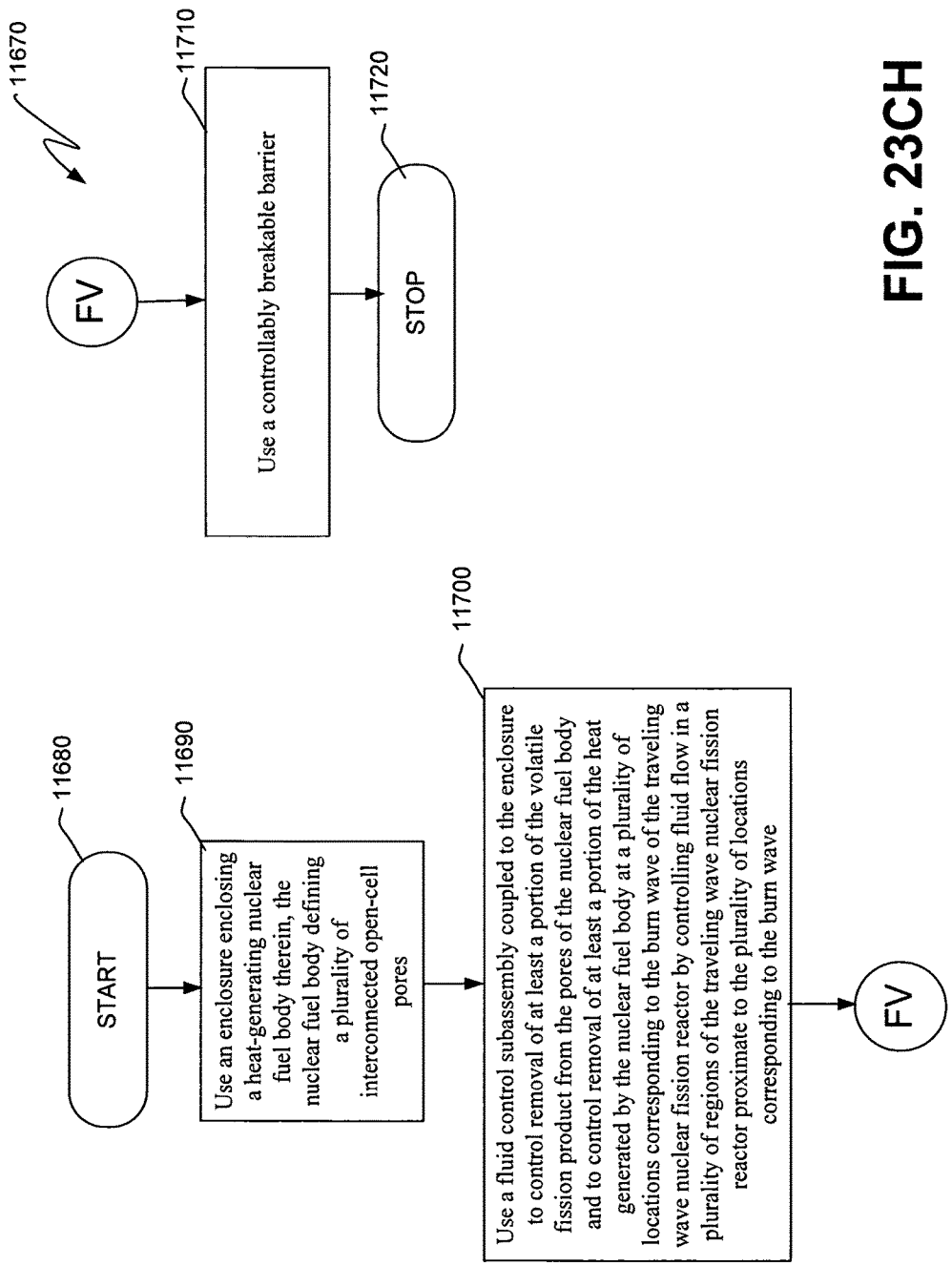
Figure 23C:
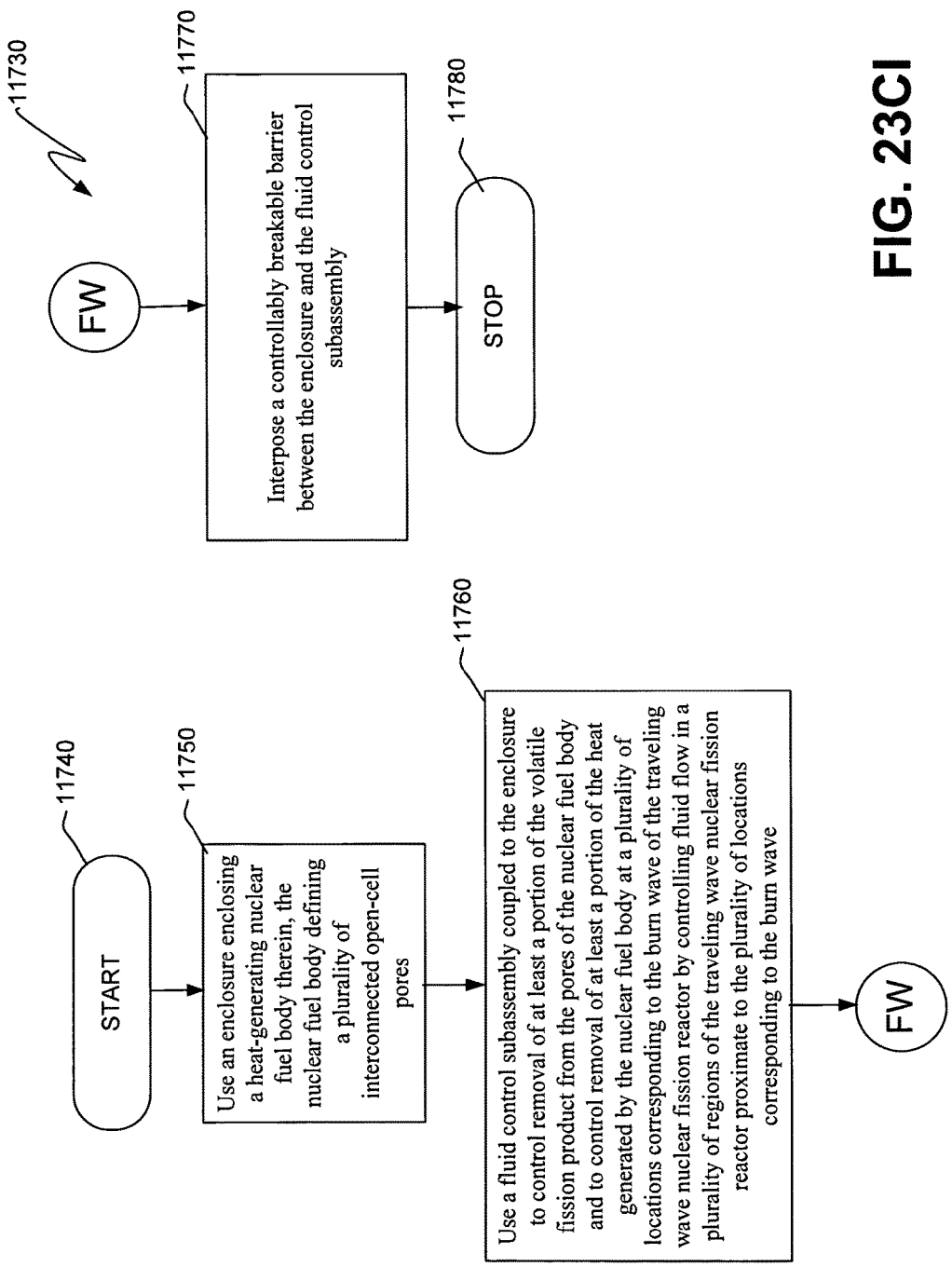
Figure 23C:
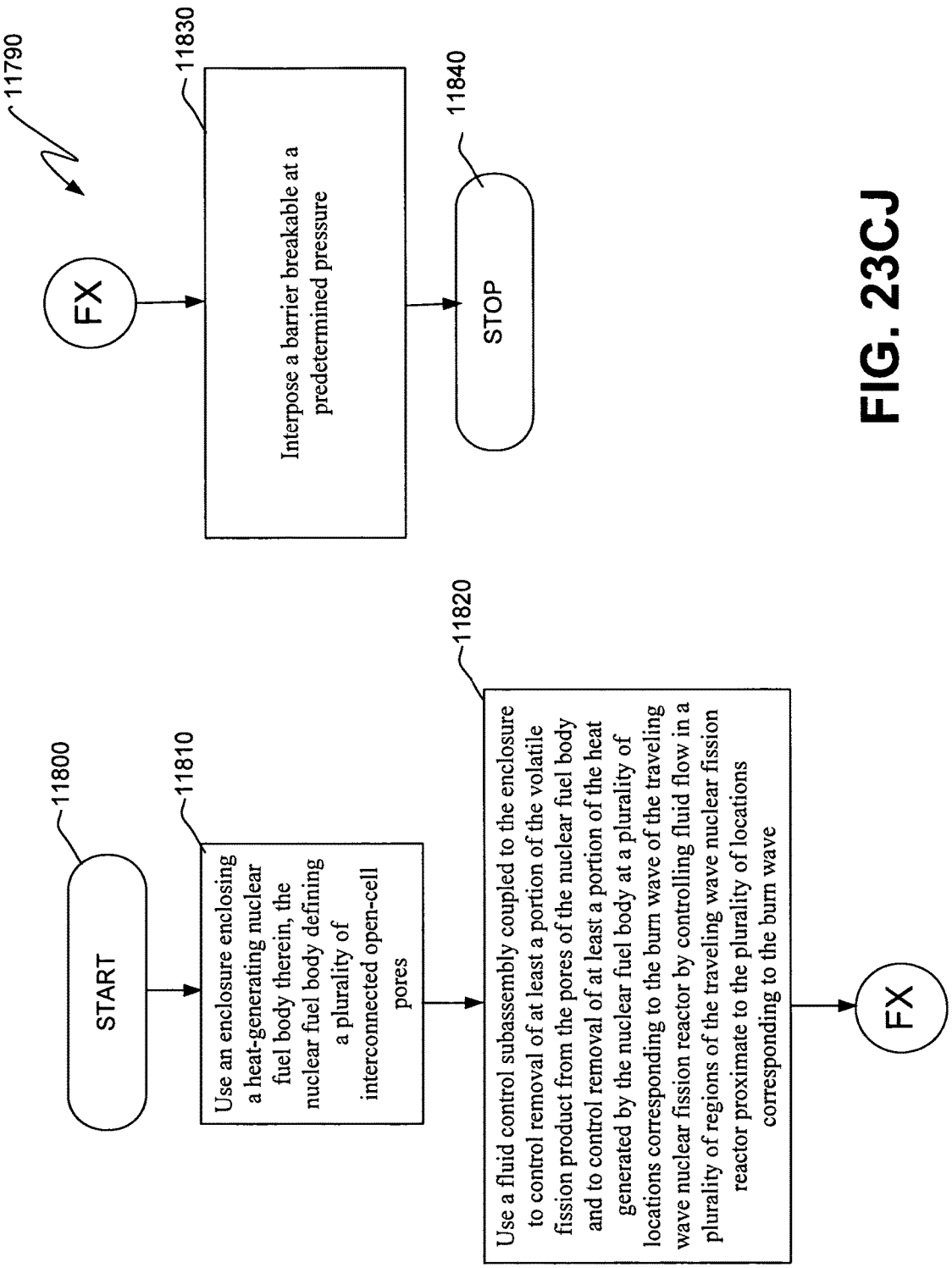
Figure 23C:
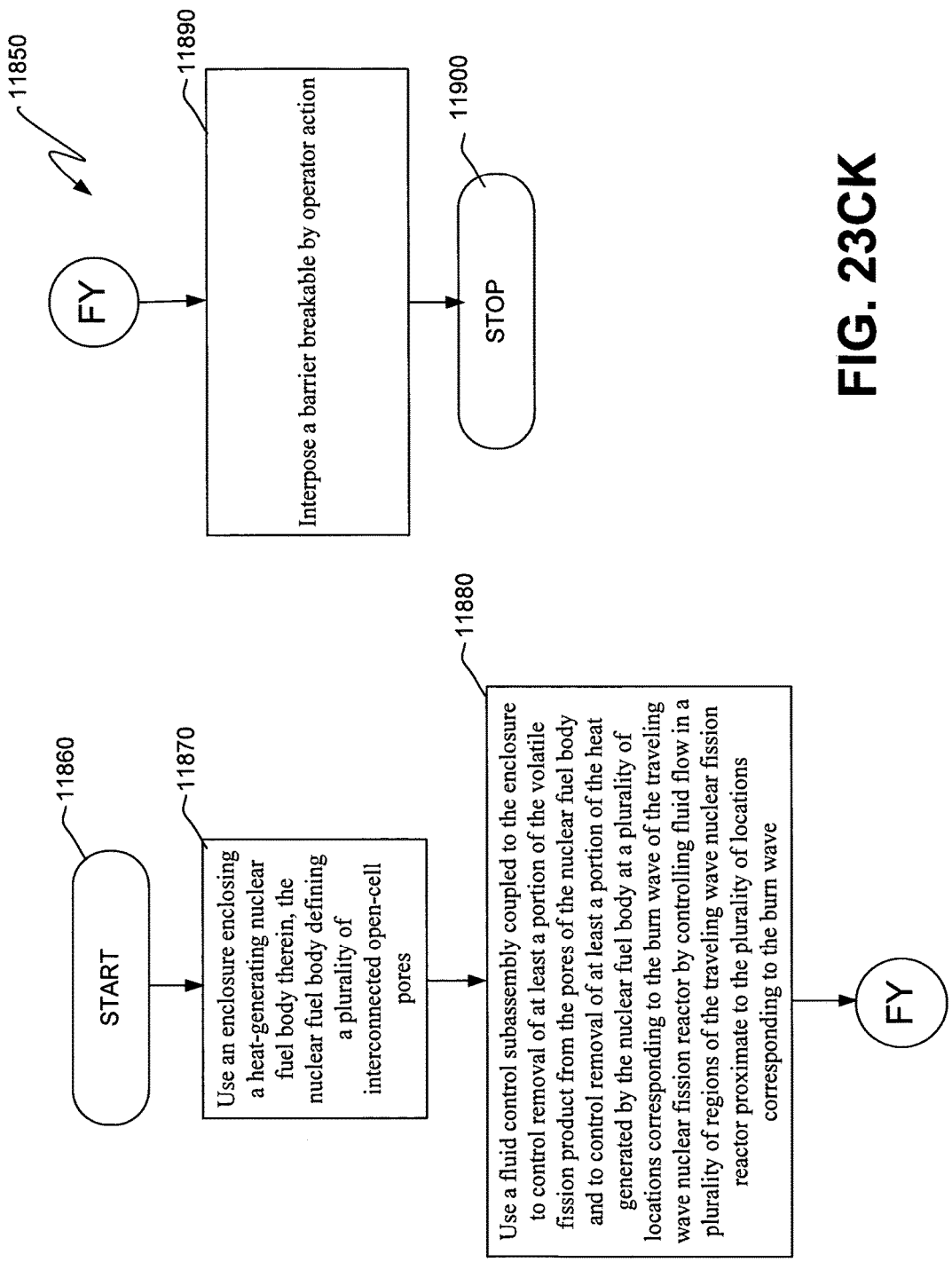

Referring to FIG. 23Z, an illustrative method 8010 for operating a nuclear fission reactor fuel assembly starts at a block 8020. At a block 8030, an enclosure is used that encloses a porous nuclear fuel body having the volatile fission product therein. At a block 8040, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 8050, the fluid control subassembly is used to circulate a fission product removal fluid through the porous nuclear fuel body, so that at least a portion of the volatile fission product is removed from the porous nuclear fuel body while the fluid control subassembly circulates the fission product removal fluid through the porous nuclear fuel body. At a block 8060, the fission product removal fluid is supplied to the porous nuclear fuel body by using an inlet subassembly. The method 8010 stops at a block 8070.

Referring to FIG. 23AA, an illustrative method 8080 for operating a nuclear fission reactor fuel assembly starts at a block 8090. At a block 8100, an enclosure is used that encloses a porous nuclear fuel body having the volatile fission product therein. At a block 8110, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 8120, the fluid control subassembly is used to circulate a fission product removal fluid through the porous nuclear fuel body, so that at least a portion of the volatile fission product is removed from the porous nuclear fuel body while the fluid control subassembly circulates the fission product removal fluid through the porous nuclear fuel body. At a block 8130, the fission product removal fluid is removed from the porous nuclear fuel body by using an outlet subassembly. The method 8080 stops at a block 8140.

Referring to FIG. 23AB, an illustrative method 8150 for operating a nuclear fission reactor fuel assembly starts at a block 8160. At a block 8170, an enclosure is used that encloses a porous nuclear fuel body having the volatile fission product therein. At a block 8180, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 8190, the fluid control subassembly is used to circulate a fission product removal fluid through the porous nuclear fuel body, so that at least a portion of the volatile fission product is removed from the porous nuclear fuel body while the fluid control subassembly circulates the fission product removal fluid through the porous nuclear fuel body. At a block 8200, the fission product removal fluid is received into a reservoir coupled to the fluid control subassembly. The method 8150 stops at a block 8210.

Referring to FIG. 23AC, an illustrative method 8220 for operating a nuclear fission reactor fuel assembly starts at a block 8230. At a block 8240, an enclosure is used that encloses a porous nuclear fuel body having the volatile fission product therein. At a block 8250, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 8260, the fluid control subassembly is used to circulate a fission product removal fluid through the porous nuclear fuel body, so that at least a portion of the volatile fission product is removed from the porous nuclear fuel body while the fluid control subassembly circulates the fission product removal fluid through the porous nuclear fuel body. At a block 8270, the fission product removal fluid is supplied from a reservoir coupled to the fluid control subassembly. The method 8220 stops at a block 8280.

Referring to FIG. 23AD, an illustrative method 8290 for operating a nuclear fission reactor fuel assembly starts at a block 8300. At a block 8310, an enclosure is used that encloses a porous nuclear fuel body having the volatile fission product therein. At a block 8320, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 8330, the fluid control subassembly is used so that the nuclear fission fuel assembly is configured to circulate a gas through the pores of the porous nuclear fuel body. The method 8290 stops at a block 8340.

Referring to FIG. 23AE, an illustrative method 8350 for operating a nuclear fission reactor fuel assembly starts at a block 8360. At a block 8370, an enclosure is used that encloses a porous nuclear fuel body having the volatile fission product therein. At a block 8380, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 8390, the fluid control subassembly is used so that the nuclear fission fuel assembly is configured to circulate a liquid through the porous nuclear fuel body. The method 8350 stops at a block 8400.

Referring to FIG. 23AF, an illustrative method 8410 for operating a nuclear fission reactor fuel assembly starts at a block 8420. At a block 8430, an enclosure is used that encloses a porous nuclear fuel body having the volatile fission product therein. At a block 8440, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 8450, the method comprises operating a pump. The method 8410 stops at a block 8460.

Referring to FIG. 23AG, an illustrative method 8470 for operating a nuclear fission reactor fuel assembly starts at a block 8480. At a block 8490, an enclosure is used that encloses a porous nuclear fuel body having the volatile fission product therein. At a block 8500, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 8510, a fluid is circulated between the fluid control subassembly and the porous nuclear fuel body by operating a pump integrally connected to the fluid control subassembly. The method 8470 stops at a block 8520.

Referring to FIG. 23AH, an illustrative method 8530 for operating a nuclear fission reactor fuel assembly starts at a block 8540. At a block 8550, an enclosure is used that encloses a porous nuclear fuel body having the volatile fission product therein. At a block 8560, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 8570, the method comprises operating a valve. The method 8530 stops at a block 8580.

Referring to FIG. 23AI, an illustrative method 8590 for operating a nuclear fission reactor fuel assembly starts at a block 8600. At a block 8610, an enclosure is used that encloses a porous nuclear fuel body having the volatile fission product therein. At a block 8620, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 8630, flow of a fluid is controlled between the enclosure and the fluid control subassembly by operating a valve interposed between the enclosure and the fluid control subassembly. The method 8590 stops at a block 8640.

Referring to FIG. 23AJ, an illustrative method 8650 for operating a nuclear fission reactor fuel assembly starts at a block 8660. At a block 8670, an enclosure is used that encloses a porous nuclear fuel body having the volatile fission product therein. At a block 8680, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 8690, flow of a fluid is controlled between the enclosure and the fluid control subassembly by operating a valve interposed between the enclosure and the fluid control subassembly. At a block 8700, flow of a fluid is controlled between the enclosure and the fluid control subassembly by operating a back-flow prevention valve. The method 8650 stops at a block 8710.

Referring to FIG. 23AK, an illustrative method 8720 for operating a nuclear fission reactor fuel assembly starts at a block 8730. At a block 8740, an enclosure is used that encloses a porous nuclear fuel body having the volatile fission product therein. At a block 8750, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 8760, the method comprises operating a controllably breakable barrier. The method 8720 stops at a block 8770.

Referring to FIG. 23AL, an illustrative method 8780 for operating a nuclear fission reactor fuel assembly starts at a block 8790. At a block 8800, an enclosure is used that encloses a porous nuclear fuel body having the volatile fission product therein. At a block 8810, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 8820, a controllably breakable barrier interposed between the enclosure and the fluid control subassembly is used. The method 8780 stops at a block 8830.

Referring to FIG. 23AM, an illustrative method 8840 for operating a nuclear fission reactor fuel assembly starts at a block 8850. At a block 8860, an enclosure is used that encloses a porous nuclear fuel body having the volatile fission product therein. At a block 8870, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 8880, a controllably breakable barrier interposed between the enclosure and the fluid control subassembly is used. At a block 8890, a barrier breakable at a predetermined pressure is used. The method 8840 stops at a block 8900.

Referring to FIG. 23AN, an illustrative method 8910 for operating a nuclear fission reactor fuel assembly starts at a block 8920. At a block 8930, an enclosure is used that encloses a porous nuclear fuel body having the volatile fission product therein. At a block 8940, a fluid control subassembly coupled to the enclosure is used to control removal of at least a portion of the volatile fission product from the porous nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 8950, a controllably breakable barrier interposed between the enclosure and the fluid control subassembly is used. At a block 8960, a barrier breakable by operator action is used. The method 8910 stops at a block 8970.

Referring to FIG. 23AO, an illustrative method 8980 for operating a nuclear fission reactor fuel assembly starts at a block 8990. At a block 9000, an enclosure is used that encloses a heat-generating nuclear fuel body therein, the nuclear fuel body defining a plurality of interconnected open-cell pores. At a block 9010, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. The method 8980 stops at a block 9020.

Referring to FIG. 23AP, an illustrative method 9030 for operating a nuclear fission reactor fuel assembly starts at a block 9040. At a block 9050, an enclosure is used that encloses a heat-generating nuclear fuel body therein, the nuclear fuel body defining a plurality of interconnected open-cell pores. At a block 9060, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 9070, operation of the fluid control subassembly is controlled by operating a control unit coupled to the fluid control subassembly. The method 9030 stops at a block 9080.

Referring to FIG. 23AQ, an illustrative method 9090 for operating a nuclear fission reactor fuel assembly starts at a block 9100. At a block 9110, an enclosure is used that encloses a heat-generating nuclear fuel body therein, the nuclear fuel body defining a plurality of interconnected open-cell pores. At a block 9120, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 9130, the enclosure is used so as to enclose the nuclear fuel body. The method 9090 stops at a block 9140.

Referring to FIG. 23AR, an illustrative method 9150 for operating a nuclear fission reactor fuel assembly starts at a block 9160. At a block 9170, an enclosure is used that encloses a heat-generating nuclear fuel body therein, the nuclear fuel body defining a plurality of interconnected open-cell pores. At a block 9180, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 9190, the enclosure is used so as to enclose a fissile material forming the nuclear fuel body. The method 9150 stops at a block 9200.

Referring to FIG. 23AS, an illustrative method 9210 for operating a nuclear fission reactor fuel assembly starts at a block 9220. At a block 9230, an enclosure is used that encloses a heat-generating nuclear fuel body therein, the nuclear fuel body defining a plurality of interconnected open-cell pores. At a block 9240, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 9250, the enclosure is used so as to enclose a fertile material forming the nuclear fuel body. The method 9210 stops at a block 9260.

Referring to FIG. 23AT, an illustrative method 9270 for operating a nuclear fission reactor fuel assembly starts at a block 9280. At a block 9290, an enclosure is used that encloses a heat-generating nuclear fuel body therein, the nuclear fuel body defining a plurality of interconnected open-cell pores. At a block 9300, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 9310, the enclosure is used so as to enclose a mixture of fissile and fertile material forming the nuclear fuel body. The method 9270 stops at a block 9320.

Referring to FIG. 23AU, an illustrative method 9330 for operating a nuclear fission reactor fuel assembly starts at a block 9340. At a block 9350, an enclosure is used that encloses a heat-generating nuclear fuel body therein, the nuclear fuel body defining a plurality of interconnected open-cell pores. At a block 9360, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 9370, the fluid control subassembly is used so as to permit a controlled release of the volatile fission product in response to a position of the burn wave in the traveling wave nuclear fission reactor. The method 9330 stops at a block 9380.

Referring to FIG. 23AV, an illustrative method 9390 for operating a nuclear fission reactor fuel assembly starts at a block 9400. At a block 9410, an enclosure is used that encloses a heat-generating nuclear fuel body therein, the nuclear fuel body defining a plurality of interconnected open-cell pores. At a block 9420, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 9430, the fluid control subassembly is used so as to permit a controlled release of the volatile fission product in response to a power level in the traveling wave nuclear fission reactor. The method 9390 stops at a block 9440.

Referring to FIG. 23AW, an illustrative method 9450 for operating a nuclear fission reactor fuel assembly starts at a block 9460. At a block 9470, an enclosure is used that encloses a heat-generating nuclear fuel body therein, the nuclear fuel body defining a plurality of interconnected open-cell pores. At a block 9480, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 9490, the fluid control subassembly is used so as to permit a controlled release of the volatile fission product in response to a neutron population level in the traveling wave nuclear fission reactor. The method 9450 stops at a block 9500.

Referring to FIG. 23AX, an illustrative method 9510 for operating a nuclear fission reactor fuel assembly starts at a block 9520. At a block 9530, an enclosure is used that encloses a heat-generating nuclear fuel body therein, the nuclear fuel body defining a plurality of interconnected open-cell pores. At a block 9540, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 9550, the fluid control subassembly is used so as to permit a controlled release of the volatile fission product in response to a volatile fission product pressure level in the traveling wave nuclear fission reactor. The method 9510 stops at a block 9560.

Referring to FIG. 23AY, an illustrative method 9570 for operating a nuclear fission reactor fuel assembly starts at a block 9580. At a block 9590, an enclosure is used that encloses a heat-generating nuclear fuel body therein, the nuclear fuel body defining a plurality of interconnected open-cell pores. At a block 9600, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 9610, the fluid control subassembly is used so as to permit a controlled release of the volatile fission product in response to a time schedule associated with the traveling wave nuclear fission reactor. The method 9570 stops at a block 9620.

Referring to FIG. 23AZ, an illustrative method 9630 for operating a nuclear fission reactor fuel assembly starts at a block 9640. At a block 9650, an enclosure is used that encloses a heat-generating nuclear fuel body therein, the nuclear fuel body defining a plurality of interconnected open-cell pores. At a block 9660, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 9670, the fluid control subassembly is used so as to permit a controlled release of the volatile fission product in response to an amount of time the traveling wave nuclear fission reactor is operated. The method 9630 stops at a block 9680.

Referring to FIG. 23BA, an illustrative method 9690 for operating a nuclear fission reactor fuel assembly starts at a block 9700. At a block 9710, an enclosure is used that encloses a heat-generating nuclear fuel body therein, the nuclear fuel body defining a plurality of interconnected open-cell pores. At a block 9720, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 9730, the volatile fission product is received into a reservoir coupled to the fluid control subassembly. The method 9690 stops at a block 9740.

Referring to FIG. 23BB, an illustrative method 9750 for operating a nuclear fission reactor fuel assembly starts at a block 9760. At a block 9770, an enclosure is used that encloses a heat-generating nuclear fuel body therein, the nuclear fuel body defining a plurality of interconnected open-cell pores. At a block 9780, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 9790, the fluid control subassembly is used to circulate a fission product removal fluid through the pores of the nuclear fuel body, so that at least a portion of the volatile fission product is removed from the pores of the nuclear fuel body while the fluid control subassembly circulates the fission product removal fluid through the pores of the nuclear fuel body. The method 9750 stops at a block 9800.

Referring to FIG. 23BC, an illustrative method 9810 for operating a nuclear fission reactor fuel assembly starts at a block 9820. At a block 9830, an enclosure is used that encloses a heat-generating nuclear fuel body therein, the nuclear fuel body defining a plurality of interconnected open-cell pores. At a block 9840, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 9850, the fluid control subassembly is used so that the nuclear fission fuel assembly is configured to circulate a fission product removal fluid comprises supplying the fission product removal fluid to the pores of the nuclear fuel body using an inlet subassembly. The method 9810 stops at a block 9860.

Referring to FIG. 23BD, an illustrative method 9870 for operating a nuclear fission reactor fuel assembly starts at a block 9880. At a block 9890, an enclosure is used that encloses a heat-generating nuclear fuel body therein, the nuclear fuel body defining a plurality of interconnected open-cell pores. At a block 9900, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 9910, the fluid control subassembly is used so that the nuclear fission fuel assembly is configured to circulate a fission product removal fluid comprises removing the fission product removal fluid from the pores of the nuclear fuel body using an outlet subassembly. The method 9870 stops at a block 9920.

Referring to FIG. 23BE, an illustrative method 9930 for operating a nuclear fission reactor fuel assembly starts at a block 9940. At a block 9950, an enclosure is used that encloses a heat-generating nuclear fuel body therein, the nuclear fuel body defining a plurality of interconnected open-cell pores. At a block 9960, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 9970, the fluid control subassembly is used so that the nuclear fission fuel assembly is configured to circulate a heat removal fluid through the pores of the nuclear fuel body, so that at least a portion of the heat generated by the nuclear fuel body is removed from the nuclear fuel body while the fluid control subassembly circulates the heat removal fluid through the pores of the nuclear fuel body. The method 9930 stops at a block 9980.

Referring to FIG. 23BF, an illustrative method 9990 for operating a nuclear fission reactor fuel assembly starts at a block 10000. At a block 10010, an enclosure is used that encloses a heat-generating nuclear fuel body therein, the nuclear fuel body defining a plurality of interconnected open-cell pores. At a block 10020, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 10030, the fluid control subassembly is used so that the nuclear fission fuel assembly is configured to circulate a heat removal fluid through the pores of the nuclear fuel body, so that at least a portion of the heat generated by the nuclear fuel body is removed from the nuclear fuel body while the fluid control subassembly circulates the heat removal fluid through the pores of the nuclear fuel body. At a block 10040, the heat removal fluid is received into a reservoir coupled to the fluid control subassembly. The method 9990 stops at a block 10050.

Referring to FIG. 23BG, an illustrative method 10060 for operating a nuclear fission reactor fuel assembly starts at a block 10070. At a block 10080, an enclosure is used that encloses a heat-generating nuclear fuel body therein, the nuclear fuel body defining a plurality of interconnected open-cell pores. At a block 10090, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 10100, the fluid control subassembly is used so that the nuclear fission fuel assembly is configured to circulate a heat removal fluid through the pores of the nuclear fuel body, so that at least a portion of the heat generated by the nuclear fuel body is removed from the nuclear fuel body while the fluid control subassembly circulates the heat removal fluid through the pores of the nuclear fuel body. At a block 10110, the heat removal fluid is supplied from a reservoir coupled to the fluid control subassembly. The method 10060 stops at a block 10120.

Referring to FIG. 23BH, an illustrative method 10130 for operating a nuclear fission reactor fuel assembly starts at a block 10140. At a block 10150, an enclosure is used that encloses a heat-generating nuclear fuel body therein, the nuclear fuel body defining a plurality of interconnected open-cell pores. At a block 10160, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 10170, the fluid control subassembly is used so that the nuclear fission fuel assembly is configured to circulate a heat removal fluid through the pores of the nuclear fuel body, so that at least a portion of the heat generated by the nuclear fuel body is removed from the nuclear fuel body while the fluid control subassembly circulates the heat removal fluid through the pores of the nuclear fuel body. At a block 10180, heat is removed from the heat removal fluid by using a heat sink coupled to the fluid control subassembly, so that the heat sink is in heat transfer communication with the heat removal fluid. The method 10130 stops at a block 10190.

Referring to FIG. 23BI, an illustrative method 10200 for operating a nuclear fission reactor fuel assembly starts at a block 10210. At a block 10220, an enclosure is used that encloses a heat-generating nuclear fuel body therein, the nuclear fuel body defining a plurality of interconnected open-cell pores. At a block 10230, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 10240, the fluid control subassembly is used so that the nuclear fission fuel assembly is configured to circulate a heat removal fluid through the pores of the nuclear fuel body, so that at least a portion of the heat generated by the nuclear fuel body is removed from the nuclear fuel body while the fluid control subassembly circulates the heat removal fluid through the pores of the nuclear fuel body. At a block 10250, heat is removed from the heat removal fluid by using a heat exchanger coupled to the fluid control subassembly, so that the heat exchanger is in heat transfer communication with the heat removal fluid. The method 10200 stops at a block 10260.

Referring to FIG. 23BJ, an illustrative method 10270 for operating a nuclear fission reactor fuel assembly starts at a block 10280. At a block 10290, an enclosure is used that encloses a heat-generating nuclear fuel body therein, the nuclear fuel body defining a plurality of interconnected open-cell pores. At a block 10300, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 10310, the fluid control subassembly is used to simultaneously circulate a fission product removal fluid and a heat removal fluid. The method 10270 stops at a block 10311.

Referring to FIG. 23BK, an illustrative method 10312 for operating a nuclear fission reactor fuel assembly starts at a block 10313. At a block 10314, an enclosure is used that encloses a heat-generating nuclear fuel body therein, the nuclear fuel body defining a plurality of interconnected open-cell pores. At a block 10315, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 10316, the fluid control subassembly is used to sequentially circulate a fission product removal fluid and a heat removal fluid. The method 10312 stops at a block 10317.

Referring to FIG. 23BL, an illustrative method 10318 for operating a nuclear fission reactor fuel assembly starts at a block 10319. At a block 10320, an enclosure is used that encloses a heat-generating nuclear fuel body therein, the nuclear fuel body defining a plurality of interconnected open-cell pores. At a block 10330, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 10340, the method comprises operating a pump. The method 10318 stops at a block 10350.

Referring to FIG. 23BM, an illustrative method 10360 for operating a nuclear fission reactor fuel assembly starts at a block 10370. At a block 10380, an enclosure is used that encloses a heat-generating nuclear fuel body therein, the nuclear fuel body defining a plurality of interconnected open-cell pores. At a block 10390, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 10400, a fluid is pumped between the fluid control subassembly and the pores of the nuclear fuel body by operating a pump integrally connected to the fluid control subassembly. The method 10360 stops at a block 10410.

Referring to FIG. 23BN, an illustrative method 10420 for operating a nuclear fission reactor fuel assembly starts at a block 10430. At a block 10440, an enclosure is used that encloses a heat-generating nuclear fuel body therein, the nuclear fuel body defining a plurality of interconnected open-cell pores. At a block 10450, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 10460, a plurality of first components coupled to the fluid control subassembly are used to supply a fission product removal fluid to the fluid control subassembly, so as to enable the fluid control subassembly to circulate the fission product removal fluid through the pores of the nuclear fuel body, whereby at least a portion of the volatile fission product is acquired by the pores of the nuclear fuel body and is removed from the pores of the nuclear fuel body while said fluid control subassembly circulates the fission product removal fluid through the pores of the nuclear fuel body. The method 10420 stops at a block 10470.

Referring to FIG. 23BO, an illustrative method 10480 for operating a nuclear fission reactor fuel assembly starts at a block 10490. At a block 10500, an enclosure is used that encloses a heat-generating nuclear fuel body therein, the nuclear fuel body defining a plurality of interconnected open-cell pores. At a block 10510, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 10520, a plurality of first components coupled to the fluid control subassembly are used to supply a fission product removal fluid to the fluid control subassembly, so as to enable the fluid control subassembly to circulate the fission product removal fluid through the pores of the nuclear fuel body, whereby at least a portion of the volatile fission product is acquired by the pores of the nuclear fuel body and is removed from the pores of the nuclear fuel body while said fluid control subassembly circulates the fission product removal fluid through the pores of the nuclear fuel body. At a block 10530, a plurality of second components coupled to the fluid control subassembly are used to supply a heat removal fluid to the fluid control subassembly, so as to enable the fluid control subassembly to circulate a heat removal fluid through the pores of the nuclear fuel body, whereby at least a portion of the heat generated by the nuclear fuel body is removed from the nuclear fuel body while the fluid control subassembly circulates the heat removal fluid through the pores of the nuclear fuel body. The method 10480 stops at a block 10540.

Referring to FIG. 23BP, an illustrative method 10550 for operating a nuclear fission reactor fuel assembly starts at a block 10560. At a block 10570, an enclosure is used that encloses a heat-generating nuclear fuel body therein, the nuclear fuel body defining a plurality of interconnected open-cell pores. At a block 10580, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 10590, a plurality of first components coupled to the fluid control subassembly are used to supply a fission product removal fluid to the fluid control subassembly, so as to enable the fluid control subassembly to circulate the fission product removal fluid through the pores of the nuclear fuel body, whereby at least a portion of the volatile fission product is acquired by the pores of the nuclear fuel body and is removed from the pores of the nuclear fuel body while said fluid control subassembly circulates the fission product removal fluid through the pores of the nuclear fuel body. At a block 10600, a plurality of second components coupled to the fluid control subassembly are used to supply a heat removal fluid to the fluid control subassembly, so as to enable the fluid control subassembly to circulate a heat removal fluid through the pores of the nuclear fuel body, whereby at least a portion of the heat generated by the nuclear fuel body is removed from the nuclear fuel body while the fluid control subassembly circulates the heat removal fluid through the pores of the nuclear fuel body. At a block 10610, the first components and the second components are used so that at least one of the first components and at least one of the second components are identical. The method 10550 stops at a block 10620.

Referring to FIG. 23BQ, an illustrative method 10630 for operating a nuclear fission reactor fuel assembly starts at a block 10640. At a block 10650, an enclosure is used that encloses a heat-generating nuclear fuel body therein, the nuclear fuel body defining a plurality of interconnected open-cell pores. At a block 10660, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 10670, a dual-purpose circuit coupled to the enclosure is used to selectively remove the volatile fission product and heat from the nuclear fuel body. The method 10630 stops at a block 10680.

Referring to FIG. 23BR, an illustrative method 10690 for operating a nuclear fission reactor fuel assembly starts at a block 10700. At a block 10710, an enclosure is used that encloses a heat-generating nuclear fuel body therein, the nuclear fuel body defining a plurality of interconnected open-cell pores. At a block 10720, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 10730, the fluid control subassembly is used to circulate a gas through the pores of the nuclear fuel body. The method 10690 stops at a block 10740.

Referring to FIG. 23BS, an illustrative method 10750 for operating a nuclear fission reactor fuel assembly starts at a block 10760. At a block 10770, an enclosure is used that encloses a heat-generating nuclear fuel body therein, the nuclear fuel body defining a plurality of interconnected open-cell pores. At a block 10780, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 10790, the fluid control subassembly is used to circulate a liquid through the pores of the nuclear fuel body. The method 10750 stops at a block 10800.

Referring to FIG. 23BT, an illustrative method 10810 for operating a nuclear fission reactor fuel assembly starts at a block 10820. At a block 10830, an enclosure is used that encloses a heat-generating nuclear fuel body therein, the nuclear fuel body defining a plurality of interconnected open-cell pores. At a block 10840, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 10850, the enclosure is used so as to enclose a nuclear fuel body in the form of a foam defining the plurality of pores. The method 10810 stops at a block 10860.

Referring to FIG. 23BU, an illustrative method 10870 for operating a nuclear fission reactor fuel assembly starts at a block 10880. At a block 10890, an enclosure is used that encloses a heat-generating nuclear fuel body therein, the nuclear fuel body defining a plurality of interconnected open-cell pores. At a block 10900, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 10910, the enclosure is used so as to enclose a nuclear fuel body having a plurality of channels. The method 10870 stops at a block 10920.

Referring to FIG. 23BV, an illustrative method 10930 for operating a nuclear fission reactor fuel assembly starts at a block 10940. At a block 10950, an enclosure is used that encloses a heat-generating nuclear fuel body therein, the nuclear fuel body defining a plurality of interconnected open-cell pores. At a block 10960, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 10970, the enclosure is used so as to enclose a nuclear fuel body having a plurality of channels. At a block 10980, the enclosure is used so as to enclose a nuclear fuel body having a plurality of particles defining the plurality of channels therebetween. The method 10930 stops at a block 10990.

Referring to FIG. 23BW, an illustrative method 11000 for operating a nuclear fission reactor fuel assembly starts at a block 11010. At a block 11020, an enclosure is used that encloses a heat-generating nuclear fuel body therein, the nuclear fuel body defining a plurality of interconnected open-cell pores. At a block 11030, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 11040, the enclosure is used so as to enclose a nuclear fuel body defining the plurality of pores, the plurality of pores having a spatially non-uniform distribution. The method 11000 stops at a block 11050.

Referring to FIG. 23BX, an illustrative method 11060 for operating a nuclear fission reactor fuel assembly starts at a block 11070. At a block 11080, an enclosure is used that encloses a heat-generating nuclear fuel body therein, the nuclear fuel body defining a plurality of interconnected open-cell pores. At a block 11090, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 11100, the enclosure is used so as to enclose a nuclear fuel body having the plurality of pores for acquiring the volatile fission product released by the burn wave in the traveling wave nuclear fission reactor. The method 11060 stops at a block 11110.

Referring to FIG. 23BY, an illustrative method 11120 for operating a nuclear fission reactor fuel assembly starts at a block 11130. At a block 11140, an enclosure is used that encloses a heat-generating nuclear fuel body therein, the nuclear fuel body defining a plurality of interconnected open-cell pores. At a block 11150, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 11160, the enclosure is used so as to enclose a nuclear fuel body having the plurality of pores, one or more of the plurality of pores being of a predetermined configuration to allow at least a portion of the volatile fission product to escape the nuclear fuel body within a predetermined response time. The method 11120 stops at a block 11170.

Referring to FIG. 23BZ, an illustrative method 11180 for operating a nuclear fission reactor fuel assembly starts at a block 11190. At a block 11200, an enclosure is used that encloses a heat-generating nuclear fuel body therein, the nuclear fuel body defining a plurality of interconnected open-cell pores. At a block 11210, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 11220, the enclosure is used so as to enclose a nuclear fuel body having the plurality of pores to allow at least a portion of the volatile fission product to escape the nuclear fuel body within a predetermined response time of between approximately 10 seconds and approximately 1,000 seconds. The method 11180 stops at a block 11230.

Referring to FIG. 23CA, an illustrative method 11240 for operating a nuclear fission reactor fuel assembly starts at a block 11250. At a block 11260, an enclosure is used that encloses a heat-generating nuclear fuel body therein, the nuclear fuel body defining a plurality of interconnected open-cell pores. At a block 11270, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 11280, the enclosure is used so as to enclose a nuclear fuel body having the plurality of pores to allow at least a portion of the volatile fission product to escape the nuclear fuel body within a predetermined response time of between approximately one second and approximately 10,000 seconds. The method 11240 stops at a block 11290.

Referring to FIG. 23CB, an illustrative method 11300 for operating a nuclear fission reactor fuel assembly starts at a block 11310. At a block 11320, an enclosure is used that encloses a heat-generating nuclear fuel body therein, the nuclear fuel body defining a plurality of interconnected open-cell pores. At a block 11330, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 11340, the enclosure is used so as to enclose a nuclear fuel body having the plurality of pores to transport the volatile fission product through the nuclear fuel body. The method 11300 stops at a block 11350.

Referring to FIG. 23CC, an illustrative method 11360 for operating a nuclear fission reactor fuel assembly starts at a block 11370. At a block 11380, an enclosure is used that encloses a heat-generating nuclear fuel body therein, the nuclear fuel body defining a plurality of interconnected open-cell pores. At a block 11390, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 11400 the enclosure is used so as to sealingly enclose a nuclear fuel body having a cylindrical-shaped geometry. The method 11360 stops at a block 11410.

Referring to FIG. 23CD, an illustrative method 11420 for operating a nuclear fission reactor fuel assembly starts at a block 11430. At a block 11440, an enclosure is used that encloses a heat-generating nuclear fuel body therein, the nuclear fuel body defining a plurality of interconnected open-cell pores. At a block 11450, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 11460, the enclosure is used so as to sealingly enclose a nuclear fuel body having a polygonal-shaped geometry. The method 11420 stops at a block 11470.

Referring to FIG. 23CE, an illustrative method 11480 for operating a nuclear fission reactor fuel assembly starts at a block 11490. At a block 11500, an enclosure is used that encloses a heat-generating nuclear fuel body therein, the nuclear fuel body defining a plurality of interconnected open-cell pores. At a block 11510, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 11520, the method comprises operating a valve. The method 11480 stops at a block 11530.

Referring to FIG. 23CF, an illustrative method 11540 for operating a nuclear fission reactor fuel assembly starts at a block 11550. At a block 11560, an enclosure is used that encloses a heat-generating nuclear fuel body therein, the nuclear fuel body defining a plurality of interconnected open-cell pores. At a block 11570, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 11580, flow of a fluid is controlled between the enclosure and the fluid control subassembly by operating a valve interposed between the enclosure and the fluid control subassembly. The method 11540 stops at a block 11590.

Referring to FIG. 23CG, an illustrative method 11600 for operating a nuclear fission reactor fuel assembly starts at a block 11610. At a block 11620, an enclosure is used that encloses a heat-generating nuclear fuel body therein, the nuclear fuel body defining a plurality of interconnected open-cell pores. At a block 11630, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 11640, flow of a fluid is controlled between the enclosure and the fluid control subassembly by operating a valve interposed between the enclosure and the fluid control subassembly. At a block 11650, flow of a fluid is controlled between the enclosure and the fluid control subassembly by operating a back-flow prevention valve. The method 11600 stops at a block 11660.

Referring to FIG. 23CH, an illustrative method 11670 for operating a nuclear fission reactor fuel assembly starts at a block 11680. At a block 11690, an enclosure is used that encloses a heat-generating nuclear fuel body therein, the nuclear fuel body defining a plurality of interconnected open-cell pores. At a block 11700, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 11710, a controllably breakable barrier is used. The method 11670 stops at a block 11720.

Referring to FIG. 23CI, an illustrative method 11730 for operating a nuclear fission reactor fuel assembly starts at a block 11740. At a block 11750, an enclosure is used that encloses a heat-generating nuclear fuel body therein, the nuclear fuel body defining a plurality of interconnected open-cell pores. At a block 11760, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 11770, a controllably breakable barrier is interposed between the enclosure and the fluid control subassembly. The method 11730 stops at a block 11780.

Referring to FIG. 23CJ, an illustrative method 11790 for operating a nuclear fission reactor fuel assembly starts at a block 11800. At a block 11810, an enclosure is used that encloses a heat-generating nuclear fuel body therein, the nuclear fuel body defining a plurality of interconnected open-cell pores. At a block 11820, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 11830, a controllably breakable barrier is interposed between the enclosure and the fluid control subassembly. The method 11790 stops at a block 11840.

Referring to FIG. 23CK, an illustrative method 11850 for operating a nuclear fission reactor fuel assembly starts at a block 11860. At a block 11870, an enclosure is used that encloses a heat-generating nuclear fuel body therein, the nuclear fuel body defining a plurality of interconnected open-cell pores. At a block 11880, a fluid control subassembly coupled to the enclosure is used to control removal of at least a portion of the volatile fission product from the pores of the nuclear fuel body and to control removal of at least a portion of the heat generated by the nuclear fuel body at a plurality of locations corresponding to the burn wave of the traveling wave nuclear fission reactor by controlling fluid flow in a plurality of regions of the traveling wave nuclear fission reactor proximate to the plurality of locations corresponding to the burn wave. At a block 11890, the method comprises interposing a barrier breakable by operator action. The method 11850 stops at a block 11900.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

Moreover, those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. For example, each of the embodiments of the nuclear fission reactor fuel assembly may be disposed in a thermal neutron reactor, a fast neutron reactor, a neutron breeder reactor or a fast neutron breeder reactor. Thus, each of the embodiments of the fuel assembly is versatile enough to be beneficially used in various nuclear reactor designs.

Therefore, what are provided are a nuclear fission reactor fuel assembly and system configured for controlled removal of a volatile fission product and heat released by a burn wave in a traveling wave nuclear fission reactor and method for same.

Moreover, the various aspects and embodiments disclosed herein are for purposes of illustration and are not intended to be limiting, with the true scope and spirit being indicated by the following claims.

What is claimed is:

1. A system for controlled removal of a volatile fission product released by presence of a burn wave in a nuclear fission reactor fuel assembly for a nuclear fission reactor, the system comprising:
an enclosure adapted to enclose a porous nuclear fuel body defining a plurality of pores having the volatile fission product therein;
a fluid control subassembly coupled to said enclosure to remove volatile fission product from the porous nuclear fuel body, the fluid control subassembly including:
a heat removal flow path for sequentially, circulating a fluid through the enclosure, the heat removal flow path including a first holding container coupled to the enclosure for providing the fluid to the enclosure and a heat exchanger coupled to the enclosure for removing heat from the fluid exiting the enclosure, the heat exchanger coupled to the first holding container for returning the fluid to the enclosure,
a fission product removal flow path for removing volatile fission product from the porous nuclear fuel body by removing the fluid containing volatile fission product therein, the fission product removal flow path including a second holding container coupled to the enclosure for holding fluid removed from the enclosure;
a control unit coupled to the heat removal flow path and the fission product removal flow path of the fluid control subassembly, the control unit configured to control operation of said heat removal flow path and the fission product flow path by controlling operation of the heat removal flow path and the fission product flow path by selectively operating the heat removal flow path to provide fluid circulation through the enclosure to remove heat from the enclosure, and in response to a selective operator, the control unit selectively ceases operation of the heat removal flow path and selectively operates the fission product removal flow path to remove the fluid containing the volatile fission products from the enclosure, the selective operator including a fission product pressure level in the nuclear fission reactor.

2. The system according to claim 1, wherein the selective operator further includes a time schedule associated with the traveling wave nuclear fission reactor.

3. The system according to claim 1, wherein the selective operator further includes an amount of time the traveling wave nuclear fission reactor is operated.

4. The system according to claim 1, wherein said enclosure encloses the porous nuclear fuel body.

5. The system according to claim 1, wherein said enclosure encloses a porous nuclear fuel body having a plurality of pores, at least some of the pores being of a predetermined configuration for allowing the volatile fission product to escape the porous nuclear fuel body within a predetermined response time.

6. The system according to claim 1, wherein said enclosure encloses a porous nuclear fuel body having a plurality of pores for allowing the volatile fission product to escape the porous nuclear fuel body within a predetermined response time of between approximately one second and approximately 10,000 seconds.

7. The system according to claim 6, wherein said enclosure encloses a porous nuclear fuel body having a plurality of pores for allowing the volatile fission product to escape the porous nuclear fuel body within a predetermined response time of between approximately 10 seconds and approximately 1,000 seconds.

8. The system according to claim 1, further comprising a pump integrally connected to said fluid control subassembly to circulate a fluid between the fluid control subassembly and the porous nuclear fuel body.

9. The system according to claim 1, wherein said fluid control subassembly comprises a valve.

10. The system according to claim 9, wherein said valve includes a back-flow prevention valve.

11. The system according to claim 1, further comprising a valve interposed between said enclosure and said fluid control subassembly to control flow of a fluid between said enclosure and said fluid control subassembly.

12. The system according to claim 11, wherein said valve includes a back-flow prevention valve.

13. The system according to claim 1, wherein said fission product removal flow path of the fluid control subassembly comprises a controllably breakable barrier.

14. The system according to claim 13, wherein said barrier breaks at a predetermined pressure.

15. The system according to claim 13, wherein said barrier breaks by operator action.

* * * * *